US010721006B2

(12) United States Patent
Murakami et al.

(10) Patent No.: US 10,721,006 B2
(45) Date of Patent: Jul. 21, 2020

(54) TRANSMISSION METHOD, TRANSMISSION DEVICE, RECEPTION METHOD, AND RECEPTION DEVICE

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: SUN PATENT TRUST, New York, NY (US)

( * ) Notice: Subject to any disclaimer, the term of this patent is extended or adjusted under 35 U.S.C. 154(b) by 129 days.

(21) Appl. No.: 14/958,785

(22) Filed: Dec. 3, 2015

(65) Prior Publication Data

US 2016/0087736 A1 Mar. 24, 2016

Related U.S. Application Data

(63) Continuation of application No. PCT/JP2014/003104, filed on Jun. 11, 2014.

(Continued)

(30) Foreign Application Priority Data

Jun. 14, 2013 (JP) ................................ 2013-125629
Jun. 20, 2013 (JP) ................................ 2013-129569

(Continued)

(51) Int. Cl.
*H04H 20/59* (2008.01)
*H04H 60/42* (2008.01)

(Continued)

(52) U.S. Cl.
CPC ............... *H04H 20/59* (2013.01); *H04B 1/16* (2013.01); *H04H 60/42* (2013.01); *H04H 60/51* (2013.01);

(Continued)

(58) Field of Classification Search
CPC ....................................................... H04L 27/00
See application file for complete search history.

(56) References Cited

U.S. PATENT DOCUMENTS

2002/0004705 A1 1/2002 Baron, Sr. et al.
2007/0216535 A1 9/2007 Carrino (Continued)

FOREIGN PATENT DOCUMENTS

JP 2007-180628 7/2007
JP 2009-296575 12/2009

(Continued)

OTHER PUBLICATIONS

Communication pursuant to Article 94(3) EPC dated Mar. 29, 2017 in corresponding European Application No. 14811642.9.

(Continued)

*Primary Examiner* — Zhiren Qin
(74) *Attorney, Agent, or Firm* — Wenderoth, Lind & Ponack, L.L.P.

(57) ABSTRACT

A transmission method for transmitting an emergency warning signal, pertaining to one aspect of the present disclosure, includes: generating control information, the control information including a flag indicating either presence or absence of information related to a region and, when the flag indicates presence, information related to the region; acquiring information related to emergency warning content; and generating the emergency warning signal including the control information and the information related to the emergency warning content. Thus, emergency warning (early (Continued)

warning) information can be transmitted with greater precision.

3 Claims, 105 Drawing Sheets

Related U.S. Application Data

(60) Provisional application No. 61/837,334, filed on Jun. 20, 2013.

(30) Foreign Application Priority Data

Jun. 24, 2013 (JP) ................................ 2013-131923
Jul. 31, 2013 (JP) ................................ 2013-159448
May 22, 2014 (JP) ................................ 2014-106349

(51) Int. Cl.

| | |
|---|---|
| ***H04H 60/51*** | (2008.01) |
| ***H04L 27/20*** | (2006.01) |
| ***H04B 1/16*** | (2006.01) |
| ***H04L 27/00*** | (2006.01) |
| ***H04N 21/488*** | (2011.01) |
| ***H04N 21/81*** | (2011.01) |
| ***H04N 21/422*** | (2011.01) |
| ***H04N 21/45*** | (2011.01) |
| ***H04L 1/00*** | (2006.01) |
| ***H04N 21/6543*** | (2011.01) |
| ***H04L 27/22*** | (2006.01) |

(52) U.S. Cl.

CPC .............. *H04L 1/005* (2013.01); *H04L 1/007* (2013.01); *H04L 1/0041* (2013.01); *H04L 1/0045* (2013.01); *H04L 1/0071* (2013.01); *H04L 1/0072* (2013.01); *H04L 1/0075* (2013.01); *H04L 27/0008* (2013.01); *H04L 27/20* (2013.01); *H04L 27/22* (2013.01); *H04N 21/42202* (2013.01); *H04N 21/4524* (2013.01); *H04N 21/4882* (2013.01); *H04N 21/6543* (2013.01); *H04N 21/814* (2013.01)

(56) References Cited

U.S. PATENT DOCUMENTS

| | | | | |
|---|---|---|---|---|
| 2010/0009651 A1 | 1/2010 | Daly et al. | | |
| 2011/0117874 A1* | 5/2011 | Shaw | G08B 27/006 | 455/404.1 |
| 2011/0280381 A1* | 11/2011 | Okamoto | G01V 1/008 | 379/37 |
| 2012/0113324 A1* | 5/2012 | Yoshida | H04B 1/18 | 348/555 |
| 2012/0208493 A1* | 8/2012 | Park | H04W 4/90 | 455/404.2 |
| 2013/0094617 A1* | 4/2013 | Shirosugi | H04N 21/4882 | 375/340 |
| 2013/0191862 A1* | 7/2013 | Ishihara | G08B 27/008 | 725/33 |
| 2013/0312059 A1* | 11/2013 | Otsuki | H04H 60/13 | 726/1 |
| 2014/0050137 A1* | 2/2014 | Alberth, Jr. | H04W 4/06 | 370/312 |
| 2014/0105097 A1* | 4/2014 | Liu | H04W 4/12 | 370/312 |
| 2014/0143802 A1* | 5/2014 | Hamada | H04N 21/4755 | 725/33 |
| 2014/0331271 A1* | 11/2014 | Ohmata | H04H 60/14 | 725/151 |
| 2014/0344846 A1* | 11/2014 | Yamamura | H04N 21/2396 | 725/25 |
| 2015/0003809 A1* | 1/2015 | Matsuda | G11B 27/105 | 386/248 |

FOREIGN PATENT DOCUMENTS

| | | |
|---|---|---|
| JP | 2013-016953 | 1/2013 |
| WO | 2014/028289 | 2/2014 |

OTHER PUBLICATIONS

International Search Report of PCT application No. PCT/JP2014/003104 dated Sep. 2, 2014.

Aik Chindapol et al., "Design, Analysis, and Performance Evaluation for BICM-ID with Square QAM Constellations in Rayleigh Fading Channels" IEEE Journal on selected areas in communications, vol. 19, No. 5, May 2001, pp. 944-957.

Extended European Search Report dated Dec. 21, 2018 in European Application No. 18192942.3.

"Common Alerting Protocol, v. 1.1", edited by Elysa Jones et al., OASIS Standard CAP-V1.1, Oct. 2005, XP055534374.

* cited by examiner

Stream type/relative stream information

| Stream type of relative stream 0 | Stream type of relative stream 1 | Stream type of relative stream 2 | ... | Stream type of relative stream 15 |
|---|---|---|---|---|
| 8 | 8 | 8 | | 8 |

(b)

Stream type information

| Value | Assignment |
|---|---|
| 00000000 | Reserved |
| 00000001 | MPEG-2TS |
| 00000010 | TLV |
| 00000011 | Video (moving image) of resolution approximately 4k (for example, 3840) pixels horizontally by approximately 2k (for example 2160) pixels vertically |
| 00000100 | Video (moving image) of resolution approximately 8k (for example, 7680) pixels horizontally by approximately 4k (for example 4320) pixels vertically |
| 00000101 | Differential information for generating video (moving image) of resolution approximately 8k (for example, 7680) pixels horizontally by approximately 4k (for example 4320) pixels vertically from a video (moving image) of resolution approximately 4k (for example, 3840) pixels horizontally by approximately 2k (for example 2160) pixels vertically |
| 00000110 | ··· |
| 00000111 ～ 11111110 | Reserved |
| 11111111 | No type assigned |

Parameters specifying 4k, 8k, and differential for 8k (layer transmission)

A200

(a)

(b)

| Satellite broadcast scheme | Extended identifier | Extended region |
|---|---|---|
| Scheme A | All "0" | All "1" |
| Scheme B | Values other than all "0" | ··· |

Scheme A: One ring ratio is assigned for a value of error coding
Scheme B: A plurality of ring ratios are assigned for a value of error coding

FIG. 48

Scheme B (1) Scheme

Scheme B

⇩

$d_0$ = "1"

(2) Coding rate and ring ratio table

Table 1

| Value ($b_0b_1b_2b_3$) | Coding rate | Ring ratio |
|---|---|---|
| 0000 | 41/120 | 3.09 |
| 0001 | 49/120 | 2.97 |
| ... | ... | ... |
| 1001 | 109/120 | 2.69 |
| ... | ... | ... |

Table 2

| Value ($b_0b_1b_2b_3$) | Coding rate | Ring ratio |
|---|---|---|
| 0000 | 41/120 | 4.00 |
| 0001 | 49/120 | 3.91 |
| ... | ... | ... |
| 1001 | 109/120 | 3.60 |
| ... | ... | ... |

...

Table 16

| Value ($b_0b_1b_2b_3$) | Coding rate | Ring ratio |
|---|---|---|
| 0000 | 41/120 | 2.59 |
| 0001 | 49/120 | 2.50 |
| ... | ... | ... |
| 1001 | 109/120 | 2.23 |
| ... | ... | ... |

Coding rate 41/120
Ring ratio 4.00

$b_0b_1b_2b_3$ = "0000"
Table 2

| Value ($c_0c_1c_2c_3$) | Table |
|---|---|
| 0000 | Table 1 |
| 0001 | Table 2 |
| ... | ... |
| 1111 | Table 16 |

Scheme B (1) Scheme

Scheme B
⇩
$d_0$ = "1"
⇩
$Z_0$ = "0" ⟹ Set to same ring ratio as scheme A
$Z_0$ = "1" ⟹ Set to ring ratio for scheme B (2) Ring ratio Table 1

| Value ($b_0b_1b_2b_3$) | Coding rate | Ring ratio |
|---|---|---|
| 0000 | 41/120 | 3.09 |
| 0001 | 49/120 | 2.97 |
| … | … | … |
| 1001 | 109/120 | 2.69 |
| … | … | … |

Table 2

| Value ($b_0b_1b_2b_3$) | Coding rate | Ring ratio |
|---|---|---|
| 0000 | 41/120 | 4.00 |
| 0001 | 49/120 | 3.91 |
| … | … | … |
| 1001 | 109/120 | 3.60 |
| … | … | … |

…

Table 16

| Value ($b_0b_1b_2b_3$) | Coding rate | Ring ratio |
|---|---|---|
| 0000 | 41/120 | 2.59 |
| 0001 | 49/120 | 2.50 |
| … | … | … |
| 1001 | 109/120 | 2.23 |
| … | … | … |

Coding rate 41/120
Ring ratio 4.00

Table 2

| Value ($c_0c_1c_2c_3$) | Table |
|---|---|
| 0000 | Table 1 |
| 0001 | Table 2 |
| … | … |
| 1111 | Table 16 |

Scheme B

Ring ratio 2.00

$x_0x_1x_2x_3x_4x_5$ = 000000

| Value ($x_0x_1x_2x_3x_4x_5$) | Ring ratio |
|---|---|
| 000000 | 2.00 |
| … | … |
| 111111 | 4.00 |

FIG. 51

Scheme B

Coding rate 41/120
Ring ratio 3.49

$b_0b_1b_2b_3$ = "0000"

Main table

| Value ($b_0b_1b_2b_3$) | Coding rate | Ring ratio |
|---|---|---|
| 0000 | 41/120 | 3.09 |
| 0001 | 49/120 | 2.97 |
| 0010 | 61/120 | 3.93 |
| … | … | … |

Ring ratio
3.49 − 3.09 = +0.4

$y_0y_1y_2y_3y_4y_5$ = "011110"

Difference table

| Value ($y_0y_1y_2y_3y_4y_5$) | Ring ratio difference |
|---|---|
| 000000 | … |
| … | … |
| 011110 | +0.4 |
| 011111 | +0.2 |
| 100000 | 0 |
| 100001 | −0.2 |
| 100010 | −0.4 |
| … | … |
| 111111 | −2.0 |

FIG. 52

Scheme B

Coding rate 41/120
Ring ratio 2.78

$b_0b_1b_2b_3$ = "0000"

Main table

| Value ($b_0b_1b_2b_3$) | Coding rate | Ring ratio |
| --- | --- | --- |
| 0000 | 41/120 | 3.09 |
| 0001 | 49/120 | 2.97 |
| 0010 | 61/120 | 3.93 |
| ... | ... | ... |

Ring ratio
2.78/3.09 = 0.9

$y_0y_1y_2y_3y_4y_5$ = "100001"

Difference table

| Value ($y_0y_1y_2y_3y_4y_5$) | Ring ratio difference |
| --- | --- |
| 000000 | ... |
| ... | ... |
| 011110 | ×1.2 |
| 011111 | ×1.1 |
| 100000 | ×1.0 |
| 100001 | ×0.9 |
| 100010 | ×0.8 |
| ... | ... |
| 111111 | ... |

FIG. 53

Scheme B (1) Scheme

Scheme B $d_0$ = "1"

(2) Coding rate and ring ratio table

Table 1

| Value ($b_0b_1b_2b_3$) | Coding rate | Ring ratio |
|---|---|---|
| 0000 | 41/120 | 3.09 |
| 0001 | 49/120 | 2.97 |
| ... | ... | ... |
| 1001 | 109/120 | 2.69 |
| ... | ... | ... |

Table 2

| Value ($b_0b_1b_2b_3$) | Coding rate | Ring ratio |
|---|---|---|
| 0000 | 41/120 | 4.00 |
| 0001 | 49/120 | 3.91 |
| ... | ... | ... |
| 1001 | 109/120 | 3.60 |
| ... | ... | ... |

...

Table 16

| Value ($b_0b_1b_2b_3$) | Coding rate | Ring ratio |
|---|---|---|
| 0000 | 41/120 | 2.59 |
| 0001 | 49/120 | 2.50 |
| ... | ... | ... |
| 1001 | 109/120 | 2.23 |
| ... | ... | ... |

Coding rate 41/120
Ring ratio 4.00

$b_0b_1b_2b_3$ = "0000"

Table 2

| Value ($c_0c_1c_2c_3$) | Table |
|---|---|
| 0000 | Table 1 |
| 0001 | Table 2 |
| ... | ... |
| 1111 | Table 16 |

Scheme B (1) Scheme

Scheme B

⇧

$d_0$ = "1"

⇧

$Z_0$ = "0" ⇐ Set to same ring ratio as scheme A $Z_0$ = "1" ⇐ Set to ring ratio for scheme B (2) Ring ratio Table 1

| Value ($b_0b_1b_2b_3$) | Coding rate | Ring ratio |
|---|---|---|
| 0000 | 41/120 | 3.09 |
| 0001 | 49/120 | 2.97 |
| ... | ... | ... |
| 1001 | 109/120 | 2.69 |
| ... | ... | ... |

Table 2

| Value ($b_0b_1b_2b_3$) | Coding rate | Ring ratio |
|---|---|---|
| 0000 | 41/120 | 4.00 |
| 0001 | 49/120 | 3.91 |
| ... | ... | ... |
| 1001 | 109/120 | 3.60 |
| ... | ... | ... |

...

Table 16

| Value ($b_0b_1b_2b_3$) | Coding rate | Ring ratio |
|---|---|---|
| 0000 | 41/120 | 2.59 |
| 0001 | 49/120 | 2.50 |
| ... | ... | ... |
| 1001 | 109/120 | 2.23 |
| ... | ... | ... |

Ring ratio 4.00

Table 2

| Value ($c_0c_1c_2c_3$) | Table |
|---|---|
| 0000 | Table 1 |
| 0001 | Table 2 |
| ... | ... |
| 1111 | Table 16 |

Scheme B

Ring ratio 2.00

$x_0x_1x_2x_3x_4x_5$ = 000000

| Value ($x_0x_1x_2x_3x_4x_5$) | Ring ratio |
|---|---|
| 000000 | 2.00 |
| ... | ... |
| 111111 | 4.00 |

FIG. 56

Scheme B

Coding rate 41/120
Ring ratio 3.49

$b_0b_1b_2b_3$ = "0000"

Main table

| Value ($b_0b_1b_2b_3$) | Coding rate | Ring ratio |
|---|---|---|
| 0000 | 41/120 | 3.09 |
| 0001 | 49/120 | 2.97 |
| 0010 | 61/120 | 3.93 |
| ... | ... | ... |

Ring ratio
3.49 − 3.09 = +0.4

$y_0y_1y_2y_3y_4y_5$ = "011110"

Difference table

| Value ($y_0y_1y_2y_3y_4y_5$) | Ring ratio difference |
|---|---|
| 000000 | ... |
| ... | ... |
| 011110 | +0.4 |
| 011111 | +0.2 |
| 100000 | 0 |
| 100001 | −0.2 |
| 100010 | −0.4 |
| ... | ... |
| 111111 | −2.0 |

FIG. 57

Scheme B

Coding rate 41/120
Ring ratio 2.78

$b_0b_1b_2b_3$ = "0000"

Main table

| Value ($b_0b_1b_2b_3$) | Coding rate | Ring ratio |
|---|---|---|
| 0000 | 41/120 | 3.09 |
| 0001 | 49/120 | 2.97 |
| 0010 | 61/120 | 3.93 |
| ... | ... | ... |

Ring ratio
2.78/3.09=0.9

$y_0y_1y_2y_3y_4y_5$ = "100001"

Difference table

| Value ($y_0y_1y_2y_3y_4y_5$) | Ring ratio difference |
|---|---|
| 000000 | ... |
| ... | ... |
| 011110 | ×1.2 |
| 011111 | ×1.1 |
| 100000 | ×1.0 |
| 100001 | ×0.9 |
| 100010 | ×0.8 |
| ... | ... |
| 111111 | ... |

FIG. 59

Scheme B (1) Scheme

Scheme B $d_0$ = "1"

(2) Coding rate, Ring ratio, and Table

Table 1

| Value ($b_0b_1b_2b_3$) | Coding rate | Ring ratio $r_1$ | Ring ratio $r_2$ |
|---|---|---|---|
| 0000 | 41/120 | 3.09 | 6.53 |
| 0001 | 49/120 | 2.97 | 7.17 |
| … | … | … | … |
| 1001 | 109/120 | 2.69 | 4.66 |

Table 2

| Value ($b_0b_1b_2b_3$) | Coding rate | Ring ratio $r_1$ | Ring ratio $r_2$ |
|---|---|---|---|
| 0000 | 41/120 | 3.50 | 7.21 |
| 0001 | 49/120 | 3.20 | 7.15 |
| … | … | … | … |
| 1001 | 109/120 | 3.00 | 5.22 |

…

Table 16

| Value ($b_0b_1b_2b_3$) | Coding rate | Ring ratio $r_1$ | Ring ratio $r_2$ |
|---|---|---|---|
| 0000 | 41/120 | 3.80 | 7.33 |
| 0001 | 49/120 | 3.50 | 7.28 |
| … | … | … | … |
| 1001 | 109/120 | 3.20 | 5.33 |

Coding rate 41/120
Ring ratio $r_1$ 3.50
Ring ratio $r_2$ 7.21

$b_0b_1b_2b_3$ = "0000"
Table 2

| Value ($c_0c_1c_2c_3$) | Table |
|---|---|
| 0000 | Table 1 |
| 0001 | Table 2 |
| … | … |
| 1111 | Table 16 |

Scheme B (1) Scheme

Scheme B

⇩

$d_0$ = "1"

⇩

$Z_0$ = "0" ⟹ Set to same ring ratio as scheme A $Z_0$ = "1" ⟹ Set to ring ratio for scheme B (2) Ring ratio Table 1

| Value ($b_0b_1b_2b_3$) | Coding rate | Ring ratio $r_1$ | Ring ratio $r_2$ |
|---|---|---|---|
| 0000 | 41/120 | 3.09 | 6.53 |
| 0001 | 49/120 | 2.97 | 7.17 |
| ... | ... | ... | ... |
| 1001 | 109/120 | 2.69 | 4.66 |

Table 2

| Value ($b_0b_1b_2b_3$) | Coding rate | Ring ratio $r_1$ | Ring ratio $r_2$ |
|---|---|---|---|
| 0000 | 41/120 | 3.50 | 7.21 |
| 0001 | 49/120 | 3.20 | 7.15 |
| ... | ... | ... | ... |
| 1001 | 109/120 | 3.00 | 5.22 |

...

Table 16

| Value ($b_0b_1b_2b_3$) | Coding rate | Ring ratio $r_1$ | Ring ratio $r_2$ |
|---|---|---|---|
| 0000 | 41/120 | 3.80 | 7.33 |
| 0001 | 49/120 | 3.50 | 7.28 |
| ... | ... | ... | ... |
| 1001 | 109/120 | 3.20 | 5.33 |

Coding rate 41/120
Ring ratio $r_1$ 3.50
Ring ratio $r_2$ 7.21

$b_0b_1b_2b_3$ = "0000"
Table 2

| Value ($c_0c_1c_2c_3$) | Table |
|---|---|
| 0000 | Table 1 |
| 0001 | Table 2 |
| ... | ... |
| 1111 | Table 16 |

Scheme B

Coding rate 41/120
Ring ratio $r_1$ 3.49
Ring ratio $r_2$ 6.73

Main table

| Value ($b_0b_1b_2b_3$) | Coding rate | Ring ratio $r_1$ | Ring ratio $r_2$ |
|---|---|---|---|
| 0000 | 41/120 | 3.09 | 6.53 |
| 0001 | 49/120 | 2.97 | 7.17 |
| ... | ... | ... | ... |
| 1001 | 109/120 | 2.69 | 4.66 |

$b_0b_1b_2b_3$ = "0000"

Ring ratio $r_1$ 3.49

Difference table

| Value ($y_0y_1y_2y_3y_4y_5$) | Ring ratio difference |
|---|---|
| 000000 | ... |
| ... | ... |
| 011110 | +0.40 |
| 011111 | +0.20 |
| 100000 | 0 |
| 100001 | -0.20 |
| 100010 | -0.40 |
| ... | ... |
| 111111 | ... |

Ring ratio difference
3.49 - 3.09 = +0.4

$y_0y_1y_2y_3y_4y_5$ = "011110"

Ring ratio $r_2$ 6.73

Difference table

| Value ($y_6y_7y_8y_9y_{10}y_{11}$) | Ring ratio difference |
|---|---|
| 000000 | ... |
| ... | ... |
| 011110 | +0.40 |
| 011111 | +0.20 |
| 100000 | 0 |
| 100001 | -0.20 |
| 100010 | -0.40 |
| ... | ... |
| 111111 | ... |

Ring ratio difference
6.73 - 6.53 = +0.2

Scheme B

Coding rate 41/120
Ring ratio $r_1$ 2.78
Ring ratio $r_2$ 7.183

Main table

| Value ($b_0b_1b_2b_3$) | Coding rate | Ring ratio $r_1$ | Ring ratio $r_2$ |
|---|---|---|---|
| 0000 | 41/120 | 3.09 | 6.53 |
| 0001 | 49/120 | 2.97 | 7.17 |
| ... | ... | ... | ... |
| 1001 | 109/120 | 2.69 | 4.66 |

$b_0b_1b_2b_3$ = "0000"

Ring ratio $r_1$ 2.78

Difference table (multiplication factor table)

Ring ratio factor 2.78/3.09 = 0.9

| Value ($y_0y_1y_2y_3y_4y_5$) | Ring ratio difference |
|---|---|
| 000000 | ... |
| ... | ... |
| 011110 | ×1.20 |
| 011111 | ×1.10 |
| 100000 | ×1.00 |
| 100001 | ×0.90 |
| 100010 | ×0.80 |
| ... | ... |
| 111111 | ... |

$y_0y_1y_2y_3y_4y_5$ = "100001"

Ring ratio $r_2$ 7.183

Difference table (multiplication factor table)

Ring ratio factor 7.183/6.53 = 1.1

| Value ($y_6y_7y_8y_9y_{10}y_{11}$) | Ring ratio difference |
|---|---|
| 000000 | ... |
| ... | ... |
| 011110 | ×1.20 |
| 011111 | ×1.10 |
| 100000 | ×1.00 |
| 100001 | ×0.90 |
| 100010 | ×0.80 |
| ... | ... |
| 111111 | ... |

Scheme B (1) Scheme

Scheme B $d_0$ = "1"

(2) Coding rate, Ring ratio, and Table

Table 1

| Value ($b_0b_1b_2b_3$) | Coding rate | Ring ratio $r_1$ | Ring ratio $r_2$ |
|---|---|---|---|
| 0000 | 41/120 | 3.09 | 6.53 |
| 0001 | 49/120 | 2.97 | 7.17 |
| … | … | … | … |
| 1001 | 109/120 | 2.69 | 4.66 |

Table 2

| Value ($b_0b_1b_2b_3$) | Coding rate | Ring ratio $r_1$ | Ring ratio $r_2$ |
|---|---|---|---|
| 0000 | 41/120 | 3.50 | 7.21 |
| 0001 | 49/120 | 3.20 | 7.15 |
| … | … | … | … |
| 1001 | 109/120 | 3.00 | 5.22 |

…

Table 16

| Value ($b_0b_1b_2b_3$) | Coding rate | Ring ratio $r_1$ | Ring ratio $r_2$ |
|---|---|---|---|
| 0000 | 41/120 | 3.80 | 7.33 |
| 0001 | 49/120 | 3.50 | 7.28 |
| … | … | … | … |
| 1001 | 109/120 | 3.20 | 5.33 |

Coding rate 41/120
Ring ratio $r_1$ 3.50
Ring ratio $r_2$ 7.21

$b_0b_1b_2b_3$ = "0000"
Table 2

| Value ($c_0c_1c_2c_3$) | Table |
|---|---|
| 0000 | Table 1 |
| 0001 | Table 2 |
| … | … |
| 1111 | Table 16 |

Scheme B (1) Scheme

Scheme B $d_0$ = "1"

$Z_0$ = "0" ⇒ Set to same ring ratio as scheme A
$Z_0$ = "1" ⇒ Set to ring ratio for scheme B (2) Ring ratio Table 1

| Value ($b_0b_1b_2b_3$) | Coding rate | Ring ratio $r_1$ | Ring ratio $r_2$ |
|---|---|---|---|
| 0000 | 41/120 | 3.09 | 6.53 |
| 0001 | 49/120 | 2.97 | 7.17 |
| ... | ... | ... | ... |
| 1001 | 109/120 | 2.69 | 4.66 |

Table 2

| Value ($b_0b_1b_2b_3$) | Coding rate | Ring ratio $r_1$ | Ring ratio $r_2$ |
|---|---|---|---|
| 0000 | 41/120 | 3.50 | 7.21 |
| 0001 | 49/120 | 3.20 | 7.15 |
| ... | ... | ... | ... |
| 1001 | 109/120 | 3.00 | 5.22 |

...

Table 16

| Value ($b_0b_1b_2b_3$) | Coding rate | Ring ratio $r_1$ | Ring ratio $r_2$ |
|---|---|---|---|
| 0000 | 41/120 | 3.80 | 7.33 |
| 0001 | 49/120 | 3.50 | 7.28 |
| ... | ... | ... | ... |
| 1001 | 109/120 | 3.20 | 5.33 |

Coding rate 41/120
Ring ratio $r_1$ 3.50
Ring ratio $r_2$ 7.21

$b_0b_1b_2b_3$ = "0000"
Table 2

| Value ($c_0c_1c_2c_3$) | Table |
|---|---|
| 0000 | Table 1 |
| 0001 | Table 2 |
| ... | ... |
| 1111 | Table 16 |

Scheme B

Ring ratio $r_1$ 2.00

| Value ($x_0x_1x_2x_3x_4x_5$) | Ring ratio $r_1$ |
|---|---|
| 000000 | 2.00 |
| ... | ... |
| 111111 | 4.00 |

$x_0x_1x_2x_3x_4x_5$ = 000000

Ring ratio $r_2$ 7.00

| Value ($x_6x_7x_8x_9x_{10}x_{11}$) | Ring ratio $r_2$ |
|---|---|
| 000000 | 3.00 |
| ... | ... |
| 111111 | 7.00 |

$x_6x_7x_8x_9x_{10}x_{11}$ = 111111

Main table

| Value ($b_0b_1b_2b_3$) | Coding rate | Ring ratio $r_1$ | Ring ratio $r_2$ |
|---|---|---|---|
| 0000 | 41/120 | 3.09 | 6.53 |
| 0001 | 49/120 | 2.97 | 7.17 |
| ... | ... | ... | ... |
| 1001 | 109/120 | 2.69 | 4.66 |

Difference table

| Value ($y_0y_1y_2y_3y_4y_5$) | Ring ratio difference |
|---|---|
| 000000 | ... |
| ... | ... |
| 011110 | +0.40 |
| 011111 | +0.20 |
| 100000 | 0 |
| 100001 | -0.20 |
| 100010 | -0.40 |
| ... | ... |
| 111111 | ... |

Difference table

| Value ($y_6y_7y_8y_9y_{10}y_{11}$) | Ring ratio difference |
|---|---|
| 000000 | ... |
| ... | ... |
| 011110 | +0.40 |
| 011111 | +0.20 |
| 100000 | 0 |
| 100001 | -0.20 |
| 100010 | -0.40 |
| ... | ... |
| 111111 | ... |

FIG. 68

Scheme B

Coding rate 41/120
Ring ratio $r_1$ 2.78
Ring ratio $r_2$ 7.183

$b_0b_1b_2b_3$ = "0000"

Main table

| Value ($b_0b_1b_2b_3$) | Coding rate | Ring ratio $r_1$ | Ring ratio $r_2$ |
|---|---|---|---|
| 0000 | 41/120 | 3.09 | 6.53 |
| 0001 | 49/120 | 2.97 | 7.17 |
| … | … | … | … |
| 1001 | 109/120 | 2.69 | 4.66 |

Ring ratio $r_1$ 2.78

Ring ratio $r_2$ 7.183

Ring ratio factor
2.78/3.09 = 0.9

Difference table
(multiplication factor table)

| Value ($y_0y_1y_2y_3y_4y_5$) | Ring ratio difference |
|---|---|
| 000000 | … |
| … | … |
| 011110 | ×1.20 |
| 011111 | ×1.10 |
| 100000 | ×1.00 |
| 100001 | ×0.90 |
| 100010 | ×0.80 |
| … | … |
| 111111 | … |

$y_0y_1y_2y_3y_4y_5$ = "100001"

Difference table
(multiplication factor table)

| Value ($y_6y_7y_8y_9y_{10}y_{11}$) | Ring ratio difference |
|---|---|
| 000000 | … |
| … | … |
| 011110 | ×1.20 |
| 011111 | ×1.10 |
| 100000 | ×1.00 |
| 100001 | ×0.90 |
| 100010 | ×0.80 |
| … | … |
| 111111 | … |

Ring ratio factor
7.183/6.53 = 1.1

| | | | | | | | | |
|---|---|---|---|---|---|---|---|---|
| Change indicator | Transmission mode/ slot information | Stream identifier/ relative stream | Packet format/ relative stream | Pointer/ slot information | Relative stream/ slot information | Relative stream/ transmission stream ID correspondence table information | Receive/ transmit control information | Extended information |

FIG. 76

| | | |
|---|---|---|
| Flag indicating presence/absence of region information | Information related to region | Emergency warning (early warning) information |

TRANSMISSION METHOD, TRANSMISSION DEVICE, RECEPTION METHOD, AND RECEPTION DEVICE

BACKGROUND

1. Technical Field

The present disclosure relates to signal transmission methods.

2. Description of the Related Art

Conventionally, as in A. Chindapol and J. A. Ritcey, "Design, analysis, and performance evaluation for BICM-ID with square QAM constellations in Rayleigh fading channels" *IEEE Journal on selected areas in communication*, vol. 19, no. 5, pp. 944-957, May 2001 (hereinafter referred to as Non-Patent Literature 1), with respect to quadrature amplitude modulation (QAM), studies have been carried out into improvements in reception quality of data for bit interleaved coded modulation with iterative detection (BICM-ID) by changing aspects of bit labelling.

Modulation schemes other than QAM, such as amplitude phase shift keying (APSK), may be used due to peak-to-average power ratio (PAPR) limitations, etc., and therefore application to communication/broadcast systems of the techniques of Non-Patent Literature 1 that relate to QAM labelling may be difficult.

SUMMARY

In one general aspect, the techniques disclosed here feature a transmission method pertaining to one aspect of the present disclosure, for transmitting an emergency warning signal, comprises: generating control information, the control information including a flag indicating either presence or absence of information related to a region and, when the flag indicates presence of information related to the region, information related to the region; acquiring information related to emergency warning content; and generating the emergency warning signal including the control information and the information related to the emergency warning content.

In the present disclosure, means for solving the various technical problems disclosed in the present disclosure are disclosed. Each of the means for solving technical problems made be combined with other means for solving technical problems, and of course may be used independently.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 22 illustrates an example configuration of stream type/relative stream information;

FIG. 48 illustrates an example of signaling;

FIG. 49 illustrates an example of signaling;

FIG. 50 illustrates an example of signaling;

FIG. 51 illustrates an example of signaling;

FIG. 52 illustrates an example of signaling;

FIG. 53 illustrates an example of signaling;

FIG. 54 illustrates an example of signaling;

FIG. 55 illustrates an example of signaling;

FIG. 56 illustrates an example of signaling;

FIG. 57 illustrates an example of signaling;

FIG. 59 illustrates an example of signaling;

FIG. 60 illustrates an example of signaling;

FIG. 62 illustrates an example of signaling;

FIG. 63 illustrates an example of signaling;

FIG. 64 illustrates an example of signaling;

FIG. 65 illustrates an example of signaling;

FIG. 66 illustrates an example of signaling;

FIG. 68 illustrates an example of signaling;

FIG. 70 illustrates an example configuration of a TMCC signal;

FIG. 76 illustrates a configuration of control information associated with an "emergency warning (early warning)";

DETAILED DESCRIPTION (Developments that LED to an Embodiment Pertaining to the Present Disclosure)

Typically, in a communication/broadcast system, in order to reduce power consumption of an amplifier for transmission and reduce errors in data at a receiver, a modulation scheme is preferred for which the peak-to-average power ratio (PAPR) is low and data reception quality is high.

In particular, in satellite broadcasting, in order to reduce power consumption of an amplifier for transmission, use of a modulation scheme for which PAPR is low is preferred, and (12,4) 16 amplitude phase shift keying (16APSK) is commonly used as a modulation scheme in which 16 constellation points exist in an in-phase (I)-quadrature-phase (Q) plane. Note that a constellation in an I-Q plane of (12,4)16APSK modulation is described in detail later.

However, when (12,4)16APSK is used in a communication/broadcast system, data reception quality of a receiver is sacrificed, and therefore there is a need to use, in satellite broadcasting, a modulation scheme/transmission method in which PAPR is low and data reception quality is high.

In order to improve reception quality, a modulation scheme having good bit error ratio (BER) properties may be considered. However, use of a modulation scheme having excellent BER properties is not necessarily the best solution in every case. This point is explained below.

For example, assume that when a modulation scheme # B is used, a signal-to-noise power ratio (SNR) of 10.0 dB is required to obtain a BER of $10^{-5}$, and when a modulation scheme # A is used, an SNR of 9.5 dB is required to obtain a BER of $10^{-5}$.

When a transmission device uses the modulation scheme # A or the modulation scheme # B at the same average transmission power, a reception device can obtain a gain of 0.5 dB (10.0−9.5) by using the modulation scheme # B.

Figure 1:
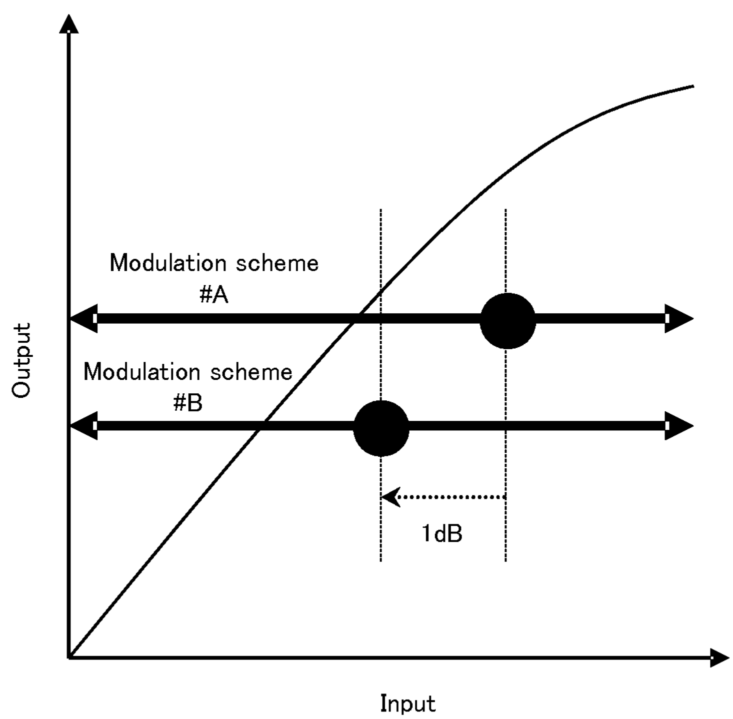
FIG. 1 illustrates an example of input/output power properties of a power amplifier mounted on a transmission device.

However, when the transmission device is installed on a satellite, PAPR becomes an issue. Input/output power properties of a power amplifier installed on the transmission device are illustrated in FIG. 1.

Here, when the modulation scheme # A is used, PAPR is assumed to be 7.0 dB, and when the modulation scheme # B is used, PAPR is assumed to be 8.0 dB.

The average transmit power when the modulation scheme # B is used is 1.0 (8.0−7.0) dB less than the average transmit power when the modulation scheme # A is used.

Accordingly, when the modulation scheme # B is used, 0.5−1.0=−0.5, and therefore the reception device obtains a gain of 0.5 dB when the modulation scheme # A is used.

As described above, use of a modulation scheme that excels in terms of BER properties is not preferred in such a case. The present embodiment takes into consideration the points above.

Thus, the present embodiment provides a modulation scheme/transmission method for which PAPR is low and data reception quality is high.

Further, in Non-Patent Literature 1, consideration is given to how to label bits and how that improves data reception quality when bit interleaved coded modulation with iterative detection (BICM-ID) is used with respect to quadrature amplitude modulation (QAM). However, in some cases it is difficult to achieve the described effects using the approach used in Non-Patent Literature 1 (how to label bits with respect to QAM) for error correction code having high error correction capacity, such as low-density parity-check (LDPC) code and turbo code such as duo-binary turbo code.

In the present embodiment, a transmission method is provided for obtaining high data reception quality when error correction code having high error correction capacity is used, such as LDPC code and turbo code, and iterative detection (or detection) is performed at a reception device side.

The following is a detailed description of embodiments of the present disclosure, with reference to the drawings.

Embodiment 1

The following describes in detail a transmission method, transmission device, reception method, and reception device of the present embodiment.

Prior to this description, an overview of a communication system using a BICM-ID scheme at a reception device side is described below.

<BICM-ID>

Figure 2:
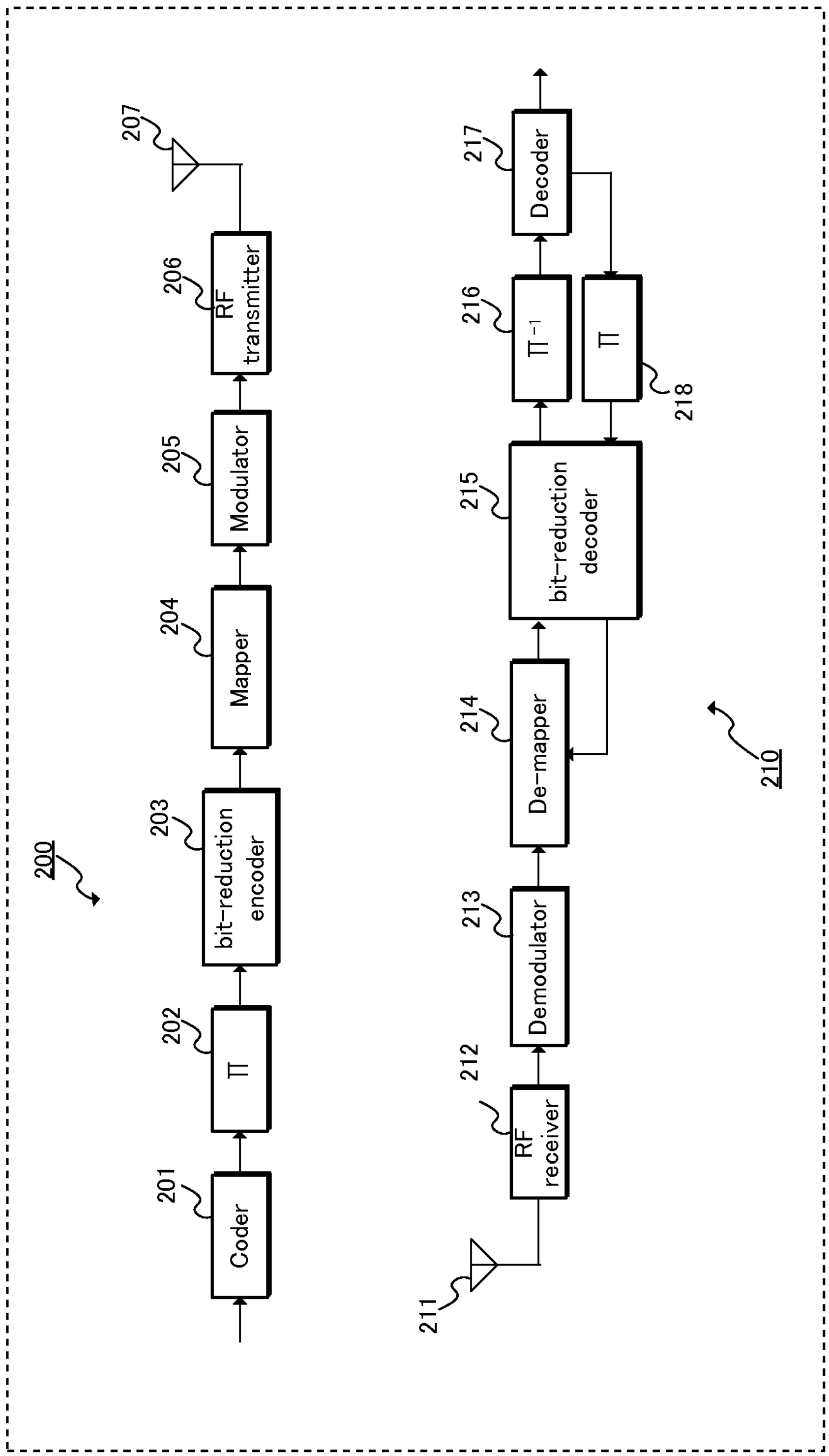
FIG. 2 illustrates an example of a communication system using a BICM-ID scheme.

FIG. 2 illustrates an example of a communication system using a BICM-ID scheme.

The following describes BICM-ID when a bit-reduction encoder 203 and a bit-reduction decoder 215 are used, but iterative detection may be implemented in cases without the bit-reduction encoder 203 and the bit-reduction decoder 215.

A transmission device 200 includes a coder 201, an interleaver 202, the bit-reduction encoder 203, a mapper 204, a modulator 205, a radio frequency (RF) transmitter 206, and a transmit antenna 207.

A reception device 210 includes a receive antenna 211, an RF receiver 212, a demodulator 213, a de-mapper 214, the bit-reduction decoder 215, a de-interleaver 216, a decoder 217, and an interleaver 218.

Figure 3:
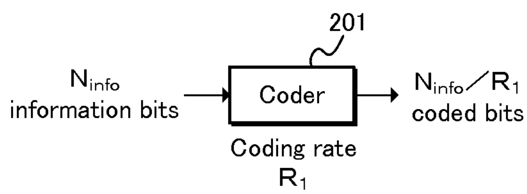
FIG. 3 illustrates an example of input and output of a coder of a transmission device.

FIG. 3 illustrates an example of input/output bits of the coder 201 of the transmission device 200.

The coder 201 performs coding at a coding rate $R_1$, and when $N_{info}$ information bits are inputted, the coder 201 outputs $N_{info}/R_1$ coded bits.

Figure 4:
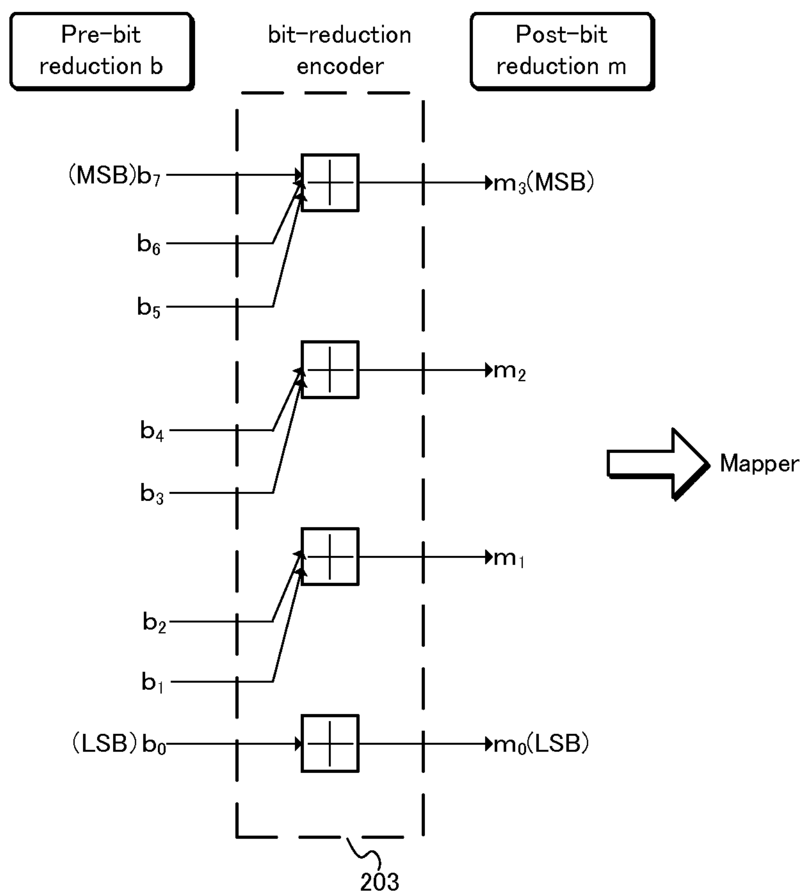
FIG. 4 illustrates an example of a bit-reduction encoder of a transmission device.

FIG. 4 illustrates an example of the bit-reduction encoder 203 of the transmission device 200.

The present example of the bit-reduction encoder 203, when a bit sequence $b(b_0\text{-}b_7)$ of eight bits is inputted from the interleaver 202, performs a conversion that involves reducing the number of bits, and outputs a bit sequence $m(m_0\text{-}m_3)$ of four bits to the mapper 204. In FIG. 4, "[+]" indicates an exclusive OR (XOR) section.

That is, the present example of the bit-reduction encoder 203 has: a branch that connects an input for bit $b_0$ to an output for bit $m_0$ via an XOR section; a branch that connects inputs for bits $b_1$ and $b_2$ to an output for bit $m_1$ via an XOR section; a branch that connects inputs for bits $b_3$ and $b_4$ to an output for bit $m_2$ via an XOR section; and a branch that connects inputs bits $b_5$, $b_6$ and $b_7$ to an output for bit $m_3$ via an XOR section.

Figure 5:
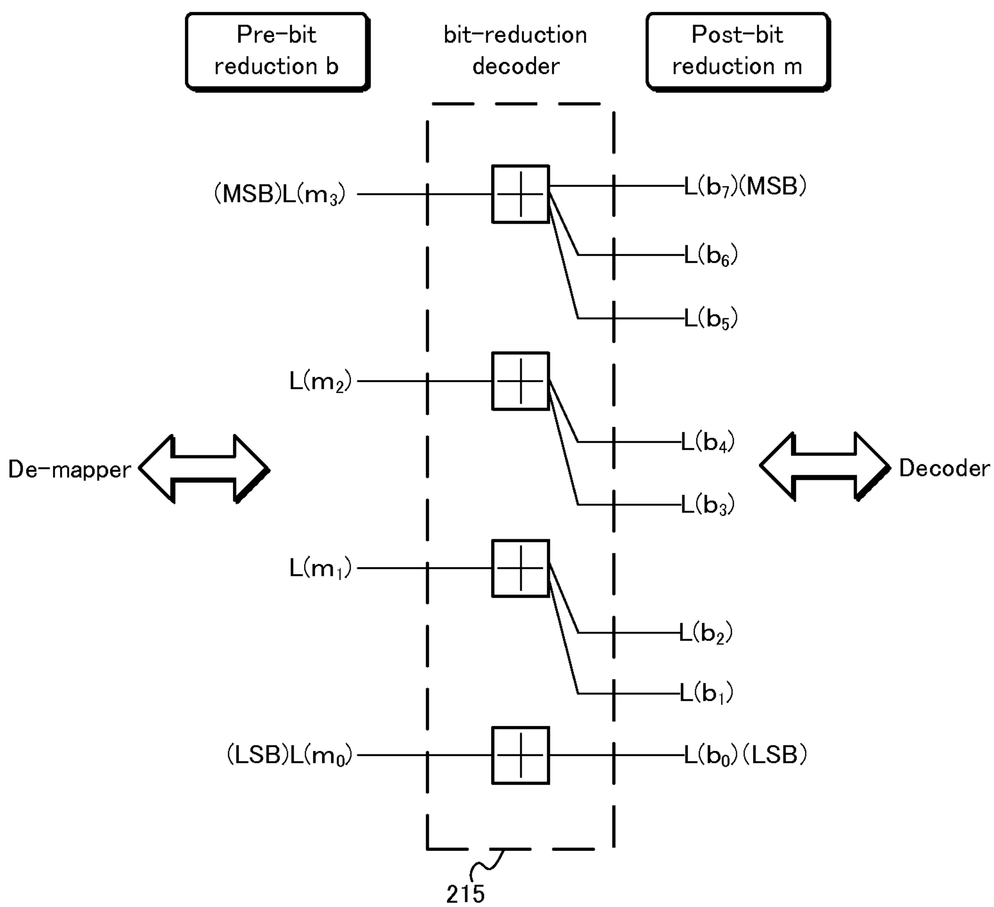
FIG. 5 illustrates an example of a bit-reduction decoder of a transmission device.

FIG. 5 illustrates an example of the bit-reduction decoder 215 of the reception device 210.

The present example of the bit-reduction decoder 215, when a log likelihood ratio (LLR) $L(m_0)$-$L(m_3)$ for a bit sequence $m(m_0\text{-}m_3)$ of four bits is inputted from the de-mapper 214, performs a conversion that involves restoring the original number of bits, and outputs an LLR $L(b_0)$-$L(b_7)$ for a bit sequence $b(b_0\text{-}b_7)$ of eight bits. The LLR $L(b_0)$-$L(b_7)$ for the bit sequence $b(b_0\text{-}b_7)$ of eight bits is inputted to the decoder 217 via the de-interleaver 216.

Further, the bit-reduction decoder 215, when an LLR $L(b_0)$-$L(b_7)$ for a bit sequence $b(b_0\text{-}b_7)$ of eights bits is inputted from the decoder 217 via the interleaver 218, performs a conversion that involves reducing the number of bits, and outputs an LLR $L(m_0)$-$L(m_3)$ for a bit sequence $m(m_0\text{-}m_3)$ of four bits to the de-mapper 214.

In FIG. 5, "[+]" indicates an XOR section. That is, the present example of the bit-reduction decoder 215 has: a branch that connects an input/output for $L(b_0)$ to an input/output for $L(m_0)$ via an XOR section; a branch that connects inputs/outputs for $L(b_1)$ and $L(b_2)$ to an input/output for $L(m_1)$ via an XOR section; a branch that connects inputs/outputs for $L(b_3)$ and $L(b_4)$ to an input/output for $L(m_2)$ via an XOR section; and a branch that connects inputs/outputs for $L(b_5)$, $L(b_6)$ and $L(b_7)$ to an input/output for $L(m_3)$ via an XOR section.

In the present example, with respect to a bit sequence $b(b_0\text{-}b_7)$ of eight bits prior to bit reduction, bit $b_0$ is a least significant bit (LSB) and bit $b_7$ is a most significant bit (MSB). Further, with respect to a bit sequence $m(m_0\text{-}m_3)$ of four bits after bit reduction, bit $m_0$ is an LSB and bit $m_3$ is an MSB.

Figure 6:
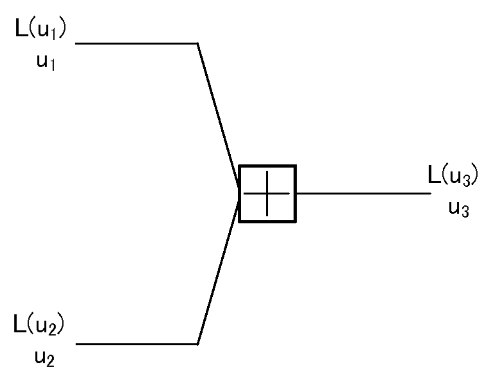
FIG. 6 illustrates an example of input and output of a XOR section of a bit-reduction decoder.

FIG. 6 illustrates input/output of an XOR section, in order to describe operation of the bit-reduction decoder 215.

In FIG. 6, bits $u_1$ and $u_2$ are connected to bit $u_3$ via an XOR section. Further, LLRs $L(u_1)$, $L(u_2)$, and $L(u_3)$ for bits $u_1$, $u_2$ and $u_3$ are illustrated. A relationship between $L(u_1)$, $L(u_2)$, and $L(u_3)$ is described later.

The following describes processing flow with reference to FIG. 2 to FIG. 6.

At the transmission device 200 side, transmit bits are inputted to the coder 201, and (error correction) coding is performed. For example, as illustrated in FIG. 3, when a coding rate of error correction code used in the coder 201 is $R_1$, and $N_{info}$ information bits are inputted to the coder 201, $N_{info}/R_1$ bits are outputted from the coder 201.

A signal (data) encoded by the coder 201 is, after interleaving processing by the interleaver 202 (permutation of data), inputted to the bit-reduction encoder 203. Subsequently, as described with reference to FIG. 3, bit number reduction processing is performed by the bit-reduction encoder 203. Note that bit number reduction processing need not be implemented.

A signal (data) on which bit reduction processing has been performed undergoes mapping processing at the mapper 204. The modulator 205 performs processing such as conversion of a digital signal to an analog signal, bandlimiting, and quadrature modulation (and multi-carrier modulation such as orthogonal frequency division multiplexing (OFDM) may also be implemented) on a signal on which mapping processing has been performed. A signal that has undergone this signal processing is transmitted wirelessly from, for example, the transmit antenna 207, via transmit radio frequency (RF) processing (206) in which transmit processing is performed.

At the reception device 210 side, the RF receiver 212 performs processing such as frequency conversion and quadrature demodulation on a signal (radio signal from a transmission device side) received by the receive antenna 211, generates a baseband signal, and outputs to the demodulator 213. The demodulator 213 performs processing such as channel estimation and demodulation, generates a signal after demodulation, and outputs to the de-mapper 214. The de-mapper 214 calculates an LLR for each bit, based on the receive signal inputted from the demodulator 213, noise power included in the receive signal, and prior information obtained from the bit-reduction decoder 215.

The de-mapper 214 performs processing with respect to a signal mapped by the mapper 204. In other words, the de-mapper 214 calculates LLRs for a bit sequence (corresponding to the bit sequence m illustrated in FIG. 4 and FIG. 5) after bit number reduction processing is performed at a transmission device side.

In a subsequent step of decoding processing (decoder 217) processing is performed with respect to all coding bits (corresponding to the bit sequence b illustrated in FIG. 4 and FIG. 5), and therefore conversion of LLRs post-bit-reduction (LLRs pertaining to processing of the de-mapper 214) to LLRs pre-bit-reduction (LLRs pertaining to processing of the decoder 217) is required.

Thus, at the bit-reduction decoder 215, LLRs post-bit-reduction inputted from the de-mapper 214 are converted to LLRs corresponding to a time pre-bit-reduction (corresponding to bit sequence b illustrated in FIG. 4 and FIG. 5). Details of processing are described later.

An LLR calculated at the bit-reduction decoder 215 is inputted to the decoder 217 after de-interleaving processing by the de-interleaver 216. The decoder 217 performs decoding processing on the basis of inputted LLRs, and thereby re-calculates the LLRs. LLRs calculated by the decoder 217 are fed back to the bit-reduction decoder 215 after interleaving processing by the interleaver 218. The bit-reduction decoder 215 converts LLRs fed back from the decoder 217 to LLRs post-bit-reduction, and inputs the LLRs post-bit-reduction to the de-mapper 214. The de-mapper 214 again calculates an LLR for each bit, based on the receive signal, noise power included in the receive signal, and prior information obtained from the bit-reduction decoder 215.

In a case in which bit number reduction processing is not performed at a transmission device side, the processing specific to the bit-reduction decoder 215 is not performed.

By repeatedly performing the above processing, finally a desired decoded result is obtained.

The following describes LLR calculation processing at the de-mapper 214.

An LLR outputted from the de-mapper 214 when a bit sequence $b(b_0, b_1, \ldots, b_{N-1})$ of N (N being an integer greater than or equal to one) bits is allocated to M (M being an integer greater than or equal to one) symbol points $S_k(S_0, S_1, \ldots, S_{M-1})$ is considered below.

When a receive signal is y, an i-th (i being an integer from zero to N−1) bit is $b_1$, and an LLR for bi is $L(b_i)$, Math (1) holds true.

[Math 1]

$$\begin{aligned} L(b_i) &= \log\frac{p(b_i=0\mid y)}{p(b_i=1\mid y)} \\ &= \log\frac{p(y\mid b_i=0)p(b_i=0)/p(y)}{p(y\mid b_i=1)p(b_i=1)/p(y)} \\ &= \log\frac{p(y\mid b_i=0)}{p(y\mid b_i=1)}+\log\frac{p(b_i=0)}{p(b_i=1)} \end{aligned} \quad \text{(Math 1)}$$

As described later, the first term on the right side of the bottom formula shown in Math (1) is an LLR obtainable from a bit other than an i-th bit, and this is defined as extrinsic information $L_e(b_1)$. Further, the second term on the right side of the bottom formula shown in Math (1) is an LLR obtainable based on a prior probability of an i-th bit, and this is defined as prior information $L_a(b_1)$.

Thus, Math (1) becomes Math (2), and transformation to Math (3) is possible.

[Math 2]

$$L(b_1)=L_e(b_1)+L_a(b_1) \quad \text{(Math 2)}$$

[Math 3]

$$L_e(b_1)=L_e(b_1)-L_a(b_1) \quad \text{(Math 3)}$$

The de-mapper 214 outputs a processing result of Math (3) as an LLR.

The numerator $p(y|b_i=0)$ of the first term on the right side of the bottom formula of Math (1) is considered below.

The numerator $p(y|b_i=0)$ is a probability that a receive signal is y when $b_1=0$ is known. This is expressed in the product $p(y|S_k)p(S_k|b_i=0)$ of “a probability $p(S_k|b_i=0)$ of a symbol point $S_k$ when $b_1=0$ is known,” and “a probability $p(y|S_k)$ of y when $S_k$ is known”. When considering all symbol points, Math (4) holds true.

[Math 4]

$$p(y\mid b_i=0)=\sum_{S_k\mid S_k(b_i)=0} p(y\mid S_k)p(S_k\mid b_i=0) \quad \text{(Math 4)}$$

In the same way, with respect to the denominator $p(y|b_i=1)$ of the first term on the right side of the bottom formula of Math (1), Math (5) holds true.

Accordingly, the first term on the right side of the bottom formula of Math (1) becomes Math (6).

[Math 5]

$$p(y \mid b_i = 1) = \sum_{S_k \mid S_k(b_i)=1} p(y \mid S_k)p(S_k \mid b_i = 1) \quad \text{(Math 5)}$$

[Math 6]

$$L_e(b_i) = \log\frac{p(y \mid b_i = 0)}{p(y \mid b_i = 1)} = \log\frac{\sum_{S_k \mid S_k(b_i)=0} p(y \mid S_k)p(S_k \mid b_i = 0)}{\sum_{S_k \mid S_k(b_i)=1} p(y \mid S_k)p(S_k \mid b_i = 1)} \quad \text{(Math 6)}$$

The expression $p(y|S_k)$ of Math (6) can be expressed as shown in Math (7) when Gaussian noise of variance $\sigma^2$ is added in the process of transmitting the symbol point $S_k$ to become the receive signal y.

[Math 7]

$$p(y \mid S_k) = \frac{1}{\sqrt{2\pi\sigma^2}}\exp\left(-\frac{(y - S_k)^2}{2\sigma^2}\right) \quad \text{(Math 7)}$$

Further, the expression $p(S_k|b_i=0)$ of Math (6) is a probability of the symbol point $S_k$ when $b_1=0$ is known, and is expressed as a product of prior probabilities of bits other than bi that constitute the symbol point $S_k$. When a j-th (j=0, 1, . . . , N−1 (j being an integer from 0 to N−1)) bit of the symbol point $S_k$ is expressed as $S_k(b_j)$, Math (8) holds true.

[Math 8]

$$S_k(b_j) \in \{0, 1\}$$
$$p(S_k \mid b_i = 0) = \prod_{j \neq i} p(b_j = S_k(b_j)) \quad \text{(Math 8)}$$

The term $p(b_j=S_k(b_j))$ is considered below.

When $L_a(b_j)$ is given as prior information, Math (9) is derived from the second term of the right side of the bottom formula of Math (1), and can be transformed to Math (10).

[Math 9]

$$L_a(b_j) = \log\frac{p(b_j = 0)}{p(b_j = 1)} \quad \text{(Math 9)}$$

[Math 10]

$$\frac{p(b_j = 0)}{p(b_j = 1)} = \exp(L_a(b_j)) \quad \text{(Math 10)}$$

Further, from the relationship $p(b_j=0)+p(b_j=1)=1$, Math (11) and Math (12) are derived.

[Math 11]

$$p(b_j = 0) = \frac{\exp(L_a(b_j))}{1 + \exp(L_a(b_j))} \quad \text{(Math 11)}$$

-continued

[Math 12]

$$p(b_j = 1) = \frac{1}{1 + \exp(L_a(b_j))} \quad \text{(Math 12)}$$

Using this, Math (13) is derived, and Math (8) becomes Math (14).

[Math 13]

$$p(b_j = S_k(b_j)) = \frac{\exp(-S_k(b_j)L_a(b_j))}{1 + \exp(-L_a(b_j))} \quad \text{(Math 13)}$$

[Math 14]

$$p(S_k \mid b_i = 0) = \prod_{j \neq i} p(b_j = S_k(b_j)) = \prod_{j \neq i} \frac{\exp(-S_k(b_j)L_a(b_j))}{1 + \exp(-L_a(b_j))} \quad \text{(Math 14)}$$

With respect to $p(S_k|b_i=1)$, a formula similar to Math (14) is derived.

From Math (7) and Math (14), Math (6) becomes Math (15). Note that as per the condition of Σ, the numerator of $S_k(b_1)$ is zero, and the denominator of $S_k(b_1)$ is one.

[Math 15]

$$L_e(b_i) = \log\frac{\sum_{S_k \mid S_k(b_i)=0} p(y \mid S_k)p(S_k \mid b_i = 0)}{\sum_{S_k \mid S_k(b_i)=1} p(y \mid S_k)p(S_k \mid b_i = 1)} = \quad \text{(Math 15)}$$

$$\log\frac{\sum_{S_k \mid S_k(b_i)=0} \frac{1}{\sqrt{2\pi\sigma^2}}\exp\left(-\frac{|y - S_k|^2}{2\sigma^2}\right)\prod_{j \neq i}\frac{\exp(-S_k(b_j)L_a(b_j))}{1 + \exp(-L_a(b_j))}}{\sum_{S_k \mid S_k(b_i)=1} \frac{1}{\sqrt{2\pi\sigma^2}}\exp\left(-\frac{|y - S_k|^2}{2\sigma^2}\right)\prod_{j \neq i}\frac{\exp(-S_k(b_j)L_a(b_j))}{1 + \exp(-L_a(b_j))}} =$$

$$\log\frac{\sum_{S_k \mid S_k(b_i)=0} \exp\left(-\frac{|y - S_k|^2}{2\sigma^2} - \sum_j S_k(b_j)L_a(b_j)\right)}{\sum_{S_k \mid S_k(b_i)=1} \exp\left(-\frac{|y - S_k|^2}{2\sigma^2} - \sum_j S_k(b_j)L_a(b_j)\right)} - L_a(b_i)$$

From the above, in performing the repeated processing of BICM-ID, the de-mapper 214 performs exponential calculation and summation for a symbol point and each bit assigned to the symbol point, thereby seeking numerators/denominators, and further performs a logarithmic calculation.

The following describes processing at the bit-reduction decoder 215.

The bit-reduction decoder 215 performs processing converting LLRs post-bit-reduction that are calculated at the de-mapper 214 to LLRs pre-bit-reduction that are required at the decoder 217, and performs processing converting LLRs pre-bit-reduction that are calculated at the decoder 217 to LLRs post-bit-reduction that are required at the de-mapper 214.

At the bit-reduction decoder 215, processing converting LLRs post-bit-reduction is performed at each [+] (each XOR section) in FIG. 5, calculation being performed according to bits connected to the [+].

In a configuration as illustrated in FIG. 6, $L(u_3)$ is considered when $L(u_1)$ and $L(u_2)$ are given, each bit being defined as $u_1$, $u_2$, $u_3$, and each LLR for the bits being defined as $L(u_1)$, $L(u_2)$, $L(u_3)$.

First, $u_1$ is considered below.

When $L(u_1)$ is given, Math (16) and Math (17) are derived from Math (11) and Math (12).

[Math 16]

$$p(u_1=0)=\frac{\exp(L(u_1))}{1+\exp(L(u_1))} \quad \text{(Math 16)}$$

[Math 17]

$$p(u_1=1)=\frac{1}{1+\exp(L(u_1))} \quad \text{(Math 17)}$$

When $u_1=0$ is associated with +1 and $u_1=1$ is associated with −1, the expected value $E[u_1]$ of $u_1$ is defined as in Math (18).

[Math 18]

$$\begin{aligned} E[u_1] &= (+1)p(u_1=0)+(-1)p(u_1=1) \\ &= \frac{\exp(L(u_1))-1}{\exp(L(u_1))+1} \\ &= \tanh\left(\frac{L(u_1)}{2}\right)\left(\Theta\tanh(X)=\frac{e^X-e^{-X}}{e^X+e^{-X}}\right) \end{aligned} \quad \text{(Math 18)}$$

In FIG. 6, $u_3=u_1[+]u_2$ and $E[u_3]=E[u_1]E[u_2]$, and therefore when substituted into Math (18), Math (19) results, from which Math (20) is derived.

[Math 19]

$$\tanh\left(\frac{L(u_3)}{2}\right)=\tanh\left(\frac{L(u_1)}{2}\right)\tanh\left(\frac{L(u_2)}{2}\right) \quad \text{(Math 19)}$$

[Math 20]

$$L(u_3)=2\tanh^{-1}\left(\tanh\left(\frac{L(u_1)}{2}\right)\tanh\left(\frac{L(u_2)}{2}\right)\right) \quad \text{(Math 20)}$$

The above considers bits $u_1$, $u_2$, and $u_3$, but when generalized to j signals, Math (21) is derived. For example, in FIG. 5, $L(m_3)$, $L(b_6)$, and $L(b_5)$ are used when determining $L(b_7)$, resulting in Math (22).

[Math 21]

$$L(u_i)=2\tanh^{-1}\left(\prod_{j|j\neq i}\tanh\left(\frac{L(u_j)}{2}\right)\right) \quad \text{(Math 21)}$$

-continued

[Math 22]

$$L(b_7)=2\tanh^{-1}\left(\tanh\frac{L(m_3)}{2}\tanh\frac{L(b_6)}{2}\tanh\frac{L(b_5)}{2}\right) \quad \text{(Math 22)}$$

In a case in which bit number reduction processing is not performed at a transmission device side, the specific processing described above is not performed.

The above describes operations in connection with BICM-ID, but iterative detection need not be implemented, and signal processing may perform detection only once.

<Transmission Device>

Figure 7:
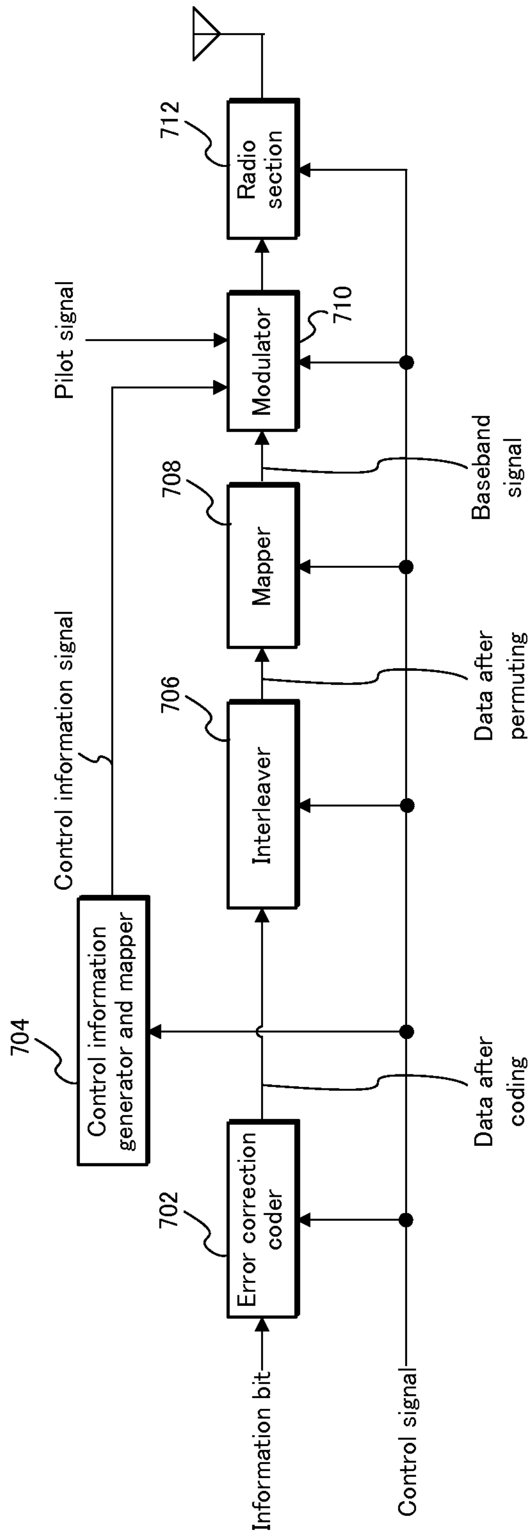
FIG. 7 illustrates a configuration of a transmission device.

FIG. 7 illustrates a configuration of a transmission device. A transmission device 700 includes an error correction coder 702, a control information generator and mapper 704, an interleaver 706, a mapper 708, a modulator 710, and a radio section 712.

The error correction coder 702 receives a control signal and information bits as input, determines, for example, code length (block length) of error correction code and coding rate of error correction code based on the control signal, performs error correction coding on the information bits based on a determined error correction coding method, and outputs bits after error correction coding to the interleaver 706.

The interleaver 706 receives a control signal and bits post-coding as input, determines an interleaving method based on the control signal, interleaves (permutes) the bits post-coding, and outputs data post-interleaving to the mapper 708.

The control information generator and mapper 704 receives a control signal as input, generates control information for a reception device to operate (for example, information related to physical layers such as an error correction scheme or modulation scheme used by a transmission device, control information not related to physical layers, etc.) based on the control signal, performs mapping on the control information, and outputs a control information signal.

The mapper 708 receives a control signal and data post-interleaving as input, determines a mapping method based on the control signal, performs mapping on the data post-interleaving according to the mapping method determined, and outputs a baseband signal in-phase component I and quadrature component Q. Modulation schemes that the mapper 708 is capable of supporting are, for example, π/2 shift BPSK, QPSK, 8PSK, (12,4)16APSK, (8,8)16APSK, and 32APSK.

Details of (12,4)16APSK, (8,8)16APSK, and details of a mapping method that is a feature of the present embodiment are described in detail later.

The modulator 710 receives a control signal, a control information signal, a pilot signal, and a baseband signal as input, determines frame configuration based on the control signal, generates, according to the frame configuration, a modulated signal from the control information signal, the pilot signal, and the baseband signal, and outputs the modulated signal.

The radio section 712 receives a modulated signal as input, performs processing such as bandlimiting using a root roll-off filter, quadrature modulation, frequency conversion, and amplification, and generates a transmit signal, the transmit signal being transmitted from an antenna.

<Constellation>

The following describes constellations and assignment (labelling) of bits to each constellation point of (12,4) 16APSK and (8,8)16APSK mapping performed by the mapper 708, which is of importance in the present embodiment.

Figure 8:
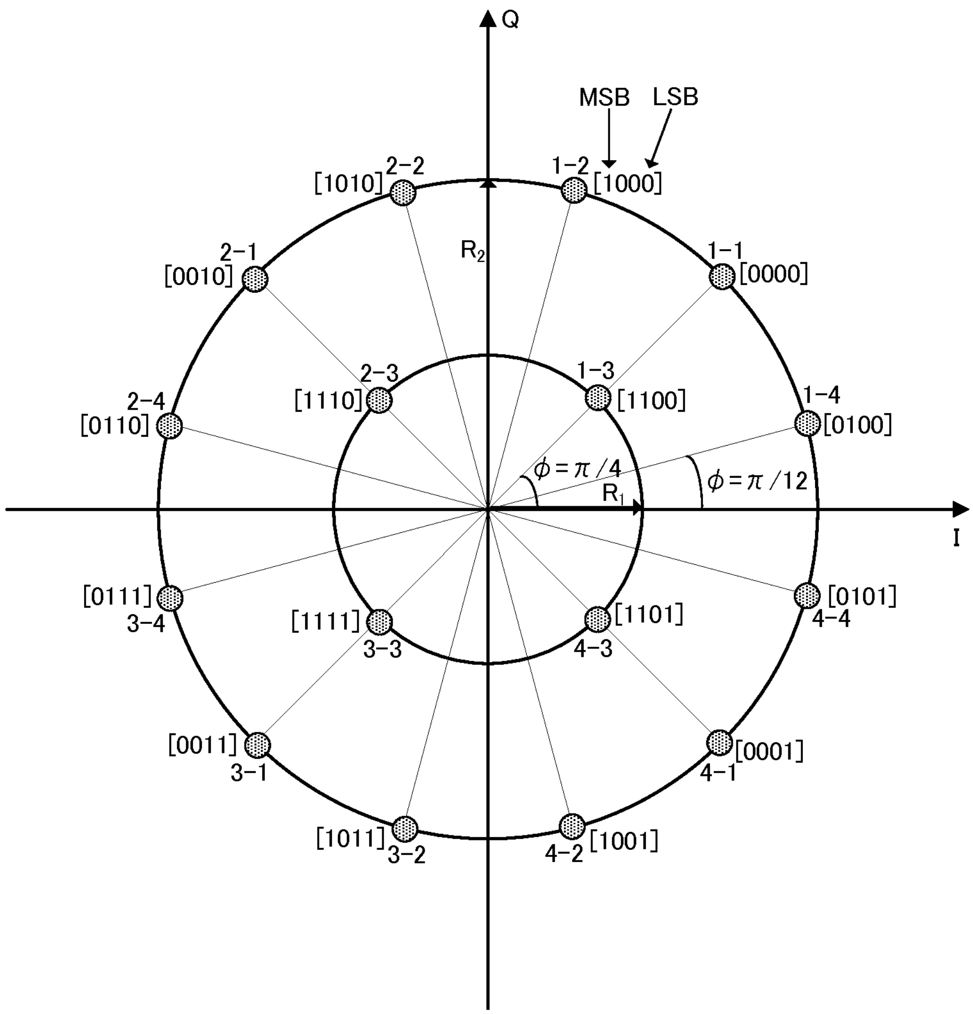
FIG. 8 illustrates a constellation of (12,4)16APSK.

As illustrated in FIG. 8, constellation points of (12,4) 16APSK mapping are arranged in two concentric circles having different radii (amplitude components) in the I-Q plane. In the present description, among the concentric circles, a circle having a larger radius $R_2$ is referred to as an "outer circle" and a circle having a smaller radius $R_1$ is referred to as an "inner circle". A ratio of the radius $R_2$ to the radius $R_1$ is referred to as a "radius ratio" (or "ring ratio"). Note that here, $R_1$ is a real number, $R_2$ is a real number, $R_1$ is greater than zero, and $R_2$ is greater than zero. Further, $R_1$ is less than $R_2$.

Further, on the circumference of the outer circle are arranged twelve constellation points and on the circumference of the inner circle are arranged four constellation points. The (12,4) in (12,4)16APSK indicates that in the order of outer circle, inner circle, there are twelve and four constellation points, respectively.

Coordinates of each constellation point of (12,4)16APSK on the I-Q plane are as follows:

Constellation point 1-1[0000] . . . $(R_2\cos(\pi/4), R_2\sin(\pi/4))$

Constellation point 1-2[1000] . . . $(R_2\cos(5\pi/12), R_2\sin(5\pi/12))$

Constellation point 1-3[1100] . . . $(R_1\cos(\pi/4), R_1\sin(\pi/4))$

Constellation point 1-4[0100] . . . $(R_2\cos(\pi/12), R_2\sin(\pi/12))$

Constellation point 2-1[0010] . . . $(R_2\cos(3\pi/4), R_2\sin(3\pi/4))$

Constellation point 2-2[1010] . . . $(R_2\cos(7\pi/12), R_2\sin(7\pi/12))$

Constellation point 2-3[1110] . . . $(R_1\cos(3\pi/4), R_1\sin(3\pi/4))$

Constellation point 2-4[0110] . . . $(R_2\cos(11\pi/12), R_2\sin(11\pi/12))$

Constellation point 3-1[0011] . . . $(R_2\cos(-3\pi/4), R_2\sin(-3\pi/4))$

Constellation point 3-2[1011] . . . $(R_2\cos(-7\pi/12), R_2\sin(-7\pi/12))$

Constellation point 3-3[1111] . . . $(R_1\cos(-3\pi/4), R_1\sin(-3\pi/4))$

Constellation point 3-4[0111] . . . $(R_2\cos(-11\pi/12), R_2\sin(-11\pi/12))$

Constellation point 4-1[0001] . . . $(R_2\cos(-\pi/4), R_2\sin(-\pi/4))$

Constellation point 4-2[1001] . . . $(R_2\cos(-5\pi/12), R_2\sin(-5\pi/12))$

Constellation point 4-3[1101] . . . $(R_1\cos(-\pi/4), R_1\sin(-\pi/4))$

Constellation point 4-4[0101] . . . $(R_2\cos(-\pi/12), R_2\sin(-\pi/12))$

With respect to phase, the unit used is radians. Accordingly, for example, referring to $R_2\cos(\pi/4)$, the unit of $\pi/4$ is radians. Hereinafter, the unit of phase is radians.

Further, for example, the following relationship is disclosed above:

Constellation point 1-1[0000] . . . $(R_2\cos(\pi/4), R_2\sin(\pi/4))$

In data that is inputted to the mapper 708, this means that when four bits $[b_3b_2b_1b_0]$=[0000], an in-phase component I and quadrature component Q of a baseband signal after mapping are defined as $(I,Q)=(R_2\cos(\pi/4), R_2\sin(\pi/4))$. As another example, the following relationship is disclosed above:

Constellation point 4-4[0101] . . . $(R_2\cos(-\pi/12), R_2\sin(-\pi/12))$

In data that is inputted to the mapper 708, this means that when four bits $[b_3b_2b_1b_0]$=[0101], an in-phase component I and quadrature component Q of a baseband signal after mapping are defined as $(I,Q)=(R_2\cos(-\pi/12), R_2\sin(-\pi/12))$.

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

Figure 9:
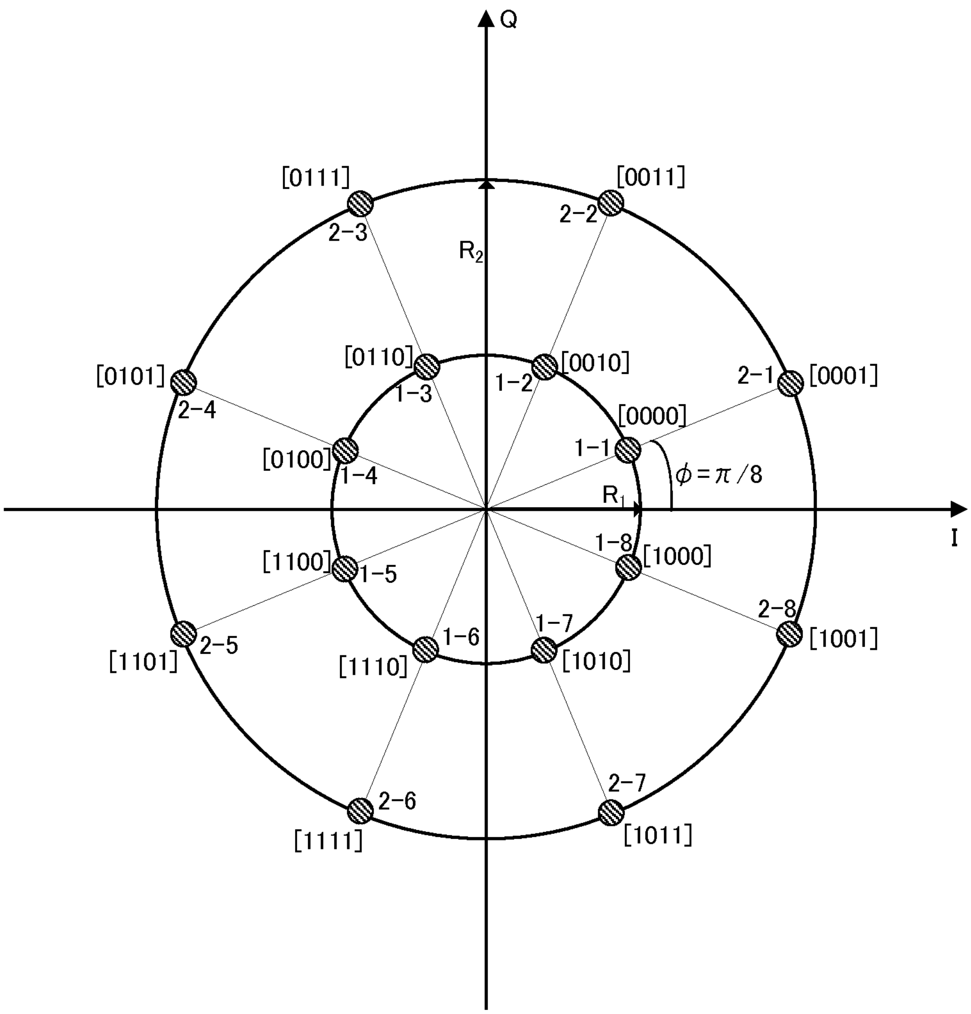
FIG. 9 illustrates a constellation of (8,8)16APSK.

As illustrated in FIG. 9, constellation points of (8,8) 16APSK mapping are arranged in two concentric circles having different radii (amplitude components) in the I-Q plane. On the circumference of the outer circle are arranged eight constellation points and on the circumference of the inner circle are arranged eight constellation points. The (8,8) in (8,8)16APSK indicates that in the order of outer circle, inner circle, there are eight and eight constellation points, respectively. Further, as with (12,4)16APSK, among the concentric circles, the circle having a larger radius $R_2$ is referred to as the "outer circle" and the circle having a smaller radius $R_1$ is referred to as the "inner circle". A ratio of the radius $R_2$ to the radius $R_1$ is referred to as a "radius ratio" (or "ring ratio"). Note that here, $R_1$ is a real number, $R_2$ is a real number, $R_1$ is greater than zero, and $R_2$ is greater than zero. Also, $R_1$ is less than $R_2$.

Coordinates of each constellation point of (8,8)16APSK on the I-Q plane are as follows:

Constellation point 1-1[0000] . . . $(R_1\cos(\pi/8), R_1\sin(\pi/8))$

Constellation point 1-2[0010] . . . $(R_1\cos(3\pi/8), R_1\sin(3\pi/8))$

Constellation point 1-3[0110] . . . $(R_1\cos(5\pi/8), R_1\sin(5\pi/8))$

Constellation point 1-4[0100] . . . $(R_1\cos(7\pi/8), R_1\sin(7\pi/8))$

Constellation point 1-5[1100] . . . $(R_1\cos(-7\pi/8), R_1\sin(-7\pi/8))$

Constellation point 1-6[1110] . . . $(R_1\cos(-5\pi/8), R_1\sin(-5\pi/8))$

Constellation point 1-7[1010] . . . $(R_1\cos(-3\pi/8), R_1\sin(-3\pi/8))$

Constellation point 1-8[1000] . . . $(R_1\cos(-\pi/8), R_1\sin(\pi/8))$

Constellation point 2-1[0001] . . . $(R_2\cos(\pi/8), R_2\sin(\pi/8))$

Constellation point 2-2[0011] . . . $(R_2\cos(3\pi/8), R_2\sin(3\pi/8))$

Constellation point 2-3[0111] . . . $(R_2\cos(5\pi/8), R_2\sin(5\pi/8))$

Constellation point 2-4[0101] . . . $(R_2\cos(7\pi/8), R_2\sin(7\pi/8))$

Constellation point 2-5[1101] . . . $(R_2\cos(-7\pi/8), R_2\sin(-7\pi/8))$

Constellation point 2-6[1111] . . . $(R_2\cos(-5\pi/8), R_2\sin(-5\pi/8))$

Constellation point 2-7[1011] . . . $(R_2\cos(-3\pi/8), R_2\sin(-3\pi/8))$

Constellation point 2-8[1001] . . . $(R_2\cos(-\pi/8), R_2\sin(-\pi/8))$

For example, the following relationship is disclosed above:

Constellation point 1-1[0000] . . . ($R_1$ cos(π/8),$R_1$ sin(π/8))

In data that is inputted to the mapper 708, this means that when four bits [$b_3b_2b_1b_0$]=[0000], an in-phase component I and quadrature component Q of a baseband signal after mapping are defined as (I,Q)=($R_1$ cos(π/8),$R_1$ sin(π/8)). As another example, the following relationship is disclosed above:

Constellation point 2-8[1001] . . . ($R_2$ cos(−π/8),$R_2$ sin(−π/8))

In data that is inputted to the mapper 708, this means that when four bits [$b_3b_2b_1b_0$]=[1001], an in-phase component I and quadrature component Q of a baseband signal after mapping are defined as (I,Q)=($R_2$ cos(−π/8),$R_2$ sin(−π/8)).

This holds true for all of constellation point 1-1, constellation point 1-2, constellation point 1-3, constellation point 1-4, constellation point 1-5, constellation point 1-6, constellation point 1-7, constellation point 1-8, constellation point 2-1, constellation point 2-2, constellation point 2-3, constellation point 2-4, constellation point 2-5, constellation point 2-6, constellation point 2-7, and constellation point 2-8.

<Transmission Output>

In order to achieve the same transmission output for each of the two types of modulation scheme above, the following normalization coefficient may be used.

[Math 23]

$$a_{(12,4)} = \frac{z}{\sqrt{(4 \times R_1^2 + 12 \times R_2^2)/16}} \quad \text{(Math 23)}$$

[Math 24]

$$a_{(8,8)} = \frac{z}{\sqrt{(R_1^2 + R_2^2)/2}} \quad \text{(Math 24)}$$

Note that $a_{(12,4)}$ is a normalization coefficient of (12,4)16APSK and $a_{(8,8)}$ is a coefficient of (8,8)16APSK.

Prior to normalization, the in-phase component of a baseband signal is $I_b$ and the quadrature component of the baseband signal is $Q_b$. After normalization, the in-phase component of the baseband signal is $I_n$ and the quadrature component of the baseband signal is $Q_n$. Thus, when a modulation scheme is (12,4)16APSK, ($I_n$, $Q_n$)=($a_{(12,4)}$×$I_b$, $a_{(12,4)}$×$Q_b$) holds true, and when a modulation scheme is (8,8)16APSK, ($I_n$, $Q_n$)=($a_{(8,8)}$×$I_b$, $a_{(8,8)}$×$Q_b$) holds true.

When a modulation scheme is (12,4)16APSK, the in-phase component $I_b$ and quadrature component $Q_b$ are the in-phase component I and quadrature component Q, respectively, of a baseband signal after mapping that is obtained by mapping based on FIG. 8. Accordingly, when a modulation scheme is (12,4)16APSK, the following relationships hold true:

Constellation point 1-1[0000]
. . . ($I_n$, $Q_n$)=($a_{(12,4)}$×$R_2$×cos(π/4), $a_{(12,4)}$×$R_2$×sin(π/4))
Constellation point 1-2[1000]
. . . ($I_n$, $Q_n$)=($a_{(12,4)}$×$R_2$×cos(5π/12), $a_{(12,4)}$×$R_2$×sin(5π/12))
Constellation point 1-3[1100]
. . . ($I_n$, $Q_n$)=($a_{(12,4)}$×$R_1$×cos(π/4), $a_{(12,4)}$×$R_1$×sin(π/4))
Constellation point 1-4[0100]
. . . ($I_n$, $Q_n$)=($a_{(12,4)}$×$R_2$×cos(π/12), $a_{(12,4)}$×$R_2$×sin(π/12))
Constellation point 2-1[0010]
. . . ($I_n$, $Q_n$)=($a_{(12,4)}$×$R_2$×cos(3π/4), $a_{(12,4)}$×$R_2$×sin(3π/4))
Constellation point 2-2[1010]
. . . ($I_n$, $Q_n$)=($a_{(12,4)}$×$R_2$×cos(7π/12), $a_{(12,4)}$×$R_2$×sin(7π/12))
Constellation point 2-3[1110]
. . . ($I_n$, $Q_n$)=($a_{(12,4)}$×$R_1$×cos(3π/4), $a_{(12,4)}$×$R_1$×sin(3π/4))
Constellation point 2-4[0110]
. . . ($I_n$, $Q_n$)=($a_{(12,4)}$×$R_2$×cos(11π/12), $a_{(12,4)}$×$R_2$×sin(11π/12))
Constellation point 3-1[0011]
. . . ($I_n$, $Q_n$)=($a_{(12,4)}$×$R_2$×cos(−3π/4), $a_{(12,4)}$×$R_2$×sin(−3π/4))
Constellation point 3-2[1011]
. . . ($I_n$, $Q_n$)=($a_{(12,4)}$×$R_2$×cos(−7π/12), $a_{(12,4)}$×$R_2$×sin(7π/12))
Constellation point 3-3[1111]
. . . ($I_n$, $Q_n$)=($a_{(12,4)}$×$R_1$×cos(−3π/4), $a_{(12,4)}$×$R_1$×sin(−3π/4))
Constellation point 3-4[0111]
. . . ($I_n$, $Q_n$)=($a_{(12,4)}$×$R_2$×cos(−11π/12), $a_{(12,4)}$×$R_2$×sin(−11π/12))
Constellation point 4-1[0001]
. . . ($I_n$, $Q_n$)=($a_{(12,4)}$×$R_2$×cos(−π/4), $a_{(12,4)}$×$R_2$×sin(−π/4))
Constellation point 4-2[1001]
. . . ($I_n$, $Q_n$)=($a_{(12,4)}$×$R_2$×cos(−5π/12), $a_{(12,4)}$×$R_2$×sin(−5π/12))
Constellation point 4-3[1101]
. . . ($I_n$, $Q_n$)=($a_{(12,4)}$×$R_1$×cos(−π/4), $a_{(12,4)}$×$R_1$×sin(−π/4))
Constellation point 4-4[0101]
. . . ($I_n$, $Q_n$)=($a_{(12,4)}$×$R_2$×cos(−π/12), $a_{(12,4)}$×$R_2$×sin(−π/12))

Further, for example, the following relationship is disclosed above:

Constellation point 1-1[0000]
. . . ($I_n$, $Q_n$)=($a_{(12,4)}$×$R_2$×cos(π/4), $a_{(12,4)}$×$R_2$×sin(π/4))

In data that is inputted to the mapper 708, this means that when four bits [$b_3b_2b_1b_0$]=[0000], ($I_n$, $Q_n$)=($a_{(12,4)}$×$R_2$×cos(π/4), $a_{(12,4)}$×$R_2$×sin(π/4)). As another example, the following relationship is disclosed above:

Constellation point 4-4[0101]
. . . $I_n$, $Q_n$)=($a_{(12,4)}$×$R_2$×cos(π/12), $a_{(12,4)}$×$R_2$×sin(−π/12))

In data that is inputted to the mapper 708, this means that when four bits [$b_3b_2b_1b_0$]=[0101], ($I_n$, $Q_n$)=($a_{(12,4)}$×$R_2$×cos(−π/12), $a_{(12,4)}$×$R_2$×sin(π/12)).

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

Thus, the mapper 708 outputs $I_n$ and $Q_n$ as described above as an in-phase component and a quadrature component, respectively, of a baseband signal.

In a similar way, when a modulation scheme is (8,8)16APSK, the in-phase component $I_b$ and quadrature component $Q_b$ are the in-phase component I and quadrature component Q, respectively, of a baseband signal after mapping that is obtained by mapping based on FIG. 9. Accordingly, when a modulation scheme is (8,8)16APSK, the following relationships hold true:

Constellation point 1-1[0000]
. . . ($I_n$, $Q_n$)=($a_{(8,8)}$×$R_1$×cos(π/8), ($a_{(8,8)}$×$R_1$×sin(π/8))
Constellation point 1-2[0010]
. . . ($I_n$, $Q_n$)=(($a_{(8,8)}$×$R_1$×cos(3π/8), ($a_{(8,8)}$×$R_1$×sin(3π/8))
Constellation point 1-3[0110]

. . . $(I_n, Q_n)=(a_{(8,8)}\times R_1\times\cos(5\pi/8), (a_{(8,8)}\times R_1\times\sin(5\pi/8))$ Constellation point 1-4[0100]

. . . $(I_n, Q_n)=((a_{(8,8)}\times R_1\times\cos(7\pi/8), (a_{(8,8)}\times R_1\times\sin(7\pi/8))$ Constellation point 1-5[1100]

. . . $(I_n, Q_n)=(a_{(8,8)}\times R_1\times\cos(-7\pi/8), (a_{(8,8)}\times R_1\times\sin(-7\pi/8))$ Constellation point 1-6[1110]

. . . $(I_n, Q_n)=(a_{(8,8)}\times R_1\times\cos(-5\pi/8), (a_{(8,8)}\times R_1\times\sin(-5\pi/8))$ Constellation point 1-7[1010]

. . . $(I_n, Q_n)=(a_{(8,8)}\times R_1\times\cos(-3\pi/8), (a_{(8,8)}\times R_1\times\sin(-3\pi/8))$ Constellation point 1-8[1000]

. . . $(I_n, Q_n)=(a_{(8,8)}\times R_1\times\cos(-\pi/8), (a_{(8,8)}\times R_1\times\sin(-\pi/8))$ Constellation point 2-1[0001]

. . . $(I_n, Q_n)=((a_{(8,8)}\times R_2\times\cos(\pi/8), (a_{(8,8)}\times R_2\times\sin(\pi/8))$ Constellation point 2-2[0011]

. . . $(I_n, Q_n)=(a_{(8,8)}\times R_2\times\cos(3\pi/8), (a_{(8,8)}\times R_2\times\sin(3\pi/8))$ Constellation point 2-3[0111]

. . . $(I_n, Q_n)=(a_{(8,8)}\times R_2\times\cos(5\pi/8), (a_{(8,8)}\times R_2\times\sin(5\pi/8))$ Constellation point 2-4[0101]

. . . $(I_n, Q_n)=(a_{(8,8)}\times R_2\times\cos(7\pi/8), a_{(8,8)}\times R_2\times\sin(7\pi/8))$ Constellation point 2-5[1101]

. . . $(I_n, Q_n)=(a_{(8,8)}\times R_2\times\cos(-7\pi/8), (a_{(8,8)}\times R_2\times\sin(-7\pi/8))$ Constellation point 2-6[1111]

. . . $(I_n, Q_n)=((a_{(8,8)}\times R_2\times\cos(-5\pi/8), (a_{(8,8)}\times R_2\times\sin(-5\pi/8))$ Constellation point 2-7[1011]

. . . $(I_n, Q_n)=(a_{(8,8)}\times R_2\times\cos(-3\pi/8), (a_{(8,8)}\times R_2\times\sin(-3\pi/8))$ Constellation point 2-8[1001]

. . . $(I_n, Q_n)=(a_{(8,8)}\times R_2\times\cos(-\pi/8), (a_{(8,8)}\times R_2\times\sin(-\pi/8))$ For example, the following relationship is disclosed above:

Constellation point 1-1[0000]

. . . $(I_n, Q_n)=(a_{(8,8)}\times R_1\times\cos(\pi/8), (a_{(8,8)}\times R_1\times\sin(\pi/8))$ In data that is inputted to the mapper 708, this means that when four bits $[b_3b_2b_1b_0]=[0000]$, $(I_n, Q_n)=((a_{(8,8)}\times R_1\times\cos(\pi/8), (a_{(8,8)}\times R_1\times\sin(\pi/8))$. As another example, the following relationship is disclosed above:

Constellation point 2-8[1001]

. . . $(I_n, Q_n)=(a_{(8,8)}\times R_2\times\cos(-\pi/8), (a_{(8,8)}\times R_2\times\sin(-\pi/8))$ In data that is inputted to the mapper 708, this means that when four bits $[b_3b_2b_1b_0]=[1001]$, $(I_n, Q_n)=((a_{(8,8)}\times R_2\times\cos(-\pi/8), (a_{(8,8)}\times R_2\times\sin(-\pi/8))$.

This holds true for all of constellation point 1-1, constellation point 1-2, constellation point 1-3, constellation point 1-4, constellation point 1-5, constellation point 1-6, constellation point 1-7, constellation point 1-8, constellation point 2-1, constellation point 2-2, constellation point 2-3, constellation point 2-4, constellation point 2-5, constellation point 2-6, constellation point 2-7, and constellation point 2-8.

Thus, the mapper 708 outputs $I_n$ and $Q_n$ as described above as an in-phase component and a quadrature component, respectively, of a baseband signal.

<Frame Configuration of Modulated Signal>

The following describes frame configuration of a modulated signal when the present embodiment is applied to advanced wide band digital satellite broadcasting.

Figure 10:
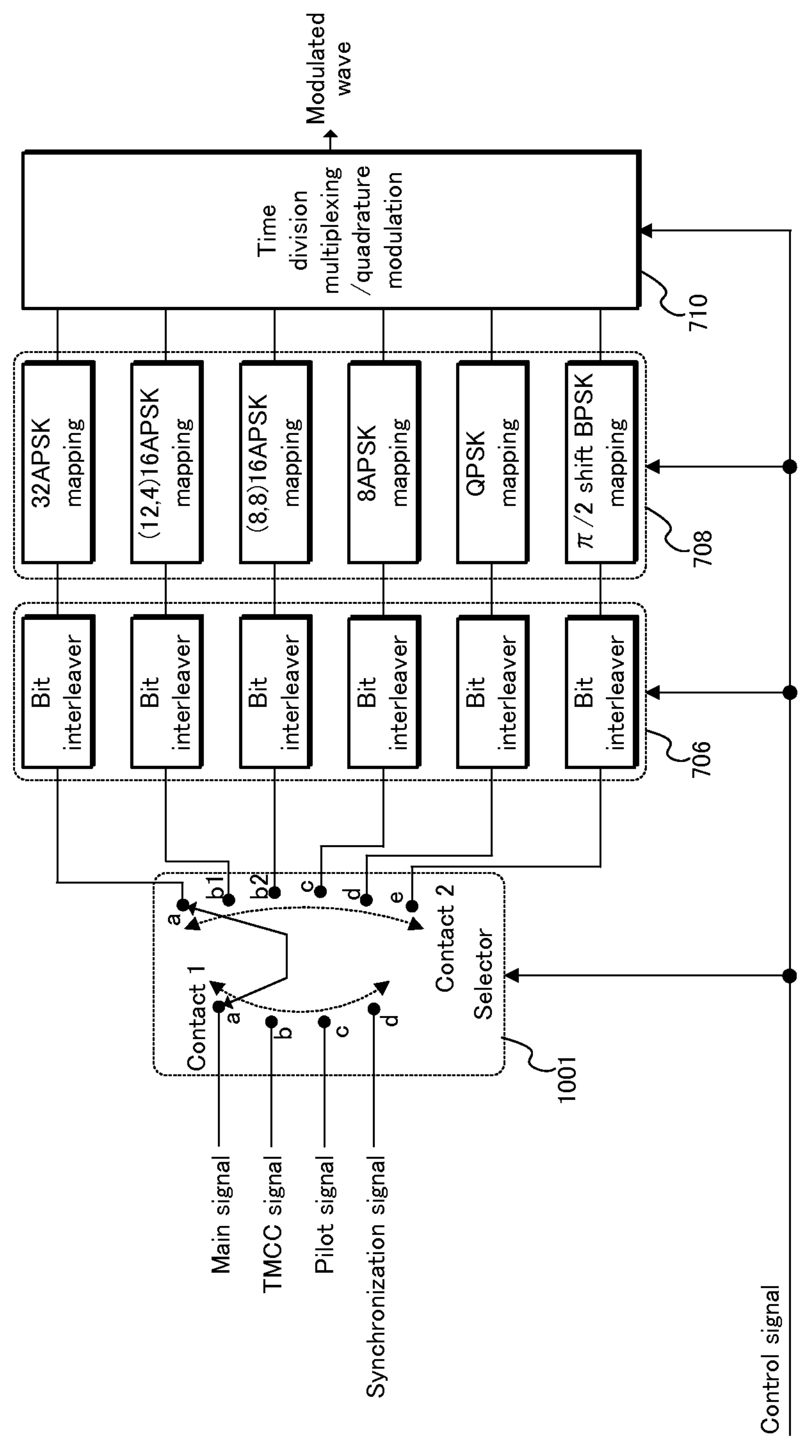
FIG. 10 is a block diagram related to generation of a modulated signal.
Figure 11:
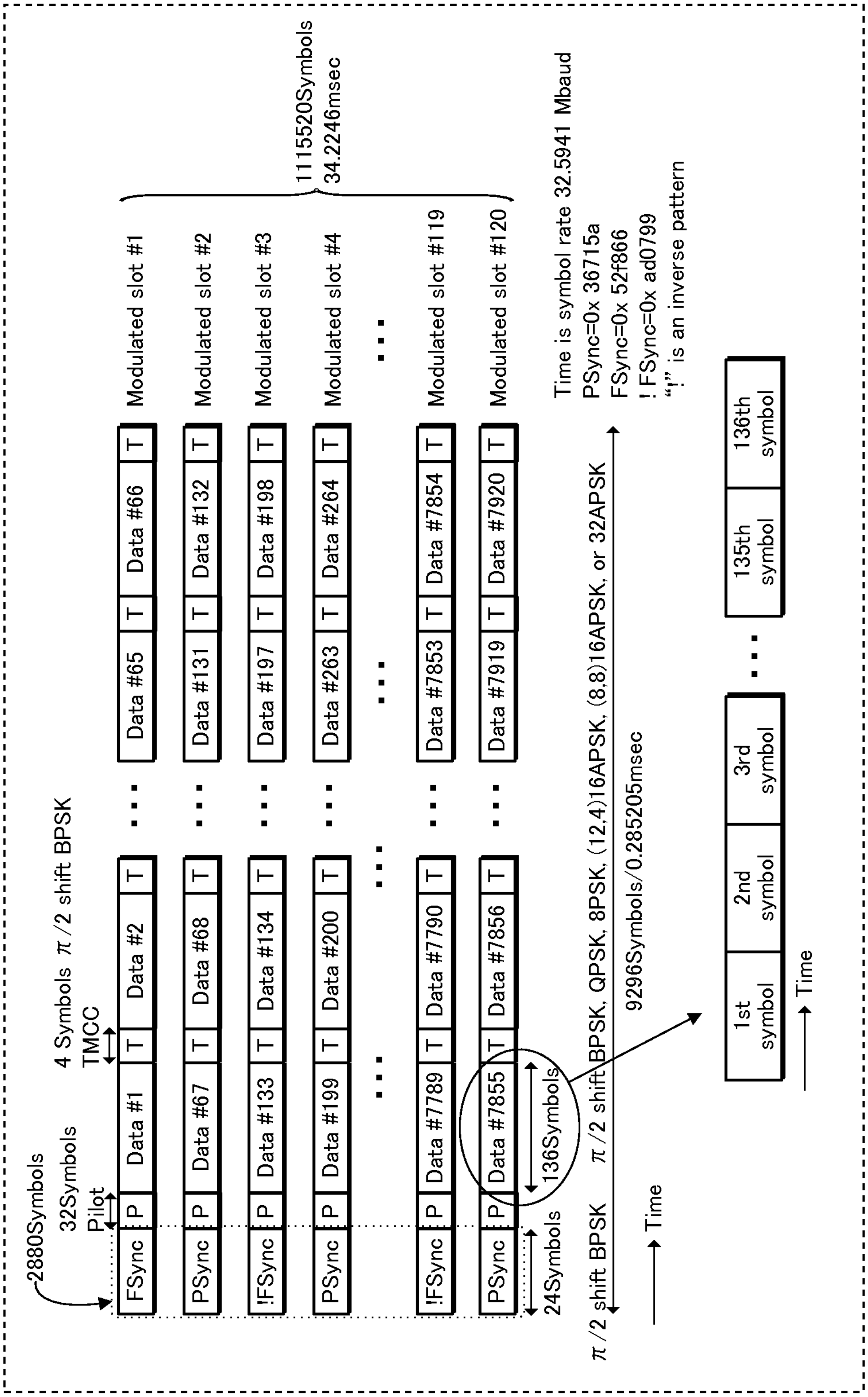
FIG. 11 illustrates a frame configuration of a modulated signal.

FIG. 10 is a block diagram related to generation of a modulated signal. FIG. 11 illustrates a frame configuration of a modulated signal.

Note that the blocks related to modulated signal generation in FIG. 10 are the error correction coder 702, the control information generator and mapper 704, the interleaver 706, and the mapper 708 in FIG. 7, consolidated and re-drawn.

A transmission and multiplexing configuration control (TMCC) signal is a control signal for performing control related to transmission and multiplexing such as a plurality of transmission modes (modulation scheme/error correction coding rate). Further, a TMCC signal indicates assignment of a modulation scheme for each symbol (or slot composed from a plurality of symbols).

A selector 1001 in FIG. 10 switches contact 1 and contact 2 so that symbol sequences of modulated wave output are arranged as illustrated in FIG. 11. Specifically, switching is performed as follows.

During synchronous transmission: Contact 1=d, contact 2=e.

During pilot transmission: Contact 1=c, contact 2=selection from a to e according to modulation scheme assigned to slot (or symbol) (as an important point of the present disclosure, b1 and b2 may be alternately selected for each symbol—this point is described in detail later).

During TMCC transmission: Contact 1=b, contact 2=e.

During data transmission: Contact 1=a, contact 2=selection from a to e according to modulation scheme assigned to slot (or symbol) (as an important point of the present disclosure, b1 and b2 may be alternately (or regularly) selected for each symbol—this point is described in detail later).

Information for arrangement indicated in FIG. 11 is included in the control signal of FIG. 10.

The interleaver 706 performs bit interleaving (bit permuting) based on information in the control signal.

The mapper 708 performs mapping according to a scheme selected by the selector 1001 based on the information in the control signal.

The modulator 710 performs processing such as time division multiplexing/quadrature modulation and bandlimiting according to a root roll-off filter, and outputs a modulated wave.

<Example of Data Symbol Pertaining to Present Disclosure>

As described above, in advanced wide band digital satellite broadcasting, in an in-phase (I)-quadrature-phase (Q) plane, (12,4)16APSK is used as a modulation scheme that broadcasts 16 constellation points, in other words four bits by one symbol. One reason for this is that PAPR of (12,4)16APSK is, for example, less than PAPR of 16QAM and PAPR of (8,8)16APSK, and therefore average transmission power of radio waves transmitted from a broadcast station, i.e., a satellite, can be increased. Accordingly, although BER properties of (12,4)16APSK are worse than BER properties of 16QAM and (8,8)16APSK, when the point that average transmission power can be set higher is considered, the probability of achieving a wide reception area is high (this point is described in more detail above).

Accordingly, in an in-phase (I)-quadrature-phase (Q) plane, as long as a modulation scheme (or transmission method) having a low PAPR and good BER properties is used as a modulation scheme (or transmission method) having 16 constellation points, the probability of achieving a wide reception area is high. The present disclosure is based on this point (note that "good BER properties" means that at a given SNR, a low BER is achieved).

An outline of a method of constructing a data symbol, which is one point of the present disclosure, is described below.

"In a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols." (However, as described in modifications below, there is a transmission method that can obtain a similar effect to the above symbol arrangement even as a method that does not satisfy this outline.) This point is explained with specific examples below.

The 136 symbols of Data #7855 in FIG. 11 are, as illustrated in FIG. 11, ordered along a time axis into "1st symbol", "2nd symbol", "3rd symbol", . . . , "135th symbol", and "136th symbol".

A (12,4)16APSK modulation scheme is used for odd-numbered symbols, and an (8,8)16APSK modulation scheme is used for even-numbered symbols.

Figure 12:
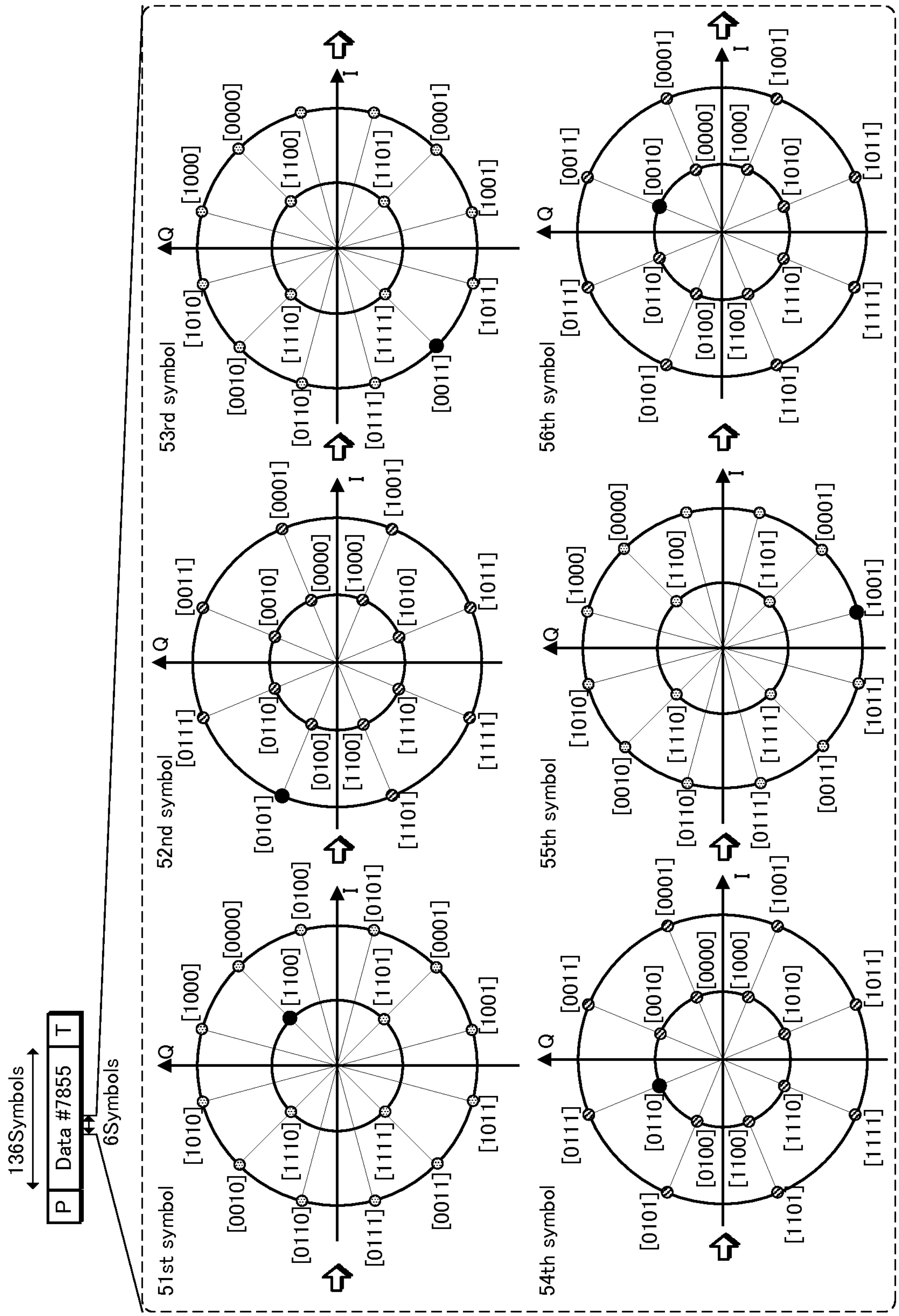
FIG. 12 illustrates an example of data symbols.

An example of data symbols is illustrated in FIG. 12. FIG. 12 illustrates six symbols among 136 symbols (from "51st symbol" to "56th symbol"). As illustrated in FIG. 12, among consecutive symbols, two types of modulation scheme are alternately used in an order (12,4)16APSK, (8,8)16APSK, (12,4)16APSK, (8,8)16APSK, (12,4)16APSK, (8,8)16APSK.

FIG. 12 illustrates the following.

When four bits $[b_3b_2b_1b_0]$ transmitted as the "51st symbol" are [1100], an in-phase component and quadrature component of a baseband signal corresponding to the constellation point marked by a black circle (●) in FIG. 12 is transmitted by the transmission device. (modulation scheme: (12,4)16APSK)

When four bits $[b_3b_2b_1b_0]$ transmitted as the "52nd symbol" are [0101], an in-phase component and quadrature component of a baseband signal corresponding to the constellation point marked by a black circle (●) in FIG. 12 is transmitted by the transmission device. (modulation scheme: (8,8)16APSK)

When four bits $[b_3b_2b_1b_0]$ transmitted as the "53rd symbol" are [0011], an in-phase component and quadrature component of a baseband signal corresponding to the constellation point marked by a black circle (●) in FIG. 12 is transmitted by the transmission device. (modulation scheme: (12,4)16APSK) When four bits $[b_3b_2b_1b_0]$ transmitted as the "54th symbol" are [0110], an in-phase component and quadrature component of a baseband signal corresponding to the constellation point marked by a black circle (●) in FIG. 12 is transmitted by the transmission device. (modulation scheme: (8,8)16APSK)

When four bits $[b_3b_2b_1b_0]$ transmitted as the "55th symbol" are [1001], an in-phase component and quadrature component of a baseband signal corresponding to the constellation point marked by a black circle (●) in FIG. 12 is transmitted by the transmission device. (modulation scheme: (12,4)16APSK)

When four bits $[b_3b_2b_1b_0]$ transmitted as the "56th symbol" are [0010], an in-phase component and quadrature component of a baseband signal corresponding to the constellation point marked by a black circle (●) in FIG. 12 is transmitted by the transmission device. (modulation scheme: (8,8)16APSK)

Note that in the above example an "odd-numbered symbol=(12,4)16APSK and even-numbered symbol=(8,8)16APSK modulation scheme configuration" is described, but this may be an "even-numbered symbol=(8,8)16APSK and odd-numbered symbol=(12,4)16APSK modulation scheme configuration".

Thus, a transmission method having a low PAPR and good BER properties is achieved, and because an average transmission power can be set high and BER properties are good, the probability of achieving a wide reception area is high.

<Advantage of Arranging Alternate Symbols of Different Modulation Schemes>

According to the present disclosure, among modulation schemes having 16 constellation points in an I-Q plane, and in particular (12,4)16APSK for which PAPR is low and (8,8)16APSK for which PAPR is slightly higher: "In a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols".

When (8,8)16APSK symbols are arranged consecutively, PAPR becomes higher as (8,8)16APSK symbols continue. However, in order that (8,8)16APSK symbols are not consecutive, "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols", and therefore there are no consecutive constellation points in connection with (8,8)16APSK. Thus, PAPR is influenced by (12,4)16APSK, for which PAPR is low, and an effect of suppressing PAPR is obtained.

In connection with BER properties, when (12,4)16APSK symbols are consecutive, BER properties are poor when performing BICM (or BICM-ID) but "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols". Thus, BER properties are influenced by (8,8)16APSK, and an effect of improving BER properties is obtained.

In particular, in order to obtain the low PAPR mentioned above, setting of the ring ratio of (12,4)16APSK and the ring ratio of (8,8)16APSK is of importance.

According to $R_1$ and $R_2$ used in representing the constellation points in the I-Q plane of (12,4)16APSK, a ring ratio $R_{(12,4)}$ of (12,4)16APSK represents $R_{(12,4)}=R_2/R_1$.

In the same way, according to $R_1$ and $R_2$ used in representing the constellation points in the I-Q plane of (8,8)16APSK, a ring ratio $R_{(8,8)}$ of (8,8)16APSK represents $R_{(8,8)}=R_2/R_1$.

Thus, an effect is obtained that "when $R_{(8,8)}<R_{(12,4)}$, the probability of further lowering PAPR is high".

When "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols", a modulation scheme likely to control peak power is (8,8)16APSK.

Peak power generated by (8,8)16APSK is likely to increase as $R_{(8,8)}$ increases. Accordingly, in order to avoid increasing peak power, setting $R_{(8,8)}$ low is preferable. On the other hand, there is a high degree of freedom for $R_{(12,4)}$ of (12,4)16APSK as long as a value is set for which BER properties are good. Thus, it is likely that the relationship $R_{(8,8)}<R_{(12,4)}$ is preferable.

However, even when $R_{(8,8)}>R_{(12,4)}$, an effect of lowering PAPR of (8,8)16APSK can be obtained. Accordingly, when focusing on improving BER properties, $R_{(8,8)}>R_{(12,4)}$ may be preferable.

The above-described relationship of ring ratios is also true for the modifications described later (<Patterns of switching modulation schemes, etc.>).

According to the embodiment described above, by alternately arranging symbols of different modulation schemes, PAPR is low and contribution is made towards providing improved data reception quality.

As stated above, an outline of the present disclosure is: "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols". The following describes labelling and constellations of (12,4)16APSK, and labelling and constellations of (8,8)16APSK for increasing the probability of a reception device obtaining high data reception quality.

<Labelling and Constellations of (12,4)16APSK>

[Labelling of (12,4)16APSK]

The following describes labelling of (12,4)16APSK. Labelling is the relationship between four bits $[b_3b_2b_1b_0]$, which are input, and arrangement of constellation points in an in-phase (I)-quadrature-phase (Q) plane. An example of labelling of (12,4)16APSK is illustrated in FIG. 8, but labelling need not conform to FIG. 8 as long as labelling satisfies the following <Condition 1> and <Condition 2>.

For the purposes of description, the following definitions are used.

When four bits to be transmitted are $[b_{a3}b_{a2}b_{a1}b_{a0}]$, a constellation point A is provided in the in-phase (I)-quadrature-phase (Q) plane, and when four bits to be transmitted are $[b_{b3}b_{b2}b_{b1}b_{b0}]$, a constellation point B is provided in the in-phase (I)-quadrature-phase (Q) plane.

When $b_{a3}=b_{b3}$, $b_{a2}=b_{b2}$, $b_{a1}=b_{b1}$, and $b_{a0}=b_{b0}$, the number of different bits of labelling is defined as zero.

Further, the following definitions are made.

When $b_{a3}\neq b_{b3}$, $b_{a2}=b_{b2}$, $b_{a1}=b_{b1}$, and $b_{a0}=b_{b0}$, the number of different bits of labelling is defined as one.

When $b_{a3}=b_{b3}$, $b_{a2}\neq b_{b2}$, $b_{a1}=b_{b1}$, and $b_{a0}=b_{b0}$, the number of different bits of labelling is defined as one.

When $b_{a3}=b_{b3}$, $b_{a2}=b_{b2}$, $b_{a1}\neq b_{b1}$, and $b_{a0}=b_{b0}$, the number of different bits of labelling is defined as one.

When $b_{a3}=b_{b3}$, $b_{a2}=b_{b2}$, $b_{a1}=b_{b1}$, and $b_{a0}\neq b_{b0}$, the number of different bits of labelling is defined as one.

When $b_{a3}\neq b_{b3}$, $b_{a2}\neq b_{b2}$, $b_{a1}=b_{b1}$, and $b_{a0}=b_{b0}$, the number of different bits of labelling is defined as two.

When $b_{a3}\neq b_{b3}$, $b_{a2}=b_{b2}$, $b_{a1}\neq b_{b1}$, and $b_{a0}=b_{b0}$, the number of different bits of labelling is defined as two.

When $b_{a3}\neq b_{b3}$, $b_{a2}=b_{b2}$, $b_{a1}=b_{b1}$, and $b_{a0}\neq b_{b0}$, the number of different bits of labelling is defined as two.

When $b_{a3}=b_{b3}$, $b_{a2}\neq b_{b2}$, $b_{a1}\neq b_{b1}$, and $b_{a0}=b_{b0}$, the number of different bits of labelling is defined as two.

When $b_{a3}=b_{b3}$, $b_{a2}\neq b_{b2}$, $b_{a1}=b_{b1}$, and $b_{a0}\neq b_{b0}$, the number of different bits of labelling is defined as two.

When $b_{a3}=b_{b3}$, $b_{a2}=b_{b2}$, $b_{a1}\neq b_{b1}$, and $b_{a0}\neq b_{b0}$, the number of different bits of labelling is defined as two.

When $b_{a3}=b_{b3}$, $b_{a2}\neq b_{b2}$, $b_{a1}\neq b_{b1}$, and $b_{a0}\neq b_{b0}$, the number of different bits of labelling is defined as three.

When $b_{a3}\neq b_{b3}$, $b_{a2}=b_{b2}$, $b_{a1}\neq b_{b1}$, and $b_{a0}\neq b_{b0}$, the number of different bits of labelling is defined as three.

When $b_{a3}\neq b_{b3}$, $b_{a2}\neq b_{b2}$, $b_{a1}=b_{b1}$, and $b_{a0}\neq b_{b0}$, the number of different bits of labelling is defined as three.

When $b_{a3}\neq b_{b3}$, $b_{a2}\neq b_{b2}$, $b_{a1}\neq b_{b1}$, and $b_{a0}=b_{b0}$, the number of different bits of labelling is defined as three.

When $b_{a3}\neq b_{b3}$, $b_{a2}\neq b_{b2}$, $b_{a1}\neq b_{b1}$, and $b_{a0}\neq b_{b0}$, the number of different bits of labelling is defined as four.

Thus, group definitions are performed. In labelling and constellation of (12,4)16APSK in an in-phase (I)-quadrature-phase (Q) plane in FIG. 8, constellation point 1-1, constellation point 1-2, constellation point 1-3, and constellation point 1-4 are defined as group 1. In the same way, constellation point 2-1, constellation point 2-2, constellation point 2-3, and constellation point 2-4 are defined as group 2; constellation point 3-1, constellation point 3-2, constellation point 3-3, and constellation point 3-4 are defined as group 3; and constellation point 4-1, constellation point 4-2, constellation point 4-3, and constellation point 4-4 are defined as group 4.

The following two conditions are provided.

<Condition 1>

X represents 1, 2, 3, and 4. All values of X satisfy the following:

The number of different bits of labelling between constellation point X-1 and constellation point X-2 is one.

The number of different bits of labelling between constellation point X-2 and constellation point X-3 is one.

The number of different bits of labelling between constellation point X-3 and constellation point X-4 is one.

The number of different bits of labelling between constellation point X-4 and constellation point X-1 is one.

<Condition 2>

In the outer circle:

The number of different bits of labelling between constellation point 1-2 and constellation point 2-2 is one.

The number of different bits of labelling between constellation point 3-2 and constellation point 4-2 is one.

The number of different bits of labelling between constellation point 1-4 and constellation point 4-4 is one.

The number of different bits of labelling between constellation point 2-4 and constellation point 3-4 is one.

In the inner circle:

The number of different bits of labelling between constellation point 1-3 and constellation point 2-3 is one.

The number of different bits of labelling between constellation point 2-3 and constellation point 3-3 is one.

The number of different bits of labelling between constellation point 3-3 and constellation point 4-3 is one.

The number of different bits of labelling between constellation point 4-3 and constellation point 1-3 is one.

By satisfying the above conditions, the number of different bits of labelling among constellation points that are near each other in an in-phase (I)-quadrature-phase (Q) plane is low, and therefore the possibility of a reception device achieving high data reception quality is increased. Thus, when a reception device performs iterative detection, the possibility of the reception device achieving high data reception quality is increased.

Constellation of (12,4)16APSK

Figure 14:
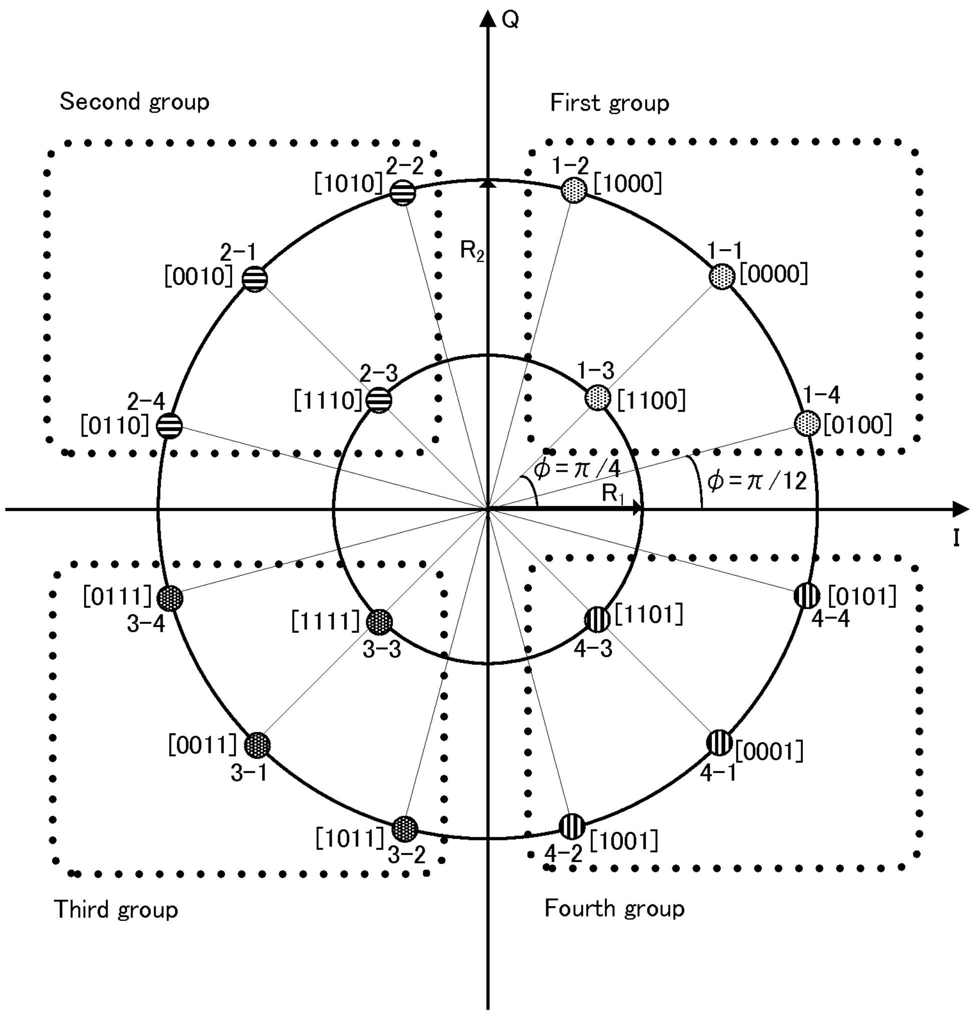
FIG. 14 illustrates an example of labelling of (12,4) 16APSK.

The above describes constellation and labelling in an in-phase (I)-quadrature-phase (Q) plane of FIG. 14, but constellation and labelling in an in-phase (I)-quadrature-phase (Q) plane is not limited to this example. For example, labelling of coordinates on an I-Q plane of each constellation point of (12,4)16APSK may be performed as follows.

Coordinates on an I-Q plane of the constellation point 1-1: $(\cos\theta\times R_2\times\cos(\pi/4)\sin\theta\times R_2\times\sin(\pi/4),\ \sin\theta\times R_2\times\cos(\pi/4)+\cos\theta\times R_2\times\sin(\pi/4))$ Coordinates on an I-Q plane of the constellation point 1-2: $R_2\times\cos(5\pi/12)\sin\theta\times R_2\times\sin(5\pi/12),\ \sin\theta\times R_2\times\cos(5\pi/12)+\cos\theta\times R_2\times\sin(5\pi/12))$ Coordinates on an I-Q plane of the constellation point 1-3: $(\cos\theta\times R_1\times\cos(\pi/4)\sin\theta\times R_1\times\sin(\pi/4),\ \sin\theta\times R_1\times\cos(\pi/4)+\cos\theta\times R_1\times\sin(\pi/4))$ Coordinates on an I-Q plane of the constellation point 1-4: $(\cos\theta\times R_2\times\cos(\pi/12)\sin\theta\times R_2\times\sin(\pi/12),\ \sin\theta\times R_2\times\cos(\pi/12)+\cos\theta\times R_2\times\sin(\pi/12))$ Coordinates on an I-Q plane of the constellation point 2-1:
$(\cos\theta\times R_2\times\cos(3\pi/4)\sin\theta\times R_2\times\sin(3\pi/4),\ \sin\theta\times R_2\times\cos(3\pi/4)+\cos\theta\times R_2\times\sin(3\pi/4))$ Coordinates on an I-Q plane of the constellation point 2-2:
$(\cos\theta\times R_2\times\cos(7\pi/12)\sin\theta\times R_2\times\sin(7\pi/12),\ \sin\theta\times R_2\times\cos(7\pi/12)+\cos\theta\times R_2\times\sin(7\pi/12))$ Coordinates on an I-Q plane of the constellation point 2-3:
$(\cos\theta\times R_1\times\cos(3\pi/4)\sin\theta\times R_1\times\sin(3\pi/4),\ \sin\theta\times R_1\times\cos(3\pi/4)+\cos\theta\times R_1\times\sin(3\pi/4))$ Coordinates on an I-Q plane of the constellation point 2-4:
$(\cos\theta\times R_2\times\cos(11\pi/12)\sin\theta\times R_2\times\sin(11\pi/12),\ \sin\theta\times R_2\times\cos(11\pi/12)+\cos\theta\times R_2\times\sin(11\pi/12))$ Coordinates on an I-Q plane of the constellation point 3-1:
$(\cos\theta\times R_2\times\cos(-3\pi/4)\sin\theta\times R_2\times\sin(-3\pi/4),\ \sin\theta\times R_2\times\cos(-3\pi/4)+\cos\theta\times R_2\times\sin(-3\pi/4))$ Coordinates on an I-Q plane of the constellation point 3-2:
$R_2\times\cos(-7\pi/12)\sin\theta\times R_2\times\sin(-7\pi/12),\ \sin\theta\times R_2\times\cos(-7\pi/12)+\cos\theta\times R_2\times\sin(-7\pi/12))$ Coordinates on an I-Q plane of the constellation point 3-3:
$(\cos\theta\times R_1\times\cos(-3\pi/4)\sin\theta\times R_1\times\sin(-3\pi/4),\ \sin\theta\times R_1\times\cos(-3\pi/4)+\cos\theta\times R_1\times\sin(-3\pi/4))$ Coordinates on an I-Q plane of the constellation point 3-4:
$(\cos\theta\times R_2\times\cos(-11\pi/12)\sin\theta\times R_2\times\sin(-11\pi/12),\ \sin\theta\times R_2\times\cos(-11\pi/12)+\cos\theta\times R_2\times\sin(-11\pi/12))$ Coordinates on an I-Q plane of the constellation point 4-1:
$(\cos\theta\times R_2\times\cos(-\pi/4)\sin\theta\times R_2\times\sin(-\pi/4),\ \sin\theta\times R_2\times\cos(-\pi/4)+\cos\theta\times R_2\times\sin(-\pi/4))$ Coordinates on an I-Q plane of the constellation point 4-2:
$(\cos\theta\times R_2\times\cos(-5\pi/12)\sin\theta\times R_2\times\sin(-5\pi/12),\ \sin\theta\times R_2\times\cos(-5\pi/12)+\cos\theta\times R_2\times\sin(-5\pi/12))$ Coordinates on an I-Q plane of the constellation point 4-3:
$(\cos\theta\times R_1\times\cos(-\pi/4)\sin\theta\times R_1\times\sin(-\pi/4),\ \sin\theta\times R_1\times\cos(-\pi/4)+\cos\theta\times R_1\times\sin(-\pi/4))$ Coordinates on an I-Q plane of the constellation point 4-4:
$(\cos\theta\times R_2\times\cos(-\pi/12)\sin\theta\times R_2\times\sin(-\pi/12),\ \sin\theta\times R_2\times\cos(-\pi/12)+\cos\theta\times R_2\times\sin(\pi/12))$ With respect to phase, the unit used is radians. Accordingly, an in-phase component $I_n$ and a quadrature component $Q_n$ of a baseband signal after normalization is represented as below.

Coordinates on an I-Q plane of the constellation point 1-1:
$(I_n, Q_n)=(a_{(12,4)}\times\cos\theta\times R_2\times\cos(\pi/4)-a_{(12,4)}\times\sin\theta\times R_2\times\sin(\pi/4),$
$a_{(12,4)}\times\sin\theta\times R_2\times\cos(\pi/4)+a_{(12,4)}\times\cos\theta\times R_2\times\sin(\pi/4))$ Coordinates on an I-Q plane of the constellation point 1-2:
$(I_n, Q_n)=(a_{(12,4)}\times\cos\theta\times R_2\times\cos(5\pi/12)-a_{(12,4)}\times\sin\theta\times R_2\times\sin(5\pi/12),$
$a_{(12,4)}\times\sin\theta\times R_2\times\cos(5\pi/12)+a_{(12,4)}\times\cos\theta\times R_2\times\sin(5\pi/12))$ Coordinates on an I-Q plane of the constellation point 1-3:
$(I_n, Q_n)=(a_{(12,4)}\times\cos\theta\times R_1\times\cos(\pi/4)-a_{(12,4)}\times\sin\theta\times R_1\times\sin(\pi/4),$
$a_{(12,4)}\times\sin\theta\times R_1\times\cos(\pi/4)+a_{(12,4)}\times\cos\theta\times R_1\times\sin(\pi/4))$ Coordinates on an I-Q plane of the constellation point 1-4:
$(I_n, Q_n)=(a_{(12,4)}\times\cos\theta\times R_2\times\cos(\pi/2)-a_{(12,4)}\times\sin\theta\times R_2\times\sin(\pi/12),$
$a_{(12,4)}\times\sin\theta\times R_2\times\cos(\pi/12)+a_{(12,4)}\times\cos\theta\times R_2\times\sin(\pi/12))$ Coordinates on an I-Q plane of the constellation point 2-1:
$(I_n, Q_n)=(a_{(12,4)}\times\cos\theta\times R_2\times\cos(3\pi/4)-a_{(12,4)}\times\sin\theta\times R_2\times\sin(3\pi/4),$
$a_{(12,4)}\times\sin\theta\times R_2\times\cos(3\pi/4)+a_{(12,4)}\times\cos\theta\times R_2\times\sin(3\pi/4))$ Coordinates on an I-Q plane of the constellation point 2-2:
$(I_n, Q_n)=(a_{(12,4)}\times\cos\theta\times R_2\times\cos(7\pi/12)-a_{(12,4)}\times\sin\theta\times R_2\times\sin(7\pi/12),$
$a_{(12,4)}\times\sin\theta\times R_2\times\cos(7\pi/12)+a_{(12,4)}\times\cos\theta\times R_2\times\sin(7\pi/12))$ Coordinates on an I-Q plane of the constellation point 2-3:
$(I_n, Q_n)=(a_{(12,4)}\times\cos\theta\times R_1\times\cos(3\pi/4)-a_{(12,4)}\times\sin\theta\times R_1\times\sin(3\pi/4),$
$a_{(12,4)}\times\sin\theta\times R_1\times\cos(3\pi/4)+a_{(12,4)}\times\cos\theta\times R_1\times\sin(3\pi/4))$ Coordinates on an I-Q plane of the constellation point 2-4:
$(I_n, Q_n)=(a_{(12,4)}\times\cos\theta\times R_2\times\cos(11\pi/12)-a_{(12,4)}\times\sin\theta\times R_2\times\sin(11\pi/12),$
$a_{(12,4)}\times\sin\theta\times R_2\times\cos(11\pi/12)+a_{(12,4)}\times\cos\theta\times R_2\times\sin(11\pi/12))$ Coordinates on an I-Q plane of the constellation point 3-1:
$(I_n, Q_n)=(a_{(12,4)}\times\cos\theta\times R_2\times\cos(-3\pi/4)-a_{(12,4)}\times\sin\theta\times R_2\times\sin(-3\pi/4),$
$a_{(12,4)}\times\sin\theta\times R_2\times\cos(-3\pi/4)+a_{(12,4)}\times\cos\theta\times R_2\times\sin(-3\pi/4))$ Coordinates on an I-Q plane of the constellation point 3-2:
$(I_n, Q_n)=(a_{(12,4)}\times\cos\theta\times R_2\times\cos(-7\pi/12)-a_{(12,4)}\times\sin\theta\times R_2\times\sin(-7\pi/12),$
$a_{(12,4)}\times\sin\theta\times R_2\times\cos(-7\pi/12)+a_{(12,4)}\times\cos\theta\times R_2\times\sin(-7\pi/12))$ Coordinates on an I-Q plane of the constellation point 3-3:
$(I_n, Q_n)=(a_{(12,4)}\times\cos\theta\times R_1\times\cos(3\pi/4)-a_{(12,4)}\times\sin\theta\times R_1\times\sin(3\pi/4),$
$a_{(12,4)}\times\sin\theta\times R_1\times\cos(-3\pi/4)+a_{(12,4)}\times\cos\theta\times R_1\times\sin(-3\pi/4))$ Coordinates on an I-Q plane of the constellation point 3-4:
$(I_n, Q_n)=(a_{(12,4)}\times\cos\theta\times R_2\times\cos(-11\pi/12)-a_{(12,4)}\times\sin\theta\times R_2\times\sin(-11\pi/12),$
$a_{(12,4)}\times\sin\theta\times R_2\times\cos(-11\pi/12)+a_{(12,4)}\times\cos\theta\times R_2\times\sin(-11\pi/12))$ Coordinates on an I-Q plane of the constellation point 4-1:
$(I_n, Q_n)=(a_{(12,4)}\times\cos\theta\times R_2\times\cos(-\pi/4)-a_{(12,4)}\times\sin\theta\times R_2\times\sin(-\pi/4),$
$a_{(12,4)}\times\sin\theta\times R_2\times\cos(-\pi/4)+a_{(12,4)}\times\cos\theta\times R_2\times\sin(-\pi/4))$ Coordinates on an I-Q plane of the constellation point 4-2:
$(I_n, Q_n)=(a_{(12,4)}\times\cos\theta\times R_2\times\cos(-5\pi/12)-a_{(12,4)}\times\sin\theta\times R_2\times\sin(-5\pi/12),$
$a_{(12,4)}\times\sin\theta\times R_2\times\cos(-5\pi/12)+a_{(12,4)}\times\cos\theta\times R_2\times\sin(-5\pi/12))$ Coordinates on an I-Q plane of the constellation point 4-3:
$(I_n, Q_n)=(a_{(12,4)}\times\cos\theta\times R_1\times\cos(-\pi/4)-a_{(12,4)}\times\sin\theta\times R_1\times\sin(-\pi/4),$
$a_{(12,4)}\times\sin\theta\times R_1\times\cos(-\pi/4)+a_{(12,4)}\times\cos\theta\times R_1\times\sin(-\pi/4))$ Coordinates on an I-Q plane of the constellation point 4-4:
$(I_n, Q_n)=(a_{(12,4)}\times\cos\theta\times R_2\times\cos(-\pi/12)-a_{(12,4)}\times\sin\theta\times R_2\times\sin(-\pi/12),$
$a_{(12,4)}\times\sin\theta\times R_2\times\cos(\pi/12)+a_{(12,4)}\times\cos\theta\times R_2\times\sin(\pi/12))$ Note that θ is a phase provided on an in-phase (I)-quadrature-phase (Q) plane, and $a_{(12,4)}$ is as shown in Math (23). In a scheme wherein "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols", a (12,4)16APSK modulation scheme may be used for which coordinates on an I-Q plane of each constellation point are as described above and <Condition 1> and <Condition 2> are satisfied.

Figure 15:
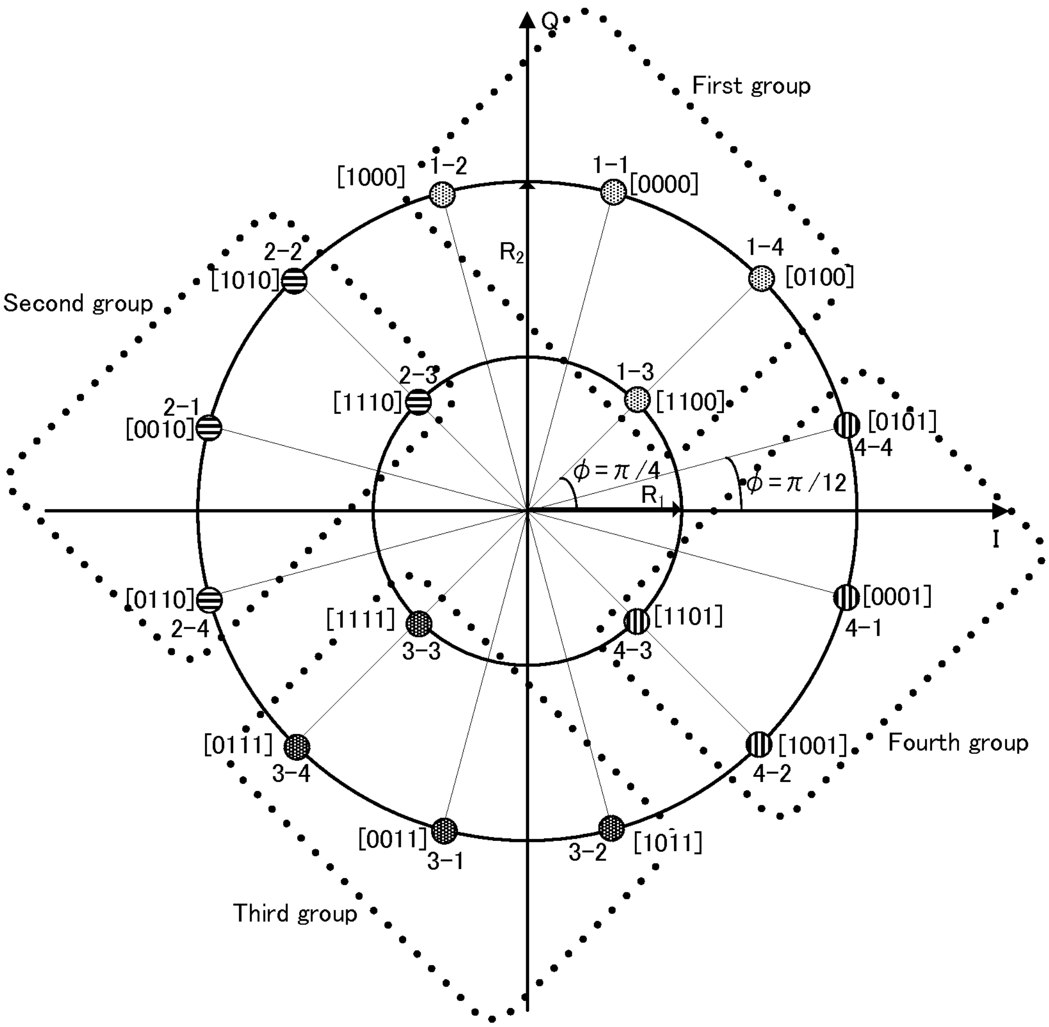
FIG. 15 illustrates an example of labelling of (12,4) 16APSK.

One example that satisfies the above is an example of constellation and labelling of (12,4)16APSK illustrated in FIG. 15. FIG. 15 shows every constellation point rotated π/6 radians with respect to FIG. 14, so that θ=π/6.

<Labelling and Constellations of (8,8)16APSK>

[Labelling of (8,8)16APSK]

The following describes labelling of (8,8)16APSK. An example of labelling of (8,8)16APSK is illustrated in FIG. 9, but labelling need not conform to FIG. 9 as long as labelling satisfies the following <Condition 3> and <Condition 4>.

For the purposes of description, the following definitions are used.

Figure 16:
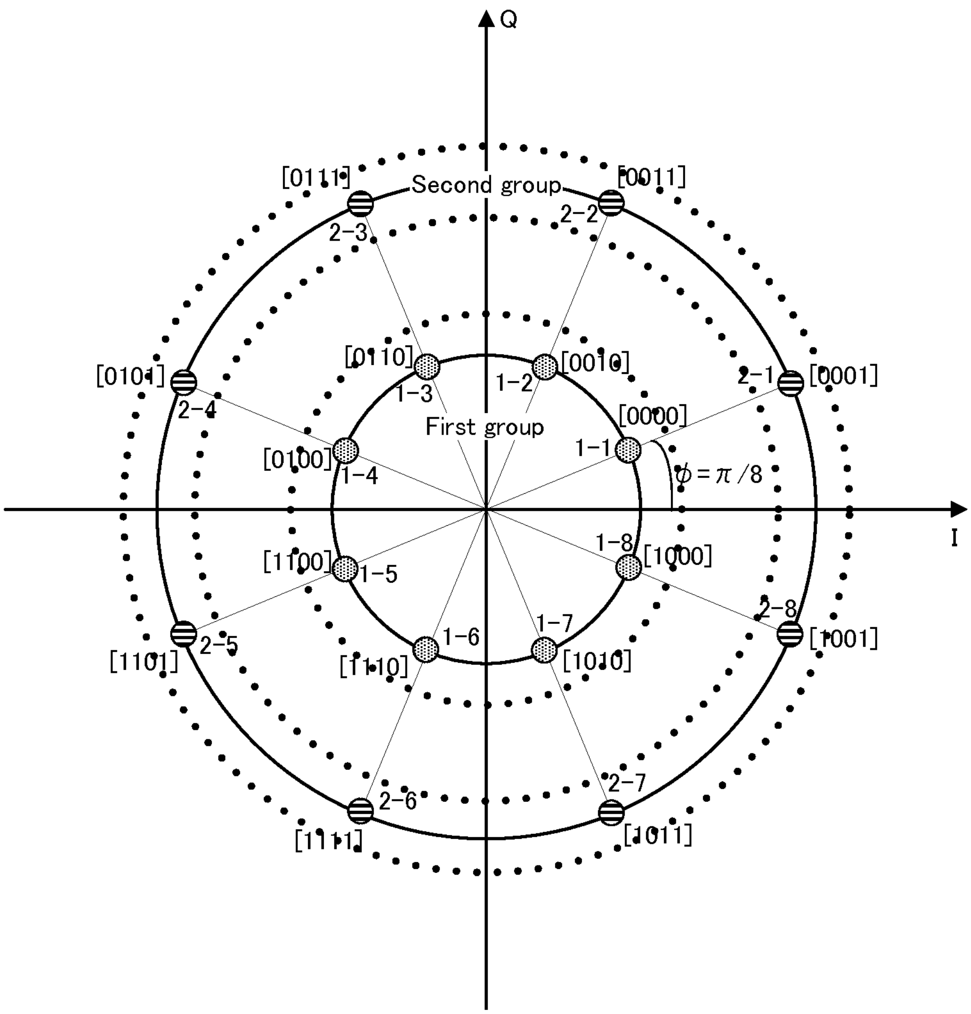
FIG. 16 illustrates an example of labelling of (8,8) 16APSK.

As illustrated in FIG. 16, eight constellation points on the circumference of the inner circle are defined as group 1: constellation point 1-1, constellation point 1-2, constellation point 1-3, constellation point 1-4, constellation point 1-5, constellation point 1-6, constellation point 1-7, and constellation point 1-8. Further, eight constellation points on the circumference of the outer circle are defined as group 2: constellation point 2-1, constellation point 2-2, constellation point 2-3, constellation point 2-4, constellation point 2-5, constellation point 2-6, constellation point 2-7, and constellation point 2-8.

The following two conditions are provided.

<Condition 3>

X represents 1 and 2. All values of X satisfy the following:

The number of different bits of labelling between constellation point X-1 and constellation point X-2 is one.

The number of different bits of labelling between constellation point X-2 and constellation point X-3 is one.

The number of different bits of labelling between constellation point X-3 and constellation point X-4 is one.

The number of different bits of labelling between constellation point X-4 and constellation point X-5 is one.

The number of different bits of labelling between constellation point X-5 and constellation point X-6 is one.

The number of different bits of labelling between constellation point X-6 and constellation point X-7 is one.

The number of different bits of labelling between constellation point X-7 and constellation point X-8 is one.

The number of different bits of labelling between constellation point X-8 and constellation point X-1 is one.

Definitions of the number of different bits of labelling are as described above.

<Condition 4>

Z represents 1, 2, 3, 4, 5, 6, 7, and 8. All values of Z satisfy the following:

The number of different bits of labelling between constellation point 1-Z and constellation point 2-Z is one.

By satisfying the above conditions, the number of different bits of labelling among constellation points that are near each other in an in-phase (I)-quadrature-phase (Q) plane is low, and therefore the possibility of a reception device achieving high data reception quality is increased. Thus, when a reception device performs iterative detection, the possibility of the reception device achieving high data reception quality is increased.

[Constellation of (8,8)16APSK]

The above describes constellation and labelling in an in-phase (I)-quadrature-phase (Q) plane of FIG. 16, but constellation and labelling in an in-phase (I)-quadrature-phase (Q) plane is not limited to this example. For example, coordinates on an I-Q plane of each constellation point of (8,8)16APSK may be labelled as follows.

Coordinates on an I-Q plane of the constellation point 1-1: $(\cos\theta\times R_1\times\cos(\pi/8)\sin\theta\times R_1\times\sin(\pi/8),\ \sin\theta\times R_1\times\cos(\pi/8)+\cos\theta\times R_1\times\sin(\pi/8))$ Coordinates on an I-Q plane of the constellation point 1-2: $(\cos\theta\times R_1\times\cos(3\pi/8)\sin\theta\times R_1\times\sin(3\pi/8),\ \sin\theta\times R_1\times\cos(3\pi/8)+\cos\theta\times R_1\times\sin(3\pi/8))$ Coordinates on an I-Q plane of the constellation point 1-3: $(\cos\theta\times R_1\times\cos(5\pi/8)\sin\theta\times R_1\times\sin(5\pi/8),\ \sin\theta\times R_1\times\cos(5\pi/8)+\cos\theta\times R_1\times\sin(5\pi/8))$ Coordinates on an I-Q plane of the constellation point 1-4: $(\cos\theta\times R_1\times\cos(7\pi/8)\sin\theta\times R_1\times\sin(7\pi/8),\ \sin\theta\times R_1\times\cos(7\pi/8)+\cos\theta\times R_1\times\sin(7\pi/8))$ Coordinates on an I-Q plane of the constellation point 1-5: $(\cos\theta\times R_1\times\cos(-7\pi/8)\sin\theta\times R_1\times\sin(-7\pi/8),\ \sin\theta\times R_1\times\cos(-7\pi/8)+\cos\theta\times R_1\times\sin(-7\pi/8))$ Coordinates on an I-Q plane of the constellation point 1-6: $(\cos\theta\times R_1\times\cos(-5\pi/8)\sin\theta\times R_1\times\sin(-5\pi/8),\ \sin\theta\times R_1\times\cos(-5\pi/8)+\cos\theta\times R_1\times\sin(-5\pi/8))$ Coordinates on an I-Q plane of the constellation point 1-7: $(\cos\theta\times R_1\times\cos(-3\pi/8)\sin\theta\times R_1\times\sin(-3\pi/8),\ \sin\theta\times R_1\times\cos(-3\pi/8)+\cos\theta\times R_1\times\sin(-3\pi/8))$ Coordinates on an I-Q plane of the constellation point 1-8: $(\cos\theta\times R_1\times\cos(-\pi/8)\sin\theta\times R_1\times\sin(\pi/8),\ \sin\theta\times R_1\times\cos(-\pi/8)+\cos\theta\times R_1\times\sin(-\pi/8))$ Coordinates on an I-Q plane of the constellation point 2-1: $(\cos\theta\times R_2\times\cos(\pi/8)\sin\theta\times R_2\times\sin(\pi/8),\ \sin\theta\times R_2\times\cos(\pi/8)+\cos\theta\times R_2\times\sin(\pi/8))$ Coordinates on an I-Q plane of the constellation point 2-2: $(\cos\theta\times R_2\times\cos(3\pi/8)\sin\theta\times R_2\times\sin(3\pi/8),\ \sin\theta\times R_2\times\cos(3\pi/8)+\cos\theta\times R_2\times\sin(3\pi/8))$ Coordinates on an I-Q plane of the constellation point 2-3: $(\cos\theta\times R_2\times\cos(5\pi/8)\sin\theta\times R_2\times\sin(5\pi/8),\ \sin\theta\times R_2\times\cos(5\pi/8)+\cos\theta\times R_2\times\sin(5\pi/8))$ Coordinates on an I-Q plane of the constellation point 2-4: $(\cos\theta\times R_2\times\cos(7\pi/8)\sin\theta\times R_2\times\sin(7\pi/8),\ \sin\theta\times R_2\times\cos(7\pi/8)+\cos\theta\times R_2\times\sin(7\pi/8))$ Coordinates on an I-Q plane of the constellation point 2-5: $(\cos\theta\times R_2\times\cos(-7\pi/8)\sin\theta\times R_2\times\sin(-7\pi/8),\ \sin\theta\times R_2\times\cos(-7\pi/8)+\cos\theta\times R_2\times\sin(-7\pi/8))$ Coordinates on an I-Q plane of the constellation point 2-6: $(\cos\theta\times R_2\times\cos(-5\pi/8)\sin\theta\times R_2\times\sin(-5\pi/8),\ \sin\theta\times R_2\times\cos(-5\pi/8)+\cos\theta\times R_2\times\sin(-5\pi/8))$ Coordinates on an I-Q plane of the constellation point 2-7: $(\cos\theta\times R_2\times\cos(-3\pi/8)\sin\theta\times R_2\times\sin(-3\pi/8),\ \sin\theta\times R_2\times\cos(-3\pi/8)+\cos\theta\times R_2\times\sin(-3\pi/8))$ Coordinates on an I-Q plane of the constellation point 2-8: $(\cos\theta\times R_2\times\cos(-\pi/8)\sin\theta\times R_2\times\sin(\pi/8),\ \sin\theta\times R_2\times\cos(-\pi/8)+\cos\theta\times R_2\times\sin(\pi/8))$ With respect to phase, the unit used is radians. Accordingly, an in-phase component $I_n$ and a quadrature component $Q_n$ of a baseband signal after normalization is represented as below.

Coordinates on an I-Q plane of the constellation point 1-1: $(I_n, Q_n)=(a_{(8,8)}\times\cos\theta\times R_1\times\cos(\pi/8)-a_{(8,8)}\times\sin\theta\times R_1\times\sin(\pi/8),$ $a_{(8,8)}\times\sin\theta\times R_1\times\cos(\pi/8)+a_{(8,8)}\times\cos\theta\times R_1\times\sin(\pi/8))$ Coordinates on an I-Q plane of the constellation point 1-2: $(I_n, Q_n)=(a_{(8,8)}\times\cos\theta\times R_1\times\cos(3\pi/8)-a_{(8,8)}\times\sin\theta\times R_1\times\sin(3\pi/8),$ $a_{(8,8)}\times\sin\theta\times R_1\times\cos(3\pi/8)+a_{(8,8)}\times\cos\theta\times R_1\times\sin(3\pi/8))$ Coordinates on an I-Q plane of the constellation point 1-3: $(I_n, Q_n)=(a_{(8,8)}\times\cos\theta\times R_1\times\cos(5\pi/8)-a_{(8,8)}\times\sin\theta\times R_1\times\sin(5\pi/8),$ $a_{(8,8)}\times\sin\theta\times R_1\times\cos(5\pi/8)+a_{(8,8)}\times\cos\theta\times R_1\times\sin(5\pi/8))$ Coordinates on an I-Q plane of the constellation point 1-4: $(I_n, Q_n)=(a_{(8,8)}\times\cos\theta\times R_1\times\cos(7\pi/8)-a_{(8,8)}\times\sin\theta\times R_1\times\sin(7\pi/8),$ $a_{(8,8)}\times\sin\theta\times R_1\times\cos(7\pi/8)+a_{(8,8)}\times\cos\theta\times R_1\times\sin(7\pi/8))$ Coordinates on an I-Q plane of the constellation point 1-5: $(I_n, Q_n)=(a_{(8,8)}\times\cos\theta\times R_1\times\cos(-7\pi/8)-a_{(8,8)}\times\sin\theta\times R_1\times\sin(-7\pi/8),$ $a_{(8,8)}\times\sin\theta\times R_1\times\cos(-7\pi/8)+a_{(8,8)}\times\cos\theta\times R_1\times\sin(-7\pi/8))$ Coordinates on an I-Q plane of the constellation point 1-6: $(I_n, Q_n)=(a_{(8,8)}\times\cos\theta\times R_1\times\cos(-5\pi/8)-a_{(8,8)}\times\sin\theta\times R_1\times\sin(-5\pi/8),$ $a_{(8,8)}\times\sin\theta\times R_1\times\cos(-5\pi/8)+a_{(8,8)}\times\cos\theta\times R_1\times\sin(-5\pi/8))$ Coordinates on an I-Q plane of the constellation point 1-7: $(I_n, Q_n)=(a_{(8,8)}\times\cos\theta\times R_1\times\cos(-3\pi/8)-a_{(8,8)}\times\sin\theta\times R_1\times\sin(-3\pi/8),$ $a_{(8,8)}\times\sin\theta\times R_1\times\cos(-3\pi/8)+a_{(8,8)}\times\cos\theta\times R_1\times\sin(-3\pi/8))$ Coordinates on an I-Q plane of the constellation point 1-8: $(I_n, Q_n)=(a_{(8,8)}\times\cos\theta\times R_1\times\cos(-\pi/8)-a_{(8,8)}\times\sin\theta\times R_1\times\sin(-\pi/8),$
$a_{(8,8)}\times\sin\theta\times R_1\times\cos(-\pi/8)+a_{(8,8)}\times\cos\theta\times R_1\times\sin(-\pi/8))$ Coordinates on an I-Q plane of the constellation point 2-1: $(I_n, Q_n)=(a_{(8,8)}\times\cos\theta\times R_2\times\cos(\pi/8)-a_{(8,8)}\times\sin\theta\times R_2\times\sin(\pi/8),$
$a_{(8,8)}\times\sin\theta\times R_2\times\cos(\pi/8)+a_{(8,8)}\times\cos\theta\times R_2\times\sin(\pi/8))$ Coordinates on an I-Q plane of the constellation point 2-2: $(I_n, Q_n)=(a_{(8,8)}\times\cos\theta\times R_2\times\cos(3\pi/8)-a_{(8,8)}\times\sin\theta\times R_2\times\sin(3\pi/8),$
$a_{(8,8)}\times\sin\theta\times R_2\times\cos(3\pi/8)+a_{(8,8)}\times\cos\theta\times R_2\times\sin(3\pi/8))$ Coordinates on an I-Q plane of the constellation point 2-3: $(I_n, Q_n)=(a_{(8,8)}\times\cos\theta\times R_2\times\cos(5\pi/8)-a_{(8,8)}\times\sin\theta\times R_2\times\sin(5\pi/8),$
$a_{(8,8)}\times\sin\theta\times R_2\times\cos(5\pi/8)+a_{(8,8)}\times\cos\theta\times R_2\times\sin(5\pi/8))$ Coordinates on an I-Q plane of the constellation point 2-4: $(I_n, Q_n)=(a_{(8,8)}\times\cos\theta\times R_2\times\cos(7\pi/8)-a_{(8,8)}\times\sin\theta\times R_2\times\sin(7\pi/8),$
$a_{(8,8)}\times\sin\theta\times R_2\times\cos(7\pi/8)+a_{(8,8)}\times\cos\theta\times R_2\times\sin(7\pi/8))$ Coordinates on an I-Q plane of the constellation point 2-5: $(I_n, Q_n)=(a_{(8,8)}\times\cos\theta\times R_2\times\cos(-7\pi/8)-a_{(8,8)}\times\sin\theta\times R_2\times\sin(-7\pi/8),$
$a_{(8,8)}\times\sin\theta\times R_2\times\cos(-7\pi/8)+a_{(8,8)}\times\cos\theta\times R_2\times\sin(-7\pi/8))$ Coordinates on an I-Q plane of the constellation point 2-6: $(I_n, Q_n)=(a_{(8,8)}\times\cos\theta\times R_2\times\cos(-5\pi/8)-a_{(8,8)}\times\sin\theta\times R_2\times\sin(-5\pi/8),$
$a_{(8,8)}\times\sin\theta\times R_2\times\cos(-5\pi/8)+a_{(8,8)}\times\cos\theta\times R_2\times\sin(-5\pi/8))$ Coordinates on an I-Q plane of the constellation point 2-7: $(I_n, Q_n)=(a_{(8,8)}\times\cos\theta\times R_2\times\cos(-3\pi/8)+a_{(8,8)}\times\sin\theta\times R_2\times\sin(-3\pi/8),$
$a_{(8,8)}\times\sin\theta\times R_2\times\cos(-3\pi/8)+a_{(8,8)}\times\cos\theta\times R_2\times\sin(-3\pi/8))$ Coordinates on an I-Q plane of the constellation point 2-8: $(I_n, Q_n)=(a_{(8,8)}\times\cos\theta\times R_2\times\cos(\pi/8)-a_{(8,8)}\times\sin\theta\times R_2\times\sin(\pi/8),$
$a_{(8,8)}\times\sin\theta\times R_2\times\cos(-\pi/8)+a_{(8,8)}\times\cos\theta\times R_2\times\sin(\pi/8))$ Note that θ is a phase provided on an in-phase (I)-quadrature-phase (Q) plane, and $a_{(8,8)}$ is as shown in Math (24). In a scheme wherein "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols", an (8,8)16APSK modulation scheme may be used for which coordinates on an I-Q plane of each constellation point are as described above and <Condition 3> and <Condition 4> are satisfied.

Figure 17:
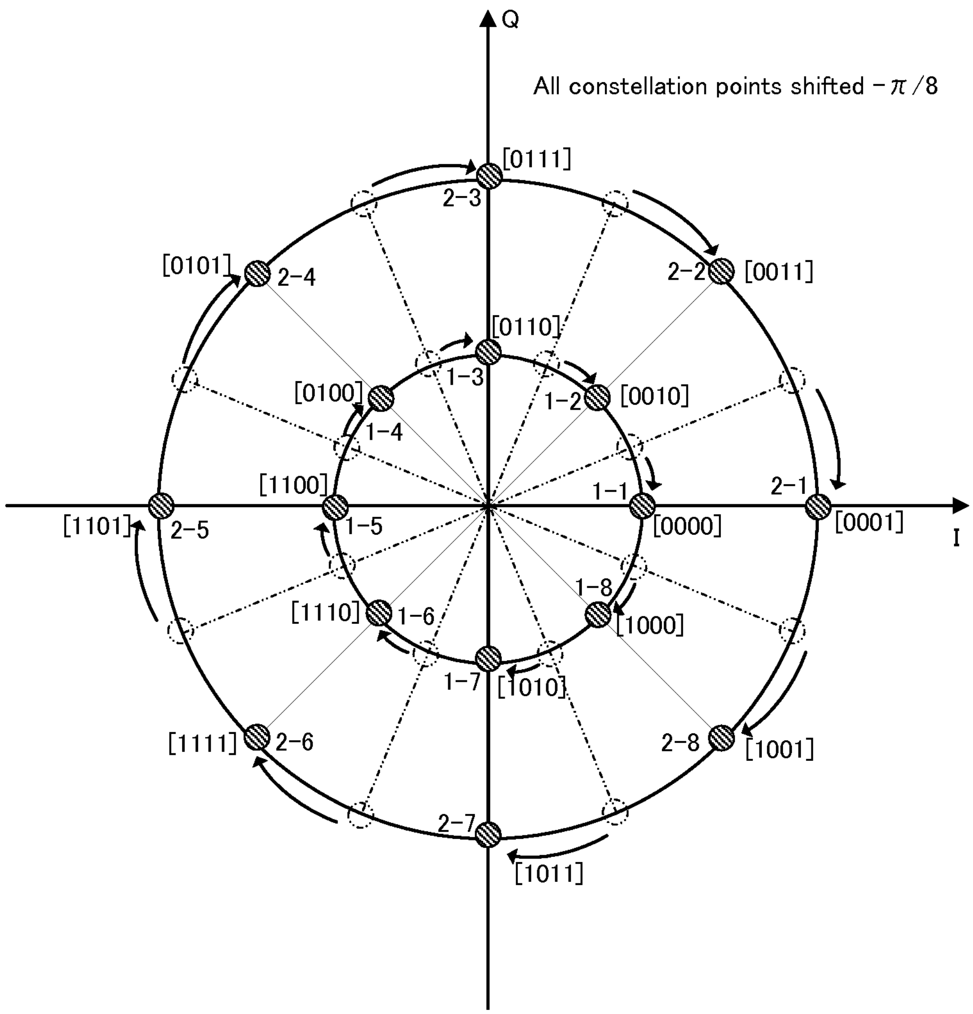
FIG. 17 illustrates an example of a constellation of (8,8)16APSK.

Further, in a scheme wherein "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols", according to the above description, when θ of (12,4)16APSK is $\theta=(N\times\pi)/2$ radians (N being an integer) and θ of (8,8)16APSK is $\theta=\pi/8+(N\times\pi)/4$ radians (N being an integer), there is a possibility that PAPR becomes lower. FIG. 17 is an example of constellation and labelling when $\theta=\pi/8$ radians.

<Patterns of Switching Modulation Schemes, Etc.>

In the example of FIG. 12, an example is described in which (12,4)16APSK symbols and (8,8)16APSK symbols are alternately switched (there are no consecutive (12,4)16APSK symbols or consecutive (8,8)16APSK symbols). The following describes modifications of the above scheme.

Figure 23:
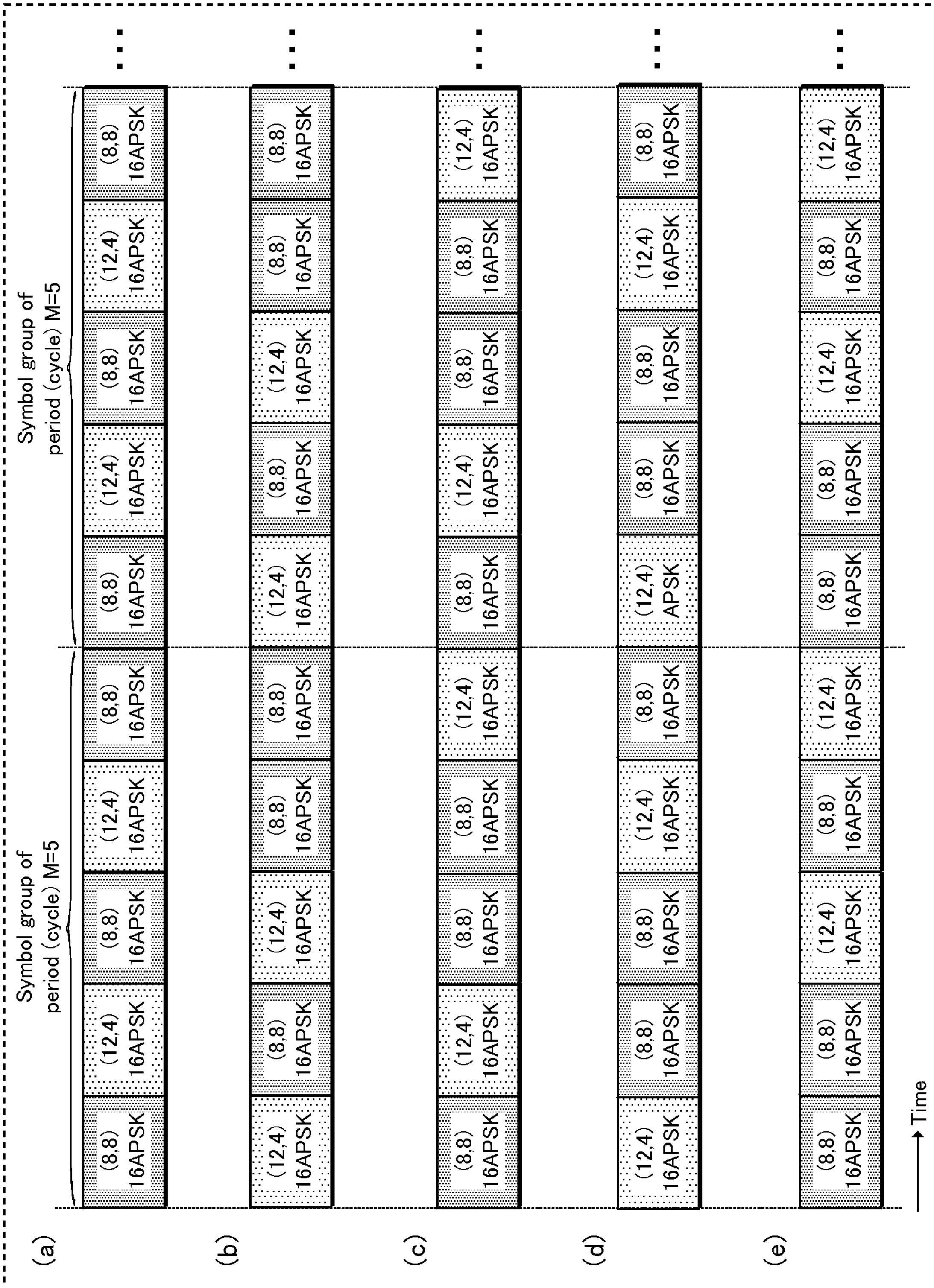
FIG. 23 illustrates examples of arrangement of modulation schemes.
Figure 24:
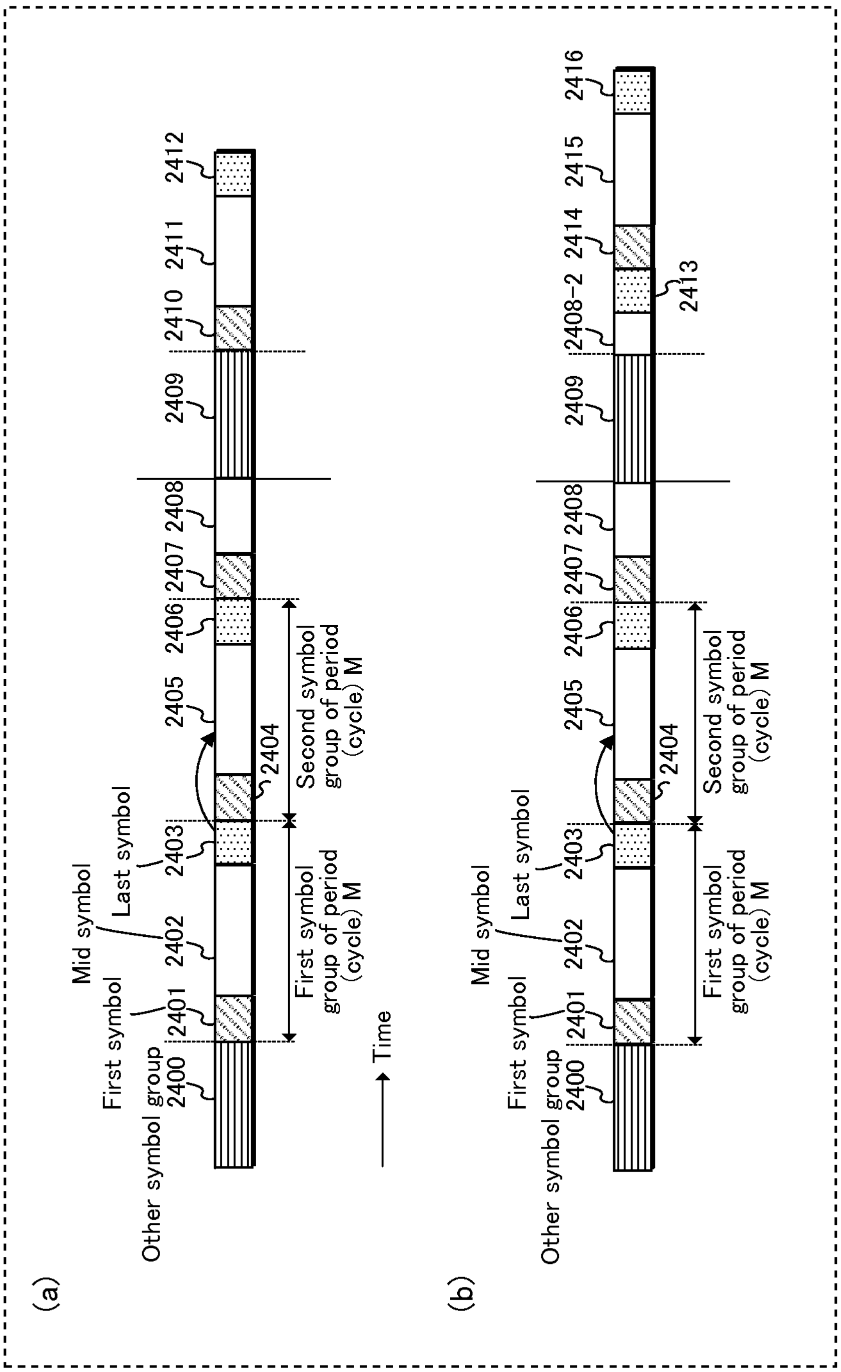
FIG. 24 illustrates an example of arrangement of symbols.

FIG. 23 and FIG. 24 are related to modifications. Features of the modifications are as follows.

One period (cycle) is composed of M symbols. Note that for the following description, one period (cycle) of M symbols is referred to (defined as) a "symbol group of period (cycle) M". The following description references FIG. 23.

When the number of consecutive symbols is at least M+1, a plurality of a "symbol group of period (cycle) M" is arranged. This point is described with reference to FIG. 24.

FIG. 23 illustrates examples of symbol groups when a "symbol group of period (cycle) M=5". Features of FIG. 23 satisfy the following two points.

In a "symbol group of period (cycle) M=5", the number of (8,8)16APSK symbols is one greater than the number of (12,4)16APSK symbols, in other words the number of (12,4)16APSK symbols is two and the number of (8,8)16APSK symbols is three.

In a "symbol group of period (cycle) M=5", there are no consecutive (8,8)16APSK symbols or there is only 1 position at which two consecutive (8,8)16APSK symbols exist. Accordingly, there are no cases of three or more consecutive (8,8)16APSK symbols.

Cases that satisfy the above two points, as methods of configuring a "symbol group of period (cycle) M=5", are illustrated in parts (a), (b), (c), (d), and (e) of FIG. 23. In FIG. 23, the horizontal axis is time.

According to FIG. 23, part (a), when configuring a "symbol group of period (cycle) M=5", a "symbol group of period (cycle) M=5" is an arrangement of symbols in the order (8,8)16APSK symbol, (12,4)16APSK symbol, (8,8)16APSK symbol, (12,4)16APSK symbol, and (8,8)16APSK symbol. Thus, a "symbol group of period (cycle) M=5" configured in this way is arranged in a repeating pattern.

According to FIG. 23, part (b), when configuring a "symbol group of period (cycle) M=5", a "symbol group of period (cycle) M=5" is an arrangement of symbols in the order (12,4)16APSK symbol, (8,8)16APSK symbol, (12,4)16APSK symbol, (8,8)16APSK symbol, and (8,8)16APSK symbol. Thus, a "symbol group of period (cycle) M=5" configured in this way is arranged in a repeating pattern.

According to FIG. 23, part (c), when configuring a "symbol group of period (cycle) M=5", a "symbol group of period (cycle) M=5" is an arrangement of symbols in the order (8,8)16APSK symbol, (12,4)16APSK symbol, (8,8)16APSK symbol, (8,8)16APSK symbol, and (12,4)16APSK symbol. Thus, a "symbol group of period (cycle) M=5" configured in this way is arranged in a repeating pattern.

According to FIG. 23, part (d), when configuring a "symbol group of period (cycle) M=5", a "symbol group of period (cycle) M=5" is an arrangement of symbols in the order (12,4)16APSK symbol, (8,8)16APSK symbol, (8,8)16APSK symbol, (12,4)16APSK symbol, and (8,8)16APSK symbol. Thus, a "symbol group of period (cycle) M=5" configured in this way is arranged in a repeating pattern.

According to FIG. 23, part (e), when configuring a "symbol group of period (cycle) M=5", a "symbol group of period (cycle) M=5" is an arrangement of symbols in the order (8,8)16APSK symbol, (8,8)16APSK symbol, (12,4)16APSK symbol, (8,8)16APSK symbol, and (12,4)16APSK symbol. Thus, a "symbol group of period (cycle) M=5" configured in this way is arranged in a repeating pattern.

Note that methods of configuring a "symbol group of period (cycle) M=5" are described with reference to FIG. 23, but the period (cycle) M is not limited to a value of five, and the following configurations are possible.

In a "symbol group of period (cycle) M", the number of (8,8)16APSK symbols is one greater than the number of (12,4)16APSK symbols, in other words the number of (12,4)16APSK symbols is N and the number of (8,8)16APSK symbols is N+1. Note that N is a natural number.

In a "symbol group of period (cycle) M", there are no consecutive (8,8)16APSK symbols or there is only 1 position at which two consecutive (8,8)16APSK symbols exist.

Accordingly, there are no cases of three or more consecutive (8,8)16APSK symbols.

Accordingly, the period (cycle) M of a "symbol group of period (cycle) M" is an odd number greater than or equal to three, but when considering an increase of PAPR when a modulation scheme is (12,4)16APSK a period (cycle) M of greater than or equal to five is suitable. However, even when a period (cycle) M is three, there is the advantage that PAPR is less than PAPR of (8,8)16APSK.

The above describes configurations according to a "symbol group of period (cycle) M", but a periodic (cyclic) configuration need not be adopted when the following is true.

When each data symbol is either a (12,4)16APSK symbol or an (8,8)16APSK symbol, three or more consecutive (8,8)16APSK symbols are not present in a consecutive data symbol group.

When constellations, labelling, and ring ratios of (12,4)16APSK and (8,8)16APSK are as described above and the conditions described above are satisfied, a similar effect can be obtained.

In a case as described above, two consecutive (8,8)16APSK symbols may occur, but an effect of a lower PAPR than PAPR of (8,8)16APSK is achieved and an effect of improving data reception quality according to (12,4)16APSK is achieved.

The following is a supplemental description, referencing FIG. 24, of a method of configuring consecutive symbols composed of (12,4)16APSK symbols and (8,8)16APSK symbols when other symbols are inserted.

In FIG. 24, part (a), 2400, 2409 indicate other symbol groups (here, a symbol group may indicate consecutive symbols and may indicate a single symbol). These other symbol groups may indicate a control symbol for transmission of a transmission method such as a modulation scheme, an error correction coding scheme, etc., pilot symbols or reference symbol for a reception device to perform channel estimation, frequency synchronization, and time synchronization, or a data symbol modulated by a modulation scheme other than (12,4)16APSK or (8,8)16APSK. In other words, the other symbol groups are symbols for which a modulation scheme is a modulation scheme other than (12,4)16APSK or (8,8)16APSK.

In FIG. 24, part (a), 2401, 2404, 2407, and 2410 indicate a first symbol of a "symbol group of period (cycle) M" (in a "symbol group of period (cycle) M", a first symbol of the period (cycle)). 2403, 2406, and 2412 indicate a last symbol of a "symbol group of period (cycle) M" (in a "symbol group of period (cycle) M", a last symbol of the period (cycle)). 2402, 2405, 2408, and 2411 indicate a mid symbol group of a "symbol group of period (cycle) M" (in a "symbol group of period (cycle) M", a symbol group excluding the first symbol and the last symbol).

FIG. 24, part (a), illustrates an example of symbol arrangement along a horizontal axis of time. In FIG. 24, part (a), a first symbol 2401 of a "symbol group of period (cycle) M" is arranged immediately after the "other symbol group" 2400. Subsequently, the mid symbol group 2402 of the "symbol group of period (cycle) M" and the last symbol 2403 of the "symbol group of period (cycle) M" are arranged. Accordingly, the "first symbol group of period (cycle) M" is arranged immediately after the "other symbol group" 2400.

The "second symbol group of period (cycle) M" is arranged immediately after the "first symbol group of period (cycle) M", the "second symbol group of period (cycle) M" being composed of the first symbol 2404, the mid symbol group 2405, and the last symbol 2406.

The first symbol 2407 of the "symbol group of period (cycle) M" is arranged after the "second symbol group of period (cycle) M", and a portion 2408 of the mid symbol group of the "symbol group of period (cycle) M" is arranged subsequently.

The "other symbol group" 2409 is arranged after the portion 2408 of the mid symbol group of the "symbol group of period (cycle) M".

A feature illustrated in FIG. 24, part (a), is that a "symbol group of period (cycle) M" is arranged after the "other symbol group" 2409, the "symbol group of period (cycle) M" being composed of a first symbol 2410, a mid symbol group 2411, and a last symbol 2412.

FIG. 24, part (b), illustrates an example of symbol arrangement along a horizontal axis of time. In FIG. 24, part (b), the first symbol 2401 of a "symbol group of period (cycle) M" is arranged immediately after the "other symbol group" 2400. Subsequently, the mid symbol group 2402 of the "symbol group of period (cycle) M" and the last symbol 2403 of the "symbol group of period (cycle) M" are arranged. Accordingly, the "first symbol group of period (cycle) M" is arranged immediately after the "other symbol group" 2400.

The "second symbol group of period (cycle) M" is arranged immediately after the "first symbol group of period (cycle) M", the "second symbol group of period (cycle) M" being composed of the first symbol 2404, the mid symbol group 2405, and the last symbol 2406.

The first symbol 2407 of the "symbol group of period (cycle) M" is arranged after the "second symbol group of period (cycle) M", and a portion 2408 of the mid symbol group of the "symbol group of period (cycle) M" is arranged subsequently.

The "other symbol group" 2409 is arranged after the portion 2408 of the mid symbol group of the "symbol group of period (cycle) M".

A feature illustrated in FIG. 24, part (b) is that a remaining portion 2408-2 of the mid symbol group of the "symbol group of period (cycle) M" is arranged after the "other symbol group" 2409, and a last symbol 2413 of the "symbol group of period (cycle) M" is arranged subsequent to the remaining portion 2408. Note that a "symbol group of period (cycle) M" is formed by the first symbol 2407, the portion 2408 of the mid symbol group, the remaining portion 2408-2 of the mid symbol group, and the last symbol 2413.

A "symbol group of period (cycle) M" is arranged after the last symbol 2413, the "symbol group of period (cycle) M" being composed of a first symbol 2414, a mid symbol group 2415, and a last symbol 2416.

In FIG. 24, each "symbol group of period (cycle) M" may have the same configuration as the "symbol group of period (cycle) M" described as an example with reference to FIG. 23, and may be configured so that "in a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols".

When constellations, labelling, and ring ratios of (12,4) 16APSK and (8,8)16APSK are as described above and the conditions described above are satisfied, a similar effect can be obtained.

According to the examples described so far, 16APSK is an example of a modulation scheme used in switching, but 32APSK and 64APSK may be implemented in the same way.

A method of configuring consecutive symbols is as described above:

A "symbol group of period (cycle) M" is configured from a symbol of a first modulation scheme of a first constellation in an in-phase (I)-quadrature-phase (Q) plane and a symbol of a second modulation scheme of a second constellation in an in-phase (I)-quadrature-phase (Q) plane. (However, the number of constellation points in the in-phase (I)-quadrature-phase (Q) plane of the first modulation scheme and the number of constellation points in the in-phase (I)-quadrature-phase (Q) plane of the second modulation scheme are equal.)

In a symbol group of at least three consecutive symbols (or at least four consecutive symbols), among which a modulation scheme for each symbol is the first modulation scheme or the second modulation scheme, there are no consecutive first modulation scheme symbols and there are no consecutive second modulation scheme symbols. (However, the number of constellation points in the in-phase (I)-quadrature-phase (Q) plane of the first modulation scheme and the number of constellation points in the in-phase (I)-quadrature-phase (Q) plane of the second modulation scheme are equal.)

Figure 25:
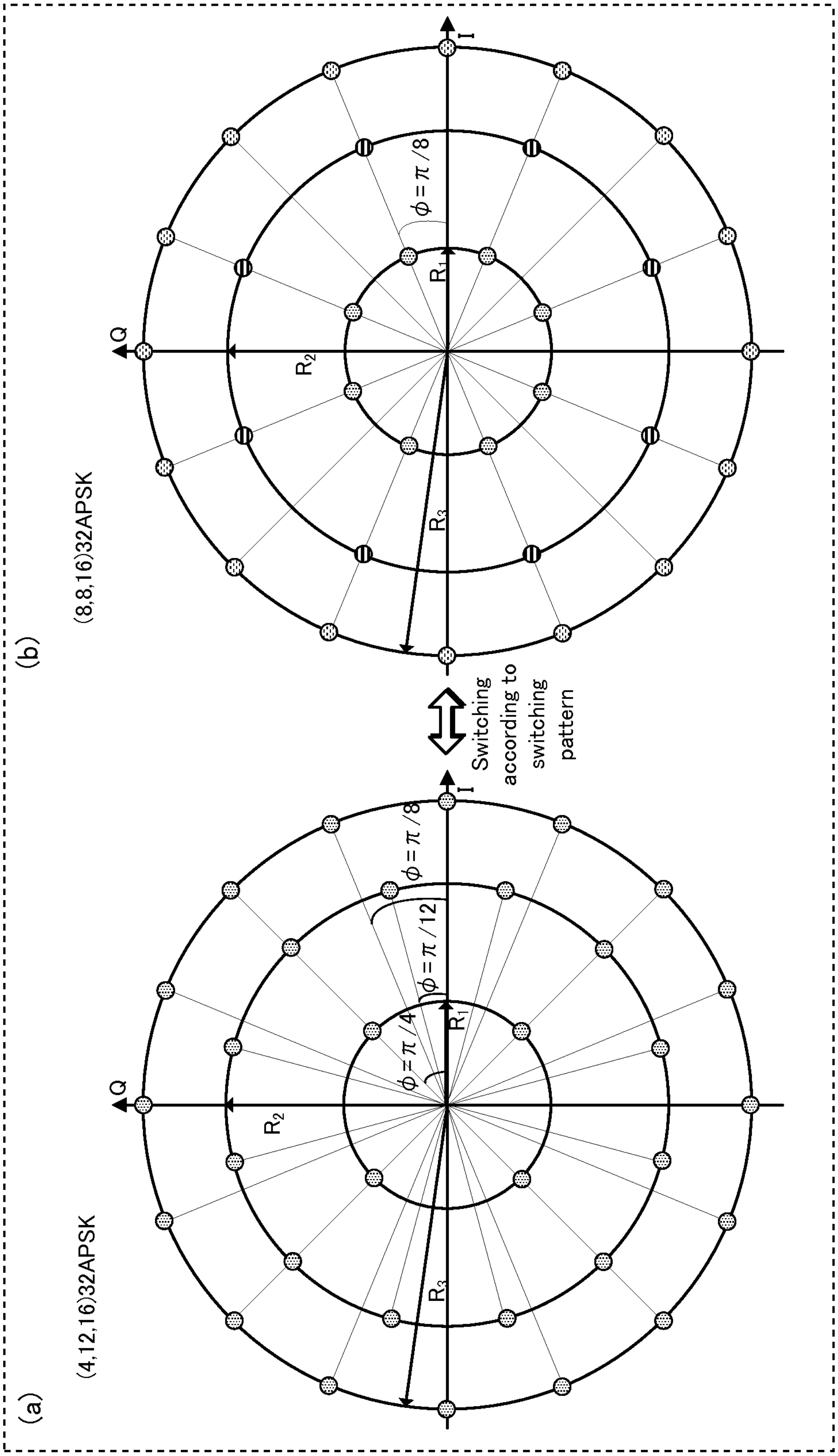
FIG. 25 illustrates examples of constellations of 32APSK.

FIG. 25 illustrates constellations in an in-phase (I)-quadrature-phase (Q) plane of a scheme of types of 32APSK having 32 constellation points in an in-phase (I)-quadrature-phase (Q) plane, according to the method described above of configuring two types of symbol as consecutive symbols.

FIG. 25, part (a) illustrates a constellation in an in-phase (I)-quadrature-phase (Q) plane of (4,12,16)32APSK.

With an origin thereof as a center, constellation points a=4 exist on a circle of radius $R_1$, constellation points b=12 exist on a circle of radius $R_2$, and constellation points c=16 exist on a circle of radius $R_3$. Accordingly (a,b,c)=(4,12,16) and is therefore referred to as (4,12,16)32APSK (note that $R_1<R_2<R_3$).

FIG. 25, part (b) illustrates a constellation in an in-phase (I)-quadrature-phase (Q) plane of (8,8,16)32APSK. With an origin thereof as a center, constellation points a=8 exist on a circle of radius $R_1$, constellation points b=8 exist on a circle of radius $R_2$, and constellation points c=16 exist on a circle of radius $R_3$. Accordingly (a,b,c)=(8,8,16) and is therefore referred to as (8,8,16)32APSK (note that $R_1<R_2<R_3$).

Thus, the method of configuring two types of symbol as consecutive symbols described above may be implemented by (4,12,16)32APSK in FIG. 25, part (a), and (8,8,16) 32APSK in FIG. 25, part (b). In other words, in the method of configuring two types of symbol as consecutive symbols described above, the first modulation scheme and the second modulation scheme may be (4,12,16)32APSK and (8,8,16) 32APSK, respectively.

Further, with an origin thereof as a center, constellation points a=16 may exist on a circle of radius $R_1$ and constellation points b=16 may exist on a circle of radius $R_2$, (a,b)=(16,16), thereby describing (16,16)32APSK (note that $R_1<R_2$).

Thus, the method of configuring two types of symbol as consecutive symbols described above may be implemented by (4,12,16)32APSK in FIG. 25, part (a), and (16,16) 32APSK. In other words, in the method of configuring two types of symbol as consecutive symbols described above, the first modulation scheme and the second modulation scheme may be (4,12,16)32APSK and (16,16)32APSK, respectively.

In addition a γ scheme 32APSK may be considered that has a different constellation to (4,12,16)32APSK, (8,8,16) 32APSK, and (16,16)32APSK. Thus, the method of configuring two types of symbol as consecutive symbols described above may be implemented by (4,12,16)32APSK in FIG. 25, part (a), and the γ scheme 32APSK. In other words, in the method of configuring two types of symbol as consecutive symbols described above, the first modulation scheme and the second modulation scheme may be (4,12,16)32APSK and the γ scheme 32APSK, respectively.

Note that a labelling method with respect to constellation in an in-phase (I)-quadrature-phase (Q) plane of (12,4) 16APSK and a labelling method with respect to constellation in an in-phase (I)-quadrature-phase (Q) plane of (8,8) 16APSK are described in the present embodiment, but a labelling method with respect to constellation in an in-phase (I)-quadrature-phase (Q) plane that is different from the present embodiment may be applied (there is a possibility of achieving an effect similar to the effect of the present embodiment).

Embodiment 2

<Example of Pilot Symbols>

In the present embodiment, configuration examples of pilot symbols in the transmission method described in embodiment 1 are described.

Note that the transmission device in the present embodiment is identical to the transmission device described in embodiment 1 and therefore description thereof is omitted here.

Interference occurs between code (between symbols) of a modulated signal, because of non-linearity of the power amplifier of the transmission device. High data reception quality can be achieved by a reception device by decreasing this intersymbol interference.

In the present example of pilot symbol configuration, a method is described of transmitting baseband signals as pilot symbols, in order to decrease intersymbol interference at a reception device. When data symbols are configured so that "in a symbol group of at least three consecutive symbols (or at least four consecutive symbols), among which a modulation scheme for each symbol is (12,4)16APSK or (8,8) 16APSK, there are no consecutive (12,4)16APSK symbols and there are no consecutive (8,8)16APSK symbols", a transmission device generates and transmits, as pilot symbols, baseband signals corresponding to all constellation points of (12,4)16APSK on an in-phase (I)-quadrature-phase (Q) plane (in other words, baseband signals corresponding to the 16 constellation points of four transmit bits $[b_3b_2b_1b_0]$ from [000] to [1111]) and baseband signals corresponding to all constellation points of (8,8)16APSK on an in-phase (I)-quadrature-phase (Q) plane (in other words, baseband signals corresponding to the 16 constellation points of four transmit bits $[b_3b_2b_1b_0]$ from [0000] to [1111]). Thus, the reception device can estimate intersymbol interference for all constellation points on an in-phase (I)-quadrature-phase (Q) plane of (12,4)16APSK and all constellation points on an in-phase (I)-quadrature-phase (Q) plane of (8,8)16APSK, and therefore there is a high possibility of achieving high data reception quality.

Figure 13:
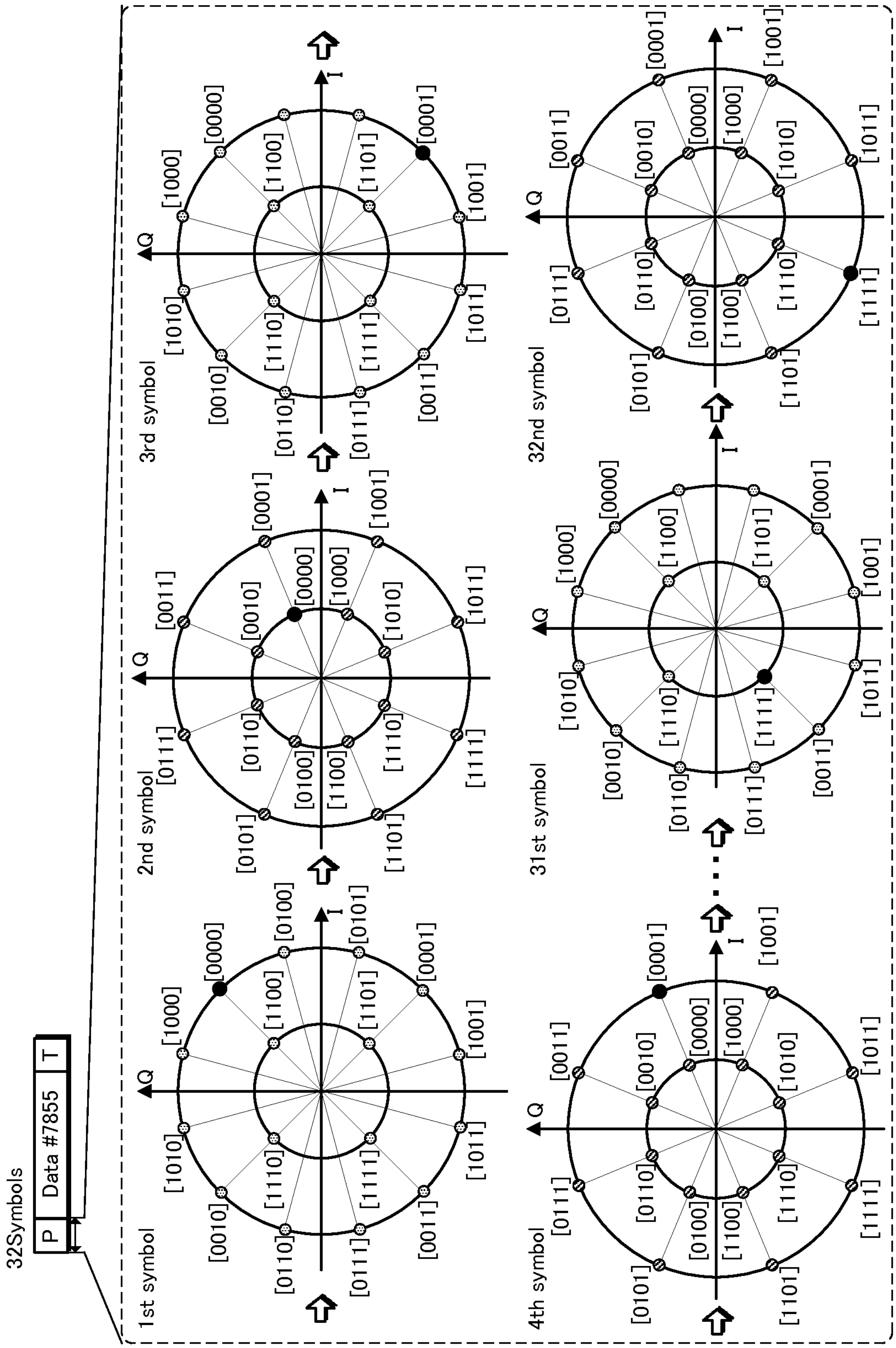
FIG. 13 illustrates an example of pilot symbols.

In the example illustrated in FIG. 13, the following are transmitted as pilot symbols, in order:

a symbol of a constellation point (baseband signal) corresponding to $[b_3b_2b_1b_0]$=[0000] of (12,4)16APSK; a symbol of a constellation point (baseband signal) corresponding to $[b_3b_2b_1b_0]$=[0000] of (8,8)16APSK;

a symbol of a constellation point (baseband signal) corresponding to $[b_3b_2b_1b_0]$=[0001] of (12,4)16APSK; a symbol of a constellation point (baseband signal) corresponding to $[b_3b_2b_1b_0]$=[0001] of (8,8)16APSK;

a symbol of a constellation point (baseband signal) corresponding to $[b_3b_2b_1b_0]$=[0010] of (12,4)16APSK; a symbol of a constellation point (baseband signal) corresponding to $[b_3b_2b_1b_0]$=[0010] of (8,8)16APSK;

a symbol of a constellation point (baseband signal) corresponding to $[b_3b_2b_1b_0]$=[0011] of (12,4)16APSK; a symbol of a constellation point (baseband signal) corresponding to $[b_3b_2b_1b_0]$=[0011] of (8,8)16APSK;

a symbol of a constellation point (baseband signal) corresponding to $[b_3b_2b_1b_0]$=[0100] of (12,4)16APSK; a symbol of a constellation point (baseband signal) corresponding to $[b_3b_2b_1b_0]$=[0100] of (8,8)16APSK;

a symbol of a constellation point (baseband signal) corresponding to $[b_3b_2b_1b_0]$=[0101] of (12,4)16APSK; a symbol of a constellation point (baseband signal) corresponding to $[b_3b_2b_1b_0]$=[0101] of (8,8)16APSK;

a symbol of a constellation point (baseband signal) corresponding to $[b_3b_2b_1b_0]$=[0110] of (12,4)16APSK; a symbol of a constellation point (baseband signal) corresponding to $[b_3b_2b_1b_0]$=[0110] of (8,8)16APSK;

a symbol of a constellation point (baseband signal) corresponding to $[b_3b_2b_1b_0]$=[0111] of (12,4)16APSK; a symbol of a constellation point (baseband signal) corresponding to $[b_3b_2b_1b_0]$=[0111] of (8,8)16APSK;

a symbol of a constellation point (baseband signal) corresponding to $[b_3b_2b_1b_0]$=[1000] of (12,4)16APSK; a symbol of a constellation point (baseband signal) corresponding to $[b_3b_2b_1b_0]$=[1000] of (8,8)16APSK;

a symbol of a constellation point (baseband signal) corresponding to $[b_3b_2b_1b_0]$=[1001] of (12,4)16APSK; a symbol of a constellation point (baseband signal) corresponding to $[b_3b_2b_1b_0]$=[1001] of (8,8)16APSK;

a symbol of a constellation point (baseband signal) corresponding to $[b_3b_2b_1b_0]$=[1010] of (12,4)16APSK; a symbol of a constellation point (baseband signal) corresponding to $[b_3b_2b_1b_0]$=[1010] of (8,8)16APSK;

a symbol of a constellation point (baseband signal) corresponding to $[b_3b_2b_1b_0]$=[1011] of (12,4)16APSK; a symbol of a constellation point (baseband signal) corresponding to $[b_3b_2b_1b_0]$=[1011] of (8,8)16APSK;

a symbol of a constellation point (baseband signal) corresponding to $[b_3b_2b_1b_0]$=[1100] of (12,4)16APSK; a symbol of a constellation point (baseband signal) corresponding to $[b_3b_2b_1b_0]$=[1100] of (8,8)16APSK;

a symbol of a constellation point (baseband signal) corresponding to $[b_3b_2b_1b_0]$=[1101] of (12,4)16APSK; a symbol of a constellation point (baseband signal) corresponding to $[b_3b_2b_1b_0]$=[1101] of (8,8)16APSK;

a symbol of a constellation point (baseband signal) corresponding to $[b_3b_2b_1b_0]$=[1110] of (12,4)16APSK; a symbol of a constellation point (baseband signal) corresponding to $[b_3b_2b_1b_0]$=[1110] of (8,8)16APSK;

a symbol of a constellation point (baseband signal) corresponding to $[b_3b_2b_1b_0]$=[1111] of (12,4)16APSK; and a symbol of a constellation point (baseband signal) corresponding to $[b_3b_2b_1b_0]$=[1111] of (8,8)16APSK.

The above feature means that:

<1> Symbols corresponding to all constellation points on an in-phase (I)-quadrature-phase (Q) plane of (12,4) 16APSK, i.e. the following symbols, are transmitted:

a symbol of a constellation point (baseband signal) corresponding to $[b_3b_2b_1b_0]$=[0000] of (12,4)16APSK;

a symbol of a constellation point (baseband signal) corresponding to $[b_3b_2b_1b_0]$=[0001] of (12,4)16APSK;

a symbol of a constellation point (baseband signal) corresponding to $[b_3b_2b_1b_0]$=[0010] of (12,4)16APSK;

a symbol of a constellation point (baseband signal) corresponding to $[b_3b_2b_1b_0]$=[0011] of (12,4)16APSK;

a symbol of a constellation point (baseband signal) corresponding to $[b_3b_2b_1b_0]$=[0100] of (12,4)16APSK;

a symbol of a constellation point (baseband signal) corresponding to $[b_3b_2b_1b_0]$=[0101] of (12,4)16APSK;

a symbol of a constellation point (baseband signal) corresponding to $[b_3b_2b_1b_0]$=[0110] of (12,4)16APSK;

a symbol of a constellation point (baseband signal) corresponding to $[b_3b_2b_1b_0]$=[0111] of (12,4)16APSK;

a symbol of a constellation point (baseband signal) corresponding to $[b_3b_2b_1b_0]$=[1000] of (12,4)16APSK;

a symbol of a constellation point (baseband signal) corresponding to $[b_3b_2b_1b_0]$=[1001] of (12,4)16APSK;

a symbol of a constellation point (baseband signal) corresponding to $[b_3b_2b_1b_0]$=[1010] of (12,4)16APSK; $[b_3b_2b_1b_0]$=[1011] of (12,4)16APSK;

a symbol of a constellation point (baseband signal) corresponding to $[b_3b_2b_1b_0]$=[1100] of (12,4)16APSK;

a symbol of a constellation point (baseband signal) corresponding to $[b_3b_2b_1b_0]$=[1101] of (12,4)16APSK;

a symbol of a constellation point (baseband signal) corresponding to $[b_3b_2b_1b_0]$=[1110] of (12,4)16APSK; and a symbol of a constellation point (baseband signal) corresponding to $[b_3b_2b_1b_0]$=[1111] of (12,4)16APSK.

Symbols corresponding to all constellation points on an in-phase (I)-quadrature-phase (Q) plane of (8,8)16APSK, i.e., the following symbols, are transmitted:

a symbol of a constellation point (baseband signal) corresponding to $[b_3b_2b_1b_0]$=[0000] of (8,8)16APSK;

a symbol of a constellation point (baseband signal) corresponding to $[b_3b_2b_1b_0]$=[0001] of (8,8)16APSK;

a symbol of a constellation point (baseband signal) corresponding to $[b_3b_2b_1b_0]$=[0010] of (8,8)16APSK;

a symbol of a constellation point (baseband signal) corresponding to $[b_3b_2b_1b_0]$=[0011] of (8,8)16APSK;

a symbol of a constellation point (baseband signal) corresponding to $[b_3b_2b_1b_0]$=[0100] of (8,8)16APSK;

a symbol of a constellation point (baseband signal) corresponding to $[b_3b_2b_1b_0]$=[0101] of (8,8)16APSK;

a symbol of a constellation point (baseband signal) corresponding to $[b_3b_2b_1b_0]$=[0110] of (8,8)16APSK;

a symbol of a constellation point (baseband signal) corresponding to $[b_3b_2b_1b_0]$=[0111] of (8,8)16APSK;

a symbol of a constellation point (baseband signal) corresponding to $[b_3b_2b_1b_0]$=[1000] of (8,8)16APSK;

a symbol of a constellation point (baseband signal) corresponding to $[b_3b_2b_1b_0]$=[1001] of (8,8)16APSK;

a symbol of a constellation point (baseband signal) corresponding to $[b_3b_2b_1b_0]$=[1010] of (8,8)16APSK;

a symbol of a constellation point (baseband signal) corresponding to $[b_3b_2b_1b_0]$=[1011] of (8,8)16APSK;

a symbol of a constellation point (baseband signal) corresponding to $[b_3b_2b_1b_0]$=[1100] of (8,8)16APSK;

a symbol of a constellation point (baseband signal) corresponding to $[b_3b_2b_1b_0]$=[1101] of (8,8)16APSK;

a symbol of a constellation point (baseband signal) corresponding to $[b_3b_2b_1b_0]$=[1110] of (8,8)16APSK; and a symbol of a constellation point (baseband signal) corresponding to $[b_3b_2b_1b_0]$=[1111] of (8,8)16APSK.

<2> In a symbol group composed of consecutive pilot symbols, there are no consecutive (12,4)16APSK symbols and there are no consecutive (8,8)16APSK symbols. According to <1>, a reception device can estimate intersymbol interference with high precision, and can therefore achieve high data reception quality. Further, according to <2>, an effect is achieved of lowering PAPR.

Note that pilot symbols are not only symbols for estimating intersymbol interference, and a reception device may use pilot symbols to perform estimation of a radio wave propagation environment (channel estimation) between the transmission device and the reception device, and may use pilot symbols to perform frequency offset estimation and time synchronization.

Operation of a reception device is described with reference to FIG. 2.

In FIG. 2, 210 indicates a configuration of a reception device. The de-mapper 214 of FIG. 2 performs de-mapping with respect to mapping of a modulation scheme used by the transmission device, for example obtaining and outputting a log-likelihood ratio for each bit. At this time, although not illustrated in FIG. 2, estimation of intersymbol interference, estimation of a radio wave propagation environment (channel estimation) between the transmission device and the reception device, time synchronization with the transmission device, and frequency offset estimation may be performed in order to precisely perform de-mapping.

Although not illustrated in FIG. 2, the reception device includes an intersymbol interference estimator, a channel estimator, a time synchronizer, and a frequency offset estimator. These estimators extract from receive signals a portion of pilot symbols, for example, and respectively perform intersymbol interference estimation, estimation of a radio wave propagation environment (channel estimation) between the transmission device and the reception device, time synchronization between the transmission device and the reception device, and frequency offset estimation between the transmission device and the reception device. Subsequently, the de-mapper 214 of FIG. 2 inputs these estimation signals and, by performing de-mapping based on these estimation signals, performs, for example, calculation of log-likelihood ratios.

Further, a transmission method of pilot symbols is not limited to the example illustrated in FIG. 13 as long as the transmission method satisfies both <1> and <2> described above. For example, a modulation scheme of the 1st symbol of FIG. 13 may be (8,8)16APSK, and a transmission order of $[b_3b_2b_1b_0]$ may be any transmission order. Further, the number of pilot symbols is not limited to 32 symbols as long as the pilot symbols satisfy both <1> and <2>. Accordingly, when composed of 32×N (N being a natural number) symbols, there is an advantage that the number of occurrences of each of the following symbols can be equalized:

a symbol of a constellation point (baseband signal) corresponding to $[b_3b_2b_1b_0]$=[0000] of (12,4)16APSK;

a symbol of a constellation point (baseband signal) corresponding to $[b_3b_2b_1b_0]$=[0001] of (12,4)16APSK;

a symbol of a constellation point (baseband signal) corresponding to $[b_3b_2b_1b_0]$=[0010] of (12,4)16APSK;

a symbol of a constellation point (baseband signal) corresponding to $[b_3b_2b_1b_0]$=[0011] of (12,4)16APSK;

a symbol of a constellation point (baseband signal) corresponding to $[b_3b_2b_1b_0]$=[0100] of (12,4)16APSK;

a symbol of a constellation point (baseband signal) corresponding to $[b_3b_2b_1b_0]$=[0101] of (12,4)16APSK;

a symbol of a constellation point (baseband signal) corresponding to $[b_3b_2b_1b_0]$=[0110] of (12,4)16APSK;

a symbol of a constellation point (baseband signal) corresponding to $[b_3b_2b_1b_0]$=[0111] of (12,4)16APSK;

a symbol of a constellation point (baseband signal) corresponding to $[b_3b_2b_1b_0]$=[1000] of (12,4)16APSK;

a symbol of a constellation point (baseband signal) corresponding to $[b_3b_2b_1b_0]$=[1001] of (12,4)16APSK; $[b_3b_2b_1b_0]$=[1010] of (12,4)16APSK;

a symbol of a constellation point (baseband signal) corresponding to $[b_3b_2b_1b_0]$=[1011] of (12,4)16APSK;

a symbol of a constellation point (baseband signal) corresponding to $[b_3b_2b_1b_0]$=[1100] of (12,4)16APSK;

a symbol of a constellation point (baseband signal) corresponding to $[b_3b_2b_1b_0]$=[1101] of (12,4)16APSK;

a symbol of a constellation point (baseband signal) corresponding to $[b_3b_2b_1b_0]$=[1110] of (12,4)16APSK;

a symbol of a constellation point (baseband signal) corresponding to $[b_3b_2b_1b_0]$=[1111] of (12,4)16APSK;

a symbol of a constellation point (baseband signal) corresponding to $[b_3b_2b_1b_0]$=[0000] of (8,8)16APSK;

a symbol of a constellation point (baseband signal) corresponding to $[b_3b_2b_1b_0]$=[0001] of (8,8)16APSK;

a symbol of a constellation point (baseband signal) corresponding to $[b_3b_2b_1b_0]$=[0010] of (8,8)16APSK;

a symbol of a constellation point (baseband signal) corresponding to $[b_3b_2b_1b_0]$=[0011] of (8,8)16APSK;

a symbol of a constellation point (baseband signal) corresponding to $[b_3b_2b_1b_0]$=[0100] of (8,8)16APSK;

a symbol of a constellation point (baseband signal) corresponding to $[b_3b_2b_1b_0]$=[0101] of (8,8)16APSK;

a symbol of a constellation point (baseband signal) corresponding to $[b_3b_2b_1b_0]$=[0110] of (8,8)16APSK;

a symbol of a constellation point (baseband signal) corresponding to $[b_3b_2b_1b_0]$=[0111] of (8,8)16APSK;

a symbol of a constellation point (baseband signal) corresponding to $[b_3b_2b_1b_0]$=[1000] of (8,8)16APSK;

a symbol of a constellation point (baseband signal) corresponding to $[b_3b_2b_1b_0]$=[1001] of (8,8)16APSK;

a symbol of a constellation point (baseband signal) corresponding to $[b_3b_2b_1b_0]$=[1010] of (8,8)16APSK; $[b_3b_2b_1b_0]$=[1011] of (8,8)16APSK;

a symbol of a constellation point (baseband signal) corresponding to $[b_3b_2b_1b_0]$=[1100] of (8,8)16APSK;

a symbol of a constellation point (baseband signal) corresponding to $[b_3b_2b_1b_0]$=[1101] of (8,8)16APSK;

a symbol of a constellation point (baseband signal) corresponding to $[b_3b_2b_1b_0]$=[1110] of (8,8)16APSK; and a symbol of a constellation point (baseband signal) corresponding to $[b_3b_2b_1b_0]$=[1111] of (8,8)16APSK.

Embodiment 3

<Signaling>

In the present embodiment, examples are described of various information signaled as TMCC information in order to facilitate reception at the reception device of a transmit signal used in the transmission scheme described in embodiment 1 and embodiment 2.

Note that the transmission device in the present embodiment is identical to the transmission device described in embodiment 1 and therefore description thereof is omitted here.

Figure 18:
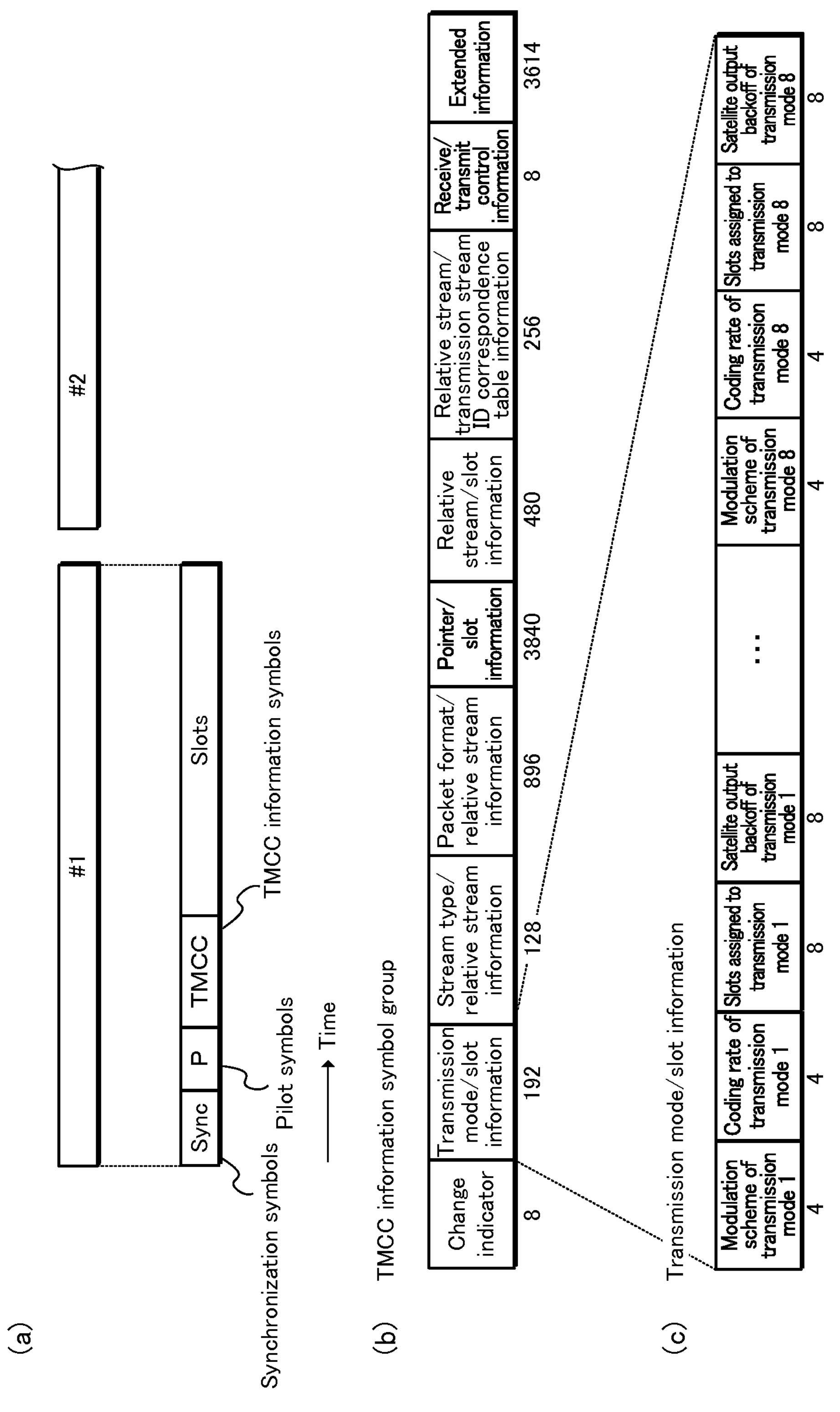
FIG. 18 illustrates a schematic of a transmit signal frame of advanced wide band digital satellite broadcasting.

FIG. 18 illustrates a schematic of a transmit signal frame of advanced wide band digital satellite broadcasting. However, this is not intended to be an accurate diagram of a frame of advanced wide band digital satellite broadcasting.

FIG. 18, part (a), indicates a frame along a horizontal axis of time, along which a "#1 symbol group", a "#2 symbol group", a "#3 symbol group", . . . are arranged. Each symbol group of the "#1 symbol group", the "#2 symbol group", the "#3 symbol group", . . . is composed of a "synchronization symbol group", a "pilot symbol group", a "TMCC information symbol group", and "slots composed of a data symbol group", as illustrated in FIG. 18, part (a). A "synchronization symbol group" is, for example, a symbol for a reception device to perform time synchronization and frequency synchronization, and a "pilot symbol group" is used by a reception device for processing as described above.

"Slots composed of a data symbol group" is composed of data symbols. Transmission methods used to generate data symbols, including error correction code, coding rate, code length, modulation scheme, etc., are switchable. Information related to transmission methods used to generate data symbols, including error correction code, coding rate, code length, modulation scheme, etc., is transmitted to a reception device via a "TMCC information symbol group".

FIG. 18, part (b), illustrates an example of a "TMCC information symbol group". The following describes in particular a configuration of "transmission mode/slot information" of a "TMCC information symbol group".

FIG. 18, part (c), illustrates a configuration of "transmission mode/slot information" of a "TMCC information symbol group". In FIG. 18, part (c), "transmission mode 1" to "transmission mode 8" are illustrated, and "slots composed of data symbol group of #1 symbol group", "slots composed of data symbol group of #2 symbol group", "slots composed of data symbol group of #3 symbol group", . . . each belong to a respective one of "transmission mode 1" to "transmission mode 8".

Thus, modulation scheme information for generating symbols of "slots composed of a data symbol group" is transmitted by symbols for transmitting each modulation scheme of a transmission mode in FIG. 18, part (c) (indicated in FIG. 18, part (c), by "modulation scheme of transmission mode 1", . . . , "modulation scheme of transmission mode 8").

Further, coding rate information of error correction code for generating symbols of "slots composed of a data symbol group" is transmitted by symbols for transmitting each coding rate of a transmission mode in FIG. 18, part (c) (indicated in FIG. 18, part (c), by "coding rate of transmission mode 1", . . . , "coding rate of transmission mode 8").

Table 1 illustrates a configuration of modulation scheme information. In Table 1, for example, when four bits to be transmitted by a symbol for transmitting a modulation scheme of a transmission mode of "transmission mode/slot information" of a "TMCC information symbol group" are [0001], a modulation scheme for generating symbols of "slots composed of a symbol group" is π/2 shift binary phase shift keying (BPSK).

When four bits to be transmitted by a symbol for transmitting a modulation scheme of a transmission mode of "transmission mode/slot information" of a "TMCC information symbol group" are [0010], a modulation scheme for generating symbols of "slots composed of a symbol group" is quadrature phase shift keying (QPSK).

When four bits to be transmitted by a symbol for transmitting a modulation scheme of a transmission mode of a "transmission mode/slot information" of a "TMCC information symbol group" are [0011], a modulation scheme for generating symbols of "slots composed of a symbol group" is 8 phase shift keying (8PSK).

When four bits to be transmitted by a symbol for transmitting a modulation scheme of a transmission mode of "transmission mode/slot information" of a "TMCC information symbol group" are [0100], a modulation scheme for generating symbols of "slots composed of a symbol group" is (12,4)16APSK.

When four bits to be transmitted by a symbol for transmitting a modulation scheme of a transmission mode of "transmission mode/slot information" of a "TMCC information symbol group" are [0101], a modulation scheme for generating symbols of "slots composed of a symbol group" is (8,8)16APSK.

When four bits to be transmitted by a symbol for transmitting a modulation scheme of a transmission mode of "transmission mode/slot information" of a "TMCC information symbol group" are [0110], a modulation scheme for generating symbols of "slots composed of a symbol group" is 32 amplitude phase shift keying (32APSK).

When four bits to be transmitted by a symbol for transmitting a modulation scheme of a transmission mode of "transmission mode/slot information" of a "TMCC information symbol group" are [0111], a modulation scheme for generating symbols of "slots composed of a symbol group" is a "transmission method mixing (12,4)16APSK symbols and (8,8)16APSK symbols" (this may be the transmission method described in embodiment 1, for example, but the present description also describes other transmission methods (for example, embodiment 4)).

TABLE 1

| Modulation scheme information | |
|---|---|
| Value | Assignment |
| 0000 | Reserved |
| 0001 | π/2 shift BPSK |
| 0010 | QPSK |
| 0011 | 8PSK |
| 0100 | (12, 4)16APSK |
| 0101 | (8, 8)16APSK |
| 0110 | 32APSK |
| 0111 | Transmission method mixing (12, 4)16APSK symbols and (8, 8)16APSK symbols |
| . . . | . . . |
| 1111 | No scheme assigned |

Table 2 illustrates a relationship between coding rates of error correction code and ring ratios when a modulation scheme is (12,4)16APSK. According to $R_1$ and $R_2$, used above to represent constellation points in an I-Q plane of (12,4)16APSK, a ring ratio $R_{(12,4)}$ of (12,4)16APSK is represented as $R_{(12,4)}=R_2/R_1$. In Table 2, for example, when four bits to be transmitted by a symbol for transmitting a coding rate of a transmission mode of "transmission mode/slot information" of a "TMCC information symbol group" are [0000], a coding rate of error correction code for generating symbols of "slots composed of a data symbol group" is 41/120 (≈⅓), and this means that when a symbol for transmitting a modulation scheme of a transmission mode is indicated to be (12,4)16APSK, a ring ratio $R_{(12,4)}$ of (12,4)16APSK is 3.09.

When four bits to be transmitted by a symbol for transmitting a coding rate of a transmission mode of "transmission mode/slot information" of a "TMCC information symbol group" are [0001], a coding rate of error correction code for generating symbols of "slots composed of a data symbol group" is 49/120 (≈⅖), and this means that when a symbol for transmitting a modulation scheme of a transmission mode is indicated to be (12,4)16APSK, a ring ratio $R_{(12,4)}$ of (12,4)16APSK is 2.97.

When four bits to be transmitted by a symbol for transmitting a coding rate of a transmission mode of "transmission mode/slot information" of a "TMCC information symbol group" are [0010], a coding rate of error correction code for generating symbols of "slots composed of a data symbol group" is 61/120 (≈½), and this means that when a symbol for transmitting a modulation scheme of a transmission mode is indicated to be (12,4)16APSK, a ring ratio $R_{(12,4)}$ of (12,4)16APSK is 3.93.

TABLE 2

Relationship between coding rates of error correction code and ring ratios when modulation scheme is (12, 4)16APSK

| Value | Coding rate (approximate value) | Ring ratio |
|---|---|---|
| 0000 | 41/120 (⅓) | 3.09 |
| 0001 | 49/120 (⅖) | 2.97 |
| 0010 | 61/120 (½) | 3.93 |
| . . . | . . . | . . . |
| 1111 | No scheme assigned | — |

Table 3 illustrates a relationship between coding rates of error correction code and ring ratios when a modulation scheme is (8,8)16APSK. As above, according to $R_1$ and $R_2$ used in representing the constellation points in the I-Q plane of (8,8)16APSK, a ring ratio $R_{(8,8)}$ of (8,8)16APSK is represented as $R_{(8,8)}=R_2/R_1$. In Table 3, for example, when four bits to be transmitted by a symbol for transmitting a coding rate of a transmission mode of "transmission mode/slot information" of a "TMCC information symbol group" are [0000], a coding rate of error correction code for generating symbols of "slots composed of a data symbol group" is 41/120 (≈⅓), and this means that when a symbol for transmitting a modulation scheme of a transmission mode is indicated to be (8,8)16APSK, a ring ratio $R_{(8,8)}$ of (8,8)16APSK is 2.70.

When four bits to be transmitted by a symbol for transmitting a coding rate of a transmission mode of "transmission mode/slot information" of a "TMCC information symbol group" are [0001], a coding rate of error correction code for generating symbols of "slots composed of a data symbol group" is 49/120 (≈⅖), and this means that when a symbol for transmitting a modulation scheme of a transmission mode is indicated to be (8,8)16APSK, a ring ratio $R_{(8,8)}$ of (8,8)16APSK is 2.60.

When four bits to be transmitted by a symbol for transmitting a coding rate of a transmission mode of "transmission mode/slot information" of a "TMCC information symbol group" are [0010], a coding rate of error correction code for generating symbols of "slots composed of a data symbol group" is 61/120 (≈½), and this means that when a symbol for transmitting a modulation scheme of a transmission mode is indicated to be (8,8)16APSK, a ring ratio $R_{(8,8)}$ of (8,8)16APSK is 2.50.

TABLE 3

Relationship between coding rates of error correction code and ring ratios when a modulation scheme is (8, 8)16APSK

| Value | Coding rate (approximate value) | Ring ratio |
|---|---|---|
| 0000 | 41/120 (⅓) | 2.70 |
| 0001 | 49/120 (⅖) | 2.60 |
| 0010 | 61/120 (½) | 2.50 |
| . . . | . . . | . . . |
| 1111 | No scheme assigned | — |

Table 4 illustrates a relationship between coding rates of error correction code and ring ratios when a transmission method mixes (12,4)16APSK symbols and (8,8)16APSK symbols.

In Table 4, for example, when four bits to be transmitted by a symbol for transmitting a coding rate of a transmission mode of "transmission mode/slot information" of a "TMCC information symbol group" are [0000], a coding rate of error correction code for generating symbols of "slots composed of a data symbol group" is 41/120 (≈⅓), and this means that when symbols for transmitting a modulation scheme of a transmission mode are indicated to be generated by a transmission method mixing (12,4)16APSK symbols and (8,8)16APSK symbols, a ring ratio $R_{(12,4)}$ of (12,4)16APSK is 4.20 and a ring ratio $R_{(8,8)}$ of (8,8)16APSK is 2.70.

When four bits to be transmitted by a symbol for transmitting a coding rate of a transmission mode of "transmission mode/slot information" of a "TMCC information symbol group" are [0001], a coding rate of error correction code for generating symbols of "slots composed of a data symbol group" is 49/120 (≈⅖), and this means that when symbols for transmitting a modulation scheme of a transmission mode are indicated to be generated by a transmission method mixing (12,4)16APSK symbols and (8,8)16APSK symbols, a ring ratio $R_{(12,4)}$ of (12,4)16APSK is 4.10 and a ring ratio $R_{(8,8)}$ of (8,8)16APSK is 2.60.

When four bits to be transmitted by a symbol for transmitting a coding rate of a transmission mode of "transmission mode/slot information" of a "TMCC information symbol group" are [0010], a coding rate of error correction code for generating symbols of "slots composed of a data symbol group" is 61/120 (≈½), and this means that when symbols for transmitting a modulation scheme of a transmission mode are indicated to be generated by a transmission method mixing (12,4)16APSK symbols and (8,8)16APSK symbols, a ring ratio $R_{(12,4)}$ of (12,4)16APSK is 4.00 and a ring ratio $R_{(8,8)}$ of (8,8)16APSK is 2.50.

TABLE 4

Relationship between coding rates of error correction code and ring ratios when transmission method mixes (12, 4)16APSK symbols and (8, 8)16APSK symbols.

| Value | Coding rate (approximate value) | (12, 4)16APSK ring ratio | (8, 8)16APSK ring ratio |
|---|---|---|---|
| 0000 | 41/120 (⅓) | 4.20 | 2.70 |
| 0001 | 49/120 (⅖) | 4.10 | 2.60 |
| 0010 | 61/120 (½) | 4.00 | 2.50 |
| . . . | . . . | . . . | . . . |
| 1111 | No scheme assigned | — | — |

Further, as in FIG. 22, the following transmission is performed by "stream type/relative stream information" of a "TMCC information symbol group".

FIG. 22, part (a) illustrates a configuration of "stream type/relative stream information". In FIG. 22, part (a), a configuration for transmitting stream type information is illustrated as an example including stream 0 to stream 15. In FIG. 22, part (a), "stream type of relative stream 0" indicates stream type information of stream 0.

Likewise, "stream type of relative stream 1" indicates stream type information of stream 1.

"Stream type of relative stream 2" indicates stream type information of stream 2.

"Stream type of relative stream 15" indicates stream type information of stream 15.

Stream type information for a stream is assumed to be composed of eight bits (however, this is just an example).

FIG. 22, part (b), illustrates examples of assignments to eight bit stream type information.

Eight bit stream type information [00000000] is reserved.

Eight bit stream type information [00000001] indicates that the stream is Moving Picture Experts Group-2 transport stream (MPEG-2TS).

Eight bit stream type information [00000010] indicates that the stream is type-length-value (TLV).

Eight bit stream type information [00000011] indicates that the stream is video (moving image) of resolution approximately 4 k (for example, 3840) pixels horizontally by approximately 2 k (for example 2160) pixels vertically. Video coding information may also be included.

Eight bit stream type information [00000100] indicates that the stream is video (moving image) of resolution approximately 8 k (for example, 7680) pixels horizontally by approximately 4 k (for example 4320) pixels vertically. Video coding information may also be included.

Eight bit stream type information [00000101] indicates that the stream is differential information for generating video (moving image) of resolution approximately 8 k (for example, 7680) pixels horizontally by approximately 4 k (for example 4320) pixels vertically from a video (moving image) of resolution approximately 4 k (for example, 3840) pixels horizontally by approximately 2 k (for example 2160) pixels vertically. Video coding information may also be included. This information is described further later.

Eight bit stream type information [11111111] is not assigned a type.

The following describes how eight bit stream type information [00000101] is used.

Assume the transmission device transmits a stream of a video # A, which is a video (moving image) of resolution approximately 4 k (for example 3840) pixels horizontally by approximately 2 k (for example 2160) pixels vertically. Thus, the transmission device transmits eight bit stream type information [00000011].

In addition, the transmission device is assumed to transmit differential information for generating video (moving image) of resolution approximately 8 k (for example, 7680) pixels horizontally by approximately 4 k (for example 4320) pixels vertically from a video (moving image) of resolution approximately 4 k (for example, 3840) pixels horizontally by approximately 2 k (for example 2160) pixels vertically. Thus, the transmission device transmits eight bit stream type information [00000101].

A reception device receives the stream type information [00000011], determines from this information that the stream is a video (moving image) of resolution approximately 4 k (for example, 3840) pixels horizontally by approximately 2 k (for example 2160) pixels vertically, and can receive the video # A that is a video (moving image) of resolution approximately 4 k (for example, 3840) pixels horizontally by approximately 2 k (for example 2160) pixels vertically.

Further, in addition to the reception device receiving the stream type information [00000011], and determining from this information that the stream is a video (moving image) of resolution approximately 4 k (for example, 3840) pixels horizontally by approximately 2 k (for example 2160) pixels vertically, the reception device receives the stream type information [00000101] and determines from this information that the stream is differential information for generating a video (moving image) of resolution approximately 8 k (for example, 7680) pixels horizontally by approximately 4 k (for example 4320) pixels vertically from a video (moving image) of resolution approximately 4 k (for example, 3840) pixels horizontally by approximately 2 k (for example 2160) pixels vertically. Thus, the reception device can obtain a video (moving image) of resolution approximately 8 k (for example, 7680) pixels horizontally by approximately 4 k (for example 4320) pixels vertically of the video # A from both streams.

Note that in order to transmit these streams, the transmission device uses, for example, a transmission method described in embodiment 1 and embodiment 2. Further, as described in embodiment 1 and embodiment 2, when the transmission device transmits these streams using modulation scheme of both (12,4)16APSK and (8,8)16APSK, the effects described in embodiment 1 and embodiment 2 can be achieved.

<Reception Device>

Figure 19:
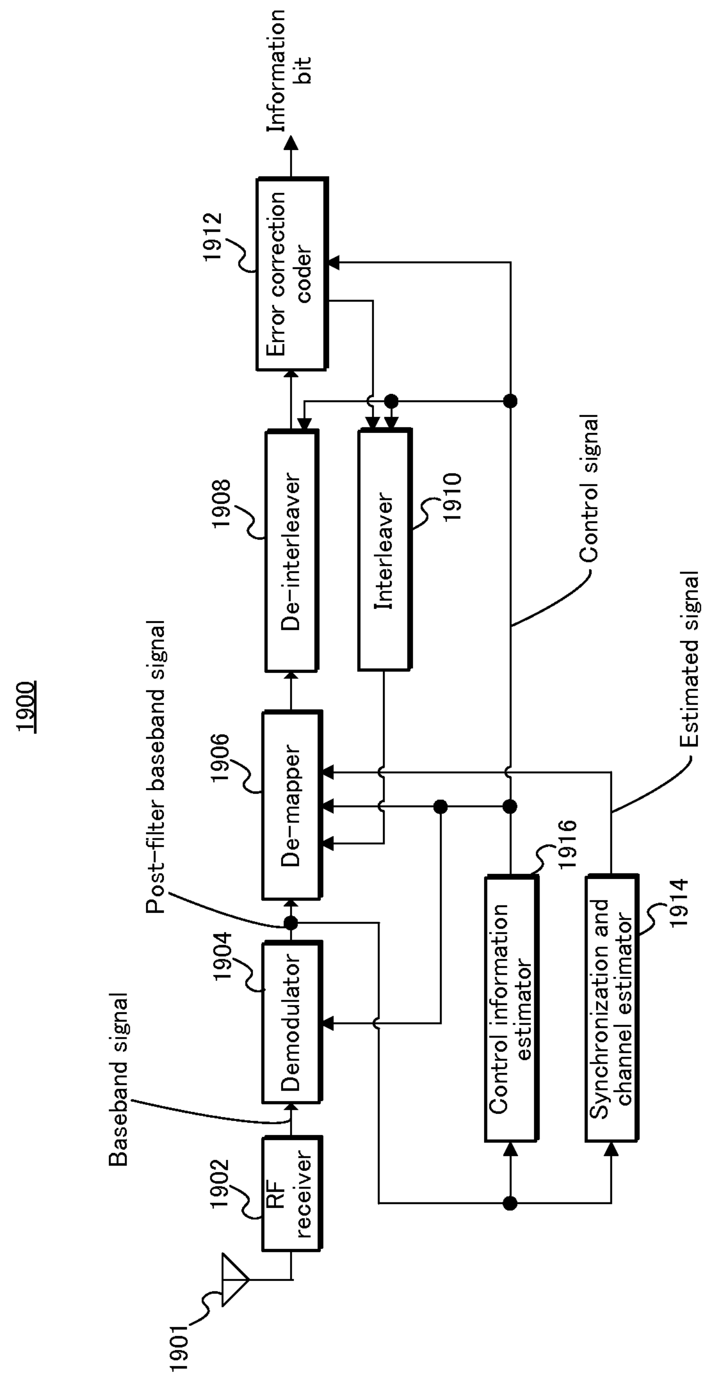
FIG. 19 illustrates a configuration of a reception device.

The following describes operation of a reception device that receives a radio signal transmitted by the transmission device 700, with reference to the diagram of a reception device in FIG. 19.

A reception device 1900 of FIG. 19 receives a radio signal transmitted by the transmission device 700 via an antenna 1901. An RF receiver 1902 performs processing such as frequency conversion and quadrature demodulation on a received radio signal, and outputs a baseband signal.

A demodulator 1904 performs processing such as root roll-off filter processing, and outputs a post-filter baseband signal.

A synchronization and channel estimator 1914 receives a post-filter baseband signal as input, performs time synchronization, frequency synchronization, and channel estimation, using, for example, a "synchronization symbol group" and "pilot symbol group" transmitted by the transmission device, and outputs an estimated signal.

A control information estimator 1916 receives a post-filter baseband signal as input, extracts symbols including control information such as a "TMCC information symbol group", performs demodulation and decoding, and outputs a control signal. Of importance in the present embodiment is that a reception device demodulates and decodes a symbol transmitting "transmission mode modulation scheme" information and a symbol transmitting "transmission mode coding rate" of "transmission mode/slot information" of a "TMCC information symbol group"; and, based on Table 1, Table 2, Table 3, and Table 4, the control information estimator 1916 generates modulation scheme (or transmission method) information and error correction code scheme (for example, coding rate of error correction code) information used by "slots composed of a data symbol group", and generates ring ratio information when a modulation scheme (or transmission method) used by "slots composed of a data symbol group" is a transmission method mixing (12,4)16APSK, (8,8)16APSK, 32APSK, (12,4)16APSK symbols and (8,8)16APSK symbols, and outputs the information as a portion of a control signal.

A de-mapper 1906 receives a post-filter baseband signal, control signal, and estimated signal as input, determines a modulation scheme (or transmission method) used by "slots composed of a data symbol group" based on the control signal (in this case, when there is a ring ratio, determination with respect to the ring ratio is also performed), calculates, based on this determination, a log-likelihood ratio (LLR) for each bit included in a data symbol from the post-filter baseband signal and estimated signal, and outputs the log-likelihood ratios. (However, instead of a soft decision value such as an LLR a hard decision value may be outputted, and a soft decision value may be outputted instead of an LLR.)

A de-interleaver 1908 receives log-likelihood ratios as input, accumulates input, performs de-interleaving (permutes data) corresponding to interleaving used by the transmission device, and outputs post-de-interleaving log-likelihood ratios.

An error correction decoder 1912 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method.

The above describes operation when iterative detection is not performed. The following is supplemental description of operation when iterative detection is performed. Note that a reception device need not implement iterative detection, and a reception device may be a reception device that performs initial detection and error detection decoding without being provided with elements related to iterative detection that are described below.

When iterative detection is performed, the error correction decoder 1912 outputs a log-likelihood ratio for each post-decoding bit. (Note that when only initial detection is performed, output of a log-likelihood ratio for each post decoding bit is not necessary.)

An interleaver 1910 interleaves log-likelihood ratios of post-decoding bits (performs permutation), and outputs post-interleaving log-likelihood ratios.

The de-mapper 1906 performs iterative detection by using post-interleaving log-likelihood ratios, a post-filter baseband signal, and an estimated signal, and outputs a log-likelihood ratio for each post-iterative detection bit.

Subsequently, interleaving and error correction code operations are performed. Thus, these operations are iteratively performed. In this way, finally the possibility of achieving a preferable decoding result is increased.

In the above description, a feature thereof is that by a reception device obtaining a symbol for transmitting a modulation scheme of a transmission mode of "transmission mode/slot information" of a "TMCC information symbol group" and a symbol for transmitting coding rate of a transmission mode of "transmission mode/slot information" of a "TMCC information symbol group"; a modulation scheme, coding rate of error detection coding, and, when a modulation scheme is 16APSK, 32APSK, or a transmission method mixing (12,4)16APSK symbols and (8,8)16APSK symbols, ring ratios, are estimated and demodulation and decoding operations become possible.

The above description describes the frame configuration in FIG. 18, but frame configurations applicable to the present disclosure are not limited in this way. When a plurality of data symbols exist, a symbol for transmitting information related to a modulation scheme used in generating the plurality of data symbols, and a symbol for transmitting information related to an error correction scheme (for example, error correction code, code length of error correction code, coding rate of error correction code, etc.) exist, any arrangement in a frame may be used with respect to the plurality of data symbols, the symbol for transmitting information related to a modulation scheme, and the symbol for transmitting information related to an error correction scheme. Further, symbols other than these symbols, for example a symbol for preamble and synchronization, pilot symbols, a reference symbol, etc., may exist in a frame.

In addition, as a method different to that described above, a symbol transmitting information related to ring ratios may exist, and the transmission device may transmit the symbol. An example of a symbol transmitting information related to ring ratios is illustrated below.

TABLE 5

Example of symbol transmitting information related to ring ratios

| Value | Assignment |
|---|---|
| 00000 | (12, 4)16APSK ring ratio 4.00 |
| 00001 | (12, 4)16APSK ring ratio 4.10 |
| 00010 | (12, 4)16APSK ring ratio 4.20 |
| 00011 | (12, 4)16APSK ring ratio 4.30 |
| 00100 | (8, 8)16APSK ring ratio 2.50 |
| 00101 | (8, 8)16APSK ring ratio 2.60 |
| 00110 | (8, 8)16APSK ring ratio 2.70 |
| 00111 | (8, 8)16APSK ring ratio 2.80 |
| 01000 | (12, 4)16APSK ring ratio 4.00, (8, 8)16APSK ring ratio 2.50 in a transmission method mixing (12, 4)16APSK symbols and (8, 8)16APSK symbols |
| 01001 | (12, 4)16APSK ring ratio 4.00, (8, 8)16APSK ring ratio 2.60 in a transmission method mixing (12, 4)16APSK symbols and (8, 8)16APSK symbols |
| 01010 | (12, 4)16APSK ring ratio 4.00, (8, 8)16APSK ring ratio 2.70 in a transmission method mixing (12, 4)16APSK symbols and (8, 8)16APSK symbols |
| 01011 | (12, 4)16APSK ring ratio 4.00, (8, 8)16APSK ring ratio 2.80 in a transmission method mixing (12, 4)16APSK symbols and (8, 8)16APSK symbols |
| 01100 | (12, 4)16APSK ring ratio 4.10, (8, 8)16APSK ring ratio 2.50 in a transmission method mixing (12, 4)16APSK symbols and (8, 8)16APSK symbols |
| 01101 | (12, 4)16APSK ring ratio 4.10, (8, 8)16APSK ring ratio 2.60 in a transmission method mixing (12, 4)16APSK symbols and (8, 8)16APSK symbols |
| 01110 | (12, 4)16APSK ring ratio 4.10, (8, 8)16APSK ring ratio 2.70 in a transmission method mixing (12, 4)16APSK symbols and (8, 8)16APSK symbols |
| 01111 | (12, 4)16APSK ring ratio 4.10, (8, 8)16APSK ring ratio 2.80 in a transmission method mixing (12, 4)16APSK symbols and (8, 8)16APSK symbols |
| . . . | . . . |
| 11111 | . . . |

According to Table 5, when [00000] is transmitted by a symbol transmitting information related to a ring ratio, a data symbol is a symbol of "(12,4)16APSK ring ratio 4.00".

Further, the following is true.

When [00001] is transmitted by a symbol transmitting information related to a ring ratio, a data symbol is a symbol of "(12,4)16APSK ring ratio 4.10".

When [00010] is transmitted by a symbol transmitting information related to a ring ratio, a data symbol is a symbol of "(12,4)16APSK ring ratio 4.20".

When [00011] is transmitted by a symbol transmitting information related to a ring ratio, a data symbol is a symbol of "(12,4)16APSK ring ratio 4.30".

When [00100] is transmitted by a symbol transmitting information related to a ring ratio, a data symbol is a symbol of "(8,8)16APSK ring ratio 2.50".

When [00101] is transmitted by a symbol transmitting information related to a ring ratio, a data symbol is a symbol of "(8,8)16APSK ring ratio 2.60".

When [00110] is transmitted by a symbol transmitting information related to a ring ratio, a data symbol is a symbol of "(8,8)16APSK ring ratio 2.70".

When [00111] is transmitted by a symbol transmitting information related to a ring ratio, a data symbol is a symbol of "(8,8)16APSK ring ratio 2.80".

When [01000] is transmitted by a symbol transmitting information related to a ring ratio, a data symbol is a symbol of "(12,4)16APSK ring ratio 4.00, (8,8)16APSK ring ratio 2.50 in a transmission method mixing (12,4)16APSK symbols and (8,8)16APSK symbols".

When [01001] is transmitted by a symbol transmitting information related to a ring ratio, a data symbol is a symbol of "(12,4)16APSK ring ratio 4.00, (8,8)16APSK ring ratio 2.60 in a transmission method mixing (12,4)16APSK symbols and (8,8)16APSK symbols".

When [01010] is transmitted by a symbol transmitting information related to a ring ratio, a data symbol is a symbol of "(12,4)16APSK ring ratio 4.00, (8,8)16APSK ring ratio 2.70 in a transmission method mixing (12,4)16APSK symbols and (8,8)16APSK symbols".

When [01011] is transmitted by a symbol transmitting information related to a ring ratio, a data symbol is a symbol of "(12,4)16APSK ring ratio 4.00, (8,8)16APSK ring ratio 2.80 in a transmission method mixing (12,4)16APSK symbols and (8,8)16APSK symbols".

When [01100] is transmitted by a symbol transmitting information related to a ring ratio, a data symbol is a symbol of "(12,4)16APSK ring ratio 4.10, (8,8)16APSK ring ratio 2.50 in a transmission method mixing (12,4)16APSK symbols and (8,8)16APSK symbols".

When [01101] is transmitted by a symbol transmitting information related to a ring ratio, a data symbol is a symbol of "(12,4)16APSK ring ratio 4.10, (8,8)16APSK ring ratio 2.60 in a transmission method mixing (12,4)16APSK symbols and (8,8)16APSK symbols".

When [01110] is transmitted by a symbol transmitting information related to a ring ratio, a data symbol is a symbol of "(12,4)16APSK ring ratio 4.10, (8,8)16APSK ring ratio 2.70 in a transmission method mixing (12,4)16APSK symbols and (8,8)16APSK symbols".

When [01111] is transmitted by a symbol transmitting information related to a ring ratio, a data symbol is a symbol of "(12,4)16APSK ring ratio 4.10, (8,8)16APSK ring ratio 2.80 in a transmission method mixing (12,4)16APSK symbols and (8,8)16APSK symbols".

Thus, by obtaining a symbol transmitting information related to a ring ratio, a reception device can estimate a ring ratio used by a data symbol, and therefore demodulation and decoding of the data symbol becomes possible.

Further, ring ratio information may be included in a symbol for transmitting a modulation scheme. An example is illustrated below.

TABLE 6

| Modulation scheme information | |
|---|---|
| Value | Assignment |
| 00000 | (12, 4)16APSK ring ratio 4.00 |
| 00001 | (12, 4)16APSK ring ratio 4.10 |
| 00010 | (12, 4)16APSK ring ratio 4.20 |
| 00011 | (12, 4)16APSK ring ratio 4.30 |
| 00100 | (8, 8)16APSK ring ratio 2.50 |
| 00101 | (8, 8)16APSK ring ratio 2.60 |
| 00110 | (8, 8)16APSK ring ratio 2.70 |
| 00111 | (8, 8)16APSK ring ratio 2.80 |
| 01000 | (12, 4)16APSK ring ratio 4.00, (8, 8)16APSK ring ratio 2.50 in a transmission method mixing (12, 4)16APSK symbols and (8, 8)16APSK symbols |
| 01001 | (12, 4)16APSK ring ratio 4.00, (8, 8)16APSK ring ratio 2.60 in a transmission method mixing (12, 4)16APSK symbols and (8, 8)16APSK symbols |
| 01010 | (12, 4)16APSK ring ratio 4.00, (8, 8)16APSK ring ratio 2.70 in a transmission method mixing (12, 4)16APSK symbols and (8, 8)16APSK symbols |
| 01011 | (12, 4)16APSK ring ratio 4.00, (8, 8)16APSK ring ratio 2.80 in a transmission method mixing (12, 4)16APSK symbols and (8, 8)16APSK symbols |
| 01100 | (12, 4)16APSK ring ratio 4.10, (8, 8)16APSK ring ratio 2.50 in a transmission method mixing (12, 4)16APSK symbols and (8, 8)16APSK symbols |
| 01101 | (12, 4)16APSK ring ratio 4.10, (8, 8)16APSK ring ratio 2.60 in a transmission method mixing (12, 4)16APSK symbols and (8, 8)16APSK symbols |
| 01110 | (12, 4)16APSK ring ratio 4.10, (8, 8)16APSK ring ratio 2.70 in a transmission method mixing (12, 4)16APSK symbols and (8, 8)16APSK symbols |
| 01111 | (12, 4)16APSK ring ratio 4.10, (8, 8)16APSK ring ratio 2.80 in a transmission method mixing (12, 4)16APSK symbols and (8, 8)16APSK symbols |
| . . . | . . . |
| 11101 | 8PSK |
| 11110 | QPSK |
| 11111 | π/2 shift BPSK |

According to Table 6, when [00000] is transmitted by a symbol transmitting modulation scheme information, a data symbol is a symbol of "(12,4)16APSK ring ratio 4.00".

Further, the following is true.

When [00001] is transmitted by a symbol transmitting modulation scheme information, a data symbol is a symbol of "(12,4)16APSK ring ratio 4.10".

When [00010] is transmitted by a symbol transmitting modulation scheme information, a data symbol is a symbol of "(12,4)16APSK ring ratio 4.20".

When [00011] is transmitted by a symbol transmitting modulation scheme information, a data symbol is a symbol of "(12,4)16APSK ring ratio 4.30".

When [00100] is transmitted by a symbol transmitting modulation scheme information, a data symbol is a symbol of "(8,8)16APSK ring ratio 2.50".

When [00101] is transmitted by a symbol transmitting modulation scheme information, a data symbol is a symbol of "(8,8)16APSK ring ratio 2.60". When [00110] is transmitted by a symbol transmitting modulation scheme information, a data symbol is a symbol of "(8,8)16APSK ring ratio 2.70".

When [00111] is transmitted by a symbol transmitting modulation scheme information, a data symbol is a symbol of "(8,8)16APSK ring ratio 2.80".

When [01000] is transmitted by a symbol transmitting modulation scheme information, a data symbol is a symbol of "(12,4)16APSK ring ratio 4.00, (8,8)16APSK ring ratio 2.50 in a transmission method mixing (12,4)16APSK symbols and (8,8)16APSK symbols".

When [01001] is transmitted by a symbol transmitting modulation scheme information, a data symbol is a symbol of "(12,4)16APSK ring ratio 4.00, (8,8)16APSK ring ratio 2.60 in a transmission method mixing (12,4)16APSK symbols and (8,8)16APSK symbols".

When [01010] is transmitted by a symbol transmitting modulation scheme information, a data symbol is a symbol of "(12,4)16APSK ring ratio 4.00, (8,8)16APSK ring ratio 2.70 in a transmission method mixing (12,4)16APSK symbols and (8,8)16APSK symbols".

When [01011] is transmitted by a symbol transmitting modulation scheme information, a data symbol is a symbol of "(12,4)16APSK ring ratio 4.00, (8,8)16APSK ring ratio 2.80 in a transmission method mixing (12,4)16APSK symbols and (8,8)16APSK symbols".

When [01100] is transmitted by a symbol transmitting modulation scheme information, a data symbol is a symbol of "(12,4)16APSK ring ratio 4.10, (8,8)16APSK ring ratio 2.50 in a transmission method mixing (12,4)16APSK symbols and (8,8)16APSK symbols".

When [01101] is transmitted by a symbol transmitting modulation scheme information, a data symbol is a symbol of "(12,4)16APSK ring ratio 4.10, (8,8)16APSK ring ratio 2.60 in a transmission method mixing (12,4)16APSK symbols and (8,8)16APSK symbols".

When [01110] is transmitted by a symbol transmitting modulation scheme information, a data symbol is a symbol of "(12,4)16APSK ring ratio 4.10, (8,8)16APSK ring ratio 2.70 in a transmission method mixing (12,4)16APSK symbols and (8,8)16APSK symbols".

When [01111] is transmitted by a symbol transmitting modulation scheme information, a data symbol is a symbol of "(12,4)16APSK ring ratio 4.10, (8,8)16APSK ring ratio 2.80 in a transmission method mixing (12,4)16APSK symbols and (8,8)16APSK symbols".

When [11101] is transmitted by a symbol transmitting modulation scheme information, a data symbol is a symbol of "8PSK".

When [11110] is transmitted by a symbol transmitting modulation scheme information, a data symbol is a symbol of "QPSK".

When [11111] is transmitted by a symbol transmitting modulation scheme information, a data symbol is a symbol of "π/2 shift BPSK".

Thus, by obtaining a symbol transmitting modulation scheme information, a reception device can estimate a modulation scheme and ring ratio used by a data symbol, and therefore demodulation and decoding of the data symbol becomes possible.

Note that in the above description, examples are described including "(12,4)16APSK ring ratio 4.10, (8,8)16APSK ring ratio 2.80 in a transmission method mixing (12,4)16APSK symbols and (8,8)16APSK symbols", "(12,4)16APSK", and "(8,8)16APSK" as selectable modulation schemes (transmission methods), but modulation schemes (transmission methods) are not limited to these examples. For example, "(12,4)16APSK ring ratio 4.10, (8,8)16APSK ring ratio 2.80 in a transmission method mixing (12,4)16APSK symbols and (8,8)16APSK symbols" may be included as a selectable modulation scheme (transmission method); "(12,4)16APSK ring ratio 4.10, (8,8)16APSK ring ratio 2.80 in a transmission method mixing (12,4)16APSK symbols and (8,8)16APSK symbols" and "(12,4)16APSK" may be included as selectable modulation schemes (transmission methods); or "(12,4)16APSK ring ratio 4.10, (8,8)16APSK ring ratio 2.80 in a transmission method mixing (12,4)16APSK symbols and (8,8)16APSK symbols" and "(8,8)16APSK" may be included as selectable modulation schemes (transmission methods). When a modulation scheme for which a ring ratio can be set is included among selectable modulation schemes, the transmission device transmits information related to the ring ratio of the modulation scheme or a control symbol that enables estimation of the ring ratio, and therefore a reception device can estimate a modulation scheme and ring ratio of a data symbol, and demodulation and decoding of the data symbol becomes possible.

Embodiment 4

In the present embodiment, an order of generation of a data symbol is described.

FIG. 18, part (a) illustrates a schematic of a frame configuration. In FIG. 18, part (a), the "#1 symbol group", the "#2 symbol group", the "#3 symbol group", . . . are lined up. Each symbol group among the "#1 symbol group", the "#2 symbol group", the "#3 symbol group", . . . is herein composed of a "synchronization symbol group", a "pilot symbol group", a "TMCC information symbol group", and "slots composed of a data symbol group" as illustrated in FIG. 18, part (a).

Here, a configuration scheme is described of data symbol groups in each "slots composed of a data symbol group" among, for example, N symbol groups including the "#1 symbol group", the "#2 symbol group", the "#3 symbol group", . . . , an "# N−1 symbol group", and an "# N symbol group".

A rule is provided with respect to generation of data symbol groups in each "slots composed of a data symbol group" among N symbol groups from a "#(β×N+1) symbol group" to a "#(β×N+N) symbol group". The rule is described with reference to FIG. 20.

Figure 20:
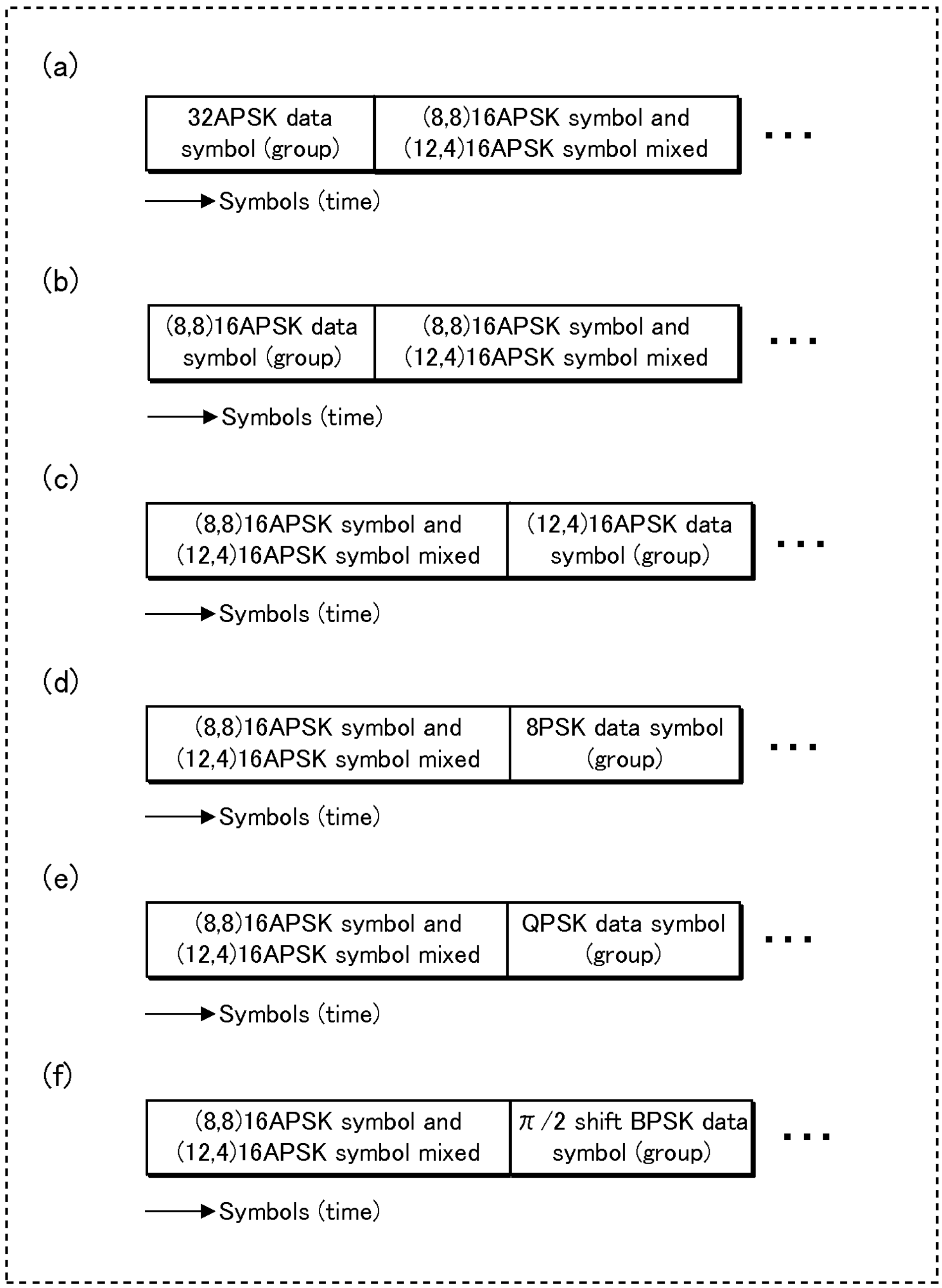
FIG. 20 illustrates examples of arrangement of modulation schemes.

In FIG. 20, "(8,8)16APSK symbol and (12,4)16APSK symbol mixed" is written, but "(8,8)16APSK symbol and (12,4)16APSK symbol mixed" means that the symbol group is generated, as described in embodiment 1, by a transmission method selected from:

"In a symbol group of at least three consecutive symbols (or at least four consecutive symbols), among which a modulation scheme for each symbol is (12,4)16APSK or (8,8)16APSK, there are no consecutive (12,4)16APSK symbols and there are no consecutive (8,8)16APSK symbols"; and When each data symbol is either a (12,4)16APSK symbol or an (8,8)16APSK symbol, three or more consecutive (8,8)16APSK symbols are not present in a consecutive data symbol group, as in the examples of FIG. 23.

Thus, "(8,8)16APSK symbol and (12,4)16APSK symbol mixed" satisfies the features of FIG. 20, part (a) to part (f). Note that in FIG. 20, the horizontal axis is symbols.

FIG. 20, Part (a):

When a 32APSK data symbol exists and an (8,8)16APSK data symbol does not exist, a "(8,8)16APSK symbol and (12,4)16APSK symbol mixed" symbol exists after a "32APSK data symbol", as illustrated in FIG. 20, part (a).

FIG. 20, Part (b):

When an (8,8)16APSK data symbol exists, a "(8,8)16APSK symbol and (12,4)16APSK symbol mixed" symbol exists after an "(8,8)16APSK data symbol", as illustrated in FIG. 20, part (b).

FIG. 20, Part (c):

When a (12,4)16APSK data symbol exists, a "(12,4)16APSK data symbol" exists after a "(8,8)16APSK symbol and (12,4)16APSK symbol mixed" symbol, as illustrated in FIG. 20, part (c).

FIG. 20, Part (d):

When an 8PSK data symbol exists and a (12,4)16APSK data symbol does not exist, an "8PSK data symbol" exists after a "(8,8)16APSK symbol and (12,4)16APSK symbol mixed" symbol, as illustrated in FIG. 20, part (d).

FIG. 20, Part (e):

When a QPSK data symbol exists, an 8PSK data symbol does not exist, and a (12,4)16APSK data symbol does not exist, a "QPSK data symbol" exists after a "(8,8)16APSK symbol and (12,4)16APSK symbol mixed" symbol, as illustrated in FIG. 20, part (e).

FIG. 20, Part (f):

When a π/2 shift BPSK data symbol exists, a QPSK data symbol does not exist, an 8PSK data symbol does not exist, and a (12,4)16APSK data symbol does not exist, a "π/2 shift BPSK data symbol" exists after a "(8,8)16APSK symbol and (12,4)16APSK symbol mixed" symbol, as illustrated in FIG. 20, part (f).

When symbols are arranged as described above, there is an advantage that a reception device can easily perform automatic gain control (AGC) because a signal sequence is arranged in order of modulation schemes (transmission methods) of high peak power.

Figure 21:
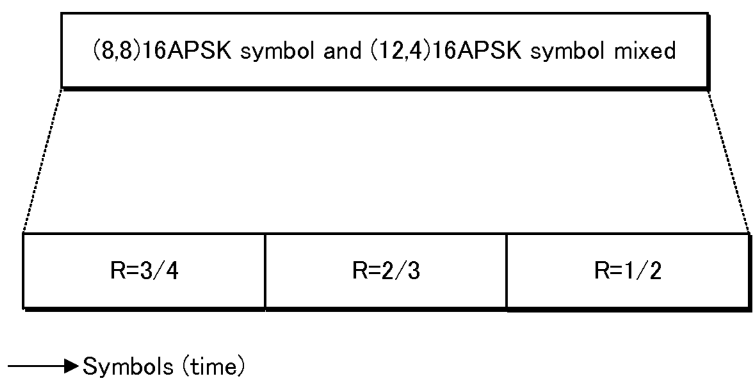
FIG. 21 illustrates an example of arrangement of modulation schemes.

FIG. 21 illustrates a method of configuring a "(8,8)16APSK symbol and (12,4)16APSK symbol mixed" symbol, as described above.

Assume that a "(8,8)16APSK symbol and (12,4)16APSK symbol mixed" symbol of a coding rate X of error correction code and a "(8,8)16APSK symbol and (12,4)16APSK symbol mixed" symbol of a coding rate Y of error correction code exist. Also assume that a relationship X>Y is satisfied.

When the above is true, a "(8,8)16APSK symbol and (12,4)16APSK symbol mixed" symbol of a coding rate Y of error correction code is arranged after a "(8,8)16APSK symbol and (12,4)16APSK symbol mixed" symbol of a coding rate X of error correction code.

As in FIG. 21, assume that a "(8,8)16APSK symbol and (12,4)16APSK symbol mixed" symbol of a coding rate 1/2 of error correction code, a "(8,8)16APSK symbol and (12,4)16APSK symbol mixed" symbol of a coding rate 2/3 of error correction code, and a "(8,8)16APSK symbol and (12,4)16APSK symbol mixed" symbol of a coding rate 3/4 of error correction code exist. Thus, from the above description, as illustrated in FIG. 21, symbols are arranged in the order of a "(8,8)16APSK symbol and (12,4)16APSK symbol mixed" symbol of a coding rate 3/4 of error correction code, a "(8,8)16APSK symbol and (12,4)16APSK symbol mixed" symbol of a coding rate 2/3 of error correction code, and a "(8,8)16APSK symbol and (12,4)16APSK symbol mixed" symbol of a coding rate 1/2 of error correction code.

Embodiment 5

According to embodiment 1 to embodiment 4, methods of switching (12,4)16APSK symbols and (8,8)16APSK symbols in a transmit frame, methods of configuring pilot symbols, methods of configuring control information including TMCC, etc., have been described.

Methods achieving a similar effect to embodiment 1 to embodiment 4 are not limited to methods using (12,4)16APSK symbols and (8,8)16APSK symbols in a transmit frame, and a method using (12,4)16APSK symbols and non-uniform (NU)-16QAM symbols can also achieve a similar effect to embodiment 1 to embodiment 4. In other words, NU-16QAM symbols may be used instead of (8,8)16APSK symbols in embodiment 1 to embodiment 4 (the modulation scheme used in combination is (12,4)16APSK).

Accordingly, the present embodiment primarily describes using NU-16QAM symbols instead of (8,8)16APSK symbols.

<Constellation>

The following describes constellation and assignment of bits to each constellation point (labelling) of NU-16QAM performed by the mapper 708 of FIG. 7.

Figure 26:
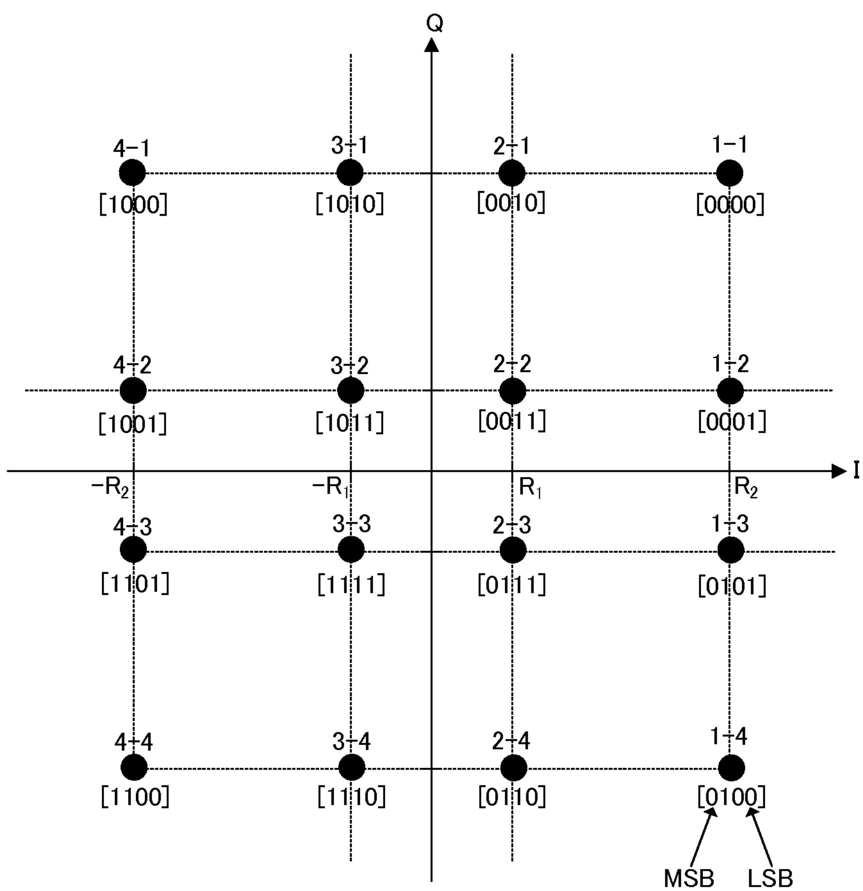
FIG. 26 illustrates an example of constellation and labelling of NU-16QAM.

FIG. 26 illustrates an example of labelling a constellation of NU-16QAM in an in-phase (I)-quadrature-phase (Q) plane. In embodiment 1 to embodiment 4, description is provided using ring ratios, but here an "amplitude ratio" is defined instead of a ring ratio. When $R_1$ and $R_2$ are defined as in FIG. 26 (here, $R_1$ is a real number greater than zero and $R_2$ is a real number greater than zero, and $R_1<R_2$), an amplitude ratio $A_r=R_2/R_1$.

Thus, an amplitude ratio of NU-16QAM is applicable instead of a ring ratio of (8,8)16APSK in embodiment 1 to embodiment 4.

Coordinates of each constellation point of NU-16QAM on the I-Q plane are as follows.

Constellation point 1-1[0000] . . . $(R_2,R_2)$
Constellation point 1-2[0001] . . . $(R_2,R_1)$
Constellation point 1-3[0101] . . . $(R_2,R_1)$
Constellation point 1-4[0100] . . . $(R_2,R_2)$
Constellation point 2-1[0010] . . . $(R_1,R_2)$
Constellation point 2-2[0011] . . . $(R_1,R_1)$
Constellation point 2-3[0111] . . . $(R_1,R_1)$
Constellation point 2-4[0110] . . . $(R_1,R_2)$
Constellation point 3-1[1010] . . . $(R_1,R_2)$
Constellation point 3-2[1011] . . . $(R_1,R_1)$
Constellation point 3-3[1111] . . . $(R_1,R_1)$
Constellation point 3-4[1110] . . . $(R_1,R_2)$
Constellation point 4-1[1000] . . . $(R_2,R_2)$
Constellation point 4-2[1001] . . . $(R_2,R_1)$
Constellation point 4-3[1101] . . . $(R_2,R_1)$
Constellation point 4-4[1100] . . . $(R_2,R_2)$ Further, for example, the following relationship is disclosed above:

Constellation point 1-1[0000] . . . $(R_2,R_2)$

In data that is inputted to the mapper 708, this means that when four bits $[b_3b_2b_1b_0]=[0000]$, an in-phase component I and quadrature component Q of a baseband signal after mapping are defined as $(I,Q)=(R_2,R_2)$. As another example, the following relationship is disclosed above:

Constellation point 4-4[1100] . . . $(R_2,R_2)$

In data that is inputted to the mapper 708, this means that when four bits $[b_3b_2b_1b_0]=[1100]$, an in-phase component I and quadrature component Q of a baseband signal after mapping are defined as $(I,Q)=(R_2,R_2)$.

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

<Transmission Output>

In order to achieve the same transmission output for (12,4)16APSK symbols and NU-16QAM symbols, the following normalization coefficient may be used. The normalization coefficient for (12,4)16APSK symbols is as described in embodiment 1. A normalization coefficient for NU-16QAM symbols is defined by the following formula.

[Math 25]

$$a_{NU-16QAM} = \frac{z}{\sqrt{(4\times2\times R_1^2 + 4\times2\times R_2^2 + 8\times(R_1^2+R_2^2))/16}} \quad \text{(Math 25)}$$

Prior to normalization, the in-phase component of a baseband signal is $I_b$ and the quadrature component of the baseband signal is $Q_b$. After normalization, the in-phase component of the baseband signal is $I_n$ and the quadrature component of the baseband signal is $Q_n$. Thus, when a modulation scheme is NU-16QAM, $(I_n, Q_n)=(a_{NU-16QAM}\times I_b, a_{NU-16QAM}\times Q_b)$ holds true.

When a modulation scheme is NU-16QAM, the in-phase component $I_b$ and quadrature component $Q_b$ are the in-phase component I and quadrature component Q, respectively, of a baseband signal after mapping that is obtained by mapping based on FIG. 26. Accordingly, when a modulation scheme is NU-16QAM, the following relationships hold true.

Constellation point 1-1[0000] . . . $(I_n, Q_n)=(a_{NU-16QAM}\times R_2, a_{NU-16QAM}\times R_2)$ Constellation point 1-2[0001] . . . $(I_n, Q_n)=(a_{NU-16QAM}\times R_2, a_{NU-16QAM}\times R_1)$ Constellation point 1-3[0101] . . . $(I_n, Q_n)=(a_{NU-16QAM}\times R_2, -a_{NU-16QAM}\times R_1)$ Constellation point 1-4[0100] . . . $(I_n, Q_n)=(a_{NU-16QAM}\times R_2, -a_{NU-16QAM}\times R_2)$ Constellation point 2-1[0010] . . . $(I_n, Q_n)=(a_{NU-16QAM}\times R_1, a_{NU-16QAM}\times R_2)$ Constellation point 2-2[0011] . . . $(I_n, Q_n)=(a_{NU-16QAM}\times R_1, a_{NU-16QAM}\times R_1)$ Constellation point 2-3[0111] . . . $(I_n, Q_n)=(a_{NU-16QAM}\times R_1, -a_{NU-16QAM}\times R_1)$ Constellation point 2-4[0110] . . . $(I_n, Q_n)=(a_{NU-16QAM}\times R_1, -a_{NU-16QAM}\times R_2)$ Constellation point 3-1[1010] . . . $(I_n, Q_n)=(-a_{NU-16QAM}\times R_1, a_{NU-16QAM}\times R_2)$ Constellation point 3-2[1011] . . . $(I_n, Q_n)=(-a_{NU-16QAM}\times R_1, a_{NU-16QAM}\times R_1)$ Constellation point 3-3[1111] . . . $(I_n, Q_n)=(-a_{NU-16QAM}\times R_1, -a_{NU-16QAM}\times R_1)$ Constellation point 3-4[1110] . . . $(I_n, Q_n)=(-a_{NU-16QAM}\times R_1, -a_{NU-16QAM}\times R_2)$ Constellation point 4-1[1000] . . . $(I_n, Q_n)=(-a_{NU-16QAM}\times R_2, a_{NU-16QAM}\times R_2)$ Constellation point 4-2[1001] . . . $(I_n, Q_n)=(-a_{NU-16QAM}\times R_2, a_{NU-16QAM}\times R_1)$ Constellation point 4-3[1101] . . . $(I_n, Q_n)=(-a_{NU-16QAM}\times R_2, -a_{NU-16QAM}\times R_1)$ Constellation point 4-4[1100] . . . $(I_n, Q_n)=(-a_{NU-16QAM}\times R_2, -a_{NU-16QAM}\times R_2)$ Further, for example, the following relationship is disclosed above:

Constellation point 1-1[0000] . . . $(I_n, Q_n)=(a_{NU-16QAM}\times R_2, a_{NU-16QAM}\times R_2)$ In data that is inputted to the mapper 708, this means that when four bits $[b_3b_2b_1b_0]=[0000]$, $(I_n, Q_n)=(a_{NU-16QAM}\times R_2, a_{NU-16QAM}\times R_2)$. As another example, the following relationship is disclosed above:

Constellation point 4-4[1100] . . . $(I_n, Q_n)=(-a_{NU-16QAM}\times R_2, -a_{NU-16QAM}\times R_2)$ In data that is inputted to the mapper 708, this means that when four bits $[b_3b_2b_1b_0]=[1100]$, $(I_n, Q_n)=(-a_{NU-16QAM}\times R_2, -a_{NU-16QAM}\times R_2)$ This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

Thus, the mapper 708 outputs $I_n$ and $Q_n$ as described above as an in-phase component and a quadrature component, respectively, of a baseband signal.

According to $R_1$ and $R_2$ used in representing the constellation points in the I-Q plane of (12,4)16APSK, a ring ratio $R_{(12,4)}$ of (12,4)16APSK represents $R_{(12,4)}=R_2/R_1$ When $R_1$ and $R_2$ are defined as in FIG. 26, an amplitude ratio of NU-16QAM is defined as $A_r=R_2/R_1$.

Thus, an effect is obtained that "when $A_r<R_{(12,4)}$, the probability of further lowering PAPR is high".

This is because a modulation scheme likely to control peak power is NU-16QAM. Peak power generated by NU-16QAM is likely to increase as $A_r$ increases. Accordingly, in order to avoid increasing peak power, setting $A_r$ low is preferable. On the other hand, there is a high degree of freedom for $R_{(12,4)}$ of (12,4)16APSK as long as a value is set for which BER properties are good. Thus, it is likely that when $A_r<R_{(12,4)}$ a lower PAPR can be obtained.

However, even when $A_r>R_{(12,4)}$, an effect of lowering PAPR of NU-16QAM can be obtained. Accordingly, when focusing on improving BER properties, $A_r>R_{(12,4)}$ may be preferable.

<Labelling and Constellations of NU-16QAM>

[NU-16QAM Labelling]

Here, labelling of NU-16QAM is described. Labelling is the relationship between four bits $[b_3b_2b_1b_0]$, which are input, and arrangement of constellation points in an in-phase (I)-quadrature-phase (Q) plane. FIG. 26 illustrates an example of NU-16QAM labelling, but as long as labelling satisfies <Condition 5> and <Condition 6>, below, labelling need not conform to FIG. 26.

For the purposes of description, the following definitions are used.

When four bits to be transmitted are $[b_{a3}b_{a2}b_{a1}b_{a0}]$, a constellation point A is provided in the in-phase (I)-quadrature-phase (Q) plane, and when four bits to be transmitted are $[b_{b3}b_{b2}b_{b1}b_{b0}]$, a constellation point B is provided in the in-phase (I)-quadrature-phase (Q) plane.

When $b_{a3}=b_{b3}$, $b_{a2}=b_{b2}$, $b_{a1}=b_{b1}$, and $b_{a0}=b_{b0}$, the number of different bits of labelling is defined as zero.

Further, the following definitions are made.

When $b_{a3}\neq b_{b3}$, $b_{a2}=b_{b2}$, $b_{a1}=b_{b1}$, and $b_{a0}=b_{b0}$, the number of different bits of labelling is defined as one.

When $b_{a3}=b_{b3}$, $b_{a2}\neq b_{b2}$, $b_{a1}=b_{b1}$, and $b_{a0}=b_{b0}$, the number of different bits of labelling is defined as one.

When $b_{a3}=b_{b3}$, $b_{a2}=b_{b2}$, $b_{a1}\neq b_{b1}$, and $b_{a0}=b_{b0}$, the number of different bits of labelling is defined as one.

When $b_{a3}=b_{b3}$, $b_{a2}=b_{b2}$, $b_{a1}=b_{b1}$, and $b_{a0}\neq b_{b0}$, the number of different bits of labelling is defined as one.

When $b_{a3}\neq b_{b3}$, $b_{a2}\neq b_{b2}$, $b_{a1}=b_{b1}$, and $b_{a0}=b_{b0}$, the number of different bits of labelling is defined as two.

When $b_{a3}\neq b_{b3}$, $b_{a2}=b_{b2}$, $b_{a1}\neq b_{b1}$, and $b_{a0}=b_{b0}$, the number of different bits of labelling is defined as two.

When $b_{a3}\neq b_{b3}$, $b_{a2}=b_{b2}$, $b_{a1}=b_{b1}$, and $b_{a0}\neq b_{b0}$, the number of different bits of labelling is defined as two.

When $b_{a3}=b_{b3}$, $b_{a2}\neq b_{b2}$, $b_{a1}\neq b_{b1}$, and $b_{a0}=b_{b0}$, the number of different bits of labelling is defined as two.

When $b_{a3}=b_{b3}$, $b_{a2}\neq b_{b2}$, $b_{a1}=b_{b1}$, and $b_{a0}\neq b_{b0}$, the number of different bits of labelling is defined as two.

When $b_{a3}=b_{b3}$, $b_{a2}=b_{b2}$, $b_{a1}\neq b_{b1}$, and $b_{a0}\neq b_{b0}$, the number of different bits of labelling is defined as two.

When $b_{a3}=b_{b3}$, $b_{a2}\neq b_{b2}$, $b_{a1}\neq b_{b1}$, and $b_{a0}\neq b_{b0}$, the number of different bits of labelling is defined as three.

When $b_{a3}\neq b_{b3}$, $b_{a2}=b_{b2}$, $b_{a1}\neq b_{b1}$, and $b_{a0}\neq b_{b0}$, the number of different bits of labelling is defined as three.

When $b_{a3}\neq b_{b3}$, $b_{a2}\neq b_{b2}$, $b_{a1}=b_{b1}$, and $b_{a0}\neq b_{b0}$, the number of different bits of labelling is defined as three.

When $b_{a3}\neq b_{b3}$, $b_{a2}\neq b_{b2}$, $b_{a1}\neq b_{b1}$, and $b_{a0}=b_{b0}$, the number of different bits of labelling is defined as three.

When $b_{a3}\neq b_{b3}$, $b_{a2}\neq b_{b2}$, $b_{a1}\neq b_{b1}$, and $b_{a0}\neq b_{b0}$, the number of different bits of labelling is defined as four.

Thus, group definitions are performed. With respect to constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4 in the above description of NU-16QAM, constellation point 1-1, constellation point 1-2, constellation point 1-3, and constellation point 1-4 are defined as group 1. In the same way, constellation point 2-1, constellation point 2-2, constellation point 2-3, and constellation point 2-4 are defined as group 2; constellation point 3-1, constellation point 3-2, constellation point 3-3, and constellation point 3-4 are defined as group 3; and constellation point 4-1, constellation point 4-2, constellation point 4-3, and constellation point 4-4 are defined as group 4.

The following two conditions are provided.

<Condition 5>

X represents 1, 2, 3, and 4. All values of X satisfy the following:

The number of different bits of labelling between constellation point X-1 and constellation point X-2 is one.

The number of different bits of labelling between constellation point X-2 and constellation point X-3 is one.

The number of different bits of labelling between constellation point X-3 and constellation point X-4 is one.

<Condition 6>

A value u represents 1, 2, and 3, and a value v represents 1, 2, 3, and 4. All values of u and all values of v satisfy the following:

The number of different bits of labelling between constellation point u−v and constellation point (u+1)−v is one.

By satisfying the above conditions, the number of different bits of labelling among constellation points that are near each other in an in-phase (I)-quadrature-phase (Q) plane is low, and therefore the possibility of a reception device achieving high data reception quality is increased. Thus, when a reception device performs iterative detection, the possibility of the reception device achieving high data reception quality is increased.

When forming a symbol by NU-16QAM, as above, and (12,4)16APSK, and when implemented similarly to embodiment 1, any of the following transmission methods may be considered.

In a symbol group of at least three consecutive symbols (or at least four consecutive symbols), among which a modulation scheme for each symbol is (12,4)16APSK or NU-16QAM, there are no consecutive (12,4)16APSK symbols and there are no consecutive NU-16QAM symbols.

In a "symbol group of period (cycle) M", the number of NU-16QAM symbols is one greater than the number of (12,4)16APSK symbols, in other words the number of (12,4)16APSK symbols is N and the number of NU-16QAM symbols is N+1. Note that N is a natural number. Thus, in a "symbol group of period (cycle) M", there are no consecutive NU-16QAM symbols or there is only one position at which two consecutive NU-16QAM symbols exist. Accordingly, there are no cases of three or more consecutive NU-16QAM symbols.

When each data symbol is either a (12,4)16APSK symbol or an NU-16QAM symbol, three or more consecutive NU-16QAM symbols are not present in a consecutive data symbol group.

Thus, by replacing description related to (8,8)16APSK symbols with NU-16QAM for portions of embodiment 1 to embodiment 4 in which (12,4)16APSK symbols and (8,8) 16APSK symbols are described (for example, transmission method, pilot symbol configuration method, reception device configuration, control information configuration including TMCC, etc.), a transmission method using (12,4) 16APSK symbols and NU-16QAM can be implemented in the same way as described in embodiment 1 to embodiment 4.

Embodiment 6

In the present embodiment, an example is described of application to wide band digital satellite broadcasting of the transmission method, the transmission device, the reception method, and the reception device described in embodiment 1 to embodiment 5.

Figure 27:
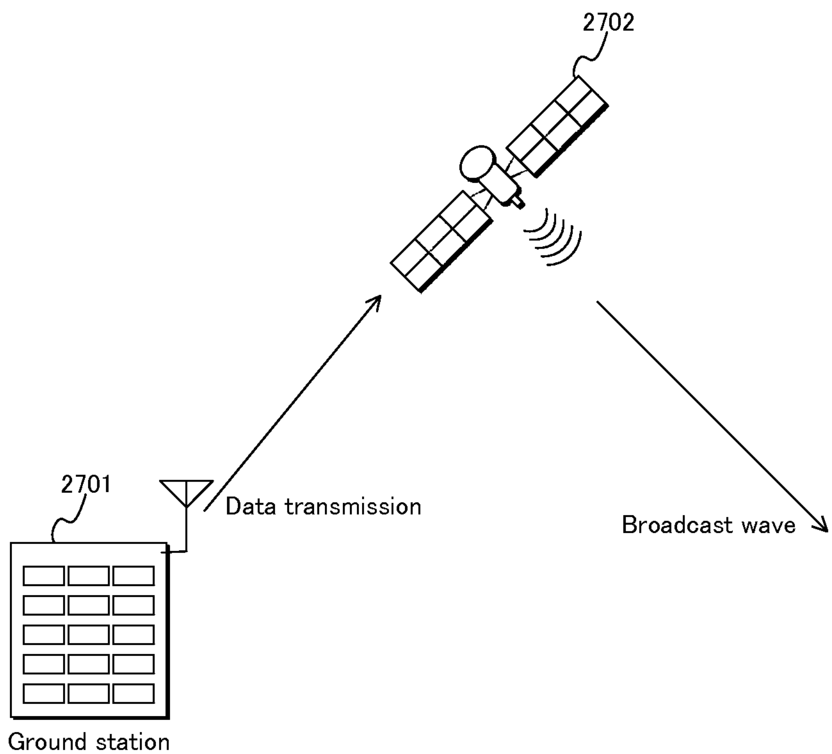
FIG. 27 illustrates a schematic of wide band digital satellite broadcasting.

FIG. 27 illustrates a schematic of wide band digital satellite broadcasting. A satellite 2702 in FIG. 27 transmits a transmit signal by using the transmission method described in embodiment 1 to embodiment 5. This transmit signal is received by a terrestrial reception device.

On the other hand, data for transmission by the satellite 2702 via a modulated signal is transmitted by a ground station 2701 in FIG. 27. Accordingly, the ground station 2701 transmits a modulation signal including data for transmission by a satellite. Thus, the satellite 2702 receives a modulated signal transmitted by the ground station 2701, and transmits data included in the modulated signal by using a transmission method described in embodiment 1 to embodiment 5.

Embodiment 7

In the present embodiment, description is provided of various information configuration examples signaled as TMCC information for smooth reception at a reception device side performed by a transmission device using a transmission method described in embodiment 1, embodiment 2, embodiment 5, etc.

In order to reduce distortion generated by a power amplifier included in the radio section 712 of the transmission device in FIG. 7, there is a method of compensating for the distortion of the power amplifier or acquiring backoff information (difference value between operating point output of a modulated signal and saturation point output of a non-modulated signal).

In wide band digital satellite broadcasting, in relation to distortion of a power amplifier, "satellite output backoff" information is transmitted in TMCC information by a transmission device.

In the present embodiment, a method of transmitting accurate information related to distortion of a power amplifier and a configuration of TMCC information are described. By transmission of the information described below, a reception device can receive a modulated signal having little distortion, and therefore an effect can be achieved of improving data reception quality.

Transmission of “whether power amplifier performed distortion compensation” information and “index indicating degree of effect of distortion compensation of power amplifier” information as TMCC information is disclosed herein.

TABLE 7

| Information related to distortion compensation of power amplifier | |
|---|---|
| Value | Assignment |
| 0 | Distortion compensation of power amplifier OFF |
| 1 | Distortion compensation of power amplifier ON |

Table 7 indicates a specific example of configuration of information related to distortion compensation of a power amplifier. As illustrated in FIG. 7, a transmission device transmits “0”, when distortion compensation of a power amplifier is OFF, or “1”, when distortion compensation of a power amplifier is ON, as, for example, a portion of TMCC information (a portion of control information).

TABLE 8

| Information related to index indicating degree of effect of distortion compensation of power amplifier | |
|---|---|
| Value | Assignment |
| 00 | Between code (intersymbol) interference: High |
| 01 | Between code (intersymbol) interference: Medium |
| 10 | Between code (intersymbol) interference: Low |
| 11 | — |

Table 8 indicates a specific example of configuration of information related to an index indicating degrees of effect of distortion compensation of a power amplifier. When between code (intersymbol) interference is high, the transmission device transmits “00”. When between code (intersymbol) interference is of a medium degree, the transmission device transmits “01”. When between code (intersymbol) interference is low, the transmission device transmits “10”.

In Table 2, Table 3, and Table 4 of embodiment 3, configurations are illustrated according to which a ring ratio is determined when a coding rate of error correction code is determined.

In the present embodiment, a different method is disclosed wherein a ring ratio is determined based on information related to distortion compensation of a power amplifier and/or information related to an index indicating a degree of effect of distortion compensation of a power amplifier and/or “satellite output backoff” information; and even when a coding rate of error correction code is set as A (even when a value is set), a transmission device selects a ring ratio from among a plurality of candidates. As TMCC information, the transmission device can notify a reception device of modulation scheme information and ring ratio information by using the “modulation scheme information” of Table 1 and/or the “information related to ring ratio” of Table 5 and/or the “modulation scheme information” of Table 6.

Figure 28:
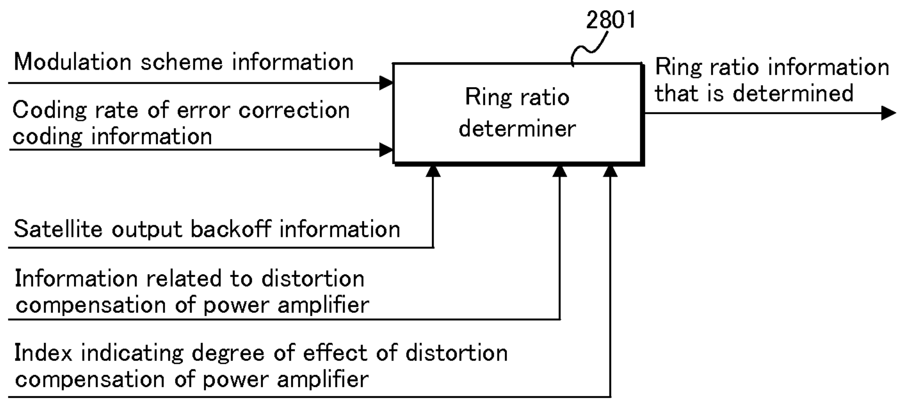
FIG. 28 illustrates a block diagram related to ring ratio determination.

FIG. 28 illustrates a block diagram related to ring ratio determination in connection with the above description. A ring ratio determiner 2801 of FIG. 28 receives “modulation scheme information”, “coding rate of error correction code information”, “satellite output backoff information”, “information related to distortion compensation of power amplifier (ON/OFF information)”, and an “index indicating degree of effect of distortion compensation of power amplifier” as input, uses all of this information or a portion of this information, determines a ring ratio when a modulation scheme (or transmission method) requires a ring ratio setting (for example, a transmission method using (8,8)16APSK, (12,4)16APSK, or a combination of (8,8)16APSK and (12,4)16APSK), and outputs ring ratio information that is determined. Subsequently, based on this ring ratio information, a mapper of the transmission device performs mapping, and this ring ratio information is, for example, transmitted by the transmission device to a reception device as control information as in Table 5 and Table 6.

Note that a characteristic point of this embodiment is that when a modulation scheme A and coding rate B are selected, ring ratio can be set from a plurality of candidates.

For example, when a modulation scheme is (12,4)16APSK and a coding rate of error correction code is 61/129 (approximately ½), three types of ring ratio, C, D, and E, are candidates as a ring ratio. Thus, which value of ring ratio to use can be determined according to backoff status and information related to distortion compensation of a power amplifier (ON/OFF information). For example, when distortion compensation of a power amplifier is ON, a ring ratio may be selected that improves data reception quality of a reception device, and when distortion compensation of a power amplifier is OFF and backoff is low, a ring ratio may be selected that decreases PAPR. (Ring ratio may be selected in similar ways for other coding rates, etc.) Note that this selection method can be applied in the same way when a modulation scheme is (8,8)16APSK, and when a transmission method is a transmission method combining (8,8)16APSK and (12,4)16APSK as described in embodiment 1.

According to the operations above, an effect is achieved of improving data reception quality of a reception device and reducing load of a transmit power amplifier.

Embodiment 8

In embodiment 7 a case is described in which NU-16QAM symbols are used instead of (8,8)16APSK symbols in embodiment 1 to embodiment 4. In the present embodiment, (4,8,4)16APSK is disclosed as an extension of NU-16QAM (NU-16QAM is one example of (4.8.4)16APSK). In the present embodiment, a case is described in which (4,8,4)16APSK symbols are used instead of (8,8)16APSK symbols in embodiment 1 to embodiment 4.

According to embodiment 1 to embodiment 4, methods of switching (12,4)16APSK symbols and (8,8)16APSK symbols in a transmit frame, methods of configuring pilot symbols, methods of configuring control information including TMCC, etc., have been described.

Methods achieving a similar effect to embodiment 1 to embodiment 4 are not limited to methods using (12,4)16APSK symbols and (8,8)16APSK symbols in a transmit frame, and a method using (12,4)16APSK symbols and (4,8,4)16APSK symbols can also achieve a similar effect to embodiment 1 to embodiment 4. In other words, (4,8,4)16APSK symbols may be used instead of (8,8)16APSK symbols in embodiment 1 to embodiment 4 (the modulation scheme used in combination is (12,4)16APSK).

Accordingly, the present embodiment primarily describes using (4,8,4)16APSK symbols instead of (8,8)16APSK symbols.

<Constellation>

Figure 30:
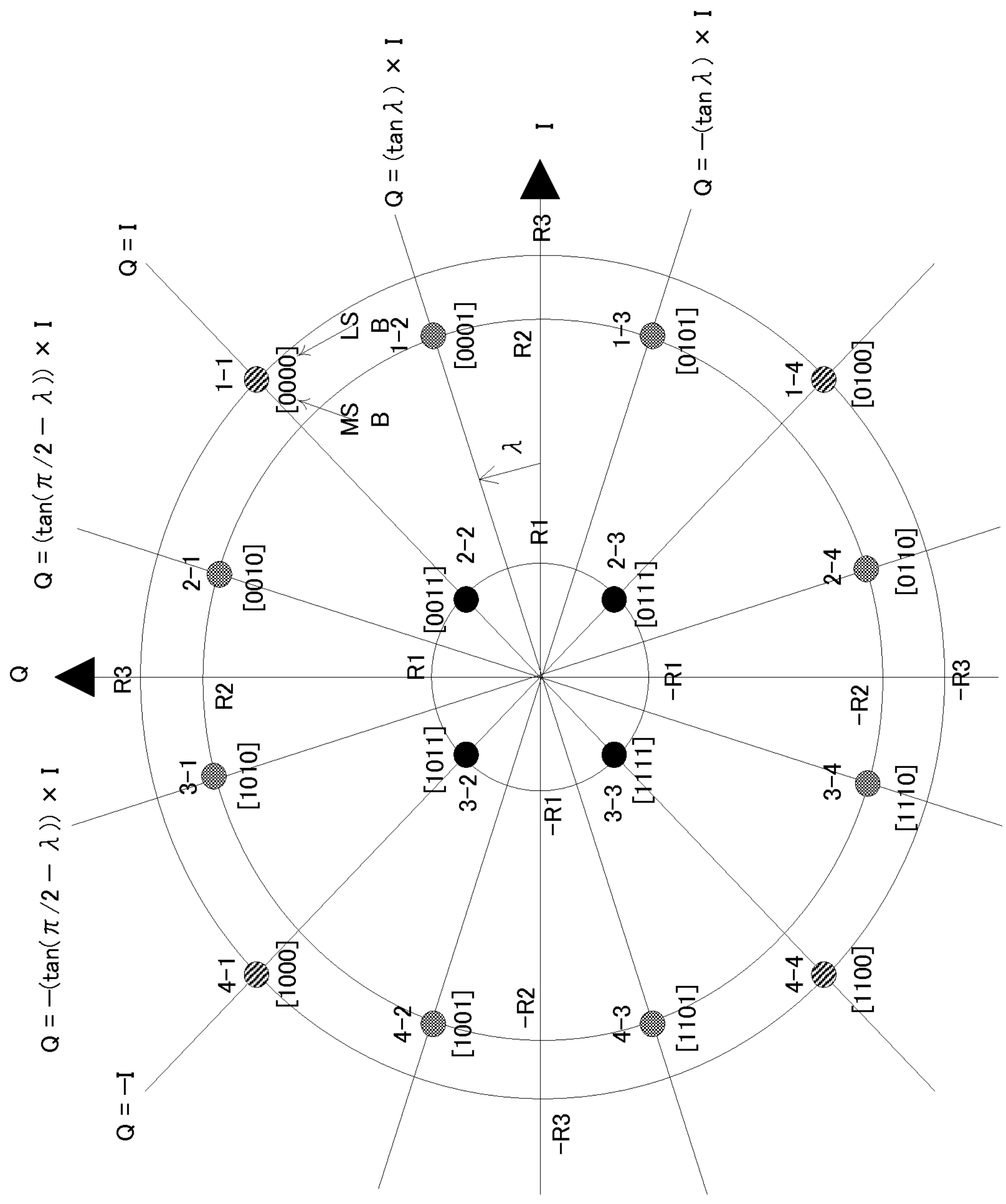
FIG. 30 illustrates an example of constellation points of (4,8,4)16APSK.

As illustrated in FIG. 30, constellation points of (4,8,4)16APSK mapping are arranged on three concentric circles having different radii (amplitude components) in an in-phase (I)-quadrature-phase (Q) plane. In the present description, among these concentric circles, a circle having the largest radius $R_3$ is called an “outer circle”, a circle having an intermediate radius $R_2$ is called a “mid circle”, and a circle having the smallest radius $R_1$ is called an “inner circle”. When $R_1$, $R_2$, and $R_3$ are defined as in FIG. 30 ($R_1$ being a real number greater than zero, $R_2$ being a real number greater than zero, and $R_3$ being a real number greater than zero, $R_1<R_2<R_3$).

Further, four constellation points are arranged on the circumference of the outer circle, eight constellation points are arranged on the circumference of the mid circle, and four constellation points are arranged on the circumference of the inner circle. The (4,8,4) in (4,8,4)16APSK refers to the four, eight, four constellation points in the order of the outer circle, the mid circle, and the inner circle.

The following describes a constellation and assignment (labelling) of bits to each constellation point of (4,8,4) 16APSK performed by the mapper 708 of FIG. 7.

FIG. 30 illustrates an example of labelling a constellation of (4,8,4)16APSK in an in-phase (I)-quadrature-phase (Q) plane. In embodiment 1 to embodiment 4, ring ratio is described, but in the case of (4,8,4)16APSK, two ring ratios are defined. A first ring ratio is $r_1=R_2/R_1$, and another ring ratio is $r_2=R_3/R_1$. Thus, two ring ratios of (4,8,4)16APSK, $r_1=R_2/R_1$ and $r_2=R_3/R_1$, are applicable instead of the ring ratio of (8,8)16APSK in embodiment 1 to embodiment 4.

Coordinates of each constellation point of (4,8,4)16APSK on the I-Q plane are as follows.

Constellation point 1-1[0000] . . . ($R_3\cos(\pi/4)$,$R_3\sin(\pi/4)$)

Constellation point 1-2[0001] . . . ($R_2\cos\lambda$,$R_2\sin\lambda$)

Constellation point 1-3[0101] . . . ($R_2\cos(-\lambda)$,$R_2\sin(-\lambda)$)

Constellation point 1-4[0100] . . . ($R_3\cos(-\pi/4)$,$R_3\sin(-\pi/4)$)

Constellation point 2-1[0010] . . . ($R_2\cos(-\lambda+\pi/2)$,$R_2\sin(-\lambda+\pi/2)$)

Constellation point 2-2[0011] . . . ($R_1\cos(\pi/4)$,$R_1\sin(\pi/4)$)

Constellation point 2-3[0111] . . . ($R_1\cos(-\pi/4)$,$R_1\sin(-\pi/4)$)

Constellation point 2-4[0110] . . . ($R_2\cos(\lambda-\pi/2)$,$R_2\sin(\lambda-\pi/2)$)

Constellation point 3-1[1010] . . . ($R_2\cos(\lambda+\pi/2)$,$R_2\sin(\lambda+\pi/2)$)

Constellation point 3-2[1011] . . . ($R_1\cos(3\pi/4)$,$R_1\sin(3\pi/4)$)

Constellation point 3-3[1111] . . . ($R_1\cos(-3\pi/4)$,$R_1\sin(-3\pi/4)$)

Constellation point 3-4[1110] . . . ($R_2\cos(-\lambda-\pi/2)$,$R_2\sin(-\lambda-\pi/2)$)

Constellation point 4-1[1000] . . . ($R_3\cos(3\pi/4)$,$R_3\sin(3\pi/4)$)

Constellation point 4-2[1001] . . . ($R_2\cos(\pi-\lambda)$,$R_2\sin(\pi-\lambda)$)

Constellation point 4-3[1101] . . . ($R_2\cos(-\pi+\lambda)$,$R_2\sin(-\pi+\lambda)$)

Constellation point 4-4[1100] . . . ($R_3\cos(-3\pi/4)$,$R_3\sin(-3\pi/4)$)

With respect to phase, the unit used is radians. Accordingly, for example, referring to $R_3\cos(\pi/4)$, the unit of $\pi/4$ is radians. Hereinafter, the unit of phase is radians. Further, $\lambda$ is greater than zero radians and smaller than $\pi/4$ (0 radians$<\lambda<\pi/4$ radians).

Further, for example, the following relationship is disclosed above:

Constellation point 1-1[0000] . . . ($R_3\cos(\pi/4)$,$R_3\sin(\pi/4)$)

In data that is inputted to the mapper 708, this means that when four bits $[b_3b_2b_1b_0]$=[0000], an in-phase component I and quadrature component Q of a baseband signal after mapping are defined as (I,Q)=($R_3\cos(\pi/4)$,$R_3\sin(\pi/4)$).

As another example, the following relationship is disclosed above:

Constellation point 4-4[1100] . . . ($R_3\cos(-3\pi/4)$,$R_3\sin(-3\pi/4)$)

In data that is inputted to the mapper 708, this means that when four bits $[b_3b_2b_1b_0]$=[1100], an in-phase component I and quadrature component Q of a baseband signal after mapping are defined as (I,Q)=($R_3\cos(-3\pi/4)$,$R_3\sin(-3\pi/4)$).

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

<Transmission Output>

In order to achieve the same transmission output for (12,4)16APSK symbols and (4,8,4)16APSK symbols, the following normalization coefficient may be used. The normalization coefficient for (12,4)16APSK symbols is as described in embodiment 1. The normalization coefficient for (4,8,4)16APSK symbols is defined by the following formula.

[Math 26]

$$a_{(4,8,4)}=\frac{z}{\sqrt{(4\times R_1^2+8\times R_2^2+4\times R_3^2)/16}} \quad \text{(Math 26)}$$

Prior to normalization, the in-phase component of a baseband signal is $I_b$ and the quadrature component of the baseband signal is $Q_b$. After normalization, the in-phase component of the baseband signal is $I_n$ and the quadrature component of the baseband signal is $Q_n$. Thus, when a modulation scheme is (4,8,4)16APSK, $(I_n, Q_n)=(a_{(4,8,4)}\times I_b, a_{(4,8,4)}\times Q_b)$ holds true.

When a modulation scheme is (4,8,4)16APSK, the in-phase component $I_b$ and quadrature component $Q_b$ are the in-phase component I and quadrature component Q, respectively, of a baseband signal after mapping that is obtained by mapping based on FIG. 30. Accordingly, when a modulation scheme is (4,8,4)16APSK, the following relationships hold true.

Constellation point 1-1[0000]
. . . $(I_n, Q_n)=(a_{(4,8,4)}\times R_3\cos(\pi/4), a_{(4,8,4)}\times R_3\sin(\pi/4))$ Constellation point 1-2[0001]
. . . $(I_n, Q_n)=(a_{(4,8,4)}\times R_2\cos\lambda, a_{(4,8,4)}\times R_2\sin\lambda)$ Constellation point 1-3[0101]
. . . $(I_n, Q_n)=(a_{(4,8,4)}\times R_2\cos(-\lambda), a_{(4,8,4)}\times R_2\sin(-\lambda))$ Constellation point 1-4[0100]
. . . $(I_n, Q_n)=(a_{(4,8,4)}\times R_3\cos(-\pi/4), a_{(4,8,4)}\times R_3\sin(-\pi/4))$ Constellation point 2-1[0010]
. . . $(I_n, Q_n)=(a_{(4,8,4)}\times R_2\cos(-\lambda+\pi/2), a_{(4,8,4)}\times R_2\sin(-\lambda+\pi/2))$ Constellation point 2-2[0011]
. . . $(I_n, Q_n)=(a_{(4,8,4)}\times R_1\cos(\pi/4), a_{(4,8,4)}\times R_1\sin(\pi/4))$ Constellation point 2-3[0111]
. . . $(I_n, Q_n)=(a_{(4,8,4)}\times R_1\cos(-\pi/4), a_{(4,8,4)}\times R_1\sin(-\pi/4))$ Constellation point 2-4[0110]

. . . $(I_n, Q_n)=(a_{(4,8,4)}\times R_2 \cos(\lambda-\pi/2), a_{(4,8,4)}\times R_2 \sin(\lambda-\pi/2))$ Constellation point 3-1[1010]

. . . $(I_n, Q_n)=(a_{(4,8,4)}\times R_2 \cos(\lambda+\pi/2), a_{(4,8,4)}\times R_2 \sin(\lambda+\pi/2))$ Constellation point 3-2[1011]

. . . $(I_n, Q_n)=(a_{(4,8,4)}\times R_1 \cos(3\pi/4), a_{(4,8,4)}\times R_1 \sin(3\pi/4))$ Constellation point 3-3[1111]

. . . $(I_n, Q_n)=(a_{(4,8,4)}\times R_1 \cos(-3\pi/4), a_{(4,8,4)}\times R_1 \sin(-3\pi/4))$ Constellation point 3-4[1110]

. . . $(I_n, Q_n)=(a_{(4,8,4)}\times R_2 \cos(-\lambda-\pi/2), a_{(4,8,4)}\times R_2 \sin(-\lambda-\pi/2))$ Constellation point 4-1[1000]

. . . $(I_n, Q_n)=(a_{(4,8,4)}\times R_3 \cos(3\pi/4), a_{(4,8,4)}\times R_3 \sin(3\pi/4))$ Constellation point 4-2[1001]

. . . $(I_n, Q_n)=(a_{(4,8,4)}\times R_2 \cos(\pi-\lambda), a_{(4,8,4)}\times R_2 \sin(\pi-\lambda))$ Constellation point 4-3[1101]

. . . $(I_n, Q_n)=(a_{(4,8,4)}\times R_2 \cos(-\pi+\lambda), a_{(4,8,4)}\times R_2 \sin(-\pi+\lambda))$ Constellation point 4-4[1100]

. . . $(I_n, Q_n)=(a_{(4,8,4)}\times R_3 \cos(-3\pi/4), a_{(4,8,4)}\times R_3 \sin(-3\pi/4))$ Further, for example, the following relationship is disclosed above:

Constellation point 1-1[0000]

. . . $(I_n, Q_n)=(a_{(4,8,4)}\times R_3 \cos(\pi/4), a_{(4,8,4)}\times R_3 \sin(\pi/4))$ In data that is inputted to the mapper 708, this means that when four bits $[b_3b_2b_1b_0]=[0000]$, $(I_n, Q_n)=(a_{(4,8,4)}\times R_3 \cos(\pi/4), a_{(4,8,4)}\times R_3 \sin(\pi/4))$. As another example, the following relationship is disclosed above:

Constellation point 4-4[1100]

. . . $(I_n, Q_n)=(a_{(4,8,4)}\times R_3 \cos(-3\pi/4), a_{(4,8,4)}\times R_3 \sin(-3\pi/4))$ In data that is inputted to the mapper 708, this means that when four bits $[b_3b_2b_1b_0]=[1100]$, $(I_n, Q_n)=(a_{(4,8,4)}\times R_3 \cos(-3\pi/4), a_{(4,8,4)}\times R_3 \sin(-3\pi/4))$.

This holds true for all of constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4.

Thus, the mapper 708 outputs $I_n$ and $Q_n$ as described above as an in-phase component and a quadrature component, respectively, of a baseband signal.

<Labelling and Constellations of (4,8,4)16APSK>

[Labelling of (4,8,4)16APSK]

The following describes labelling of (4,8,4)16APSK. Labelling is the relationship between four bits $[b_3b_2b_1b_0]$, which are input, and arrangement of constellation points in an in-phase (I)-quadrature-phase (Q) plane. An example of labelling of (4,8,4)16APSK is illustrated in FIG. 30, but labelling need not conform to FIG. 30 as long as labelling satisfies the following <Condition 7> and <Condition 8>.

For the purposes of description, the following definitions are used.

When four bits to be transmitted are $[b_{a3}b_{a2}b_{a1}b_{a0}]$, a constellation point A is provided in the in-phase (I)-quadrature-phase (Q) plane, and when four bits to be transmitted are $[b_{b3}b_{b2}b_{b1}b_{b0}]$, a constellation point B is provided in the in-phase (I)-quadrature-phase (Q) plane.

When $b_{a3}=b_{b3}$, $b_{a2}=b_{b2}$, $b_{a1}=b_{b1}$, and $b_{a0}=b_{b0}$, the number of different bits of labelling is defined as zero.

Further, the following definitions are made.

When $b_{a3}\neq b_{b3}$, $b_{a2}=b_{b2}$, $b_{a1}=b_{b1}$, and $b_{a0}=b_{b0}$, the number of different bits of labelling is defined as one.

When $b_{a3}=b_{b3}$, $b_{a2}\neq b_{b2}$, $b_{a1}=b_{b1}$, and $b_{a0}=b_{b0}$, the number of different bits of labelling is defined as one.

When $b_{a3}=b_{b3}$, $b_{a2}=b_{b2}$, $b_{a1}\neq b_{b1}$, and $b_{a0}=b_{b0}$, the number of different bits of labelling is defined as one.

When $b_{a3}=b_{b3}$, $b_{a2}=b_{b2}$, $b_{a1}=b_{b1}$, and $b_{a0}\neq b_{b0}$, the number of different bits of labelling is defined as one.

When $b_{a3}\neq b_{b3}$, $b_{a2}\neq b_{b2}$, $b_{a1}=b_{b1}$, and $b_{a0}=b_{b0}$, the number of different bits of labelling is defined as two.

When $b_{a3}\neq b_{b3}$, $b_{a2}=b_{b2}$, $b_{a1}\neq b_{b1}$, and $b_{a0}=b_{b0}$, the number of different bits of labelling is defined as two.

When $b_{a3}\neq b_{b3}$, $b_{a2}=b_{b2}$, $b_{a1}=b_{b1}$, and $b_{a0}\neq b_{b0}$, the number of different bits of labelling is defined as two.

When $b_{a3}=b_{b3}$, $b_{a2}\neq b_{b2}$, $b_{a1}\neq b_{b1}$, and $b_{a0}=b_{b0}$, the number of different bits of labelling is defined as two.

When $b_{a3}=b_{b3}$, $b_{a2}\neq b_{b2}$, $b_{a1}=b_{b1}$, and $b_{a0}\neq b_{b0}$, the number of different bits of labelling is defined as two.

When $b_{a3}=b_{b3}$, $b_{a2}=b_{b2}$, $b_{a1}\neq b_{b1}$, and $b_{a0}\neq b_{b0}$, the number of different bits of labelling is defined as two.

When $b_{a3}=b_{b3}$, $b_{a2}\neq b_{b2}$, $b_{a1}\neq b_{b1}$, and $b_{a0}\neq b_{b0}$, the number of different bits of labelling is defined as three.

When $b_{a3}\neq b_{b3}$, $b_{a2}=b_{b2}$, $b_{a1}\neq b_{b1}$, and $b_{a0}\neq b_{b0}$, the number of different bits of labelling is defined as three.

When $b_{a3}\neq b_{b3}$, $b_{a2}\neq b_{b2}$, $b_{a1}=b_{b1}$, and $b_{a0}\neq b_{b0}$, the number of different bits of labelling is defined as three.

When $b_{a3}\neq b_{b3}$, $b_{a2}\neq b_{b2}$, $b_{a1}\neq b_{b1}$, and $b_{a0}=b_{b0}$, the number of different bits of labelling is defined as three.

When $b_{a3}\neq b_{b3}$, $b_{a2}\neq b_{b2}$, $b_{a1}\neq b_{b1}$, and $b_{a0}\neq b_{b0}$, the number of different bits of labelling is defined as four.

Thus, group definitions are performed. With respect to constellation point 1-1, constellation point 1-2, constellation point 1-3, constellation point 1-4, constellation point 2-1, constellation point 2-2, constellation point 2-3, constellation point 2-4, constellation point 3-1, constellation point 3-2, constellation point 3-3, constellation point 3-4, constellation point 4-1, constellation point 4-2, constellation point 4-3, and constellation point 4-4 in the above description of (4,8,4)16APSK, constellation point 1-1, constellation point 1-2, constellation point 1-3, and constellation point 1-4 are defined as group 1. In the same way, constellation point 2-1, constellation point 2-2, constellation point 2-3, and constellation point 2-4 are defined as group 2; constellation point 3-1, constellation point 3-2, constellation point 3-3, and constellation point 3-4 are defined as group 3; and constellation point 4-1, constellation point 4-2, constellation point 4-3, and constellation point 4-4 are defined as group 4.

The following two conditions are provided.

<Condition 7>

X represents 1, 2, 3, and 4. All values of X satisfy the following:

The number of different bits of labelling between constellation point X-1 and constellation point X-2 is one.

The number of different bits of labelling between constellation point X-2 and constellation point X-3 is one.

The number of different bits of labelling between constellation point X-3 and constellation point X-4 is one.

<Condition 8>

A value u represents 1, 2, and 3, and a value v represents 1, 2, 3, and 4. All values of u and all values of v satisfy the following:

The number of different bits of labelling between constellation point u–v and constellation point (u+1)–v is one.

By satisfying the above conditions, the number of different bits of labelling among constellation points that are near each other in an in-phase (I)-quadrature-phase (Q) plane is low, and therefore the possibility of a reception device achieving high data reception quality is increased. Thus, when a reception device performs iterative detection, the possibility of the reception device achieving high data reception quality is increased.

[Constellation of (4,8,4)16APSK]

The above describes constellation and labelling in an in-phase (I)-quadrature-phase (Q) plane of FIG. 30, but constellation and labelling in an in-phase (I)-quadrature-phase (Q) plane is not limited to this example. For example, labelling of coordinates on an I-Q plane of each constellation point of (4,8,4)16APSK may be performed as follows.

Coordinates on an I-Q plane of the constellation point 1-1[0000]:

$(\cos\theta\times R_3\times\cos(\pi/4)\sin\theta\times R_3\times\sin(\pi/4),\ \sin\theta\times R_3\times\cos(\pi/4)+\cos\theta\times R_3\times\sin(\pi/4))$ Coordinates on an I-Q plane of the constellation point 1-2 [0001]:

$(\cos\theta\times R_2\times\cos\lambda-\sin\theta\times R_2\times\sin\lambda,\ \sin\theta\times R_2\times\cos\lambda+\cos\theta\times R_2\times\sin\lambda)$ Coordinates on an I-Q plane of the constellation point 1-3 [0101]:

$(\cos\theta\times R_2\times\cos(-\lambda)\sin\theta\times R_2\times\sin(-\lambda),\ \sin\theta\times R_2\times\cos(-\lambda)+\cos\theta\times R_2\times\sin(-\lambda))$ Coordinates on an I-Q plane of the constellation point 1-4 [0100]:

$(\cos\theta\times R_3\times\cos(-\pi/4)\sin\theta\times R_3\times\sin(-\pi/4),\ \sin\theta\times R_3\times\cos(-\pi/4)+\cos\theta\times R_3\times\sin(-\pi/4))$ Coordinates on an I-Q plane of the constellation point 2-1[0010]:

$(\cos\theta\times R_2\times\cos(-\lambda+\pi/2)-\sin\theta\times R_2\times\sin(-\lambda+\pi/2),$
$\sin\theta\times R_2\times\cos(-\lambda+\pi/2)+\cos\theta\times R_2\times\sin(-\lambda+\pi/2))$ Coordinates on an I-Q plane of the constellation point 2-2 [0011]:

$R_1\times\cos(\pi/4)-\sin\theta\times R_1\times\sin(\pi/4),\ \sin\theta\times R_1\times\cos(\pi/4)+\cos\theta\times R_1\times\sin(\pi/4))$ Coordinates on an I-Q plane of the constellation point 2-3 [0111]:

$(\cos\theta\times R_1\times\cos(-\pi/4)-\sin\theta\times R_1\times\sin(-\pi/4),\ \sin\theta\times R_1\times\cos(-\pi/4)+\cos\theta\times R_1\times\sin(-\pi/4))$ Coordinates on an I-Q plane of the constellation point 2-4 [0110]:

$(\cos\theta\times R_2\times\cos(\lambda-\pi/2)\sin\theta\times R_2\times\sin(\lambda-\pi/2),\ \sin\theta\times R_2\times\cos(\lambda-\pi/2)+\cos\theta\times R_2\times\sin(\lambda-\pi/2))$ Coordinates on an I-Q plane of the constellation point 3-1[1010]:

$(\cos\theta\times R_2\times\cos(\lambda+\pi/2)\sin\theta\times R_2\times\sin(\lambda+\pi/2),\ \sin\theta\times R_2\times\cos(\lambda+\pi/2)+\cos\theta\times R_2\times\sin(\lambda+\pi/2))$ Coordinates on an I-Q plane of the constellation point 3-2 [1011]:

$(\cos\theta\times R_1\times\cos(3\pi/4)\sin\theta\times R_1\times\sin(3\pi/4),\ \sin\theta\times R_1\times\cos(3\pi/4)+\cos\theta\times R_1\times\sin(3\pi/4))$ Coordinates on an I-Q plane of the constellation point 3-3 [1111]:

$(\cos\theta\times R_1\times\cos(-3\pi/4)\sin\theta\times R_1\times\sin(-3\pi/4),\ \sin\theta\times R_1\times\cos(-3\pi/4)+\cos\theta\times R_1\times\sin(-3\pi/4))$ Coordinates on an I-Q plane of the constellation point 3-4 [1110]:

$(\cos\theta\times R_2\times\cos(-\lambda-\pi/2)\sin\theta\times R_2\times\sin(-\lambda-\pi/2),\ \sin\theta\times R_2\times\cos(-\lambda-\pi/2)+\cos\theta\times R_2\times\sin(-\lambda-\pi/2))$ Coordinates on an I-Q plane of the constellation point 4-1[1000]:

$(\cos\theta\times R_3\times\cos(3\pi/4)\sin\theta\times R_3\times\sin(3\pi/4),\ \sin\theta\times R_3\times\cos(3\pi/4)+\cos\theta\times R_3\times\sin(3\pi/4))$ Coordinates on an I-Q plane of the constellation point 4-2 [1001]:

$(\cos\theta\times R_2\times\cos(\pi-\lambda)\sin\theta\times R_2\times\sin(\pi-\lambda),\ \sin\theta\times R_2\times\cos(\pi-\lambda)+\cos\theta\times R_2\times\sin(\pi-\lambda))$ Coordinates on an I-Q plane of the constellation point 4-3 [1101]:

$(\cos\theta\times R_2\times\cos(-\pi+\lambda)\sin\theta\times R_2\times\sin(-\pi+\lambda),\ \sin\theta\times R_2\times\cos(-\pi+\lambda)+\cos\theta\times R_2\times\sin(-\pi+\lambda))$ Coordinates on an I-Q plane of the constellation point 4-4 [1100]:

$(\cos\theta\times R_3\times\cos(-3\pi/4)\sin\theta\times R_3\times\sin(-3\pi/4),\ \sin\theta\times R_3\times\cos(-3\pi/4)+\cos\theta\times R_3\times\sin(-3\pi/4))$ With respect to phase, the unit used is radians. Accordingly, an in-phase component $I_n$ and a quadrature component $Q_n$ of a baseband signal after normalization is represented as below.

Coordinates on an I-Q plane of the constellation point 1-1[0000]:

$(I_n,\ Q_n)=(a_{(4,8,4)}\times\cos\theta\times R_3\times\cos\lambda-a_{(4,8,4)}\times\sin\theta\times R_3\times\sin\lambda,$ $a_{(4,8,4)}\times\sin\theta\times R_3\times\cos(\pi/4)+a_{(4,8,4)}\times\cos\times R_3\times\sin(\pi/4))$ Coordinates on an I-Q plane of the constellation point 1-2 [0001]:

$(I_n,\ Q_n)=(a_{(4,8,4)}\times\cos\theta\times R_2\times\cos\lambda-a_{(4,8,4)}\times\sin\theta\times R_2\times\sin\lambda,$ $a_{(4,8,4)}\times\sin\theta\times R_2\times\cos\lambda+a_{(4,8,4)}\times\cos\theta\times R_2\times\sin\lambda)$ Coordinates on an I-Q plane of the constellation point 1-3 [0101]:

$(I_n,\ Q_n)=(a_{(4,8,4)}\times\cos\theta\times R_2\times\cos(-\lambda)+a_{(4,8,4)}\times\sin\theta\times R_2\times\sin(-\lambda),$ $a_{(4,8,4)}\times\sin\theta\times R_2\times\cos(-\lambda)+a_{(4,8,4)}\times\cos\theta\times R_2\times\sin(-\lambda))$ Coordinates on an I-Q plane of the constellation point 1-4 [0100]:

$(I_n,\ Q_n)=(a_{(4,8,4)}\times\cos\theta\times R_3\times\cos(\pi/4)+a_{(4,8,4)}\times\sin\theta\times R_3\times\sin(-\pi/4),$ $a_{(4,8,4)}\times\sin\theta\times R_3\times\cos(-\pi/4)+a_{(4,8,4)}\times\cos\theta\times R_3\times\sin(-\pi/4))$ Coordinates on an I-Q plane of the constellation point 2-1[0010]:

$(I_n,\ Q_n)=(a_{(4,8,4)}\times\cos\theta\times R_2\times\cos(-\lambda+\pi/2)-a_{(4,8,4)}\times\sin\theta\times R_2\times\sin(-\lambda+\pi/2),\ a_{(4,8,4)}\times\sin\theta\times R_2\times\cos(-\lambda+\pi/2)+a_{(4,8,4)}\times\cos\theta\times R_2\times\sin(-\lambda+\pi/2))$ Coordinates on an I-Q plane of the constellation point 2-2[0011]:

$(I_n,\ Q_n)=(a_{(4,8,4)}\times\cos\theta\times R_1\times\cos(\pi/4)-a_{(4,8,4)}\times\sin\theta\times R_1\times\sin(\pi/4),$ $a_{(4,8,4)}\times\sin\theta\times R_1\times\cos(\pi/4)+a_{(4,8,4)}\times\cos\theta\times R_1\times\sin(\pi/4))$ Coordinates on an I-Q plane of the constellation point 2-3[0111]:

$(I_n,\ Q_n)=(a_{(4,8,4)}\times\cos\theta\times R_1\times\cos(-\pi/4)-a_{(4,8,4)}\times\sin\theta\times R_1\times\sin(-\pi/4),$ $a_{(4,8,4)}\times\sin\theta\times R_1\times\cos(-\pi/4)+a_{(4,8,4)}\times\cos\theta\times R_1\times\sin(-\pi/4))$ Coordinates on an I-Q plane of the constellation point 2-4[0110]:

$(I_n,\ Q_n)=(a_{(4,8,4)}\times\cos\theta\times R_2\times\cos(\lambda-\pi/2)-a_{(4,8,4)}\times\sin\theta\times R_2\times\sin(\lambda-\pi/2),$ $a_{(4,8,4)}\times\sin\theta\times R_2\times\cos(\lambda-\pi/2)+a_{(4,8,4)}\times\cos\theta\times R_2\times\sin(\lambda-\pi/2))$ Coordinates on an I-Q plane of the constellation point 3-1[1010]:

$(I_n,\ Q_n)=(a_{(4,8,4)}\times\cos\theta\times R_2\times\cos(\lambda+\pi/2)-a_{(4,8,4)}\times\sin\theta\times R_2\times\sin(\lambda+\pi/2),$ $a_{(4,8,4)}\times\sin\theta\times R_2\times\cos(\lambda+\pi/2)-a_{(4,8,4)}\times\cos\theta\times R_2\times\sin(\lambda+\pi/2))$ Coordinates on an I-Q plane of the constellation point 3-2[1011]:

$(I_n,\ Q_n)=(a_{(4,8,4)}\times\cos\theta\times R_1\times\cos(3\pi/4)-a_{(4,8,4)}\times\sin\theta\times R_1\times\sin(3\pi/4),$ $a_{(4,8,4)}\times\sin\theta\times R_1\times\cos(3\pi/4)+a_{(4,8,4)}\times\cos\theta\times R_1\times\sin(3\pi/4))$ Coordinates on an I-Q plane of the constellation point 3-3[1111]:

$(I_n,\ Q_n)=(a_{(4,8,4)}\times\cos\theta\times R_1\times\cos(3\pi/4)-a_{(4,8,4)}\times\sin\theta\times R_1\times\sin(-3\pi/4),$ $a_{(4,8,4)} \times \sin\theta \times R_1 \times \cos(-3\pi/4) + a_{(4,8,4)} \times \cos\theta \times R_1 \times \sin(-3\pi/4))$ Coordinates on an I-Q plane of the constellation point 3-4[1110]:

$(I_n, Q_n) = (a_{(4,8,4)} \times \cos\theta \times R_2 \times \cos(-\lambda-\pi/2) - a_{(4,8,4)} \times \sin\theta \times R_2 \times \sin(-\lambda-\pi/2),$ $a_{(4,8,4)} \times \sin\theta \times R_2 \times \cos(-\lambda-\pi/2) + a_{(4,8,4)} \times \cos\theta \times R_2 \times \sin(-\lambda-\pi/2))$ Coordinates on an I-Q plane of the constellation point 4-1[1000]:

$(I_n, Q_n) = (a_{(4,8,4)} \times \cos\theta \times R_3 \times \cos(3\pi/4) - a_{(4,8,4)} \times \sin\theta \times R_3 \times \sin(3\pi/4),$ $a_{(4,8,4)} \times \sin\theta \times R_3 \times \cos(3\pi/4) + a_{(4,8,4)} \times \cos\theta \times R_3 \times \sin(3\pi/4))$ Coordinates on an I-Q plane of the constellation point 4-2[1001]:

$(I_n, Q_n) = (a_{(4,8,4)} \times \cos\theta \times R_2 \times \cos(\pi-\lambda) - a_{(4,8,4)} \times \sin\theta \times R_2 \times \sin(\pi-\lambda),$ $a_{(4,8,4)} \times \sin\theta \times R_2 \times \cos(\pi-\lambda) + a_{(4,8,4)} \times \cos\theta \times R_2 \times \sin(\pi-\lambda))$ Coordinates on an I-Q plane of the constellation point 4-3[1101]:

$(I_n, Q_n) = (a_{(4,8,4)} \times \cos\theta \times R_2 \times \cos(-\pi+\lambda) - a_{(4,8,4)} \times \sin\theta \times R_2 \times \sin(-\pi+\lambda),$ $a_{(4,8,4)} \times \sin\theta \times R_2 \times \cos(-\pi+\lambda) + a_{(4,8,4)} \times \cos\theta \times R_2 \times \sin(-\pi+\lambda))$ Coordinates on an I-Q plane of the constellation point 4-4[1100]:

$(I_n, Q_n) = (a_{(4,8,4)} \times \cos\theta \times R_3 \times \cos(3\pi/4) - a_{(4,8,4)} \times \sin\theta \times R_3 \times \sin(3\pi/4),$ $a_{(4,8,4)} \times \sin\theta \times R_3 \times \cos(-3\pi/4) + a_{(4,8,4)} \times \cos\theta \times R_3 \times \sin(-3\pi/4))$ Note that θ is a phase provided on an in-phase (I)-quadrature-phase (Q) plane, and $a_{(4,8,4)}$ is as shown in Math (26).

When forming a symbol by (4,8,4)16APSK, as above, and (12,4)16APSK, and when implemented similarly to embodiment 1, any of the following transmission methods may be considered.

In a symbol group of at least three consecutive symbols (or at least four consecutive symbols), among which a modulation scheme for each symbol is (12,4)16APSK or (4,8,4)16APSK, there are no consecutive (12,4)16APSK symbols and there are no consecutive (4,8,4)16APSK symbols".

In a "symbol group of period (cycle) M", the number of (4,8,4)16APSK symbols is one greater than the number of (12,4)16APSK symbols, in other words the number of (12,4)16APSK symbols is N and the number of (4,8,4)16APSK symbols is N+1. Note that N is a natural number. Thus, in a "symbol group of period (cycle) M", there are no consecutive (4,8,4)16APSK symbols or there is only 1 position at which two consecutive (4,8,4)16APSK symbols exist. Accordingly, three or more consecutive (4,8,4)16APSK symbols do not exist.

When each data symbol is either a (12,4)16APSK symbol or a (4,8,4)16APSK symbol, three or more consecutive (4,8,4)16APSK symbols are not present in a consecutive data symbol group.

Thus, by replacing description related to (8,8)16APSK symbols with (4,8,4)16APSK for portions of embodiment 1 to embodiment 4 in which (12,4)16APSK symbols and (8,8)16APSK symbols are described (for example, transmission method, pilot symbol configuration method (embodiment 2), reception device configuration, control information configuration including TMCC, etc.), a transmission method using (12,4)16APSK symbols and (4,8,4)16APSK can be implemented in the same way as described in embodiment 1 to embodiment 4.

Embodiment 9

In embodiment 8, a case is described in which (4,8,4)16APSK symbols are used instead of the (8,8)16APSK symbols in embodiment 1 to embodiment 4. In the present embodiment, conditions are described related to constellations for improving data reception quality with respect to the (4,8,4)16APSK described in embodiment 8.

As stated in embodiment 8, FIG. 30 illustrates an example arrangement of 16 constellation points of (4,8,4)16APSK in an in-phase (I)-quadrature-phase (Q) plane. Here, phases forming a half-line of Q=0 and I<0 and a half-line of Q=(tan λ)×I and Q≥0 are considered to be λ (radians) (0 radians<λ<π/4 radians).

In FIG. 30, 16 constellation points of (4,8,4)16APSK are drawn so that λ<π/8 radians.

Figure 31:
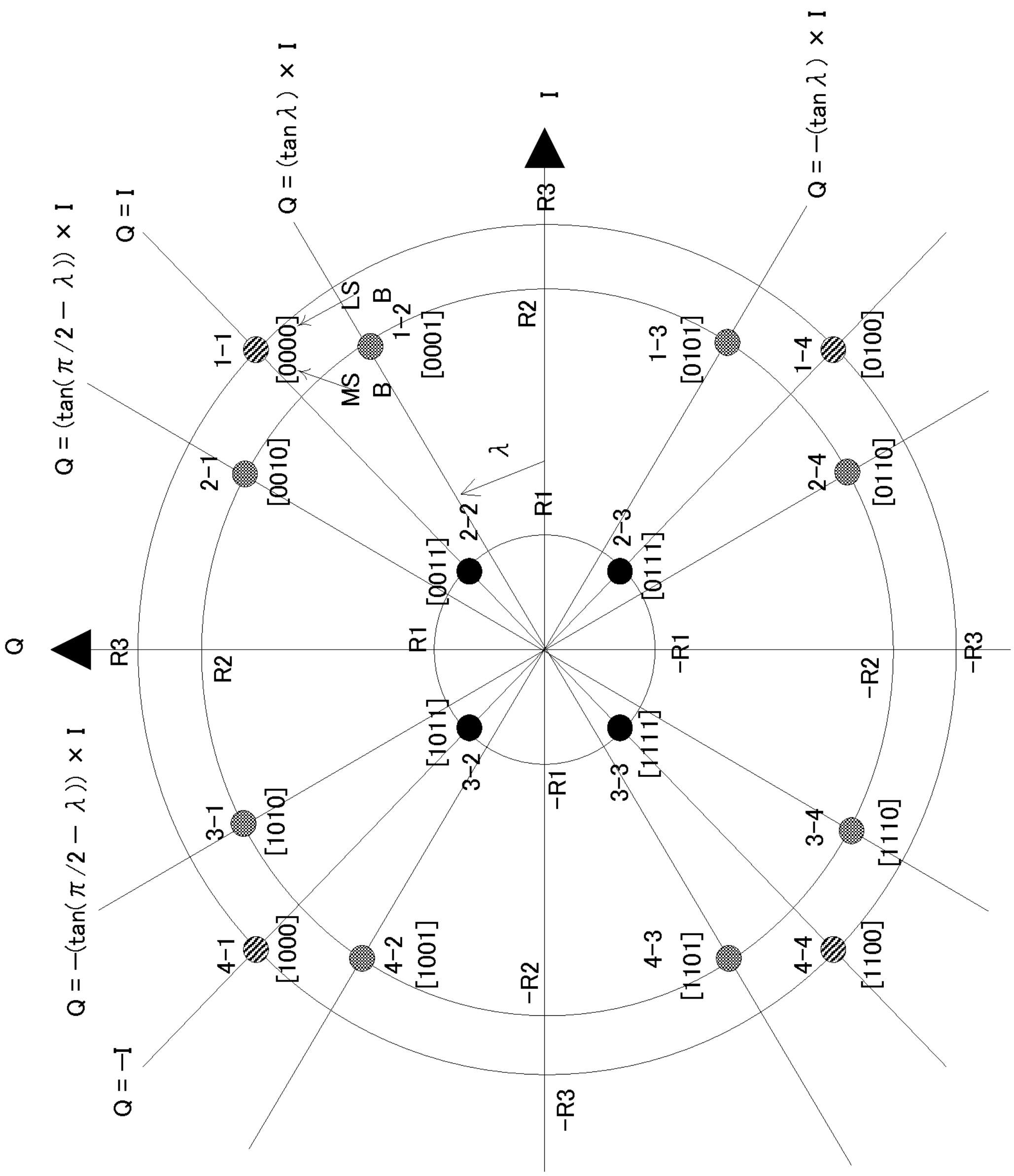
FIG. 31 illustrates an example of constellation points of (4,8,4)16APSK.

In FIG. 31, 16 constellation points of (4,8,4)16APSK are drawn so that λ≥π/8 radians.

First, eight constellation points, i.e. constellation point 1-2, constellation point 1-3, constellation point 2-1, constellation point 2-4, constellation point 3-1, constellation point 3-4, constellation point 4-2, and constellation point 4-3 exist on an intermediate size "mid circle" of radius $R_2$. Focusing on these eight constellation points, a method of setting λ to π/8 radians, as in a constellation of 8PSK, may be considered in order to achieve high reception quality.

However, four constellation points, i.e., constellation point 1-1, constellation point 1-4, constellation point 4-1, and constellation point 4-4 exist on a largest "outer circle" of radius $R_3$. Further, four constellation points, i.e., constellation point 2-2, constellation point 2-3, constellation point 3-2, and constellation point 3-3, exist on a smallest "inner circle" of radius $R_1$. When focusing on the relationship between these constellation points and the eight constellation points on the "mid circle", <Condition 9> is preferably satisfied (Condition 9 becomes a condition for achieving high data reception quality).

$$\lambda < \pi/8 \text{ radians} \quad \text{<Condition 9>}$$

This point is described with reference to FIG. 30 and FIG. 31. In FIG. 30 and FIG. 31, constellation point 1-2 and constellation point 2-1 on the "mid circle", constellation point 1-1 on the "outer circle", and constellation point 2-2 on the "inner circle", all in a first quadrant, are focused on. Although constellation point 1-2, constellation point 2-1, constellation point 1-1, and constellation point 2-2 in the first quadrant are focused on, discussion focusing on these four constellation points also applies to four constellation points in a second quadrant, four constellation points in a third quadrant, and four constellation points in a fourth quadrant.

As can be seen from FIG. 31, when λ≥π/8, a distance between constellation point 1-2 and constellation point 2-1 on the "mid circle" and constellation point 1-1 on the "outer circle" becomes short. Thus, because resistance to noise is reduced, data reception quality by a reception device decreases.

In the case of FIG. 31, constellation point 1-1 on the "outer circle" is focused on, but according to values of $R_1$, $R_2$, and $R_3$, focus on constellation point 2-2 on the "inner circle" may be required, so that when λ>π/8 radians, a distance between constellation point 1-2 and constellation point 2-1 on the "mid circle" and constellation point 2-2 on the "inner circle" becomes short. Thus, because resistance to noise is reduced, data reception quality by a reception device decreases.

On the other hand, when $\lambda<\pi/8$ radians is set as in FIG. 30, a distance between constellation point 1-1 and constellation point 1-2, a distance between constellation point 1-1 and constellation point 2-1, a distance between constellation point 2-2 and constellation point 1-2, and a distance between constellation point 2-2 and constellation point 2-1 can all be set larger, which is one condition for achieving high data reception quality.

From the above points, <Condition 9> becomes an important condition for a reception device to achieve high data reception quality.

The following describes further conditions for a reception device to achieve high data reception quality.

Figure 32:
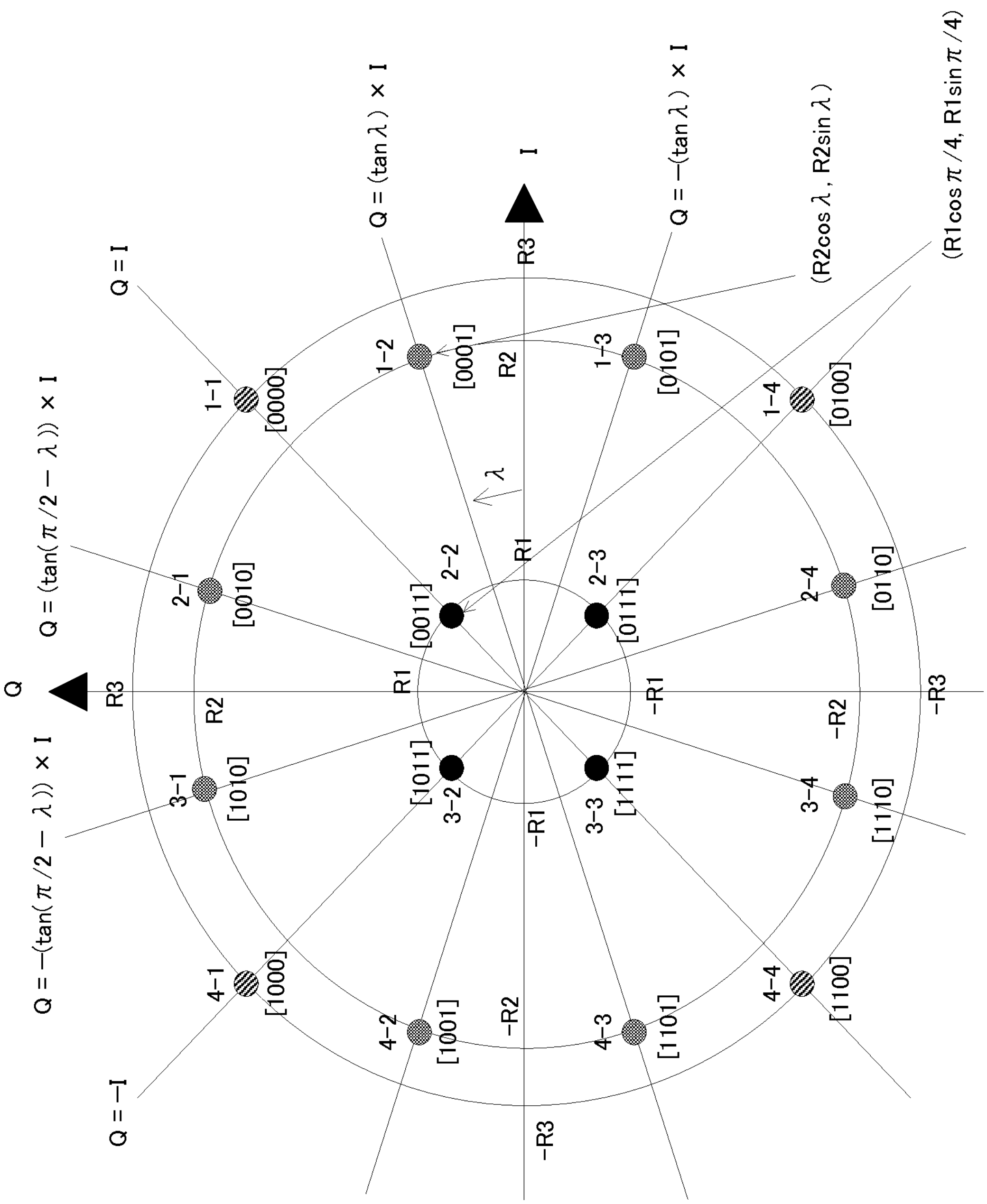
FIG. 32 illustrates an example of constellation points of (4,8,4)16APSK.

In FIG. 32, constellation point 1-2 and constellation point 2-2 of the first quadrant are focused on. Although constellation point 1-2 and constellation point 2-2 of the first quadrant are focused on here, this focus is also applicable to constellation point 3-2 and constellation point 4-2 of the second quadrant, constellation point 3-3 and constellation point 4-3 of the third quadrant, and constellation point 1-3 and constellation point 2-3 of the fourth quadrant.

Coordinates of constellation point 1-2 are $(R_2 \cos\lambda, R_2 \sin\lambda)$, and coordinates of constellation point 2-2 are $(R_1 \cos(\pi/4), R_1 \sin(\pi/4))$. In order to increase the probability of a reception device achieving a high data reception quality, the following condition is provided.

$$R_1 \sin(\pi/4) < R_2 \sin\lambda \qquad \text{<Condition 10>}$$

Among the four constellation points on the “inner circle”, the smallest Euclidean distance is $\alpha$. (Euclidean distance between constellation point 2-2 and constellation point 2-3, Euclidean distance between constellation point 2-3 and constellation point 3-3, and Euclidean distance between constellation point 3-2 and constellation point 2-2 is $\alpha$.)

Among the eight constellation points on the “mid circle”, a Euclidean distance between constellation point 1-2 and constellation point 1-3 is $\beta$. Distance between constellation point 2-1 and constellation point 3-1, distance between constellation point 4-2 and constellation point 4-3, and distance between constellation point 3-4 and constellation point 2-4 is also $\beta$.

When <Condition 10> is satisfied, $\alpha<\beta$ holds true.

Considering the points above, when both <Condition 9> and <Condition 10> are satisfied, and when Euclidean distance derived by extracting two different constellation points among 16 constellation points is considered, regardless of which two constellation points are extracted, the Euclidean distance is large, and therefore the possibility of a reception device achieving high data reception quality is increased.

However, there is the possibility of a reception device achieving high data reception quality without satisfying <Condition 9> and/or <Condition 10>. This is because there is the possibility of different suitable conditions existing according to distortion characteristics (for example, see FIG. 1) of a power amplifier for transmission included in the radio section 712 of the transmission device illustrated in FIG. 7.

In this case, when considering arrangement of constellation points (coordinates of constellation points) of (4,8,4)16APSK on an in-phase (I)-quadrature-phase (Q) plane as disclosed in embodiment 8, the following condition is added in addition to <Condition 10>

Coordinates of constellation point 1-2 are $(R_2 \cos\lambda, R_2 \sin\lambda)$, and coordinates of constellation point 2-2 are $(R_1 \cos(\pi/4), R_1 \sin(\pi/4))$. Thus, the following condition is provided.

$$R_1 \sin(\pi/4) \neq R_2 \sin\lambda \qquad \text{<Condition 11>}$$

Coordinates of constellation point 1-1 are $(R_3 \cos(\pi/4), R_3 \sin(\pi/4))$, and coordinates of constellation point 1-2 are $(R_2 \cos\lambda, R_2 \sin\lambda)$. Thus, the following condition is provided.

$$R_2 \cos\lambda \neq R_3 \cos(\pi/4) \qquad \text{<Condition 12>}$$

Thus, the following nine (4,8,4)16APSK are considered.

[1] Satisfying <Condition 10> for arrangement of constellation points (coordinates of constellation points) of (4,8,4)16APSK on an in-phase (I)-quadrature-phase (Q) plane as described in embodiment 8. $(R_1<R_2<R_3)$

[2] Satisfying <Condition 11> for arrangement of constellation points (coordinates of constellation points) of (4,8,4)16APSK on an in-phase (I)-quadrature-phase (Q) plane as described in embodiment 8. $(R_1<R_2<R_3)$

[3] Satisfying <Condition 12> for arrangement of constellation points (coordinates of constellation points) of (4,8,4)16APSK on an in-phase (I)-quadrature-phase (Q) plane as described in embodiment 8. $(R_1<R_2<R_3)$

[4] Satisfying <Condition 9> and <Condition 10> for arrangement of constellation points (coordinates of constellation points) of (4,8,4)16APSK on an in-phase (I)-quadrature-phase (Q) plane as described in embodiment 8. $(R_1<R_2<R_3)$

[5] Satisfying <Condition 9> and <Condition 11> for arrangement of constellation points (coordinates of constellation points) of (4,8,4)16APSK on an in-phase (I)-quadrature-phase (Q) plane as described in embodiment 8. $(R_1<R_2<R_3)$

[6] Satisfying <Condition 9> and <Condition 12> for arrangement of constellation points (coordinates of constellation points) of (4,8,4)16APSK on an in-phase (I)-quadrature-phase (Q) plane as described in embodiment 8. $(R_1<R_2<R_3)$

[7] Satisfying <Condition 10> and $\lambda=\pi/12$ radians for arrangement of constellation points (coordinates of constellation points) of (4,8,4)16APSK on an in-phase (I)-quadrature-phase (Q) plane as described in embodiment 8. $(R_1<R_2<R_3)$

[8] Satisfying <Condition 11> and $\lambda=\pi/12$ radians for arrangement of constellation points (coordinates of constellation points) of (4,8,4)16APSK on an in-phase (I)-quadrature-phase (Q) plane as described in embodiment 8. $(R_1<R_2<R_3)$

[9] Satisfying <Condition 12> and $\lambda=\pi/12$ radians for arrangement of constellation points (coordinates of constellation points) of (4,8,4)16APSK on an in-phase (I)-quadrature-phase (Q) plane as described in embodiment 8. $(R_1<R_2<R_3)$ Constellations (coordinates of constellation points) on an in-phase (I)-quadrature-phase (Q) plane of these nine (4,8,4)16APSK schemes are different from constellations (coordinates of constellation points) on an in-phase (I)-quadrature-phase (Q) plane of the NU-16QAM scheme described in embodiment 7, and are constellations characteristic of the present embodiment.

Further, the following nine (4,8,4)16APSK are considered.

[10] Satisfying <Condition 7> and <Condition 8>, and satisfying <Condition 10> for arrangement of constellation points (coordinates of constellation points) of (4,8,4)16APSK on an in-phase (I)-quadrature-phase (Q) plane as described in embodiment 8. $(R_1<R_2<R_3)$

[11] Satisfying <Condition 7> and <Condition 8>, and satisfying <Condition 11> for arrangement of constellation points (coordinates of constellation points) of (4,8,4)16APSK on an in-phase (I)-quadrature-phase (Q) plane as described in embodiment 8. $(R_1<R_2<R_3)$

[12] Satisfying <Condition 7> and <Condition 8>, and satisfying <Condition 12> for arrangement of constellation points (coordinates of constellation points) of (4,8,4)16APSK on an in-phase (I)-quadrature-phase (Q) plane as described in embodiment 8. ($R_1<R_2<R_3$)

[13] Satisfying <Condition 7> and <Condition 8>, and satisfying <Condition 9> and <Condition 10> for arrangement of constellation points (coordinates of constellation points) of (4,8,4)16APSK on an in-phase (I)-quadrature-phase (Q) plane as described in embodiment 8. ($R_1<R_2<R_3$)

[14] Satisfying <Condition 7> and <Condition 8>, and satisfying <Condition 9> and <Condition 11> for arrangement of constellation points (coordinates of constellation points) of (4,8,4)16APSK on an in-phase (I)-quadrature-phase (Q) plane as described in embodiment 8. ($R_1<R_2<R_3$)

[15] Satisfying <Condition 7> and <Condition 8>, and satisfying <Condition 9> and <Condition 12> for arrangement of constellation points (coordinates of constellation points) of (4,8,4)16APSK on an in-phase (I)-quadrature-phase (Q) plane as described in embodiment 8. ($R_1<R_2<R_3$)

[16] Satisfying <Condition 7> and <Condition 8>, and satisfying <Condition 10> and $\lambda=\pi/12$ radians for arrangement of constellation points (coordinates of constellation points) of (4,8,4)16APSK on an in-phase (I)-quadrature-phase (Q) plane as described in embodiment 8. ($R_1<R_2<R_3$)

[17] Satisfying <Condition 7> and <Condition 8>, and satisfying <Condition 11> and $\lambda=\pi/12$ radians for arrangement of constellation points (coordinates of constellation points) of (4,8,4)16APSK on an in-phase (I)-quadrature-phase (Q) plane as described in embodiment 8. ($R_1<R_2<R_3$)

[18] Satisfying <Condition 7> and <Condition 8>, and satisfying <Condition 12> and $\lambda=\pi/12$ radians for arrangement of constellation points (coordinates of constellation points) of (4,8,4)16APSK on an in-phase (I)-quadrature-phase (Q) plane as described in embodiment 8. ($R_1<R_2<R_3$)

According to the above, the number of different bits of labelling among constellation points that are near each other in an in-phase (I)-quadrature-phase (Q) plane is low, and therefore the possibility of a reception device achieving high data reception quality is increased. Thus, when a reception device performs iterative detection, the possibility of the reception device achieving high data reception quality is increased.

Embodiment 10

According to embodiment 1 to embodiment 4, methods of switching (12,4)16APSK symbols and (8,8)16APSK symbols in a transmit frame, methods of configuring pilot symbols, methods of configuring control information including TMCC, etc., have been described. Embodiment 7 describes a method using NU-16QAM instead of (8,8)16APSK as described in embodiment 1 to embodiment 4, and embodiment 8 describes a method using (4,8,4)16APSK instead of (8,8)16APSK as described in embodiment 1 to embodiment 4.

In embodiment 9, a constellation of (4,8,4)16APSK is described for a reception device to achieve improved data reception quality in a method using (4,8,4)16APSK instead of the (8,8)16APSK described in embodiment 1 to embodiment 4.

For example, in a situation in which distortion characteristics are severe, such as satellite broadcasting by using a power amplifier for transmission included in the radio section 712 of the transmission device illustrated in FIG. 7, even when (only) using (4,8,4)16APSK as a modulation scheme, PAPR is low and therefore intersymbol interference is reduced and, when compared to (12,4)16APSK, (4,8,4)16APSK improves constellation and labelling, and therefore a reception device is likely to achieve high data reception quality.

In the present embodiment, this point, i.e., a transmission method that can specify (4,8,4)16APSK as a modulation scheme of data symbols is described.

For example, in a frame of a modulated signal such as in FIG. 11, (4,8,4)16APSK can be specified as a modulation scheme of Data #1 to Data #7920.

Accordingly, in FIG. 11, when "1st symbol, 2nd symbol, 3rd symbol, . . . , 135th symbol, 136th symbol" are arranged along a horizontal axis of time, (4,8,4)16APSK can be specified as the modulation scheme of "1st symbol, 2nd symbol, 3rd symbol, . . . , 135th symbol, 136th symbol".

As one feature of such configuration, "two or more (4,8,4)16APSK symbols are consecutive". Two or more consecutive (4,8,4)16APSK symbols are consecutive along a time axis when, for example, a single carrier transmission scheme is used (see FIG. 33). Further, when a multi-carrier transmission scheme such as orthogonal frequency division multiplexing (OFDM) is used, the two or more consecutive (4,8,4)16APSK symbols may be consecutive along a time axis (see FIG. 33), and may be consecutive along a frequency axis (see FIG. 34).

Figure 33:
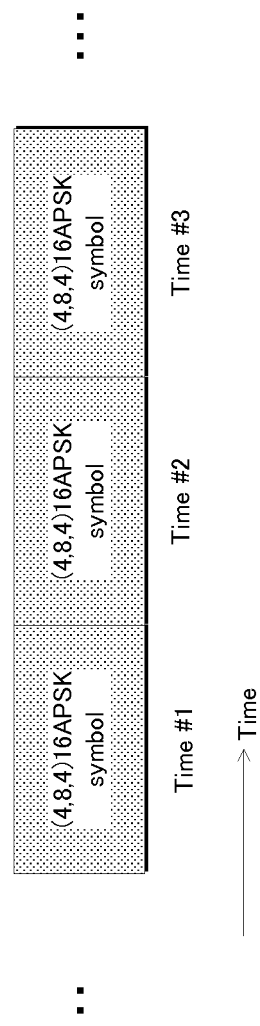
FIG. 33 illustrates an example of arrangement of symbols.

FIG. 33 illustrates an example arrangement of symbols when time is a horizontal axis. A (4,8,4)16APSK symbol at time #1, a (4,8,4)16APSK symbol at time #2, a (4,8,4)16APSK symbol at time #3, . . . .

Figure 34:
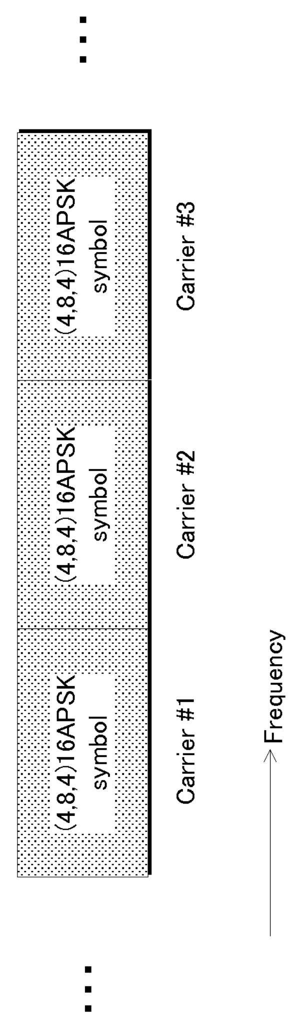
FIG. 34 illustrates an example of arrangement of symbols.

FIG. 34 illustrates an example arrangement of symbols when frequency is a horizontal axis. A (4,8,4)16APSK symbol at carrier #1, a (4,8,4)16APSK symbol at carrier #2, a (4,8,4)16APSK symbol at carrier #3, . . . .

Figure 35:
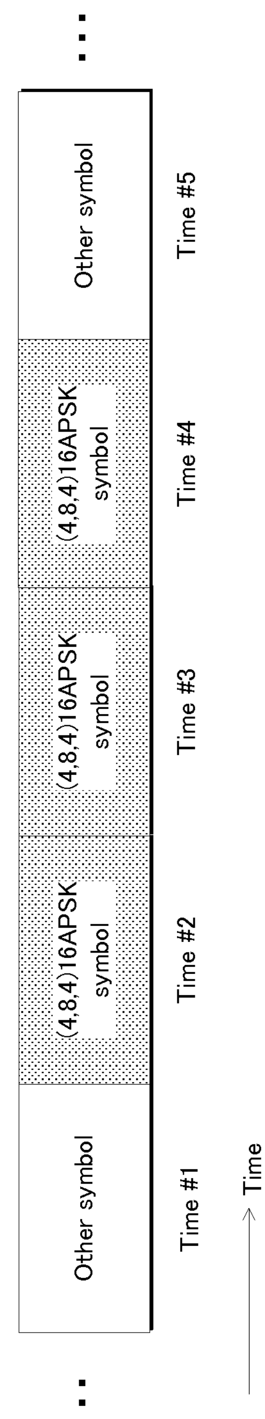
FIG. 35 illustrates an example of arrangement of symbols.
Figure 36:
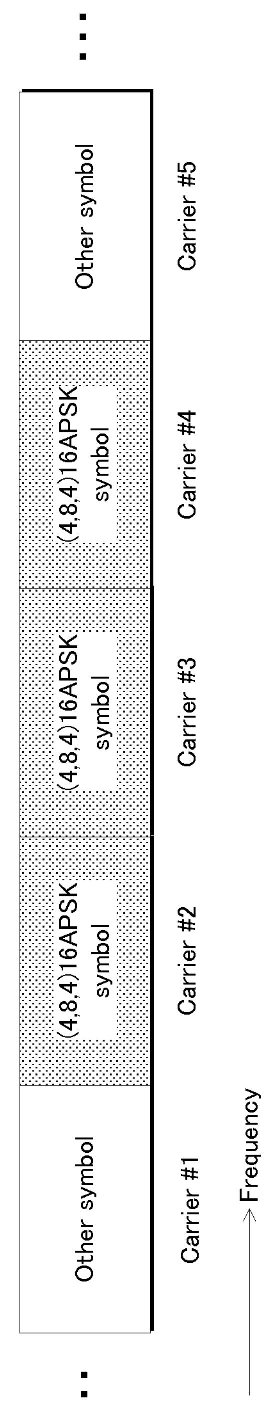
FIG. 36 illustrates an example of arrangement of symbols.

Further examples of "two or more (4,8,4)16APSK symbols are consecutive" are illustrated in FIG. 35 and FIG. 36.

FIG. 35 illustrates an example arrangement of symbols when time is a horizontal axis. Another symbol at time #1, a (4,8,4)16APSK symbol at time #2, a (4,8,4)16APSK symbol at time #3, a (4,8,4)16APSK symbol at time #4, another symbol at time #5, . . . . The other symbol may be a pilot symbol, a symbol transmitting control information, a reference symbol, a symbol for frequency or time synchronization, or any kind of symbol.

FIG. 36 illustrates an example arrangement of symbols when frequency is a horizontal axis. Another symbol at carrier #1, a (4,8,4)16APSK symbol at carrier #2, a (4,8,4)16APSK symbol at carrier #3, a (4,8,4)16APSK symbol at carrier #4, another symbol at carrier #5, . . . . The other symbol may be a pilot symbol, a symbol transmitting control information, a reference symbol, a symbol for frequency or time synchronization, or any kind of symbol.

(4,8,4)16APSK symbols may be symbols for transmitting data and may be pilot symbols as described in embodiment 2.

When a (4,8,4)16APSK symbol is a symbol for transmitting data, (4,8,4)16APSK mapping described in embodiment 8 is performed to obtain an in-phase component and quadrature component of a baseband signal from four bits of data, $b_3$, $b_2$, $b_1$, and $b_0$.

As above, when a modulation scheme of a data symbol is (4,8,4)16APSK, PAPR is low and therefore occurrence of intersymbol interference is reduced and, when compared to (12,4)16APSK, (4,8,4)16APSK is preferred for constellation and labelling, and therefore a reception device is likely to achieve high data reception quality.

In this case, when the constellation described in embodiment 9 is applied to (4,8,4)16APSK, the probability of achieving higher data reception quality becomes higher. Specific examples are as follows.

[1] Satisfying <Condition 10> for arrangement of constellation points (coordinates of constellation points) of (4,8,4)16APSK on an in-phase (I)-quadrature-phase (Q) plane as described in embodiment 8. $(R_1<R_2<R_3)$

[2] Satisfying <Condition 11> for arrangement of constellation points (coordinates of constellation points) of (4,8,4)16APSK on an in-phase (I)-quadrature-phase (Q) plane as described in embodiment 8. $(R_1<R_2<R_3)$

[3] Satisfying <Condition 12> for arrangement of constellation points (coordinates of constellation points) of (4,8,4)16APSK on an in-phase (I)-quadrature-phase (Q) plane as described in embodiment 8. $(R_1<R_2<R_3)$

[4] Satisfying <Condition 9> and <Condition 10> for arrangement of constellation points (coordinates of constellation points) of (4,8,4)16APSK on an in-phase (I)-quadrature-phase (Q) plane as described in embodiment 8. $(R_1<R_2<R_3)$

[5] Satisfying <Condition 9> and <Condition 11> for arrangement of constellation points (coordinates of constellation points) of (4,8,4)16APSK on an in-phase (I)-quadrature-phase (Q) plane as described in embodiment 8. $(R_1<R_2<R_3)$

[6] Satisfying <Condition 9> and <Condition 12> for arrangement of constellation points (coordinates of constellation points) of (4,8,4)16APSK on an in-phase (I)-quadrature-phase (Q) plane as described in embodiment 8. $(R_1<R_2<R_3)$

[7] Satisfying <Condition 10> and $\lambda=\pi/12$ radians for arrangement of constellation points (coordinates of constellation points) of (4,8,4)16APSK on an in-phase (I)-quadrature-phase (Q) plane as described in embodiment 8. $(R_1<R_2<R_3)$

[8] Satisfying <Condition 11> and $\lambda=\pi/12$ radians for arrangement of constellation points (coordinates of constellation points) of (4,8,4)16APSK on an in-phase (I)-quadrature-phase (Q) plane as described in embodiment 8. $(R_1<R_2<R_3)$

[9] Satisfying <Condition 12> and $\lambda=\pi/12$ radians for arrangement of constellation points (coordinates of constellation points) of (4,8,4)16APSK on an in-phase (I)-quadrature-phase (Q) plane as described in embodiment 8. $(R_1<R_2<R_3)$

[10] Satisfying <Condition 7> and <Condition 8>, and satisfying <Condition 10> for arrangement of constellation points (coordinates of constellation points) of (4,8,4)16APSK on an in-phase (I)-quadrature-phase (Q) plane as described in embodiment 8. $(R_1<R_2<R_3)$

[11] Satisfying <Condition 7> and <Condition 8>, and satisfying <Condition 11> for arrangement of constellation points (coordinates of constellation points) of (4,8,4)16APSK on an in-phase (I)-quadrature-phase (Q) plane as described in embodiment 8. $(R_1<R_2<R_3)$

[12] Satisfying <Condition 7> and <Condition 8>, and satisfying <Condition 12> for arrangement of constellation points (coordinates of constellation points) of (4,8,4)16APSK on an in-phase (I)-quadrature-phase (Q) plane as described in embodiment 8. $(R_1<R_2<R_3)$

[13] Satisfying <Condition 7> and <Condition 8>, and satisfying <Condition 9> and <Condition 10> for arrangement of constellation points (coordinates of constellation points) of (4,8,4)16APSK on an in-phase (I)-quadrature-phase (Q) plane as described in embodiment 8. $(R_1<R_2<R_3)$

[14] Satisfying <Condition 7> and <Condition 8>, and satisfying <Condition 9> and <Condition 11> for arrangement of constellation points (coordinates of constellation points) of (4,8,4)16APSK on an in-phase (I)-quadrature-phase (Q) plane as described in embodiment 8. $(R_1<R_2<R_3)$

[15] Satisfying <Condition 7> and <Condition 8>, and satisfying <Condition 9> and <Condition 12> for arrangement of constellation points (coordinates of constellation points) of (4,8,4)16APSK on an in-phase (I)-quadrature-phase (Q) plane as described in embodiment 8. $(R_1<R_2<R_3)$

[16] Satisfying <Condition 7> and <Condition 8>, and satisfying <Condition 10> and $\lambda=\pi/12$ radians for arrangement of constellation points (coordinates of constellation points) of (4,8,4)16APSK on an in-phase (I)-quadrature-phase (Q) plane as described in embodiment 8. $(R_1<R_2<R_3)$

[17] Satisfying <Condition 7> and <Condition 8>, and satisfying <Condition 11> and $\lambda=\pi/12$ radians for arrangement of constellation points (coordinates of constellation points) of (4,8,4)16APSK on an in-phase (I)-quadrature-phase (Q) plane as described in embodiment 8. $(R_1<R_2<R_3)$

[18] Satisfying <Condition 7> and <Condition 8>, and satisfying <Condition 12> and $\lambda=\pi/12$ radians for arrangement of constellation points (coordinates of constellation points) of (4,8,4)16APSK on an in-phase (I)-quadrature-phase (Q) plane as described in embodiment 8. $(R_1<R_2<R_3)$

[19] Satisfying <Condition 9> and <Condition 10> for arrangement of constellation points (coordinates of constellation points) of (4,8,4)16APSK on an in-phase (I)-quadrature-phase (Q) plane as described in embodiment 8. $(R_1<R_2<R_3)$

[20] Satisfying <Condition 7> and <Condition 8>, and satisfying <Condition 9> and <Condition 10> for arrangement of constellation points (coordinates of constellation points) of (4,8,4)16APSK on an in-phase (I)-quadrature-phase (Q) plane as described in embodiment 8. $(R_1<R_2<R_3)$

Embodiment 11

<Example of Pilot Symbols>

In the present embodiment, an example of pilot symbol configuration is described in the transmission scheme described in embodiment 10 (the modulation scheme of data symbols is (4,8,4)16APSK).

Note that the transmission device in the present embodiment is identical to the transmission device described in embodiment 1 and therefore description thereof is omitted here. However, (4,8,4)16APSK is used instead of (8,8)16APSK.

Intersymbol interference occurs for modulated signals because of non-linearity of the power amplifier of the transmission device. High data reception quality can be achieved by a reception device by decreasing this intersymbol interference.

In the present example of pilot symbol configuration, in order to reduce intersymbol interference at a reception device, when data symbols are configured so that "two or more (4,8,4)16APSK symbols are consecutive", a transmission device generates and transmits, as pilot symbols, all baseband signals corresponding to all possible constellation points of (4,8,4)16APSK on an in-phase (I)-quadrature-phase (Q) plane (in other words, baseband signals corresponding to 16 constellation points of four transmit bits $[b_3b_2b_1b_0]$, from [0000] to [1111]). Thus, a reception device can estimate intersymbol interference for all possible constellation points of (4,8,4)16APSK on an in-phase (I)-quadrature-phase (Q) plane, and therefore achieving high data reception quality is likely.

Specifically, the following are transmitted as pilot symbols (reference symbols), in order:

a symbol of a constellation point (baseband signal) corresponding to $[b_3b_2b_1b_0]=[0000]$ of (4,8,4)16APSK;

a symbol of a constellation point (baseband signal) corresponding to $[b_3b_2b_1b_0]=[0001]$ of (4,8,4)16APSK;

a symbol of a constellation point (baseband signal) corresponding to $[b_3b_2b_1b_0]=[0010]$ of (4,8,4)16APSK;

a symbol of a constellation point (baseband signal) corresponding to $[b_3b_2b_1b_0]=[0011]$ of (4,8,4)16APSK;

a symbol of a constellation point (baseband signal) corresponding to $[b_3b_2b_1b_0]=[0100]$ of (4,8,4)16APSK;

a symbol of a constellation point (baseband signal) corresponding to $[b_3b_2b_1b_0]=[0101]$ of (4,8,4)16APSK;

a symbol of a constellation point (baseband signal) corresponding to $[b_3b_2b_1b_0]=[0110]$ of (4,8,4)16APSK;

a symbol of a constellation point (baseband signal) corresponding to $[b_3b_2b_1b_0]=[0111]$ of (4,8,4)16APSK;

a symbol of a constellation point (baseband signal) corresponding to $[b_3b_2b_1b_0]=[1000]$ of (4,8,4)16APSK;

a symbol of a constellation point (baseband signal) corresponding to $[b_3b_2b_1b_0]=[1001]$ of (4,8,4)16APSK;

a symbol of a constellation point (baseband signal) corresponding to $[b_3b_2b_1b_0]=[1010]$ of (4,8,4)16APSK;

a symbol of a constellation point (baseband signal) corresponding to $[b_3b_2b_1b_0]=[1011]$ of (4,8,4)16APSK;

a symbol of a constellation point (baseband signal) corresponding to $[b_3b_2b_1b_0]=[1100]$ of (4,8,4)16APSK;

a symbol of a constellation point (baseband signal) corresponding to $[b_3b_2b_1b_0]=[1101]$ of (4,8,4)16APSK;

a symbol of a constellation point (baseband signal) corresponding to $[b_3b_2b_1b_0]=[1110]$ of (4,8,4)16APSK; and a symbol of a constellation point (baseband signal) corresponding to $[b_3b_2b_1b_0]=[1111]$ of (4,8,4)16APSK.

The above feature means that:

<1> Symbols corresponding to all constellation points of (4,8,4)16APSK on an in-phase (I)-quadrature-phase (Q) plane, i.e., the following symbols, are transmitted in any order:

a symbol of a constellation point (baseband signal) corresponding to $[b_3b_2b_1b_0]=[0000]$ of (4,8,4)16APSK;

a symbol of a constellation point (baseband signal) corresponding to $[b_3b_2b_1b_0]=[0001]$ of (4,8,4)16APSK;

a symbol of a constellation point (baseband signal) corresponding to $[b_3b_2b_1b_0]=[0010]$ of (4,8,4)16APSK;

a symbol of a constellation point (baseband signal) corresponding to $[b_3b_2b_1b_0]=[0011]$ of (4,8,4)16APSK;

a symbol of a constellation point (baseband signal) corresponding to $[b_3b_2b_1b_0]=[0100]$ of (4,8,4)16APSK;

a symbol of a constellation point (baseband signal) corresponding to $[b_3b_2b_1b_0]=[0101]$ of (4,8,4)16APSK;

a symbol of a constellation point (baseband signal) corresponding to $[b_3b_2b_1b_0]=[0110]$ of (4,8,4)16APSK;

a symbol of a constellation point (baseband signal) corresponding to $[b_3b_2b_1b_0]=[0111]$ of (4,8,4)16APSK;

a symbol of a constellation point (baseband signal) corresponding to $[b_3b_2b_1b_0]=[1000]$ of (4,8,4)16APSK;

a symbol of a constellation point (baseband signal) corresponding to $[b_3b_2b_1b_0]=[1001]$ of (4,8,4)16APSK;

a symbol of a constellation point (baseband signal) corresponding to $[b_3b_2b_1b_0]=[1010]$ of (4,8,4)16APSK;

a symbol of a constellation point (baseband signal) corresponding to $[b_3b_2b_1b_0]=[1011]$ of (4,8,4)16APSK;

a symbol of a constellation point (baseband signal) corresponding to $[b_3b_2b_1b_0]=[1100]$ of (4,8,4)16APSK;

a symbol of a constellation point (baseband signal) corresponding to $[b_3b_2b_1b_0]=[1101]$ of (4,8,4)16APSK;

a symbol of a constellation point (baseband signal) corresponding to $[b_3b_2b_1b_0]=[1110]$ of (4,8,4)16APSK; and a symbol of a constellation point (baseband signal) corresponding to $[b_3b_2b_1b_0]=[1111]$ of (4,8,4)16APSK.

Pilot symbols need not be symbols only for estimating intersymbol interference, and a reception device may estimate a radio wave propagation environment between a transmission device and the reception device (channel estimation), and may estimate frequency offset using the pilot symbols.

Further, a transmission method of pilot symbols is not limited to the above. Above, the pilot symbols are configured as 16 symbols, but when, for example, the pilot symbols are configured as 16×N symbols (N being a natural number), there is an advantage that the number of occurrences of each of the following symbols can be equalized:

a symbol of a constellation point (baseband signal) corresponding to $[b_3b_2b_1b_0]=[0000]$ of (4,8,4)16APSK;

a symbol of a constellation point (baseband signal) corresponding to $[b_3b_2b_1b_0]=[0001]$ of (4,8,4)16APSK;

a symbol of a constellation point (baseband signal) corresponding to $[b_3b_2b_1b_0]=[0010]$ of (4,8,4)16APSK;

a symbol of a constellation point (baseband signal) corresponding to $[b_3b_2b_1b_0]=[0011]$ of (4,8,4)16APSK;

a symbol of a constellation point (baseband signal) corresponding to $[b_3b_2b_1b_0]=[0100]$ of (4,8,4)16APSK;

a symbol of a constellation point (baseband signal) corresponding to $[b_3b_2b_1b_0]=[0101]$ of (4,8,4)16APSK;

a symbol of a constellation point (baseband signal) corresponding to $[b_3b_2b_1b_0]=[0110]$ of (4,8,4)16APSK; $[b_3b_2b_1b_0]=[0111]$ of (4,8,4)16APSK;

a symbol of a constellation point (baseband signal) corresponding to $[b_3b_2b_1b_0]=[1000]$ of (4,8,4)16APSK;

a symbol of a constellation point (baseband signal) corresponding to $[b_3b_2b_1b_0]=[1001]$ of (4,8,4)16APSK;

a symbol of a constellation point (baseband signal) corresponding to $[b_3b_2b_1b_0]=[1010]$ of (4,8,4)16APSK;

a symbol of a constellation point (baseband signal) corresponding to $[b_3b_2b_1b_0]=[1011]$ of (4,8,4)16APSK;

a symbol of a constellation point (baseband signal) corresponding to $[b_3b_2b_1b_0]=[1100]$ of (4,8,4)16APSK;

a symbol of a constellation point (baseband signal) corresponding to $[b_3b_2b_1b_0]=[1101]$ of (4,8,4)16APSK;

a symbol of a constellation point (baseband signal) corresponding to $[b_3b_2b_1b_0]=[1110]$ of (4,8,4)16APSK; and a symbol of a constellation point (baseband signal) corresponding to $[b_3b_2b_1b_0]=[1111]$ of (4,8,4)16APSK.

Embodiment 12

<Signaling>

In the present embodiment, examples are described of various information signaled as TMCC information in order to facilitate reception at the reception device of a transmit signal used in the transmission scheme described in embodiment 10.

Note that the transmission device in the present embodiment is identical to the transmission device described in embodiment 1 and therefore description thereof is omitted here. However, (4,8,4)16APSK is used instead of (8,8) 16APSK.

FIG. 18 illustrates a schematic of a transmit signal frame of advanced wide band digital satellite broadcasting. However, this is not intended to be an accurate diagram of a frame of advanced wide band digital satellite broadcasting. Note that details are described in embodiment 3, and therefore description is omitted here.

Table 9 illustrates a configuration of modulation scheme information. In table 9, for example, when four bits to be transmitted by a symbol for transmitting a modulation scheme of a transmission mode of “transmission mode/slot information” of a “TMCC information symbol group” are [0001], a modulation scheme for generating symbols of “slots composed of a symbol group” is π/2 shift binary phase shift keying (BPSK).

When four bits to be transmitted by a symbol for transmitting a modulation scheme of a transmission mode of “transmission mode/slot information” of a “TMCC information symbol group” are [0010], a modulation scheme for generating symbols of “slots composed of a symbol group” is quadrature phase shift keying (QPSK).

When four bits to be transmitted by a symbol for transmitting a modulation scheme of a transmission mode of “transmission mode/slot information” of a “TMCC information symbol group” are [0011], a modulation scheme for generating symbols of “slots composed of a symbol group” is 8 phase shift keying (8PSK).

When four bits to be transmitted by a symbol for transmitting a modulation scheme of a transmission mode of “transmission mode/slot information” of a “TMCC information symbol group” are [0100], a modulation scheme for generating symbols of “slots composed of a symbol group” is (12,4)16APSK.

When four bits to be transmitted by a symbol for transmitting a modulation scheme of a transmission mode of “transmission mode/slot information” of a “TMCC information symbol group” are [0101], a modulation scheme for generating symbols of “slots composed of a symbol group” is (4,8,4)16APSK.

When four bits to be transmitted by a symbol for transmitting a modulation scheme of a transmission mode of “transmission mode/slot information” of a “TMCC information symbol group” are [0110], a modulation scheme for generating symbols of “slots composed of a symbol group” is 32 amplitude phase shift keying (32APSK).

TABLE 9

Modulation scheme information

| Value | Assignment |
|---|---|
| 0000 | Reserved |
| 0001 | π/2 shift BPSK |
| 0010 | QPSK |
| 0011 | 8PSK |
| 0100 | (12, 4)16APSK |
| 0101 | (4, 8, 4)16APSK |
| 0110 | 32APSK |
| 0111 | . . . |
| . . . | . . . |
| 1111 | No scheme assigned |

Table 10 illustrates a relationship between coding rates of error correction code and ring ratios when a modulation scheme is (12,4)16APSK. According to $R_1$ and $R_2$, used above to represent constellation points in an I-Q plane of (12,4)16APSK, a ring ratio $R_{(12,4)}$ of (12,4)16APSK is represented as $R_{(12,4)}=R_2/R_1$. In Table 10, for example, when four bits to be transmitted by a symbol for transmitting a coding rate of a transmission mode of “transmission mode/slot information” of a “TMCC information symbol group” are [0000], a coding rate of error correction code for generating symbols of “slots composed of a data symbol group” is 41/120 (≈⅓), and this means that when a symbol for transmitting a modulation scheme of a transmission mode is indicated to be (12,4)16APSK, a ring ratio $R_{(12,4)}$ of (12,4)16APSK is 3.09.

When four bits to be transmitted by a symbol for transmitting a coding rate of a transmission mode of “transmission mode/slot information” of a “TMCC information symbol group” are [0001], a coding rate of error correction code for generating symbols of “slots composed of a data symbol group” is 49/120 (≈⅖), and this means that when a symbol for transmitting a modulation scheme of a transmission mode is indicated to be (12,4)16APSK, a ring ratio $R_{(12,4)}$ of (12,4)16APSK is 2.97.

When four bits to be transmitted by a symbol for transmitting a coding rate of a transmission mode of “transmission mode/slot information” of a “TMCC information symbol group” are [0010], a coding rate of error correction code for generating symbols of “slots composed of a data symbol group” is 61/120 (≈½), and this means that when a symbol for transmitting a modulation scheme of a transmission mode is indicated to be (12,4)16APSK, a ring ratio $R_{(12,4)}$ of (12,4)16APSK is 3.93.

TABLE 10

Relationship between coding rates of error correction code and ring ratios when modulation scheme is (12, 4)16APSK

| Value | Coding rate (approximate value) | Ring ratio |
|---|---|---|
| 0000 | 41/120 (⅓) | 3.09 |
| 0001 | 49/120 (⅖) | 2.97 |
| 0010 | 61/120 (½) | 3.93 |
| . . . | . . . | . . . |
| 1111 | No scheme assigned | — |

Table 11 indicates a relationship between coding rate of error correction code and radii/phases, when a modulation scheme is (4,8,4)16APSK.

In Table 11, for example, when four bits to be transmitted by a symbol for transmitting a coding rate of a transmission mode of “transmission mode/slot information” of a “TMCC information symbol group” are [0000], a coding rate of error correction code for generating symbols of “slots composed of a data symbol group” is 41/120 (≈⅓), and this means that when a symbol for transmitting a modulation scheme of a transmission mode is indicated to be (4,8,4)16APSK, $R_1=1.00$, $R_2=2.00$, $R_3=2.20$, and phase $\lambda=\pi/12$ radians.

When four bits to be transmitted by a symbol for transmitting a coding rate of a transmission mode of “transmission mode/slot information” of a “TMCC information symbol group” are [0001], a coding rate of error correction code for generating symbols of “slots composed of a data symbol group” is 49/120 (≈⅖), and this means that when a symbol for transmitting a modulation scheme of a transmission mode is indicated to be (4,8,4)16APSK, $R_1=1.00$, $R_2=2.10$, $R_3=2.20$, and phase $\lambda=\pi/12$ radians.

When four bits to be transmitted by a symbol for transmitting a coding rate of a transmission mode of “transmission mode/slot information” of a “TMCC information symbol group” are [0010], a coding rate of error correction code for generating symbols of “slots composed of a data symbol group” is 61/120 (≈½), and this means that when a symbol for transmitting a modulation scheme of a transmission mode is indicated to be (4,8,4)16APSK, $R_1=1.00$, $R_2=2.20$, $R_3=2.30$, and phase $\lambda=\pi/10$ radians.

TABLE 11

Relationship between radii/phases of error correction coding and ring ratios when modulation scheme is (4, 8, 4)16APSK

| Value | Coding rate (approximate value) | Radii and phase |
|---|---|---|
| 0000 | 41/120 (⅓) | $R_1 = 1.00$, $R_2 = 2.00$, $R_3 = 2.20$, $\lambda = \pi/12$ |
| 0001 | 49/120 (⅖) | $R_1 = 1.00$, $R_2 = 2.10$, $R_3 = 2.20$, $\lambda = \pi/12$ |
| 0010 | 61/120 (½) | $R_1 = 1.00$, $R_2 = 2.20$, $R_3 = 2.30$, $\lambda = \pi/10$ |
| . . . | . . . | . . . |
| 1111 | No scheme assigned | — |

<Reception Device>

The following describes operation of a reception device that receives a radio signal transmitted by the transmission device 700, with reference to the diagram of a reception device in FIG. 19.

The reception device 1900 of FIG. 19 receives a radio signal transmitted by the transmission device 700 via the antenna 1901. The RF receiver 1902 performs processing such as frequency conversion and quadrature demodulation on a received radio signal, and outputs a baseband signal.

The demodulator 1904 performs processing such as root roll-off filter processing, and outputs a post-filter baseband signal.

The synchronization and channel estimator 1914 receives a post-filter baseband signal as input, performs time synchronization, frequency synchronization, and channel estimation, using, for example, a "synchronization symbol group" and "pilot symbol group" transmitted by the transmission device, and outputs an estimated signal.

The control information estimator 1916 receives a post-filter baseband signal as input, extracts symbols including control information such as a "TMCC information symbol group", performs demodulation and decoding, and outputs a control signal.

Of importance in the present embodiment is that a reception device demodulates and decodes a symbol transmitting "transmission mode modulation scheme" information and a symbol transmitting "transmission mode coding rate" of "transmission mode/slot information" of a "TMCC information symbol group"; and, based on Table 9, Table 10, and Table 11, the control information estimator 1916 generates modulation scheme information and error correction code scheme (for example, coding rate of error correction code) information used by "slots composed of a data symbol group", and generates ring ratio and radii/phase information when a modulation scheme used by "slots composed of a data symbol group" is (12,4)16APSK, (4,8,4)16APSK, or 32APSK, and outputs the information as a portion of a control signal.

The de-mapper 1906 receives a post-filter baseband signal, control signal, and estimated signal as input, determines a modulation scheme (or transmission method) used by "slots composed of a data symbol group" based on the control signal (in this case, when there is a ring ratio and radii/phase, determination with respect to the ring ratio and radii/phase is also performed), calculates, based on this determination, a log-likelihood ratio (LLR) for each bit included in a data symbol from the post-filter baseband signal and estimated signal, and outputs the log-likelihood ratios. (However, instead of a soft decision value such as an LLR a hard decision value may be outputted, and a soft decision value may be outputted instead of an LLR.)

The de-interleaver 1908 receives log-likelihood ratios as input, accumulates input, performs de-interleaving (permutes data) corresponding to interleaving used by the transmission device, and outputs post-de-interleaving log-likelihood ratios.

The error correction decoder 1912 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method.

The above describes operation when iterative detection is not performed. The following is supplemental description of operation when iterative detection is performed. Note that a reception device need not implement iterative detection, and a reception device may be a reception device that performs initial detection and error detection decoding without being provided with elements related to iterative detection that are described below.

When iterative detection is performed, the error correction decoder 1912 outputs a log-likelihood ratio for each post-decoding bit. (Note that when only initial detection is performed, output of a log-likelihood ratio for each post decoding bit is not necessary.)

The interleaver 1910 interleaves log-likelihood ratios of post-decoding bits (performs permutation), and outputs post-interleaving log-likelihood ratios.

The de-mapper 1906 performs iterative detection by using post-interleaving log-likelihood ratios, a post-filter baseband signal, and an estimated signal, and outputs a log-likelihood ratio for each post-iterative detection bit.

Subsequently, interleaving and error correction code operations are performed. Thus, these operations are iteratively performed. In this way, finally the possibility of achieving a preferable decoding result is increased.

In the above description, a feature thereof is that by a reception device obtaining a symbol for transmitting a modulation scheme of a transmission mode of "transmission mode/slot information" of a "TMCC information symbol group" and a symbol for transmitting a coding rate of a transmission mode of "transmission mode/slot information" of a "TMCC information symbol group", a modulation scheme and coding rate of error detection coding are estimated, and, when a modulation scheme is 16APSK, 32APSK, ring ratios and radii/phases are estimated, and demodulation and decoding operations become possible.

The above description describes the frame configuration in FIG. 18, but frame configurations applicable to the present disclosure are not limited in this way. When a plurality of data symbols exist, a symbol exists for transmitting information related to a modulation scheme used in generating the plurality of data symbols, and a symbol exists for transmitting information related to an error correction scheme (for example, error correction code used, code length of error correction code, coding rate of error correction code, etc.) used in generating the plurality of data symbols, any arrangement in a frame may be used with respect to the plurality of data symbols, the symbol for transmitting information related to a modulation scheme, and the symbol for transmitting information related to an error correction scheme. Further, symbols other than these symbols, for example a symbol for preamble and synchronization, pilot symbols, a reference symbol, etc., may exist in a frame.

In addition, as a method different to that described above, a symbol transmitting information related to ring ratios and radii/phases may exist, and the transmission device may transmit the symbol. An example of a symbol transmitting information related to ring ratios and radii/phases is illustrated below.

TABLE 12

Example of symbol transmitting information related to ring ratios and radii/phases

| Value | Assignment |
|---|---|
| 00000 | (12, 4)16APSK ring ratio 4.00 |
| 00001 | (12, 4)16APSK ring ratio 4.10 |
| 00010 | (12, 4)16APSK ring ratio 4.20 |
| 00011 | (12, 4)16APSK ring ratio 4.30 |
| 00100 | (4, 8, 4)16APSK $R_1$ = 1.00, $R_2$ = 2.00, $R_3$ = 2.20, $\lambda = \pi/12$ |
| 00101 | (4, 8, 4)16APSK $R_1$ = 1.00, $R_2$ = 2.10, $R_3$ = 2.20, $\lambda = \pi/12$ |
| 00110 | (4, 8, 4)16APSK $R_1$ = 1.00, $R_2$ = 2.20, $R_3$ = 2.30, $\lambda = \pi/10$ |
| 00111 | (4, 8, 4)16APSK $R_1$ = 1.00, $R_2$ = 2.20, $R_3$ = 2.30, $\lambda = \pi/12$ |
| . . . | . . . |
| 11111 | . . . |

In Table 12, when [00000] is transmitted by a symbol transmitting information related to ring ratio and radii/phase, a data symbol is a symbol of "(12,4)16APSK ring ratio 4.00".

Further, the following is true.

When [00001] is transmitted by a symbol transmitting information related to ring ratio and radii/phase, a data symbol is a symbol of "(12,4)16APSK ring ratio 4.10".

When [00010] is transmitted by a symbol transmitting information related to ring ratio and radii/phase, a data symbol is a symbol of "(12,4)16APSK ring ratio 4.20".

When [00011] is transmitted by a symbol transmitting information related to ring ratio and radii/phase, a data symbol is a symbol of "(12,4)16APSK ring ratio 4.30".

When [00100] is transmitted by a symbol transmitting information related to ring ratio and radii/phase, a data symbol is a symbol of "(4,8,4)16APSK $R_1$=1.00, $R_2$=2.00, $R_3$=2.20, $\lambda=\pi/12$".

When [00101] is transmitted by a symbol transmitting information related to ring ratio and radii/phase, a data symbol is a symbol of "(4,8,4)16APSK $R_1$=1.00, $R_2$=2.10, $R_3$=2.20, $\lambda=\pi/12$".

When [00110] is transmitted by a symbol transmitting information related to ring ratio and radii/phase, a data symbol is a symbol of "(4,8,4)16APSK $R_1$=1.00, $R_2$=2.20, $R_3$=2.30, $\lambda=\pi/10$".

When [00111] is transmitted by a symbol transmitting information related to ring ratio and radii/phase, a data symbol is a symbol of "(4,8,4)16APSK $R_1$=1.00, $R_2$=2.20, $R_3$=2.30, $\lambda=\pi/12$".

Thus, by obtaining a symbol transmitting information related to ring ratio and radii/phases, a reception device can estimate a ring ratio and radii/phases used by a data symbol, and therefore demodulation and decoding of the data symbol becomes possible.

Further, ring ratio and radii/phases information may be included in a symbol for transmitting a modulation scheme. An example is illustrated below.

TABLE 13

Modulation scheme information

| Value | Assignment |
|---|---|
| 00000 | (12, 4)16APSK ring ratio 4.00 |
| 00001 | (12, 4)16APSK ring ratio 4.10 |
| 00010 | (12, 4)16APSK ring ratio 4.20 |
| 00011 | (12, 4)16APSK ring ratio 4.30 |
| 00100 | (4, 8, 4)16APSK $R_1$ = 1.00, $R_2$ = 2.00, $R_3$ = 2.20, $\lambda = \pi/12$ |
| 00101 | (4, 8, 4)16APSK $R_1$ = 1.00, $R_2$ = 2.10, $R_3$ = 2.20, $\lambda = \pi/12$ |
| 00110 | (4, 8, 4)16APSK $R_1$ = 1.00, $R_2$ = 2.20, $R_3$ = 2.30, $\lambda = \pi/10$ |
| 00111 | (4, 8, 4)16APSK $R_1$ = 1.00, $R_2$ = 2.20, $R_3$ = 2.30, $\lambda = \pi/12$ |
| . . . | . . . |
| 11101 | 8PSK |
| 11110 | QPSK |
| 11111 | $\pi/2$ shift BPSK |

In Table 13, when [00000] is transmitted by a symbol transmitting modulation scheme information, a data symbol is a symbol of "(12,4)16APSK ring ratio 4.00".

Further, the following is true.

When [00001] is transmitted by a symbol transmitting modulation scheme information, a data symbol is a symbol of "(12,4)16APSK ring ratio 4.10".

When [00010] is transmitted by a symbol transmitting modulation scheme information, a data symbol is a symbol of "(12,4)16APSK ring ratio 4.20".

When [00011] is transmitted by a symbol transmitting modulation scheme information, a data symbol is a symbol of "(12,4)16APSK ring ratio 4.30".

When [00100] is transmitted by a symbol transmitting modulation scheme information, a data symbol is a symbol of "(4,8,4)16APSK $R_1$=1.00, $R_2$=2.00, $R_3$=2.20, $\lambda=\pi/12$".

When [00101] is transmitted by a symbol transmitting modulation scheme information, a data symbol is a symbol of "(4,8,4)16APSK $R_1$=1.00, $R_2$=2.10, $R_3$=2.20, $\lambda=\pi/12$".

When [00110] is transmitted by a symbol transmitting modulation scheme information, a data symbol is a symbol of "(4,8,4)16APSK $R_1$=1.00, $R_2$=2.20, $R_3$=2.30, $\lambda=\pi/10$".

When [00111] is transmitted by a symbol transmitting modulation scheme information, a data symbol is a symbol of "(4,8,4)16APSK $R_1$=1.00, $R_2$=2.20, $R_3$=2.30, $\lambda=\pi/12$".

When [11101] is transmitted by a symbol transmitting modulation scheme information, a data symbol is a symbol of "8PSK".

When [11110] is transmitted by a symbol transmitting modulation scheme information, a data symbol is a symbol of "QPSK".

When [11111] is transmitted by a symbol transmitting modulation scheme information, a data symbol is a symbol of "$\pi/2$ shift BPSK".

Thus, by obtaining a symbol transmitting modulation scheme information, a reception device can estimate a modulation scheme, ring ratio, radii, and phases used by a data symbol, and therefore demodulation and decoding of the data symbol becomes possible.

Note that in the above description, examples are described including "(12,4)16APSK" and "(4,8,4)16APSK" as selectable modulation schemes (transmission methods), but modulation schemes (transmission methods) are not limited to these examples. In other words, other modulation schemes may be selectable.

Embodiment 13

In the present embodiment, an order of generation of a data symbol is described.

FIG. 18, part (a) illustrates a schematic of a frame configuration. In FIG. 18, part (a), the "#1 symbol group", the "#2 symbol group", the "#3 symbol group", . . . are lined up. Each symbol group among the "#1 symbol group", the "#2 symbol group", the "#3 symbol group", . . . is herein composed of a "synchronization symbol group", a "pilot symbol group", a "TMCC information symbol group", and "slots composed of a data symbol group", as illustrated in FIG. 18, part (a).

Here, a configuration scheme is described of data symbol groups in each "slots composed of a data symbol group" among, for example, N symbol groups including the "#1 symbol group", the "#2 symbol group", the "#3 symbol group", . . . , an "# N−1 symbol group", an "# N symbol group".

A rule is provided with respect to generation of data symbol groups in each "slots composed of a data symbol group" among N symbol groups from a "#(β×N+1) symbol group" to a "#(β×N+N) symbol group". The rule is described with reference to FIG. 37.

Figure 37:
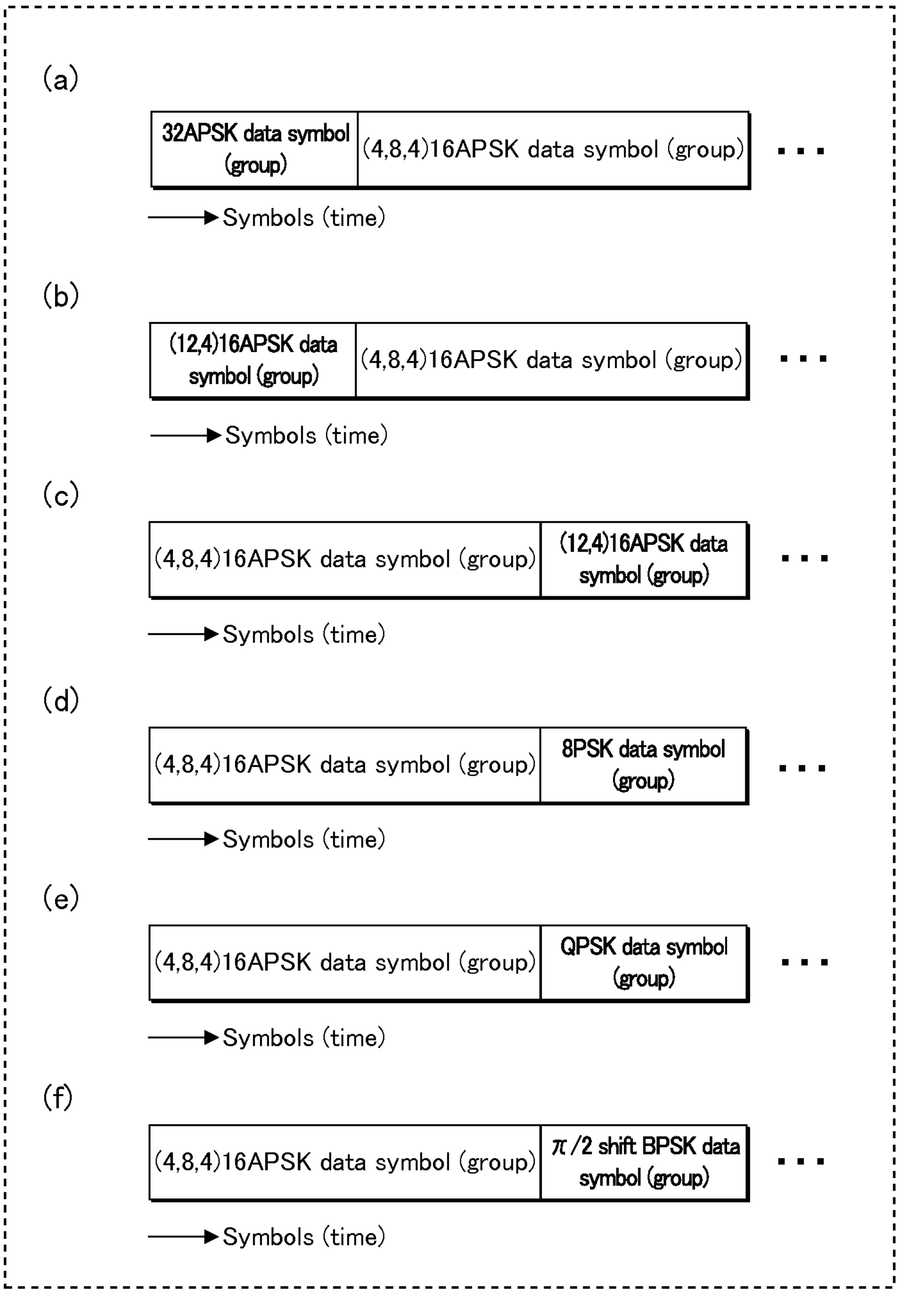
FIG. 37 illustrates examples of arrangement of modulation schemes.

Thus, a data symbol group of (4,8,4)16APSK of FIG. 37 satisfies features of FIG. 37, part (a), to FIG. 37, part (f). Note that in FIG. 37, the horizontal axis is symbols.

FIG. 37, Part (a):

When a 32APSK data symbol exists and a (12,4)16APSK data symbol does not exist, a "(4,8,4)16APSK data symbol" exists after a "32APSK data symbol", as illustrated in FIG. 37, part (a).

FIG. 37, Part (b):

When a (12,4)16APSK data symbol exists, a "(4,8,4) 16APSK data symbol" exists after a "(12,4)16APSK data symbol", as illustrated in FIG. 37, part (b).

FIG. 37, Part (c):

When a (12,4)16APSK data symbol exists, a "(12,4) 16APSK data symbol" exists after a "(4,8,4)16APSK data symbol", as illustrated in FIG. 37, part (c).

Either FIG. 37, part (b), or FIG. 37, part (c) may be satisfied.

FIG. 37, Part (d):

When an 8PSK data symbol exists and a (12,4)16APSK data symbol does not exist, an "8PSK data symbol" exists after a "(4,8,4)16APSK data symbol", as illustrated in FIG. 37, part (d).

FIG. 37, Part (e):

When an QPSK data symbol exists, an 8PSK data symbol does not exist, and a (12,4)16APSK data symbol does not exist, a "QPSK data symbol" exists after a "(4,8,4)16APSK data symbol", as illustrated in FIG. 37, part (e).

FIG. 37, Part (f):

When a π/2 shift BPSK data symbol exists, a QPSK data symbol does not exist, an 8PSK data symbol does not exist, and a (12,4)16APSK data symbol does not exist, a "π/2 shift BPSK data symbol" exists after a "(4,8,4)16APSK data symbol", as illustrated in FIG. 37, part (f).

When symbols are arranged as described above, there is an advantage that a reception device can easily perform automatic gain control (AGC) because a signal sequence is arranged in order of modulation schemes (transmission methods) of high peak power.

Figure 38:
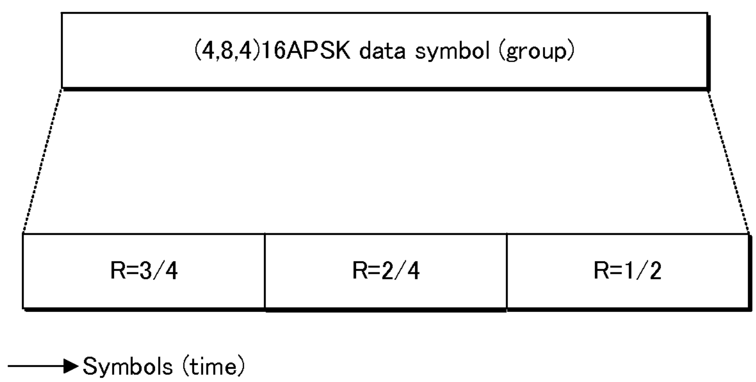
FIG. 38 illustrates an example of arrangement of modulation schemes.

FIG. 38 illustrates an example configuration method of the "(4,8,4)16APSK data symbol" described above.

Assume that a "(4,8,4)16APSK data symbol" of a coding rate X of error correction code and a "(4,8,4)16APSK data symbol" of a coding rate Y of error correction code exist. Also assume that a relationship X>Y is satisfied.

Thus, a "(4,8,4)16APSK data symbol" of a coding rate Y of error correction code is arranged after a "(4,8,4)16APSK data symbol" of a coding rate X of error correction code.

As in FIG. 38, assume that a "(4,8,4)16APSK data symbol" of a coding rate 1/2 of error correction code, a "(4,8,4)16APSK data symbol" of a coding rate 2/3 of error correction code, and a "(4,8,4)16APSK data symbol" of a coding rate 3/4 of error correction code exist. Thus, from the above description, as illustrated in FIG. 38, symbols are arranged in the order of a "(4,8,4)16APSK data symbol" of a coding rate 3/4 of error correction code, a "(4,8,4)16APSK data symbol" of a coding rate 2/3 of error correction code, and a "(4,8,4)16APSK data symbol" of a coding rate 1/2 of error correction code.

Embodiment A

In the present embodiment, a scheme is described that can select a ring ratio (for example, a (12,4)16APSK ring ratio) even when a coding rate of error correction code is a given coding rate (for example, coding rate is set to a value K). This scheme contributes to improvements in variation of patterns of switching modulation schemes, for example, and thereby a reception device can achieve high data reception quality by setting suitable ring ratios.

Note that ring ratio (for example, (12,4)16APSK ring ratio) has been defined prior to the present embodiment, and ring ratio may also be referred to as "radius ratio".

<Transmit Station>

Figure 39:
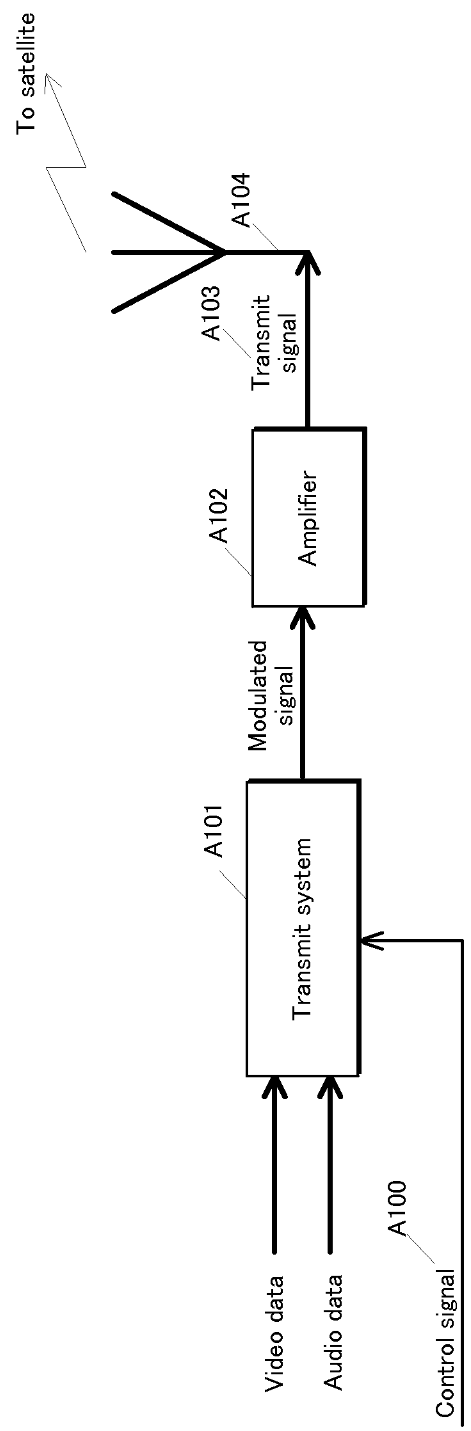
FIG. 39 illustrates an example of a transmit station.

FIG. 39 illustrates an example of a transmit station.

A transmit system A101 in FIG. 39 receives video data and audio data as input and generates a modulated signal according to a control signal A100.

The control signal A100 specifies code length of error correction code, coding rate, modulation scheme, and ring ratio.

An amplifier A102 receives a modulated signal as input, amplifies the modulated signal, and outputs a post-amplification transmit signal A103. The transmit signal A103 is transmitted via an antenna A104.

<Ring Ratio Selection>

Table 14 illustrates an example of coding rates of error correction code and ring ratios when a modulation scheme is (12,4)16APSK.

TABLE 14

Coding rates of error correction code and ring ratios when modulation scheme is (12, 4)16APSK

| Value | Coding rate (approximate value) | Ring ratio |
|---|---|---|
| 0000 | 41/120 (⅓) | 2.99 |
| 0001 | 41/120 (⅓) | 3.09 |
| 0010 | 41/120 (⅓) | 3.19 |
| 0011 | 49/120 (⅖) | 2.87 |
| 0100 | 49/120 (⅖) | 2.97 |
| 0101 | 49/120 (⅖) | 3.07 |
| 0110 | 61/120 (½) | 3.83 |
| . . . | . . . | . . . |
| 1111 | No scheme assigned | — |

A control signal generator (not illustrated) generates the control signal A100 for indicating a value of Table 14 according to a predefined coding rate and ring ratio of a transmission device. At the transmit system A101, a modulated signal is generated according to a coding rate and ring ratio specified by the control signal A100.

For example, when a transmission device specifies (12, 4)16APSK as a modulation scheme, 41/120(≈⅓) as a coding rate of error correction code, and 2.99 as a ring ratio, four bits of control information related to bit ratio are "0000". Further, when (12,4)16APSK is specified as a modulation scheme, 41/120(≈⅓) is specified as a coding rate of error correction code, and 3.09 is specified as a ring ratio, four bits of control information related to bit ratio are "0001".

Thus, a transmission device transmits "four bits of control information related to ring ratio" as a portion of control information.

Further, at a terminal that receives data (control information) containing four bit values of Table 14 (four bits of control information related to ring ratio), de-mapping (for example, log-likelihood ratio for each bit) is performed according to a coding rate and ring ratio indicated by the bit values, and data modulation, etc., is performed.

Transmission of this four bit value (four bits of control information related to ring ratio) can be performed using four bits within "transmission mode/slot information" with a "TMCC information symbol group".

Table 14 indicates "in a case in which a symbol for transmitting a modulation scheme of a transmission mode indicates (12,4)16APSK, when values of four bits are "0000", a coding rate of error correction code for generating symbols of "slots composed of a data symbol group" is 41/120 (≈⅓) and a ring ratio of (12,4)16APSK is $R_{(12,4)}$=2.99".

Further, "in a case in which a symbol for transmitting a modulation scheme of a transmission mode indicates (12,4) 16APSK, when values of four bits are "0001", a coding rate of error correction code for generating symbols of "slots composed of a data symbol group" is 41/120 (≈⅓) and a ring ratio of (12,4)16APSK is $R_{(12,4)}$=3.09".

Further, "in a case in which a symbol for transmitting a modulation scheme of a transmission mode indicates (12,4) 16APSK, when values of four bits are "0010", a coding rate of error correction code for generating symbols of "slots composed of a data symbol group" is 41/120 (≈⅓) and a ring ratio of (12,4)16APSK is $R_{(12,4)}$=3.19".

In this Table 14, for each coding rate value three types of ring ratio are assigned, but this is merely one example. In other words, for each coding rate value a plurality of types of ring ratio may be assigned. Further, a portion of coding rate values may be assigned one type of ring ratio, and remaining coding rate values may be assigned a plurality of types of ring ratio.

<Reception Device>

A reception device is described that corresponds to the transmission method of the present embodiment.

Figure 40:
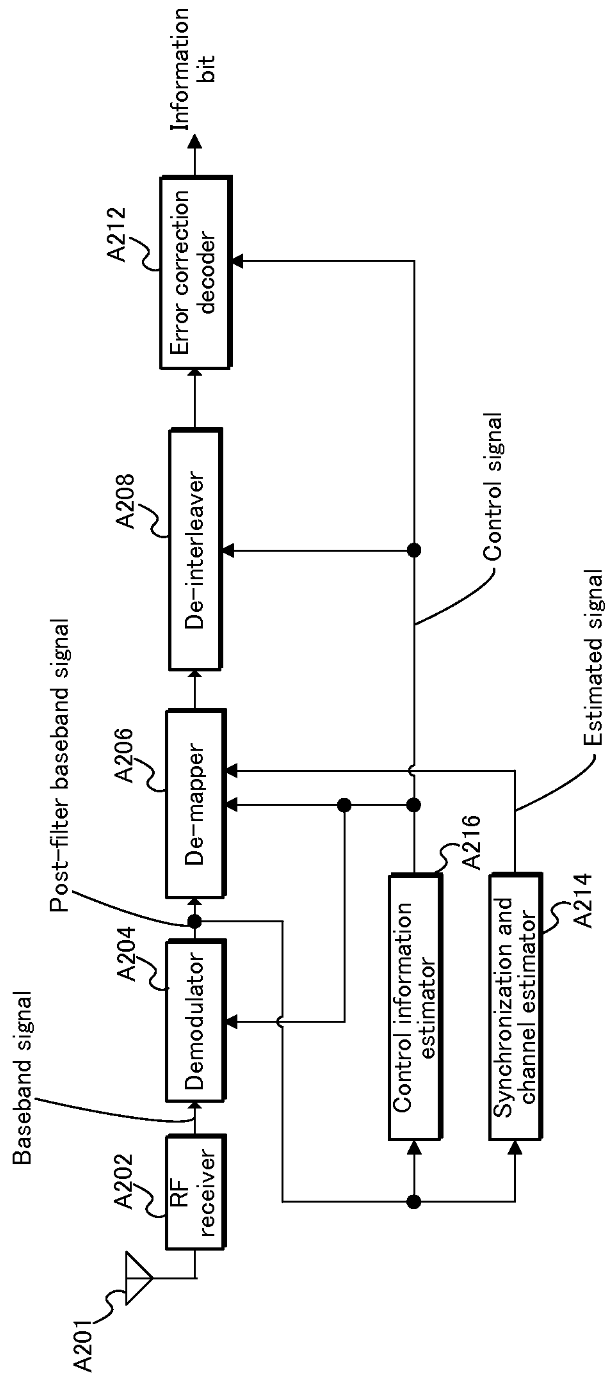
FIG. 40 illustrates an example configuration of a reception device.

A reception device (terminal) A200 of FIG. 40 receives, via an antenna A201, a radio signal transmitted by the transmit station of FIG. 39 and relayed by a satellite (repeater station). A relationship between the transmit station, repeated station, and reception device (terminal) is described in the next embodiment.

An RF receiver A202 performs processing such as frequency conversion and quadrature demodulation on a received radio signal, and outputs a baseband signal.

A demodulator A204 performs processing such as root roll-off filter processing, and outputs a post-filter baseband signal.

A synchronization and channel estimator A214 receives a post-filter baseband signal as input, performs time synchronization, frequency synchronization, and channel estimation, using, for example, a "synchronization symbol group" and "pilot symbol group" transmitted by the transmission device, and outputs an estimated signal.

A control information estimator A216 receives a post-filter baseband signal as input, extracts symbols including control information such as a "TMCC information symbol group", performs demodulation and decoding, and outputs a control signal. Of importance to the present embodiment is that a symbol transmitting "transmission mode/slot information" of a "TMCC information symbol group" is demodulated and decoded by the reception device A200. Thus, the control information estimator A216 generates information specifying a coding rate and ring ratio from values of four bits (four bits of control information related to ring ratio) decoded based on a table identical to Table 14 stored at the reception device A200, and outputs the information as a portion of a control signal.

A de-mapper A206 receives a post-filter baseband signal, control signal, and estimated signal as input, determines, based on the control signal, a modulation scheme (or transmission method) and ring ratio used by "slots composed by a data symbol group", calculates, based on this determination, a log-likelihood ratio (LLR) for each bit included in a data symbol from the post-filter baseband signal and the estimated signal, and outputs the LLRs. (However, instead of a soft decision value such as an LLR a hard decision value may be outputted, and a soft decision value instead of an LLR may be outputted.) (However, instead of a soft decision value such as an LLR a hard decision value may be outputted, and a soft decision value may be outputted instead of an LLR.)

A de-interleaver A208 receives log-likelihood ratios and a control signal as input, accumulates input, performs de-interleaving (permutes data) corresponding to interleaving used by the transmission device, and outputs post-de-interleaving log-likelihood ratios.

An error correction decoder A212 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method. The above describes operation when iterative detection is not performed, but the reception device may perform iterative detection as described for the reception device of FIG. 2.

Embodiment B

The present embodiment describes a scheme that can select a ring ratio of (12,4)16APSK for each channel even when a coding rate of error correction code is set to a given value (for example, coding rate set as K). In the following, (12,4)16APSK is described as a modulation scheme that selects ring ratios, but modulation schemes that select ring ratios are not limited to (12,4)16APSK.

Thus, by setting a suitable ring ratio for each channel, a reception device can achieve high data reception quality.

Figure 41:
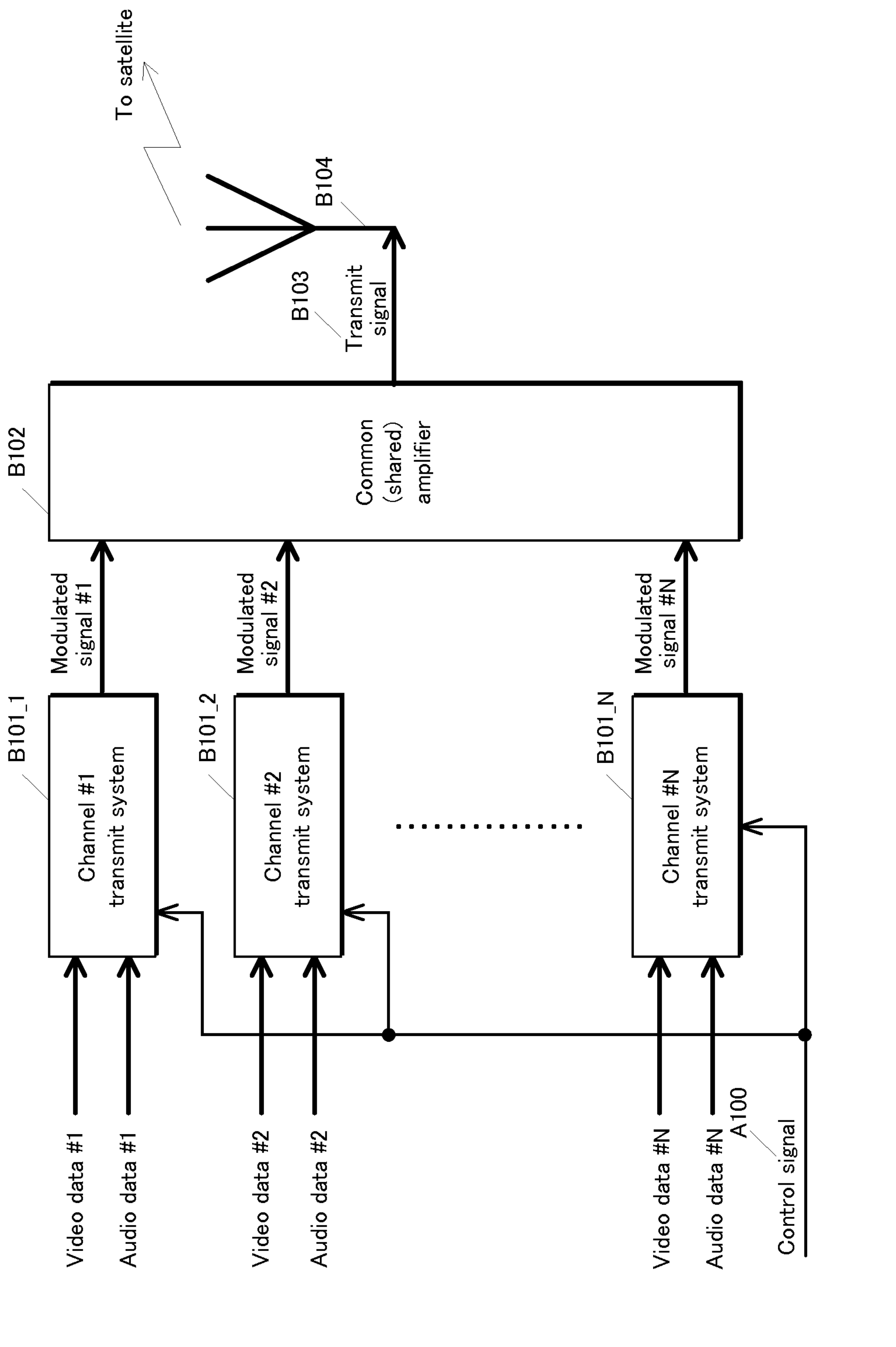
FIG. 41 illustrates an example configuration of a transmit station.
Figure 42:
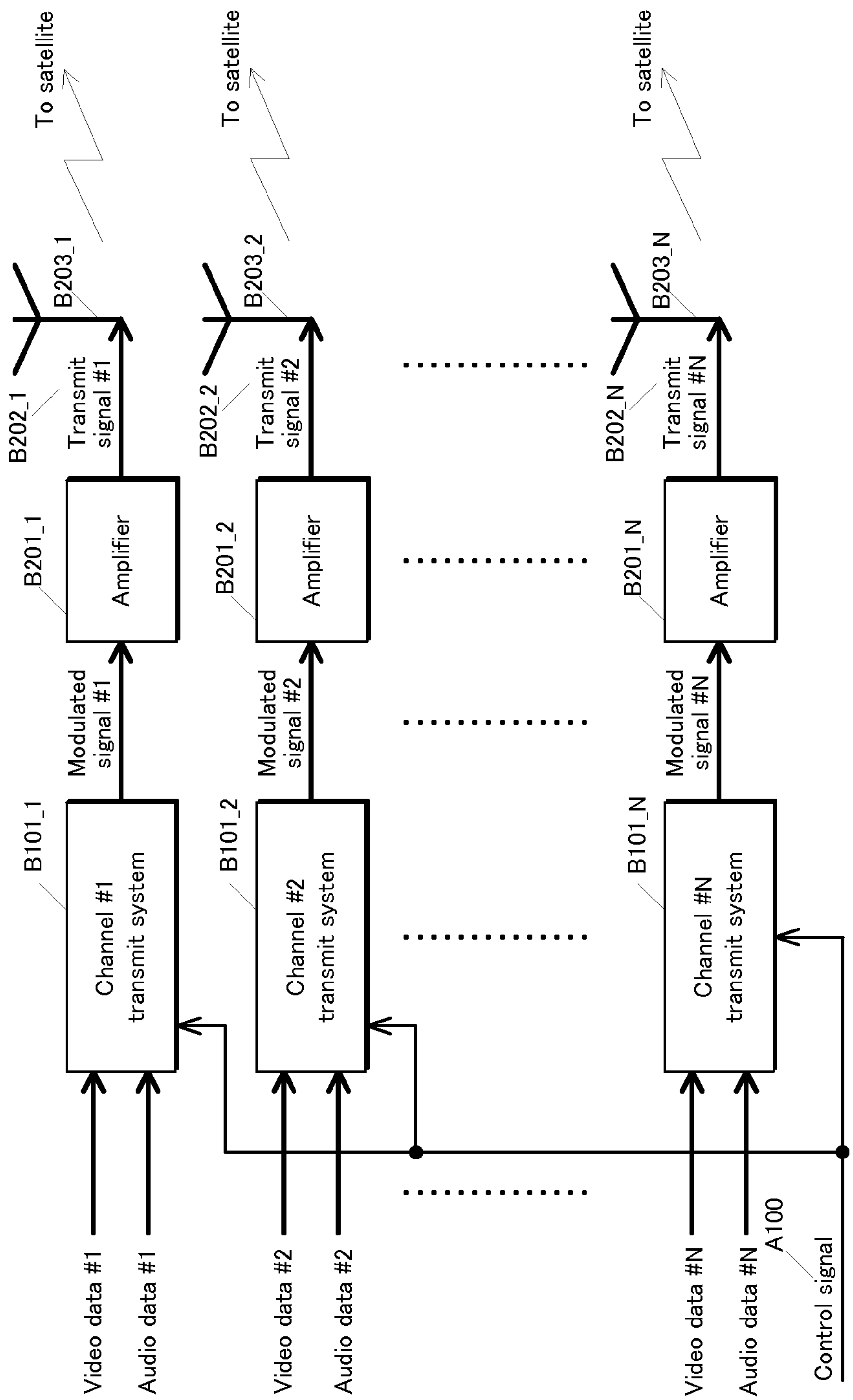
FIG. 42 illustrates an example configuration of a transmit station.
Figure 43:
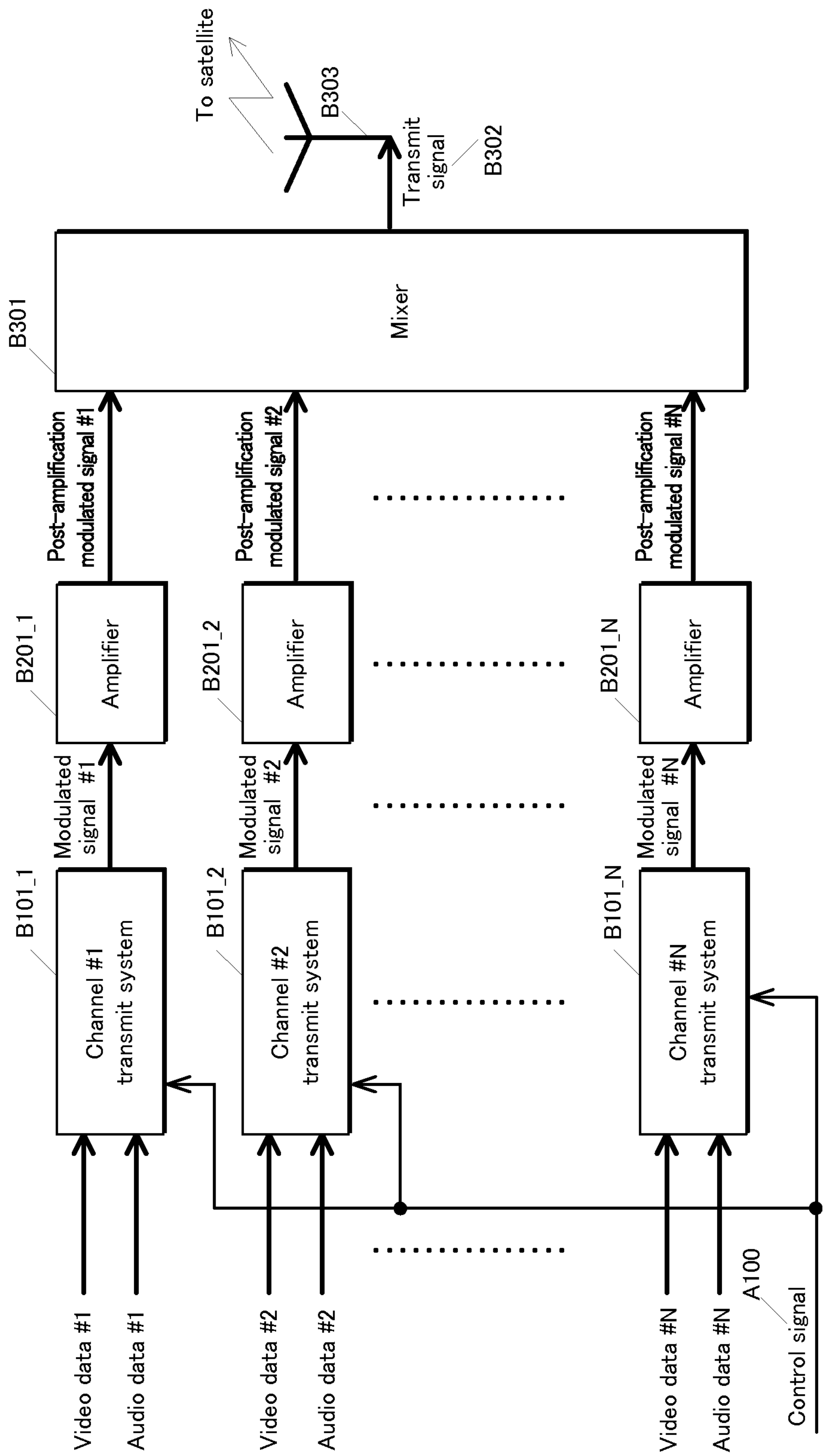
FIG. 43 illustrates an example configuration of a transmit station.
Figure 44:
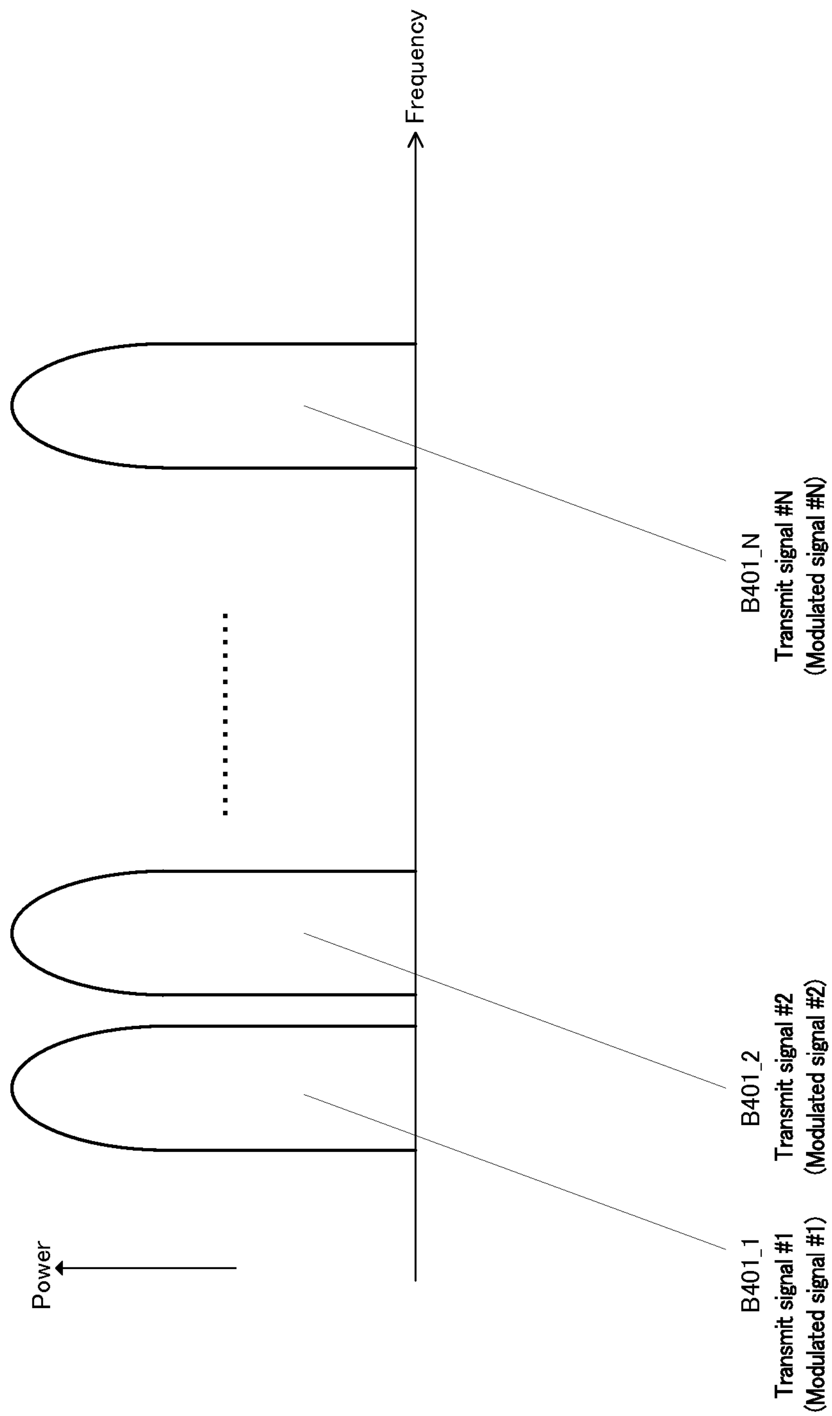
FIG. 44 illustrates an example of frequency allocation of signals.
Figure 45:
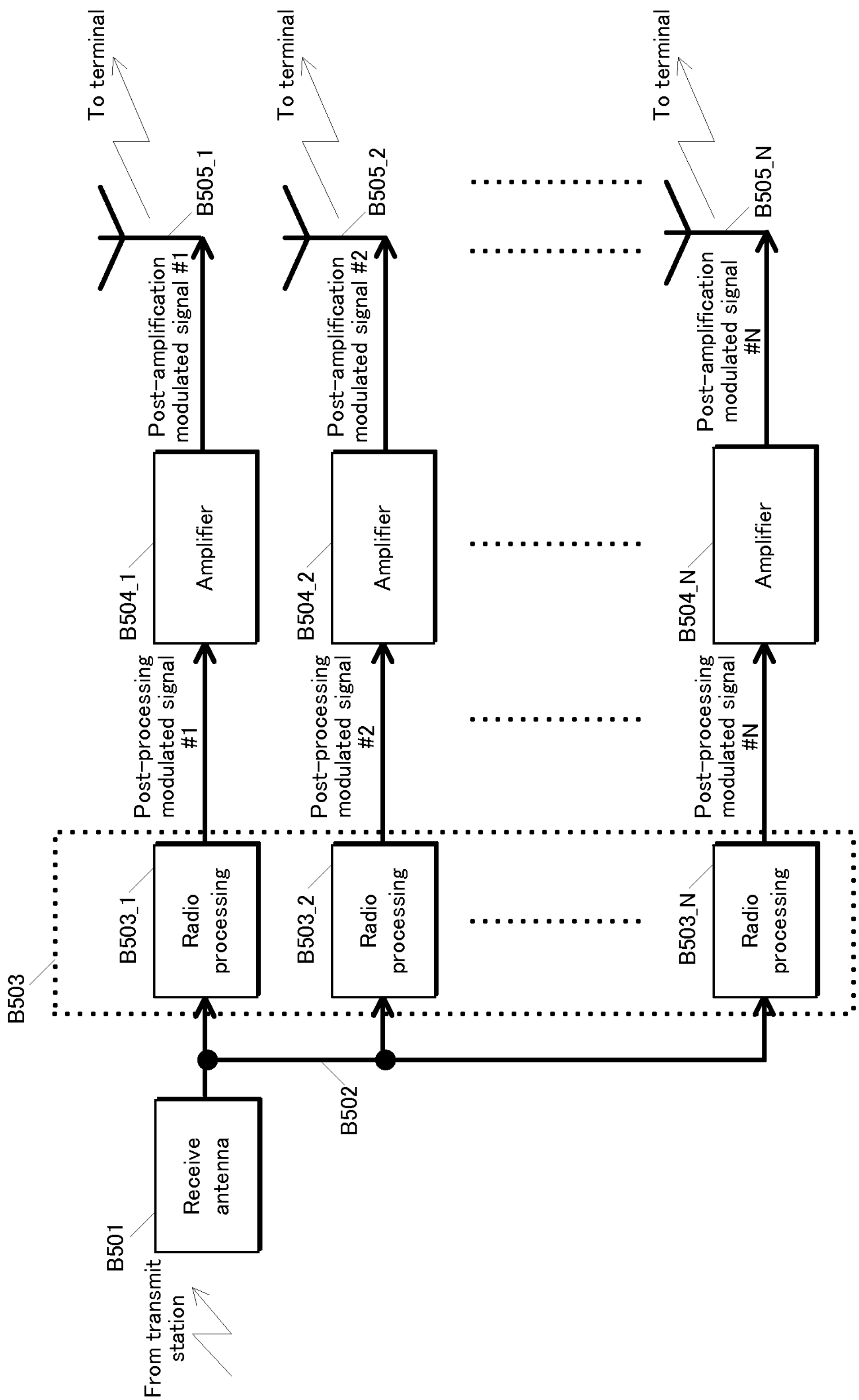
FIG. 45 illustrates an example configuration of a satellite.
Figure 46:
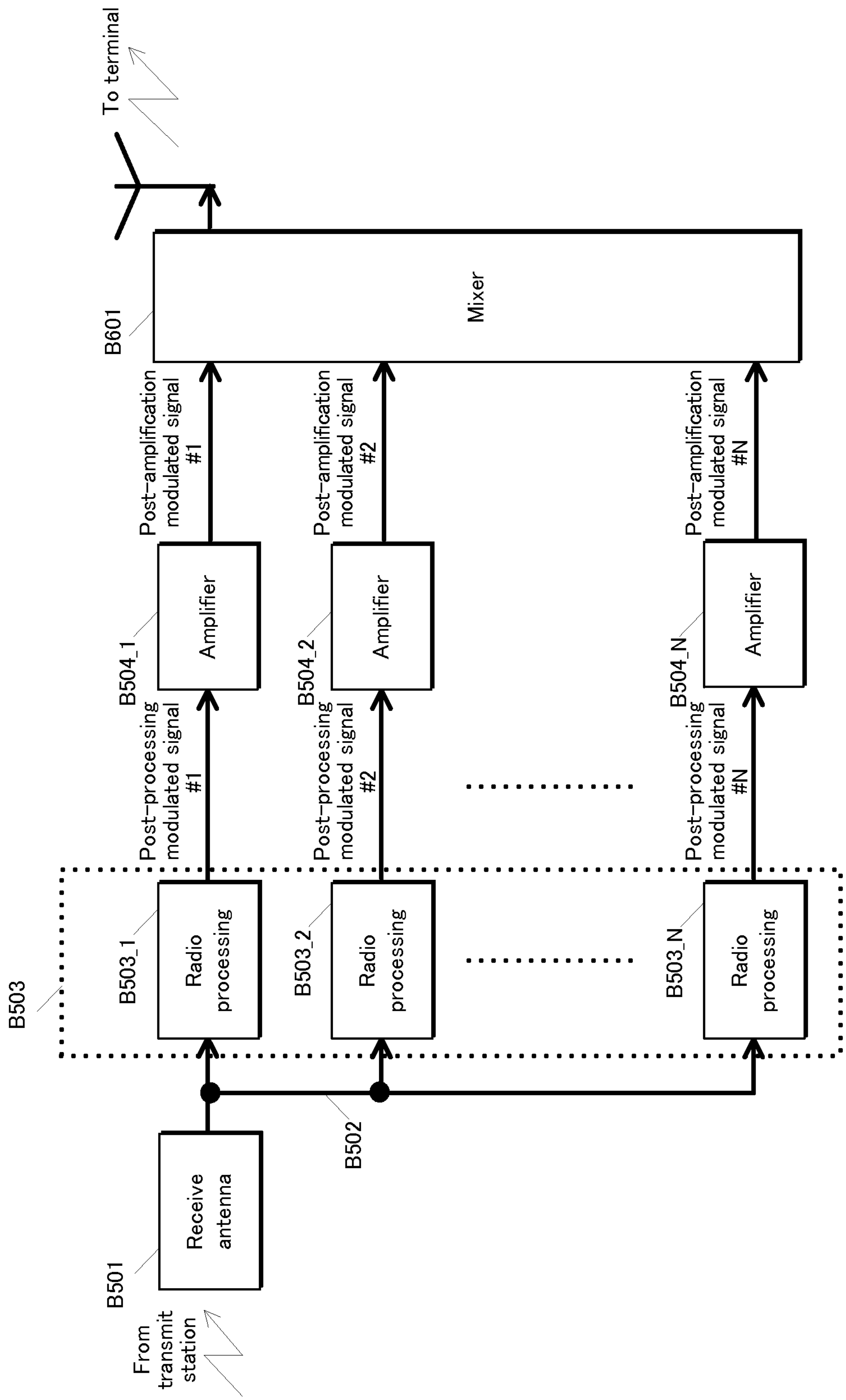
FIG. 46 illustrates an example configuration of a satellite.

FIG. 41 to FIG. 43 illustrate a terrestrial transmit station transmitting a transmit signal towards a satellite. FIG. 44 illustrates frequency allocation of each modulated signal. FIG. 45 and FIG. 46 illustrate examples of satellites (repeaters) that receive a signal transmitted by a terrestrial transmit station and transmit a modulated signal towards a terrestrial receive terminal.

Note that ring ratio (for example, (12,4)16APSK ring ratio) has been defined prior to the present embodiment, and ring ratio may also be referred to as "radius ratio".

<Transmit Station>

FIG. 41 illustrates an example of a transmit station having a common (shared) amplifier.

N transmit systems B101_1 to B101_N of FIG. 41 each receive video data, audio data, and the control signal A100 as input.

The control signal A100 specifies code length of error correction code, coding rate, modulation scheme, and ring ratio for each channel. This modulation scheme is, for example, specified as (12,4)16APSK.

Transmit systems B101_1 to B101_N generate modulated signals according to the control signal A100.

A common (shared) amplifier B102 receives modulated signals #1 to # N as input, amplifies the modulated signals, and outputs a post-amplification transmit signal B103 including the modulated signals #1 to # N.

The transmit signal B103 is composed of a signal of N channels of modulated signals #1 to # N and includes a "TMCC information symbol group" for each channel (each modulated signal). These "TMCC information symbol groups" include ring ratio information in addition to code length of error correction code, coding rate and modulation scheme.

Specifically, modulated signal #1 includes "TMCC information symbol group" in modulated signal #1 (channel #1), modulated signal #2 includes "TMCC information symbol group" in modulated signal #2 (channel #2), . . . , modulated signal # N includes "TMCC information symbol group" in modulated signal # N (channel # N).

Transmit signal B103 is transmitted via antenna B104.

FIG. 42 illustrates an example of a transmit station having an amplifier for each transmit system channel.

N amplifiers B201_1 to B201_N amplify a modulated signal inputted thereto, and output transmit signals B202_1 to B202_N. Transmit signals B202_1 to B202_N are transmitted via antennas B203_1 to B203_N.

The transmit station of FIG. 43 is an example of a transmit station that has an amplifier for each transmit system channel, but transmits after mixing by a mixer.

A mixer B301 mixes post-amplification modulated signals outputted from the amplifiers B201_1 to B201_N, and transmits a post-mixing transmit signal B302 via an antenna B303.

<Frequency Allocation of Each Modulated Signal>

FIG. 44 illustrates an example of frequency allocation of signals (transmit signals or modulated signals) B401_1 to B401_N. In FIG. 44, the horizontal axis is frequency and the vertical axis is power. As illustrated in FIG. 44, B401_1 indicates a position on a frequency axis of transmit signal #1 (modulated signal #1) in FIG. 41, FIG. 42, and FIG. 43; B401_2 indicates a position on the frequency axis of transmit signal #2 (modulated signal #2) in FIG. 41, FIG. 42, and FIG. 43; . . . ; and B401_N indicates a position on the frequency axis of transmit signal # N (modulated signal # N) in FIG. 41, FIG. 42, and FIG. 43.

<Satellite>

Referring to the satellite of FIG. 45, the receive antenna B501 receives a signal transmitted by a transmit station, and outputs the receive signal B502. Here, the receive signal B502 includes components of modulated signal #1 to modulated signal # N in FIG. 41, FIG. 42, FIG. 43, and FIG. 44.

B503 in FIG. 45 is a radio processor. The radio processor B503 includes radio processing B503_1 to B503_N.

Radio processing B503_1 receives the receive signal B502 as input, performs signal processing such as amplification and frequency conversion with respect to components of modulated signal #1 in FIG. 41, FIG. 42, FIG. 43, and FIG. 44, and outputs a post-signal processing modulated signal #1.

Likewise, radio processing B503_2 receives the receive signal B502 as input, performs signal processing such as amplification and frequency conversion with respect to components of modulated signal #2 in FIG. 41, FIG. 42, FIG. 43, and FIG. 44, and outputs a post-signal processing modulated signal #2.

Likewise, radio processing B503_N receives the receive signal B502 as input, performs signal processing such as amplification and frequency conversion with respect to components of modulated signal # N in FIG. 41, FIG. 42, FIG. 43, and FIG. 44, and outputs a post-signal processing modulated signal # N.

An amplifier B504_1 receives the post-signal processing modulated signal #1 as input, amplifies the post-signal processing modulated signal #1, and outputs a post-amplification modulated signal #1.

An amplifier B504_2 receives the post-signal processing modulated signal #2 as input, amplifies the post-signal processing modulated signal #2, and outputs a post-amplification modulated signal #2.

An amplifier B504_N receives the post-signal processing modulated signal # N as input, amplifies the post-signal processing modulated signal # N, and outputs a post-amplification modulated signal # N.

Thus, each post-amplification modulated signal is transmitted via a respective one of antennas B505_1 to B505_N. (A transmitted modulated signal is received by a terrestrial terminal.)

Here, frequency allocation of signals transmitted by a satellite (repeater) is described with reference to FIG. 44.

As previously described, referring to FIG. 44, B401_1 indicates a position on the frequency axis of transmit signal #1 (modulated signal #1) in FIG. 41, FIG. 42, and FIG. 43; B401_2 indicates a position on the frequency axis of transmit signal #2 (modulated signal #2) in FIG. 41, FIG. 42, and FIG. 43; . . . ; and B401_N indicates a position on the frequency axis of transmit signal # N (modulated signal # N) in FIG. 41, FIG. 42, and FIG. 43. Here, a frequency band being used is assumed to be a GHz.

Referring to FIG. 44, B401_1 indicates a position on the frequency axis of modulated signal #1 transmitted by the satellite (repeater) in FIG. 45; B401_2 indicates a position on the frequency axis of modulated signal #2 transmitted by the satellite (repeater) in FIG. 45; . . . ; and B401_N indicates a position on the frequency axis of modulated signal # N transmitted by the satellite (repeater) in FIG. 45. Here, a frequency band being used is assumed to be β GHz.

The satellite in FIG. 46 is different from the satellite in FIG. 45 in that a signal is transmitted after mixing at the mixer B601. Thus, the mixer B601 receives a post-amplification modulated signal #1, a post-amplification modulated signal #2, . . . , a post-amplification modulated signal # N as input, and generates a post-mixing modulated signal. Here, the post-mixing modulated signal includes a modulated signal #1 component, a modulated signal #2 component, . . . , and a modulated signal # N component, frequency allocation is as in FIG. 44, and is a signal in β GHz.

<Ring Ratio Selection>

Referring to the satellite systems described in FIG. 41 to FIG. 46, (12,4)16APSK ring ratio (radius ratio) is described as being selected for each channel from channel #1 to channel # N.

For example, when a code length (block length) of error correction code is X bits, among a plurality of selectable coding rates, a coding rate A (for example, ¾) is selected.

Referring to the satellite systems in FIG. 45 and FIG. 46, when distortion of the amplifiers B504_1, B504_2, . . . , B504_N is low (linearity of input and output is high), even when a ring ratio (radius ratio) of (12,4)16APSK is uniquely defined, as long as a suitable value is determined a (terrestrial) terminal (reception device) can achieve high data reception quality.

In satellite systems, amplifiers that can achieve high output are used in order to transmit modulated signals to terrestrial terminals. Thus, high-distortion amplifiers (linearity of input and output is low) are used, and the likelihood of distortion varying between amplifiers is high (distortion properties (input/output properties) of the amplifiers B504_1, B504_2, . . . , B504_N are different).

In this case, use of suitable (12,4)16APSK ring ratios (radius ratios) for each amplifier, i.e., selecting a suitable (12,4)16APSK ring ratio (radius ratio) for each channel, enables high data reception quality for each channel at a terminal. The transmit stations in FIG. 41, FIG. 42, and FIG. 43 perform this kind of setting by using the control signal A100.

Accordingly, information related to (12,4)16APSK ring ratios is included in, for example, control information such as TMCC that is included in each modulated signal (each channel). (This point is described in the previous embodiment.)

Accordingly, when the (terrestrial) transmit station in FIG. 41, FIG. 42, and FIG. 43 uses (12,4)16APSK as a modulation scheme of a data symbol of modulated signal #1, ring ratio information of the (12,4)16APSK is transmitted as a portion of control information.

Likewise, when the (terrestrial) transmit station in FIG. 41, FIG. 42, and FIG. 43 uses (12,4)16APSK as a modulation scheme of a data symbol of modulated signal #2, ring ratio information of the (12,4)16APSK is transmitted as a portion of control information.

Likewise, when the (terrestrial) transmit station in FIG. 41, FIG. 42, and FIG. 43 uses (12,4)16APSK as a modulation scheme of a data symbol of modulated signal # N, ring ratio information of the (12,4)16APSK is transmitted as a portion of control information.

A coding rate of error correction code used in modulated signal #1, a coding rate of error correction code used in modulated signal #2, . . . , and a coding rate of error correction code used in modulated signal # N may be identical.

<Reception Device>

A reception device is described that corresponds to the transmission method of the present embodiment.

The reception device (terminal) A200 of FIG. 40 receives, via the antenna A201, a radio signal transmitted by the transmit station in FIG. 41 and FIG. 42 and relayed by a satellite (repeater station). The RF receiver A202 performs processing such as frequency conversion and quadrature demodulation on a received radio signal, and outputs a baseband signal.

The demodulator A204 performs processing such as root roll-off filter processing, and outputs a post-filter baseband signal.

The synchronization and channel estimator A214 receives a post-filter baseband signal as input, performs time synchronization, frequency synchronization, and channel estimation, using, for example, a "synchronization symbol group" and "pilot symbol group" transmitted by the transmission device, and outputs an estimated signal.

The control information estimator A216 receives a post-filter baseband signal as input, extracts symbols including control information such as a "TMCC information symbol group", performs demodulation and decoding, and outputs a control signal. Of importance to the present embodiment is that a symbol transmitting "TMCC information symbol group" information is demodulated and decoded by the reception device A200. Thus, the control information estimator A216 generates information specifying a code length of error correction code, coding rate, modulation scheme, and ring ratio per channel, from values decoded at the reception device A200, and outputs the information as a portion of a control signal.

The de-mapper A206 receives a post-filter baseband signal, control signal, and estimated signal as input, determines, based on the control signal, a modulation scheme (or transmission method) and ring ratio used by "slots composed by a data symbol group", calculates, based on this determination, a log-likelihood ratio (LLR) for each bit included in a data symbol from the post-filter baseband signal and the estimated signal, and outputs the LLRs. (However, instead of a soft decision value such as an LLR a hard decision value may be outputted, and a soft decision value may be outputted instead of an LLR.)

The de-interleaver A208 receives log-likelihood ratios and a control signal as input, accumulates input, performs de-interleaving (permutes data) corresponding to interleaving used by the transmission device, and outputs post-de-interleaving log-likelihood ratios.

The error correction decoder A212 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method. The above describes operation when iterative detection is not performed, but the reception device may perform iterative detection as described for the reception device of FIG. 2.

A method of generating ring ratio information included in control information is not limited to the embodiment described prior to the present embodiment, and information related to ring ratios may be transmitted by any means.

Embodiment C

The present embodiment describes signaling (method of transmitting control information) for notifying a terminal of a ring ratio (for example (12,4)16APSK ring ratio).

Note that ring ratio (for example, (12,4)16APSK ring ratio) has been defined prior to the present embodiment, and ring ratio may also be referred to as "radius ratio".

Signaling as above can be performed by using bits included in a "TMCC information symbol group" as described in the present description.

In the present embodiment, an example of configuring a "TMCC information symbol group" is based on *Transmission System for Advanced Wide Band Digital Satellite Broadcasting*, ARIB Standard STD-B44, Ver. 1.0.

Information related to ring ratios for a transmit station to notify a terminal via a satellite (repeater) may accompany use of the 3614 bits of "extended information" within a "TMCC information symbol group" described with reference to FIG. 18. (This point is also disclosed in *Transmission System for Advanced Wide Band Digital Satellite Broadcasting*, ARIB Standard STD-B44, Ver. 1.0.) This is illustrated in FIG. 47.

Figure 47:
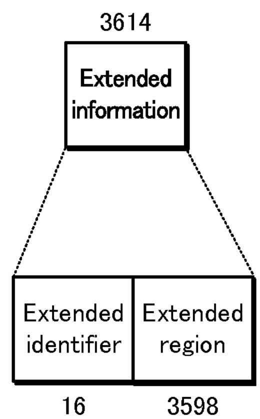
FIG. 47 illustrates an example configuration of extended information.

Extended information in FIG. 47 is a field used for conventional TMCC extended information, and is composed of 16 bits of an extended identifier and 3598 bits of an extended region. In "extended information" of TMCC in FIG. 47, when "scheme A" is applied, the extended identifier is all "0" (all 16 bits are zero) and the 3598 bits of the extended region are "1".

Further, when "scheme B" is applied, bits of the extended identifier have values other than all "0", i.e., values other than "0000000000000000", as TMCC information is extended. Whether scheme A or scheme B is applied may for example be determined by user settings.

"Scheme A" is a transmission scheme (for example, satellite digital broadcast) that determines a ring ratio when a coding rate of error correction code is set to a given value. (Ring ratio is uniquely determined when a coding rate of error correction code to be used is determined.)

"Scheme B" is a transmission scheme (for example, satellite digital broadcast) that can select a ring ratio to use from a plurality of ring ratios each time a coding rate of error correction code is set to a given value.

The following describes examples of signaling performed by a transmit station, with reference to FIG. 48 to FIG. 52, but in all the examples the following bits are used in signaling.

$d_0$: Indicates a scheme of satellite broadcasting.

$c_0c_1c_2c_3$: Indicate a table.

$b_0b_1b_2b_3$: Indicate coding rate (may also indicate ring ratio).

$x_0x_1x_2x_3x_4x_5$: Indicate ring ratio.

$y_0y_1y_2y_3y_4y_5$: Indicate difference of ring ratio.

Detailed description of the above bits is provided later.

The "coding rate" illustrated in FIG. 48, FIG. 49, FIG. 50, FIG. 51, and FIG. 52 is coding rate of error correction code, and although values of 41/120, 49/120, 61/120, and 109/120 are specifically illustrated, these values may be approximated as 41/120≈⅓, 49/120≈⅖, 61/120≈½, and 109/120≈9/10.

The following describes <Example 1> to <Example 5>.

Referring to extended information in FIG. 47, "scheme A" is selected when all bits of the extended identifier are "0" (all 16 bits are zero) and all 3598 bits of the extended region are "1".

First, a case is described in which a transmission device (transmit station) transmits a modulated signal using "scheme A".

When a transmission device (transmit station) selects (12,4)16APSK as a modulation scheme, a relationship between coding rate of error correction code and ring ratio of (12,4)16APSK is as follows.

TABLE 15

Relationship between coding rate and (12, 4)16APSK ring ratio (radius ratio) when "scheme A" is selected.

| Coding rate (approximate value) | Ring ratio |
|---|---|
| 41/120 (⅓) | 3.09 |
| 49/120 (⅖) | 2.97 |
| 61/120 (½) | 3.93 |
| 73/120 (⅗) | 2.87 |
| 81/120 (⅔) | 2.92 |
| 89/120 (¾) | 2.97 |
| 97/120 (⅘) | 2.73 |
| 101/120 (⅚) | 2.67 |
| 105/120 (⅞) | 2.76 |
| 109/120 (9/10) | 2.69 |

Accordingly, setting all bits of TMCC extended identifier to "0" (all 16 bits are zero) and setting all 3598 bits of TMCC extended region to "1" (a transmission device transmits these values) enables a reception device to determine that "scheme A" is selected, and further, coding rate information of error correction code is transmitted as a portion of TMCC. A reception device can determine a (12,4)16APSK ring ratio from this information when (12,4)16APSK is used as a modulation scheme.

Specifically, $b_0$, $b_1$, $b_2$, and $b_3$ are used as described above. A relationship between $b_0$ $b_1$, $b_2$, $b_3$, and coding rate of error correction code is as follows.

TABLE 16

Relationship between $b_1$, $b_2$, $b_3$, $b_4$ and coding rate of error correction code

| $b_0b_1b_2b_3$ | Coding rate (approximate value) |
|---|---|
| 0000 | 41/120 (⅓) |
| 0001 | 49/120 (⅖) |
| 0010 | 61/120 (½) |
| 0011 | 73/120 (⅗) |
| 0100 | 81/120 (⅔) |
| 0101 | 89/120 (¾) |
| 0110 | 97/120 (⅘) |
| 0111 | 101/120 (⅚) |
| 1000 | 105/120 (⅞) |
| 1001 | 109/120 (9/10) |

As in Table 16, when a transmission device (transmit station) uses 41/120 as a coding rate of error correction code, $(b_0b_1b_2b_3)$=(0000). Further, when 49/120 is used as a coding rate of error correction code, $(b_0b_1b_2b_3)$=(0001), . . . , when 109/120 is used as a coding rate of error correction code, $(b_0b_1b_2b_3)$=(1001). As a portion of TMCC, $b_0$, $b_1$, $b_2$, and $b_3$ are transmitted.

Accordingly, the following table can be made.

TABLE 17

Relationship between $b_0$, $b_1$, $b_2$, $b_3$, coding rate of error correction code, and ring ratio

| $b_0b_1b_2b_3$ | Coding rate (approximate value) | Ring ratio |
|---|---|---|
| 0000 | 41/120 (⅓) | 3.09 |
| 0001 | 49/120 (⅖) | 2.97 |
| 0010 | 61/120 (½) | 3.93 |
| 0011 | 73/120 (⅗) | 2.87 |
| 0100 | 81/120 (⅔) | 2.92 |
| 0101 | 89/120 (¾) | 2.97 |
| 0110 | 97/120 (⅘) | 2.73 |
| 0111 | 101/120 (⅚) | 2.67 |
| 1000 | 105/120 (⅞) | 2.76 |
| 1001 | 109/120 (9/10) | 2.69 |

As can be seen from Table 17:

When a transmission device (transmit station) is set to $(b_0b_1b_2b_3)$=(0000), a coding rate of error correction code is 41/120, and when (12,4)16APSK is used, a ring ratio (radius ratio) is 3.09.

When a transmission device (transmit station) is set to $(b_0b_1b_2b_3)$=(0001), a coding rate of error correction code is 49/120, and when (12,4)16APSK is used, a ring ratio (radius ratio) is 2.97.

When a transmission device (transmit station) is set to $(b_0b_1b_2b_3)$=(0010), a coding rate of error correction code is 61/120, and when (12,4)16APSK is used, a ring ratio (radius ratio) is 3.93.

When a transmission device (transmit station) is set to $(b_0b_1b_2b_3)$=(0011), a coding rate of error correction code is 73/120, and when (12,4)16APSK is used, a ring ratio (radius ratio) is 2.87.

When a transmission device (transmit station) is set to $(b_0b_1b_2b_3)$=(0100), a coding rate of error correction code is 81/120, and when (12,4)16APSK is used, a ring ratio (radius ratio) is 2.92.

When a transmission device (transmit station) is set to $(b_0b_1b_2b_3)$=(0101), a coding rate of error correction code is 89/120, and when (12,4)16APSK is used, a ring ratio (radius ratio) is 2.97.

When a transmission device (transmit station) is set to $(b_0b_1b_2b_3)$=(0110), a coding rate of error correction code is 97/120, and when (12,4)16APSK is used, a ring ratio (radius ratio) is 2.73.

When a transmission device (transmit station) is set to $(b_0b_1b_2b_3)$=(0111), a coding rate of error correction code is 101/120, and when (12,4)16APSK is used, a ring ratio (radius ratio) is 2.67.

When a transmission device (transmit station) is set to $(b_0b_1b_2b_3)$=(1000), a coding rate of error correction code is 105/120, and when (12,4)16APSK is used, a ring ratio (radius ratio) is 2.76.

When a transmission device (transmit station) is set to $(b_0b_1b_2b_3)$=(1001), a coding rate of error correction code is 109/120, and when (12,4)16APSK is used, a ring ratio (radius ratio) is 2.69.

Accordingly, the transmission device (transmit station):

Sets all bits of TMCC extended information to "0" (all 16 bits are zero) and all 3598 bits of TMCC extended region to "1", in order to notify a reception device that "scheme A" is being used.

Transmitting $b_0b_1b_2b_3$ in order that coding rate of error correction code and (12,4)16APSK can be estimated.

The following describes a case in which a transmission device (of a transmit station) transmits data using "scheme B".

As described above, when "scheme B" is applied, bits of the extended identifier have values other than all "0", i.e., values other than "0000000000000000", as TMCC information is extended. Here, as an example, when "0000000000000001" is transmitted as an extended identifier, a transmission device (of a transmit station) transmits data using "scheme B".

When the 16 bits of an extended identifier are represented as $d_{15}, d_{14}, d_{13}, d_{12}, d_{11}, d_{10}, d_9, d_8, d_7, d_6, d_5, d_4, d_3, d_2, d_1, d_0$, in a case in which "scheme B" is applied, $(d_{15}, d_{14}, d_{13}, d_{12}, d_{11}, d_{10}, d_9, d_8, d_7, d_6, d_5, d_4, d_3, d_2, d_1, d_0)$=(0, 0, 0, 0, 0, 0, 0, 0, 0, 0, 0, 0, 0, 0, 0, 1). (When "scheme B" is applied as described above it suffices that $(d_{15}, d_{14}, d_{13}, d_{12}, d_{11}, d_{10}, d_9, d_8, d_7, d_6, d_5, d_4, d_3, d_2, d_1, d_0)$ are set to values other than (0, 0, 0, 0, 0, 0, 0, 0, 0, 0, 0, 0, 0, 0, 0, 0), and are therefore not limited to the example of $(d_{15}, d_{14}, d_{13}, d_{12}, d_{11}, d_{10}, d_9, d_8, d_7, d_6, d_5, d_4, d_3, d_2, d_1, d_0)$=(0, 0, 0, 0, 0, 0, 0, 0, 0, 0, 0, 0, 0, 0, 0, 1).)

As specific examples, <Example 1> to <Example 5> are described below.

Example 1

In example 1, a plurality of ring ratios are prepared in a table of (12,4)16APSK ring ratios, and therefore different ring ratios can be set for one coding rate.

As an example a case is described in which "satellite broadcasting scheme: "scheme B", coding rate: 41/120, and (12,4)16APSK ring ratio: 4.00" are set. (Note that it is assumed that (12,4)16APSK is selected as a modulation scheme.)

As illustrated in FIG. 48, table 1, table 2, . . . , table 16, in other words 16 tables, table 1 to table 16, are prepared. Each table associates $(b_0b_1b_2b_3)$ values as described above, coding rates of error correction code, and (12,4)16APSK ring ratios with each other.

For example, in table 1, when a coding rate of error correction code for generating a data symbol is 41/120 and a (12,4)16APSK ring ratio is 3.09, $(b_0b_1b_2b_3)$=(0000). In the same way, when a coding rate of error correction code for generating a data symbol is 49/120 and a (12,4)16APSK ring ratio is 2.97, $(b_0b_1b_2b_3)$=(0001) . . . . When a coding rate of error correction code for generating a data symbol is 109/120 and a (12,4)16APSK ring ratio is 3.09, $(b_0b_1b_2b_3)$=(1001).

In table 2, when a coding rate of error correction code for generating a data symbol is 41/120 and a (12,4)16APSK ring ratio is 4.00, $(b_0b_1b_2b_3)$=(0000). In the same way, when a coding rate of error correction code for generating a data symbol is 49/120 and a (12,4)16APSK ring ratio is 3.91, $(b_0b_1b_2b_3)$=(0001) . . . . When a coding rate of error correction code for generating a data symbol is 109/120 and a (12,4)16APSK ring ratio is 3.60, $(b_0b_1b_2b_3)$=(1001).

In table 16, when a coding rate of error correction code for generating a data symbol is 41/120 and a (12,4)16APSK ring ratio is 2.59, $(b_0b_1b_2b_3)$=(0000). In the same way, when a coding rate of error correction code for generating a data symbol is 49/120 and a (12,4)16APSK ring ratio is 2.50, $(b_0b_1b_2b_3)$=(0001) . . . . When a coding rate of error correction code for generating a data symbol is 109/120 and a (12,4)16APSK ring ratio is 2.23, $(b_0b_1b_2b_3)$=(1001).

In table 1 to table 16, although not described above, $b_0b_1b_2b_3$ values and (12,4)16APSK ring ratios are associated with each of coding rates of error correction code 41/120, 49/120, 61/120, 73/120, 81/120, 89/120, 97/120, 101/120, 105/120, and 109/120.

Further, as illustrated in FIG. 48, association between $c_0c_1c_2c_3$ values and table selected is performed. When table 1 is selected, $(c_0,c_1,c_2,c_3)$=(0,0,0,0), when table 2 is selected, $(c_0,c_1,c_2,c_3)$=(0,0,0,1), . . . , and when table 16 is selected, $(c_0,c_1,c_2,c_3)$=(1,1,1,1).

The following describes a method of setting, for example, "satellite broadcasting scheme: "scheme B", coding rate: 41/120, and (12,4)16APSK ring ratio: 4.00".

First, as above, "scheme B" is selected so $d_0$="1" is set.

Further, as illustrated in FIG. 48, a first line of table 2 shows a coding rate 41/120 and a (12,4)16APSK ring ratio 4.00, and therefore $b_0b_1b_2b_3$="0000".

Accordingly, a value $c_0c_1c_2c_3$="0001" for indicating table 2 among 16 tables, table 1 to 16.

Accordingly, when a transmission device (transmit station) transmits a data symbol when "satellite broadcasting scheme: "scheme B", coding rate: 41/120, and (12,4) 16APSK ring ratio: 4.00", the transmission device transmits $d_0$="1", $b_0b_1b_2b_3$="0000", and $c_0c_1c_2c_3$="0001" control information (a portion of TMCC information) along with the data symbol. Note that, as control information, transmission is also required of control information indicating that a modulation scheme of the data symbol is (12,4)16APSK.

In other words, in <Example 1>:

A plurality of tables are prepared that associates $b_0b_1b_2b_3$ values and (12,4)16APSK ring ratios with each of coding rates of error correction code 41/120, 49/120, 61/120, 73/120, 81/120, 89/120, 97/120, 101/120, 105/120, and 109/120.

$c_0c_1c_2c_3$ indicates a used table and is transmitted by a transmission device (transmit station).

Thus, a transmission device transmits ring ratio information of (12,4)16APSK used to generate a data symbol.

Note that a method of setting (12,4)16APSK ring ratios when a transmission device (transmit station) uses "scheme A" is as described prior to the description of <Example 1>.

Example 2

Example 2 is a modification of <Example 1>.

The following describes a case in which a transmission device (transmit station) selects "scheme B". Here, a transmission device (transmit station) selects "scheme B", and therefore $d_0$="1" is set, as indicated in FIG. 49.

Subsequently, the transmission device (transmit station) sets a value of $z_0$. When a (12,4)16APSK ring ratio is set by the same method as "scheme A", $z_0$=0 is set. When $z_0$=0 is set, a coding rate of error correction code is determined from $b_0$, $b_1$, $b_2$, $b_3$ in table 16 and (12,4)16APSK ring ratio is determined from table 15. (See Table 17)

When a (12,4)16APSK ring ratio is set by the same method as in Example 1, $z_0$=1 is set. Thus, (12,4)16APSK ring ratio is not determined based on table 15, but is determined in the way described in Example 1.

As an example a case is described in which "satellite broadcasting scheme: "scheme B", coding rate: 41/120, and (12,4)16APSK ring ratio: 4.00" are set. (Note that it is assumed that (12,4)16APSK is selected as a modulation scheme and $z_0$=1.)

As illustrated in FIG. 49, table 1, table 2, . . . , table 16, in other words 16 tables, table 1 to table 16, are prepared.

Each table associates ($b_0b_1b_2b_3$) values as described above, coding rates of error correction code, and (12,4) 16APSK ring ratios with each other.

For example, in table 1, when a coding rate of error correction code for generating a data symbol is 41/120 and a (12,4)16APSK ring ratio is 3.09, ($b_0b_1b_2b_3$)=(0000). In the same way, when a coding rate of error correction code for generating a data symbol is 49/120 and a (12,4)16APSK ring ratio is 2.97, ($b_0b_1b_2b_3$)=(0001) . . . . When a coding rate of error correction code for generating a data symbol is 109/120 and a (12,4)16APSK ring ratio is 3.09, ($b_0b_1b_2b_3$)=(1001).

In table 2, when a coding rate of error correction code for generating a data symbol is 41/120 and a (12,4)16APSK ring ratio is 4.00, ($b_0b_1b_2b_3$)=(0000). In the same way, when a coding rate of error correction code for generating a data symbol is 49/120 and a (12,4)16APSK ring ratio is 3.91, ($b_0b_1b_2b_3$)=(0001) . . . . When a coding rate of error correction code for generating a data symbol is 109/120 and a (12,4)16APSK ring ratio is 3.60, ($b_0b_1b_2b_3$)=(1001).

In table 16, when a coding rate of error correction code for generating a data symbol is 41/120 and a (12,4)16APSK ring ratio is 2.59, ($b_0b_1b_2b_3$)=(0000). In the same way, when a coding rate of error correction code for generating a data symbol is 49/120 and a (12,4)16APSK ring ratio is 2.50, ($b_0b_1b_2b_3$)=(0001) . . . . When a coding rate of error correction code for generating a data symbol is 109/120 and a (12,4)12APSK ring ratio is 2.23, ($b_0b_1b_2b_3$)=(1001).

In table 1 to table 16, although not described above, $b_0b_1b_2b_3$ values and (12,4)16APSK ring ratios are associated with each of coding rates of error correction code 41/120, 49/120, 61/120, 73/120, 81/120, 89/120, 97/120, 101/120, 105/120, and 109/120.

Further, as illustrated in FIG. 49, association between $c_0c_1c_2c_3$ values and table selected is performed. When table 1 is selected, ($c_0$,$c_1$,$c_2$,$c_3$)=(0,0,0,0), when table 2 is selected, ($c_0$,$c_1$,$c_2$,$c_3$)=(0,0,0,1), . . . , and when table 16 is selected, ($c_0$,$c_1$,$c_2$,$c_3$)=(1,1,1,1).

The following describes a method of setting, for example, "satellite broadcasting scheme: "scheme B", coding rate: 41/120, and (12,4)16APSK ring ratio: 4.00".

First, as above, "scheme B" is selected so $d_0$="1" is set. Further, $z_0$=1 is set.

Further, as illustrated in FIG. 49, a first line of table 2 shows a coding rate 41/120 and a (12,4)16APSK ring ratio 4.00, and therefore $b_0b_1b_2b_3$="0000".

Accordingly, a value $c_0c_1c_2c_3$="0001" for indicating table 2 among 16 tables, table 1 to 16.

Accordingly, when a transmission device (transmit station) transmits a data symbol so that "satellite broadcasting scheme: "scheme B", coding rate: 41/120, and (12,4) 16APSK ring ratio: 4.00", the transmission device transmits $d_0$="1", $z_0$=1, $b_0b_1b_2b_3$="0000", and $c_0c_1c_2c_3$="0001" control information (a portion of TMCC information) along with the data symbol. Note that, as control information, transmission is also required of control information indicating that a modulation scheme of the data symbol is (12,4) 16APSK.

Note that a method of setting (12,4)16APSK ring ratios when a transmission device (transmit station) uses "scheme A" is as described prior to the description of <Example 1>.

Example 3

Example 3 is characterized by signaling being performed by a value indicating ring ratio.

First, as in <Example 1> and <Example 2>, a transmission device (transmit station) transmits a modulated signal by "scheme B", and therefore $d_0$="1" is set.

Thus, as illustrated in FIG. 50, values of $x_0x_1x_2x_3x_4x_5$ and (12,4)16APSK ring ratios are associated with each other. For example, as illustrated in FIG. 50, when a transmission device (transmit station) is set so that when ($x_0$,$x_1$,$x_2$,$x_3$,$x_4$,$x_5$)=(0,0,0,0,0,0), (12,4)16APSK ring ratio is set to 2.00, . . . , when ($x_0$,$x_1$,$x_2$,$x_3$,$x_4$,$x_5$)=(1,1,1,1,1,1), (12,4) 16APSK ring ratio is set to 4.00.

As an example, the following describes a method of setting, for example, "satellite broadcasting scheme: "scheme B", and (12,4)16APSK ring ratio: 2.00".

In this example, a transmission device (transmit station) sets $x_0x_1x_2x_3x_4x_5$="000000" from "relationship between $x_0x_1x_2x_3x_4x_5$ value and (12,4)16APSK ring ratio" in FIG. 50.

Accordingly, when a transmission device (transmit station) transmits a data symbol so that "satellite broadcast scheme: "scheme B" and (12,4)16APSK ring ratio: 2.00", the transmission device transmits $d_0$="1" and $x_0x_1x_2x_3x_4x_5$="000000" control information (a portion of TMCC information) along with the data symbol. Note that, as control information, transmission is also required of control information indicating that a modulation scheme of the data symbol is (12,4)16APSK.

Note that a method of setting (12,4)16APSK ring ratios when a transmission device (transmit station) uses "scheme A" is as described prior to the description of <Example 1>.

Example 4

Example 4 implements signaling of a desired (12,4)16APSK ring ratio by $b_0b_1b_2b_3$, indicating coding rate of error correction code and (12,4)16APSK ring ratio in a main table, and $y_0y_1y_2y_3y_4y_5$, indicating ring ratio difference.

An important point in Example 4 is that the main table illustrated in FIG. 51 is composed of the relationship between $b_0,b_1,b_2,b_3$, coding rate of error correction code, and ring ratio from Table 17, in other words "scheme A".

Further characterizing points of Example 4 are described below.

FIG. 51 illustrates a difference table. The difference table is a table for difference information from (12,4)16APSK ring ratios set using the main table. Based on the main table, a (12,4)16APSK ring ratio is, for example, set as h.

Thus, the following is true.

When a transmission device (transmit station) sets $(y_0y_1y_2y_3y_4y_5)$=(011110), (12,4)16APSK ring ratio is set to h+0.4.

When a transmission device (transmit station) sets $(y_0y_1y_2y_3y_4y_5)$=(011111), (12,4)16APSK ring ratio is set to h+0.2.

When a transmission device (transmit station) sets $(y_0y_1y_2y_3y_4y_5)$=(100000), (12,4)16APSK ring ratio is set to h+0.

When a transmission device (transmit station) sets $(y_0y_1y_2y_3y_4y_5)$=(100001), (12,4)16APSK ring ratio is set to h−0.2.

When a transmission device (transmit station) sets $(y_0y_1y_2y_3y_4y_5)$=(100010), (12,4)16APSK ring ratio is set to h−0.4.

Accordingly, a transmission device determines $(y_0y_1y_2y_3y_4y_5)$ and thereby determines a correction value f with respect to a (12,4)16APSK ring ratio h determined by the main table, and sets a (12,4)16APSK ring ratio to h+f.

As an example, the following describes a method of setting "satellite broadcasting scheme: "scheme B", coding rate: 41/120, and (12,4)16APSK ring ratio: 3.49".

First, a transmission device selects "scheme B" and therefore sets $d_0$="1".

Subsequently, the transmission device sets $b_0b_1b_2b_3$="0000" to select coding rate 41/120 from the main table of FIG. 51.

Since the (12,4)16APSK ring ratio corresponding to $b_0b_1b_2b_3$="0000" in the main table is 3.09, the difference between the ring ratio 3.49 to be set and the ring ratio 3.09 is 3.49−3.09=+0.4.

Thus, the transmission device sets $y_0y_1y_2y_3y_4y_5$="011110", which indicates "+0.4" in the difference table.

Accordingly, when the transmission device (transmit station) transmits a data symbol so that "satellite broadcasting scheme: "scheme B", coding rate: 41/120, and (12,4)16APSK ring ratio: 3.49", the transmission device transmits $d_0$="1", $b_0b_1b_2b_3$="0000", $y_0y_1y_2y_3y_4y_5$="011110" control information (a portion of TMCC information) along with the data symbol. Note that, as control information, transmission is also required of control information indicating that a modulation scheme of the data symbol is (12,4)16APSK.

Example 4 uses a portion of the main table of "scheme A" even when using "scheme B", and therefore a portion of "scheme A" is suitable for use in "scheme B".

Note that a method of setting (12,4)16APSK ring ratios when a transmission device (transmit station) uses "scheme A" is as described prior to the description of <Example 1>.

In FIG. 51 a single difference table is provided but a plurality of difference tables may be provided. For example, difference table 1 to difference table 16 may be provided. Thus, as in FIG. 48 and FIG. 49, a difference table to be used may be selected by $c_0c_1c_2c_3$. Accordingly, a transmission device sets $c_0c_1c_2c_3$ in addition to $d_0$, $b_0b_1b_2b_3$, and $y_0y_1y_2y_3y_4y_5$, and transmits $c_0c_1c_2c_3$ in addition to $d_0$, $b_0b_1b_2b_3$, and $y_0y_1y_2y_3y_4y_5$ as a portion of control information along with a data symbol.

Further, from a value of $y_0y_1y_2y_3y_4y_5$ in a difference table being used, a correction value f is obtained for a (12,4)16APSK ring ratio h determined by using the main table.

Example 5

Example 5 implements signaling of a desired ring ratio by using $b_0b_1b_2b_3$, indicating coding rate of error correction code and (12,4)16APSK ring ratio in a main table, and $y_0y_1y_2y_3y_4y_5$, indicating ring ratio difference.

An important point in Example 5 is that the main table illustrated in FIG. 52 is composed of the relationship between $b_0,b_1,b_2,b_3$, coding rate of error correction code, and ring ratio from Table 17, in other words "scheme A".

Further characterizing points of Example 5 are described below.

FIG. 52 illustrates a difference table. The difference table is a table for difference information from (12,4)16APSK ring ratios set using the main table. Based on the main table, a (12,4)16APSK ring ratio is, for example, set as h.

Thus, the following is true.

When a transmission device (transmit station) sets $(y_0y_1y_2y_3y_4y_5)$=(011110), (12,4)16APSK ring ratio is set to h×1.2.

When a transmission device (transmit station) sets $(y_0y_1y_2y_3y_4y_5)$=(011111), (12,4)16APSK ring ratio is set to h×1.1.

When a transmission device (transmit station) sets $(y_0y_1y_2y_3y_4y_5)$=(100000), (12,4)16APSK ring ratio is set to h×1.0.

When a transmission device (transmit station) sets $(y_0y_1y_2y_3y_4y_5)$=(100001), (12,4)16APSK ring ratio is set to h×0.9.

When a transmission device (transmit station) sets $(y_0y_1y_2y_3y_4y_5)$=(100010), (12,4)16APSK ring ratio is set to h×0.8.

Accordingly, a transmission device determines $(y_0y_1y_2y_3y_4y_5)$ and thereby determines a correction coefficient g with respect to a (12,4)16APSK ring ratio h determined by the main table, and sets a (12,4)16APSK ring ratio to h×g.

As an example, the following describes a method of setting "satellite broadcasting scheme: "scheme B", coding rate: 41/120, and (12,4)16APSK ring ratio: 2.78".

First, a transmission device selects "scheme B" and therefore sets $d_0$="1".

Subsequently, the transmission device sets $b_0b_1b_2b_3$="0000" to select coding rate 41/120 from the main table of FIG. 52.

Since the (12,4)16APSK ring ratio corresponding to $b_0b_1b_2b_3$="0000" in the main table is 3.09, the difference indicated by multiplication between the ring ratio to be set 2.78 and 3.09 is 2.78/3.09=0.9.

Thus, the transmission device sets $y_0y_1y_2y_3y_4y_5$="100001", which indicates "×0.9" in the difference table.

Accordingly, when a transmission device (transmit station) transmits a data symbol so that "satellite broadcasting scheme: "scheme B", coding rate: 41/120, and (12,4) 16APSK ring ratio: 2.78", the transmission device transmits $d_0$="1", $b_0b_1b_2b_3$="0000", and $y_0y_1y_2y_3y_4y_5$="100001" control information (portion of TMCC information) along with the data symbol. Note that, as control information, transmission is also required of control information indicating that a modulation scheme of the data symbol is (12,4) 16APSK.

Example 5 uses a portion of the main table of "scheme A" even when using "scheme B", and therefore a portion of "scheme A" is suitable for use in "scheme B".

Not that a method of setting (12,4)16APSK ring ratios when a transmission device (transmit station) uses "scheme A" is as described prior to the description of <Example 1>.

In FIG. 52 a single difference table is provided but a plurality of difference tables may be provided. For example, difference table 1 to difference table 16 may be provided. Thus, as in FIG. 48 and FIG. 49, a difference table to be used may be selected by $c_0c_1c_2c_3$. Accordingly, a transmission device sets $c_0c_1c_2c_3$ in addition to $d_0$, $b_0b_1b_2b_3$, and $y_0y_1y_2y_3y_4y_5$, and transmits $c_0c_1c_2c_3$ in addition to $d_0$, $b_0b_1b_2b_3$, and $y_0y_1y_2y_3y_4y_5$ as a portion of control information along with a data symbol.

Further, from a value of $y_0y_1y_2y_3y_4y_5$ in a difference table being used, a correction coefficient g is obtained for a (12,4)16APSK ring ratio h determined by using the main table.

<Reception Device>

The following describes configuration common to <Example 1> to <Example 5> of a reception device corresponding to a transmission method of the present embodiment and subsequently describes specific processing for each example.

The terrestrial reception device (terminal) A200 of FIG. 40 receives, via the antenna A201, a radio signal transmitted by the transmit station of FIG. 39 and relayed by a satellite (repeater station). The RF receiver A202 performs processing such as frequency conversion and quadrature demodulation on a received radio signal, and outputs a baseband signal.

The demodulator A204 performs processing such as root roll-off filter processing, and outputs a post-filter baseband signal.

The synchronization and channel estimator A214 receives a post-filter baseband signal as input, performs time synchronization, frequency synchronization, and channel estimation, using, for example, a "synchronization symbol group" and "pilot symbol group" transmitted by the transmission device, and outputs an estimated signal.

The control information estimator A216 receives a post-filter baseband signal as input, extracts symbols including control information such as a "TMCC information symbol group", performs demodulation and decoding, and outputs a control signal.

Of importance to the present embodiment is that control information included in "TMCC information symbol group" is estimated by the control information estimator A216 and outputted as a control signal, and that $d_0$, $z_0$, $c_0c_1c_2c_3$, $b_0b_1b_2b_3$, $x_0x_1x_2x_3x_4x_5$, and $y_0y_1y_2y_3y_4y_5$ information, described above, is included in the control signal.

The de-mapper A206 receives a post-filter baseband signal, control signal, and estimated signal as input, determines, based on the control signal, a modulation scheme (or transmission method) and ring ratio used by "slots composed by a data symbol group", calculates, based on this determination, a log-likelihood ratio (LLR) for each bit included in a data symbol from the post-filter baseband signal and the estimated signal, and outputs the LLRs. (However, instead of a soft decision value such as an LLR a hard decision value may be outputted, and a soft decision value may be outputted instead of an LLR.)

The de-interleaver A208 receives log-likelihood ratios and a control signal as input, accumulates input, performs de-interleaving (permutes data) corresponding to interleaving used by the transmission device, and outputs post-de-interleaving log-likelihood ratios.

The error correction decoder A212 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method. The above describes operation when iterative detection is not performed, but the reception device may perform iterative detection as described for the reception device of FIG. 2.

Such a reception device stores tables that are the same as the tables indicates in <Example 1> to <Example 5>, described above, and, by performing operations in reverse of that described in <Example 1> to <Example 5>, estimates a satellite broadcasting scheme, coding rate of error correction code, and (12,4)16APSK ring ratio, and performs demodulation and decoding. The following describes each example separately.

In the following, the control information estimator A216 of a reception device is assumed to determine that a modulation scheme of a data symbol is (12,4)16APSK from TMCC information.

<<Reception Device Corresponding to Example 1>>

When a transmission device (transmit station) transmits a modulated signal by "scheme A":

When the control information estimator A216 of a reception device obtains $d_0$="0", the control information estimator A216 determines that a data symbol is a symbol transmitted by "scheme A". By obtaining a value of $b_0b_1b_2b_3$, when the data symbol is a (12,4)16APSK symbol, the control information estimator A216 estimates a (12,4) 16APSK ring ratio. The de-mapper A206 performs demodulation of the data symbol based on the above estimated information.

When a transmission device (transmit station) transmits a modulated signal by "scheme B":

As illustrated in FIG. 53, the control information estimator A216 of the reception device estimates "scheme B" from $d_0$="1", and a coding rate of error correction code 41/120 and (12,4)16APSK ring ratio 4.00 from line 1 of table 2 based on $c_0c_1c_2c_3$="0001" and $b_0b_1b_2b_3$="0000". The de-mapper A206 performs demodulation of the data symbol based on the above estimated information.

<<Reception Device Corresponding to Example 2>>

When a transmission device (transmit station) transmits a modulated signal by "scheme A":

When the control information estimator A216 of a reception device obtains $d_0$="0", the control information estimator A216 determines that a data symbol is a symbol transmitted by "scheme A". By obtaining a value of $b_0b_1b_2b_3$, when the data symbol is a (12,4)16APSK symbol, the control information estimator A216 estimates a (12,4) 16APSK ring ratio. The de-mapper A206 performs demodulation of the data symbol based on the above estimated information.

When a transmission device (transmit station) transmits a modulated signal by "scheme B":

As illustrated in FIG. 54, the control information estimator A216 of the reception device determines "set to same ring ratio as scheme A" when obtaining $d_0$="1" and $z_0$="0", and estimates a coding rate of error correction code and (12,4)16APSK ring ratio from Table 17 when obtaining $b_0b_1b_2b_3$. The de-mapper A206 performs demodulation of the data symbol based on the above estimated information.

Further, as illustrated in FIG. 54, the control information estimator A216 of the reception device determines "set to ring ratio for scheme B" from $d_0$="1" and $z_0$="1", and estimates a coding rate of error correction code 41/120 and (12,4)16APSK ring ratio 4.00 from line 1 of table 2 based on $c_0c_1c_2c_3$="0001" and $b_0b_1b_2b_3$="0000". The de-mapper A206 performs demodulation of the data symbol based on the above estimated information.

<<Reception Device Corresponding to Example 3>>

When a transmission device (transmit station) transmits a modulated signal by "scheme A":

When the control information estimator A216 of a reception device obtains $d_0$="0", the control information estimator A216 determines that a data symbol is a symbol transmitted by "scheme A". By obtaining a value of $b_0b_1b_2b_3$, when the data symbol is a (12,4)16APSK symbol, the control information estimator A216 estimates a (12,4) 16APSK ring ratio. The de-mapper A206 performs demodulation of the data symbol based on the above estimated information.

When a transmission device (transmit station) transmits a modulated signal by "scheme B":

As illustrated in FIG. 55, the control information estimator A216 of the reception device estimates "scheme B" from $d_0$="1", and (12,4)16APSK ring ratio 2.00 from $x_0x_1x_2x_3x_4x_5$="000000". The de-mapper A206 performs demodulation of the data symbol based on the above estimated information.

<<Reception Device Corresponding to Example 4>>

When a transmission device (transmit station) transmits a modulated signal by "scheme A":

When the control information estimator A216 of a reception device obtains $d_0$="0", the control information estimator A216 determines that a data symbol is a symbol transmitted by "scheme A". By obtaining a value of $b_0b_1b_2b_3$, when the data symbol is a (12,4)16APSK symbol, the control information estimator A216 estimates a (12,4) 16APSK ring ratio. The de-mapper A206 performs demodulation of the data symbol based on the above estimated information.

When a transmission device (transmit station) transmits a modulated signal by "scheme B":

As illustrated in FIG. 56, the control information estimator A216 of the reception device determines that a data symbol is a symbol of "scheme B" from $d_0$="1". Further, the control information estimator A216 of the reception device estimates a difference of +0.4 from $y_0y_1y_2y_3y_4y_5$="011110". Further, based on $b_0b_1b_2b_3$="0000", the control information estimator A216 estimates (12,4)16APSK ring ratio 3.09 prior to taking into account difference, and estimates a coding rate of error correction code 41/120. By summing both so that 3.09+0.4=3.49, the control information estimator A216 estimates a (12,4)16APSK ring ratio 3.49. The de-mapper A206 performs demodulation of the data symbol based on the above estimated information.

<<Reception Device Corresponding to Example 5>>

When a transmission device (transmit station) transmits a modulated signal by "scheme A":

When the control information estimator A216 of a reception device obtains $d_0$="0", the control information estimator A216 determines that a data symbol is a symbol transmitted by "scheme A". By obtaining a value of $b_0b_1b_2b_3$, when the data symbol is a (12,4)16APSK symbol, the control information estimator A216 estimates a (12,4) 16APSK ring ratio. The de-mapper A206 performs demodulation of the data symbol based on the above estimated information.

When a transmission device (transmit station) transmits a modulated signal by "scheme B":

As illustrated in FIG. 57, the control information estimator A216 of the reception device determines that a data symbol is a symbol of "scheme B" from $d_0$="1". Further, the control information estimator A216 of the reception device estimates a difference of ×0.9 from $y_0y_1y_2y_3y_4y_5$="100001". Further, based on $b_0b_1b_2b_3$="0000", the control information estimator A216 estimates (12,4)16APSK ring ratio 3.09 prior to taking into account difference, and estimates a coding rate of error correction code 41/120. By multiplying both so that 3.09×0.9=2.78, the control information estimator A216 estimates a (12,4)16APSK ring ratio 2.78. The de-mapper A206 performs demodulation of the data symbol based on the above estimated information.

Embodiment D

In the present embodiment, a method of transmitting pilot symbols based on embodiment C is described.

Note that ring ratio (for example, (12,4)16APSK ring ratio) has been defined prior to the present embodiment, and ring ratio may also be referred to as "radius ratio".

<Example of Pilot Symbols>

In the present embodiment, an example is described of pilot symbol configuration in the transmit scheme described in embodiment C (a data symbol modulation scheme is (12,4)16APSK).

Note that the transmission device in the present embodiment is identical to the transmission device described in embodiment 1 and therefore description thereof is omitted here.

Interference occurs between code (between symbols) of a modulated signal, because of non-linearity of the power amplifier of the transmission device. High data reception quality can be achieved by a reception device by decreasing this intersymbol interference.

In the present example of pilot symbol configuration, in order to reduce intersymbol interference at a reception device, a transmission device transmits pilot symbols by using a modulation scheme and ring ratio used in a data symbol.

Accordingly, when a transmission device (transmit station) determines a modulation scheme and ring ratio of a data symbol by any of the methods of <Example 1> to <Example 5> of embodiment C, the transmission device generates and transmits pilot symbols by using the same modulation scheme and ring ratio as the data symbol.

The following illustrates specific examples. However, description continues assuming that (12,4)16APSK is selected as a modulation scheme.

In the Case of <Example 1> of Embodiment C:

When a transmission device (transmit station) transmits a data symbol so that "satellite broadcasting scheme: "scheme B", coding rate: 41/120, and (12,4)16APSK ring ratio: 4.00", $d_0$="1", $b_0b_1b_2b_3$="0000", and $c_0c_1c_2c_3$="0001". Thus, based on "$d_0$="1", $b_0b_1b_2b_3$="0000", and $c_0c_1c_2c_3$="0001"", the transmission device sets a modulation scheme and ring ratio of pilot symbols to (12,4)16APSK and ring ratio 4.00 (of (12,4)16APSK), respectively.

Accordingly, the transmission device (transmit station) transmits the following, in order, as pilot symbols:

a symbol of a constellation point (baseband signal) corresponding to $[b_3b_2b_1b_0]$=[0000] of (12,4)16APSK ring ratio 4.00;

a symbol of a constellation point (baseband signal) corresponding to $[b_3b_2b_1b_0]$=[0001] of (12,4)16APSK ring ratio 4.00;

a symbol of a constellation point (baseband signal) corresponding to $[b_3b_2b_1b_0]$=[0010] of (12,4)16APSK ring ratio 4.00;

a symbol of a constellation point (baseband signal) corresponding to $[b_3b_2b_1b_0]$=[0011] of (12,4)16APSK ring ratio 4.00;

a symbol of a constellation point (baseband signal) corresponding to $[b_3b_2b_1b_0]$=[0100] of (12,4)16APSK ring ratio 4.00;

a symbol of a constellation point (baseband signal) corresponding to $[b_3b_2b_1b_0]$=[0101] of (12,4)16APSK ring ratio 4.00;

a symbol of a constellation point (baseband signal) corresponding to $[b_3b_2b_1b_0]$=[0110] of (12,4)16APSK ring ratio 4.00;

a symbol of a constellation point (baseband signal) corresponding to $[b_3b_2b_1b_0]$=[0111] of (12,4)16APSK ring ratio 4.00;

a symbol of a constellation point (baseband signal) corresponding to $[b_3b_2b_1b_0]$=[1000] of (12,4)16APSK ring ratio 4.00; $[b_3b_2b_1b_0]$=[1001] of (12,4)16APSK ring ratio 4.00;

a symbol of a constellation point (baseband signal) corresponding to $[b_3b_2b_1b_0]$=[1010] of (12,4)16APSK ring ratio 4.00;

a symbol of a constellation point (baseband signal) corresponding to $[b_3b_2b_1b_0]$=[1011] of (12,4)16APSK ring ratio 4.00;

a symbol of a constellation point (baseband signal) corresponding to $[b_3b_2b_1b_0]$=[1100] of (12,4)16APSK ring ratio 4.00;

a symbol of a constellation point (baseband signal) corresponding to $[b_3b_2b_1b_0]$=[1101] of (12,4)16APSK ring ratio 4.00;

a symbol of a constellation point (baseband signal) corresponding to $[b_3b_2b_1b_0]$=[1110] of (12,4)16APSK ring ratio 4.00; and a symbol of a constellation point (baseband signal) corresponding to $[b_3b_2b_1b_0]$=[1111] of (12,4)16APSK ring ratio 4.00.

Thus, a reception device can estimate intersymbol interference with high precision, and can therefore achieve high data reception quality.

Pilot symbols need not be symbols only for estimating intersymbol interference, and a reception device may estimate a radio wave propagation environment between a transmission device and the reception device (channel estimation), and may estimate frequency offset and perform time synchronization using the pilot symbols.

When a transmission device sets separate values for data symbol ring ratios, pilot symbols are changed to the same ring ratio as data symbols (a value L) and the transmission device (transmit station) transmits the following, in order, as pilot symbols:

a symbol of a constellation point (baseband signal) corresponding to $[b_3b_2b_1b_0]$=[0000] of (12,4)16APSK ring ratio L;

a symbol of a constellation point (baseband signal) corresponding to $[b_3b_2b_1b_0]$=[0001] of (12,4)16APSK ring ratio L;

a symbol of a constellation point (baseband signal) corresponding to $[b_3b_2b_1b_0]$=[0010] of (12,4)16APSK ring ratio L;

a symbol of a constellation point (baseband signal) corresponding to $[b_3b_2b_1b_0]$=[0011] of (12,4)16APSK ring ratio L;

a symbol of a constellation point (baseband signal) corresponding to $[b_3b_2b_1b_0]$=[0100] of (12,4)16APSK ring ratio L; $[b_3b_2b_1b_0]$=[0101] of (12,4)16APSK ring ratio L;

a symbol of a constellation point (baseband signal) corresponding to $[b_3b_2b_1b_0]$=[0110] of (12,4)16APSK ring ratio L;

a symbol of a constellation point (baseband signal) corresponding to $[b_3b_2b_1b_0]$=[0111] of (12,4)16APSK ring ratio L;

a symbol of a constellation point (baseband signal) corresponding to $[b_3b_2b_1b_0]$=[1000] of (12,4)16APSK ring ratio L;

a symbol of a constellation point (baseband signal) corresponding to $[b_3b_2b_1b_0]$=[1001] of (12,4)16APSK ring ratio L;

a symbol of a constellation point (baseband signal) corresponding to $[b_3b_2b_1b_0]$=[1010] of (12,4)16APSK ring ratio L;

a symbol of a constellation point (baseband signal) corresponding to $[b_3b_2b_1b_0]$=[1011] of (12,4)16APSK ring ratio L;

a symbol of a constellation point (baseband signal) corresponding to $[b_3b_2b_1b_0]$=[1100] of (12,4)16APSK ring ratio L;

a symbol of a constellation point (baseband signal) corresponding to $[b_3b_2b_1b_0]$=[1101] of (12,4)16APSK ring ratio L;

a symbol of a constellation point (baseband signal) corresponding to $[b_3b_2b_1b_0]$=[1110] of (12,4)16APSK ring ratio L; and a symbol of a constellation point (baseband signal) corresponding to $[b_3b_2b_1b_0]$=[1111] of (12,4)16APSK ring ratio L.

In the Case of <Example 2> of Embodiment C:

When a transmission device (transmit station) transmits a data symbol so that "satellite broadcasting scheme: "scheme B", coding rate: 41/120, and (12,4)16APSK ring ratio: 4.00", the transmission device transmits $d_0$="1", $z_0$=1, $b_0b_1b_2b_3$="0000", and $c_0c_1c_2c_3$="0001" control information (a portion of TMCC information) along with the data symbol. Thus, based on "$d_0$="1", $z_0$=1, $b_0b_1b_2b_3$="0000", and $c_0c_1c_2c_3$="0001"", the transmission device sets a modulation scheme and ring ratio of pilot symbols to (12,4) 16APSK and ring ratio 4.00 (of (12,4)16APSK), respectively.

Accordingly, the transmission device (transmit station) transmits the following, in order, as pilot symbols:

a symbol of a constellation point (baseband signal) corresponding to $[b_3b_2b_1b_0]$=[0000] of (12,4)16APSK ring ratio 4.00;

a symbol of a constellation point (baseband signal) corresponding to $[b_3b_2b_1b_0]$=[0001] of (12,4)16APSK ring ratio 4.00;

a symbol of a constellation point (baseband signal) corresponding to $[b_3b_2b_1b_0]$=[0010] of (12,4)16APSK ring ratio 4.00;

a symbol of a constellation point (baseband signal) corresponding to $[b_3b_2b_1b_0]$=[0011] of (12,4)16APSK ring ratio 4.00;

a symbol of a constellation point (baseband signal) corresponding to $[b_3b_2b_1b_0]$=[0100] of (12,4)16APSK ring ratio 4.00;

a symbol of a constellation point (baseband signal) corresponding to $[b_3b_2b_1b_0]$=[0101] of (12,4)16APSK ring ratio 4.00;

a symbol of a constellation point (baseband signal) corresponding to $[b_3b_2b_1b_0]$=[0110] of (12,4)16APSK ring ratio 4.00;

a symbol of a constellation point (baseband signal) corresponding to $[b_3b_2b_1b_0]$=[0111] of (12,4)16APSK ring ratio 4.00;

a symbol of a constellation point (baseband signal) corresponding to $[b_3b_2b_1b_0]$=[1000] of (12,4)16APSK ring ratio 4.00;

a symbol of a constellation point (baseband signal) corresponding to $[b_3b_2b_1b_0]$=[1001] of (12,4)16APSK ring ratio 4.00;

a symbol of a constellation point (baseband signal) corresponding to $[b_3b_2b_1b_0]$=[1010] of (12,4)16APSK ring ratio 4.00;

a symbol of a constellation point (baseband signal) corresponding to $[b_3b_2b_1b_0]$=[1011] of (12,4)16APSK ring ratio 4.00;

a symbol of a constellation point (baseband signal) corresponding to $[b_3b_2b_1b_0]$=[1100] of (12,4)16APSK ring ratio 4.00;

a symbol of a constellation point (baseband signal) corresponding to $[b_3b_2b_1b_0]$=[1101] of (12,4)16APSK ring ratio 4.00;

a symbol of a constellation point (baseband signal) corresponding to $[b_3b_2b_1b_0]$=[1110] of (12,4)16APSK ring ratio 4.00; and a symbol of a constellation point (baseband signal) corresponding to $[b_3b_2b_1b_0]$=[1111] of (12,4)16APSK ring ratio 4.00.

Thus, a reception device can estimate intersymbol interference with high precision, and can therefore achieve high data reception quality.

Pilot symbols need not be symbols only for estimating intersymbol interference, and a reception device may estimate a radio wave propagation environment between a transmission device and the reception device (channel estimation), and may estimate frequency offset and perform time synchronization using the pilot symbols.

When a transmission device sets separate values for data symbol ring ratios, pilot symbols are changed to the same ring ratio as data symbols (a value L) and the transmission device (transmit station) transmits the following, in order, as pilot symbols:

a symbol of a constellation point (baseband signal) corresponding to $[b_3b_2b_1b_0]$=[0000] of (12,4)16APSK ring ratio L;

a symbol of a constellation point (baseband signal) corresponding to $[b_3b_2b_1b_0]$=[0001] of (12,4)16APSK ring ratio L;

a symbol of a constellation point (baseband signal) corresponding to $[b_3b_2b_1b_0]$=[0010] of (12,4)16APSK ring ratio L;

a symbol of a constellation point (baseband signal) corresponding to $[b_3b_2b_1b_0]$=[0011] of (12,4)16APSK ring ratio L;

a symbol of a constellation point (baseband signal) corresponding to $[b_3b_2b_1b_0]$=[0100] of (12,4)16APSK ring ratio L;

a symbol of a constellation point (baseband signal) corresponding to $[b_3b_2b_1b_0]$=[0101] of (12,4)16APSK ring ratio L;

a symbol of a constellation point (baseband signal) corresponding to $[b_3b_2b_1b_0]$=[0110] of (12,4)16APSK ring ratio L;

a symbol of a constellation point (baseband signal) corresponding to $[b_3b_2b_1b_0]$=[0111] of (12,4)16APSK ring ratio L;

a symbol of a constellation point (baseband signal) corresponding to $[b_3b_2b_1b_0]$=[1000] of (12,4)16APSK ring ratio L;

a symbol of a constellation point (baseband signal) corresponding to $[b_3b_2b_1b_0]$=[1001] of (12,4)16APSK ring ratio L;

a symbol of a constellation point (baseband signal) corresponding to $[b_3b_2b_1b_0]$=[1010] of (12,4)16APSK ring ratio L;

a symbol of a constellation point (baseband signal) corresponding to $[b_3b_2b_1b_0]$=[1011] of (12,4)16APSK ring ratio L;

a symbol of a constellation point (baseband signal) corresponding to $[b_3b_2b_1b_0]$=[1100] of (12,4)16APSK ring ratio L;

a symbol of a constellation point (baseband signal) corresponding to $[b_3b_2b_1b_0]$=[1101] of (12,4)16APSK ring ratio L;

a symbol of a constellation point (baseband signal) corresponding to $[b_3b_2b_1b_0]$=[1110] of (12,4)16APSK ring ratio L; and a symbol of a constellation point (baseband signal) corresponding to $[b_3b_2b_1b_0]$=[1111] of (12,4)16APSK ring ratio L.

In the Case of <Example 3> of Embodiment C:

When a transmission device (transmit station) transmits a data symbol so that "satellite broadcasting scheme: "scheme B" and (12,4)16APSK ring ratio: 2.00", the transmission device transmits $d_0$="1" and $x_0x_1x_2x_3x_4x_5$="000000" control information (a portion of TMCC information) along with the data symbol. Thus, based on "$d_0$="1", and $x_0x_1x_2x_3x_4x_5$="000000"", the transmission device sets a modulation scheme and ring ratio of pilot symbols to (12,4)16APSK and ring ratio 2.00 (of (12,4)16APSK), respectively.

Accordingly, the transmission device (transmit station) transmits the following, in order, as pilot symbols:

a symbol of a constellation point (baseband signal) corresponding to $[b_3b_2b_1b_0]$=[0000] of (12,4)16APSK ring ratio 2.00;

a symbol of a constellation point (baseband signal) corresponding to $[b_3b_2b_1b_0]$=[0001] of (12,4)16APSK ring ratio 2.00;

a symbol of a constellation point (baseband signal) corresponding to $[b_3b_2b_1b_0]$=[0010] of (12,4)16APSK ring ratio 2.00;

a symbol of a constellation point (baseband signal) corresponding to $[b_3b_2b_1b_0]$=[0011] of (12,4)16APSK ring ratio 2.00;

a symbol of a constellation point (baseband signal) corresponding to $[b_3b_2b_1b_0]$=[0100] of (12,4)16APSK ring ratio 2.00;

a symbol of a constellation point (baseband signal) corresponding to $[b_3b_2b_1b_0]$=[0101] of (12,4)16APSK ring ratio 2.00;

a symbol of a constellation point (baseband signal) corresponding to $[b_3b_2b_1b_0]$=[0110] of (12,4)16APSK ring ratio 2.00;

a symbol of a constellation point (baseband signal) corresponding to $[b_3b_2b_1b_0]$=[0111] of (12,4)16APSK ring ratio 2.00;

a symbol of a constellation point (baseband signal) corresponding to $[b_3b_2b_1b_0]$=[1000] of (12,4)16APSK ring ratio 2.00;

a symbol of a constellation point (baseband signal) corresponding to $[b_3b_2b_1b_0]$=[1001] of (12,4)16APSK ring ratio 2.00;

a symbol of a constellation point (baseband signal) corresponding to $[b_3b_2b_1b_0]$=[1010] of (12,4)16APSK ring ratio 2.00;

a symbol of a constellation point (baseband signal) corresponding to $[b_3b_2b_1b_0]$=[1011] of (12,4)16APSK ring ratio 2.00;

a symbol of a constellation point (baseband signal) corresponding to $[b_3b_2b_1b_0]$=[1100] of (12,4)16APSK ring ratio 2.00;

a symbol of a constellation point (baseband signal) corresponding to $[b_3b_2b_1b_0]$=[1101] of (12,4)16APSK ring ratio 2.00;

a symbol of a constellation point (baseband signal) corresponding to $[b_3b_2b_1b_0]$=[1110] of (12,4)16APSK ring ratio 2.00; and a symbol of a constellation point (baseband signal) corresponding to $[b_3b_2b_1b_0]$=[1111] of (12,4)16APSK ring ratio 2.00.

Thus, a reception device can estimate intersymbol interference with high precision, and can therefore achieve high data reception quality.

Pilot symbols need not be symbols only for estimating intersymbol interference, and a reception device may estimate a radio wave propagation environment between a transmission device and the reception device (channel estimation), and may estimate frequency offset and perform time synchronization using the pilot symbols.

When a transmission device sets separate values for data symbol ring ratios, pilot symbols are changed to the same ring ratio as data symbols (a value L) and the transmission device (transmit station) transmits the following, in order, as pilot symbols:

a symbol of a constellation point (baseband signal) corresponding to $[b_3b_2b_1b_0]$=[0000] of (12,4)16APSK ring ratio L;

a symbol of a constellation point (baseband signal) corresponding to $[b_3b_2b_1b_0]$=[0001] of (12,4)16APSK ring ratio L;

a symbol of a constellation point (baseband signal) corresponding to $[b_3b_2b_1b_0]$=[0010] of (12,4)16APSK ring ratio L;

a symbol of a constellation point (baseband signal) corresponding to $[b_3b_2b_1b_0]$=[0011] of (12,4)16APSK ring ratio L;

a symbol of a constellation point (baseband signal) corresponding to $[b_3b_2b_1b_0]$=[0100] of (12,4)16APSK ring ratio L;

a symbol of a constellation point (baseband signal) corresponding to $[b_3b_2b_1b_0]$=[0101] of (12,4)16APSK ring ratio L;

a symbol of a constellation point (baseband signal) corresponding to $[b_3b_2b_1b_0]$=[0110] of (12,4)16APSK ring ratio L;

a symbol of a constellation point (baseband signal) corresponding to $[b_3b_2b_1b_0]$=[0111] of (12,4)16APSK ring ratio L;

a symbol of a constellation point (baseband signal) corresponding to $[b_3b_2b_1b_0]$=[1000] of (12,4)16APSK ring ratio L;

a symbol of a constellation point (baseband signal) corresponding to $[b_3b_2b_1b_0]$=[1001] of (12,4)16APSK ring ratio L;

a symbol of a constellation point (baseband signal) corresponding to $[b_3b_2b_1b_0]$=[1010] of (12,4)16APSK ring ratio L;

a symbol of a constellation point (baseband signal) corresponding to $[b_3b_2b_1b_0]$=[1011] of (12,4)16APSK ring ratio L;

a symbol of a constellation point (baseband signal) corresponding to $[b_3b_2b_1b_0]$=[1100] of (12,4)16APSK ring ratio L;

a symbol of a constellation point (baseband signal) corresponding to $[b_3b_2b_1b_0]$=[1101] of (12,4)16APSK ring ratio L;

a symbol of a constellation point (baseband signal) corresponding to $[b_3b_2b_1b_0]$=[1110] of (12,4)16APSK ring ratio L; and a symbol of a constellation point (baseband signal) corresponding to $[b_3b_2b_1b_0]$=[1111] of (12,4)16APSK ring ratio L.

In the Case of <Example 4> of Embodiment C:

When a transmission device (transmit station) transmits a data symbol so that "satellite broadcasting scheme: "scheme B", coding rate: 41/120, and (12,4)16APSK ring ratio: 3.49", the transmission device transmits $d_0$="1", $b_0b_1b_2b_3$="0000", and $y_0y_1y_2y_3y_4y_5$="011110" control information (portion of TMCC information) along with the data symbol. Thus, based on "$d_0$="1", $b_0b_1b_2b_3$="0000", and $y_0y_1y_2y_3y_4y_5$="011110"", the transmission device sets a modulation scheme and ring ratio of pilot symbols to (12,4)16APSK and ring ratio 3.49 (of (12,4)16APSK), respectively.

Accordingly, the transmission device (transmit station) transmits the following, in order, as pilot symbols:

a symbol of a constellation point (baseband signal) corresponding to $[b_3b_2b_1b_0]$=[0000] of (12,4)16APSK ring ratio 3.49;

a symbol of a constellation point (baseband signal) corresponding to $[b_3b_2b_1b_0]$=[0001] of (12,4)16APSK ring ratio 3.49;

a symbol of a constellation point (baseband signal) corresponding to $[b_3b_2b_1b_0]$=[0010] of (12,4)16APSK ring ratio 3.49;

a symbol of a constellation point (baseband signal) corresponding to $[b_3b_2b_1b_0]$=[0011] of (12,4)16APSK ring ratio 3.49;

a symbol of a constellation point (baseband signal) corresponding to $[b_3b_2b_1b_0]$=[0100] of (12,4)16APSK ring ratio 3.49;

a symbol of a constellation point (baseband signal) corresponding to $[b_3b_2b_1b_0]$=[0101] of (12,4)16APSK ring ratio 3.49;

a symbol of a constellation point (baseband signal) corresponding to $[b_3b_2b_1b_0]$=[0110] of (12,4)16APSK ring ratio 3.49;

a symbol of a constellation point (baseband signal) corresponding to $[b_3b_2b_1b_0]$=[0111] of (12,4)16APSK ring ratio 3.49;

a symbol of a constellation point (baseband signal) corresponding to $[b_3b_2b_1b_0]$=[1000] of (12,4)16APSK ring ratio 3.49;

a symbol of a constellation point (baseband signal) corresponding to $[b_3b_2b_1b_0]$=[1001] of (12,4)16APSK ring ratio 3.49;

a symbol of a constellation point (baseband signal) corresponding to $[b_3b_2b_1b_0]$=[1010] of (12,4)16APSK ring ratio 3.49;

a symbol of a constellation point (baseband signal) corresponding to $[b_3b_2b_1b_0]$=[1011] of (12,4)16APSK ring ratio 3.49;

a symbol of a constellation point (baseband signal) corresponding to $[b_3b_2b_1b_0]$=[1100] of (12,4)16APSK ring ratio 3.49;

a symbol of a constellation point (baseband signal) corresponding to $[b_3b_2b_1b_0]$=[1101] of (12,4)16APSK ring ratio 3.49;

a symbol of a constellation point (baseband signal) corresponding to $[b_3b_2b_1b_0]$=[1110] of (12,4)16APSK ring ratio 3.49; and a symbol of a constellation point (baseband signal) corresponding to $[b_3b_2b_1b_0]$=[1111] of (12,4)16APSK ring ratio 3.49.

Thus, a reception device can estimate intersymbol interference with high precision, and can therefore achieve high data reception quality.

Pilot symbols need not be symbols only for estimating intersymbol interference, and a reception device may estimate a radio wave propagation environment between a transmission device and the reception device (channel estimation), and may estimate frequency offset and perform time synchronization using the pilot symbols.

When a transmission device sets separate values for data symbol ring ratios, pilot symbols are changed to the same ring ratio as data symbols (a value L) and the transmission device (transmit station) transmits the following, in order, as pilot symbols:

a symbol of a constellation point (baseband signal) corresponding to $[b_3b_2b_1b_0]$=[0000] of (12,4)16APSK ring ratio L;

a symbol of a constellation point (baseband signal) corresponding to $[b_3b_2b_1b_0]$=[0001] of (12,4)16APSK ring ratio L;

a symbol of a constellation point (baseband signal) corresponding to $[b_3b_2b_1b_0]$=[0010] of (12,4)16APSK ring ratio L;

a symbol of a constellation point (baseband signal) corresponding to $[b_3b_2b_1b_0]$=[0011] of (12,4)16APSK ring ratio L;

a symbol of a constellation point (baseband signal) corresponding to $[b_3b_2b_1b_0]$=[0100] of (12,4)16APSK ring ratio L;

a symbol of a constellation point (baseband signal) corresponding to $[b_3b_2b_1b_0]$=[0101] of (12,4)16APSK ring ratio L;

a symbol of a constellation point (baseband signal) corresponding to $[b_3b_2b_1b_0]$=[0110] of (12,4)16APSK ring ratio L;

a symbol of a constellation point (baseband signal) corresponding to $[b_3b_2b_1b_0]$=[0111] of (12,4)16APSK ring ratio L;

a symbol of a constellation point (baseband signal) corresponding to $[b_3b_2b_1b_0]$=[1000] of (12,4)16APSK ring ratio L;

a symbol of a constellation point (baseband signal) corresponding to $[b_3b_2b_1b_0]$=[1001] of (12,4)16APSK ring ratio L;

a symbol of a constellation point (baseband signal) corresponding to $[b_3b_2b_1b_0]$=[1010] of (12,4)16APSK ring ratio L;

a symbol of a constellation point (baseband signal) corresponding to $[b_3b_2b_1b_0]$=[1011] of (12,4)16APSK ring ratio L;

a symbol of a constellation point (baseband signal) corresponding to $[b_3b_2b_1b_0]$=[1100] of (12,4)16APSK ring ratio L;

a symbol of a constellation point (baseband signal) corresponding to $[b_3b_2b_1b_0]$=[1101] of (12,4)16APSK ring ratio L;

a symbol of a constellation point (baseband signal) corresponding to $[b_3b_2b_1b_0]$=[1110] of (12,4)16APSK ring ratio L; and a symbol of a constellation point (baseband signal) corresponding to $[b_3b_2b_1b_0]$=[1111] of (12,4)16APSK ring ratio L.

In the Case of <Example 5> of Embodiment C:

When a transmission device (transmit station) transmits a data symbol so that "satellite broadcasting scheme: "scheme B", coding rate: 41/120, and (12,4)16APSK ring ratio: 2.78", the transmission device transmits $d_0$="1", $b_0b_1b_2b_3$="0000", and $y_0y_1y_2y_3y_4y_5$="100001" control information (portion of TMCC information) along with the data symbol. Thus, based on "$d_0$="1", $b_0b_1b_2b_3$="0000", and $y_0y_1y_2y_3y_4y_5$="100001"", the transmission device sets a modulation scheme and ring ratio of pilot symbols to (12,4)16APSK and ring ratio 2.78 (of (12,4)16APSK), respectively.

Accordingly, the transmission device (transmit station) transmits the following, in order, as pilot symbols:

a symbol of a constellation point (baseband signal) corresponding to $[b_3b_2b_1b_0]$=[0000] of (12,4)16APSK ring ratio 2.78;

a symbol of a constellation point (baseband signal) corresponding to $[b_3b_2b_1b_0]$=[0001] of (12,4)16APSK ring ratio 2.78;

a symbol of a constellation point (baseband signal) corresponding to $[b_3b_2b_1b_0]$=[0010] of (12,4)16APSK ring ratio 2.78;

a symbol of a constellation point (baseband signal) corresponding to $[b_3b_2b_1b_0]$=[0011] of (12,4)16APSK ring ratio 2.78;

a symbol of a constellation point (baseband signal) corresponding to $[b_3b_2b_1b_0]$=[0100] of (12,4)16APSK ring ratio 2.78;

a symbol of a constellation point (baseband signal) corresponding to $[b_3b_2b_1b_0]$=[0101] of (12,4)16APSK ring ratio 2.78;

a symbol of a constellation point (baseband signal) corresponding to $[b_3b_2b_1b_0]$=[0110] of (12,4)16APSK ring ratio 2.78;

a symbol of a constellation point (baseband signal) corresponding to $[b_3b_2b_1b_0]$=[0111] of (12,4)16APSK ring ratio 2.78;

a symbol of a constellation point (baseband signal) corresponding to $[b_3b_2b_1b_0]=[1000]$ of (12,4)16APSK ring ratio 2.78;

a symbol of a constellation point (baseband signal) corresponding to $[b_3b_2b_1b_0]=[1001]$ of (12,4)16APSK ring ratio 2.78;

a symbol of a constellation point (baseband signal) corresponding to $[b_3b_2b_1b_0]=[1010]$ of (12,4)16APSK ring ratio 2.78;

a symbol of a constellation point (baseband signal) corresponding to $[b_3b_2b_1b_0]=[1011]$ of (12,4)16APSK ring ratio 2.78;

a symbol of a constellation point (baseband signal) corresponding to $[b_3b_2b_1b_0]=[1100]$ of (12,4)16APSK ring ratio 2.78;

a symbol of a constellation point (baseband signal) corresponding to $[b_3b_2b_1b_0]=[1101]$ of (12,4)16APSK ring ratio 2.78;

a symbol of a constellation point (baseband signal) corresponding to $[b_3b_2b_1b_0]=[1110]$ of (12,4)16APSK ring ratio 2.78; and a symbol of a constellation point (baseband signal) corresponding to $[b_3b_2b_1b_0]=[1111]$ of (12,4)16APSK ring ratio 2.78.

Thus, a reception device can estimate intersymbol interference with high precision, and can therefore achieve high data reception quality.

Pilot symbols need not be symbols only for estimating intersymbol interference, and a reception device may estimate a radio wave propagation environment between a transmission device and the reception device (channel estimation), and may estimate frequency offset and perform time synchronization using the pilot symbols.

When a transmission device sets separate values for data symbol ring ratios, pilot symbols are changed to the same ring ratio as data symbols (a value L) and the transmission device (transmit station) transmits the following, in order, as pilot symbols:

a symbol of a constellation point (baseband signal) corresponding to $[b_3b_2b_1b_0]=[0000]$ of (12,4)16APSK ring ratio L;

a symbol of a constellation point (baseband signal) corresponding to $[b_3b_2b_1b_0]=[0001]$ of (12,4)16APSK ring ratio L;

a symbol of a constellation point (baseband signal) corresponding to $[b_3b_2b_1b_0]=[0010]$ of (12,4)16APSK ring ratio L;

a symbol of a constellation point (baseband signal) corresponding to $[b_3b_2b_1b_0]=[0011]$ of (12,4)16APSK ring ratio L;

a symbol of a constellation point (baseband signal) corresponding to $[b_3b_2b_1b_0]=[0100]$ of (12,4)16APSK ring ratio L;

a symbol of a constellation point (baseband signal) corresponding to $[b_3b_2b_1b_0]=[0101]$ of (12,4)16APSK ring ratio L;

a symbol of a constellation point (baseband signal) corresponding to $[b_3b_2b_1b_0]=[0110]$ of (12,4)16APSK ring ratio L;

a symbol of a constellation point (baseband signal) corresponding to $[b_3b_2b_1b_0]=[0111]$ of (12,4)16APSK ring ratio L;

a symbol of a constellation point (baseband signal) corresponding to $[b_3b_2b_1b_0]=[1000]$ of (12,4)16APSK ring ratio L;

a symbol of a constellation point (baseband signal) corresponding to $[b_3b_2b_1b_0]=[1001]$ of (12,4)16APSK ring ratio L;

a symbol of a constellation point (baseband signal) corresponding to $[b_3b_2b_1b_0]=[1010]$ of (12,4)16APSK ring ratio L;

a symbol of a constellation point (baseband signal) corresponding to $[b_3b_2b_1b_0]=[1011]$ of (12,4)16APSK ring ratio L;

a symbol of a constellation point (baseband signal) corresponding to $[b_3b_2b_1b_0]=[1100]$ of (12,4)16APSK ring ratio L;

a symbol of a constellation point (baseband signal) corresponding to $[b_3b_2b_1b_0]=[1101]$ of (12,4)16APSK ring ratio L;

a symbol of a constellation point (baseband signal) corresponding to $[b_3b_2b_1b_0]=[1110]$ of (12,4)16APSK ring ratio L; and a symbol of a constellation point (baseband signal) corresponding to $[b_3b_2b_1b_0]=[1111]$ of (12,4)16APSK ring ratio L.

Operation of a reception device is described with reference to FIG. 2.

In FIG. 2, 210 indicates a configuration of a reception device. The de-mapper 214 of FIG. 2 performs de-mapping with respect to mapping of a modulation scheme used by the transmission device, for example obtaining and outputting a log-likelihood ratio for each bit. At this time, although not illustrated in FIG. 2, estimation of intersymbol interference, estimation of a radio wave propagation environment (channel estimation) between the transmission device and the reception device, time synchronization with the transmission device, and frequency offset estimation may be performed in order to precisely perform de-mapping.

Although not illustrated in FIG. 2, the reception device includes an intersymbol interference estimator, a channel estimator, a time synchronizer, and a frequency offset estimator. These estimators extract from receive signals a portion of pilot symbols, for example, and respectively perform intersymbol interference estimation, estimation of a radio wave propagation environment (channel estimation) between the transmission device and the reception device, time synchronization between the transmission device and the reception device, and frequency offset estimation between the transmission device and the reception device. Subsequently, the de-mapper 214 of FIG. 2 inputs these estimation signals and, by performing de-mapping based on these estimation signals, performs, for example, calculation of log-likelihood ratios.

Modulation scheme and ring ratio information used in generating a data symbol is, as described in embodiment C, transmitted by using control information such as TMCC control information. Thus, because a modulation scheme and ring ratio used in generating pilot symbols is the same as the modulation scheme and ring ratio used in generating data symbols, a reception device estimates, by a control information estimator, the modulation scheme and ring ratio from control information, and, by inputting this information to the de-mapper 214, estimation of distortion of propagation path, etc., is performed from the pilot symbols and de-mapping of the data symbol is performed.

Further, a transmission method of pilot symbols is not limited to the above. For example, a transmission device (transmit station) may transmit, as pilot symbols:

a symbol of a constellation point (baseband signal) corresponding to $[b_3b_2b_1b_0]=[0000]$ of (12,4)16APSK ring ratio L, a plurality of times;

a symbol of a constellation point (baseband signal) corresponding to $[b_3b_2b_1b_0]$=[0001] of (12,4)16APSK ring ratio L, a plurality of times;

a symbol of a constellation point (baseband signal) corresponding to $[b_3b_2b_1b_0]$=[0010] of (12,4)16APSK ring ratio L, a plurality of times;

a symbol of a constellation point (baseband signal) corresponding to $[b_3b_2b_1b_0]$=[0011] of (12,4)16APSK ring ratio L, a plurality of times;

a symbol of a constellation point (baseband signal) corresponding to $[b_3b_2b_1b_0]$=[0100] of (12,4)16APSK ring ratio L, a plurality of times;

a symbol of a constellation point (baseband signal) corresponding to $[b_3b_2b_1b_0]$=[0101] of (12,4)16APSK ring ratio L, a plurality of times;

a symbol of a constellation point (baseband signal) corresponding to $[b_3b_2b_1b_0]$=[0110] of (12,4)16APSK ring ratio L, a plurality of times;

a symbol of a constellation point (baseband signal) corresponding to $[b_3b_2b_1b_0]$=[0111] of (12,4)16APSK ring ratio L, a plurality of times;

a symbol of a constellation point (baseband signal) corresponding to $[b_3b_2b_1b_0]$=[1000] of (12,4)16APSK ring ratio L, a plurality of times;

a symbol of a constellation point (baseband signal) corresponding to $[b_3b_2b_1b_0]$=[1001] of (12,4)16APSK ring ratio L, a plurality of times;

a symbol of a constellation point (baseband signal) corresponding to $[b_3b_2b_1b_0]$=[1010] of (12,4)16APSK ring ratio L, a plurality of times;

a symbol of a constellation point (baseband signal) corresponding to $[b_3b_2b_1b_0]$=[1011] of (12,4)16APSK ring ratio L, a plurality of times;

a symbol of a constellation point (baseband signal) corresponding to $[b_3b_2b_1b_0]$=[1100] of (12,4)16APSK ring ratio L, a plurality of times;

a symbol of a constellation point (baseband signal) corresponding to $[b_3b_2b_1b_0]$=[1101] of (12,4)16APSK ring ratio L, a plurality of times;

a symbol of a constellation point (baseband signal) corresponding to $[b_3b_2b_1b_0]$=[1110] of (12,4)16APSK ring ratio L, a plurality of times; and a symbol of a constellation point (baseband signal) corresponding to $[b_3b_2b_1b_0]$=[1111] of (12,4)16APSK ring ratio L, a plurality of times.

When the following symbols are each transmitted an equal number of times, there is an advantage that a reception device can perform precise estimation of distortion of a propagation path:

a symbol of a constellation point (baseband signal) corresponding to $[b_3b_2b_1b_0]$=[0000] of (12,4)16APSK ring ratio L;

a symbol of a constellation point (baseband signal) corresponding to $[b_3b_2b_1b_0]$=[0001] of (12,4)16APSK ring ratio L;

a symbol of a constellation point (baseband signal) corresponding to $[b_3b_2b_1b_0]$=[0010] of (12,4)16APSK ring ratio L;

a symbol of a constellation point (baseband signal) corresponding to $[b_3b_2b_1b_0]$=[0011] of (12,4)16APSK ring ratio L;

a symbol of a constellation point (baseband signal) corresponding to $[b_3b_2b_1b_0]$=[0100] of (12,4)16APSK ring ratio L;

a symbol of a constellation point (baseband signal) corresponding to $[b_3b_2b_1b_0]$=[0101] of (12,4)16APSK ring ratio L;

a symbol of a constellation point (baseband signal) corresponding to $[b_3b_2b_1b_0]$=[0110] of (12,4)16APSK ring ratio L;

a symbol of a constellation point (baseband signal) corresponding to $[b_3b_2b_1b_0]$=[0111] of (12,4)16APSK ring ratio L;

a symbol of a constellation point (baseband signal) corresponding to $[b_3b_2b_1b_0]$=[1000] of (12,4)16APSK ring ratio L;

a symbol of a constellation point (baseband signal) corresponding to $[b_3b_2b_1b_0]$=[1001] of (12,4)16APSK ring ratio L; $[b_3b_2b_1b_0]$=[1010] of (12,4)16APSK ring ratio L;

a symbol of a constellation point (baseband signal) corresponding to $[b_3b_2b_1b_0]$=[1011] of (12,4)16APSK ring ratio L;

a symbol of a constellation point (baseband signal) corresponding to $[b_3b_2b_1b_0]$=[1100] of (12,4)16APSK ring ratio L;

a symbol of a constellation point (baseband signal) corresponding to $[b_3b_2b_1b_0]$=[1101] of (12,4)16APSK ring ratio L;

a symbol of a constellation point (baseband signal) corresponding to $[b_3b_2b_1b_0]$=[1110] of (12,4)16APSK ring ratio L; and a symbol of a constellation point (baseband signal) corresponding to $[b_3b_2b_1b_0]$=[1111] of (12,4)16APSK ring ratio L.

Frame configurations applicable to the present disclosure are not limited to the above description. When a plurality of data symbols exist, a symbol for transmitting information related to a modulation scheme used in generating the plurality of data symbols, and a symbol for transmitting information related to an error correction scheme (for example, error correction code used, code length of error correction code, coding rate of error correction code, etc.) exist, any arrangement in a frame may be used with respect to the plurality of data symbols, the symbol for transmitting information related to a modulation scheme, and the symbol for transmitting information related to an error correction scheme. Further, symbols other than these symbols, for example a symbol for preamble and synchronization, pilot symbols, a reference symbol, etc., may exist in a frame.

Embodiment E

Embodiment B, Embodiment C, and Embodiment D describe methods of changing ring ratios of (12,4)16APSK, methods of transmitting control information, methods of transmitting pilot symbols, etc. Of course, the content described in Embodiment B, Embodiment C, and Embodiment D can be applied to other modulation schemes.

The present embodiment describes a scheme that can select a ring ratio of 32APSK for each channel even when a coding rate of error correction code is set to a given value (for example, coding rate set as K).

Thus, by setting a suitable ring ratio for each channel, a reception device can achieve high data reception quality.

FIG. 41 to FIG. 43 illustrate a terrestrial transmit station transmitting a transmit signal towards a satellite. FIG. 44 illustrates frequency allocation of each modulated signal. FIG. 45 and FIG. 46 illustrate examples of satellites (repeaters) that receive a signal transmitted by a terrestrial transmit station and transmit a modulated signal towards a terrestrial receive terminal.

First, ring ratio (radius ratio) of 32APSK is defined.

Figure 58:
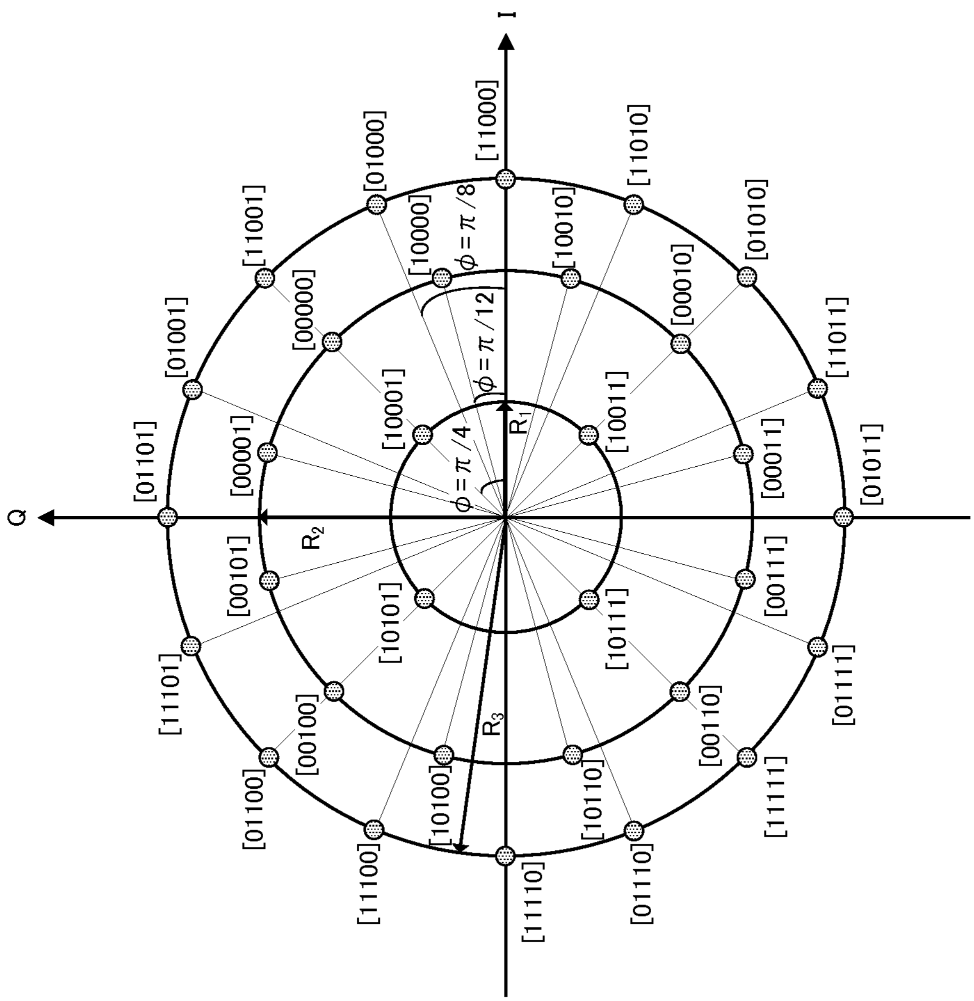
FIG. 58 illustrates an example of a constellation of (4,12,16)32APSK.

FIG. 58 illustrates constellations in an in-phase (I)-quadrature-phase (Q) plane of a scheme of 32APSK having 32 constellation points in an in-phase (I)-quadrature-phase (Q) plane.

FIG. 58 illustrates a constellation in an in-phase (I)-quadrature-phase (Q) plane of (4,12,16)32APSK. With an origin thereof as a center, constellation points a exist on a circle of radius $R_1$ (a=4), constellation points b exist on a circle of radius $R_2$ (b=12), and constellation points c exist on a circle of radius $R_3$ (c=16). Accordingly (a,b,c)=(4,12,16) and is therefore referred to as (4,12,16)32APSK. (Note that $0<R_1<R_2<R_3$.) Here, a first radius ratio (ring ratio) is defined as $r_1=R_2/R_1$ and a second radius ratio (ring ratio) is defined as $r_2=R_3/R_1$.

<Constellation>

The following describes a constellation and assignment (labelling) of bits to each constellation point of (4,12,16) 32APSK mapping.

An example of labelling is illustrated in FIG. 58. However, FIG. 58 is just an example and labelling that is different from FIG. 58 may be performed.

Coordinates of each constellation point of (4,12,16) 32APSK on the I-Q plane are as follows:

Input bits $[b_4b_3b_2b_1b_0]$=[00000]
. . . ($R_2\cos(\pi/4)$,$R_2\sin(\pi/4)$)
Input bits $[b_4b_3b_2b_1b_0]$=[00001]
. . . ($R_2\cos(\pi/4+\pi/6)$,$R_2\sin(\pi/4+\pi/6)$)
Input bits $[b_4b_3b_2b_1b_0]$=[00010]
. . . ($R_2\cos((7\times\pi)/4)$,$R_2\sin((7\times\pi)/4)$)
Input bits $[b_4b_3b_2b_1b_0]$=[00011]
. . . ($R_2\cos((7\times\pi)/4\pi/6)$,$R_2\sin((7\times\pi)/4-\pi/6)$)
Input bits $[b_4b_3b_2b_1b_0]$=[00100]
. . . ($R_2\cos((3\times\pi)/4)$,$R_2\sin((3\times\pi)/4)$)
Input bits $[b_4b_3b_2b_1b_0]$=[00101]
. . . ($R_2\cos((3\times\pi)/4-\pi/6)$,$R_2\sin((3\times\pi)/4-\pi/6)$)
Input bits $[b_4b_3b_2b_1b_0]$=[00110]
. . . ($R_2\cos((5\times\pi)/4)$,$R_2\sin((5\times\pi)/4)$)
Input bits $[b_4b_3b_2b_1b_0]$=[00111]
. . . ($R_2\cos((5\times\pi)/4+\pi/6)$,$R_2\sin((5\times\pi)/4+\pi/6)$)
Input bits $[b_4b_3b_2b_1b_0]$=[01000]
. . . ($R_3\cos(\pi/8)$,$R_3\sin(\pi/8)$)
Input bits $[b_4b_3b_2b_1b_0]$=[01001]
. . . ($R_3\cos((3\times\pi)/8)$,$R_3\sin((3\times\pi)/8)$)
Input bits $[b_4b_3b_2b_1b_0]$=[01010]
. . . ($R_3\cos((14\times\pi)/8)$, $R_3\sin((14\times\pi)/8)$)
Input bits $[b_4b_3b_2b_1b_0]$=[01011]
. . . ($R_3\cos((12\times\pi)/8)$,$R_3\sin((12\times\pi)/8)$)
Input bits $[b_4b_3b_2b_1b_0]$=[01100]
. . . ($R_3\cos((6\times\pi)/8)$,$R_3\sin((6\times\pi)/8)$)
Input bits $[b_4b_3b_2b_1b_0]$=[01101]
. . . ($R_3\cos((4\times\pi)/8)$,$R_3\sin((4\times\pi)/8)$)
Input bits $[b_4b_3b_2b_1b_0]$=[01110]
. . . ($R_3\cos((9\times\pi)/8)$,$R_3\sin((9\times\pi)/8)$)
Input bits $[b_4b_3b_2b_1b_0]$=[01111]
. . . ($R_3\cos((11\times\pi)/8)$,$R_3\sin((11\times\pi)/8)$)
Input bits $[b_4b_3b_2b_1b_0]$=[10000]
. . . ($R_2\cos(\pi/4-\pi/6)$,$R_2\sin(\pi/4-\pi/6)$)
Input bits $[b_4b_3b_2b_1b_0]$=[10001]
. . . ($R_1\cos(\pi/4)$,$R_1\sin(\pi/4)$)
Input bits $[b_4b_3b_2b_1b_0]$=[10010]
. . . ($R_2\cos((7\times\pi)/4+\pi/6)$,$R_2\sin((7\times\pi)/4+\pi/6)$)
Input bits $[b_4b_3b_2b_1b_0]$=[10011]
. . . ($R_1\cos((7\times\pi)/4)$,$R_1\sin((7\times\pi)/4)$)
Input bits $[b_4b_3b_2b_1b_0]$=[10100]
. . . ($R_2\cos((3\times\pi)/4+\pi/6)$,$R_2\sin((3\times\pi)/4+\pi/6)$)
Input bits $[b_4b_3b_2b_1b_0]$=[10101]
. . . ($R_1\cos((3\times\pi)/4)$,$R_1\sin((3\times\pi)/4)$)
Input bits $[b_4b_3b_2b_1b_0]$=[10110]
. . . ($R_2\cos((5\times\pi)/4-\pi/6)$,$R_2\sin((5\times\pi)/4-\pi/6)$)
Input bits $[b_4b_3b_2b_1b_0]$=[10111]
. . . ($R_1\cos((5\times\pi)/4)$,$R_1\sin((5\times\pi)/4)$)
Input bits $[b_4b_3b_2b_1b_0]$=[11000]
. . . ($R_3\cos(0\times\pi)/8)$,$R_3\sin(0\times\pi)/8)$)
Input bits $[b_4b_3b_2b_1b_0]$=[11001]
. . . ($R_3\cos((2\times\pi)/8)$,$R_3\sin((2\times\pi)/8)$)
Input bits $[b_4b_3b_2b_1b_0]$=[11010]
. . . ($R_3\cos((15\times\pi)/8)$,$R_3\sin((15\times\pi)/8)$)
Input bits $[b_4b_3b_2b_1b_0]$=[11011]
. . . ($R_3\cos((13\times\pi)/8)$,$R_3\sin((13\times\pi)/8)$)
Input bits $[b_4b_3b_2b_1b_0]$=[11100]
. . . ($R_3\cos((7\times\pi)/8)$,$R_3\sin((7\times\pi)/8)$)
Input bits $[b_4b_3b_2b_1b_0]$=[11101]
. . . ($R_3\cos((5\times\pi)/8)$,$R_3\sin((5\times\pi)/8)$)
Input bits $[b_4b_3b_2b_1b_0]$=[11110]
. . . ($R_3\cos((8\times\pi)/8)$,$R_3\sin((8\times\pi)/8)$)
Input bits $[b_4b_3b_2b_1b_0]$=[11111]
. . . ($R_3\cos((10\times\pi)/8)$,$R_3\sin((10\times\pi)/8)$)

With respect to phase, the unit used is radians. Accordingly, for example, referring to $R_2\cos(\pi/4)$, the unit of $\pi/4$ is radians. Hereinafter, the unit of phase is radians.

Further, for example, the following relationship is disclosed above:

Input bits $[b_4b_3b_2b_1b_0]$=[00000] . . . ($R_2\cos(\pi/4)$,$R_2\sin(\pi/4)$)

In data that is inputted to the mapper 708, for example, this means that when five bits $[b_4b_3b_2b_1b_0]$=[00000], an in-phase component I and quadrature component Q of a baseband signal after mapping are defined as (I,Q)=($R_2\cos(\pi/4)$,$R_2\sin(\pi/4)$).

As another example, the following relationship is disclosed above:

Input bits $[b_4b_3b_2b_1b_0]$=[01000] . . . ($R_3\cos(\pi/8)$,$R_3\sin(\pi/8)$)

In data that is inputted to the mapper 708, for example, this means that when five bits $[b_4b_3b_2b_1b_0]$=[01000], an in-phase component I and quadrature component Q of a baseband signal after mapping are defined as (I,Q)=($R_3\cos(\pi/8)$,$R_3\sin(\pi/8)$).

This relationship is defined for all values of input bits $[b_4b_3b_2b_1b_0]$ from [00000] to [11111].

<Transmission Output>

In order to achieve the same transmission output for (4,12,16)32APSK as other transmission schemes, the following normalization coefficient may be used.

[Math 27]

$$a_{(4,12,16)} = \frac{z}{\sqrt{(4\times R_1^2+12\times R_2^2+16\times R_3^2)/32}} \qquad \text{(Math 27)}$$

Prior to normalization, the in-phase component of a baseband signal is $I_b$ and the quadrature component of the baseband signal is $Q_b$. After normalization, the in-phase component of the baseband signal is $I_n$ and the quadrature component of the baseband signal is $Q_n$. Thus, when a modulation scheme is (4,12,16)32APSK, ($I_n$, $Q_n$)=($a_{(4,12,16)}\times I_b$, $a_{(4,12,16)}\times Q_b$) holds true.

Accordingly, when a modulation scheme is (4,12,16) 32APSK, the in-phase component $I_b$ and quadrature component $Q_b$ are the in-phase component I and quadrature component Q, respectively, of a baseband signal after mapping that is obtained by mapping based on FIG. 58. Accordingly, when a modulation scheme is (4,12,16)32APSK, the following relationships hold true:

Input bits $[b_4b_3b_2b_1b_0]$=[00000]

. . . $(I_n, Q_n)=(a_{(4,12,16)}\times R_2\times\cos(\pi/4), a_{(4,12,16)}\times R_2\times\sin(\pi/4))$ Input bits $[b_4b_3b_2b_1b_0]$=[00001]

. . . $(I_n, Q_n)=(a_{(4,12,16)}\times R_2\times\cos(\pi/4+\pi/6), a_{(4,12,16)}\times R_2\times\sin(\pi/4+\pi/6))$ Input bits $[b_4b_3b_2b_1b_0]$=[00010]

. . . $(I_n, Q_n)=(a_{(4,12,16)}\times R_2\times\cos((7\times\pi)/4), a_{(4,12,16)}\times R_2\times\sin((7\times\pi)/4))$ Input bits $[b_4b_3b_2b_1b_0]$=[00011]

. . . $(I_n, Q_n)=(a_{(4,12,16)}\times R_2\times\cos((7\times\pi)/4\pi/6), a_{(4,12,16)}\times R_2\times\sin((7\times\pi)/4\pi/6))$ Input bits $[b_4b_3b_2b_1b_0]$=[00100]

. . . $(I_n, Q_n)=(a_{(4,12,16)}\times R_2\times\cos((3\times\pi)/4), a_{(4,12,16)}\times R_2\times\sin((3\times\pi)/4))$ Input bits $[b_4b_3b_2b_1b_0]$=[00101]

. . . $(I_n, Q_n)=(a_{(4,12,16)}\times R_2\times\cos((3\times\pi)/4\pi/6), a_{(4,12,16)}\times R_2\times\sin((3\times\pi)/4\pi/6))$ Input bits $[b_4b_3b_2b_1b_0]$=[00110]

. . . $(I_n, Q_n)=(a_{(4,12,16)}\times R_2\times\cos((5\times\pi)/4), a_{(4,12,16)}\times R_2\times\sin((5\times\pi)/4))$ Input bits $[b_4b_3b_2b_1b_0]$=[00111]

. . . $(I_n, Q_n)=(a_{(4,12,16)}\times R_2\times\cos((5\times\pi)/4+\pi/6), a_{(4,12,16)}\times R_2\times\sin((5\times\pi)/4+\pi/6))$ Input bits $[b_4b_3b_2b_1b_0]$=[01000]

. . . $(I_n, Q_n)=(a_{(4,12,16)}\times R_3\times\cos(\pi/8), a_{(4,12,16)}\times R_3\times\sin(\pi/8))$ Input bits $[b_4b_3b_2b_1b_0]$=[01001]

. . . $(I_n, Q_n)=(a_{(4,12,16)}\times R_3\times\cos((3\times\pi)/8), a_{(4,12,16)}\times R_3\times\sin((3\times\pi)/8))$ Input bits $[b_4b_3b_2b_1b_0]$=[01010]

. . . $(I_n, Q_n)=(a_{(4,12,16)}\times R_3\times\cos((14\times\pi)/8), a_{(4,12,16)}\times R_3\times\sin((14\times\pi)/8))$ Input bits $[b_4b_3b_2b_1b_0]$=[01011]

. . . $(I_n, Q_n)=(a_{(4,12,16)}\times R_3\times\cos((12\times\pi)/8), a_{(4,12,16)}\times R_3\times\sin((12\times\pi)/8))$ Input bits $[b_4b_3b_2b_1b_0]$=[01100]

. . . $(I_n, Q_n)=(a_{(4,12,16)}\times R_3\times\cos((6\times\pi)/8), a_{(4,12,16)}\times R_3\times\sin((6\times\pi)/8))$ Input bits $[b_4b_3b_2b_1b_0]$=[01101]

. . . $(I_n, Q_n)=(a_{(4,12,16)}\times R_3\times\cos((4\times\pi)/8), a_{(4,12,16)}\times R_3\times\sin((4\times\pi)/8))$ Input bits $[b_4b_3b_2b_1b_0]$=[01110]

. . . $(I_n, Q_n)=(a_{(4,12,16)}\times R_3\times\cos((9\times\pi)/8), a_{(4,12,16)}\times R_3\times\sin((9\times\pi)/8))$ Input bits $[b_4b_3b_2b_1b_0]$=[01111]

. . . $(I_n, Q_n)=(a_{(4,12,16)}\times R_3\times\cos((11\times\pi)/8), a_{(4,12,16)}\times R_3\times\sin((11\times\pi)/8))$ Input bits $[b_4b_3b_2b_1b_0]$=[10000]

. . . $(I_n, Q_n)=(a_{(4,12,16)}\times R_2\times\cos(\pi/4-\pi/6), a_{(4,12,16)}\times R_2\times\sin(\pi/4-\pi/6))$ Input bits $[b_4b_3b_2b_1b_0]$=[10001]

. . . $(I_n, Q_n)=(a_{(4,12,16)}\times R_1\times\cos(\pi/4), a_{(4,12,16)}\times R_1\times\sin(\pi/4))$ Input bits $[b_4b_3b_2b_1b_0]$=[10010]

. . . $(I_n, Q_n)=(a_{(4,12,16)}\times R_2\times\cos(7\times\pi)/4+\pi/6), a_{(4,12,16)}\times R_2\times\sin(7\times\pi)/4+\pi/6))$ Input bits $[b_4b_3b_2b_1b_0]$=[10011]

. . . $(I_n, Q_n)=(a_{(4,12,16)}\times R_1\times\cos((7\times\pi)/4), a_{(4,12,16)}\times R_1\times\sin((7\times\pi)/4))$ Input bits $[b_4b_3b_2b_1b_0]$=[10100]

. . . $(I_n, Q_n)=(a_{(4,12,16)}\times R_2\times\cos((3\times\pi)/4+\pi/6), a_{(4,12,16)}\times R_2\times\sin((3\times\pi)/4+\pi/6))$ Input bits $[b_4b_3b_2b_1b_0]$=[10101]

. . . $(I_n, Q_n)=(a_{(4,12,16)}\times R_1\times\cos((3\times\pi)/4), a_{(4,12,16)}\times R_1\times\sin((3\times\pi)/4))$ Input bits $[b_4b_3b_2b_1b_0]$=[10110]

. . . $(I_n, Q_n)=(a_{(4,12,16)}\times R_2\times\cos((5\times\pi)/4\pi/6), a_{(4,12,16)}\times R_2\times\sin((5\times\pi)/4\pi/6))$ Input bits $[b_4b_3b_2b_1b_0]$=[10111]

. . . $(I_n, Q_n)=(a_{(4,12,16)}\times R_1\times\cos((5\times\pi)/4), a_{(4,12,16)}\times R_1\times\sin((5\times\pi)/4))$ Input bits $[b_4b_3b_2b_1b_0]$=[11000]

. . . $(I_n, Q_n)=(a_{(4,12,16)}\times R_3\times\sin((8\times\pi)/8), a_{(4,12,16)}\times R_3\times\sin((0\times\pi)/8))$ Input bits $[b_4b_3b_2b_1b_0]$=[11001]

. . . $(I_n, Q_n)=(a_{(4,12,16)}\times R_3\times\cos((2\times\pi)/8), a_{(4,12,16)}\times R_3\times\sin((2\times\pi)/8))$ Input bits $[b_4b_3b_2b_1b_0]$=[11010]

. . . $(I_n, Q_n)=(a_{(4,12,16)}\times R_3\times\cos((15\times\pi)/8), a_{(4,12,16)}\times R_3\times\sin((15\times\pi)/8))$ Input bits $[b_4b_3b_2b_1b_0]$=[11011]

. . . $(I_n, Q_n)=(a_{(4,12,16)}\times R_3\times\cos((13\times\pi)/8), a_{(4,12,16)}\times R_3\times\sin((13\times\pi)/8))$ Input bits $[b_4b_3b_2b_1b_0]$=[11100]

. . . $(I_n, Q_n)=(a_{(4,12,16)}\times R_3\times\cos(7\times\pi)/8), a_{(4,12,16)}\times R_3\times\sin((7\times\pi)/8))$ Input bits $[b_4b_3b_2b_1b_0]$=[11101]

. . . $(I_n, Q_n)=(a_{(4,12,16)}\times R_3\times\cos((5\times\pi)/8), a_{(4,12,16)}\times R_3\times\sin((5\times\pi)/8))$ Input bits $[b_4b_3b_2b_1b_0]$=[11110]

. . . $(I_n, Q_n)=(a_{(4,12,16)}\times R_3\times\cos((8\times\pi)/8), a_{(4,12,16)}\times R_3\times\sin((8\times\pi)/8))$ Input bits $[b_4b_3b_2b_1b_0]$=[11111]

. . . $(I_n, Q_n)=(a_{(4,12,16)}\times R_3\times\cos((10\times\pi)/8), a_{(4,12,16)}\times R_3\times\sin((10\times\pi)/8))$ Further, for example, the following relationship is disclosed above:

Input bits $[b_4b_3b_2b_1b_0]$=[00000]

. . . $(I_n, Q_n)=(a_{(4,12,16)}\times R_2\times\cos(\pi/4), a_{(4,12,16)}\times R_2\times\sin(\pi/4))$ In data that is inputted to the mapper 708, this means that when five bits $[b_4b_3b_2b_1b_0]$=[00000], $(I_n, Q_n)=(a_{(4,12,16)}\times R_2\times\cos(\pi/4), a_{(4,12,16)}\times R_2\times\sin(\pi/4))$.

As another example, the following relationship is disclosed above:

Input bits $[b_4b_3b_2b_1b_0]$=[01000]

. . . $(I_n, Q_n)=(a_{(4,12,16)}\times R_3\times\cos(\pi/8), a_{(4,12,16)}\times R_3\times\sin(\pi/8))$ In data that is inputted to the mapper 708, this means that when five bits $[b_4b_3b_2b_1b_0]$=[01000], $(I_n, Q_n)=(a_{(4,12,16)}\times R_3\times\cos(\pi/8), a_{(4,12,16)}\times R_3\times\sin(\pi/8))$.

This relationship is defined for all values of input bits $[b_4b_3b_2b_1b_0]$ from [00000] to[11111].

<Transmit Station>

FIG. 41 illustrates an example of a transmit station having a common (shared) amplifier.

N transmit systems B101_1 to B101_N of FIG. 41 each receive video data, audio data, and the control signal A100 as input.

The control signal A100 specifies code length of error correction code, coding rate, modulation scheme, and ring ratio for each channel. This modulation scheme is, for example, specified as (4,12,16)32APSK.

Transmit systems B101_1 to B101_N generate modulated signals according to the control signal A100.

The common (shared) amplifier B102 receives modulated signals #1 to # N as input, amplifies the modulated signals, and outputs the post-amplification transmit signal B103 including the modulated signals #1 to # N.

The transmit signal B103 is composed of a signal of N channels of modulated signals #1 to # N and includes a "TMCC information symbol group" for each channel (each modulated signal). These "TMCC information symbol groups" include ring ratio information in addition to code length of error correction code, coding rate and modulation scheme.

Specifically, modulated signal #1 includes "TMCC information symbol group" in modulated signal #1 (channel #1), modulated signal #2 includes "TMCC information symbol group" in modulated signal #2 (channel #2), . . . , modulated signal # N includes "TMCC information symbol group" in modulated signal # N (channel # N).

The transmit signal B103 is transmitted via the antenna B104.

FIG. 42 illustrates an example of a transmit station having an amplifier for each transmit system channel.

N amplifiers B201_1 to B201_N amplify a modulated signal inputted thereto, and output transmit signals B202_1 to B202_N. Transmit signals B202_1 to B202_N are transmitted via antennas B203_1 to B203_N.

The transmit station of FIG. 43 is an example of a transmit station that has an amplifier for each transmit system channel, but transmits after mixing by a mixer.

The mixer B301 mixes post-amplification modulated signals outputted from the amplifiers B201_1 to B201_N, and transmits the post-mixing transmit signal B302 via the antenna B303.

<Frequency Allocation of Each Modulated Signal>

FIG. 44 illustrates an example of frequency allocation of signals (transmit signals or modulated signals) B401_1 to B401_N. In FIG. 44, the horizontal axis is frequency and the vertical axis is power. As illustrated in FIG. 44, B401_1 indicates a position on a frequency axis of transmit signal #1 (modulated signal #1) in FIG. 41, FIG. 42, and FIG. 43; B401_2 indicates a position on the frequency axis of transmit signal #2 (modulated signal #2) in FIG. 41, FIG. 42, and FIG. 43; . . . ; and B401_N indicates a position on the frequency axis of transmit signal # N (modulated signal # N) in FIG. 41, FIG. 42, and FIG. 43.

<Satellite>

Referring to the satellite of FIG. 45, the receive antenna B501 receives a signal transmitted by a transmit station, and outputs the receive signal B502. Here, the receive signal B502 includes components of modulated signal #1 to modulated signal # N in FIG. 41, FIG. 42, FIG. 43, and FIG. 44.

B503 in FIG. 45 is a radio processor. The radio processor B503 includes radio processing B503_1 to B503_N.

Radio processing B503_1 receives the receive signal B502 as input, performs signal processing such as amplification and frequency conversion with respect to components of modulated signal #1 in FIG. 41, FIG. 42, FIG. 43, and FIG. 44, and outputs a post-signal processing modulated signal #1.

Likewise, radio processing B503_2 receives the receive signal B502 as input, performs signal processing such as amplification and frequency conversion with respect to components of modulated signal #2 in FIG. 41, FIG. 42, FIG. 43, and FIG. 44, and outputs a post-signal processing modulated signal #2.

Likewise, radio processing B503_N receives the receive signal B502 as input, performs signal processing such as amplification and frequency conversion with respect to components of modulated signal # N in FIG. 41, FIG. 42, FIG. 43, and FIG. 44, and outputs a post-signal processing modulated signal # N.

The amplifier B504_1 receives the post-signal processing modulated signal #1 as input, amplifies the post-signal processing modulated signal #1, and outputs a post-amplification modulated signal #1.

The amplifier B504_2 receives the post-signal processing modulated signal #2 as input, amplifies the post-signal processing modulated signal #2, and outputs a post-amplification modulated signal #2.

The amplifier B504_N receives the post-signal processing modulated signal # N as input, amplifies the post-signal processing modulated signal # N, and outputs a post-amplification modulated signal # N.

Thus, each post-amplification modulated signal is transmitted via a respective one of antennas B50δ_1 to B50δ_N. (A transmitted modulated signal is received by a terrestrial terminal.) Here, frequency allocation of signals transmitted by a satellite (repeater) is described with reference to FIG. 44.

As illustrated in FIG. 44, B401_1 indicates a position on a frequency axis of transmit signal #1 (modulated signal #1) in FIG. 41, FIG. 42, and FIG. 43; B401_2 indicates a position on the frequency axis of transmit signal #2 (modulated signal #2) in FIG. 41, FIG. 42, and FIG. 43; . . . ; and B401_N indicates a position on the frequency axis of transmit signal # N (modulated signal # N) in FIG. 41, FIG. 42, and FIG. 43. Here, a frequency band being used is assumed to be a α GHz.

Referring to FIG. 44, B401_1 indicates a position on the frequency axis of modulated signal #1 transmitted by the satellite (repeater) in FIG. 45; B401_2 indicates a position on the frequency axis of modulated signal #2 transmitted by the satellite (repeater) in FIG. 45; . . . ; and B401_N indicates a position on the frequency axis of modulated signal # N transmitted by the satellite (repeater) in FIG. 45. Here, a frequency band being used is assumed to be β GHz.

The satellite in FIG. 46 is different from the satellite in FIG. 45 in that a signal is transmitted after mixing at the mixer B601. Thus, the mixer B601 receives a post-amplification modulated signal #1, a post-amplification modulated signal #2, . . . , a post-amplification modulated signal # N as input, and generates a post-mixing modulated signal. Here, the post-mixing modulated signal includes a modulated signal #1 component, a modulated signal #2 component, . . . , and a modulated signal # N component, frequency allocation is as in FIG. 44, and is a signal in β GHz.

<Ring Ratio Selection>

Referring to the satellite systems described in FIG. 41 to FIG. 46, (4,12,16)32APSK ring ratios (radius ratios) $(r_1,r_2)$ are described as being selected for each channel from channel #1 to channel # N.

For example, when a code length (block length) of error correction code is X bits, among a plurality of selectable coding rates, a coding rate A (for example, ¾) is selected.

Referring to the satellite systems in FIG. 45 and FIG. 46, when distortion of the amplifiers B504_1, B504_2, . . . , B504_N is low (linearity of input and output is high), even when the two ring ratios (radius ratios) of (4,12,16)32APSK $(r_1,r_2)$ are uniquely defined, as long as suitable values are determined a (terrestrial) terminal (reception device) can achieve high data reception quality.

In satellite systems, amplifiers that can achieve high output are used in order to transmit modulated signals to terrestrial terminals. Thus, high-distortion amplifiers (linearity of input and output is low) are used, and the likelihood of distortion varying between amplifiers is high (distortion properties (input/output properties) of the amplifiers B504_1, B504_2, . . . , B504_N are different).

In this case, use of suitable (4,12,16)32APSK ring ratios (radius ratios) $(r_1,r_2)$ for each amplifier, i.e., selecting suitable (4,12,16)32APSK ring ratios (radius ratios) $(r_1,r_2)$ for each channel, enables high data reception quality for each channel at a terminal. The transmit stations in FIG. 41, FIG. 42, and FIG. 43 perform this kind of setting by using the control signal A100.

Accordingly, information related to the two (4,12,16) 32APSK ring ratios (radius ratios) $(r_1,r_2)$ is included in, for example, control information such as TMCC that is included in each modulated signal (each channel). (This is performed as described in other embodiments.)

Accordingly, when the (terrestrial) transmit station in FIG. 41, FIG. 42, and FIG. 43 uses (4,12,16)32APSK as a modulation scheme of a data symbol of modulated signal #1, ring ratio (radius ratio) $(r_1,r_2)$ information of the (4,12,16) 32APSK is transmitted as a portion of control information.

Likewise, when the (terrestrial) transmit station in FIG. 41, FIG. 42, and FIG. 43 uses (4,12,16)32APSK as a modulation scheme of a data symbol of modulated signal #2, ring ratio (radius ratio) $(r_1,r_2)$ information of the (4,12,16) 32APSK is transmitted as a portion of control information.

Likewise, when the (terrestrial) transmit station in FIG. 41, FIG. 42, and FIG. 43 uses (4,12,16)32APSK as a modulation scheme of a data symbol of modulated signal # N, ring ratio (radius ratio) $(r_1,r_2)$ information of the (4,12,16)32APSK is transmitted as a portion of control information.

A coding rate of error correction code used in modulated signal #1, a coding rate of error correction code used in modulated signal #2, . . . , and a coding rate of error correction code used in modulated signal # N may be identical.

<Reception Device>

A reception device is described that corresponds to the transmission method of the present embodiment.

The reception device (terminal) A200 of FIG. 40 receives, via the antenna A201, a radio signal transmitted by the transmit station in FIG. 41 and FIG. 42 and relayed by a satellite (repeater station). The RF receiver A202 performs processing such as frequency conversion and quadrature demodulation on a received radio signal, and outputs a baseband signal.

The demodulator A204 performs processing such as root roll-off filter processing, and outputs a post-filter baseband signal.

The synchronization and channel estimator A214 receives a post-filter baseband signal as input, performs time synchronization, frequency synchronization, and channel estimation, using, for example, a "synchronization symbol group" and "pilot symbol group" transmitted by the transmission device, and outputs an estimated signal.

The control information estimator A216 receives a post-filter baseband signal as input, extracts symbols including control information such as a "TMCC information symbol group", performs demodulation and decoding, and outputs a control signal. Of importance to the present embodiment is that a symbol transmitting "TMCC information symbol group" information is demodulated and decoded by the reception device A200. Thus, the control information estimator A216 generates information specifying a code length of error correction code, coding rate, modulation scheme, and ring ratio per channel, from values decoded at the reception device A200, and outputs the information as a portion of a control signal.

The de-mapper A206 receives a post-filter baseband signal, control signal, and estimated signal as input, determines, based on the control signal, a modulation scheme (or transmission method) and ring ratio used by "slots composed by a data symbol group", calculates, based on this determination, a log-likelihood ratio (LLR) for each bit included in a data symbol from the post-filter baseband signal and the estimated signal, and outputs the LLRs. (However, instead of a soft decision value such as an LLR a hard decision value may be outputted, and a soft decision value may be outputted instead of an LLR.)

The de-interleaver A208 receives log-likelihood ratios and a control signal as input, accumulates input, performs de-interleaving (permutes data) corresponding to interleaving used by the transmission device, and outputs post-de-interleaving log-likelihood ratios.

The error correction decoder A212 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method. The above describes operation when iterative detection is not performed, but the reception device may perform iterative detection as described for the reception device of FIG. 2.

A method of generating ring ratio information included in control information is not limited to the embodiment described prior to the present embodiment, and information related to ring ratios may be transmitted by any means.

Embodiment F

The present embodiment describes signaling (method of transmitting control information) for notifying a terminal of ring ratios (for example two (4,12,16)32APSK ring ratios (radius ratios)).

Note that ring ratios (for example, two (4,12,16)32APSK ring ratios (radius ratios)) have been defined prior to the present embodiment, and ring ratios may also be referred to as "radius ratios".

Signaling as above can be performed by using bits included in a "TMCC information symbol group" as described in the present description.

In the present embodiment, an example of configuring a "TMCC information symbol group" is based on *Transmission System for Advanced Wide Band Digital Satellite Broadcasting*, ARIB Standard STD-B44, Ver. 1.0.

Information related to ring ratios for a transmit station to notify a terminal via a satellite (repeater) may accompany use of the 3614 bits of "extended information" within a "TMCC information symbol group" described with reference to FIG. 18. (This point is also disclosed in *Transmission System for Advanced Wide Band Digital Satellite Broadcasting*, ARIB Standard STD-B44, Ver. 1.0.) This is illustrated in FIG. 47.

Extended information in FIG. 47 is a field used for conventional TMCC extended information, and is composed of 16 bits of an extended identifier and 3598 bits of an extended region. In "extended information" of TMCC in FIG. 47, when "scheme A" is applied, the extended identifier is all "0" (all 16 bits are zero) and the 3598 bits of the extended region are "1".

Further, when "scheme B" is applied, bits of the extended identifier have values other than all "0", i.e., values other than "0000000000000000", as TMCC information is extended. Whether scheme A or scheme B is applied may for example be determined by user settings.

"Scheme A" is a transmission scheme (for example, satellite digital broadcast) that determines a ring ratio when a coding rate of error correction code is set to a given value. (Ring ratio is uniquely determined when a coding rate of error correction code to be used is determined.)

"Scheme B" is a transmission scheme (for example, satellite digital broadcast) that can select a ring ratio to use from a plurality of ring ratios each time a coding rate of error correction code is set to a given value.

The following describes examples of signaling performed by a transmit station, with reference to FIG. 59 to FIG. 63, but in all the examples the following bits are used in signaling.

$d_0$: Indicates a scheme of satellite broadcasting.

$c_0c_1c_2c_3(c_4c_5c_6c_7)$: Indicate a table.

$b_0b_1b_2b_3$: Indicate coding rate (may also indicate ring ratio).

$x_0x_1x_2x_3x_4x_5(x_6x_7x_8x_9x_{10}x_{11})$: Indicate ring ratio.

$y_0y_1y_2y_3y_4y_5(y_6y_7y_8y_9y_{10}y_{11})$: Indicate ring ratio difference.

Detailed description of the above bits is provided later.

The "coding rate" illustrated in FIG. 59 to FIG. 63 is coding rate of error correction code, and although values of 41/120, 49/120, 61/120, and 109/120 are specifically illustrated, these values may be approximated as 41/120≈⅓, 49/120≈⅖, 61/120≈½, and 109/120≈9/10.

The following describes <Example 1> to <Example 5>.

Referring to extended information in FIG. 47, "scheme A" is selected when all bits of the extended identifier are "0" (all 16 bits are zero) and all 3598 bits of the extended region are "1".

First, a case is described in which a transmission device (transmit station) transmits a modulated signal using "scheme A".

When a transmission device (transmit station) selects (4,12,16)32APSK as a modulation scheme, a relationship between coding rate of error correction code and ring ratio of (4,12,16)32APSK is as follows.

TABLE 18

Relationship between coding rate and ring ratios (radius ratios) of (4, 12, 16)32APSK when "scheme A" is selected

| Coding rate (Approximate value) | Ring ratio $r_1$ | Ring ratio $r_2$ |
|---|---|---|
| 41/120 (⅓) | 3.09 | 6.53 |
| 49/120 (⅖) | 2.97 | 7.17 |
| 61/120 (½) | 3.93 | 8.03 |
| 73/120 (⅗) | 2.87 | 5.61 |
| 81/120 (⅔) | 2.92 | 5.68 |
| 89/120 (¾) | 2.97 | 5.57 |
| 97/120 (⅘) | 2.73 | 5.05 |
| 101/120 (⅚) | 2.67 | 4.80 |
| 105/120 (⅞) | 2.76 | 4.82 |
| 109/120 (9/10) | 2.69 | 4.66 |

Accordingly, setting all bits of TMCC extended identifier to "0" (all 16 bits are zero) and setting all 3598 bits of TMCC extended region to "1" (a transmission device transmits these values) enables a reception device to determine that "scheme A" is selected, and further, coding rate information of error correction code is transmitted as a portion of TMCC. A reception device can determine the two (4,12,16) 32APSK ring ratios (radius ratios) from this information when (4,12,16)32APSK is used as a modulation scheme.

Specifically, $b_0$, $b_1$, $b_2$, and $b_3$ are used as described above. A relationship between $b_0$, $b_1$, $b_2$, $b_3$, and coding rate of error correction code is as follows.

TABLE 19

Relationship between $b_0$, $b_1$, $b_2$, $b_3$, and coding rate of error correction coding

| $b_0$, $b_1$, $b_2$, $b_3$ | Coding rate (Approximate value) |
|---|---|
| 0000 | 41/120 (⅓) |
| 0001 | 49/120 (⅖) |
| 0010 | 61/120 (½) |
| 0011 | 73/120 (⅗) |
| 0100 | 81/120 (⅔) |
| 0101 | 89/120 (¾) |
| 0110 | 97/120 (⅘) |
| 0111 | 101/120 (⅚) |
| 1000 | 105/120 (⅞) |
| 1001 | 109/120 (9/10) |

As in Table 19, when a transmission device (transmit station) uses 41/120 as a coding rate of error correction code, $(b_0b_1b_2b_3)$=(0000). Further, when 49/120 is used as a coding rate of error correction code, $(b_0b_1b_2b_3)$=(0001), . . . , when 109/120 is used as a coding rate of error correction code, $(b_0b_1b_2b_3)$=(1001). As a portion of TMCC, $b_0$, $b_1$, $b_2$, and $b_3$ are transmitted.

Accordingly, the following table can be made.

TABLE 20

Relationship between $b_0$, $b_1$, $b_2$, $b_3$, coding rate of error correction code, and ring ratios

| $b_0$, $b_1$, $b_2$, $b_3$ | Coding rate (approximate value) | Ring ratio $r_1$ | Ring ratio $r_2$ |
|---|---|---|---|
| 0000 | 41/120 (⅓) | 3.09 | 6.53 |
| 0001 | 49/120 (⅖) | 2.97 | 7.17 |
| 0010 | 61/120 (½) | 3.93 | 8.03 |
| 0011 | 73/120 (⅗) | 2.87 | 5.61 |
| 0100 | 81/120 (⅔) | 2.92 | 5.68 |
| 0101 | 89/120 (¾) | 2.97 | 5.57 |
| 0110 | 97/120 (⅘) | 2.73 | 5.05 |
| 0111 | 101/120 (⅚) | 2.67 | 4.80 |
| 1000 | 105/120 (⅞) | 2.76 | 4.82 |
| 1001 | 109/120 (9/10) | 2.69 | 4.66 |

As can be seen from Table 20, when a transmission device (transmit station) is set so that $(b_0b_1b_2b_3)$=(0000), the coding rate of error correction coding is 41/120, and when (4,12,16)32APSK is used, ring ratio (radius ratio) $r_1$ is 3.09, and ring ratio (radius ratio) $r_2$ is 6.53.

When a transmission device (transmit station) is set to $(b_0b_1b_2b_3)$=(0001), a coding rate of error correction code is 49/120, and when (4,12,16)32APSK is used, ring ratio (radius ratio) $r_1$ is 2.97, and ring ratio (radius ratio) $r_2$ is 7.17.

When a transmission device (transmit station) is set to $(b_0b_1b_2b_3)$=(0010), a coding rate of error correction code is 61/120, and when (4,12,16)32APSK is used, ring ratio (radius ratio) $r_1$ is 3.93, and ring ratio (radius ratio) $r_2$ is 8.03.

When a transmission device (transmit station) is set to $(b_0b_1b_2b_3)$=(0011), a coding rate of error correction code is 73/120, and when (4,12,16)32APSK is used, ring ratio (radius ratio) $r_1$ is 2.87, and ring ratio (radius ratio) $r_2$ is 5.61.

When a transmission device (transmit station) is set to $(b_0b_1b_2b_3)$=(0100), a coding rate of error correction code is 81/120, and when (4,12,16)32APSK is used, ring ratio (radius ratio) $r_1$ is 2.92, and ring ratio (radius ratio) $r_2$ is 5.68.

When a transmission device (transmit station) is set to $(b_0b_1b_2b_3)$=(0101), a coding rate of error correction code is 89/120, and when (4,12,16)32APSK is used, ring ratio (radius ratio) $r_1$ is 2.97, and ring ratio (radius ratio) $r_2$ is 5.57.

When a transmission device (transmit station) is set to $(b_0b_1b_2b_3)$=(0110), a coding rate of error correction code is 97/120, and when (4,12,16)32APSK is used, ring ratio (radius ratio) $r_1$ is 2.73, and ring ratio (radius ratio) $r_2$ is 5.05.

When a transmission device (transmit station) is set to $(b_0b_1b_2b_3)$=(0111), a coding rate of error correction code is 101/128, and when (4,12,16)32APSK is used, ring ratio (radius ratio) $r_1$ is 2.67, and ring ratio (radius ratio) $r_2$ is 4.80.

When a transmission device (transmit station) is set to $(b_0b_1b_2b_3)$=(1000), a coding rate of error correction code is 105/120, and when (4,12,16)32APSK is used, ring ratio (radius ratio) $r_1$ is 2.76, and ring ratio (radius ratio) $r_2$ is 4.82.

When a transmission device (transmit station) is set to $(b_0b_1b_2b_3)$=(1001), a coding rate of error correction code is 109/120, and when (4,12,16)32APSK is used, ring ratio (radius ratio) $r_1$ is 2.69, and ring ratio (radius ratio) $r_2$ is 4.66.

Accordingly, the transmission device (transmit station):

Sets all bits of TMCC extended information to "0" (all 16 bits are zero) and all 3598 bits of TMCC extended region to "1", in order to notify a reception device that "scheme A" is being used.

Transmits $b_0b_1b_2b_3$ in order that coding rate of error correction code and (4,12,16)32APSK ring ratios can be estimated.

The following describes a case in which a transmission device (of a transmit station) transmits data using "scheme B".

As described above, when "scheme B" is applied, bits of the extended identifier have values other than all "0", i.e., values other than "0000000000000000", as TMCC information is extended. Here, as an example, when "0000000000000001" is transmitted as an extended identifier, a transmission device (of a transmit station) transmits data using "scheme B".

When the 16 bits of an extended identifier are represented as $d_{15}$, $d_{14}$, $d_{13}$, $d_{12}$, $d_{11}$, $d_{10}$, $d_9$, $d_8$, $d_7$, $d_6$, $d_5$, $d_4$, $d_3$, $d_2$, $d_1$, $d_0$, in a case in which "scheme B" is applied, $(d_{15}, d_{14}, d_{13}, d_{12}, d_{11}, d_{10}, d_9, d_8, d_7, d_6, d_5, d_4, d_3, d_2, d_1, d_0)$=(0, 0, 0, 0, 0, 0, 0, 0, 0, 0, 0, 0, 0, 0, 0, 1). (When "scheme B" is applied as described above it suffices that $(d_{15}, d_{14}, d_{13}, d_{12}, d_{11}, d_{10}, d_9, d_8, d_7, d_6, d_5, d_4, d_3, d_2, d_1, d_0)$ are set to values other than (0, 0, 0, 0, 0, 0, 0, 0, 0, 0, 0, 0, 0, 0, 0, 0), and are therefore not limited to the example of $(d_{15}, d_{14}, d_{13}, d_{12}, d_{11}, d_{10}, d_9, d_8, d_7, d_6, d_5, d_4, d_3, d_2, d_1, d_0)$=(0, 0, 0, 0, 0, 0, 0, 0, 0, 0, 0, 0, 0, 0, 0, 1).)

As specific examples, <Example 1> to <Example 5> are described below.

Example 1

In example 1, a plurality of ring ratios are prepared in a table of (4,12,16)32APSK ring ratios (radius ratios), and therefore different ring ratios can be set for one coding rate.

As an example a case is described in which "satellite broadcasting scheme: "scheme B", coding rate: 41/120, (4,12,16)32APSK ring ratio $r_1$: 3.50 and ring ratio $r_2$: 7.21" are set. (Note that it is assumed that (4,12,16)32APSK is selected as a modulation scheme.)

As illustrated in FIG. 59, table 1, table 2, . . . , table 16, in other words 16 tables, table 1 to table 16, are prepared.

Each table associates $(b_0b_1b_2b_3)$ values as described above, coding rates of error correction code, and (4,12,16) 32APSK ring ratio $r_1$ and ring ratio $r_2$ with each other.

For example, in table 1, when a coding rate of error correction code for generating a data symbol is 41/120 and (4,12,16)32APSK ring ratio $r_1$ is 3.09 and ring ratio $r_2$ is 6.58, $(b_0b_1b_2b_3)$=(0000). In the same way, when a coding rate of error correction code for generating a data symbol is 49/120 and (4,12,16)32APSK ring ratio $r_1$ is 2.97 and ring ratio $r_2$ is 7.17, $(b_0b_1b_2b_3)$=(0001) . . . . When a coding rate of error correction code for generating a data symbol is 109/120 and (4,12,16)32APSK ring ratio $r_1$ is 2.69 and ring ratio $r_2$ is 4.66, $(b_0b_1b_2b_3)$=(1001).

In table 2, when a coding rate of error correction code for generating a data symbol is 41/120 and (4,12,16)32APSK ring ratio $r_1$ is 3.50 and ring ratio $r_2$ is 7.21, $(b_0b_1b_2b_3)$=(0000). In the same way, when a coding rate of error correction code for generating a data symbol is 49/120 and (4,12,16)32APSK ring ratio $r_1$ is 3.20 and ring ratio $r_2$ is 7.15, $(b_0b_1b_2b_3)$=(0001) . . . . When a coding rate of error correction code for generating a data symbol is 109/120 and (4,12,16)32APSK ring ratio $r_1$ is 3.00 and ring ratio $r_2$ is 5.22, $(b_0b_1b_2b_3)$=(1001).

In table 16, when a coding rate of error correction code for generating a data symbol is 41/120 and (4,12,16)32APSK ring ratio $r_1$ is 3.80 and ring ratio $r_2$ is 7.33, $(b_0b_1b_2b_3)$=(0000). In the same way, when a coding rate of error correction code for generating a data symbol is 49/120 and (4,12,16)32APSK ring ratio $r_1$ is 3.50 and ring ratio $r_2$ is 7.28, $(b_0b_1b_2b_3)$=(0001) . . . . When a coding rate of error correction code for generating a data symbol is 109/122 and (4,12,16)32APSK ring ratio $r_1$ is 3.20 and ring ratio $r_2$ is 5.33, $(b_0b_1b_2b_3)$=(1001).

In table 1 to table 16, although not described above, $b_0b_1b_2b_3$ values and (4,12,16)32APSK ring ratios (radius ratios) are associated with each of coding rates of error correction code 41/120, 49/120, 61/120, 73/120, 81/120, 89/120, 97/120, 101/120, 105/120, and 109/120.

Further, as illustrated in FIG. 59, association between $c_0c_1c_2c_3$ values and table selected is performed. When table 1 is selected, $(c_0,c_1,c_2,c_3)$=(0,0,0,0), when table 2 is selected, $(c_0,c_1,c_2,c_3)$=(0,0,0,1), . . . , and when table 16 is selected, $(c_0,c_1,c_2,c_3)$=(1,1,1,1).

As an example a case is described in which "satellite broadcasting scheme: "scheme B", coding rate: 41/120, (4,12,16)32APSK ring ratio $r_1$: 3.50 and ring ratio $r_2$: 7.21" are set.

First, as above, "scheme B" is selected so $d_0$="1" is set.

Further, as illustrated in FIG. 59, a first line of table 2 shows a coding rate 41/120, (4,12,16)32APSK ring ratio $r_1$ 3.50 and ring ratio $r_2$ 7.21, and therefore $b_0b_1b_2b_3$="0000".

Accordingly, a value $c_0c_1c_2c_3$="0001" for indicating table 2 among 16 tables, table 1 to 16.

Accordingly, when a transmission device (transmit station) transmits a data symbol so that "satellite broadcasting scheme: "scheme B", coding rate: 41/120, and (4,12,16) 32APSK ring ratio $r_1$: 3.50 and ring ratio $r_2$ 7.21", the transmission device transmits $d_0$="1", $b_0b_1b_2b_3$="0000", and $c_0c_1c_2c_3$="0001" control information (a portion of TMCC information) along with the data symbol. Note that, as control information, transmission is also required of control information indicating that a modulation scheme of the data symbol is (4,12,16)32APSK.

In other words, in <Example 1>:

A plurality of tables are prepared that associates $b_0b_1b_2b_3$ values and (12,4)16APSK ring ratios with each of coding rates of error correction code 41/120, 49/120, 61/120, 73/120, 81/120, 89/120, 97/120, 101/120, 105/120, and 109/120.

$c_0c_1c_2c_3$ indicates a used table and is transmitted by a transmission device (transmit station).

Thus, a transmission device transmits ring ratio (radius ratio) information of (4,12,16)32APSK used to generate a data symbol.

Not that a method of setting (4,12,16)32APSK ring ratios when a transmission device (transmit station) uses "scheme A" is as described prior to the description of <Example 1>.

Example 2

Example 2 is a modification of <Example 1>.

The following describes a case in which a transmission device (transmit station) selects "scheme B". Here, a transmission device (transmit station) selects "scheme B", and therefore $d_0$="1" is set, as indicated in FIG. 60.

Subsequently, the transmission device (transmit station) sets a value of $z_0$. When a (12,4)16APSK ring ratio is set by the same method as "scheme A", $z_0$=0 is set. When $z_0$=0 is set, a coding rate of error correction code is determined from $b_0$, $b_1$, $b_2$, $b_3$ in table 19 and (4,12,16)32APSK ring ratios (radius ratios) are determined from table 18. (See Table 20)

When the two (4,12,16)32APSK ring ratios (radius ratios) are set by the same method as in Example 1, $z_0$=1 is set. Thus, the two (4,12,16)32APSK ring ratios (radius ratios) are not determined based on table 18, but are determined in the way described in Example 1.

As an example a case is described in which "satellite broadcasting scheme: "scheme B", coding rate: 41/120, (4,12,16)32APSK ring ratio $r_1$: 3.50 and ring ratio $r_2$: 7.21" are set. (Note that it is assumed that (4,12,16)32APSK is selected as a modulation scheme and $z_0$=1.)

As illustrated in FIG. 60, table 1, table 2, . . . , table 16, in other words 16 tables, table 1 to table 16, are prepared.

Each table associates ($b_0b_1b_2b_3$) values as described above, coding rates of error correction code, and two (4,12,16)32APSK ring ratios (radius ratios) with each other.

For example, in table 1, when a coding rate of error correction code for generating a data symbol is 41/120 and (4,12,16)32APSK ring ratio $r_1$ is 3.09 and ring ratio $r_2$ is 6.58, ($b_0b_1b_2b_3$)=(0000). In the same way, when a coding rate of error correction code for generating a data symbol is 49/120 and (4,12,16)32APSK ring ratio $r_1$ is 2.97 and ring ratio $r_2$ is 7.17, ($b_0b_1b_2b_3$)=(0001) . . . . When a coding rate of error correction code for generating a data symbol is 109/120 and (4,12,16)32APSK ring ratio $r_1$ is 2.69 and ring ratio $r_2$ is 4.66, ($b_0b_1b_2b_3$)=(1001).

In table 2, when a coding rate of error correction code for generating a data symbol is 41/120 and (4,12,16)32APSK ring ratio $r_1$ is 3.50 and ring ratio $r_2$ is 7.21, ($b_0b_1b_2b_3$)=(0000). In the same way, when a coding rate of error correction code for generating a data symbol is 49/120 and (4,12,16)32APSK ring ratio $r_1$ is 3.20 and ring ratio $r_2$ is 7.15, ($b_0b_1b_2b_3$)=(0001) . . . . When a coding rate of error correction code for generating a data symbol is 109/120 and (4,12,16)32APSK ring ratio $r_1$ is 3.00 and ring ratio $r_2$ is 5.22, ($b_0b_1b_2b_3$)=(1001).

In table 16, when a coding rate of error correction code for generating a data symbol is 41/120 and (4,12,16)32APSK ring ratio $r_1$ is 3.80 and ring ratio $r_2$ is 7.33, ($b_0b_1b_2b_3$)=(0000). In the same way, when a coding rate of error correction code for generating a data symbol is 49/120 and (4,12,16)32APSK ring ratio $r_1$ is 3.50 and ring ratio $r_2$ is 7.28, ($b_0b_1b_2b_3$)=(0001) . . . . When a coding rate of error correction code for generating a data symbol is 109/120 and (4,12,16)32APSK ring ratio $r_1$ is 3.20 and ring ratio $r_2$ is 5.33, ($b_0b_1b_2b_3$)=(1001).

In table 1 to table 16, although not described above, $b_0b_1b_2b_3$ values and (4,12,16)32APSK ring ratios (radius ratios) are associated with each of coding rates of error correction code 41/120, 49/120, 61/120, 73/120, 81/120, 89/120, 97/120, 101/120, 105/120, and 109/120.

Further, as illustrated in FIG. 60, association between $c_0c_1c_2c_3$ values and table selected is performed. When table 1 is selected, ($c_0$,$c_1$,$c_2$,$c_3$)=(0,0,0,0), when table 2 is selected, ($c_0$,$c_1$,$c_2$,$c_3$)=(0,0,0,1), . . . , and when table 16 is selected, ($c_0$,$c_1$,$c_2$,$c_3$)=(1,1,1,1).

As an example a case is described in which "satellite broadcasting scheme: "scheme B", coding rate: 41/120, (4,12,16)32APSK ring ratio $r_1$: 3.50 and ring ratio $r_2$: 7.21" are set.

First, as above, "scheme B" is selected so $d_0$="1" is set. Further, $z_0$=1 is set.

Further, as illustrated in FIG. 60, a first line of table 2 shows a coding rate 41/120, (4,12,16)32APSK ring ratio $r_1$ 3.50 and ring ratio $r_2$ 7.21, and therefore $b_0b_1b_2b_3$="0000".

Accordingly, a value $c_0c_1c_2c_3$="0001" for indicating table 2 among 16 tables, table 1 to 16.

When a transmission device (transmit station) transmits a data symbol so that "satellite broadcasting scheme: "scheme B", coding rate: 41/120, and (4,12,16)32APSK ring ratio $r_1$: 3.50 and ring ratio $r_2$: 7.21", the transmission device transmits $d_0$="1", $z_0$=1, $b_0b_1b_2b_3$="0000", and $c_0c_1c_2c_3$="0001" control information (a portion of TMCC information) along with the data symbol. Note that, as control information, transmission is also required of control information indicating that a modulation scheme of the data symbol is (4,12,16)32APSK.

Not that a method of setting the two (4,12,16)32APSK ring ratios (radius ratios) when a transmission device (transmit station) uses "scheme A" is as described prior to the description of <Example 1>.

Example 3

Example 3 is characterized by signaling being performed by a value indicating ring ratio.

First, as in <Example 1> and <Example 2>, a transmission device (transmit station) transmits a modulated signal by "scheme B", and therefore $d_0$="1" is set.

Figure 61:
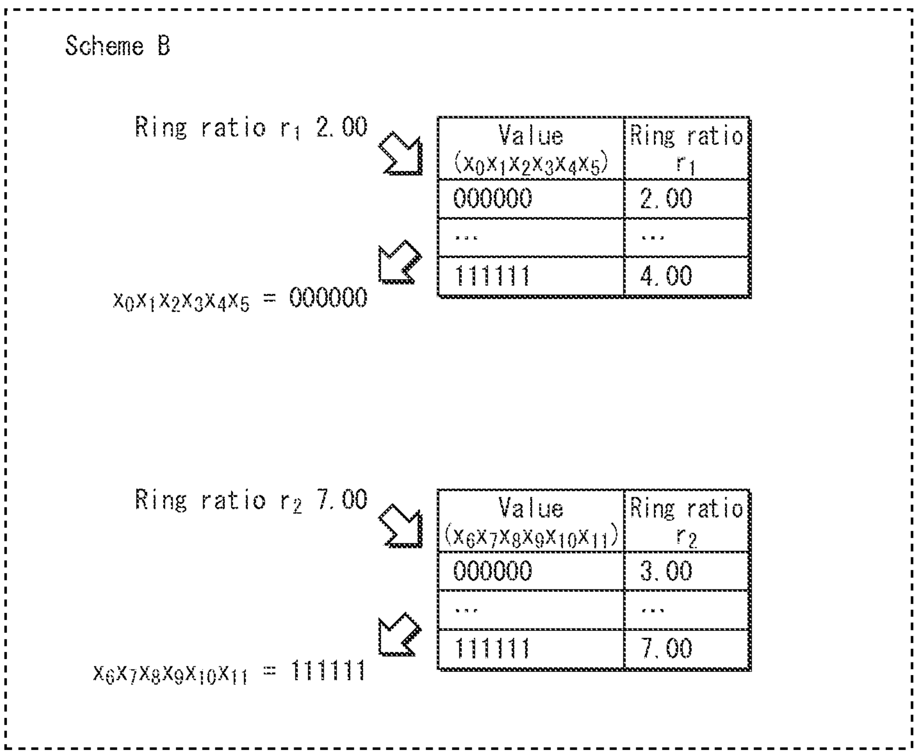
FIG. 61 illustrates an example of signaling.

Thus, as illustrated in FIG. 61, values of $x_0x_1x_2x_3x_4x_5$ and (4,12,16)32APSK ring ratio $r_1$ are associated with each other and values of $x_6x_7x_8x_9x_{10}x_{11}$ and (4,12,16)32APSK ring ratio $r_2$ are associated with each other.

For example, as illustrated in FIG. 61, when a transmission device (transmit station) is set so that when ($x_0$,$x_1$,$x_2$,$x_3$,$x_4$,$x_5$)=(0,0,0,0,0,0), (4,12,16)32APSK ring ratio $r_1$ is set to 2.00, . . . , when ($x_0$,$x_1$,$x_2$,$x_3$,$x_4$,$x_5$)=(1,1,1,1,1,1), (4,12,16)32APSK ring ratio $r_2$ is set to 4.00.

Further, when a transmission device (transmit station) is set so that when ($x_6$,$x_7$,$x_8$,$x_9$,$x_{10}$,$x_{11}$)=(0,0,0,0,0,0), (4,12,16)32APSK ring ratio $r_2$ is set to 3.00, . . . , when ($x_6$,$x_7$,$x_8$,$x_9$,$x_{10}$,$x_{11}$)=(1,1,1,1,1,1), (4,12,16)32APSK ring ratio $r_2$ is set to 7.00.

As an example a case is described in which "satellite broadcasting scheme: "scheme B" and (4,12,16)32APSK ring ratio $r_1$: 2.00 and ring ratio $r_2$: 7.00" are set.

In this example, a transmission device (transmit station) sets $x_0x_1x_2x_3x_4x_5$="000000" from "relationship between $x_0x_1x_2x_3x_4x_5$ value and (4,12,16)32APSK ring ratio $r_1$" in FIG. 61.

Further, the transmission device (transmit station) sets $x_6x_7x_8x_9x_{10}x_{11}$="111111" from "relationship between $x_6x_7x_8x_9x_{10}x_{11}$ value and (4,12,16)32APSK ring ratio $r_2$".

Accordingly, when a transmission device (transmit station) transmits a data symbol so that "satellite broadcast scheme: "scheme B", (4,12,16)32APSK ring ratio $r_1$: 2.00, and (4,12,16)32APSK ring ratio $r_2$: 7.00", the transmission device transmits $d_0$="1", $x_0x_1x_2x_3x_4x_5$="000000", and $x_6x_7x_8x_9x_{10}x_{11}$="111111" control information (a portion of TMCC information) along with the data symbol. Note that, as control information, transmission is also required of control information indicating that a modulation scheme of the data symbol is (4,12,16)32APSK.

Not that a method of setting the two (4,12,16)32APSK ring ratios (radius ratios) when a transmission device (transmit station) uses "scheme A" is as described prior to the description of <Example 1>.

Example 4

Example 4 implements signaling of desired (4,12,16) 32APSK ring ratios $r_1$ and $r_2$ by $b_0b_1b_2b_3$, indicating coding rate of error correction code and the two (4,12,16)32APSK ring ratios in a main table, $y_0y_1y_2y_3y_4y_5$, indicating ring ratio $r_1$ difference, and $y_6y_7y_8y_9y_{10}y_{11}$ indicating ring ratio $r_2$ difference.

An important point in Example 4 is that the main table illustrated in FIG. 62 is composed of the relationship between $b_0$,$b_1$,$b_2$,$b_3$, coding rate of error correction code, ring ratio $r_1$, and ring ratio $r_2$ from Table 20, in other words "scheme A".

Further characterizing points of Example 4 are described below.

FIG. 62 illustrates a difference table for ring ratio $r_1$ and a difference table for ring ratio $r_2$. Each difference table is a table for difference information from (4,12,16)32APSK ring ratios set using the main table.

Based on the main table, a (4,12,16)32APSK ring ratio $r_1$ is, for example, set as $h_1$.

Thus, the following is true.

When a transmission device (transmit station) sets ($y_0y_1y_2y_3y_4y_5$)=(011110), (4,12,16)32APSK ring ratio $r_1$ is set to $h_1$+0.4.

When a transmission device (transmit station) sets ($y_0y_1y_2y_3y_4y_5$)=(011111), (4,12,16)32APSK ring ratio $r_1$ is set to $h_1$+0.2.

When a transmission device (transmit station) sets ($y_0y_1y_2y_3y_4y_5$)=(100000), (4,12,16)32APSK ring ratio $r_1$ is set to $h_1$+0.

When a transmission device (transmit station) sets ($y_0y_1y_2y_3y_4y_5$)=(100001), (4,12,16)32APSK ring ratio $r_1$ is set to $h_1$−0.2.

When a transmission device (transmit station) sets ($y_0y_1y_2y_3y_4y_5$)=(100010), (4,12,16)32APSK ring ratio $r_1$ is set to $h_1$−0.4.

Further, based on the main table, a (4,12,16)32APSK ring ratio $r_2$ is, for example, set as $h_2$.

Thus, the following is true.

When a transmission device (transmit station) sets ($y_6y_7y_8y_9y_{10}y_{11}$)=(011110), (4,12,16)32APSK ring ratio $r_2$ is set to $h_2$+0.4.

When a transmission device (transmit station) sets ($y_6y_7y_8y_9y_{10}y_{11}$)=(011111), (4,12,16)32APSK ring ratio $r_2$ is set to $h_2$+0.2.

When a transmission device (transmit station) sets ($y_6y_7y_8y_9y_{10}y_{11}$)=(100000), (4,12,16)32APSK ring ratio $r_2$ is set to $h_2$+0.

When a transmission device (transmit station) sets ($y_6y_7y_8y_9y_{10}y_{11}$)=(100001), (4,12,16)32APSK ring ratio $r_2$ is set to $h_2$−0.2.

When a transmission device (transmit station) sets ($y_6y_7y_8y_9y_{10}y_{11}$)=(100010), (4,12,16)32APSK ring ratio $r_2$ is set to $h_2$−0.4.

Accordingly, a transmission device determines ($y_0y_1y_2y_3y_4y_5$) and thereby determines a correction value $f_1$ with respect to the value $h_1$ of the (4,12,16)32APSK ring ratio $r_1$ determined by the main table, and sets the (4,12,16) 32APSK ring ratio $r_1$ to $h_1$+$f_1$.

Further, the transmission device determines ($y_6y_7y_8y_9y_{10}y_{11}$) and thereby determines a correction value $f_2$ with respect to the value $h_2$ of the (4,12,16)32APSK ring ratio $r_2$ determined by the main table, and sets the (4,12,16) 32APSK ring ratio $r_2$ to $h_2$+$f_2$.

As an example a case is described in which "satellite broadcasting scheme: "scheme B", coding rate: 41/120, (4,12,16)32APSK ring ratio $r_1$: 3.49 and ring ratio $r_2$: 6.73" are set.

First, a transmission device selects "scheme B" and therefore sets $d_0$="1".

Subsequently, the transmission device sets $b_0b_1b_2b_3$="0000" to select coding rate 41/120 from the main table of FIG. 62.

Since the (4,12,16)32APSK ring ratio $r_1$ corresponding to $b_0b_1b_2b_3$="0000" in the main table is 3.09, the difference between the ring ratio 3.49 to be set and the ring ratio 3.09 is 3.49-3.09=+0.40.

Thus, the transmission device sets $y_0y_1y_2y_3y_4y_5$="011110", which indicates "+0.4" in the difference table.

Since the (4,12,16)32APSK ring ratio $r_2$ corresponding to $b_0b_1b_2b_3$="0000" in the main table is 6.53, the difference between the ring ratio 6.73 to be set and the ring ratio 6.53 is 6.73-6.53=+0.20.

Thus, the transmission device sets $y_6y_7y_8y_9y_{10}y_{11}$="011111", which indicates "+0.20" in the difference table.

Accordingly, when a transmission device (transmit station) transmits a data symbol so that "satellite broadcasting scheme: "scheme B", coding rate: 41/120, and (4,12,16) 32APSK ring ratio $r_1$: 3.49 and ring ratio $r_2$: 6.73", the transmission device transmits $d_0$="1", $b_0b_1b_2b_3$="0000", $y_0y_1y_2y_3y_4y_5$="011110", and $y_6y_7y_8y_9y_{10}y_{11}$="011111" control information (portion of TMCC information) along with the data symbol. Note that, as control information, transmission is also required of control information indicating that a modulation scheme of the data symbol is (4,12,16)32APSK.

Example 4 uses a portion of the main table of "scheme A" even when using "scheme B", and therefore a portion of "scheme A" is suitable for use in "scheme B".

Not that a method of setting the two (4,12,16)32APSK ring ratios (radius ratios) when a transmission device (transmit station) uses "scheme A" is as described prior to the description of <Example 1>.

In FIG. 62 a single difference table for ring ratio $r_1$ is provided but a plurality of difference tables for ring ratio $r_1$ may be provided. For example, difference table 1 to difference table 16 may be provided for ring ratio $r_1$. Thus, as in FIG. 59 and FIG. 60, a difference table to be used may be selected by $c_0c_1c_2c_3$. Accordingly, a transmission device sets $c_0c_1c_2c_3$ in addition to $d_0$, $b_0b_1b_2b_3$, and $y_0y_1y_2y_3y_4y_5$, and transmits $c_0c_1c_2c_3$ in addition to $d_0$, $b_0b_1b_2b_3$, and $y_0y_1y_2y_3y_4y_5$ as a portion of control information along with a data symbol.

Further, from a value of $y_0y_1y_2y_3y_4y_5$ in a difference table being used, the correction value $f_1$ is obtained from the value $h_1$ of the (4,12,16)32APSK ring ratio $r_1$ determined by using the main table.

Likewise, in FIG. 62, a single difference table for ring ratio $r_2$ is provided but a plurality of difference tables for ring ratio $r_2$ may be provided. For example, difference table 1 to difference table 16 may be provided for ring ratio $r_2$. Thus, as in FIG. 59 and FIG. 60, a difference table to be used may be selected by $c_4c_5c_6c_7$, which corresponds to $c_0c_1c_2c_3$. Accordingly, a transmission device sets $c_4c_5c_6c_7$ in addition to $d_0$, $b_0b_1b_2b_3$, and $y_6y_7y_8y_9y_{10}y_{11}$, and transmits $c_4c_5c_6c_7$ in addition to $d_0$, $b_0b_1b_2b_3$, and $y_6y_7y_8y_9y_{10}y_{11}$ as a portion of control information along with a data symbol.

Further, from a value of $y_6y_7y_8y_9y_{10}y_{11}$ in a difference table being used, the correction value $f_2$ is obtained from the value $h_2$ of the (4,12,16)32APSK ring ratio $r_2$ determined by using the main table.

Note that when a plurality of difference tables for ring ratio $r_1$ and a plurality of difference tables for ring ratio $r_2$ are provided, a transmission device transmits $c_0c_1c_2c_3$ and $c_4c_5c_6c_7$ in addition to $d_0$, $b_0d_1d_2d_3$, $y_0y_1y_2y_3y_4y_5$, and $y_6y_7y_8y_9y_{10}y_{11}$ as a portion of control information along with a data symbol.

Example 5

Example 5 implements signaling of desired (4,12,16)32APSK ring ratios $r_1$ and $r_2$ by using $b_0b_1b_2b_3$, indicating coding rate of error correction code and two (4,12,16)32APSK ring ratios in a main table, $y_0y_1y_2y_3y_4y_5$, indicating ring ratio $r_1$ difference, and $y_6y_7y_8y_9y_{10}y_{11}$, indicating ring ratio $r_2$ difference.

An important point in Example 5 is that the main table illustrated in FIG. 63 is composed of the relationship between $b_0$,$b_2$,$b_2$,$b_3$, coding rate of error correction code, and ring ratio from Table 20, in other words "scheme A".

Further characterizing points of Example 5 are described below.

FIG. 63 illustrates difference tables (multiplication coefficient tables). Each difference table is a table for difference information from (4,12,16)32APSK ring ratios set using the main table. Based on the main table, a (4,12,16)32APSK ring ratio $r_1$ is, for example, set as $h_1$.

Thus, the following is true.

When a transmission device (transmit station) sets $(y_0y_1y_2y_3y_4y_5)$=(011110), (4,12,16)32APSK ring ratio $r_1$ is set to $h_1$×1.2.

When a transmission device (transmit station) sets $(y_0y_1y_2y_3y_4y_5)$=(011111), (4,12,16)32APSK ring ratio $r_1$ is set to $h_1$×1.1.

When a transmission device (transmit station) sets $(y_0y_1y_2y_3y_4y_5)$=(100000), (4,12,16)32APSK ring ratio $r_1$ is set to $h_1$×1.0.

When a transmission device (transmit station) sets $(y_0y_1y_2y_3y_4y_5)$=(100001), (4,12,16)32APSK ring ratio $r_1$ is set to $h_1$×0.9.

When a transmission device (transmit station) sets $(y_0y_1y_2y_3y_4y_5)$=(100010), (4,12,16)32APSK ring ratio $r_1$ is set to $h_1$×0.8.

Based on the main table, a (4,12,16)32APSK ring ratio $r_2$ is, for example, set as $h_2$.

Thus, the following is true.

When a transmission device (transmit station) sets $(y_6y_7y_8y_9y_{10}y_{11})$=(011110), (4,12,16)32APSK ring ratio $r_2$ is set to $h_2$×1.2.

When a transmission device (transmit station) sets $(y_6y_7y_8y_9y_{10}y_{11})$=(011111), (4,12,16)32APSK ring ratio $r_2$ is set to $h_2$×1.1.

When a transmission device (transmit station) sets $(y_6y_7y_8y_9y_{10}y_{11})$=(100000), (4,12,16)32APSK ring ratio $r_2$ is set to $h_2$×1.0.

When a transmission device (transmit station) sets $(y_6y_7y_8y_9y_{10}y_{11})$=(100001), (4,12,16)32APSK ring ratio $r_2$ is set to $h_2$×0.9.

When a transmission device (transmit station) sets $(y_6y_7y_8y_9y_{10}y_{11})$=(100010), (4,12,16)32APSK ring ratio $r_2$ is set to $h_2$×0.8.

Accordingly, a transmission device determines $(y_0y_1y_2y_3y_4y_5)$ and thereby determines a correction coefficient $g_1$ with respect to the value $h_1$ of the (4,12,16)32APSK ring ratio $r_1$ determined by the main table, and sets the (4,12,16)32APSK ring ratio $r_1$ to $h_1$×$g_1$.

Further, the transmission device determines $(y_6y_7y_8y_9y_{10}y_{11})$ and thereby determines a correction coefficient $g_2$ with respect to the value $h_2$ of the (4,12,16)32APSK ring ratio $r_2$ determined by the main table, and sets the (4,12,16)32APSK ring ratio $r_2$ to $h_2$×$g_2$.

As an example a case is described in which "satellite broadcasting scheme: "scheme B", coding rate: 41/120, (4,12,16)32APSK ring ratio $r_1$: 2.78 and ring ratio $r_2$: 7.183" are set.

First, a transmission device selects "scheme B" and therefore sets $d_0$="1".

Subsequently, the transmission device sets $b_0b_1b_2b_3$="0000" to select coding rate 41/120 from the main table of FIG. 63.

Since the (4,12,16)32APSK ring ratio $r_1$ corresponding to $b_0b_1b_2b_3$="0000" in the main table is 3.09, the difference indicated by multiplication between the ring ratio to be set 2.78 and 3.09 is 2.78/3.09=0.9.

Thus, the transmission device sets $y_0y_1y_2y_3y_4y_5$="100001", which indicates "×0.9" in the difference table.

Since the (4,12,16)32APSK ring ratio $r_2$ corresponding to $b_0b_1b_2b_3$="0000" in the main table is 6.53, the difference indicated by multiplication between the ring ratio to be set 7.183 and 6.53 is 7.183/6.53=1.1.

Thus, the transmission device sets $y_6y_7y_8y_9y_{10}y_{11}$="011111", which indicates "×1.1" in the difference table.

When a transmission device (transmit station) transmits a data symbol so that "satellite broadcasting scheme: "scheme B", coding rate: 41/120, and (4,12,16)32APSK ring ratio $r_1$: 2.78 and ring ratio $r_2$: 7.183", the transmission device transmits $d_0$="1", $b_0b_1b_2b_3$="0000", $y_0y_1y_2y_3y_4y_5$="100001", and $y_6y_7y_8y_9y_{10}y_{11}$="011111" control information (portion of TMCC information) along with the data symbol. Note that, as control information, transmission is also required of control information indicating that a modulation scheme of the data symbol is (4,12,16)32APSK.

Example 5 uses a portion of the main table of "scheme A" even when using "scheme B", and therefore a portion of "scheme A" is suitable for use in "scheme B".

Not that a method of setting the two (4,12,16)32APSK ring ratios (radius ratios) when a transmission device (transmit station) uses "scheme A" is as described prior to the description of <Example 1>.

In FIG. 63 a single difference table for ring ratio $r_1$ is provided but a plurality of difference tables for ring ratio $r_1$ may be provided. For example, difference table 1 to difference table 16 may be provided for ring ratio $r_1$. Thus, as in FIG. 59 and FIG. 60, a difference table to be used may be selected by $c_0c_1c_2c_3$. Accordingly, a transmission device sets $c_0c_1c_2c_3$ in addition to $d_0$, $b_0b_1b_2b_3$, and $y_0y_1y_2y_3y_4y_5$, and transmits $c_0c_1c_2c_3$ in addition to $d_0$, $b_0b_1b_2b_3$, and $y_0y_1y_2y_3y_4y_5$ as a portion of control information along with a data symbol.

Further, from a value of $y_0y_1y_2y_3y_4y_5$ in a difference table being used, the correction value $g_1$ is obtained from the value $h_1$ of the (4,12,16)32APSK ring ratio $r_1$ determined by using the main table.

Likewise, in FIG. 63, a single difference table for ring ratio $r_2$ is provided but a plurality of difference tables for ring ratio $r_2$ may be provided. For example, difference table 1 to difference table 16 may be provided for ring ratio $r_2$. Thus, as in FIG. 59 and FIG. 60, a difference table to be used may be selected by $c_4c_5c_6c_7$, which corresponds to $c_0c_1c_2c_3$. Accordingly, a transmission device sets $c_4c_5c_6c_7$ in addition to $d_0$, $b_0b_1b_2b_3$, and $y_6y_7y_8y_9y_{10}y_{11}$, and transmits $c_4c_5c_6c_7$ in addition to $d_0$, $b_0b_1b_2b_3$, and $y_6y_7y_8y_9y_{10}y_{11}$ as a portion of control information along with a data symbol.

Further, from a value of $y_6y_7y_8y_9y_{10}y_{11}$ in a difference table being used, the correction value $g_2$ is obtained from the value $h_2$ of the (4,12,16)32APSK ring ratio $r_2$ determined by using the main table.

Note that when a plurality of difference tables for ring ratio $r_1$ and a plurality of difference tables for ring ratio $r_2$ are provided, a transmission device transmits $c_0c_1c_2c_3$ and $c_4c_5c_6c_7$ in addition to $d_0$, $b_0d_1d_2d_3$, $y_0y_1y_2y_3y_4y_5$, and $y_6y_7y_8y_9y_{10}y_{11}$ as a portion of control information along with a data symbol.

<Reception Device>

The following describes configuration common to <Example 1> to <Example 5> of a reception device corresponding to a transmission method of the present embodiment and subsequently describes specific processing for each example.

The terrestrial reception device (terminal) A200 of FIG. 40 receives, via the antenna A201, a radio signal transmitted by the transmit station of FIG. 39 and relayed by a satellite (repeater station). The RF receiver A202 performs processing such as frequency conversion and quadrature demodulation on a received radio signal, and outputs a baseband signal.

The demodulator A204 performs processing such as root roll-off filter processing, and outputs a post-filter baseband signal.

The synchronization and channel estimator A214 receives a post-filter baseband signal as input, performs time synchronization, frequency synchronization, and channel estimation, using, for example, a "synchronization symbol group" and "pilot symbol group" transmitted by the transmission device, and outputs an estimated signal.

The control information estimator A216 receives a post-filter baseband signal as input, extracts symbols including control information such as a "TMCC information symbol group", performs demodulation and decoding, and outputs a control signal.

Of importance to the present embodiment is that control information included in "TMCC information symbol group" is estimated by the control information estimator A216 and outputted as a control signal, and that $d_0$, $z_0$, $c_0c_1c_2c_3$, $b_0b_1b_2b_3$, $x_0x_1x_2x_3x_4x_5$, $y_0y_1y_2y_3y_4y_5$, $c_4c_5c_6c_7$, $x_6x_7x_8x_9x_{10}x_{11}$, and $y_6y_7y_8y_9y_{10}y_{11}$ information, described above, is included in the control signal.

The de-mapper A206 receives a post-filter baseband signal, control signal, and estimated signal as input, determines, based on the control signal, a modulation scheme (or transmission method) and ring ratio used by "slots composed by a data symbol group", calculates, based on this determination, a log-likelihood ratio (LLR) for each bit included in a data symbol from the post-filter baseband signal and the estimated signal, and outputs the LLRs. (However, instead of a soft decision value such as an LLR a hard decision value may be outputted, and a soft decision value may be outputted instead of an LLR.)

The de-interleaver A208 receives log-likelihood ratios and a control signal as input, accumulates input, performs de-interleaving (permutes data) corresponding to interleaving used by the transmission device, and outputs post-de-interleaving log-likelihood ratios.

The error correction decoder A212 receives post-de-interleaving log-likelihood ratios and a control signal as input, determines error correction code used (code length, coding rate, etc.), performs error correction decoding based on this determination, and obtains estimated information bits. When the error correction code being used is an LDPC code, belief propagation (BP) decoding methods such as sum-product decoding, shuffled belief propagation (BP) decoding, and layered BP decoding may be used as a decoding method. The above describes operation when iterative detection is not performed, but the reception device may perform iterative detection as described for the reception device of FIG. 2.

Such a reception device stores tables that are the same as the tables indicates in <Example 1> to <Example 5>, described above, and, by performing operations in reverse of that described in <Example 1> to <Example 5>, estimates a satellite broadcasting scheme, coding rate of error correction code, and (12,4)16APSK ring ratio, and performs demodulation and decoding. The following describes each example separately.

In the following, the control information estimator A216 of a reception device is assumed to determine that a modulation scheme of a data symbol is (12,4)16APSK from TMCC information.

<<Reception Device Corresponding to Example 1>>

When a transmission device (transmit station) transmits a modulated signal by "scheme A":

When the control information estimator A216 of a reception device obtains $d_0$="0", the control information estimator A216 determines that a data symbol is a symbol transmitted by "scheme A". By obtaining a value of $b_0b_1b_2b_3$, when the data symbol is a (4,12,16)32APSK symbol, the control information estimator A216 estimates the two (4,12,16)32APSK ring ratios (radius ratios) ($r_1$, $r_2$). The de-mapper A206 performs demodulation of the data symbol based on the above estimated information.

When a transmission device (transmit station) transmits a modulated signal by "scheme B":

As illustrated in FIG. 64, the control information estimator A216 of the reception device estimates "scheme B" from $d_0$="1", and a coding rate of error correction code 41/120 and (4,12,16)32APSK ring ratio $r_1$ 3.50 and ring ratio $r_2$ 7.21 from line 1 of table 2 based on $c_0c_1c_2c_3$="0001" and $b_0b_1b_2b_3$="0000". The de-mapper A206 performs demodulation of the data symbol based on the above estimated information.

<<Reception Device Corresponding to Example 2>>

When a transmission device (transmit station) transmits a modulated signal by "scheme A":

When the control information estimator A216 of a reception device obtains $d_0$="0", the control information estimator A216 determines that a data symbol is a symbol transmitted by "scheme A". By obtaining a value of $b_0b_1b_2b_3$, when the data symbol is a (4,12,16)32APSK symbol, the control information estimator A216 estimates the two (4,12,16)32APSK ring ratios (radius ratios) ($r_1$, $r_2$). The de-mapper A206 performs demodulation of the data symbol based on the above estimated information.

When a transmission device (transmit station) transmits a modulated signal by "scheme B":

As illustrated in FIG. 65, the control information estimator A216 of the reception device determines "set to same ring ratio as scheme A" when obtaining $d_0$="1" and $z_0$="0", and estimates a coding rate of error correction code and the two (4,12,16)32APSK ring ratios (radius ratios) ($r_1$, $r_2$) from Table 20 when obtaining $b_0b_1b_2b_3$. The de-mapper A206 performs demodulation of the data symbol based on the above estimated information.

Further, as illustrated in FIG. 65, the control information estimator A216 of the reception device determines "scheme B" from $d_0$="1" and $z_0$="1", and estimates a coding rate of error correction code 41/120 and (4,12,16)32APSK ring ratio $r_1$ 3.50 and ring ratio $r_2$ 7.21 from line 1 of table 2 based on $c_0c_1c_2c_3$="0001" and $b_0b_1b_2b_3$="0000". The de-mapper A206 performs demodulation of the data symbol based on the above estimated information.

<<Reception Device Corresponding to Example 3>>

When a transmission device (transmit station) transmits a modulated signal by "scheme A":

When the control information estimator A216 of a reception device obtains $d_0$="0", the control information estimator A216 determines that a data symbol is a symbol transmitted by "scheme A". By obtaining a value of $b_0b_1b_2b_3$, when the data symbol is a (4,12,16)32APSK symbol, the control information estimator A216 estimates the two (4,12,16)32APSK ring ratios (radius ratios) ($r_1$, $r_2$). The de-mapper A206 performs demodulation of the data symbol based on the above estimated information.

When a transmission device (transmit station) transmits a modulated signal by "scheme B":

As illustrated in FIG. 66, the control information estimator A216 of the reception device estimates "scheme B" from $d_0$="1", (4,12,16)32APSK ring ratio $r_1$ 2.00 from $x_0x_1x_2x_3x_4x_5$="000000", and (4,12,16)32APSK ring ratio $r_2$ 7.00 from $x_6x_7x_8x_9x_{10}x_{11}$="111111". The de-mapper A206 performs demodulation of the data symbol based on the above estimated information.

<<Reception Device Corresponding to Example 4>>

When a transmission device (transmit station) transmits a modulated signal by "scheme A":

When the control information estimator A216 of a reception device obtains $d_0$="0", the control information estimator A216 determines that a data symbol is a symbol transmitted by "scheme A". By obtaining a value of $b_0b_1b_2b_3$, when the data symbol is a (4,12,16)32APSK symbol, the control information estimator A216 estimates the two (4,12,16)32APSK ring ratios (radius ratios) ($r_1$, $r_2$). The de-mapper A206 performs demodulation of the data symbol based on the above estimated information.

Figure 67:
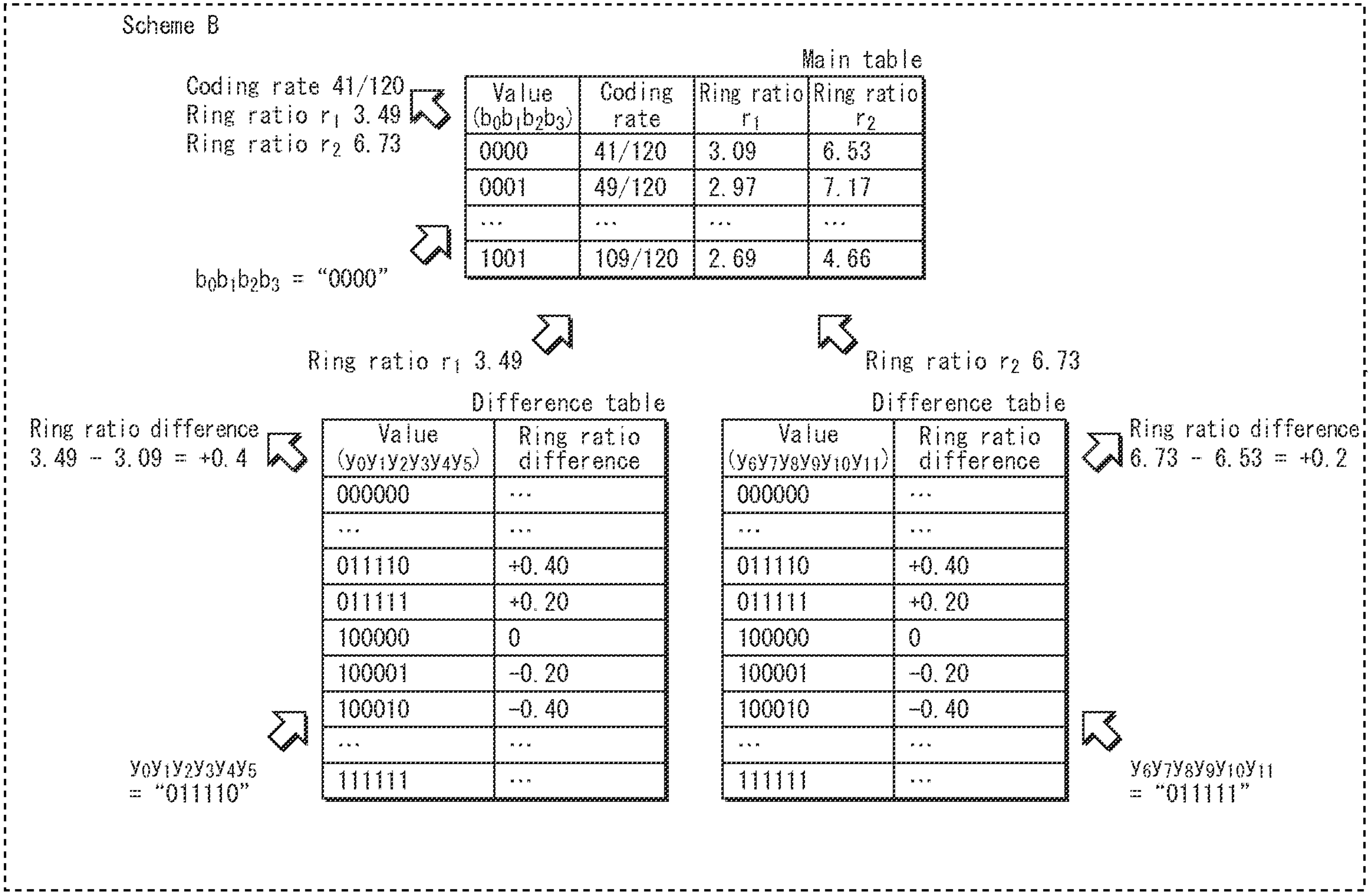
FIG. 67 illustrates an example of signaling.

When a transmission device (transmit station) transmits a modulated signal by "scheme B":

As illustrated in FIG. 67, the control information estimator A216 of the reception device determines that a data symbol is a symbol of "scheme B" from $d_0$="1". Further, the control information estimator A216 of the reception device estimates a difference of +0.4 from $y_0y_1y_2y_3y_4y_5$="011110". Further, based on $b_0b_1b_2b_3$="0000", the control information estimator A216 estimates the (4,12,16)32APSK ring ratio $r_1$ 3.09 prior to taking into account difference, and estimates a coding rate of error correction code 41/120. By summing both so that 3.09+0.4=3.49, the control information estimator A216 estimates the (4,12,16)32APSK ring ratio $r_1$ 3.49. Further, the control information estimator A216 of the reception device estimates a difference of +0.2 from $y_6y_7y_8y_9y_{10}y_{11}$="011111". Further, based on $b_0b_1b_2b_3$="0000", the control information estimator A216 estimates the (4,12,16)32APSK ring ratio $r_2$ 6.53 prior to taking into account difference, and estimates a coding rate of error correction code 41/120. By summing both so that 6.53+0.2=6.73, the control information estimator A216 estimates the (4,12,16)32APSK ring ratio $r_2$ 6.73. The de-mapper A206 performs demodulation of the data symbol based on the above estimated information.

<<Reception Device Corresponding to Example 5>>

When a transmission device (transmit station) transmits a modulated signal by "scheme A":

When the control information estimator A216 of a reception device obtains $d_0$="0", the control information estimator A216 determines that a data symbol is a symbol transmitted by "scheme A". By obtaining a value of $b_0b_1b_2b_3$, when the data symbol is a (4,12,16)32APSK symbol, the control information estimator A216 estimates the two (4,12,16)32APSK ring ratios (radius ratios) ($r_1$, $r_2$). The de-mapper A206 performs demodulation of the data symbol based on the above estimated information.

When a transmission device (transmit station) transmits a modulated signal by "scheme B":

As illustrated in FIG. 68, the control information estimator A216 of the reception device determines that a data symbol is a symbol of "scheme B" from $d_0$="1". Further, the control information estimator A216 of the reception device estimates a difference of ×0.9 from $y_0y_1y_2y_3y_4y_5$="100001". Further, based on $b_0b_1b_2b_3$="0000", the control information estimator A216 estimates the (4,12,16)32APSK ring ratio $r_1$ 3.09 prior to taking into account difference, and estimates a coding rate of error correction code 41/120. By multiplying both so that 3.09×0.9=2.78, the control information estimator A216 estimates the (4,12,16)32APSK ring ratio $r_1$ to be 2.78. Further, the control information estimator A216 of the reception device estimates a difference of ×1.1 from $y_6y_7y_8y_9y_{10}y_{11}$="011111". Further, based on $b_0b_1b_2b_3$="0000", the control information estimator A216 estimates the (4,12,16)32APSK ring ratio $r_2$ 6.53 prior to taking into account difference, and estimates a coding rate of error correction code 41/120. By multiplying both so that 6.53×1.1=7.183, the control information estimator A216 estimates the (4,12,16)32APSK ring ratio $r_2$ to be 7.183. The de-mapper A206 performs demodulation of the data symbol based on the above estimated information.

Embodiment G

In the present embodiment, a method of transmitting pilot symbols based on embodiment F is described.

Note that ring ratios (for example, (4,12,16)32APSK ring ratios) have been defined prior to the present embodiment, and ring ratios may also be referred to as "radius ratios".

<Example of Pilot Symbols>

In the present embodiment, an example of pilot symbol configuration is described in the transmission scheme described in embodiment F (the modulation scheme of data symbols is (4,12,16)32APSK).

Note that the transmission device in the present embodiment is identical to the transmission device described in embodiment 1 and therefore description thereof is omitted here.

Interference occurs between code (between symbols) of a modulated signal, because of non-linearity of the power amplifier of the transmission device. High data reception quality can be achieved by a reception device by decreasing this intersymbol interference.

In the present example of pilot symbol configuration, in order to reduce intersymbol interference at a reception device, a transmission device transmits pilot symbols by using a modulation scheme and ring ratio used in a data symbol.

Accordingly, when a transmission device (transmit station) determines a modulation scheme and ring ratios of a data symbol by any of the methods of <Example 1> to <Example 5> of embodiment F, the transmission device generates and transmits pilot symbols by using the same modulation scheme and ring ratios as the data symbol.

The following illustrates specific examples. However, description continues assuming that (4,12,16)32APSK is selected as a modulation scheme.

In the Case of <Example 1> of Embodiment F:

When a transmission device (transmit station) transmits a data symbol so that "satellite broadcasting scheme: "scheme B", coding rate: 41/120, and (4,12,16)32APSK ring ratio $r_1$: 3.50 and ring ratio $r_2$: 7.21", $d_0$="1", $b_0b_1b_2b_3$="0000", and $c_0c_1c_2c_3$="0001". Thus, based on "$d_0$="1", $b_0b_1b_2b_3$="0000", and $c_0c_1c_2c_3$="0001"", the transmission device sets a modulation scheme and ring ratios of pilot symbols to (4,12,16)32APSK and ring ratio $r_1$ to 3.50 and ring ratio $r_2$ to 7.21.

Accordingly, the transmission device (transmit station) transmits the following, in order, as pilot symbols:

a symbol of a constellation point (baseband signal) corresponding to $[b_4b_3b_2b_1b_0]$=[00000] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00001] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00010] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00011] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00100] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00101] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00110] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00111] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01000] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01001] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01010] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01011] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01100] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01101] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01110] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01111] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10000] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10001] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10010] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10011] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10100] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10101] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10110] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10111] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11000] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11001] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11010] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11011] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11100] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11101] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11110] of (4,12,16)32APSK ring ratio $r_1$ 3.50 and ring ratio $r_2$ 7.21; and a symbol of a constellation point (baseband signal) corresponding to $[b_4b_3b_2b_1b_0]$=[11111] of (4,12,16)32APSK ring ratio $r_1$ 3.50 and ring ratio $r_2$ 7.21.

Thus, a reception device can estimate intersymbol interference with high precision, and can therefore achieve high data reception quality.

Pilot symbols need not be symbols only for estimating intersymbol interference, and a reception device may estimate a radio wave propagation environment between a transmission device and the reception device (channel estimation), and may estimate frequency offset and perform time synchronization using the pilot symbols.

When a transmission device sets separate values for data symbol ring ratios, pilot symbols are changed to the same ring ratios as data symbols (a ring ratio $r_1$ value $L_1$ and a ring ratio $r_2$ value $L_2$) and the transmission device (transmit station) transmits the following, in order, as pilot symbols:

a symbol of a constellation point (baseband signal) corresponding to $[b_4b_3b_2b_1b_0]$=[00000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11110] of (4,12,16)32APSK ring ratio $r_1$ value $L_1$ and ring ratio $r_2$ value $L_2$; and a symbol of a constellation point (baseband signal) corresponding to $[b_4b_3b_2b_1b_0]$=[11111] of (4,12,16)32APSK ring ratio $r_1$ value $L_1$ and ring ratio $r_2$ value $L_2$.

In the Case of <Example 2> of Embodiment F:

When a transmission device (transmit station) transmits a data symbol so that "satellite broadcasting scheme: "scheme B", coding rate: 41/120, and (4,12,16)32APSK ring ratio $r_1$: 3.50 and ring ratio $r_2$: 7.21", the transmission device transmits $d_0$="1", $z_0$=1, $b_0b_1b_2b_3$="0000", and $c_0c_1c_2c_3$="0001" control information (a portion of TMCC information) along with the data symbol. Thus, based on "$d_0$="1", $z_0$=1, $b_0b_1b_2b_3$="0000", and $c_0c_1c_2c_3$="0001"", the transmission device sets a modulation scheme and ring ratios of pilot symbols to (4,12,16)32APSK and ring ratio $r_1$ to 3.50 and ring ratio $r_2$ to 7.21.

Accordingly, the transmission device (transmit station) transmits the following, in order, as pilot symbols:

a symbol of a constellation point (baseband signal) corresponding to $[b_4b_3b_2b_1b_0]$=[00000] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00001] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00010] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00011] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00100] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00101] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00110] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[00111] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01000] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01001] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01010] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01011] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01100] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01101] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01110] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[01111] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10000] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10001] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10010] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10011] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10100] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10101] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10110] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[10111] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11000] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11001] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11010] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11011] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11100] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11101] of (4,12,16)32APSK ring ratio $r_1$ 3.50 and ring ratio $r_2$ 7.21;

a symbol of a constellation point (baseband signal) corresponding to $[b_4b_3b_2b_1b_0]$=[11110] of (4,12,16)32APSK ring ratio $r_1$ 3.50 and ring ratio $r_2$ 7.21; and a symbol of a constellation point (baseband signal) corresponding to $[b_4b_3b_2b_1b_0]$=[11111] of (4,12,16)32APSK ring ratio $r_1$ 3.50 and ring ratio $r_2$ 7.21.

Thus, a reception device can estimate intersymbol interference with high precision, and can therefore achieve high data reception quality.

Pilot symbols need not be symbols only for estimating intersymbol interference, and a reception device may estimate a radio wave propagation environment between a transmission device and the reception device (channel estimation), and may estimate frequency offset and perform time synchronization using the pilot symbols.

When a transmission device sets separate values for data symbol ring ratios, pilot symbols are changed to the same ring ratios as data symbols (a ring ratio $r_1$ value $L_1$ and a ring ratio $r_2$ value $L_2$) and the transmission device (transmit station) transmits the following, in order, as pilot symbols:

a symbol of a constellation point (baseband signal) corresponding to $[b_4b_3b_2b_1b_0]$=[00000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11110] of (4,12,16)32APSK ring ratio $r_1$ value $L_1$ and ring ratio $r_2$ value $L_2$; and a symbol of a constellation point (baseband signal) corresponding to $[b_4b_3b_2b_1b_0]$=[11111] of (4,12,16)32APSK ring ratio $r_1$ value $L_1$ and ring ratio $r_2$ value $L_2$.

In the Case of <Example 3> of Embodiment F:

Accordingly, when a transmission device (transmit station) transmits a data symbol so that "satellite broadcast scheme: "scheme B", (4,12,16)32APSK ring ratio $r_1$: 2.00, and (4,12,16)32APSK ring ratio $r_2$: 7.00", the transmission device transmits $d_0$="1", $x_0x_1x_2x_3x_4x_5$="000000", and $x_6x_7x_8x_9x_{10}x_{11}$="111111" control information (a portion of TMCC information) along with the data symbol. Thus, based on "$d_0$="1", $x_0x_1x_2x_3x_4x_5$="000000", and $x_6x_7x_8x_9x_{10}x_{11}$="111111"", the transmission device sets a modulation scheme and ring ratios of pilot symbols to (4,12,16)32APSK and ring ration to 2.00 and ring ratio $r_2$ to 7.00.

Accordingly, the transmission device (transmit station) transmits the following, in order, as pilot symbols:

a symbol of a constellation point (baseband signal) corresponding to $[b_4b_3b_2b_1b_0]$=[00000] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[00001] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[00010] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[00011] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[00100] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[00101] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[00110] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[00111] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[01000] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[01001] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[01010] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[01011] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[01100] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[01101] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[01110] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[01111] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[10000] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[10001] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[10010] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[10011] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[10100] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[10101] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[10110] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[10111] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[11000] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[11001] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[11010] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[11011] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[11100] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[11101] of (4,12,16)32APSK ring ratio $r_1$ 2.00 and ring ratio $r_2$ 7.00;

a symbol of a constellation point (baseband signal) corresponding to $[b_4b_3b_2b_1b_0]$=[11110] of (4,12,16)32APSK ring ratio $r_1$ 2.00 and ring ratio $r_2$ 7.00; and a symbol of a constellation point (baseband signal) corresponding to $[b_4b_3b_2b_1b_0]$=[11111] of (4,12,16)32APSK ring ratio $r_1$ 2.00 and ring ratio $r_2$ 7.00.

Thus, a reception device can estimate intersymbol interference with high precision, and can therefore achieve high data reception quality.

Pilot symbols need not be symbols only for estimating intersymbol interference, and a reception device may estimate a radio wave propagation environment between a transmission device and the reception device (channel estimation), and may estimate frequency offset and perform time synchronization using the pilot symbols.

When a transmission device sets separate values for data symbol ring ratios, pilot symbols are changed to the same ring ratios as data symbols (a ring ratio $r_1$ value $L_1$ and a ring ratio $r_2$ value $L_2$) and the transmission device (transmit station) transmits the following, in order, as pilot symbols:

a symbol of a constellation point (baseband signal) corresponding to $[b_4b_3b_2b_1b_0]$=[00000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11110] of (4,12,16)32APSK ring ratio $r_1$ value $L_1$ and ring ratio $r_2$ value $L_2$; and a symbol of a constellation point (baseband signal) corresponding to $[b_4b_3b_2b_1b_0]$=[11111] of (4,12,16)32APSK ring ratio $r_1$ value $L_1$ and ring ratio $r_2$ value $L_2$.

In the Case of <Example 4> of Embodiment F:

When a transmission device (transmit station) transmits a data symbol so that "satellite broadcasting scheme: "scheme B", coding rate: 41/120, and (4,12,16)32APSK ring ratio $r_1$: 3.49 and ring ratio $r_2$: 6.73", the transmission device transmits $d_0$="1", $b_0b_1b_2b_3$="0000", $y_0y_1y_2y_3y_4y_5$="011110", and $y_6y_7y_8y_9y_{10}y_{11}$="011111" control information (portion of TMCC information) along with the data symbol. Thus, based on "$d_0$="1", $b_0b_1b_2b_3$="0000", $y_0y_1y_2y_3y_4y_5$="011110", and $y_6y_7y_8y_9y_{10}y_{11}$="011111"", the transmission device sets a modulation scheme and ring ratios of pilot symbols to (4,12,16)32APSK and ring ratio $r_1$ to 3.49 and ring ratio $r_2$ to 6.73.

Accordingly, the transmission device (transmit station) transmits the following, in order, as pilot symbols:

a symbol of a constellation point (baseband signal) corresponding to $[b_4b_3b_2b_1b_0]$=[00000] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[00001] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[00010] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[00011] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[00100] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[00101] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[00110] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[00111] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[01000] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[01001] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[01010] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[01011] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[01100] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[01101] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[01110] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[01111] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[10000] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[10001] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[10010] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[10011] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[10100] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[10101] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[10110] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[10111] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[11000] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[11001] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[11010] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[11011] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[11100] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[11101] of (4,12,16)32APSK ring ratio $r_1$ 3.49 and ring ratio $r_2$ 6.73;

a symbol of a constellation point (baseband signal) corresponding to $[b_4b_3b_2b_1b_0]$=[11110] of (4,12,16)32APSK ring ratio $r_1$ 3.49 and ring ratio $r_2$ 6.73; and a symbol of a constellation point (baseband signal) corresponding to $[b_4b_3b_2b_1b_0]$=[11111] of (4,12,16)32APSK ring ratio $r_1$ 3.49 and ring ratio $r_2$ 6.73.

Thus, a reception device can estimate intersymbol interference with high precision, and can therefore achieve high data reception quality.

Pilot symbols need not be symbols only for estimating intersymbol interference, and a reception device may estimate a radio wave propagation environment between a transmission device and the reception device (channel estimation), and may estimate frequency offset and perform time synchronization using the pilot symbols.

When a transmission device sets separate values for data symbol ring ratios, pilot symbols are changed to the same ring ratios as data symbols (a ring ratio $r_1$ value $L_1$ and a ring ratio $r_2$ value $L_2$) and the transmission device (transmit station) transmits the following, in order, as pilot symbols:

a symbol of a constellation point (baseband signal) corresponding to $[b_4b_3b_2b_1b_0]$=[00000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11110] of (4,12,16)32APSK ring ratio $r_1$ value $L_1$ and ring ratio $r_2$ value $L_2$; and a symbol of a constellation point (baseband signal) corresponding to $[b_4b_3b_2b_1b_0]$=[11111] of (4,12,16)32APSK ring ratio $r_1$ value $L_1$ and ring ratio $r_2$ value $L_2$.

In the Case of <Example 5> of Embodiment C:

When a transmission device (transmit station) transmits a data symbol so that "satellite broadcasting scheme: "scheme B", coding rate: 41/120, and (4,12,16)32APSK ring ratio $r_1$: 2.78 and ring ratio $r_2$: 7.183", the transmission device transmits $d_0$="1", $b_0b_1b_2b_3$="0000", $y_0y_1y_2y_3y_4y_5$="100001", and $y_6y_7y_8y_9y_{10}y_{11}$="011111" control information (portion of TMCC information) along with the data symbol. Thus, based on "$d_0$="1", $b_0b_1b_2b_3$="0000", $y_0y_1y_2y_3y_4y_5$="100001", and $y_6y_7y_8y_9y_{10}y_{11}$="011111"", the transmission device sets a modulation scheme and ring ratios of pilot symbols to (4,12,16)32APSK and ring ratio $r_1$ to 2.78 and ring ratio $r_2$ to 7.183.

Accordingly, the transmission device (transmit station) transmits the following, in order, as pilot symbols:

a symbol of a constellation point (baseband signal) corresponding to $[b_4b_3b_2b_1b_0]$=[00000] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[00001] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[00010] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[00011] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[00100] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[00101] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[00110] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[00111] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[01000] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[01001] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[01010] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[01011] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[01100] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[01101] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[01110] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[01111] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[10000] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[10001] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[10010] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[10011] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[10100] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[10101] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[10110] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[10111] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[11000] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[11001] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[11010] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[11011] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[11100] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[11101] of (4,12,16)32APSK ring ratio $r_1$ 2.78 and ring ratio $r_2$ 7.183;

a symbol of a constellation point (baseband signal) corresponding to $[b_4b_3b_2b_1b_0]$=[11110] of (4,12,16)32APSK ring ratio $r_1$ 2.78 and ring ratio $r_2$ 7.183; and a symbol of a constellation point (baseband signal) corresponding to $[b_4b_3b_2b_1b_0]$=[11111] of (4,12,16)32APSK ring ratio $r_1$ 2.78 and ring ratio $r_2$ 7.183.

Thus, a reception device can estimate intersymbol interference with high precision, and can therefore achieve high data reception quality.

Pilot symbols need not be symbols only for estimating intersymbol interference, and a reception device may estimate a radio wave propagation environment between a transmission device and the reception device (channel estimation), and may estimate frequency offset and perform time synchronization using the pilot symbols.

When a transmission device sets separate values for data symbol ring ratios, pilot symbols are changed to the same ring ratios as data symbols (a ring ratio $r_1$ value $L_1$ and a ring ratio $r_2$ value $L_2$) and the transmission device (transmit station) transmits the following, in order, as pilot symbols:

a symbol of a constellation point (baseband signal) corresponding to $[b_4b_3b_2b_1b_0]$=[00000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11110] of (4,12,16)32APSK ring ratio $r_1$ value $L_1$ and ring ratio $r_2$ value $L_2$; and a symbol of a constellation point (baseband signal) corresponding to $[b_4b_3b_2b_1b_0]$=[11111] of (4,12,16)32APSK ring ratio $r_1$ value $L_1$ and ring ratio $r_2$ value $L_2$.

Operation of a reception device is described with reference to FIG. 2.

In FIG. 2, 210 indicates a configuration of a reception device. The de-mapper 214 of FIG. 2 performs de-mapping with respect to mapping of a modulation scheme used by the transmission device, for example obtaining and outputting a log-likelihood ratio for each bit. At this time, although not illustrated in FIG. 2, estimation of intersymbol interference, estimation of a radio wave propagation environment (channel estimation) between the transmission device and the reception device, time synchronization with the transmission device, and frequency offset estimation may be performed in order to precisely perform de-mapping.

Although not illustrated in FIG. 2, the reception device includes an intersymbol interference estimator, a channel estimator, a time synchronizer, and a frequency offset estimator. These estimators extract from receive signals a portion of pilot symbols, for example, and respectively perform intersymbol interference estimation, estimation of a radio wave propagation environment (channel estimation) between the transmission device and the reception device, time synchronization between the transmission device and the reception device, and frequency offset estimation between the transmission device and the reception device. Subsequently, the de-mapper 214 of FIG. 2 inputs these estimation signals and, by performing de-mapping based on these estimation signals, performs, for example, calculation of log-likelihood ratios.

Modulation scheme and ring ratio information used in generating a data symbol is, as described in embodiment F, transmitted by using control information such as TMCC control information. Thus, because a modulation scheme and ring ratio used in generating pilot symbols is the same as the modulation scheme and ring ratio used in generating data symbols, a reception device estimates, by a control information estimator, the modulation scheme and ring ratio from control information, and, by inputting this information to the de-mapper 214, estimation of distortion of propagation path, etc., is performed from the pilot symbols and de-mapping of the data symbol is performed.

Further, a transmission method of pilot symbols is not limited to the above. For example, a transmission device (transmit station) may transmit, as pilot symbols:

a symbol of a constellation point (baseband signal) corresponding to $[b_4b_3b_2b_1b_0]$=[00000] of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]$=[00001] of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]$=[00010] of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]$=[00011] of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]$=[00100] of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]$=[00101] of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[00110]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[00111]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[01000]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[01001]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[01010]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[01011]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[01100]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[01101]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[01110]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[01111]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[10000]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[10001]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[10010]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[10011]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[10100]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[10101]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[10110]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[10111]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[11000]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[11001]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[11010]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[11011]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[11100]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[11101]$ of (4,12,16)32APSK ring ratio $r_1$ value $L_1$ and ring ratio $r_2$ value $L_2$, a plurality of times;

a symbol of a constellation point (baseband signal) corresponding to $[b_4b_3b_2b_1b_0]=[11110]$ of (4,12,16)32APSK ring ratio $r_1$ value $L_1$ and ring ratio $r_2$ value $L_2$, a plurality of times; and a symbol of a constellation point (baseband signal) corresponding to $[b_4b_3b_2b_1b_0]=[11111]$ of (4,12,16)32APSK ring ratio $r_1$ value $L_1$ and ring ratio $r_2$ value $L_2$, a plurality of times.

When the following symbols are each transmitted an equal number of times, there is an advantage that a reception device can perform precise estimation of distortion of a propagation path:

a symbol of a constellation point (baseband signal) corresponding to $[b_4b_3b_2b_1b_0]=[00000]$ of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]=[00001]$ of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]=[00010]$ of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]=[00011]$ of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]=[00100]$ of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]=[00101]$ of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]=[00110]$ of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[00111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[01111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10110] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[10111] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11000] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11001] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11010] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11011] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11100] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11101] of (4,12,16)32APSK ring ratio $r_1$ value $L_1$ and ring ratio $r_2$ value $L_2$;

a symbol of a constellation point (baseband signal) corresponding to $[b_4b_3b_2b_1b_0]$=[11110] of (4,12,16)32APSK ring ratio $r_1$ value $L_1$ and ring ratio $r_2$ value $L_2$; and a symbol of a constellation point (baseband signal) corresponding to $[b_4b_3b_2b_1b_0]$=[11111] of (4,12,16)32APSK ring ratio $r_1$ value $L_1$ and ring ratio $r_2$ value $L_2$.

The above description is based on the frame configuration illustrated in FIG. 18, but frame configurations applicable to the present disclosure are not limited to the above description. When a plurality of data symbols exist, a symbol for transmitting information related to a modulation scheme used in generating the plurality of data symbols, and a symbol for transmitting information related to an error correction scheme (for example, error correction code used, code length of error correction code, coding rate of error correction code, etc.) exist, any arrangement in a frame may be used with respect to the plurality of data symbols, the symbol for transmitting information related to a modulation scheme, and the symbol for transmitting information related to an error correction scheme. Further, symbols other than these symbols, for example a symbol for preamble and synchronization, pilot symbols, a reference symbol, etc., may exist in a frame.

Embodiment AA

The present embodiment describes a method of changing a roll-off rate of the bandlimiting filter, described later. The present embodiment describes a method of changing the roll-off rate of a bandlimiting filter with respect to a transmission scheme based on *Transmission System for Advanced Wide Band Digital Satellite Broadcasting,* ARIB Standard STD-B44, Ver. 1.0.

First, frame configuration and TMCC configuration is described.

FIG. 11 illustrates a single frame configuration according to *Transmission System for Advanced Wide Band Digital Satellite Broadcasting*, ARIB Standard STD-B44, Ver. 1.0. In FIG. 11, "FSync" and "!FSync" indicate frame synchronization signals. "PSync" indicates slot synchronization signals. "P" indicates a pilot symbol group, and "T" indicates a TMCC symbol group.

"Data" indicates a data symbol group (symbol group for transmitting data), and a modulation scheme of a data symbol group is any of π/2 shift BPSK, QPSK, 8PSK, (12,4)16APSK, and (4,12,16)32APSK.

As illustrated in FIG. 11, the single frame is composed of 120 slots (from modulated slot #1 to modulated slot #120). Each slot (slot or frame) is composed of synchronization signals, pilot symbols, TMCC symbol groups, and data symbol groups. When the TMCC symbol groups included in the single frame are collected, there are 31,680 bits. The following describes the 31,680 bits from which a TMCC signal is composed.

Figure 69:
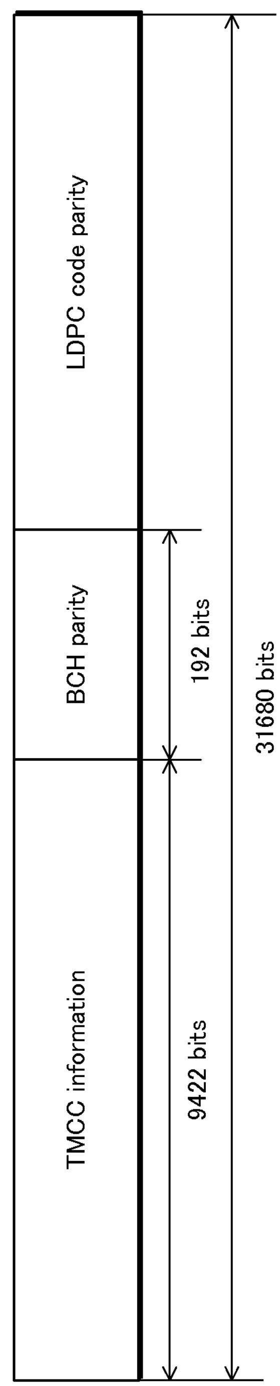
FIG. 69 illustrates an example configuration of a TMCC signal.

FIG. 69 illustrates a configuration of a TMCC signal composed from 31680 bits. The TMCC signal is composed of 9422 bits of TMCC information, 192 bits of Bose-Chaudhuri-Hocquenghem (BCH) parity, and 22066 bits of parity for LDPC code. Here, parity is parity generated by coding according to BCH and LDPC code.

FIG. 70 illustrates a configuration of the 9422 bits of TMCC information. As illustrated in FIG. 70, the TMCC information is composed of "change indicator", "transmission mode/slot information", "stream identifier/relative stream", "packet format/relative stream", "pointer/slot information", "relative stream/slot information", "relative stream/transmission stream ID correspondence table information", "transmit/receive control information", and "extended information". The following is a simple description of each element.

"Change Indicator":

The change indicator is incremented by 1 each time a change in TMCC information content occurs, and returns to "00000000" when it becomes "11111111". However, the change indicator does not increment when only the pointer/slot information changes.

"Transmission Mode/Slot Information":

The transmission mode/slot information indicates the modulation scheme of the main broadcast signal, coding rate of error correction coding, satellite output back-off, and assigned slot number.

"Stream Identifier/Relative Stream":

The stream identifier/relative stream information is a region that indicates correspondence between relative stream number and types of stream, and indicates a packet stream type for each relative stream number assigned to each slot indicated by an item of relative stream/slot information.

"Packet Format/Relative Stream":

The packet format/relative stream information indicates a correspondence between relative stream number and packet format, and indicates a packet format for each relative stream number assigned to each slot by relative stream/slot information.

"Pointer/Slot Information":

The pointer/slot information indicates start position of first packet and end position of last packet included in each slot.

"Relative Stream/Slot Information":

The relative stream/slot information indicates correspondence between slots and relative stream numbers, and indicates a relative stream number transmitted by each slot in order from slot 1.

"Relative Stream/Transmit Stream ID Correspondence Table Information":

The relative stream/transmission stream ID correspondence table indicates correspondence between relative stream numbers used by relative stream/slot information and transmit stream IDs.

"Transmit/Receive Control Information":

The transmit/receive control information transmits a signal for receiver activation control in an emergency warning broadcast and uplink control information.

"Extended Information":

The extended information is a field used for conventional TMCC information extension. In the case of TMCC information extension, when an extended identifier is a predefined as a value other than "0000000000000000", this indicates that the field that follows is valid. When the extended identifier is "0000000000000000", the extended field is stuffed with "1" bits.

The following describes a method of changing roll-off rate.

First, a system configuration is described.

As described in embodiment B and embodiment E, a system is composed of a transmit station (ground station), satellite (repeater), and terminal.

A configuration of a terrestrial transmit station transmitting a transmit signal towards a satellite is as illustrated in FIG. 41 to FIG. 43. Further, a configuration of satellites (repeaters) that receive a signal transmitted by a terrestrial transmit station and transmit a modulated signal towards a terrestrial receive terminal is as illustrated in FIG. 45 and FIG. 46. Details of these configurations are described in embodiment B and embodiment E, and are omitted here.

A characterizing feature of the present embodiment is "changing roll-off rates". Thus, this characterizing feature is described below.

Figure 71:
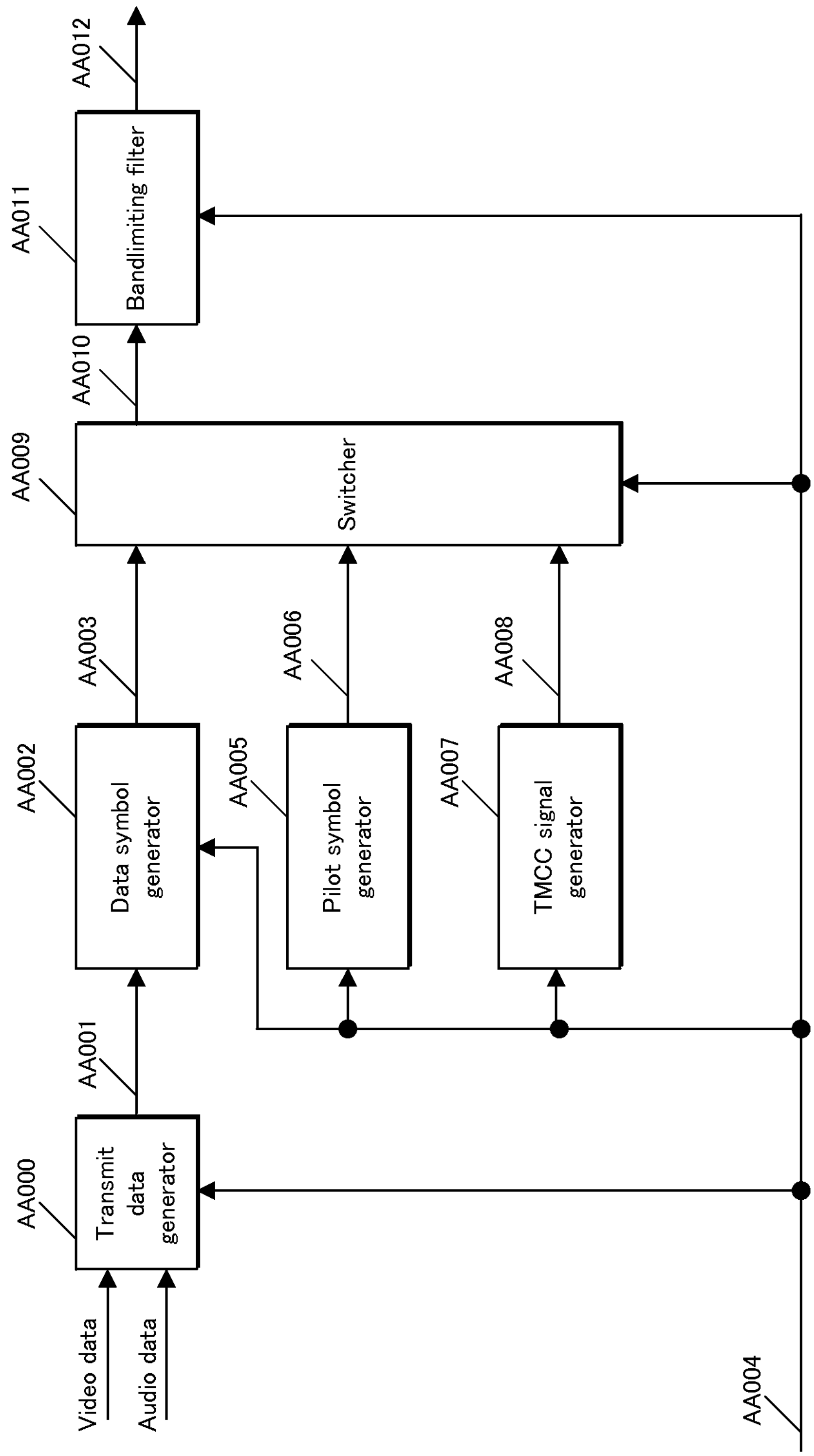
FIG. 71 illustrates an example configuration of a channel portion of a transmit station.

FIG. 71 illustrates a detailed configuration of a channel # X portion (X is an integer greater than or equal to one) in a terrestrial transmit station (ground station) that transmits a transmit signal towards the satellite of FIG. 41 to FIG. 43.

In FIG. 71, a transmit data generator AA000 receives, as input, video data, audio data, and a control signal AA004, performs BCH coding and LDPC coding based on the control signal AA004, and outputs transmit data AA001.

A data symbol generator AA002 receives the transmit data AA001 and the control signal AA004 as input, performs modulation scheme mapping based on the control signal AA004, and outputs a data symbol signal AA003.

A pilot symbol generator AA005 receives the control signal AA004 as input, generates modulation scheme pilot symbols based on the control signal AA004, and outputs a pilot symbol signal AA006.

A TMCC signal generator AA007 receives the control signal AA004 as input, generates TMCC symbols as described above, based on the control signal AA004, and outputs a TMCC symbol signal AA008.

A switcher AA009 receives the data symbol signal AA003, the pilot symbol signal AA006, the TMCC symbol signal AA008, and the control signal AA004 as input, performs selection of the data symbol signal AA003, the pilot symbol signal AA006, and the TMCC symbol signal AA008, based on information related to frame configuration included in the control signal AA004, and outputs a modulated signal AA010.

A bandlimiting filter AA0011 receives the modulated signal AA0010 and the control signal AA0004 as input, sets a roll-off rate based on the control signal AA0004, performs bandlimiting at the roll-off rate set, and outputs a post-bandlimiting modulated signal AA012. The post-bandlimiting modulated signal AA012 corresponds to the modulated signal # X (X being an integer greater than or equal to one and less than or equal to N) in FIG. 41 to FIG. 43.

Frequency properties of a bandlimiting filter are as in the following equation.

[Math 28]

$$\begin{cases} 1 & |F| \le F_n \times (1-\alpha) \\ \sqrt{\frac{1}{2} + \frac{1}{2}\sin\frac{\pi}{2F_n}\left[\frac{F_n - |F|}{\alpha}\right]} & F_n \times (1-\alpha) \le |F| \le F_n \times (1+\alpha) \\ 0 & |F| \ge F_n \times (1+\alpha) \end{cases} \quad \text{(Math 28)}$$

In the above equation, F is center frequency of a carrier, $F_n$ is Nyquist frequency, and α is roll-off rate (which may be referred to a roll-off factor, root roll-off rate, and root roll-off factor).

Figure 72:
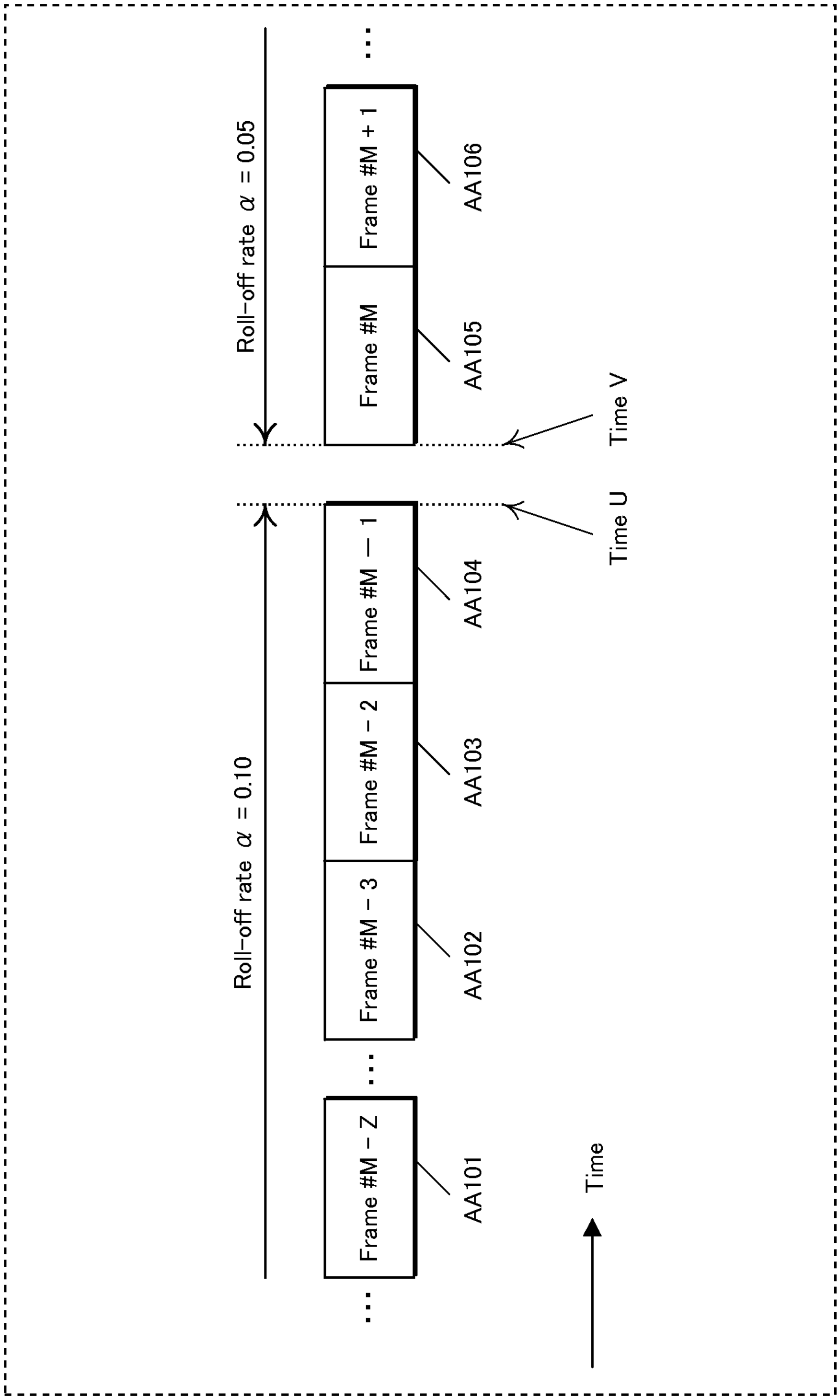
FIG. 72 illustrates an example of frame conversion.

FIG. 72 illustrates an example of frame changes in the embodiment, in which the horizontal axis is time. In FIG. 72, AA101 is frame # M−Z, the (M−Z)-th frame. AA102 is frame # M−3, the (M−3)-th frame.

AA103 is frame # M−2, the (M−2)-th frame. AA104 is frame # M−1, the (M−1)-th frame. AA105 is frame # M, the M-th frame. AA106 is frame # M+1, the (M+1)-th frame. Each frame is constructed as per the frame in FIG. 11.

As illustrated in FIG. 72, in the present embodiment, roll-off rate (roll-off factor) is a switchable system in which a bandlimiting filter roll-off rate (roll-off factor) a of frames at or before time U is 0.10, and the bandlimiting filter roll-off rate (roll-off factor) a of frames at or after time V is 0.05.

Assuming that when the roll-off rate (roll-off factor) α is 0.10, the baud rate (symbol rate (symbol transmission speed)) is p, and when the roll-off rate (roll-off factor) a is 0.05, the baud rate (symbol rate (symbol transmission speed)) is q, it suffices that $p<q$ for effective use of frequency bands ($p=q$ is also acceptable, but is not effective use of frequency bands).

Here, an example is described in which roll-off rate (roll-off factor) α is 0.10 and roll-off rate (roll-off factor) α is 0.05, but roll-off rate (roll-off factor) α is not limited to these values. Thus, assuming that when the roll-off rate (roll-off factor) α is $A_1$, the baud rate (symbol rate (symbol transmission speed)) is $p_1$, and when the roll-off rate (roll-off factor) α is $A_2$, the baud rate (symbol rate (symbol transmission speed)) is $p_2$, it suffices that when $A_1<A_2$, $p_1>p_2$ for effective use of frequency bands ($p_1=p_2$ is also acceptable, but is not effective use of frequency bands).

In FIG. 72, an example is disclosed of the roll-off rate being switched from 0.10 to 0.05, but the roll-off rate is not limited in this way. The roll-off rate may switch from 0.05 to 0.10, switch from $A_1$ to $A_2$, or switch from $A_2$ to $A_1$. Further, the roll-off rate is not limited being switched between two types of value, and may be switched between three or more types of value. However, assuming that when the roll-off rate (roll-off factor) α is $A_x$, the baud rate (symbol rate (symbol transmission speed)) is $p_x$, and when the roll-off rate (roll-off factor) α is $A_y$, the baud rate (symbol rate (symbol transmission speed)) is $p_y$, it suffices that when $A_x<A_y$, $p_x>p_y$ for effective use of frequency bands ($p_x=p_y$ is also acceptable, but is not effective use of frequency bands).

Figure 73:
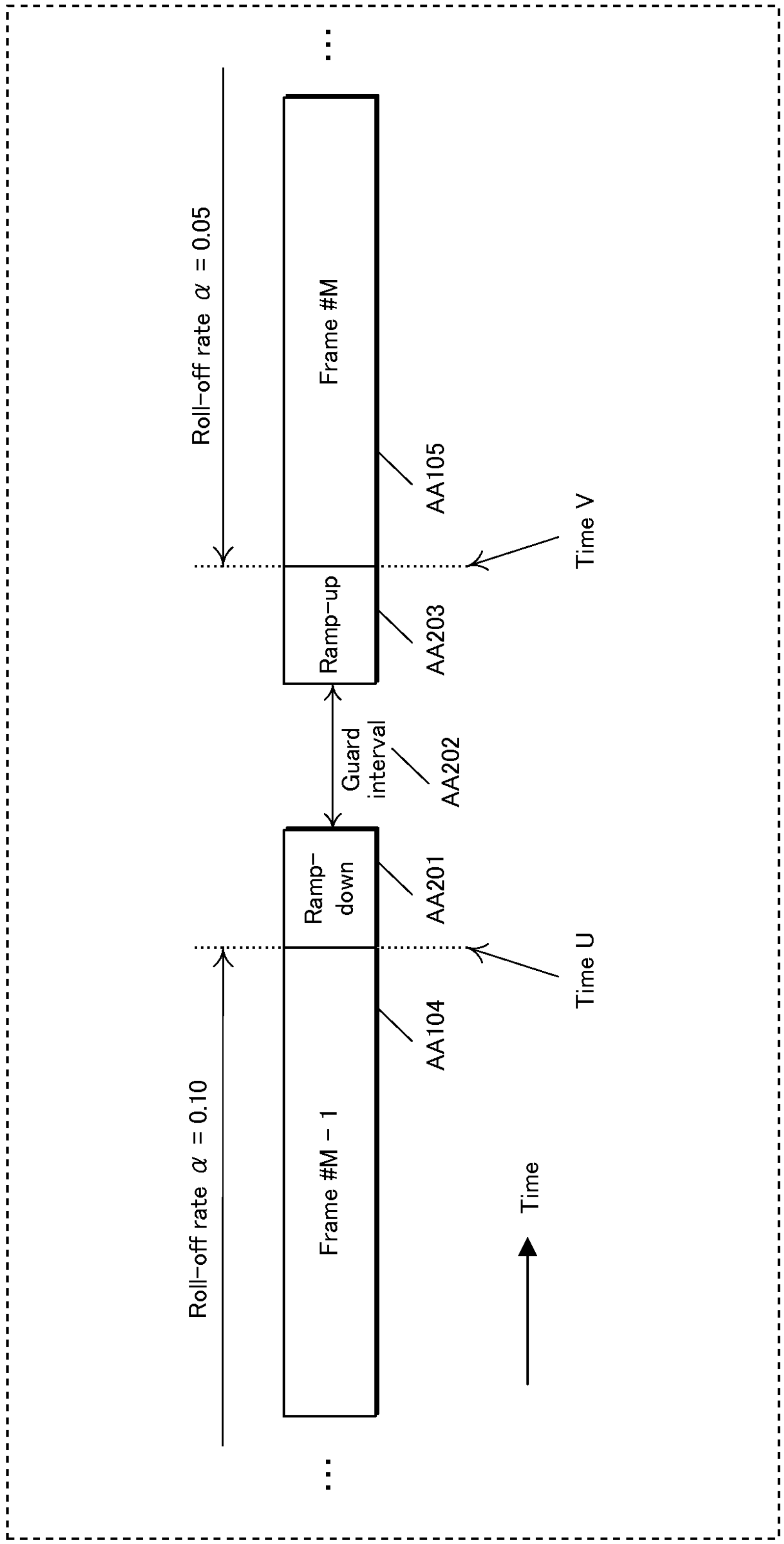
FIG. 73 illustrates an example of changes along a time axis when roll-off rate is switched.

FIG. 73 illustrates changes over time when the roll-off rate α of FIG. 72 is switched from 0.10 to 0.05. Frame # M−1 (AA104) is composed of roll-off rate 0.10 symbols, frame # M (AA105) is composed of roll-off rate 0.05 symbols, time U is a time at which transmission of frame # M−1 is complete, and time V is a time at which transmission of frame # M is started.

Thus, FIG. 73 illustrates a specific example of time U and time V. Ramp-down AA201 is an interval during which signal level is gradually reduced. The guard interval AA202 is an interval during which signal level is zero, i.e., baseband signal in-phase component I is zero and baseband signal quadrature component Q is zero. Ramp-up AA203 is an interval during which signal level is gradually increased. In this way, out-of-band spurious emission can be reduced.

Figure 74:
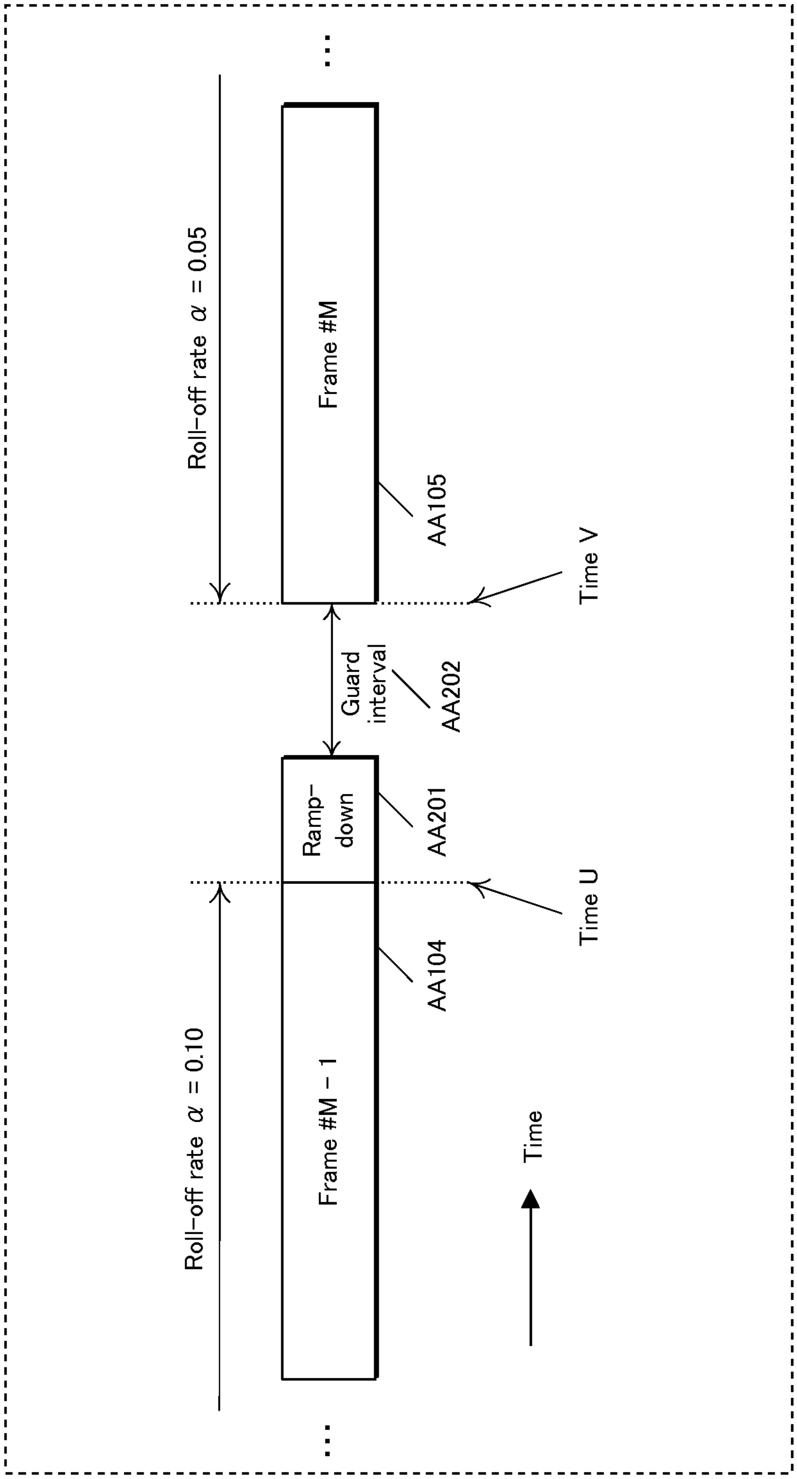
FIG. 74 illustrates an example of changes along a time axis when roll-off rate is switched.

FIG. 74 illustrates a different example to FIG. 73 of changes over time when the roll-off rate α is switched from 0.10 to 0.05.

In FIG. 74, the ramp-down AA201 is an interval during which signal level is gradually reduced. The guard interval AA202 is an interval during which signal level is zero, i.e., baseband signal in-phase component I is zero and baseband signal quadrature component Q is zero. In this way, out-of-band spurious emission can be reduced.

As described above, baud rate (symbol rate (symbol transmission speed)) is different for each roll-off rate. (Alternatively, along with roll-off rate changing, symbol rate may be switched.)

Accordingly, baud rate and filter coefficient of a bandlimiting filter (for example, when a digital filter is used) are switched when a transmit station (ground station) switches roll-off rate. When a transmit station does not notify a (terrestrial) terminal of switching timing, the terminal is required to estimate baud rate and bandlimiting filter being used, and it is likely that this estimation takes time. (It is very difficult to continue to receive without switching baud rate and filter coefficient of a bandlimiting filter (for example, when a digital filter is used).)

Thus, when a transmit station (ground station) switches roll-off rate, it is likely that video/audio/etc. is disturbed when a (terrestrial) terminal requires time to perform the above estimation. Accordingly, precise switching of roll-off rate is desirable.

Information transmitted in TMCC in order to resolve this technical problem is described below.

TABLE 21

Correspondence between $K_0K_1K_2K_3$ and switching frame number

| $K_0K_1K_2K_3$ | Significance |
|---|---|
| 1111 | Normal value |
| 1110 | 15 frames before switching |
| 1101 | 14 frames before switching |
| 1100 | 13 frames before switching |
| . . . | . . . |
| 0010 | 3 frames before switching |
| 0001 | 2 frames before switching |
| 0000 | 1 frame before switching |

Table 21 illustrates correspondence between $K_0K_1K_2K_3$ and the number of frames before switching. As one example, $K_0K_1K_2K_3$ is transmitted as a portion of extended information of TMCC. (As described in embodiment F and elsewhere, when TMCC information is extended, bits of the extended identifier have values other than all "0", i.e., values other than "0000000000000000".)

An example is described in which roll-off rate α is switched from 0.10 to 0.05, as in FIG. 72.

In FIG. 72, roll-off rate α is switched to 0.05 from frame # M (AA105). Accordingly, frame # M−Z (AA101) is a frame Z frames prior to the roll-off rate α switching to 0.05.

Frame # M−3 (AA102) is a frame three frames prior to the roll-off rate α switching to 0.05.

Frame # M−2 (AA103) is a frame two frames prior to the roll-off rate α switching to 0.05.

Frame # M−1 (AA104) is a frame one frame prior to the roll-off rate α switching to 0.05.

Accordingly, when Z=15, frame # M−Z is a frame 15 frames prior to the roll-off rate α switching to 0.05, and therefore a transmit station transmits $K_0K_1K_2K_3$="1110" in this frame.

Likewise, when Z=14, frame # M−Z is a frame 14 frames prior to the roll-off rate α switching to 0.05, and therefore a transmit station transmits $K_0K_1K_2K_3$="1101" in this frame.

Frame # M−3 (AA102) is a frame three frames prior to the roll-off rate α switching to 0.05, and therefore a transmit station transmits $K_0K_1K_2K_3$="0010" in this frame.

Frame # M−2 (AA103) is a frame two frames prior to the roll-off rate α switching to 0.05, and therefore a transmit station transmits $K_0K_1K_2K_3$="0001" in this frame.

Frame # M−1 (AA104) is a frame one frame prior to the roll-off rate α switching to 0.05, and therefore a transmit station transmits $K_0K_1K_2K_3$="0000" in this frame.

Thus, in the frame # M (AA105) in which the roll-off rate is switched to 0.05, the change in roll-off rate is complete, and a transmit station transmits $K_0K_1K_2K_3$="1111" in this frame. Note that as long as a change in roll-off rate does not occur, a transmit station transmits $K_0K_1K_2K_3$="1111" in each frame after frame # M (AA105).

The above describes an example in which roll-off rate is switched from 0.10 to 0.05, but roll-off rate switching is not limited in this way. Accordingly, referring to FIG. 72, a case may be considered in which roll-off rate is switched to $\beta_2$ in frame # M (AA105). In this case, roll-off rate of . . . , frame # M−Z (AA101), . . . , frame # M−3 (AA102), frame # M−2 (AA103), and frame # M−1 (AA104) is $p_1$, and roll-off rate of frame # M (AA105), frame # M+1 (AA106), . . . , is $\beta_2$. ($\beta_1 \neq \beta_2$)

Accordingly, when Z=15, frame # M−Z is a frame 15 frames prior to the roll-off rate α switching to $\beta_2$, and therefore a transmit station transmits $K_0K_1K_2K_3$="1110" in this frame.

Likewise, when Z=14, frame # M−Z is a frame 14 frames prior to the roll-off rate α switching to $\beta_2$, and therefore a transmit station transmits $K_0K_1K_2K_3$="1101" in this frame.

Frame # M−3 (AA102) is a frame three frames prior to the roll-off rate α switching to $\beta_2$, and therefore a transmit station transmits $K_0K_1K_2K_3$="0010" in this frame.

Frame # M−2 (AA103) is a frame two frames prior to the roll-off rate α switching to $\beta_2$, and therefore a transmit station transmits $K_0K_1K_2K_3$="0001" in this frame.

Frame # M−1 (AA104) is a frame one frame prior to the roll-off rate α switching to $\beta_2$, and therefore a transmit station transmits $K_0K_1K_2K_3$="0000" in this frame.

Thus, in the frame # M (AA105) in which the roll-off rate is switched to $\beta_2$, the change in roll-off rate is complete, and a transmit station transmits $K_0K_1K_2K_3$="1111" in this frame. Note that as long as a change in roll-off rate does not occur, a transmit station transmits $K_0K_1K_2K_3$="1111" in each frame after frame # M (AA105).

Accordingly, when Z=G (G is an integer greater than or equal to 16), frame # M−Z is a frame G frames prior to the roll-off rate α switching to $\beta_2$, and therefore a transmit station transmits $K_0K_1K_2K_3$="1111" in this frame.

When Z=H (H is an integer from one to 15), frame # M−Z is a frame H frames prior to the roll-off rate α switching to $\beta_2$, and therefore a transmit station transmits $K_0K_1K_2K_3$="binary expression of H" in this frame.

As above, a (terrestrial) transmit station transmitting $K_0K_1K_2K_3$ and a terminal receiving $K_0K_1K_2K_3$ has the benefit of a frame in which roll-off rate is switched being known in advance. A transmit station need not notify a terminal 15 frames in advance of roll-off rate switching as in the example above, and, for example, a transmit station may notify a terminal one frame in advance of roll-off rate switching, and may notify a terminal seven frames in advance of roll-off rate switching. A transmit station may start notifying a terminal of a change in roll-off rate from any frame according to any timing.

In a case of a switchable roll-off rate having two values 0.10 and 0.05, a roll-off rate switching value can be easily estimated by a terminal, and therefore a terminal can precisely respond to roll-off rate changes by receiving $K_0K_1K_2K_3$.

In a case in which a switchable roll-off rate has three or more values, new information in addition to $K_0K_1K_2K_3$ may be transmitted as control information such as TMCC. This point is explained below. Even when a switchable roll-off rate has two values, the following implementation may be implemented.

Table 22 illustrates correspondence between $L_0L_1$ and roll-off rate. As one example, $L_0L_1$ is transmitted as a portion of extended information of TMCC. (As described in embodiment F and elsewhere, when TMCC information is extended, bits of the extended identifier have values other than all "0", i.e., values other than "0000000000000000".) $L_0L_1$ is transmitted at the same time as $K_0K_1K_2K_3$ as a portion of extended information of TMCC.

TABLE 22

Correspondence between $L_0L_1$ and roll-off rate

| $L_0L_1$ | Significance |
|---|---|
| 11 | Normal value |
| 10 | Roll-off rate α = 0.10 |
| 01 | Roll-off rate α = 0.05 |
| 00 | Roll-off rate α = 0.03 |

An example is described in which roll-off rate α is switched from 0.10 to 0.05, as in FIG. 72.

In FIG. 72, roll-off rate α is switched to 0.05 from frame # M (AA105). Accordingly, frame # M−Z (AA101) is a frame Z frames prior to the roll-off rate α switching to 0.05.

Frame # M−3 (AA102) is a frame three frames prior to the roll-off rate α switching to 0.05.

Frame # M−2 (AA103) is a frame two frames prior to the roll-off rate α switching to 0.05.

Frame # M−1 (AA104) is a frame one frame prior to the roll-off rate α switching to 0.05.

For example, when Z=15, frame # M−Z is a frame 15 frames prior to the roll-off rate α switching to 0.05, and therefore a transmit station transmits $K_0K_1K_2K_3$="1110" in this frame. In addition, because roll-off rate is switched to 0.05, the transmit station transmits $L_0L_1$="01", based on Table 22.

Likewise, when Z=14, frame # M−Z is a frame 14 frames prior to the roll-off rate α switching to 0.05, and therefore a transmit station transmits $K_0K_1K_2K_3$="1101" in this frame. In addition, because roll-off rate is switched to 0.05, the transmit station transmits $L_0L_1$="01", based on Table 22.

Frame # M−3 (AA102) is a frame three frames prior to the roll-off rate α switching to 0.05, and therefore a transmit station transmits $K_0K_1K_2K_3$="0010" in this frame. In addition, because roll-off rate is switched to 0.05, the transmit station transmits $L_0L_1$="01", based on Table 22.

Frame # M−2 (AA103) is a frame two frames prior to the roll-off rate α switching to 0.05, and therefore a transmit station transmits $K_0K_1K_2K_3$="0001" in this frame. In addition, because roll-off rate is switched to 0.05, the transmit station transmits $L_0L_1$="01", based on Table 22.

Frame # M−1 (AA104) is a frame one frame prior to the roll-off rate α switching to 0.05, and therefore a transmit station transmits $K_0K_1K_2K_3$="0000" in this frame. In addition, because roll-off rate is switched to 0.05, the transmit station transmits $L_0L_1$="01", based on Table 22.

Thus, in the frame # M (AA105) in which the roll-off rate is switched to 0.05, the change in roll-off rate is complete, and a transmit station transmits $K_0K_1K_2K_3$="1111" in this frame. In addition, because the change in roll-off rate is complete, the transmit station transmits $L_0L_1$="11", based on Table 22. Note that as long as a change in roll-off rate does not occur, a transmit station transmits $K_0K_1K_2K_3$="1111" and $L_0L_1$="11" in each frame after frame # M (AA105).

The above describes an example in which roll-off rate is switched from 0.10 to 0.05, but roll-off rate switching is not limited in this way.

Referring to FIG. 72, a case in which roll-off rate is switched to $\beta_2$ from frame # M (AA105) may be considered. In this case, roll-off rate of . . . , frame # M−Z (AA101), . . . , frame # M−3 (AA102), frame # M−2 (AA103), and frame # M−1 (AA104) is $p_1$, and roll-off rate of frame # M (AA105), frame # M+1 (AA106), . . . , is $\beta_2$. ($\beta_1 \neq \beta_2$)

Accordingly, when Z=15, frame # M−Z is a frame 15 frames prior to the roll-off rate α switching to $\beta_2$, and therefore a transmit station transmits $K_0K_1K_2K_3$="1110" in this frame. In addition, because roll-off rate is to be switched to $\beta_2$, the transmit station transmits bits corresponding to $\beta_2$ as $L_0L_1$. (For example, when $\beta_2$=0.03, $L_0L_1$="00", based on Table 22.)

Likewise, when Z=14, frame # M−Z is a frame 14 frames prior to the roll-off rate α switching to $\beta_2$, and therefore a transmit station transmits $K_0K_1K_2K_3$="1101" in this frame. In addition, because roll-off rate is to be switched to $\beta_2$, the transmit station transmits bits corresponding to $\beta_2$ as $L_0L_1$. (For example, when $\beta_2$=0.03, $L_0L_1$="00", based on Table 22.)

Frame # M−3 (AA102) is a frame three frames prior to the roll-off rate α switching to $\beta_2$, and therefore a transmit station transmits $K_0K_1K_2K_3$="0010" in this frame. In addition, because roll-off rate is to be switched to $\beta_2$, the transmit station transmits bits corresponding to $\beta_2$ as $L_0L_1$. (For example, when $\beta_2$=0.03, $L_0L_1$="00", based on Table 22.)

Frame # M−2 (AA103) is a frame two frames prior to the roll-off rate α switching to $\beta_2$, and therefore a transmit station transmits $K_0K_1K_2K_3$="0001" in this frame. In addition, because roll-off rate is to be switched to $\beta_2$, the transmit station transmits bits corresponding to $\beta_2$ as $L_0L_1$. (For example, when $\beta_2$=0.03, $L_0L_1$="00", based on Table 22.)

Frame # M−1 (AA104) is a frame one frame prior to the roll-off rate α switching to $\beta_2$, and therefore a transmit station transmits $K_0K_1K_2K_3$="0000" in this frame. In addition, because roll-off rate is to be switched to $\beta_2$, the transmit station transmits bits corresponding to $\beta_2$ as $L_0L_1$. (For example, when $\beta_2$=0.03, $L_0L_1$="00", based on Table 22.)

Thus, in the frame # M (AA105) in which the roll-off rate is switched to $\beta_2$, the change in roll-off rate is complete, and a transmit station transmits $K_0K_1K_2K_3$="1111" in this frame. Note that as long as a change in roll-off rate does not occur, a transmit station transmits $K_0K_1K_2K_3$="1111" in each frame after frame # M (AA105). In addition, because the change in roll-off rate is complete, the transmit station transmits $L_0L_1$="11", based on Table 22. Note that as long as a change in roll-off rate does not occur, a transmit station transmits $K_0K_1K_2K_3$="1111" and $L_0L_1$="11" in each frame after frame # M (AA105).

Accordingly, when Z=G (G is an integer greater than or equal to 16), frame # M−Z is a frame G frames prior to the roll-off rate α switching to $\beta_2$, and therefore a transmit station transmits $K_0K_1K_2K_3$="1111" in this frame. In addition, the transmit station transmits $L_0L_1$="11", based on Table 22.

When Z=H (H is an integer from one to fifteen), frame # M−Z is a frame H frames prior to the roll-off rate α switching to $\beta_2$, and therefore a transmit station transmits $K_0K_1K_2K_3$="Binary representation of H" in this frame. In addition, because roll-off rate is to be switched to $\beta_2$, the transmit station transmits bits corresponding to $\beta_2$ as $L_0L_1$. (For example, when $\beta_2$=0.03, $L_0L_1$="00", based on Table 22.)

As above, a (terrestrial) transmit station transmitting $K_0K_1K_2K_3$ and $L_0L_1$, and a terminal receiving $K_0K_1K_2K_3$ and $L_0L_1$ has the benefits of a frame in which roll-off rate is switched being known in advance and a roll-off rate value of the frame in which roll-off rate is switched being known, and therefore an effect is achieved of the terminal precisely responding to a change in roll-off rate.

A transmit station need not notify a terminal 15 frames in advance of roll-off rate switching as in the example above, and, for example, a transmit station may notify a terminal one frame in advance of roll-off rate switching, and may notify a terminal seven frames in advance of roll-off rate switching. A transmit station may start notifying a terminal of a change in roll-off rate from any frame according to any timing.

Further, referring to Table 22, an example is described in which three roll-off rate values can be set, but the number of roll-off rates is not limited in this way and the number of roll-off rate values which can be set may be three or more, and may be two.

Further, timing at which a transmit station transmits $L_0L_1$ corresponding to roll-off rate value is not limited to that described above, as long as the transmit station transmits $L_0L_1$ corresponding to roll-off rate value prior to the frame in which roll-off rate is switched.

The following describes a method different from Table 22.

Table 23 illustrates correspondence between $M_0M_1$ and roll-off rate in use. As one example, $M_0M_1$ is transmitted as a portion of extended information of TMCC. Table 24 illustrates correspondence between $M_2M_3$ and roll-off rate to switch to. As one example, $M_2M_3$ is transmitted as a portion of extended information of TMCC.

(As described in embodiment F and elsewhere, when TMCC information is extended, bits of the extended identifier have values other than all "0", i.e., values other than "0000000000000000".) $M_0M_1$ and $M_2M_3$ are transmitted at the same time as $K_0K_1K_2K_3$ as a portion of extended information of TMCC.

TABLE 23

Correspondence between $M_0M_1$ and roll-off rate in use

| $M_0M_1$ | Significance (roll-off rate in use) |
|---|---|
| 11 | Roll-off rate α = 0.10 |
| 10 | Roll-off rate α = 0.08 |
| 01 | Roll-off rate α = 0.05 |
| 00 | Roll-off rate α = 0.03 |

TABLE 24

Correspondence between $M_2M_3$ and roll-off rate in use

| $M_2M_3$ | Significance (roll-off rate to switch to) |
|---|---|
| 11 | Roll-off rate α = 0.10 |
| 10 | Roll-off rate α = 0.08 |
| 01 | Roll-off rate α = 0.05 |
| 00 | Roll-off rate α = 0.03 |

An example is described in which roll-off rate α is switched from 0.10 to 0.05, as in FIG. 72.

In FIG. 72, roll-off rate α is switched to 0.05 from frame # M (AA105). Accordingly, frame # M−Z (AA101) is a frame Z frames prior to the roll-off rate α switching to 0.05.

Frame # M−3 (AA102) is a frame three frames prior to the roll-off rate α switching to 0.05.

Frame # M−2 (AA103) is a frame two frames prior to the roll-off rate α switching to 0.05.

Frame # M−1 (AA104) is a frame one frame prior to the roll-off rate α switching to 0.05.

For example, when Z=15, frame # M−Z is a frame 15 frames prior to the roll-off rate α switching to 0.05, and therefore a transmit station transmits $K_0K_1K_2K_3$="1110" in this frame. In addition, the transmit station transmits $M_0M_1$="11" and $M_2M_3$="01", because the roll-off rate of this frame is 0.10, and therefore $M_0M_1$="11", based on Table 23, and the roll-off rate to switch to is 0.05, and therefore $M_2M_3$="01", based on Table 24.

Likewise, when Z=14, frame # M−Z is a frame 14 frames prior to the roll-off rate α switching to 0.05, and therefore a transmit station transmits $K_0K_1K_2K_3$="1101" in this frame. In addition, the transmit station transmits $M_0M_1$="11" and $M_2M_3$="01", because the roll-off rate of this frame is 0.10, and therefore $M_0M_1$="11", based on Table 23, and the roll-off rate to switch to is 0.05, and therefore $M_2M_3$="01", based on Table 24.

Frame # M−3 (AA102) is a frame three frames prior to the roll-off rate α switching to 0.05, and therefore a transmit station transmits $K_0K_1K_2K_3$="0010" in this frame. In addition, the transmit station transmits $M_0M_1$="11" and $M_2M_3$="01", because the roll-off rate of this frame is 0.10, and therefore $M_0M_1$="11", based on Table 23, and the roll-off rate to switch to is 0.05, and therefore $M_2M_3$="01", based on Table 24.

Frame # M−2 (AA103) is a frame two frames prior to the roll-off rate α switching to 0.05, and therefore a transmit station transmits $K_0K_1K_2K_3$="0001" in this frame. In addition, the transmit station transmits $M_0M_1$="11" and $M_2M_3$="01", because the roll-off rate of this frame is 0.10, and therefore $M_0M_1$="11", based on Table 23, and the roll-off rate to switch to is 0.05, and therefore $M_2M_3$="01", based on Table 24.

Frame # M−1 (AA104) is a frame one frame prior to the roll-off rate α switching to 0.05, and therefore a transmit station transmits $K_0K_1K_2K_3$="0000" in this frame. In addition, the transmit station transmits $M_0M_1$="11" and $M_2M_3$="01", because the roll-off rate of this frame is 0.10, and therefore $M_0M_1$="11", based on Table 23, and the roll-off rate to switch to is 0.05, and therefore $M_2M_3$="01", based on Table 24.

Thus, in the frame # M (AA105) in which the roll-off rate is switched to 0.05, the change in roll-off rate is complete, and a transmit station transmits $K_0K_1K_2K_3$="1111" in this frame. In addition, the roll-off rate of this frame is 0.05, and therefore $M_0M_1$="01", based on Table 23. Note that as long as a change in roll-off rate does not occur, a transmit station transmits $K_0K_1K_2K_3$="1111" and $M_2M_3$="01" (based on Table 24) in each frame after frame # M (AA105).

The above describes an example in which roll-off rate is switched from 0.10 to 0.05, but roll-off rate switching is not limited in this way.

Referring to FIG. 72, a case in which roll-off rate is switched to $\beta_2$ from frame # M (AA105) may be considered. In this case, roll-off rate of . . . , frame # M−Z (AA101), . . . , frame # M−3 (AA102), frame # M−2 (AA103), and frame # M−1 (AA104) is $p_1$, and roll-off rate of frame # M (AA105), frame # M+1 (AA106), . . . , is $\beta_2$. ($\beta_1 \neq \beta_2$)

Accordingly, when Z=15, frame # M−Z is a frame 15 frames prior to the roll-off rate α switching to $\beta_2$, and therefore a transmit station transmits $K_0K_1K_2K_3$="1110" in this frame.

In addition, the transmit station transmits bits corresponding to $\beta_1$ as $M_0M_1$, because the roll-off rate of this frame is $\beta_1$, and transmits bits corresponding to $\beta_2$ as $M_2M_3$, because the roll-off rate to switch to is $\beta_2$.

Likewise, when Z=14, frame # M−Z is a frame 14 frames prior to the roll-off rate α switching to $\beta_2$, and therefore a transmit station transmits $K_0K_1K_2K_3$="1101" in this frame. In addition, the transmit station transmits bits corresponding to $\beta_1$ as $M_0M_1$, because the roll-off rate of this frame is $p_1$, and transmits bits corresponding to $\beta_2$ as $M_2M_3$, because the roll-off rate to switch to is $\beta_2$.

Frame # M−3 (AA102) is a frame three frames prior to the roll-off rate α switching to $\beta_2$, and therefore a transmit station transmits $K_0K_1K_2K_3$="0010" in this frame. In addition, the transmit station transmits bits corresponding to $\beta_1$ as $M_0M_1$, because the roll-off rate of this frame is $\beta_1$, and transmits bits corresponding to $\beta_2$ as $M_2M_3$, because the roll-off rate to switch to is $\beta_2$.

Frame # M−2 (AA103) is a frame two frames prior to the roll-off rate α switching to $\beta_2$, and therefore a transmit station transmits $K_0K_1K_2K_3$="0001" in this frame.

In addition, the transmit station transmits bits corresponding to $\beta_1$ as $M_0M_1$, because the roll-off rate of this frame is $\beta_1$, and transmits bits corresponding to $\beta_2$ as $M_2M_3$, because the roll-off rate to switch to is $\beta_2$.

Frame # M−1 (AA104) is a frame one frame prior to the roll-off rate α switching to $\beta_2$, and therefore a transmit station transmits $K_0K_1K_2K_3$="0000" in this frame. In addition, the transmit station transmits bits corresponding to $\beta_1$ as $M_0M_1$, because the roll-off rate of this frame is $\beta_1$, and transmits bits corresponding to $\beta_2$ as $M_2M_3$, because the roll-off rate to switch to is $\beta_2$.

Thus, in the frame # M (AA105) in which the roll-off rate is switched to $\beta_2$, the change in roll-off rate is complete, and a transmit station transmits $K_0K_1K_2K_3$="1111" in this frame. Note that as long as a change in roll-off rate does not occur, a transmit station transmits $K_0K_1K_2K_3$="1111" in each frame after frame # M (AA105). In addition, the roll-off rate of this frame is $\beta_2$, and therefore $M_0M_1$ are bits corresponding to $\beta_2$. Note that as long as a change in roll-off rate does not occur, a transmit station transmits $K_0K_1K_2K_3$="1111" and $M_2M_3$ as bits corresponding to $\beta_2$ in each frame after frame # M (AA105).

Accordingly, when Z=G (G is an integer greater than or equal to 16), frame # M−Z is a frame G frames prior to the roll-off rate α switching to $\beta_2$, and therefore a transmit station transmits $K_0K_1K_2K_3$="1111" in this frame. In addition, the roll-off rate of this frame is $\beta_1$, and therefore the transmit station transmits $M_0M_1$ as bits corresponding to $\beta_1$. In addition, although roll-off rate is to be switched to $\beta_2$, the transmit station transmits bits corresponding to $p_1$ as $M_2M_3$, because G is an integer greater than or equal to 16.

When Z=H (H is an integer from one to 15), frame # M−Z is a frame H frames prior to the roll-off rate α switching to $\beta_2$, and therefore a transmit station transmits $K_0K_1K_2K_3$="binary representation of H" in this frame. In addition, the roll-off rate of this frame is $\beta_1$, and therefore the transmit station transmits $M_0M_1$ as bits corresponding to $\beta_1$. Further, the roll-off rate will switch to $\beta_2$, and therefore the transmit station transmits $M_2M_3$ as bits corresponding to $\beta_2$.

As above, a (terrestrial) transmit station transmitting $K_0K_1K_2K_3$, $M_0M_1$, and $M_2M_3$ and a terminal receiving $K_0K_1K_2K_3$, $M_0M_1$, and $M_2M_3$ has the benefits of a frame in which roll-off rate is switched being known in advance from $K_0K_1K_2K_3$ and a roll-off rate value of the frame in which roll-off rate is switched being known from $M_2M_3$, and therefore an effect is achieved of the terminal precisely responding to a change in roll-off rate.

A transmit station need not notify a terminal 15 frames in advance of roll-off rate switching as in the example above, and, for example, a transmit station may notify a terminal one frame in advance of roll-off rate switching, and may notify a terminal seven frames in advance of roll-off rate switching. A transmit station may start notifying a terminal of a change in roll-off rate from any frame according to any timing.

Further, referring to Table 23 and Table 24, an example is described in which four roll-off rate values can be set, but the number of roll-off rates is not limited in this way and the number of roll-off rate values which can be set may be three or more, and may be two.

Further, timing at which a transmit station transmits $M_2M_3$ corresponding to roll-off rate value is not limited to that described above, as long as the transmit station transmits $M_2M_3$ corresponding to roll-off rate value prior to the frame in which roll-off rate is switched.

Various examples are described above, but the important points of the present embodiment are as follows:

A transmit station transmits to a terminal, in advance, control information related to timing of a frame in which roll-off rate is changed.

The transmit station transmits to the terminal control information that allows determination of roll-off rate to change.

Next, operation of a reception device is described with reference to FIG. 75.

Figure 75:
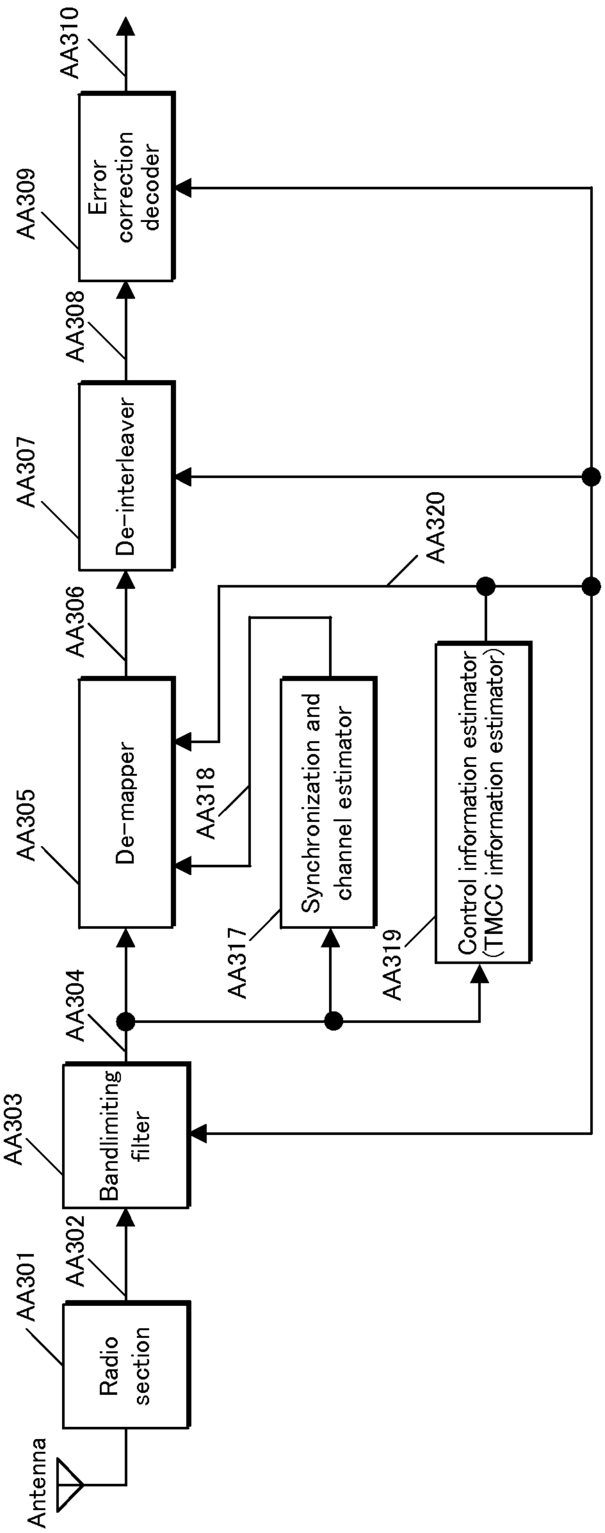
FIG. 75 illustrates an example configuration of a reception device.

FIG. 75 illustrates an example of configuration of a reception device of a terminal. A radio section AA301 receives a receive signal received by an antenna as input, performs processing such as frequency conversion and quadrature demodulation, and outputs baseband signal AA302.

A bandlimiting filter AA303 receives the baseband signal AA302 and control information AA320 as input, and sets a roll-off rate of the bandlimiting filter AA303 based on the control information AA320. Subsequently, the bandlimiting filter AA303 outputs a post-bandlimiting baseband signal AA304.

A de-mapper AA305 receives the post-bandlimiting baseband signal AA304, a synchronization and channel estimation signal AA308, and the control information AA310 as input, extracts information such as modulation scheme from the control information AA310, and performs frequency offset removal and time synchronization and obtains a channel estimation value according to the synchronization and channel estimation signal AA308. Subsequently, the de-mapper AA305, based on this information, performs de-mapping (demodulation) of the post-bandlimiting baseband signal AA304 and, for example, outputs a log-likelihood ratio signal AA306.

A de-interleaver AA307 receives the log-likelihood ratio signal AA306 and the control information AA320 as input, performs, based on the control information AA320, de-interleaving (permuting) with respect to log-likelihood ratio information, and outputs a de-interleaved log-likelihood ratio signal AA308.

An error correction decoder AA309 receives the de-interleaved log-likelihood ratio signal AA308 and the control information AA320 as input, extracts error correction scheme information (for example, coding rate) from the control information AA320, performs error correction decoding based on the error correction scheme information, and outputs receive data AA310.

A synchronization and channel estimator AA317 receives the post-bandlimiting baseband signal AA304 as input, extracts a synchronization signal, pilot signal, etc., performs time synchronization, frame synchronization, frequency synchronization, and channel estimation, and outputs the synchronization and channel estimation signal AA318.

A control information estimator (TMCC information estimator) AA319 receives the post-bandlimiting baseband signal AA304 as input and, for example, obtains TMCC information from the post-bandlimiting baseband signal AA304. Subsequently, the control information estimator (TMCC information estimator) AA319 outputs the control information AA320 that includes error correction coding scheme information, modulation scheme information, etc.

In particular, the control information AA320 includes the roll-off rate change timing and the roll-off rate change value described above. Accordingly, the control information estimator (TMCC information estimator) AA319 obtains, for example, the $(K_0K_1K_2K_3)$ information, the $(K_0K_1K_2K_3L_0L_1)$ information, or the $(K_0K_1K_2K_3M_0M_1M_2M_3)$ information described above, estimates the roll-off rate change timing and the roll-off rate change value as described above, and outputs the control information AA320 that includes this estimated information.

Subsequently, the bandlimiting filter AA303 performs the bandlimiting filter roll-off rate change at an appropriate timing based on this estimated information.

Note that $K_0K_1K_2K_3$, $L_0L_1$, $M_0M_1$, and $M_2M_3$ are described as being transmitted as a portion of TMCC extended information, but are not limited to this example, and a transmit station can transmit $K_0K_1K_2K_3$, $L_0L_1$, $M_0M_1$, and $M_2M_3$ as control information like TMCC so that a terminal can respond appropriately to a change in roll-off rate by receiving this information.

Further, in the present embodiment, an example system composed of a transmit station, repeater, and terminal is described, but a system composed of a transmit station and terminal may of course be implemented in a similar way. In such a case, the transmit station can transmit $K_0K_1K_2K_3$, $L_0L_1$, $M_0M_1$, and $M_2M_3$ and the terminal can respond appropriately to a change in roll-off rate by receiving this information.

As a bandlimiting filter, a filter having the frequency properties of Math 28 has been described, but the bandlimiting filter is not limited in this way, and may be a filter having other frequency properties. In such a case, a narrow passband filter and a wide passband filter are used, so that using a filter for which a in Math 28 is large is equivalent to using the wide passband filter and using a filter for which a in Math 28 is small is equivalent to using the narrow passband filter, and the embodiment described above can be implemented using this relationship.

According to the above implementation, a reception device can appropriately handle roll-off rate changes. A transmission device can apply a high-speed baud rate by changing the roll-off rate, and therefore an effect can be obtained of increasing data transmission efficiency.

Embodiment BB

In embodiment AA, a method of changing roll-off rate of a bandlimiting filter and a method of constructing control information of transmission and multiplexing configuration control (TMCC), etc., is described.

In the present embodiment, a method is described of transmitting control information such as TMCC at a time of emergency warning broadcasting. The present embodiment describes a case in which emergency warning broadcasting is performed with respect to a transmission scheme based on *Transmission System for Advanced Wide Band Digital Satellite Broadcasting*, ARIB Standard STD-B44, Ver. 1.0.

TMCC configuration, transmission device configuration, reception device configuration, etc., are all as described in embodiment AA, and description thereof is omitted here.

Further, in the present embodiment, as described in embodiment B, embodiment C, embodiment D, embodiment E, embodiment F, and embodiment G, a system composed of a (terrestrial) transmit station, (satellite) repeater, and terminal is described as an example.

In the present embodiment, a case is considered in which a transmit station (ground station) transmits emergency warning (early warning) information (for example, emergency earthquake information (epicenter information, magnitude information indicating earthquake scale, tremor (seismic intensity) information of each local quake), local predicted seismic intensity information, predicted arrival time of local tremors, tsunami arrival time, tsunami scale (tsunami height), information about volcano eruption, etc.) including electronic message information (for example, message information to be displayed on a display device such as a television or display) and/or video or still image information.

Satellite broadcasting such as advanced wide band digital satellite broadcasting is characterized by distribution of broadcast signals to a broad area, but when this property is used it is difficult to distribute different broadcast signals to each local region. For example, importance of emergency warning (early warning) information such as information related to earthquake occurrence is different according to region, and therefore a transmit station transmitting emergency warning (early warning) information without attaching priority information such as importance level is not desirable when considering the needs of each user. (Broadcast signals (transmit signals) are signals transmitted by a satellite (repeater); however, a transmitter of signals corresponding to broadcast signals is a transmit station (ground station), as described in other embodiments.)

Accordingly, when broadcasting emergency warning (early warning) information, information related to a region that is a subject of the emergency warning (early warning) information is attached and broadcast. Thus, by specifying a subject region, precise transmission is possible to a user considered likely to want emergency warning (early warning) information.

When a reception device (terminal) obtains information related to region that is transmitted along with emergency warning (early warning) information, when a specified region is applicable, signal processing (receive processing) is performed for receiving (demodulating) the emergency warning (early warning) information.

Setting a region of a reception device (terminal) can be achieved by a global positioning system (GPS) or a method specifying a region at a time of installation of the reception device (terminal), but is not limited to these examples. Thus, "relevance/non-relevance for specified region" determination is performed by comparing region information obtained by setting a region and information related to region that is transmitted along with emergency warning (early warning) information.

Further, including a "flag indicating either presence or absence of information related to region" in a broadcast signal (transmit signal) (for example, in control information such as TMCC) is appropriate for a reception device (terminal). For example, when information related to a region is not present the flag indicates "0" and information related to the region is not broadcast, and when information related to the region is present the flag indicates "1" and information related to the region is broadcast. Note that when a "flag indicating either presence or absence of information related to region" is present, a configuration of control information related to "emergency warning/early warning" may be, for example, composed of a "flag indicating either presence or absence of information related to region", "information related to region", and "emergency warning (early warning) information, as illustrated in FIG. 76.

A reception device (terminal) identifies a flag indicating either presence or absence of information related to region (for example, included in control information such as TMCC), acquires information related to the region when information related to the region is present (in other words, the flag described above "1", and performs signal processing (receive processing) to receive (demodulate) emergency warning (early warning) information corresponding to the specified region. An example of "relevance/non-relevance for specified region" determination is described above.

As above, information having different importance levels according to region can be distributed by using satellite broadcasting when a (terrestrial) transmit station attaches information related to a region that is a subject of emergency warning (early warning) information to control information such as TMCC, and transmits this information. Further, by providing a flag indicating either presence or absence of information related to region in control information such as TMCC, an effect can be achieved of broadcasting emergency warning (early warning) information with greater precision.

When a transmit station transmits the flag described above as "0" (information related to region is not present), a reception device (terminal) may determine that emergency warning (early warning) information is relevant to all regions, or may determine that determination of importance level of emergency warning (early warning) information need not be performed.

"Broadcast signals (transmit signals) are signals transmitted by a satellite (repeater); however, a transmitter of signals corresponding to broadcast signals is a transmit station (ground station), as described in other embodiments" is disclosed above, but a system in which a satellite generates broadcast signals (transmit signals) to transmit to a (terrestrial) terminal can also achieve the effect of precisely transmitting emergency warning (early warning) information by the method of transmitting control information described above.

Embodiment CC

In embodiment AA, a method of changing roll-off rate of a bandlimiting filter and a method of constructing control information of transmission and multiplexing configuration control (TMCC), etc., is described.

In the present embodiment, a method is described of transmitting control information such as TMCC at a time of emergency warning broadcasting. The present embodiment describes a case in which emergency warning broadcasting is performed with respect to a transmission scheme based on *Transmission System for Advanced Wide Band Digital Satellite Broadcasting*, ARIB Standard STD-B44, Ver. 1.0.

TMCC configuration, transmission device configuration, reception device configuration, etc., are all as described in embodiment AA, and description thereof is omitted here.

Further, in the present embodiment, as described in embodiment B, embodiment C, embodiment D, embodiment E, embodiment F, and embodiment G, a system composed of a (terrestrial) transmit station, (satellite) repeater, and terminal is described as an example.

In the present embodiment, a case is considered in which a transmit station (ground station) transmits emergency warning (early warning) information (for example, emergency earthquake information (epicenter information, magnitude information indicating earthquake scale, tremor (seismic intensity) information of each local quake), local predicted seismic intensity information, predicted arrival time of local tremors, tsunami arrival time, tsunami scale (tsunami height), information about volcano eruption, etc.) including electronic message information (for example, message information to be displayed on a display device such as a television or display), and/or video or still image information, and/or graphic (for example, map) information, and/or audio information.

Satellite broadcasting such as advanced wide band digital satellite broadcasting is characterized by distribution of broadcast signals to a broad area, but when this property is used it is difficult to distribute different broadcast signals to each local region. For example, importance of emergency warning (early warning) information such as information related to earthquake occurrence is different according to region, and therefore a transmit station transmitting emergency warning (early warning) information without attaching priority information such as importance level is not desirable when considering the needs of each user. (Broadcast signals (transmit signals) are signals transmitted by a satellite (repeater); however, a transmitter of signals corresponding to broadcast signals is a transmit station (ground station), as described in other embodiments.)

Accordingly, when broadcasting emergency warning (early warning) information, information related to a region that is a subject of the emergency warning (early warning) information is attached and broadcast. Thus, by specifying a subject region, precise transmission is possible to a user considered likely to want emergency warning (early warning) information.

When a reception device (terminal) obtains information related to region that is transmitted along with emergency warning (early warning) information, when a specified region is applicable, signal processing (receive processing) is performed for receiving (demodulating) the emergency warning (early warning) information.

Setting a region of a reception device (terminal) can be achieved by a global positioning system (GPS) or a method specifying a region at a time of installation of the reception device (terminal), but is not limited to these examples. Thus, "relevance/non-relevance for specified region" determination is performed by comparing region information obtained by setting a region and information related to region that is transmitted along with emergency warning (early warning) information.

Further, including a "flag indicating either presence or absence of information related to region" in a broadcast signal (transmit signal) (for example, in control information such as TMCC) is appropriate for a reception device (terminal). For example, when information related to a region is not present the flag indicates "0" and information related to the region is not broadcast, and when information related to the region is present the flag indicates "1" and information related to the region is broadcast. Note that when a "flag indicating either presence or absence of information related to region" is present, a configuration of control information related to "emergency warning/early warning" may be, for example, composed of a "flag indicating either presence or absence of information related to region", "information related to region", and "emergency warning (early warning) information, as illustrated in FIG. 76.

A reception device (terminal) identifies a flag indicating either presence or absence of information related to region (for example, included in control information such as TMCC), acquires information related to the region when information related to the region is present (in other words, the flag described above is "1", and performs signal processing (receive processing) to receive (demodulate) emergency warning (early warning) information corresponding to the specified region. An example of "relevance/non-relevance for specified region" determination is described above.

As above, information having different importance levels according to region can be distributed by using satellite broadcasting when a (terrestrial) transmit station attaches information related to a region that is a subject of emergency warning (early warning) information to control information such as TMCC, and transmits this information. Further, by providing a flag indicating either presence or absence of information related to region in control information such as TMCC, an effect can be achieved of broadcasting emergency warning (early warning) information with greater precision.

When a transmit station transmits the flag described above as "0" (information related to region is not present), a reception device (terminal) may determine that emergency warning (early warning) information is relevant to all regions, or may determine that determination of importance level of emergency warning (early warning) information need not be performed.

"Broadcast signals (transmit signals) are signals transmitted by a satellite (repeater); however, a transmitter of signals corresponding to broadcast signals is a transmit station (ground station), as described in other embodiments" is disclosed above, but a system in which a satellite generates broadcast signals (transmit signals) to transmit to a (terrestrial) terminal can also achieve the effect of precisely transmitting emergency warning (early warning) information by the method of transmitting control information described above.

Embodiment DD

In embodiment AA, a method of changing roll-off rate of a bandlimiting filter and a method of constructing control information of transmission and multiplexing configuration control (TMCC), etc., is described.

The present embodiment describes in detail a method of changing roll-off rate of a bandlimiting filter during an emergency warning broadcast. The present embodiment describes a method of changing roll-off rate of a bandlimiting filter when emergency warning broadcasting is performed with respect to a transmission scheme based on *Transmission System for Advanced Wide Band Digital Satellite Broadcasting*, ARIB Standard STD-B44, Ver. 1.0.

TMCC configuration, transmission device configuration, reception device configuration, etc., are all as described in embodiment AA, and description thereof is omitted here.

Further, in the present embodiment, as described in embodiment B, embodiment C, embodiment D, embodiment E, embodiment F, and embodiment G, a system composed of a (terrestrial) transmit station, (satellite) repeater, and terminal is described as an example.

First, as a precondition of a broadcast system, a transmit station (ground station) as described in embodiment AA is assumed to be able to select a value of a roll-off rate of a bandlimiting filter from a plurality of values, as in embodiment AA. (Obviously, a receive station (terminal) changes a value of a roll-off rate along with a change in value of a roll-off rate of the bandlimiting filter of the transmit station.)

In the present embodiment, a case is considered in which a transmit station (ground station) transmits emergency warning (early warning) information (for example, emergency earthquake information (epicenter information, magnitude information indicating earthquake scale, tremor (seismic intensity) information of each local quake), local predicted seismic intensity information, predicted arrival time of local tremors, tsunami arrival time, tsunami scale (tsunami height), information about volcano eruption, etc.) including electronic message information (for example, message information to be displayed on a display device such as a television or display), and/or video or still image information, and/or graphic (for example, map) information, and/or audio information. (In the case of graphic information, earthquake information may be included on a map, and in the case of audio information, evacuation instruction information for each region may be included.)

The present disclosure discloses "a transmission method, reception method, transmission device, and reception device for setting a roll-off rate of the bandlimiting filter described in embodiment AA to β (setting a value of the roll-off rate) when transmitting emergency warning (early warning) information including electronic message information, and/or video or still image information, and/or graphic information, and/or audio information".

Example 1

Figure 77:
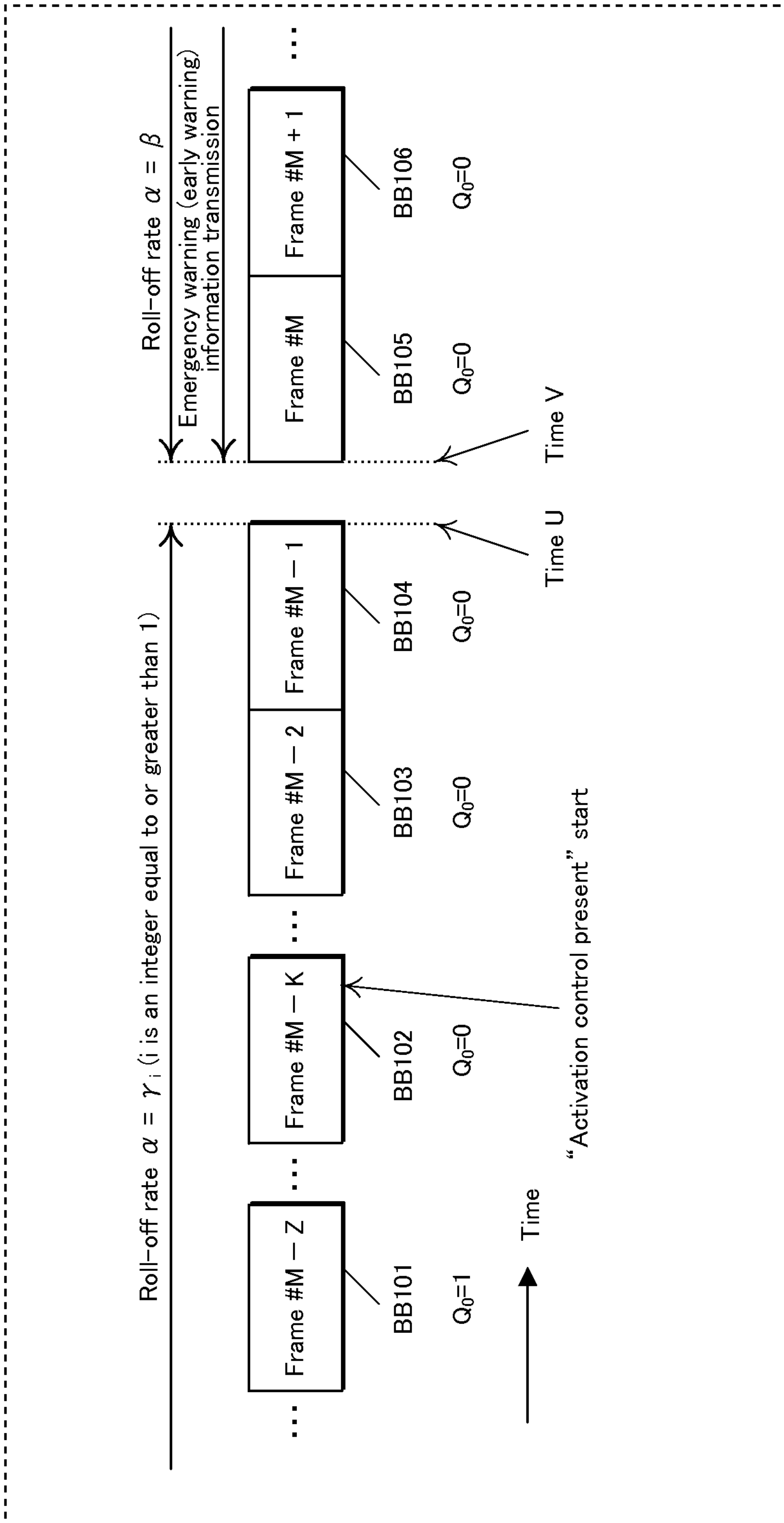
FIG. 77 illustrates a frame configuration when an "emergency warning (early warning)" is performed.

FIG. 77 illustrates a state of frames on a time axis when there is an interruption such as an emergency warning broadcast while a transmit station (ground station) is transmitting frames by using a roll-off rate $\alpha=\gamma_i$ (i being an integer equal to or greater than one). Further, for each frame, a state of $Q_0$ is also illustrated, which is described later.

Note that j is an integer equal to or greater than one, and to satisfy this condition $\gamma_i\neq\beta$ for all values of j. Further, j and k are integers equal to or greater than one, j≠k, and to satisfy this condition $\gamma_j\neq\gamma_k$ for all values of j and all values of k.

In FIG. 77, for frame # M (BB105), roll-off rate $\alpha=\beta$, and for frames prior to frame # M (BB105), roll-off rate $\alpha=\gamma_i$. Here, emergency warning (early warning) information including electronic message information, and/or video or still image information, and/or graphic information, and/or audio information is assumed to be transmitted in frame # M (BB105).

Frame # M−Z (BB101) is a frame Z frames prior to frame # M (BB105), for which roll-off rate $\alpha=\gamma_i$. (Z is an integer equal to or greater than K+1.)

Frame # M−K (BB102) is a frame K frames prior to frame # M (BB105), for which roll-off rate $\alpha=\gamma_i$.

Frame # M−2 (BB103) is a frame two frames prior to frame # M (BB105), for which roll-off rate $\alpha=\gamma_i$.

Frame # M−1 (BB104) is a frame one frame prior to frame # M (BB105), for which roll-off rate $\alpha=\gamma_i$.

Here, emergency warning (early warning) information including electronic message information, and/or video or still image information, and/or graphic information, and/or audio information is assumed to be transmitted in frame # M+1 (BB106), for which roll-off rate $\alpha=\beta$.

Configuration of each frame is as described in embodiment AA, and each frame may be constructed as illustrated in FIG. 11.

A feature of FIG. 77 is that a transmit station transmits emergency warning (early warning) information including electronic message information, and/or video or still image information, and/or graphic information, and/or audio information in frames at roll-off rate $\alpha=\beta$. Thus, a reception device can reliably receive emergency warning (early warning) information including electronic message information, and/or video or still image information, and/or graphic information, and/or audio information, and therefore an effect is achieved of improving the probability of ensuring a user's safety.

Next, in the present embodiment, a method is described of transmitting control information such as TMCC.

A transmit station (ground station) is here assumed to transmit $Q_0$ as a portion of TMCC information. Table 25 illustrates correspondence between $Q_0$ and an emergency warning broadcast activation flag.

TABLE 25

Correspondence between $Q_0$ and emergency warning broadcast activation flag

| $Q_0$ | Significance |
|---|---|
| 1 | Activation control not present |
| 0 | Activation control present |

As indicated in table 25, when $Q_0$="1", an emergency warning broadcast is not being performed. (In table 25, "activation control not present".) Further, when $Q_0$="0", either an emergency broadcast is to be performed (i.e., advance notice is being given that an emergency broadcast is to be performed) or an emergency broadcast is being performed. (In table 25, "activation control present".)

In FIG. 77, as illustrated, a transmit station changes the $Q_0$ that is a portion of the TMCC of frame # M−K (BB102) to "0". (In frame # M−K−1, $Q_0$ is "1", and $Q_0$ is also assumed to be "1" in previous frames.) Thus, when F is an integer equal to or greater than MK, $Q_0$ is assumed to be set to "1" in frame # F.

Here, as described above, in FIG. 77, emergency warning (early warning) information including electronic message information, and/or video or still image information, and/or graphic information, and/or audio information is transmitted in frame # M (BB105), and emergency warning (early warning) information including electronic message information, and/or video or still image information, and/or graphic information, and/or audio information is also transmitted in subsequent frames.

In frame 77, an end time of frame # M−1 (BB104) and a start time of frame # M (BB105) do not match, and this is because roll-off rate changes, as described in embodiment AA. In symbols between time U and time V, ramp-up, ramp-down, and guard intervals may be present as described in embodiment AA, for example. Other symbols may be inserted between time U and time V (for example, a symbol for transmitting control information, a symbol, a pilot symbol, a reference symbol, preamble, a symbol for performing synchronization, a symbol for a receiver to detect a signal, a symbol for determining frequency offset, a symbol for determining phase, etc.).

Next, receiver operation is described when a transmit station transmits frames as illustrated in FIG. 77.

Figure 78:
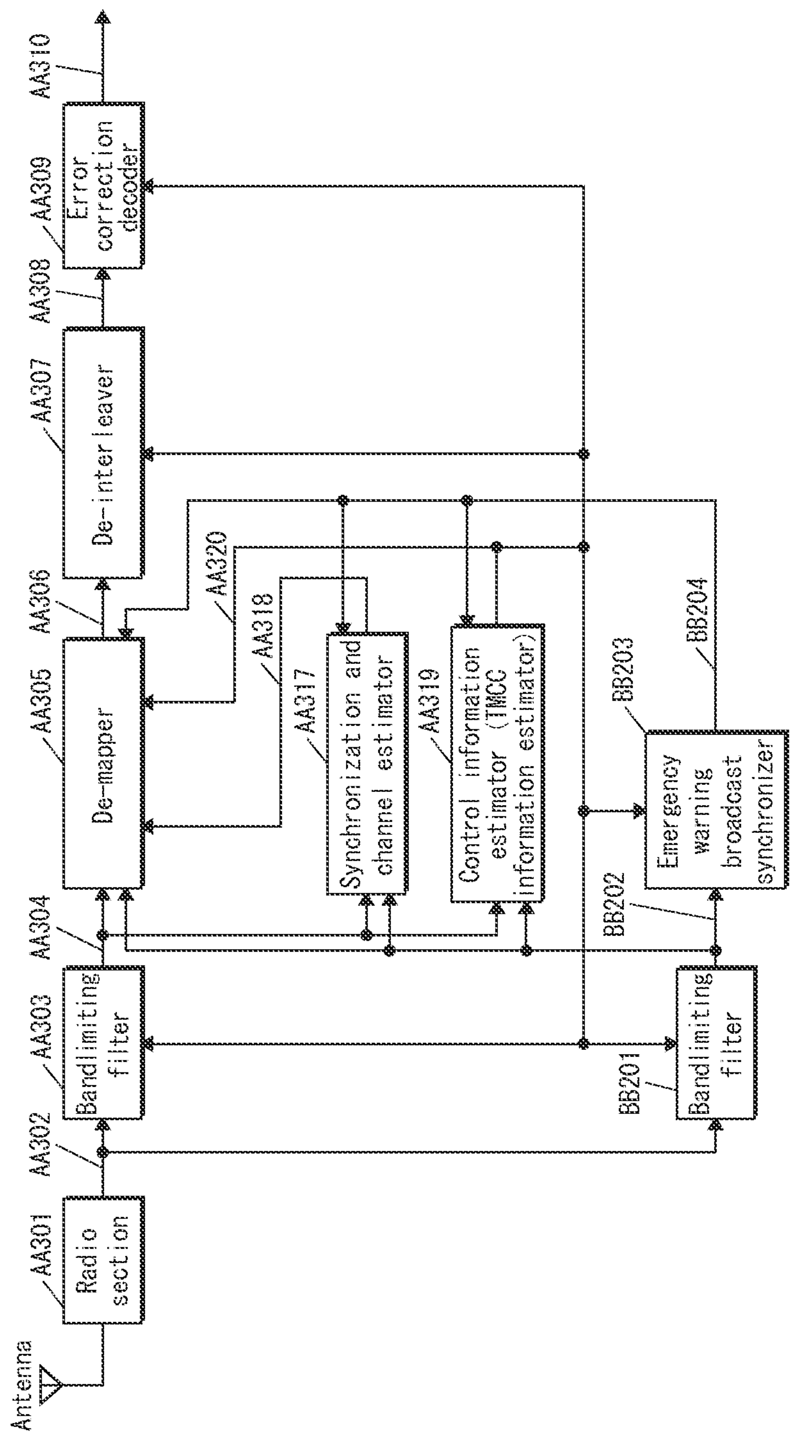
FIG. 78 illustrates an example configuration of a reception device.

FIG. 78 illustrates an example of configuration of a reception device. In FIG. 78, operations that are similar to FIG. 75 are assigned the same reference sign and description thereof is omitted.

When receiving frame # M−1 (BB104) of FIG. 77 and previous frames, roll-off rate α is set to $\gamma_i$ in the bandlimiting filter AA303.

When a reception device receives frame # M−Z of FIG. 77 (when Z is an integer greater than or equal to K+1), the control information estimator (TMCC information estimator) AA319 obtains control information (TMCC information) of frame # M−Z from the post-bandlimiting baseband signal AA304 that is inputted thereto. Thus, $Q_0$ is obtained from the control information (TMCC information). Because $Q_0$="1", the reception device determines that there is no activation of an emergency warning broadcast, and therefore de-mapping, de-interleaving, and error correction decoding processing is performed, obtaining receive data AA310 (the de-mapper AA305, the synchronization and channel estimator AA317, and the control information estimator (TMCC information estimator) AA319 perform each process with respect to a post-bandlimiting baseband signal).

When a reception device receives frame # M−K (BB102) of FIG. 77, the control information estimator (TMCC information estimator) AA319 obtains control information (TMCC information) of frame # M−K from the post-bandlimiting baseband signal AA304 that is inputted thereto. Thus, $Q_0$ is obtained from the control information (TMCC information). Because $Q_0$="0", the reception device determines that there is activation of an emergency warning broadcast. In frame # M−K−1 and previous frames, $Q_0$="1", and in frame # M−K, $Q_0$="0" for the first time. Accordingly, from frame # M−K+1, which is the next frame after frame # M−K, emergency warning (early warning) information may be broadcast. (However, even if emergency warning (early warning) information is broadcast in frame # M−K there is no problem with receiver operation; in such a case, the reception device can obtain emergency warning (early warning) information including electronic message information, and/or video or still image information, and/or graphic information, and/or audio information by receiving frame # M−K.)

As described above, the present embodiment describes "a transmission method, reception method, transmission device, and reception device for setting a roll-off rate of the bandlimiting filter described in embodiment AA to β (setting a value of the roll-off rate) when transmitting emergency warning (early warning) information including electronic message information, and/or video or still image information, and/or graphic information, and/or audio information". Thus, a bandlimiting filter BB201 of FIG. 78 is a bandlimiting filter for receiving emergency warning broadcasts, and therefore a roll-off rate thereof is β.

Further, a roll-off rate used when a transmit station transmits frame # M−K+1 may be β. (Because $Q_0$="0" for the first time in frame # M−K (BB102.)

Accordingly, the bandlimiting filter BB201 of FIG. 78 receives the control information AA320 and the baseband signal AA302 as input, performs bandlimiting filter signal processing for baseband signals corresponding to frame # M−K+1 and subsequent frames, based on $Q_0$ information included in control information AA320, and outputs a post-bandlimiting baseband signal BB202 at a roll-off rate β.

An emergency warning broadcast synchronizer BB203 in FIG. 78 receives the control information AA320 and the post-bandlimiting baseband signal BB202 at roll-off rate β as input, performs processing such as frame synchronization, time synchronization, and symbol synchronization for the post-bandlimiting baseband signal BB202 at roll-off rate β, based on $Q_0$ information included in the control information AA320, and outputs a synchronization signal BB204 including information indicating whether or not synchronization is achieved.

When frames are as illustrated in FIG. 77, $Q_0$="0" in frame # M−K, and a transmit station also transmits $Q_0$="0" information in subsequent frames, i.e., frame # M−K+1, frame # M−K+2, . . . , frame # M−1, frame # M, frame # M+1, . . . . Further, transmission of emergency warning (early warning) information begins from frame # M.

Accordingly, for frame # M−K+1 to frame # M−1, the emergency warning broadcast synchronizer BB203 in FIG. 78 receives the control information AA320 and the post-bandlimiting baseband signal BB202 at roll-off rate β as input, and outputs the synchronization signal BB204 indicating that synchronization is not achieved, as frame synchronization, time synchronization, and symbol synchronization cannot be achieved by using the post-bandlimiting baseband signal BB202 at roll-off rate β.

For frame # M (BB105), the emergency warning broadcast synchronizer BB203 in FIG. 78 receives the control information AA320 and the post-bandlimiting baseband signal BB202 at roll-off rate β as input and outputs the synchronization signal BB204 indicating that synchronization is achieved, as frame synchronization, time synchronization, and symbol synchronization can be achieved by using the post-bandlimiting baseband signal BB202 at roll-off rate β.

For frame # M+1 (BB106) and subsequent frames, the emergency warning broadcast synchronizer BB203 in FIG. 78 receives the control information AA320 and the post-bandlimiting baseband signal BB202 at roll-off rate β as input and outputs the synchronization signal BB204 indicating that synchronization is achieved, as frame synchronization, time synchronization, and symbol synchronization can be achieved by using the post-bandlimiting baseband signal BB202 at roll-off rate β.

Also, the de-mapper AA305 in FIG. 78 receives the post-bandlimiting baseband signal AA304, the post-bandlimiting baseband signal BB202, the synchronization signal BB204, the synchronization and channel estimation signal AA318, and the control signal AA320 as input, performs de-mapping of the post-bandlimiting baseband signal BB202 at roll-off rate β, as synchronization is achieved for frame # M (BB105) and subsequent frames, and outputs a log-likelihood ratio signal AA306.

Note that the de-mapper AA305 in FIG. 78, as synchronization is not achieved for frame # M−1 and previous frames, performs de-mapping of the post-bandlimiting baseband signal AA304 and outputs a log-likelihood ratio signal AA306.

The synchronization and channel estimator AA317 in FIG. 78 receives the post-bandlimiting baseband signal AA304, the post-bandlimiting baseband signal BB202 at roll-off rate β, and the synchronization signal BB204 as input, performs time synchronization, frequency synchronization, and channel estimation by using the post-bandlimiting baseband signal BB202 at roll-off rate β, as synchronization is achieved for frame # M (BB105) and subsequent frames, and outputs a synchronization and channel estimation signal AA318.

Note that the synchronization and channel estimator AA317 in FIG. 78, as synchronization is not achieved for frame # M−1 and previous frames, performs time synchronization, frequency synchronization, and channel estimation by using the post-bandlimiting baseband signal AA304, and outputs a synchronization and channel estimation signal AA318.

Example 2

Figure 79:
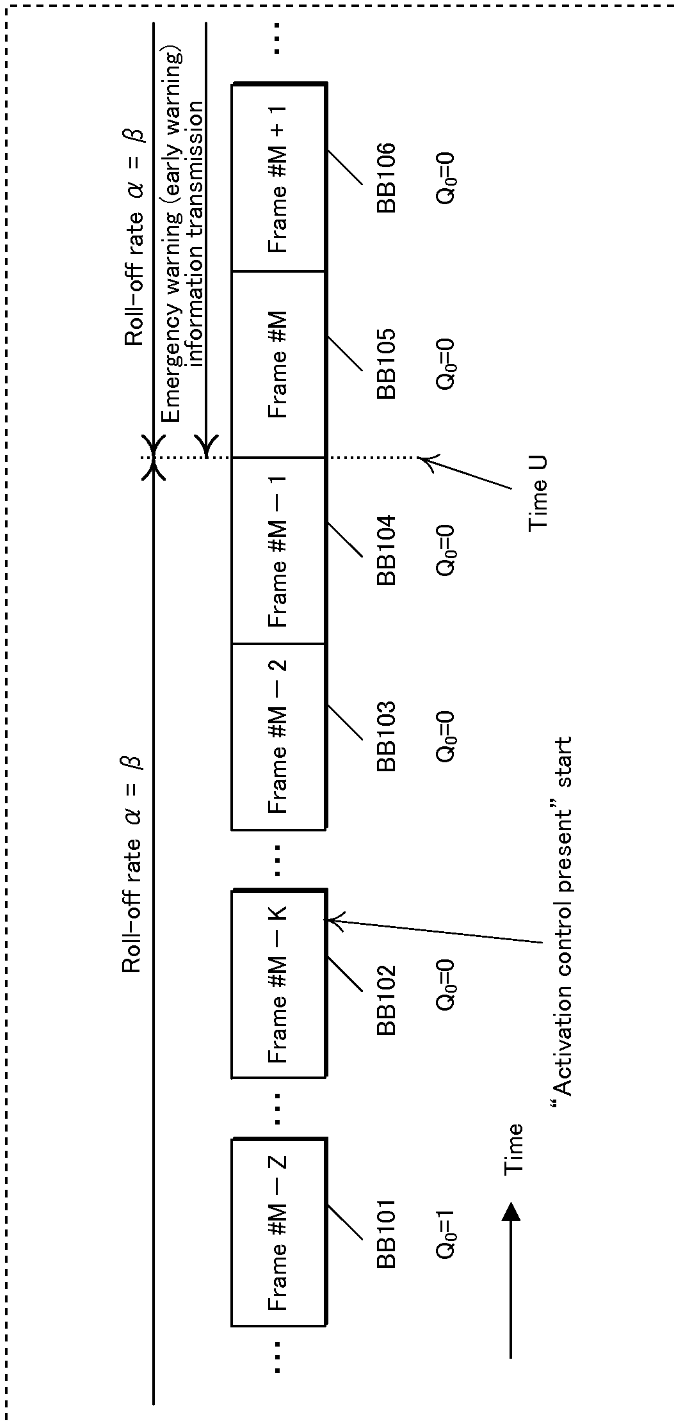
FIG. 79 illustrates a frame configuration when an "emergency warning (early warning)" is performed.
Figure 80:
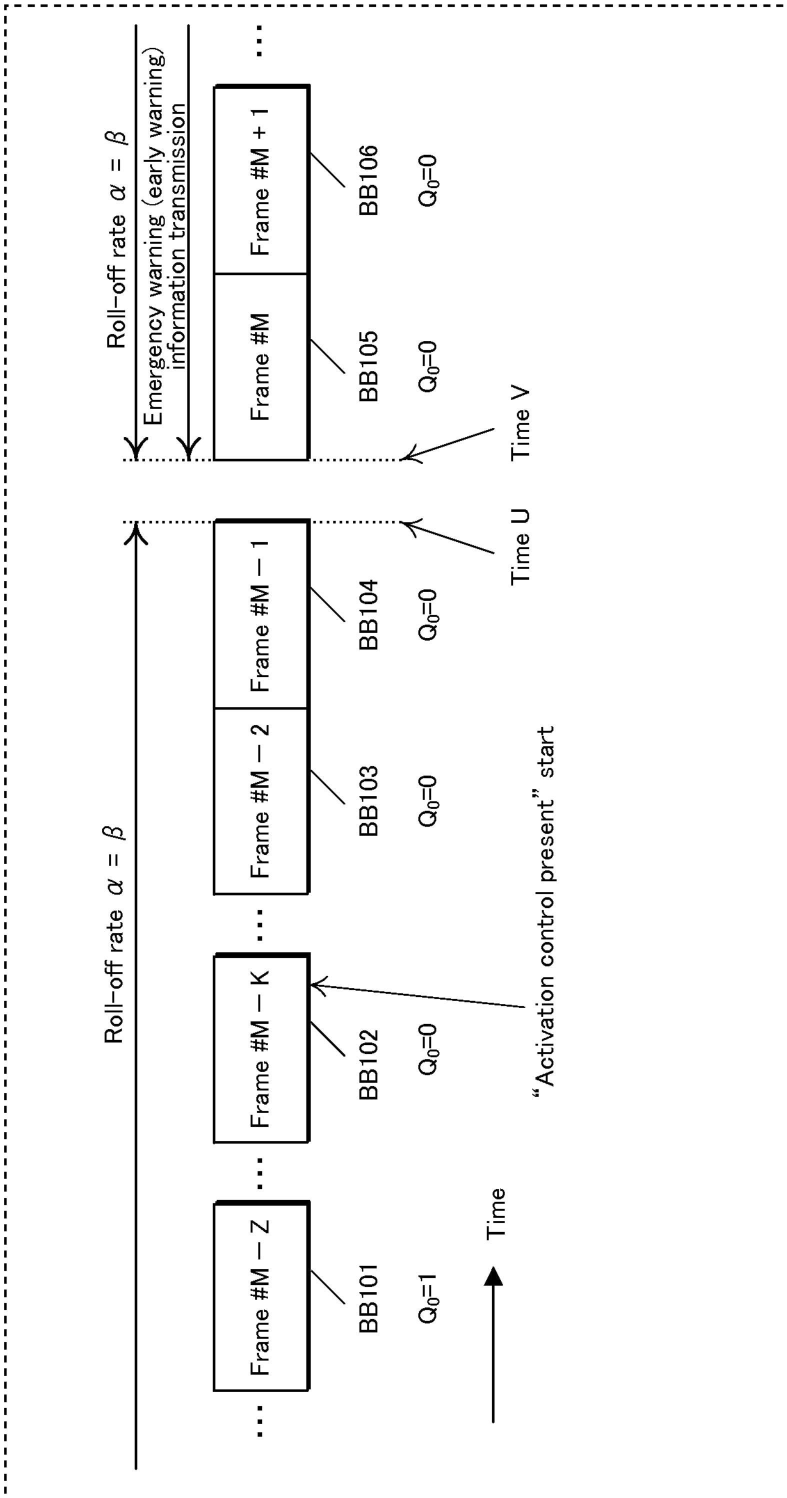
FIG. 80 illustrates a frame configuration when an "emergency warning (early warning)" is performed.

FIG. 79 and FIG. 80 illustrate different frames than FIG. 77. States of $Q_0$ are also shown for each frame. A point of difference from FIG. 77 in FIG. 79 and FIG. 80 is that there is an interruption of emergency warning broadcasting while information is being transmitted at roll-off rate α=β.

In FIG. 79 and FIG. 80, for frame # M (BB105), roll-off rate α=β, and for frames prior to frame # M (BB105), roll-off rate is also β. Here, emergency warning (early warning) information including electronic message information, and/or video or still image information, and/or graphic information, and/or audio information is assumed to be transmitted in frame # M (BB105).

Frame # M−Z (BB101) is a frame Z frames prior to frame # M (BB105), for which roll-off rate α=β. (Z is an integer equal to or greater than K+1.)

Frame # M−K (BB102) is a frame K frames prior to frame # M (BB105), for which roll-off rate α=β.

Frame # M−2 (BB103) is a frame two frames prior to frame # M (BB105), for which roll-off rate α=β.

Frame # M−1 (BB104) is a frame one frame prior to frame # M (BB105), for which roll-off rate α=β.

Here, emergency warning (early warning) information including electronic message information, and/or video or still image information, and/or graphic information, and/or audio information is assumed to be transmitted in frame # M+1 (BB106), for which roll-off rate α=β.

Configuration of each frame is as described in embodiment AA, and each frame may be constructed as illustrated in FIG. 11.

In FIG. 79 and FIG. 80, as in FIG. 77, a transmit station transmits emergency warning (early warning) information including electronic message information, and/or video or still image information, and/or graphic information, and/or audio information in frames at roll-off rate α=β. Thus, a reception device can reliably receive emergency warning (early warning) information including electronic message information, and/or video or still image information, and/or graphic information, and/or audio information, and therefore an effect is achieved of improving the probability of ensuring a user's safety.

Next, a method of transmitting control information such as TMCC is described.

A transmit station (ground station) is here assumed to transmit $Q_0$ as a portion of TMCC information. Table 25 illustrates correspondence between $Q_0$ and an emergency warning broadcast activation flag.

In FIG. 79 and FIG. 80, as illustrated, a transmit station changes the $Q_0$ that is a portion of the TMCC of frame # M−K (BB102) to "0". (In frame # M−K−1, $Q_0$ is "1", and $Q_0$ is also assumed to be "1" in previous frames.) Thus, when F is an integer equal to or greater than MK, $Q_0$ is assumed to be set to "1" in frame # F.

Here, as described above, in FIG. 79 and FIG. 80, emergency warning (early warning) information including electronic message information, and/or video or still image information, and/or graphic information, and/or audio information is transmitted in frame # M (BB105), and emergency warning (early warning) information including electronic message information, and/or video or still image information, and/or graphic information, and/or audio information is also transmitted in subsequent frames.

FIG. 79 illustrates an example in which an end time of frame # M−1 (BB104) and a start time of frame # M (BB105) match. FIG. 80 illustrates an example in which an end time of frame # M−1 (BB105) and a start time of frame # M (BB105) do not match, but in symbols between time U and time V, ramp-up, ramp-down, and guard intervals may be present as described in embodiment AA, for example. Other symbols may be inserted between time U and time V (for example, a symbol for transmitting control information, a pilot symbol, a reference symbol, preamble, a symbol for performing synchronization, a symbol for a receiver to detect a signal, a symbol for determining frequency offset, a symbol for determining phase, etc.). This is a point of difference between FIG. 79 and FIG. 80, and a transmit station may transmit by using either method.

Next, receiver operation is described when a transmit station transmits frames as illustrated in FIG. 79 and FIG. 80.

FIG. 78 illustrates an example of configuration of a reception device. In FIG. 78, operations that are similar to FIG. 75 are assigned the same reference sign and description thereof is omitted.

When receiving frame # M−1 (BB104) of FIG. 79 or FIG. 80, and previous frames, roll-off rate α is set to β in the bandlimiting filter AA303.

When a reception device receives frame # M−Z of FIG. 79 or FIG. 80 (when Z is an integer greater than or equal to K+1), the control information estimator (TMCC information estimator) AA319 obtains control information (TMCC information) of frame # M−Z from the post-bandlimiting baseband signal AA304 that is inputted thereto. Thus, $Q_0$ is obtained from the control information (TMCC information). Because $Q_0$="1", the reception device determines that there is no activation of an emergency warning broadcast, and therefore de-mapping, de-interleaving, and error correction decoding processing is performed, obtaining receive data AA310. (The de-mapper AA305, the synchronization and channel estimator AA317, and the control information estimator (TMCC information estimator) AA319 perform each process with respect to a post-bandlimiting baseband signal.)

When a reception device receives frame # M−K (BB102) of FIG. 79 or FIG. 80, the control information estimator (TMCC information estimator) AA319 obtains control information (TMCC information) of frame # M−K from the post-bandlimiting baseband signal AA304 that is inputted thereto. Thus, $Q_0$ is obtained from the control information (TMCC information). Because $Q_0$="0", the reception device determines that there is activation of an emergency warning broadcast. In frame # M−K−1 and previous frames, $Q_0$="1", and in frame # M−K, $Q_0$="0" for the first time. Accordingly, from frame # M−K+1, which is the next frame after frame # M−K, emergency warning (early warning) information may be broadcast. (However, even if emergency warning (early warning) information is broadcast in frame # M−K there is no problem with receiver operation; in such a case, the reception device can obtain emergency warning (early warning) information including electronic message information, and/or video or still image information, and/or graphic information, and/or audio information by receiving frame # M−K.)

As described above, the present embodiment discloses "a transmission method, reception method, transmission device, and reception device for setting a roll-off rate of the bandlimiting filter described in embodiment AA to β (setting a value of the roll-off rate) when transmitting emergency warning (early warning) information including electronic message information, and/or video or still image information, and/or graphic information, and/or audio information". Thus, the bandlimiting filter BB201 of FIG. 78 is a bandlimiting filter for receiving emergency warning broadcasts, and therefore a roll-off rate thereof is β.

The bandlimiting filter BB201 of FIG. 78 receives the control information AA320 and the baseband signal AA302 as input, performs bandlimiting filter signal processing for baseband signals corresponding to frame # M−K+1 and subsequent frames, based on $Q_0$ information included in control information AA320, and outputs a post-bandlimiting baseband signal BB202 at a roll-off rate β.

The emergency warning broadcast synchronizer BB203 in FIG. 78 receives the control information AA320 and the post-bandlimiting baseband signal BB202 at roll-off rate β as input, performs processing such as frame synchronization, time synchronization, and symbol synchronization for the post-bandlimiting baseband signal BB202 at roll-off rate β, based on $Q_0$ information included in the control information AA320, and outputs a synchronization signal BB204 including information indicating whether or not synchronization is achieved.

When frames are as illustrated in FIG. 79 or FIG. 80, $Q_0$="0" in frame # M−K, and a transmit station also transmits $Q_0$="0" information in subsequent frames, i.e., frame # M−K+1, frame # M−K+2, . . . , frame # M−1, frame # M, frame # M+1, . . . . Further, transmission of emergency warning (early warning) information begins from frame # M.

For frame # M−K+1 to frame # M−1, the emergency warning broadcast synchronizer BB203 in FIG. 78 receives the control information AA320 and the post-bandlimiting baseband signal BB202 at roll-off rate β as input, and frame synchronization, time synchronization, and symbol synchronization can be achieved by using the post-bandlimiting baseband signal BB202 at roll-off rate β. Accordingly, the emergency warning broadcast synchronizer BB203 of FIG. 78 outputs a synchronization signal BB204 indicating that synchronization is achieved. However, in frame # M−K+1 to frame # M−1, emergency warning (early warning) information is not transmitted.

The de-mapper AA305 in FIG. 78 receives the post-bandlimiting baseband signal AA304, the post-bandlimiting baseband signal BB202, the synchronization signal BB204, the synchronization and channel estimation signal AA318, and the control signal AA320 as input, performs de-mapping of the post-bandlimiting baseband signal BB202 at roll-off rate β, as synchronization is achieved for frame # M−K+1 to frame # M−1, and outputs a log-likelihood ratio signal AA306. (However, in frame # M−K+1 to frame # M−1, emergency warning (early warning) information is not transmitted.)

For frame # M (BB105), the emergency warning broadcast synchronizer BB203 in FIG. 78 receives the control information AA320 and the post-bandlimiting baseband signal BB202 at roll-off rate β as input and outputs the synchronization signal BB204 indicating that synchronization is achieved, as frame synchronization, time synchronization, and symbol synchronization can be achieved by using the post-bandlimiting baseband signal BB202 at roll-off rate β.

For frame # M+1 (BB106) and subsequent frames, the emergency warning broadcast synchronizer BB203 in FIG. 78 receives the control information AA320 and the post-bandlimiting baseband signal BB202 at roll-off rate β as input and outputs the synchronization signal BB204 indicating that synchronization is achieved, as frame synchronization, time synchronization, and symbol synchronization can be achieved by using the post-bandlimiting baseband signal BB202 at roll-off rate β.

The de-mapper AA305 in FIG. 78 receives the post-bandlimiting baseband signal AA304, the post-bandlimiting baseband signal BB202, the synchronization signal BB204, the synchronization and channel estimation signal AA318, and the control signal AA320 as input, performs de-mapping of the post-bandlimiting baseband signal BB202 at roll-off rate β, as synchronization is achieved for frame # M (BB105) and subsequent frames, and outputs a log-likelihood ratio signal AA306. (Emergency warning (early warning) information is transmitted in frame # M (BB105) and subsequent frames.)

The synchronization and channel estimator AA317 in FIG. 78 receives the post-bandlimiting baseband signal AA304, the post-bandlimiting baseband signal BB202 at roll-off rate β, and the synchronization signal BB204 as input, performs time synchronization, frequency synchronization, and channel estimation by using the post-bandlimiting baseband signal BB202 at roll-off rate β, as synchronization is achieved for frame # M−K+1 to frame # M−1, and outputs a synchronization and channel estimation signal AA318.

The synchronization and channel estimator AA317 in FIG. 78 receives the post-bandlimiting baseband signal AA304, the post-bandlimiting baseband signal BB202 at roll-off rate β, and the synchronization signal BB204 as input, performs time synchronization, frequency synchronization, and channel estimation by using the post-bandlimiting baseband signal BB202 at roll-off rate β, as synchronization is achieved for frame # M (BB105) and subsequent frames, and outputs a synchronization and channel estimation signal AA318.

Example 3

Figure 81:
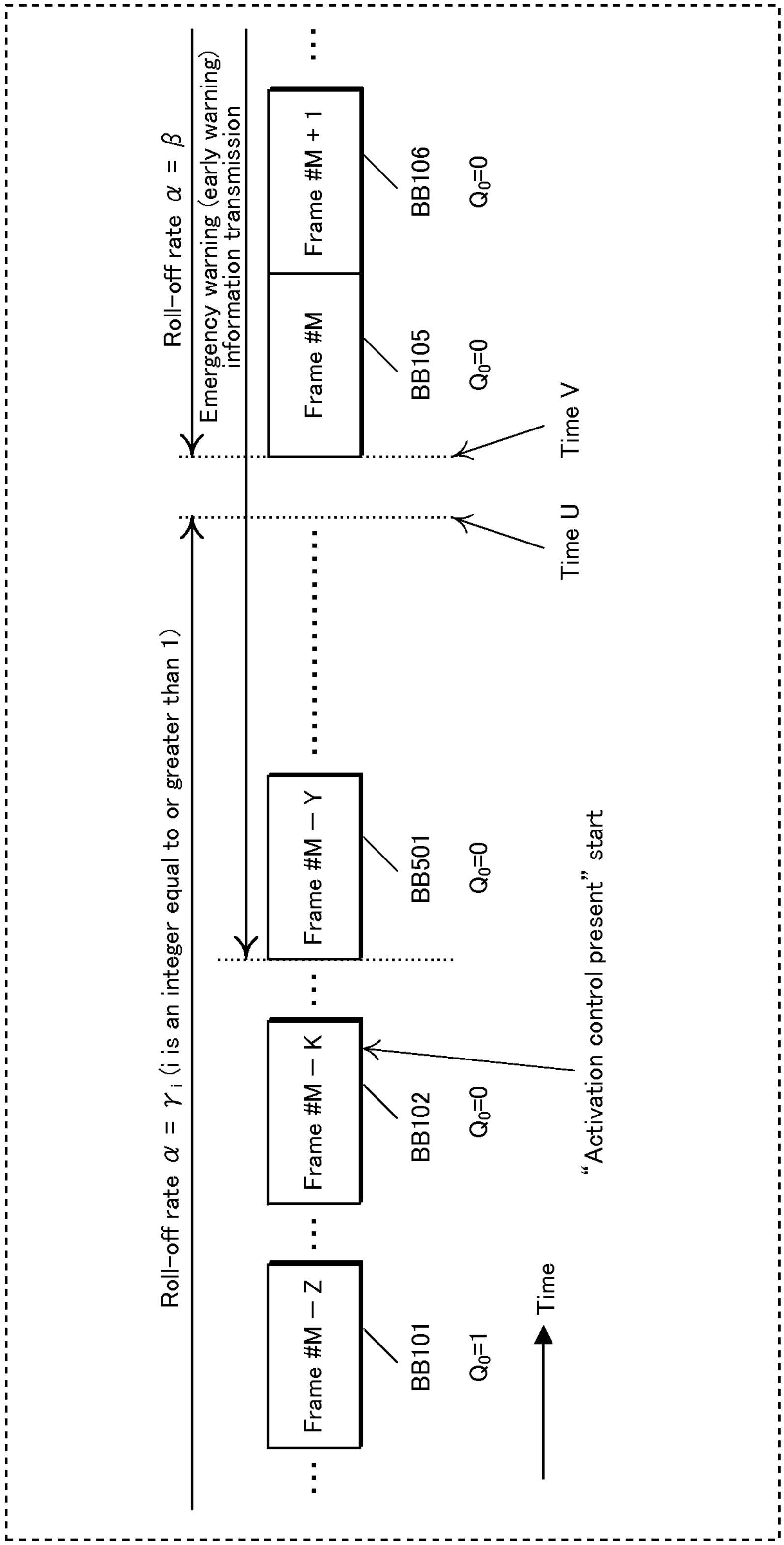
FIG. 81 illustrates a frame configuration when an "emergency warning (early warning)" is performed.

FIG. 81 illustrates a state of frames on a time axis when there is an interruption such as an emergency warning broadcast while a transmit station (ground station) is transmitting frames by using a roll-off rate $\alpha=\gamma_i$ (i being an integer equal to or greater than one). States of $Q_0$ are also shown for each frame.

Note that j is an integer equal to or greater than one, and to satisfy this condition $\gamma_i\neq\beta$ for all values of j. Further, j and k are integers equal to or greater than one, j≠k, and to satisfy this condition $\gamma_j\neq\gamma_k$ for all values of j and all values of k.

In FIG. 81, for frame # M (BB105), roll-off rate α=β, and for frames prior to frame # M (BB105), roll-off rate $\alpha=\gamma_i$. Here, emergency warning (early warning) information including electronic message information, and/or video or still image information, and/or graphic information, and/or audio information is assumed to be transmitted in frame # M (BB105).

Frame # M−Z (BB101) is a frame Z frames prior to frame # M (BB105), for which roll-off rate $\alpha=\gamma_i$. (Z is an integer equal to or greater than K+1.)

Frame # M−K (BB102) is a frame K frames prior to frame # M (BB105), for which roll-off rate $\alpha=\gamma_i$.

Frame # M−Y (BB501) is a frame Y frames prior to frame # M (BB105), for which roll-off rate $\alpha=\gamma_i$. Here, frame # M−Y (BB501) is a frame in which emergency warning (early warning) information including electronic message information, and/or video or still image information, and/or graphic information, and/or audio information begins. Y is an integer from one to K.

Frame # MX is a frame X frames prior to frame # M (BB105), for which roll-off rate $\alpha=\gamma_i$. Here, emergency warning (early warning) information including electronic message information, and/or video or still image information, and/or graphic information, and/or audio information is assumed to be transmitted in frame # MX. X is an integer from one to Y.

Here, emergency warning (early warning) information including electronic message information, and/or video or still image information, and/or graphic information, and/or audio information is assumed to be transmitted in frame # M+1 (BB106), for which roll-off rate $\alpha=\beta$.

Configuration of each frame is as described in embodiment AA, and each frame may be constructed as illustrated in FIG. 11.

A feature illustrated in FIG. 81 is that while a transmission device is transmitting emergency warning (early warning) information including electronic message information, and/or video or still image information, and/or graphic information, and/or audio information by using frames at roll-off rate $\alpha=\beta$, emergency warning (early warning) information including electronic message information, and/or video or still image information, and/or graphic information, and/or audio information can be received even at other roll-off rates, and therefore an effect is achieved of improving the probability of ensuring a user's safety.

Next, a method of transmitting control information such as TMCC is described.

A transmit station (ground station) is here assumed to transmit $Q_0$ as a portion of TMCC information. Table 25 illustrates correspondence between $Q_0$ and an emergency warning broadcast activation flag.

In FIG. 81, as illustrated, a transmit station changes the $Q_0$ that is a portion of the TMCC of frame # M−K (BB102) to "0". (In frame # M−K−1, $Q_0$ is "1", and $Q_0$ is also assumed to be "1" in previous frames.) Thus, when F is an integer equal to or greater than MK, $Q_0$ is assumed to be set to "1" in frame # F.

Here, as described above, in FIG. 81, emergency warning (early warning) information including electronic message information, and/or video or still image information, and/or graphic information, and/or audio information is transmitted in frame # M−Y (BB501), and emergency warning (early warning) information including electronic message information, and/or video or still image information, and/or graphic information, and/or audio information is also transmitted in subsequent frames.

In frame 81, an end time of frame # M−1 (BB104) and a start time of frame # M (BB105) do not match, and this is because roll-off rate changes, as described in embodiment AA. In symbols between time U and time V, ramp-up, ramp-down, and guard intervals may be present as described in embodiment AA, for example. Other symbols may be inserted between time U and time V (for example, a symbol for transmitting control information, a pilot symbol, a reference symbol, preamble, a symbol for performing synchronization, a symbol for a receiver to detect a signal, a symbol for determining frequency offset, a symbol for determining phase, etc.).

Next, receiver operation is described when a transmit station transmits frames as illustrated in FIG. 81.

FIG. 78 illustrates an example of configuration of a reception device. In FIG. 78, operations that are similar to FIG. 75 are assigned the same reference sign and description thereof is omitted.

When receiving frame # M−1 (BB104) of FIG. 81 and previous frames, roll-off rate $\alpha$ is set to $\gamma_i$ in the bandlimiting filter AA303.

When a reception device receives frame # M−Z of FIG. 81 (when Z is an integer greater than or equal to K+1), the control information estimator (TMCC information estimator) AA319 obtains control information (TMCC information) of frame # M−Z from the post-bandlimiting baseband signal AA304 that is inputted thereto. Thus, $Q_0$ is obtained from the control information (TMCC information). Because $Q_0$="1", the reception device determines that there is no activation of an emergency warning broadcast, and therefore de-mapping, de-interleaving, and error correction decoding processing is performed, obtaining receive data AA310 (the de-mapper AA305, the synchronization and channel estimator AA317, and the control information estimator (TMCC information estimator) AA319 perform each process with respect to a post-bandlimiting baseband signal).

When a reception device receives frame # M−K (BB102) of FIG. 81, the control information estimator (TMCC information estimator) AA319 obtains control information (TMCC information) of frame # M−K from the post-bandlimiting baseband signal AA304 that is inputted thereto. Thus, $Q_0$ is obtained from the control information (TMCC information). Because $Q_0$="0", the reception device determines that there is activation of an emergency warning broadcast. In frame # M−K−1 and previous frames, $Q_0$="1", and in frame # M−K, $Q_0$="0" for the first time. Accordingly, from frame # M−K+1, which is the next frame after frame # M−K, emergency warning (early warning) information may be broadcast. (However, even if emergency warning (early warning) information is broadcast in frame # M−K there is no problem with receiver operation; in such a case, the reception device can obtain emergency warning (early warning) information including electronic message information, and/or video or still image information, and/or graphic information, and/or audio information by receiving frame # M−K.)

In the present example, unlike (Example 1), roll-off rate is $\gamma_i$, and emergency warning (early warning) information including electronic message information, and/or video or still image information, and/or graphic information, and/or audio information is transmitted from frame # M−K (BB102) and subsequent frames. (However, emergency warning (early warning) information including electronic message information, and/or video or still image information, and/or graphic information, and/or audio information is also assumed to be transmitted in frames at roll-off rate $\beta$.)

In the present example, "emergency warning (early warning) information including electronic message information, and/or video or still image information, and/or graphic information, and/or audio information may also be transmitted in frames at roll-off rate $\beta$". The bandlimiting filter BB201 of FIG. 78 is a bandlimiting filter for receiving emergency warning broadcasts, and therefore a roll-off rate thereof is $\beta$.

Further, a roll-off rate used when a transmit station transmits frame # M−K+1 may be $\beta$. (Because $Q_0$="0" for the first time in frame # M−K (BB102.)

Accordingly, the bandlimiting filter BB201 of FIG. 78 receives the control information AA320 and the baseband signal AA302 as input, performs bandlimiting filter signal processing for baseband signals corresponding to frame # M−K+1 and subsequent frames, based on $Q_0$ information included in control information AA320, and outputs a post-bandlimiting baseband signal BB202 at roll-off rate $\beta$.

The emergency warning broadcast synchronizer BB203 in FIG. 78 receives the control information AA320 and the post-bandlimiting baseband signal BB202 at roll-off rate $\beta$ as input, performs processing such as frame synchronization, time synchronization, and symbol synchronization for the post-bandlimiting baseband signal BB202 at roll-off rate $\beta$, based on $Q_0$ information included in the control information AA320, and outputs a synchronization signal BB204 including information indicating whether or not synchronization is achieved.

When frames are as illustrated in FIG. 81, $Q_0$="0" in frame # M−K, and a transmit station also transmits $Q_0$="0"

information in subsequent frames, i.e., frame # M−K+1, frame # M−K+2, . . . , frame # M−1, frame # M, frame # M+1, . . . . Further, transmission of emergency warning (early warning) information begins from frame # M−Y.

For frame # M−K+1 to frame # M−1, the emergency warning broadcast synchronizer BB203 in FIG. 78 receives the control information AA320 and the post-bandlimiting baseband signal BB202 at roll-off rate β as input, and outputs a synchronization signal BB204 indicating that synchronization is not achieved, as frame synchronization, time synchronization, and symbol synchronization cannot be achieved by using the post-bandlimiting baseband signal BB202 at roll-off rate β.

For frame # M (BB105), the emergency warning broadcast synchronizer BB203 in FIG. 78 receives the control information AA320 and the post-bandlimiting baseband signal BB202 at roll-off rate β as input and outputs the synchronization signal BB204 indicating that synchronization is achieved, as frame synchronization, time synchronization, and symbol synchronization can be achieved by using the post-bandlimiting baseband signal BB202 at roll-off rate β.

For frame # M+1 (BB106) and subsequent frames, the emergency warning broadcast synchronizer BB203 in FIG. 78 receives the control information AA320 and the post-bandlimiting baseband signal BB202 at roll-off rate β as input and outputs the synchronization signal BB204 indicating that synchronization is achieved, as frame synchronization, time synchronization, and symbol synchronization can be achieved by using the post-bandlimiting baseband signal BB202 at roll-off rate β.

The de-mapper AA305 in FIG. 78 receives the post-bandlimiting baseband signal AA304, the post-bandlimiting baseband signal BB202, the synchronization signal BB204, the synchronization and channel estimation signal AA318, and the control signal AA320 as input, performs de-mapping of the post-bandlimiting baseband signal BB202 at roll-off rate β, as synchronization is achieved for frame # M (BB105) and subsequent frames, and outputs a log-likelihood ratio signal AA306. (Thus, emergency warning (early warning) information including electronic message information, and/or video or still image information, and/or graphic information, and/or audio information can be obtained.)

Note that the de-mapper AA305 in FIG. 78, as synchronization is not achieved for frame # M−1 and previous frames, performs de-mapping of the post-bandlimiting baseband signal AA304 and outputs a log-likelihood ratio signal AA306. Note that emergency warning (early warning) information including electronic message information, and/or video or still image information, and/or graphic information, and/or audio information can be obtained from frames from frame # M−Y to frame # M−1.

The synchronization and channel estimator AA317 in FIG. 78 receives the post-bandlimiting baseband signal AA304, the post-bandlimiting baseband signal BB202 at roll-off rate β, and the synchronization signal BB204 as input, performs time synchronization, frequency synchronization, and channel estimation by using the post-bandlimiting baseband signal BB202 at roll-off rate β, as synchronization is achieved for frame # M (BB105) and subsequent frames, and outputs a synchronization and channel estimation signal AA318.

Note that the synchronization and channel estimator AA317 in FIG. 78, as synchronization is not achieved for frame # M−1 and previous frames, performs time synchronization, frequency synchronization, and channel estimation by using the post-bandlimiting baseband signal AA304, and outputs a synchronization and channel estimation signal AA318.

Example 4

Figure 82:
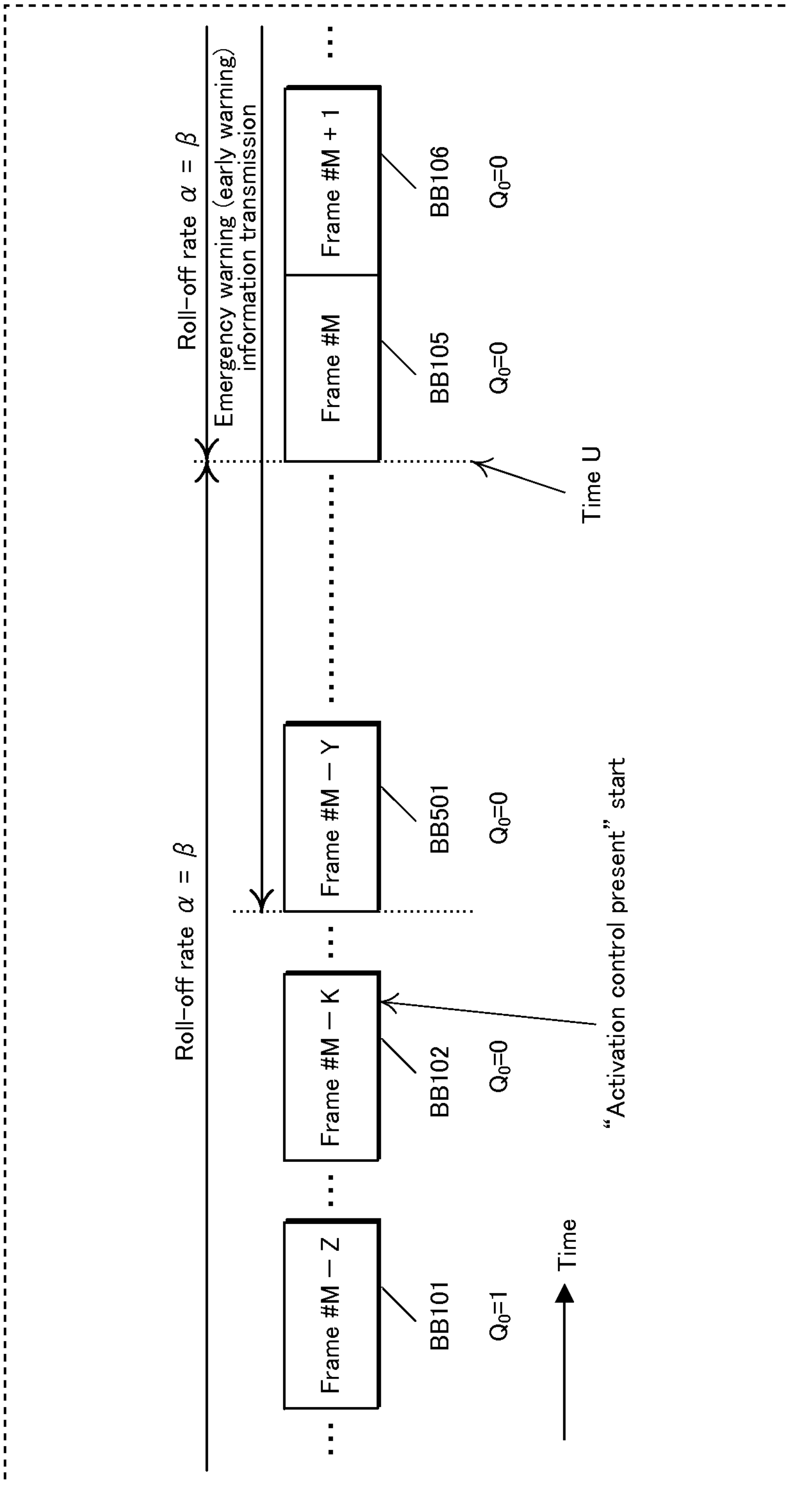
FIG. 82 illustrates a frame configuration when an "emergency warning (early warning)" is performed.
Figure 83:
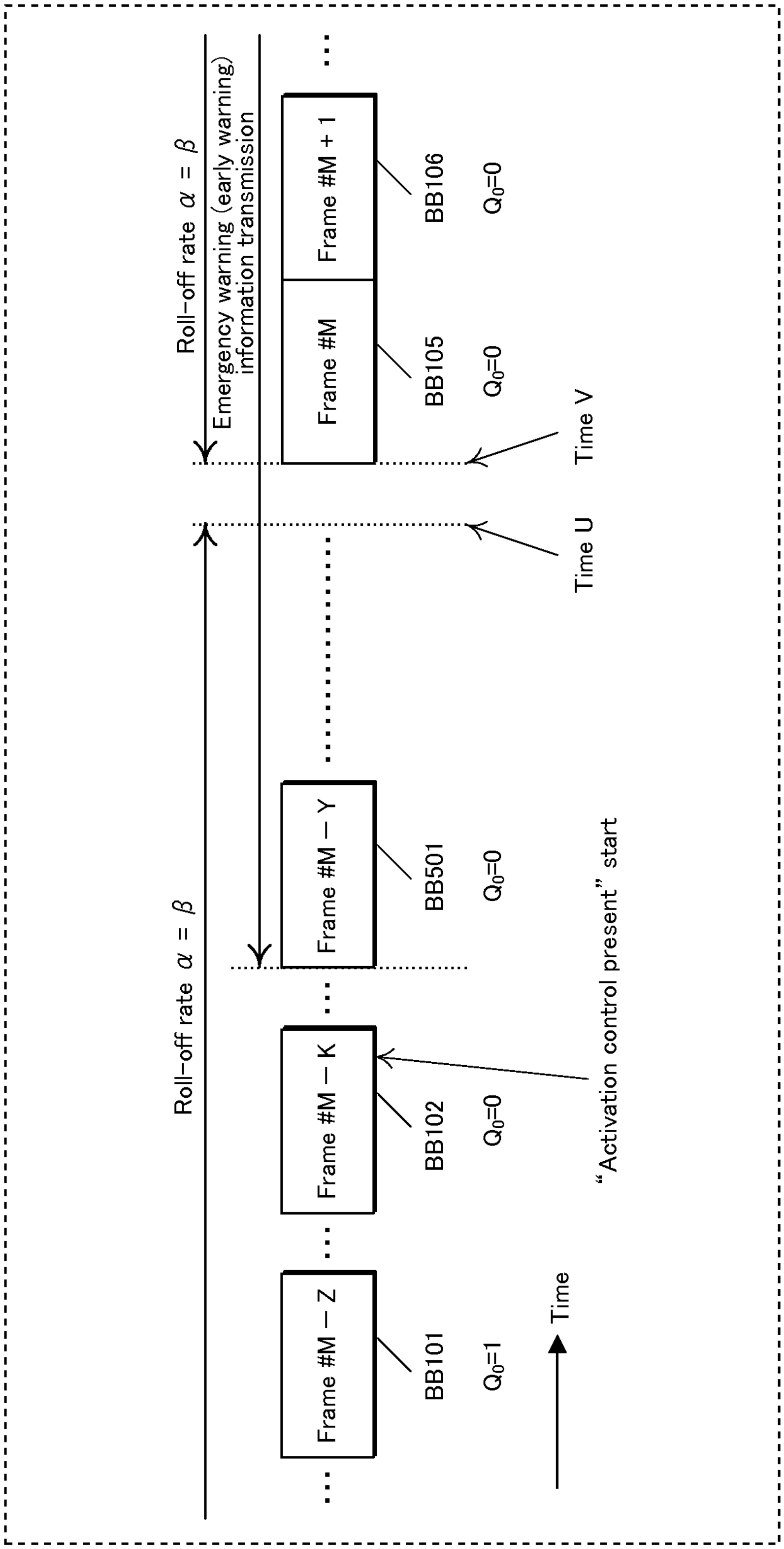
FIG. 83 illustrates a frame configuration when an "emergency warning (early warning)" is performed.

FIG. 82 and FIG. 83 illustrate different frames than FIG. 81. States of $Q_0$ are also shown for each frame. A point of difference from FIG. 81 in FIG. 82 and FIG. 83 is that there is an interruption of emergency warning broadcasting while information is being transmitted at roll-off rate α=β.

In FIG. 82 and FIG. 83, for frame # M (BB105), roll-off rate α=β, and for frames prior to frame # M (BB105), roll-off rate is also β. Here, emergency warning (early warning) information including electronic message information, and/or video or still image information, and/or graphic information, and/or audio information is assumed to be transmitted in frame # M (BB105).

Frame # M−Z (BB101) is a frame Z frames prior to frame # M (BB105), for which roll-off rate α=β. (Z is an integer equal to or greater than K+1.)

Frame # M−K (BB102) is a frame K frames prior to frame # M (BB105), for which roll-off rate α=β.

Frame # M−Y (BB501) is a frame Y frames prior to frame # M (BB105), for which roll-off rate α=β. Here, frame # M−Y (BB501) is a frame in which emergency warning (early warning) information including electronic message information, and/or video or still image information, and/or graphic information, and/or audio information begins. Y is an integer from one to K.

Frame # MX is a frame X frames prior to frame # M (BB105), for which roll-off rate α=β. Here, emergency warning (early warning) information including electronic message information, and/or video or still image information, and/or graphic information, and/or audio information is assumed to be transmitted in frame # MX. X is an integer from one to Y.

Here, emergency warning (early warning) information including electronic message information, and/or video or still image information, and/or graphic information, and/or audio information is assumed to be transmitted in frame # M+1 (BB106), for which roll-off rate α=β.

Configuration of each frame is as described in embodiment AA, and each frame may be constructed as illustrated in FIG. 11.

In FIG. 82 and FIG. 83, as in FIG. 81, a transmit station transmits emergency warning (early warning) information including electronic message information, and/or video or still image information, and/or graphic information, and/or audio information in frames at roll-off rate α=β. Thus, a reception device can reliably receive emergency warning (early warning) information including electronic message information, and/or video or still image information, and/or graphic information, and/or audio information, and therefore an effect is achieved of improving the probability of ensuring a user's safety.

Next, a method of transmitting control information such as TMCC is described.

A transmit station (ground station) is here assumed to transmit $Q_0$ as a portion of TMCC information. Table 25 illustrates correspondence between $Q_0$ and an emergency warning broadcast activation flag.

In FIG. 82 and FIG. 83, as illustrated, a transmit station changes the $Q_0$ that is a portion of the TMCC of frame # M−K (BB102) to "0". (In frame # M−K−1, $Q_0$ is "1", and $Q_0$ is also assumed to be "1" in previous frames.) Thus, when F is an integer equal to or greater than MK, $Q_0$ is assumed to be set to "1" in frame # F.

(Thus, as described above, in FIG. 82 and FIG. 83, emergency warning (early warning) information including electronic message information, and/or video or still image information, and/or graphic information, and/or audio information is transmitted in frame # M−Y (BB501), and emergency warning (early warning) information including electronic message information, and/or video or still image information, and/or graphic information, and/or audio information is also transmitted in subsequent frames.

FIG. 82 illustrates an example in which an end time of frame # M−1 (BB104) and a start time of frame # M (BB105) match. In FIG. 83, the end time of frame # M−1 (BB104) and the start time of frame # M (BB105) do not match, but in symbols between time U and time V, ramp-up, ramp-down, and guard intervals may be present as described in embodiment AA, for example. Other symbols may be inserted between time U and time V (for example, a symbol for transmitting control information, a pilot symbol, a reference symbol, preamble, a symbol for performing synchronization, a symbol for a receiver to detect a signal, a symbol for determining frequency offset, a symbol for determining phase, etc.). This is a point of difference between FIG. 82 and FIG. 83, and a transmit station may transmit by using either method.

Next, receiver operation is described when a transmit station transmits frames as illustrated in FIG. 82 and FIG. 83.

FIG. 78 illustrates an example of configuration of a reception device. In FIG. 78, operations that are similar to FIG. 75 are assigned the same reference sign and description thereof is omitted.

When receiving frame # M−1 (BB104) of FIG. 82 or FIG. 83, and previous frames, roll-off rate α is set to β in the bandlimiting filter AA303.

When a reception device receives frame # M−Z of FIG. 82 or FIG. 83 (when Z is an integer greater than or equal to K+1), the control information estimator (TMCC information estimator) AA319 obtains control information (TMCC information) of frame # M−Z from the post-bandlimiting baseband signal AA304 that is inputted thereto. Thus, $Q_0$ is obtained from the control information (TMCC information). Because $Q_0$="1", the reception device determines that there is no activation of an emergency warning broadcast, and therefore de-mapping, de-interleaving, and error correction decoding processing is performed, obtaining receive data AA310. (The de-mapper AA305, the synchronization and channel estimator AA317, and the control information estimator (TMCC information estimator) AA319 perform each process with respect to a post-bandlimiting baseband signal.)

When a reception device receives frame # M−K (BB102) of FIG. 82 or FIG. 83, the control information estimator (TMCC information estimator) AA319 obtains control information (TMCC information) of frame # M−K from the post-bandlimiting baseband signal AA304 that is inputted thereto. Thus, $Q_0$ is obtained from the control information (TMCC information). Because $Q_0$="0", the reception device determines that there is activation of an emergency warning broadcast. In frame # M−K−1 and previous frames, $Q_0$="1", and in frame # M−K, $Q_0$="0" for the first time. Accordingly, from frame # M−K+1, which is the next frame after frame # M−K, emergency warning (early warning) information may be broadcast. (However, even if emergency warning (early warning) information is broadcast in frame # M−K there is no problem with receiver operation; in such a case, the reception device can obtain emergency warning (early warning) information including electronic message information, and/or video or still image information, and/or graphic information, and/or audio information by receiving frame # M−K.)

As described above, the present embodiment discloses "a transmission method, reception method, transmission device, and reception device for setting a roll-off rate of the bandlimiting filter described in embodiment AA to β (setting a value of the roll-off rate) when transmitting emergency warning (early warning) information including electronic message information, and/or video or still image information, and/or graphic information, and/or audio information". The bandlimiting filter BB201 of FIG. 78 is a bandlimiting filter for receiving emergency warning broadcasts, and therefore a roll-off rate thereof is β.

The bandlimiting filter BB201 of FIG. 78 receives the control information AA320 and the baseband signal AA302 as input, performs bandlimiting filter signal processing for baseband signals corresponding to frame # M−K+1 and subsequent frames, based on $Q_0$ information included in control information AA320, and outputs a post-bandlimiting baseband signal BB202 at roll-off rate β.

The emergency warning broadcast synchronizer BB203 in FIG. 78 receives the control information AA320 and the post-bandlimiting baseband signal BB202 at roll-off rate β as input, performs processing such as frame synchronization, time synchronization, and symbol synchronization for the post-bandlimiting baseband signal BB202 at roll-off rate β, based on $Q_0$ information included in the control information AA320, and outputs a synchronization signal BB204 including information indicating whether or not synchronization is achieved.

When frames are as illustrated in FIG. 82 or FIG. 83, $Q_0$="0" in frame # M−K, and a transmit station also transmits $Q_0$="0" information in subsequent frames, i.e., frame # M−K+1, frame # M−K+2, . . . , frame # M−1, frame # M, frame # M+1, . . . . Further, transmission of emergency warning (early warning) information begins from frame # M−Y.

For frame # M−K+1 to frame # M−Y−1, the emergency warning broadcast synchronizer BB203 in FIG. 78 receives the control information AA320 and the post-bandlimiting baseband signal BB202 at roll-off rate β as input, and frame synchronization, time synchronization, and symbol synchronization can be achieved by using the post-bandlimiting baseband signal BB202 at roll-off rate β. Accordingly, the emergency warning broadcast synchronizer BB203 of FIG. 78 outputs a synchronization signal BB204 indicating that synchronization is achieved. However, in frame # M−K+1 to frame # M−Y−1, emergency warning (early warning) information is not transmitted.

The de-mapper AA305 in FIG. 78 receives the post-bandlimiting baseband signal AA304, the post-bandlimiting baseband signal BB202, the synchronization signal BB204, the synchronization and channel estimation signal AA318, and the control signal AA320 as input, performs de-mapping of the post-bandlimiting baseband signal BB202 at roll-off rate β, as synchronization is achieved for frame # M−K+1 to frame # M−Y−1, and outputs a log-likelihood ratio signal AA306. (However, in frame # M−K+1 to frame # M−Y−1, emergency warning (early warning) information is not transmitted.)

For frame # M−Y (BB501), the emergency warning broadcast synchronizer BB203 in FIG. 78 receives the control information AA320 and the post-bandlimiting baseband signal BB202 at roll-off rate β as input and outputs the synchronization signal BB204 indicating that synchronization is achieved, as frame synchronization, time synchronization, and symbol synchronization can be achieved by using the post-bandlimiting baseband signal BB202 at roll-off rate β.

For frame # M−Y+1 and subsequent frames, the emergency warning broadcast synchronizer BB203 in FIG. 78 receives the control information AA320 and the post-bandlimiting baseband signal BB202 at roll-off rate β as input and outputs the synchronization signal BB204 indicating that synchronization is achieved, as frame synchronization, time synchronization, and symbol synchronization can be achieved by using the post-bandlimiting baseband signal BB202 at roll-off rate β.

The de-mapper AA305 in FIG. 78 receives the post-bandlimiting baseband signal AA304, the post-bandlimiting baseband signal BB202, the synchronization signal BB204, the synchronization and channel estimation signal AA318, and the control signal AA320 as input, performs de-mapping of the post-bandlimiting baseband signal BB202 at roll-off rate β, as synchronization is achieved for frame # M−Y (BB501) and subsequent frames, and outputs a log-likelihood ratio signal AA306. (Emergency warning (early warning) information is transmitted in frame # M−Y (BB501) and subsequent frames.)

The synchronization and channel estimator AA317 in FIG. 78 receives the post-bandlimiting baseband signal AA304, the post-bandlimiting baseband signal BB202 at roll-off rate β, and the synchronization signal BB204 as input, performs time synchronization, frequency synchronization, and channel estimation by using the post-bandlimiting baseband signal BB202 at roll-off rate β, as synchronization is achieved for frame # M−K+1 to frame # M−Y−1, and outputs a synchronization and channel estimation signal AA318.

The synchronization and channel estimator AA317 in FIG. 78 receives the post-bandlimiting baseband signal AA304, the post-bandlimiting baseband signal BB202 at roll-off rate β, and the synchronization signal BB204 as input, performs time synchronization, frequency synchronization, and channel estimation by using the post-bandlimiting baseband signal BB202 at roll-off rate β, as synchronization is achieved for frame # M−Y (BB501) and subsequent frames, and outputs a synchronization and channel estimation signal AA318.

Next, operation of a (terrestrial) transmit station is described. Note that FIG. 7 illustrates configuration of a transmit station and operations of each element are described in other embodiments, and therefore description is omitted here. Details of configuration of the mapper 708 of FIG. 7 are provided in FIG. 10. Note that operations of each element of FIG. 10 are described in other embodiments, and therefore description is omitted here.

The control information generator and mapper 704 receives a control signal as input, performs mapping for transmission of information corresponding to TMCC in the control signal, and outputs a control information signal. The control signal is assumed to include $Q_0$ information shown in Table 25.

The mapper 708 of FIG. 7 receives a control signal as input and switches roll-off rate when switching roll-off rate is required according to the $Q_0$ information included in the control signal. As stated previously, specific configuration of mapper 708 is illustrated in FIG. 10.

Emergency warning (early warning) information including electronic message information, and/or video or still image information, and/or graphic information, and/or audio information is transmitted. Thus, as described in other embodiments, emergency warning (early warning) information including electronic message information, and/or video or still image information, and/or graphic information, and/or audio information may be transmitted by using "extended information" of TMCC or may be transmitted by inclusion in a main broadcast signal (stream).

For frames in FIG. 77, FIG. 79, FIG. 80, FIG. 81, FIG. 82, and FIG. 83, as described above, "configuration of each frame is as described in embodiment AA, and each frame may be constructed as illustrated in FIG. 11", however, frames are not limited in this way. For example, a frame for transmitting emergency warning (early warning) information including electronic message information, and/or video or still image information, and/or graphic information, and/or audio information may be configured as a frame pursuant to "*Transmission System for Digital Satellite Broadcasting*, ARIB Standard STD-B20, Ver. 3.0 or later versions of *Transmission System for Digital Satellite Broadcasting*, ARIB Standard STD-B20". In this case, the roll-off rate used in transmission of emergency warning (early warning) information including electronic message information, and/or video or still image information, and/or graphic information, and/or audio information is 0.35.

Further, frames in which emergency warning (early warning) information including electronic message information, and/or video or still image information, and/or graphic information, and/or audio information is transmitted may be switched in stages.

For example, after $Q_0$="0", emergency warning (early warning) information including electronic message information, and/or video or still image information, and/or graphic information, and/or audio information may be transmitted by a frame as illustrated in FIG. 11 and described in embodiment AA; and subsequently, emergency warning (early warning) information including electronic message information, and/or video or still image information, and/or graphic information, and/or audio information may be transmitted by a frame pursuant to "*Transmission System for Digital Satellite Broadcasting*, ARIB Standard STD-B20, Ver. 3.0 or later versions of *Transmission System for Digital Satellite Broadcasting*, ARIB Standard STD-B20".

As above, a transmit station transmits emergency warning (early warning) information including electronic message information, and/or video or still image information, and/or graphic information, and/or audio information in frames at roll-off rate α=β. Thus, a reception device can reliably receive emergency warning (early warning) information including electronic message information, and/or video or still image information, and/or graphic information, and/or audio information, and therefore an effect is achieved of improving the probability of ensuring a user's safety.

In the present embodiment, an example of a system composed of a transmit station, a repeater, and a terminal is described as in embodiment B, embodiment C, embodiment D, embodiment E, embodiment F, and embodiment G, but a system composed of a transmit station and a terminal may of course be implemented similarly.

Embodiment EE

In embodiment CC and embodiment DD, audio information is described as being selectable as emergency warning (early warning) information. In the present embodiment, a method is described for reliably communicating, when audio information is selected as emergency warning (early warning) information, emergency warning (early warning) information to a user of a reception device (terminal).

TMCC configuration, transmission device configuration, reception device configuration, etc., is as described in embodiment AA, and description thereof is omitted here.

Further, in the present embodiment, as described in embodiment B, embodiment C, embodiment D, embodiment E, embodiment F, and embodiment G, a system composed of a (terrestrial) transmit station, (satellite) repeater, and terminal is described as an example.

As described in embodiment DD and indicated in Table 25, a transmit station (ground station) transmits $Q_0$ as a portion of TMCC information.

In embodiment DD, "a transmit station transmits emergency warning (early warning) information including electronic message information, and/or video or still image information, and/or graphic information, and/or audio information in frames at roll-off rate $\alpha=\beta$", but this is just one example, and for example, a transmission method may be implemented as described below, so that when $Q_0=1$, normal information transmission is performed at roll-off rate $\gamma_i$, and subsequently, when $Q_0=0$, emergency warning (early warning) information is transmitted at roll-off rate $\gamma_i$.

Further, for example, $R_2R_1R_0$ information may be transmitted as a portion of control information such as TMCC, to indicate a format of emergency warning (early warning) information. Correspondence between $R_2R_1R_0$ and emergency warning broadcast information type is indicated in the table below.

TABLE 26

Correspondence between $R_2R_1R_0$ and emergency warning broadcast information type

| $R_2R_1R_0$ | Significance |
|---|---|
| 000 | Electronic message information |
| 001 | Video |
| 010 | Still image |
| 011 | Audio |
| 100-111 | Reserved |

As indicated in Table 26, when $R_2R_1R_0$="000", emergency warning broadcast information is transmitted as electronic message information. Further, when $R_2R_1R_0$="001", emergency warning broadcast information is transmitted as video; when $R_2R_1R_0$="010", emergency warning broadcast information is transmitted as a still image; when $R_2R_1R_0$="011", emergency warning broadcast information is transmitted as audio; and $R_2R_1R_0$="100" to "111" values are reserved.

Further, emergency warning (early warning) information, as an example, is transmitted by using "extended information" of TMCC.

Configuration of a transmit station that transmits control information such as TMCC is, for example, the configuration illustrated in FIG. 7, as described in embodiment DD. Detailed description is provided in other embodiments, and is omitted here.

Next, configuration of a reception device (terminal) is described.

Figure 84:
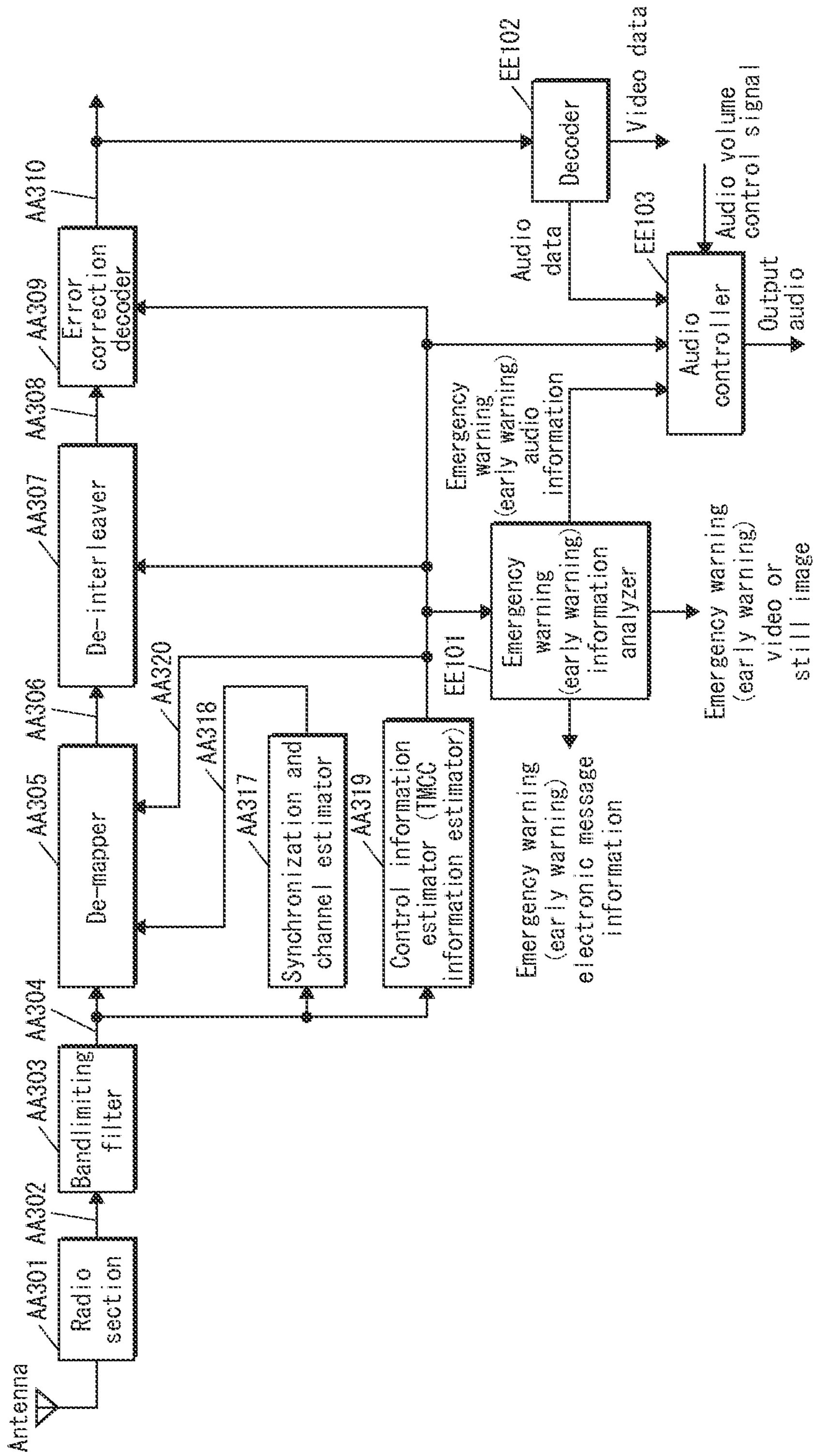
FIG. 84 illustrates an example configuration of a reception device.

FIG. 84 illustrates an example of a reception device configuration, in which operations thereof that are the same as operations performed according to FIG. 78 are assigned the same reference sign and description thereof is omitted.

In FIG. 84, a decoder EE102 is a decoder associated with video and audio, which accepts receive data AA310 as input and outputs audio data and video data.

In FIG. 84, an emergency warning (early warning) information analyzer EE101 receives control information AA320 as input and determines, according to $Q_0$ value, whether emergency warning (early warning) information is being transmitted. In addition, according to $R_2R_1R_0$ values, the emergency warning (early warning) information analyzer EE101 determines a format of emergency warning (emergency value) information; based on this determination, decoding of an electronic message, video, still image or audio is performed; and emergency warning (early warning) electronic message information, emergency warning (early warning) video/still image, or emergency warning (early warning) audio information is generated and outputted, based on emergency warning (early warning) information included in control information AA320.

In FIG. 84, an audio controller EE103 receives an audio volume control signal as input, and can adjust audio volume. Accordingly, audio volume is set to a given value. This value is referred to as G.

The audio controller EE103 of FIG. 84, in addition to an audio volume control signal, receives audio data, emergency warning (early warning) audio information, and control information AA320 as input, and determines whether or not emergency warning (early warning) audio information is present, based on a $Q_0$ value and an $R_2R_1R_0$ value included in the control information AA320. In a case in which emergency warning (early warning) audio information is determined to be present, audio data outputted from the decoder EE102 is muted and audio based on the emergency warning (early warning) audio information is prioritized and outputted as output audio. Output audio is transformed to sound via speakers, earphones, or headphones.

However, other control methods are possible. For example, the following method.

The audio controller EE103 of FIG. 84, in addition to an audio volume control signal, receives audio data, emergency warning (early warning) audio information, and control information AA320 as input, and determines whether or not emergency warning (early warning) audio information is present, based on a $Q_0$ value and an $R_2R_1R_0$ value included in the control information AA320. In a case in which emergency warning (early warning) audio information is determined to be present, audio volume of audio data outputted from the decoder EE102 is set to a volume less than the value G, audio based on the emergency warning (early warning) audio information is prioritized to be louder, and the audio data outputted from the decoder EE102 and the emergency warning (early warning) audio information are outputted as output audio.

As above, by prioritizing the emergency warning (early warning) audio information in the output audio, emergency warning (early warning) information can be reliably communicated to a user of a reception device (terminal), and therefore an effect is achieved of increasing the probability of ensuring safety of the user.

A transmit station, in addition to $Q_0$ and $R_2R_1R_0$, may also transmit "information related to a region that is a subject" of emergency warning (early warning) information, as described in embodiment BB and embodiment CC. Operation in this case is described below.

The audio controller EE103 of FIG. 84, in addition to an audio volume control signal, receives audio data, emergency warning (early warning) audio information, and control information AA320 as input, and determines whether or not emergency warning (early warning) audio information is present, based on a $Q_0$ value and an $R_2R_1R_0$ value included in the control information AA320. In addition, the audio controller EE103 of FIG. 84 obtains "information related to a region that is a subject" of emergency warning (early warning) information included in control information AA320, and determines whether the reception device (terminal) is associated with "a region that is a subject" of emergency warning (early warning) information. (A method of determination is as described in embodiment BB and embodiment CC.) Thus, in a case in which the audio controller EE103 of FIG. 84 determines that emergency warning (early warning) audio information is present and that "a region is a subject" of emergency warning (early warning) information, audio data outputted from the decoder EE102 is muted and audio based on the emergency warning (early warning) audio information is prioritized and outputted as output audio. Output audio is transformed to sound via speakers, earphones, or headphones. As another method, in a case in which the audio controller EE103 of FIG. 84 determines that emergency warning (early warning) audio information is present and that "a region is a subject" of emergency warning (early warning) information, audio volume of audio data outputted from the decoder EE102 is set to a volume less than the value G, audio based on the emergency warning (early warning) audio information is prioritized, and the audio data outputted from the decoder EE102 and the emergency warning (early warning) audio information are outputted as output audio.

In a case in which the audio controller EE103 of FIG. 84 determines that emergency warning (early warning) audio information is present and a region is not a subject, audio data outputted from the decoder EE102 is outputted as output audio.

As above, by performing a control for audio output of emergency warning (early warning) audio information, emergency warning (early warning) information can be reliably communicated to a user of a reception device (terminal), and therefore an effect is achieved of increasing the probability of ensuring safety of the user while also achieving an effect of allowing a user to hear audio of a main broadcast signal (stream), without interruption, when in a region that is not a subject of the emergency warning (early warning) information.

In the above description, electronic message information, video, still image, or audio information for emergency warning (early warning) use is described, but electronic message information, video, still image, or audio information may be transmitted for a purpose other than emergency warning (early warning). However, in such a case, a transmit station may transmit a flag indicating an emergency warning (early warning) as a portion of control information such as TMCC. As one example, a transmit station transmits $S_2S_1S_0$ as a portion of control information such as TMCC. In this case, correspondence between $S_2S_1S_0$ and information purpose is indicated in Table 27.

TABLE 27

Correspondence between $S_2S_1S_0$ and information purpose

| $S_2S_1S_0$ | Significance |
|---|---|
| 000 | Emergency warning (early warning) |
| 001 | Other |
| 010-111 | Reserved |

As in Table 27, when $S_2S_1S_0$="000", the electronic message information, video, still image, or audio information is emergency warning (early warning) information. When $S_2S_1S_0$="001", the electronic message information, video, still image, or audio information is information other than emergency warning (early warning) information. $S_2S_1S_0$="010"–"111" is reserved.

A reception device (terminal), even without the presence of $S_2S_1S_0$ as control information (even if a transmit station does not transmit $S_2S_1S_0$), can determine that electronic message information, video, still image, or audio information is emergency warning (early warning) information from the $Q_0$ value, and therefore a transmit station does not have to transmit $S_2S_1S_0$.

Figure 85:
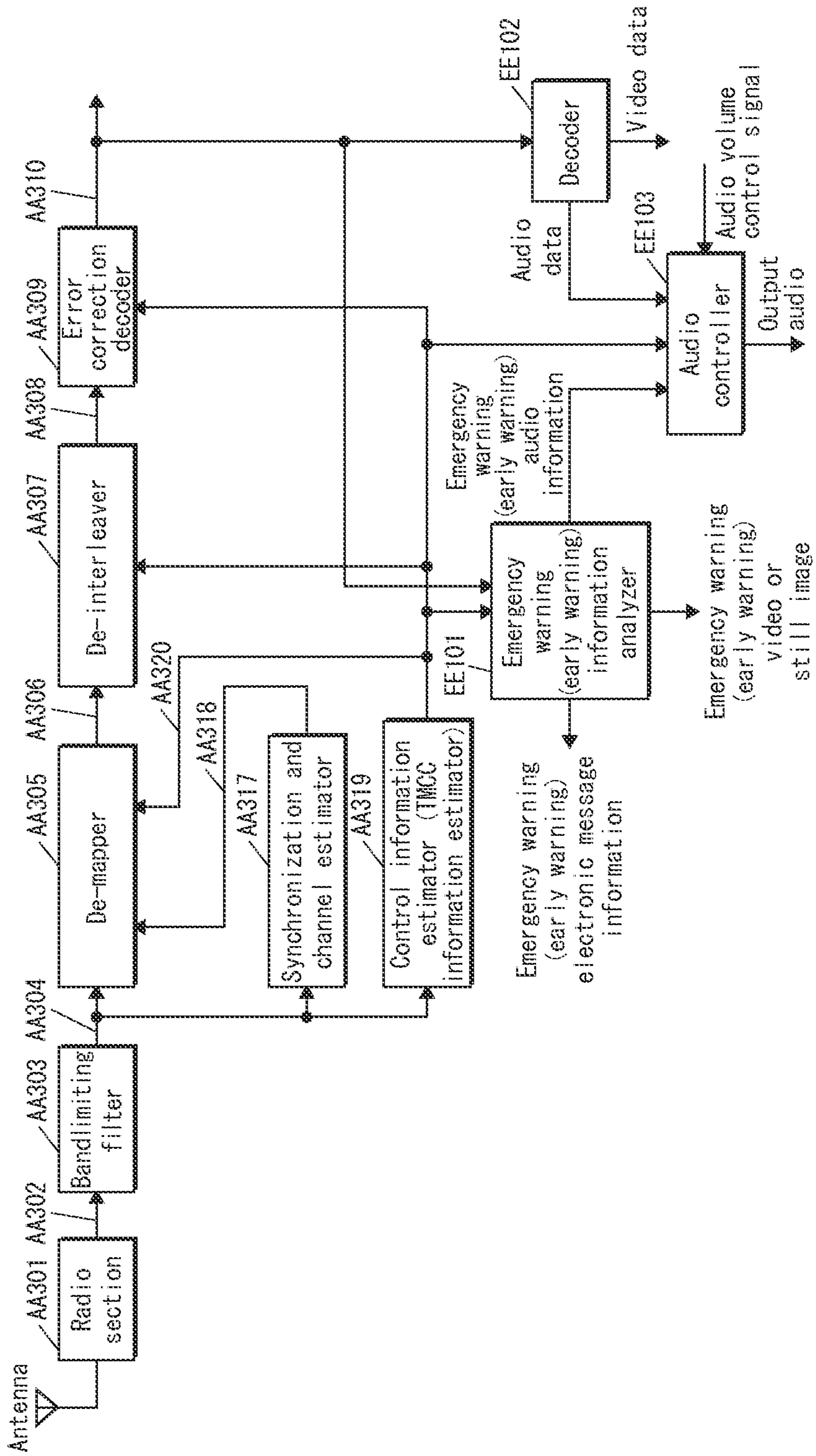
FIG. 85 illustrates an example configuration of a reception device.

In the above description, "emergency warning (early warning) information, as an example, is transmitted by using "extended information" of TMCC" is described, but emergency warning (early warning) information may be transmitted by a transmit station by using a main broadcast signal (stream). In this case, a method of transmitting control information such as TMCC is implemented similarly to "emergency warning (early warning) information, as an example, is transmitted by using "extended information" of TMCC", as described above. FIG. 85 illustrates an example of reception device (terminal) configuration in a case in which emergency warning (early warning) information is transmitted by a transmit station by using a main broadcast signal (stream).

In FIG. 85, elements that are the same as in FIG. 78 and FIG. 84 are assigned the same reference signs. FIG. 85 differs from FIG. 84 in that the emergency warning (early warning) information analyzer EE101 receives receive data AA310 as input. Otherwise, configuration and operation is the same as described above, and description thereof is omitted here.

In FIG. 85, the emergency warning (early warning) information analyzer EE101 receives control information AA320 as input and determines, according to $Q_0$ value, whether emergency warning (early warning) information is being transmitted. In addition, according to $R_2R_1R_0$ values, the emergency warning (early warning) information analyzer EE101 determines a format of emergency warning (emergency value) information; based on this determination, decoding of an electronic message, video, still image or audio is performed; and emergency warning (early warning) electronic message information, emergency warning (early warning) video/still image, or emergency warning (early warning) audio information is generated and outputted, based on emergency warning (early warning) information included in receive data AA310.

In the present embodiment, an example of a system composed of a transmit station, a repeater, and a terminal is described as in embodiment B, embodiment C, embodiment D, embodiment E, embodiment F, and embodiment G, but a system composed of a transmit station and a terminal may of course be implemented similarly.

Embodiment FF

In embodiment EE, transmission of an emergency warning by using audio that uses TMCC is described. In the present embodiment, an application example of embodiment EE is described.

As described in embodiment EE, a method of transmitting emergency warning (early warning) information and other information by using TMCC is described. In the present embodiment, an audio output method is described as an application example of embodiment EE.

TMCC configuration, transmission device configuration, reception device configuration, etc., is as described in embodiment AA, and description thereof is omitted here.

Further, in the present embodiment, as described in embodiment B, embodiment C, embodiment D, embodiment E, embodiment F, and embodiment G, a system composed of a (terrestrial) transmit station, (satellite) repeater, and terminal is described as an example.

In the present embodiment, as one example, a transmit station (ground station) transmits $Q_0$ (emergency warning broadcast activation flag) of Table 25, described in embodiment DD, and $R_2$, $R_1$, $R_0$ (information associated with information type (in embodiment EE, emergency warning broadcast information type is described, but emergency warning broadcasts are not limited to the description in embodiment EE)) of Table 26, described in embodiment EE.

In this case, a terminal can identify, according to $Q_0$, whether information transmitted by TMCC is emergency warning broadcast information or information other than an emergency warning broadcast.

As another example, a transmit station (ground station) transmits $Q_0$ (emergency warning broadcast activation flag) of Table 25, described in embodiment DD, $R_2$, $R_1$, $R_0$ (information associated with information type (in embodiment EE, emergency warning broadcast information type is described, but emergency warning broadcasts are not limited to the description in embodiment EE)) of Table 26, described in embodiment EE, and $S_2$, $S_1$, $S_0$ (information associated with information purpose (intended use doesn't have to include emergency warning (early warning))) of Table 27, described in embodiment EE.

In this case, a terminal can identify, according to $Q_0$ and $S_2$, $S_1$, $S_0$, whether information transmitted by TMCC is emergency warning broadcast information or information other than an emergency warning broadcast.

A system is considered in which a terminal can identify whether information transmitted by using a region of TMCC is emergency warning broadcast information or information other than an emergency warning broadcast, according to any of the methods above. Thus, a system is considered that can specify audio as information transmitted by using a region of TMCC, according to $R_2$, $R_1$, $R_0$ (information associated with information type).

Figure 86:
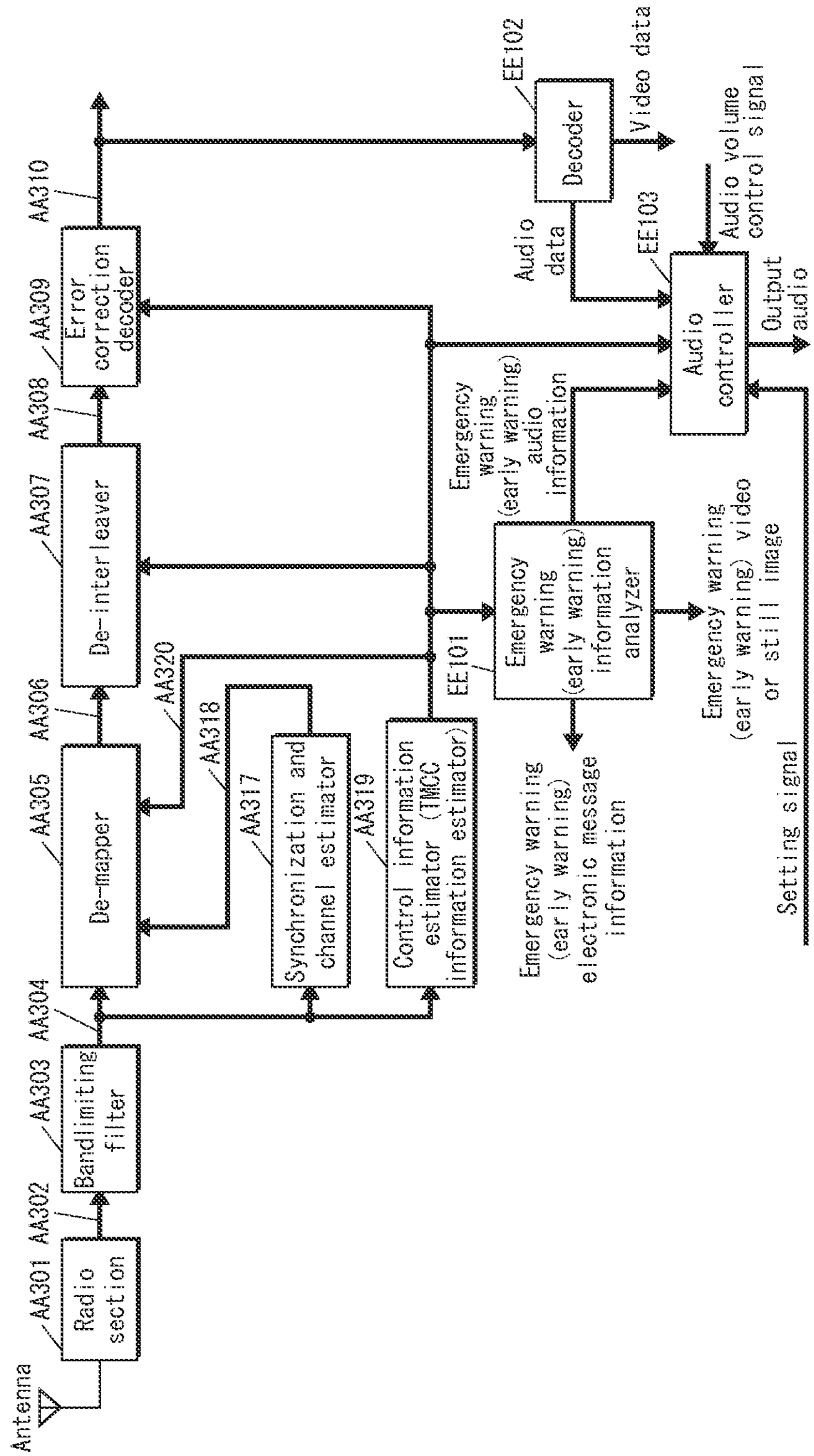
FIG. 86 illustrates an example configuration of a reception device.

FIG. 86 illustrates an example of a terminal configuration of the present embodiment, in which operations thereof that are the same as operations performed according to FIG. 84 are assigned the same reference sign. A point of difference between FIG. 86 and FIG. 84 is that the audio controller (EE103) receives a setting signal as input. This point is explained in detail below.

Being able to control a method of audio output via a setting signal that is inputted to the audio controller (EE103) of FIG. 86 is a feature of the present embodiment.

In embodiment EE, transmission of emergency warning (early warning) information is considered, but in the present embodiment, a system is considered that can transmit, by TMCC, information other than emergency warning (early warning) information, such as electronic message information, video, still image, audio, etc. Accordingly, in FIG. 86, control information AA320 is assumed to include information other than emergency warning (early warning) information, such as electronic message information, video, still image, audio, etc. Accordingly, the audio controller EE103 of FIG. 86 can obtain audio other than emergency warning (early warning) audio from the control information AA320 that is inputted thereto. This point is also true for FIG. 88, which is described later.

Figure 87:
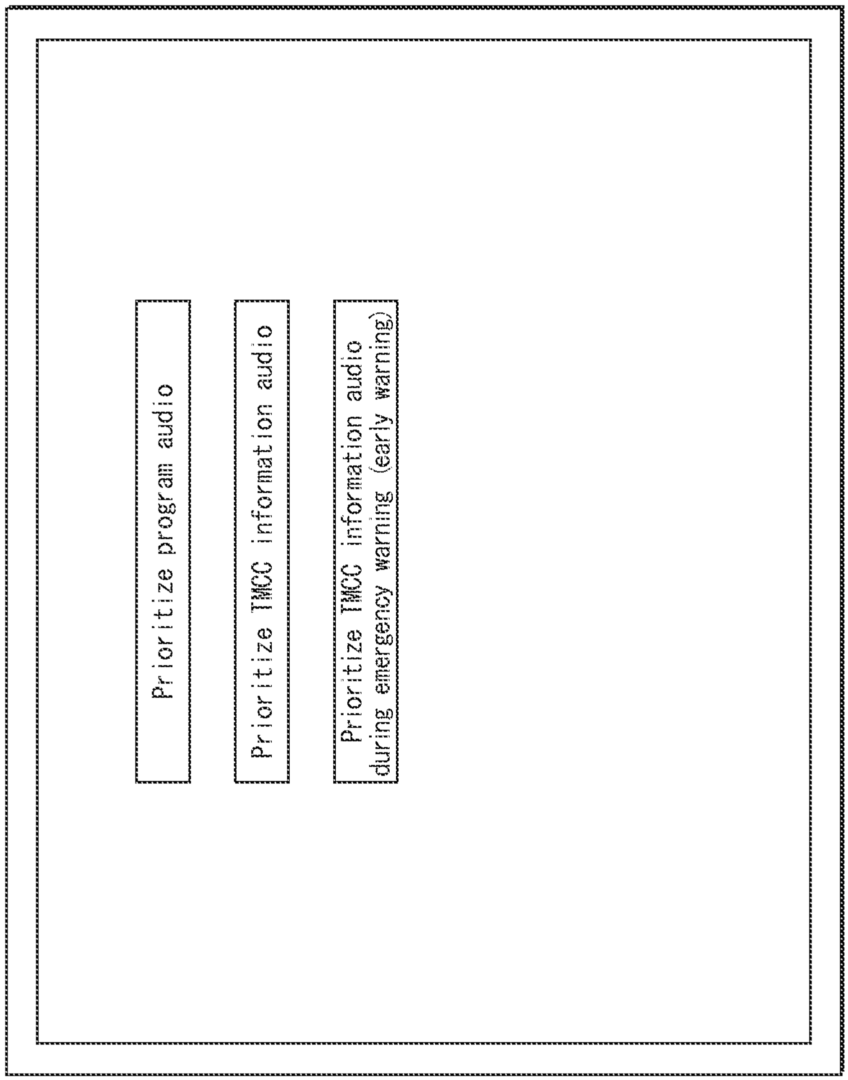
FIG. 87 illustrates a setting screen example related to audio output method.

FIG. 87 illustrates a setting screen displayed on a television or monitor for example, in connection with a method of setting audio output via a setting signal.

In FIG. 87, a "prioritize program audio" mode, a "prioritize TMCC information audio" mode, and a "prioritize TMCC information audio during emergency warning (early warning)" mode are illustrated as examples. (However, when actually displayed on a screen, the same content may be displayed in different ways. Further, modes displayed on screen are not limited to "prioritize program audio", "prioritize TMCC information audio", and "prioritize TMCC information audio during emergency warning (early warning)" and other modes may be present. Further, all of the modes "prioritize program audio", "prioritize TMCC information audio", and "prioritize TMCC information audio during emergency warning (early warning)" need not be present. The important point is that a method of audio output can be set.) Details of each mode are described below.

Prioritize Program Audio:

When this mode is selected for a terminal, outputting audio information transmitted by a main broadcast signal (stream) to speakers, earphones, headphones, etc., is prioritized. Accordingly, audio information transmitted by using a region of TMCC is not prioritized as output to speakers, earphones, headphones, etc. As described in embodiment EE, to "prioritize" may be considered to mean a method that does not output one audio source and to mean a method that provides a higher volume and a lower volume to two audio sources.

Prioritize TMCC Information Audio:

When this mode is selected for a terminal, outputting audio information transmitted by using a region of TMCC to speakers, earphones, headphones, etc., is prioritized over audio information transmitted by a main broadcast signal (stream). As described in embodiment EE, to "prioritize" may be considered to mean a method that does not output one audio source and to mean a method that provides a higher volume and a lower volume to two audio sources.

Prioritize TMCC information audio during emergency warning (early warning):

When this mode is selected for a terminal, the following operations occur.

When emergency warning (early warning) audio information is transmitted by using a TMCC region, outputting this audio information from speakers, earphones, headphones, etc., is prioritized. (Accordingly, outputting audio information transmitted by a main broadcast signal (stream) as audio to speakers, earphones, headphones, etc., is not prioritized.)

When audio information other than emergency warning (early warning) audio information is transmitted by using a TMCC region, outputting audio information transmitted by a main broadcast signal (stream) as audio to speakers, earphones, headphones, etc., is prioritized. (Accordingly, outputting, as audio, audio information other than emergency warning (early warning) audio information that is transmitted by using a TMCC region to speakers, earphones, headphones, etc., is not prioritized.)

In order to set a mode selected from among modes displayed on screen, the setting signal of FIG. 86 transmits a control signal. The audio controller EE103 of FIG. 86, sets priority of audio output according to the mode selected by a user, and outputs audio from speakers, earphones, headphones, etc. according to the priority set.

Figure 88:
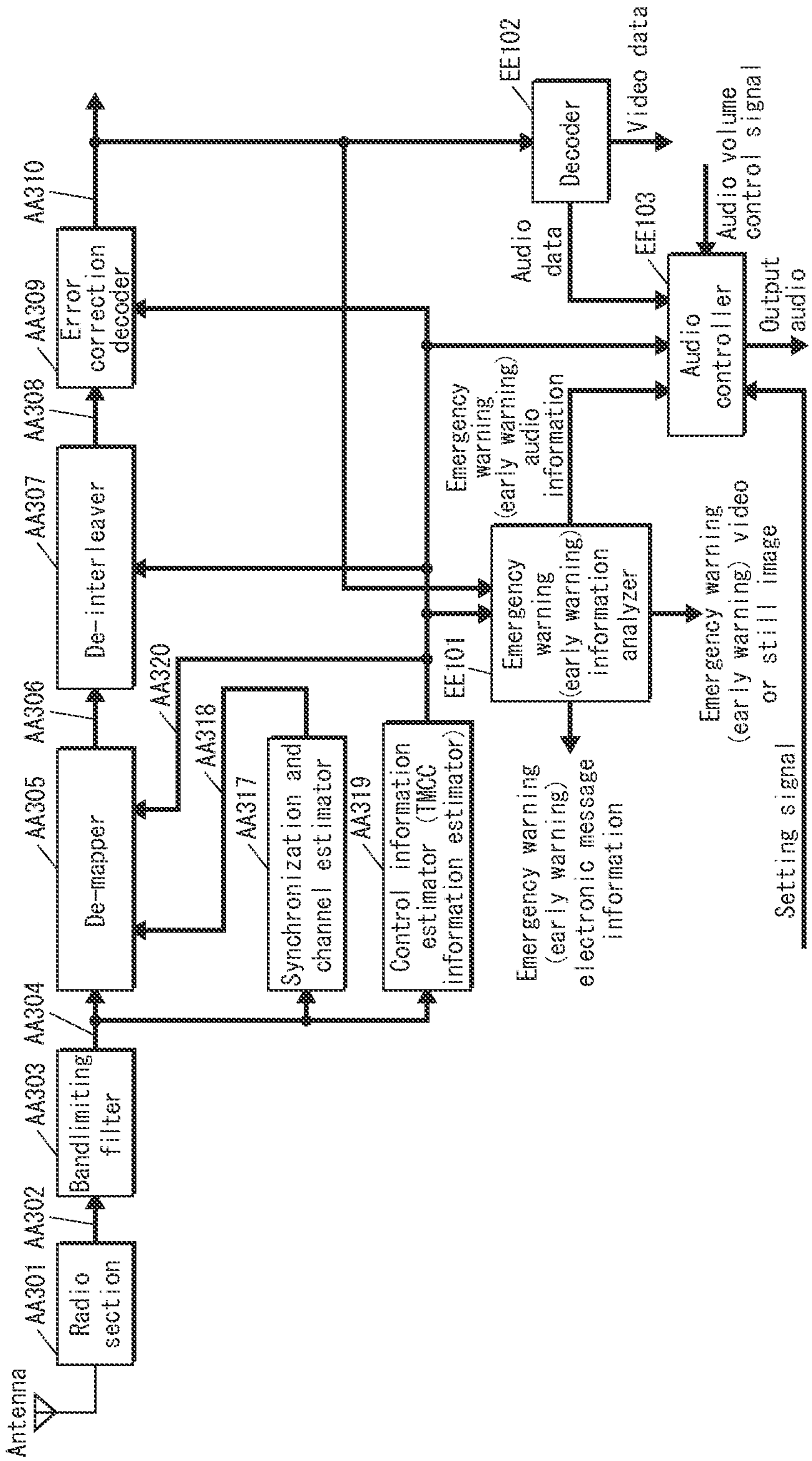
FIG. 88 illustrates an example configuration of a reception device.

FIG. 88 illustrates an example configuration of a terminal that is different to FIG. 86, and elements that operate $\alpha$ s in FIG. 85 have the same reference signs as in FIG. 85. FIG. 88 illustrates a terminal configuration in a case in which emergency warning (early warning) information is transmitted by a main broadcast signal (stream), as in FIG. 85. A point that is different to FIG. 85 is that the audio controller (EE103) receives a setting signal as input. This point is explained in detail below.

As described above, being able to control a method of audio output by a setting signal that is inputted to the audio controller (EE103) of FIG. 88 is a feature.

Figure 89:
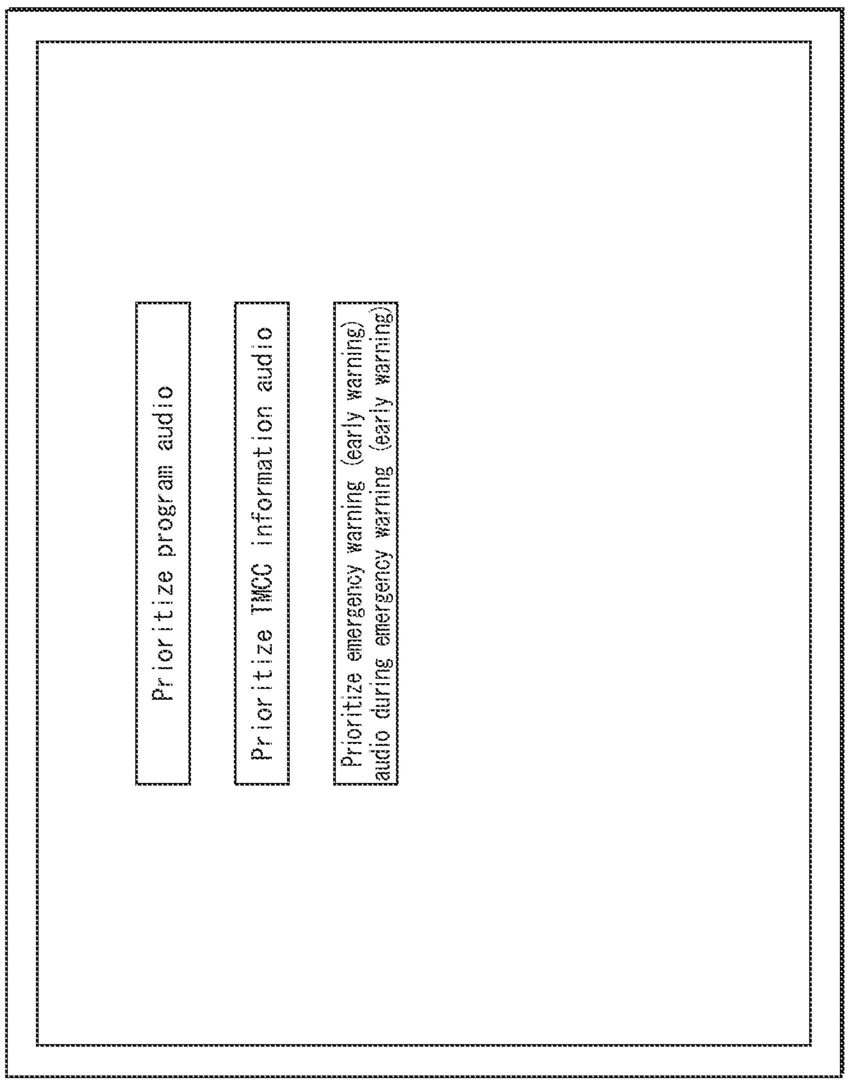
FIG. 89 illustrates a setting screen example related to audio output method.

FIG. 89 illustrates a setting screen displayed on a television or monitor for example, in connection with a method of setting audio output via a setting signal.

In FIG. 89, a "prioritize program audio" mode, a "prioritize TMCC information audio" mode, and a "prioritize emergency warning (early warning) audio during emergency warning (early warning)" mode are illustrated as examples. (However, when actually displayed on a screen, the same content may be displayed in different ways. Further, modes displayed on screen are not limited to "prioritize program audio", and "prioritize emergency warning (early warning) audio during emergency warning (early warning)" and other modes may be present. Further, all of the modes "prioritize program audio", "prioritize TMCC information audio", and "prioritize emergency warning (early warning) audio during emergency warning (early warning)" need not be present. The important point is that a method of audio output can be set.) Details of each mode are described below.

Prioritize program audio:

When this mode is selected for a terminal, outputting audio information transmitted by a main broadcast signal (stream) to speakers, earphones, headphones, etc., is prioritized. Accordingly, audio information transmitted by using a region of TMCC is not prioritized as output to speakers, earphones, headphones, etc.

When an emergency warning (early warning) is transmitted by a main broadcast signal (stream), emergency warning (early warning) audio is output from speakers, earphones, headphones, etc., instead of a program currently being viewed.

In a case in which an emergency warning (early warning) is transmitted by a main broadcast signal, but a program being viewed continues being broadcast, audio of the program being viewed is output from speakers, earphones, headphones, etc.

As described in embodiment EE, to "prioritize" may be considered to mean a method that does not output one audio source and to mean a method that provides a higher volume and a lower volume to two audio sources.

Prioritize TMCC information audio:

When this mode is selected for a terminal, outputting audio information transmitted by using a region of TMCC to speakers, earphones, headphones, etc., is prioritized over audio information transmitted by a main broadcast signal (stream). As described in embodiment EE, to "prioritize" may be considered to mean a method that does not output one audio source and to mean a method that provides a higher volume and a lower volume to two audio sources.

Prioritize emergency warning (early warning) audio during emergency warning (early warning): When this mode is selected for a terminal, the following operations occur.

When emergency warning (early warning) audio information is transmitted by a main broadcast signal (stream), outputting this audio information from speakers, earphones, headphones, etc., is prioritized.

In order to set a mode selected from among modes displayed on screen, the setting signal of FIG. 88 transmits a control signal. The audio controller EE103 of FIG. 88, sets priority of audio output according to the mode selected by a user, and outputs audio from speakers, earphones, headphones, etc. according to the priority set.

As above, audio output is controlled according to a mode selected by a user, and therefore audio of the mode selected by the user is appropriately audible to the user. Further, a user that prioritized "emergency warning (early warning) audio" can hear emergency warning (early warning) audio when appropriate, achieving an effect of ensuring safety of the user.

Next, description is provided for an example of operation when region information is included in TMCC, as described in embodiment BB and embodiment CC, with respect to the embodiment described above.

As above, referring to the embodiment described with reference to FIG. 86 and FIG. 87, details of each mode indicated in FIG. 87 are as follows.

Prioritize program audio:

When this mode is selected for a terminal, outputting audio information transmitted by a main broadcast signal (stream) to speakers, earphones, headphones, etc., is prioritized. Accordingly, audio information transmitted by using a region of TMCC is not prioritized as output to speakers, earphones, headphones, etc. As described in embodiment EE, to "prioritize" may be considered to mean a method that does not output one audio source and to mean a method that provides a higher volume and a lower volume to two audio sources.

Prioritize TMCC information audio:

When this mode is selected for a terminal, the following operations occur.

When region information included in TMCC matches a region to which the terminal belongs, outputting audio information transmitted by using a TMCC region from speakers, earphones, headphones, etc., is prioritized.

When region information included in TMCC does not match a region to which the terminal belongs, outputting audio information transmitted by a main broadcast signal (stream) to speakers, earphones, headphones, etc., is prioritized.

When region information is not included in TMCC, outputting audio information transmitted by using a TMCC region from speakers, earphones, headphones, etc., is prioritized.

As described in embodiment EE, to "prioritize" may be considered to mean a method that does not output one audio source and to mean a method that provides a higher volume and a lower volume to two audio sources.

Prioritize TMCC information audio during emergency warning (early warning):

When this mode is selected for a terminal, the following operations occur.

When emergency warning (early warning) audio information is transmitted by using a TMCC region, and region information included in TMCC matches a region to which the terminal belongs, outputting this audio information from speakers, earphones, headphones, etc., is prioritized.

When emergency warning (early warning) audio information is transmitted by using a TMCC region, and region information included in TMCC does not match a region to which the terminal belongs, outputting this audio information from speakers, earphones, headphones, etc., is not prioritized. (Accordingly, outputting audio information transmitted by a main broadcast signal (stream) as audio to speakers, earphones, headphones, etc., is prioritized.)

When emergency warning (early warning) audio information is transmitted by using a TMCC region and region information is not included in TMCC, outputting this audio information from speakers, earphones, headphones, etc., is prioritized.

When audio information other than emergency warning (early warning) audio information is transmitted by using a TMCC region, outputting audio information transmitted by a main broadcast signal (stream) as audio to speakers, earphones, headphones, etc., is prioritized regardless of whether or not region information is included in TMCC. (Accordingly, outputting, as audio, audio information other than emergency warning (early warning) audio information that is transmitted by using a TMCC region to speakers, earphones, headphones, etc., is not prioritized.)

In order to set a mode selected from among modes displayed on screen, the setting signal of FIG. 86 transmits a control signal. The audio controller EE103 of FIG. 86, sets priority of audio output according to the mode selected by a user, and outputs audio from speakers, earphones, headphones, etc. according to the priority set.

As above, referring to the embodiment described with reference to FIG. 88 and FIG. 89, details of each mode indicated in FIG. 89 are as follows.

Prioritize program audio:

When this mode is selected for a terminal, outputting audio information transmitted by a main broadcast signal (stream) to speakers, earphones, headphones, etc., is prioritized. Accordingly, audio information transmitted by using a region of TMCC is not prioritized as output to speakers, earphones, headphones, etc.

When an emergency warning (early warning) is transmitted by a main broadcast signal (stream), emergency warning (early warning) audio is output from speakers, earphones, headphones, etc., instead of a program currently being viewed.

In a case in which an emergency warning (early warning) is transmitted by a main broadcast signal, but a program being viewed continues being broadcast, audio of the program being viewed is output from speakers, earphones, headphones, etc.

As described in embodiment EE, to “prioritize” may be considered to mean a method that does not output one audio source and to mean a method that provides a higher volume and a lower volume to two audio sources.

Prioritize TMCC information audio: When this mode is selected for a terminal and region information included in TMCC matches a region to which the terminal belongs, outputting audio information transmitted by using a TMCC region from speakers, earphones, headphones, etc., is prioritized.

When this mode is selected for a terminal and region information included in TMCC does not match a region to which the terminal belongs, outputting audio information transmitted by using a TMCC region from speakers, earphones, headphones, etc., is not prioritized.

When this mode is selected for a terminal and region information is not included in TMCC, outputting audio information transmitted by using a TMCC region from speakers, earphones, headphones, etc., is prioritized.

As described in embodiment EE, to “prioritize” may be considered to mean a method that does not output one audio source and to mean a method that provides a higher volume and a lower volume to two audio sources.

Prioritize emergency warning (early warning) audio during emergency warning (early warning):

When this mode is selected for a terminal, the following operations occur.

When emergency warning (early warning) audio information is transmitted by a main broadcast signal (stream), and region information included in TMCC matches a region to which the terminal belongs, outputting this audio information from speakers, earphones, headphones, etc., is prioritized.

When emergency warning (early warning) audio information is transmitted by a main broadcast signal (stream), and region information included in TMCC does not match a region to which the terminal belongs, outputting this audio information from speakers, earphones, headphones, etc., is not prioritized.

When emergency warning (early warning) audio information is transmitted by a main broadcast signal (stream) and region information is not included in TMCC, outputting this audio information from speakers, earphones, headphones, etc., is prioritized.

In order to set a mode selected from among modes displayed on screen, the setting signal of FIG. 88 transmits a control signal. The audio controller EE103 of FIG. 88, sets priority of audio output according to the mode selected by a user, and outputs audio from speakers, earphones, headphones, etc. according to the priority set.

In the present embodiment, an example of a system composed of a transmit station, a repeater, and a terminal is described as in embodiment B, embodiment C, embodiment D, embodiment E, embodiment F, and embodiment G, but a system composed of a transmit station and a terminal may of course be implemented similarly.

Embodiment GG

A method of setting audio is described in embodiment FF. The present embodiment describes methods of setting a screen of a terminal.

TMCC configuration, transmission device configuration, reception device configuration, etc., is as described in embodiment AA, and description thereof is omitted here.

Further, in the present embodiment, as described in embodiment B, embodiment C, embodiment D, embodiment E, embodiment F, and embodiment G, a system composed of a (terrestrial) transmit station, (satellite) repeater, and terminal is described as an example.

In the present embodiment, as one example, a transmit station (ground station) transmits $Q_0$ (emergency warning broadcast activation flag) of Table 25, described in embodiment DD, and $R_2$, $R_1$, $R_0$ (information associated with information type (in embodiment EE, emergency warning broadcast information type is described, but emergency warning broadcasts are not limited to the description in embodiment EE)) of Table 26, described in embodiment EE.

In this case, a terminal can identify, according to $Q_0$, whether information transmitted by TMCC is emergency warning broadcast information or information other than an emergency warning broadcast.

As another example, a transmit station (ground station) transmits $Q_0$ (emergency warning broadcast activation flag) of Table 25, described in embodiment DD, $R_2$, $R_1$, $R_0$ (information associated with information type (in embodiment EE, emergency warning broadcast information type is described, but emergency warning broadcasts are not limited to the description in embodiment EE)) of Table 26, described in embodiment EE, and $S_2$, $S_1$, $S_0$ (information associated with information purpose (intended use doesn't have to include emergency warning (early warning))) of Table 27, described in embodiment EE.

In this case, a terminal can identify, according to $Q_0$ and $S_2$, $S_1$, $S_0$, whether information transmitted by TMCC is emergency warning broadcast information or information other than an emergency warning broadcast.

A system is considered in which a terminal can identify whether information transmitted by using a region of TMCC is emergency warning broadcast information or information other than an emergency warning broadcast, according to any of the methods above. Thus, a system is considered that can specify "electronic message information" or "video" or "still image" as information transmitted by using a region of TMCC, according to $R_2$, $R_1$, $R_0$ (information associated with information type).

Figure 90:
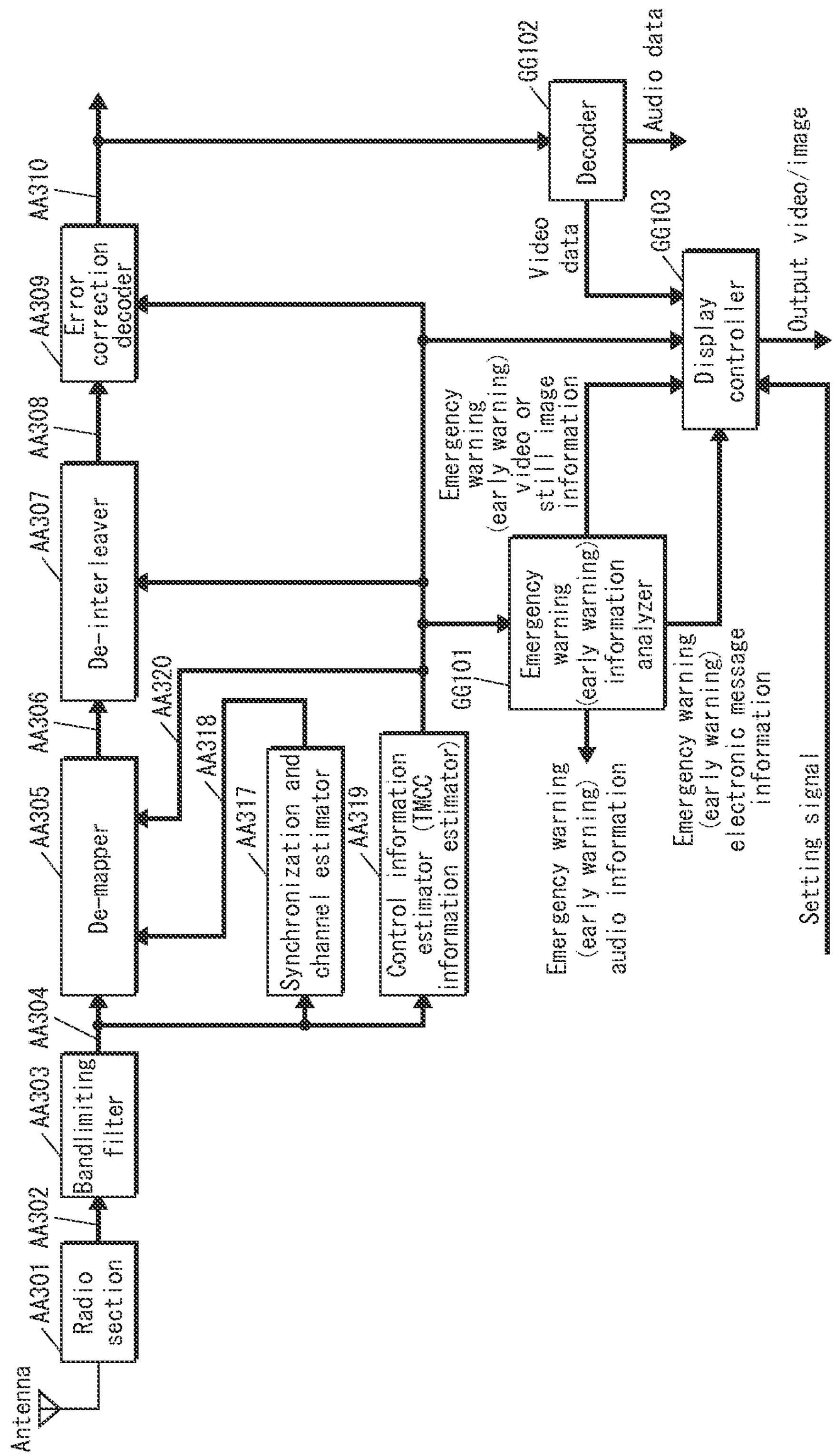
FIG. 90 illustrates an example configuration of a reception device.

FIG. 90 illustrates an example of a terminal configuration of the present embodiment, in which operations thereof that are the same as operations performed according to FIG. 75 are assigned the same reference sign. Characterizing elements of the present embodiment are an emergency warning (early warning) information analyzer GG101, a decoder GG102, and a screen controller GG103. These are explained in detail below.

In the present embodiment, a particularly characterizing feature is that a method of screen output can be controlled by a setting signal that is inputted to the screen controller (GG103) of FIG. 90. These elements and features are described below in order.

In embodiment EE, transmission of emergency warning (early warning) information is considered, but in the present embodiment, a system is considered that can transmit, by TMCC, information other than emergency warning (early warning) information, such as electronic message information, video, still image, audio, etc. Accordingly, in FIG. 86, control information AA320 is assumed to include information other than emergency warning (early warning) information, such as electronic message information, video, still image, audio, etc. Accordingly, the screen controller GG103 of FIG. 90 can obtain "electronic message information", "video", or "still image" other than emergency warning (early warning) information from control information AA320 that is inputted thereto.

FIG. 90 is described, but description is omitted of portions that operate the same way as in FIG. 75. The emergency warning (early warning) information analyzer GG101 receives control information AA320 as input and determines whether emergency warning (early warning) information is being transmitted. The emergency warning (early warning) information analyzer GG101 determines a format of emergency warning (emergency value) information; based on this determination, decoding of an electronic message, video, still image or audio is performed; and emergency warning (early warning) electronic message information, emergency warning (early warning) video (or) still image, or emergency warning (early warning) audio information is generated and outputted, based on emergency warning (early warning) information included in control information AA320.

The decoder GG102 is a decoder associated with video and audio, which accepts receive data AA310 as input and outputs audio data and video data.

Being able to control a method of screen output via a setting signal that is inputted to the screen controller (GG103) of FIG. 90 is a feature of the present embodiment.

Figure 91:
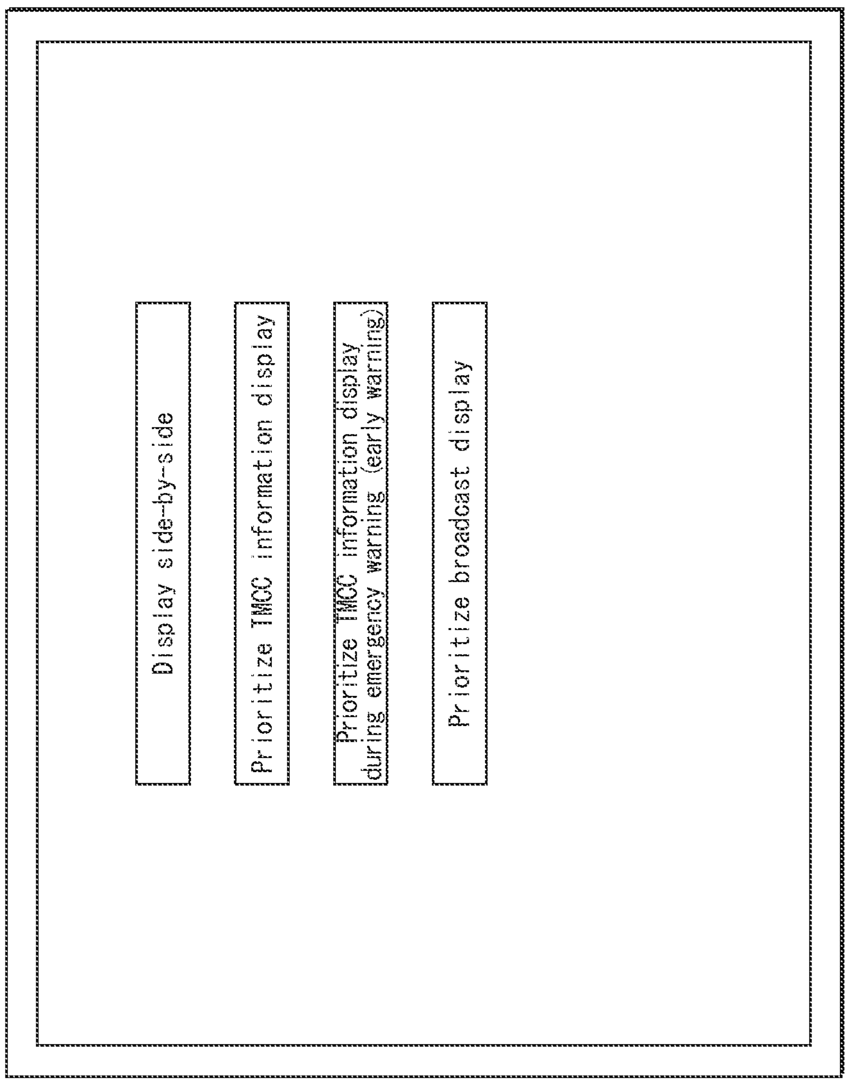
FIG. 91 illustrates a setting screen example related to audio output method.

FIG. 91 illustrates a setting screen displayed on a television or monitor for example, in connection with a method of setting screen output via a setting signal.

In FIG. 91, for example, "display side-by-side", "prioritize TMCC information display", "prioritize TMCC information display during emergency warning (early warning)", and "prioritize broadcast display" modes are illustrated. (However, when actually displayed on a screen, the same content may be displayed in different ways. Further, modes displayed on screen are not limited to "display side-by-side", "prioritize TMCC information display", "prioritize TMCC information display during emergency warning (early warning)", and "prioritize broadcast display" and other modes may be present.

Further, all of the modes "display side-by-side", "prioritize TMCC information display", "prioritize TMCC information display during emergency warning (early warning)", and "prioritize broadcast display" need not be present. The important point is that a method of screen output can be set.) Details of each mode are described below.

Display Side-by-Side:

When this mode is selected for a terminal, and video information, still image information, or electronic message information is transmitted in TMCC, "video information, still image information, or electronic message information of TMCC" and "video information (or still image information) transmitted by a main broadcast signal (stream)" are displayed side-by-side on a monitor.

Figure 92:
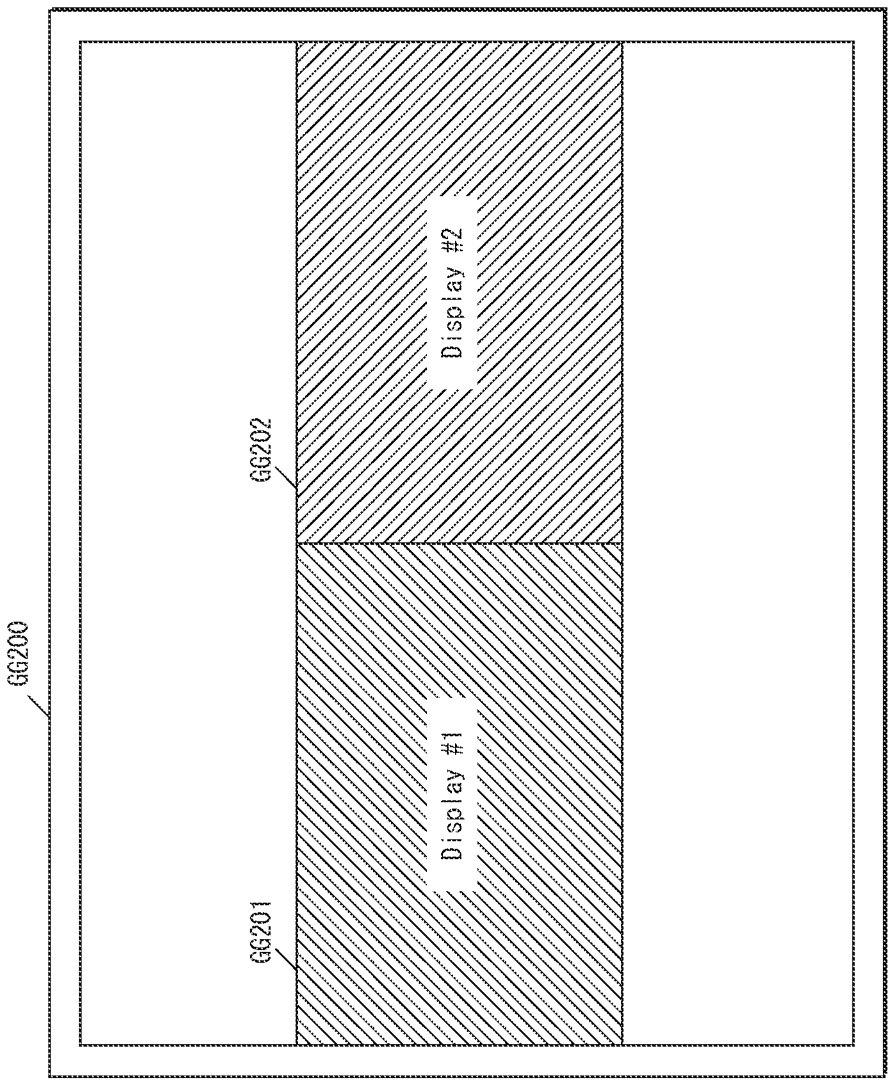
FIG. 92 illustrates a screen display example.

In FIG. 92, GG200 is a monitor and, for example, "video information, still image information, or electronic message information of TMCC" is displayed on screen #1 (GG201) and "video information (or still image information) transmitted by a main broadcast signal (stream)" is displayed on screen #2 (GG202) so that the monitor displays two screens side-by-side.

Figure 93:
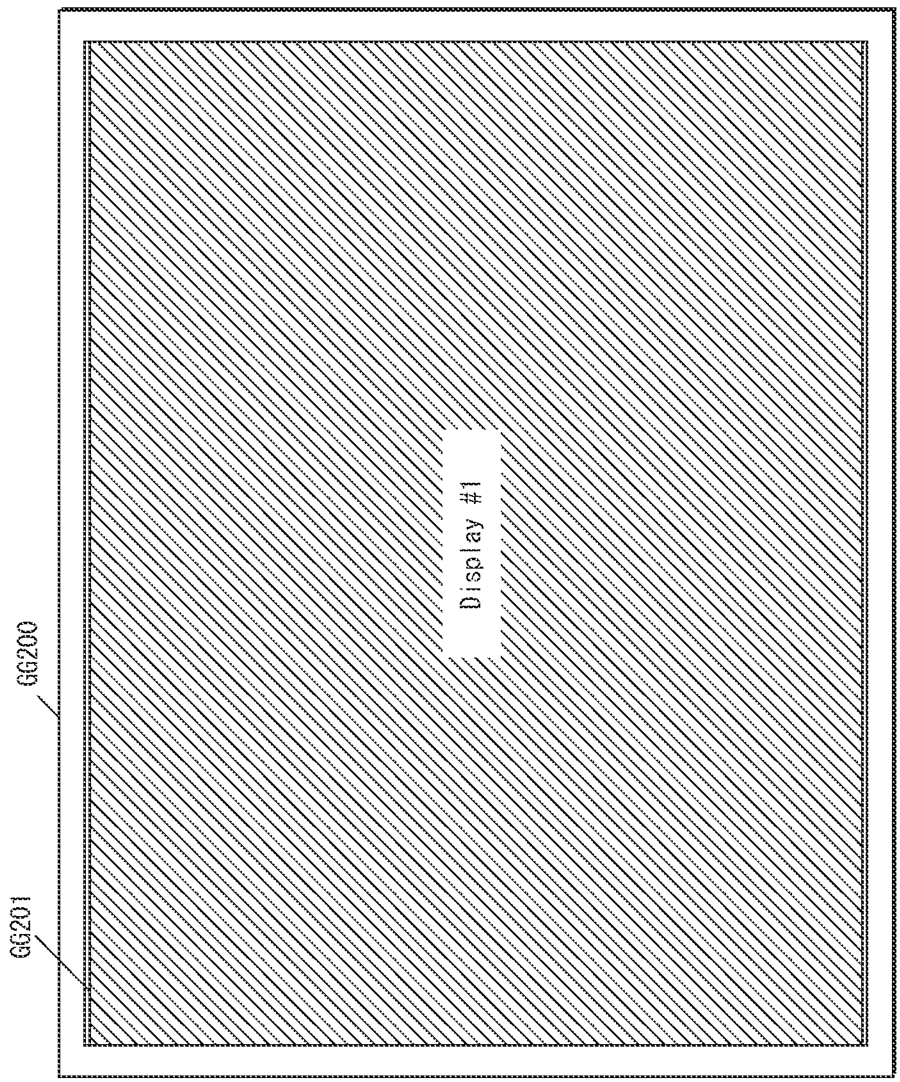
FIG. 93 illustrates a screen display example.

When "video information, still image information, or electronic message information of TMCC" is not transmitted, the monitor G200 displays "video information (or still image information) transmitted by a main broadcast signal (stream)" (screen #1 (GG201)) as illustrated in FIG. 93.

Prioritize TMCC Information Display:

When this mode is selected for a terminal and video information, still image information, or electronic message information is transmitted in TMCC, "video information, still image information, or electronic message information of TMCC" is prioritized for display on the monitor. When video information, still image information, or electronic message information is not transmitted in TMCC, "video information (or still image information) transmitted by a main broadcast signal (stream)" is displayed on the monitor.

There are three methods for prioritizing display.

<Methods for Prioritizing Display>

(First Method):

When first information and second information is present, only one is displayed on the monitor. For example, as in FIG. 93, on the monitor (GG200), the first information is displayed on screen #1 (GG201) and the second information is not displayed. (The first information is prioritized information.)

Figure 94:
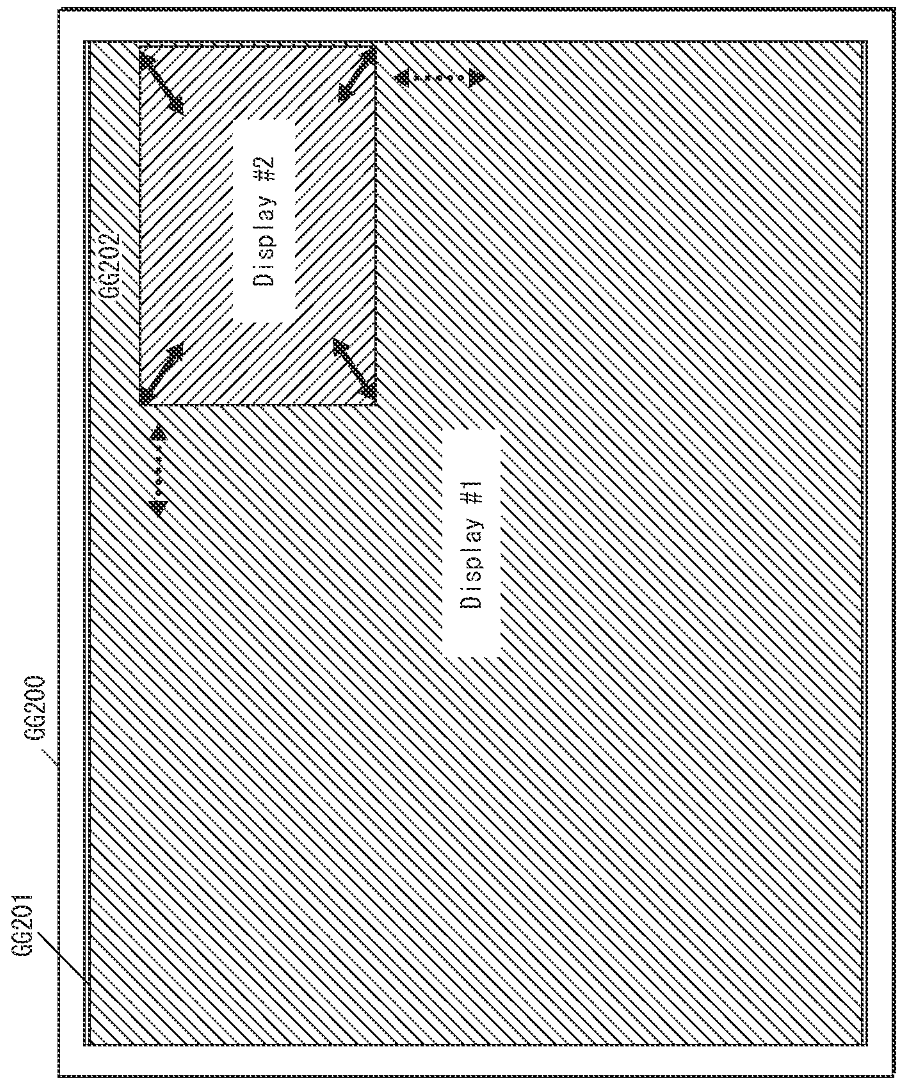
FIG. 94 illustrates a screen display example.

(Second Method):

When first information and second information is present, screen #1 (GG201) and screen #2 (GG202) are displayed overlapping on the monitor. However, as illustrated in FIG. 94, the first information is displayed as in screen #1 (GG201) and the second information is displayed as in screen #2 (GG202), i.e., screen size is different. In this case, screen size is set so that screen #1 is larger than screen #2, and therefore the first information is prioritized information.

Screen size, screen location (up and down, left and right) of screen #2 as in FIG. 94 can be changed by settings. (Screen size and screen location of screen #1 may also be adjustable.)

(Third method):

When first information and second information is present, screen #1 (GG201) and screen #2 (GG202) are displayed without overlapping on the monitor. However, as illustrated in FIG. 95, the first information is displayed as in screen #1

(GG201) and the second information is displayed as in screen #2 (GG202), i.e., screen size is different. In this case, screen size is set so that screen #1 is larger than screen #2, and therefore the first information is prioritized information.

Figure 95:
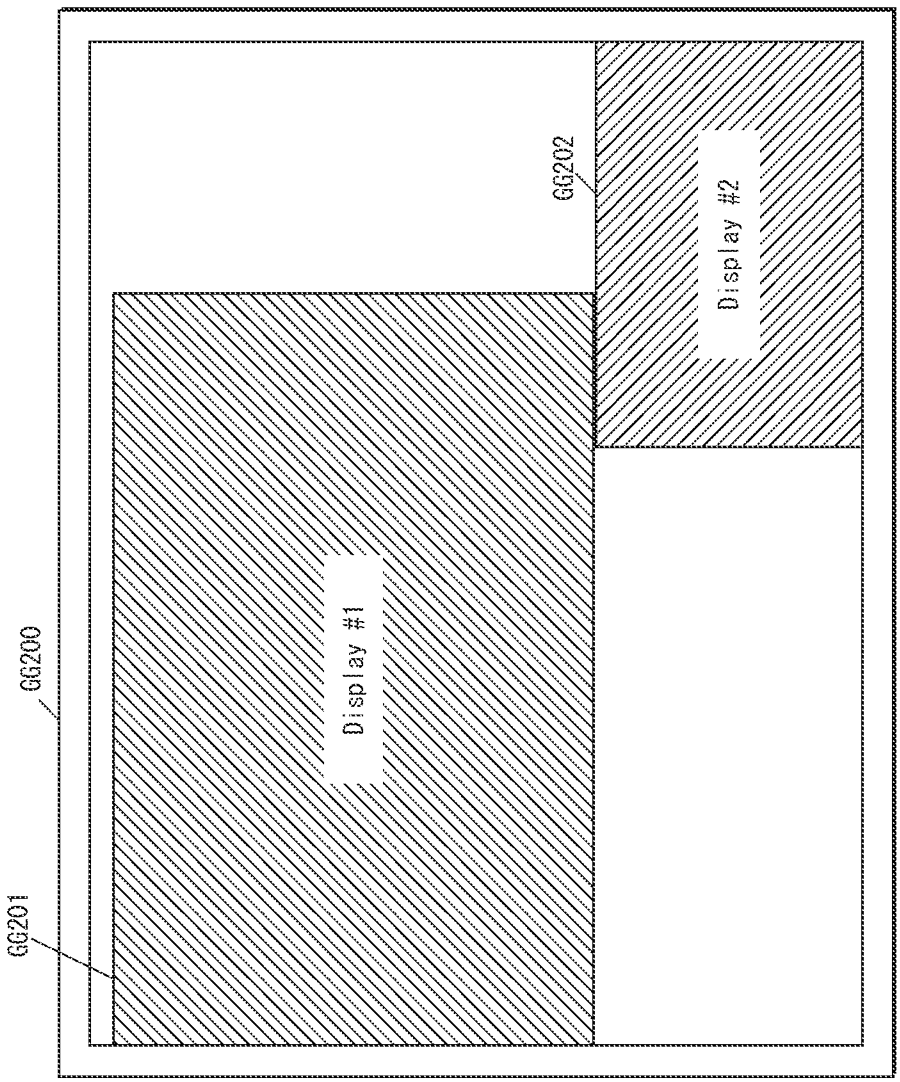
FIG. 95 illustrates a screen display example.

Screen size, screen location (up and down, left and right) of screen #1 and screen #2 as in FIG. 95 can be changed by settings.

Prioritize TMCC information display during emergency warning (early warning):

When this mode is selected for a terminal and emergency warning (early warning) video information, still image information, or electronic message information is transmitted in TMCC, "video information, still image information, or electronic message information of emergency warning (early warning) of TMCC" is prioritized for display on the monitor.

When emergency warning (early warning) video information, still image information, or electronic message information is not transmitted in TMCC, "video information (or still image information) transmitted by a main broadcast signal (stream)" is prioritized for display on the monitor.

For example, when video information, still image information, or electronic message information other than emergency warning (early warning) information is transmitted in TMCC, "video information (or still image information) transmitted by a main broadcast signal (stream)" is prioritized, and display of the video information, still image information, or electronic message information other than emergency warning (early warning) information of TMCC is not prioritized.

When video information, still image information, or electronic message information is not transmitted in TMCC, "video information (or still image information) transmitted by a main broadcast signal (stream)" is displayed on the monitor.

Methods of prioritizing display are as described above.

Prioritize Broadcast Display:

When this mode is selected for a terminal, "video information (or still image information) transmitted by a main broadcast signal (stream)" is prioritized for display on the monitor.

Methods of prioritizing display are as described above.

In order to set a mode selected from among modes displayed on screen, the setting signal of FIG. 90 transmits a control signal. The screen controller GG103 of FIG. 90 sets priorities of display output according to a mode selected by a user, and displays screens according to the priorities set.

Figure 96:
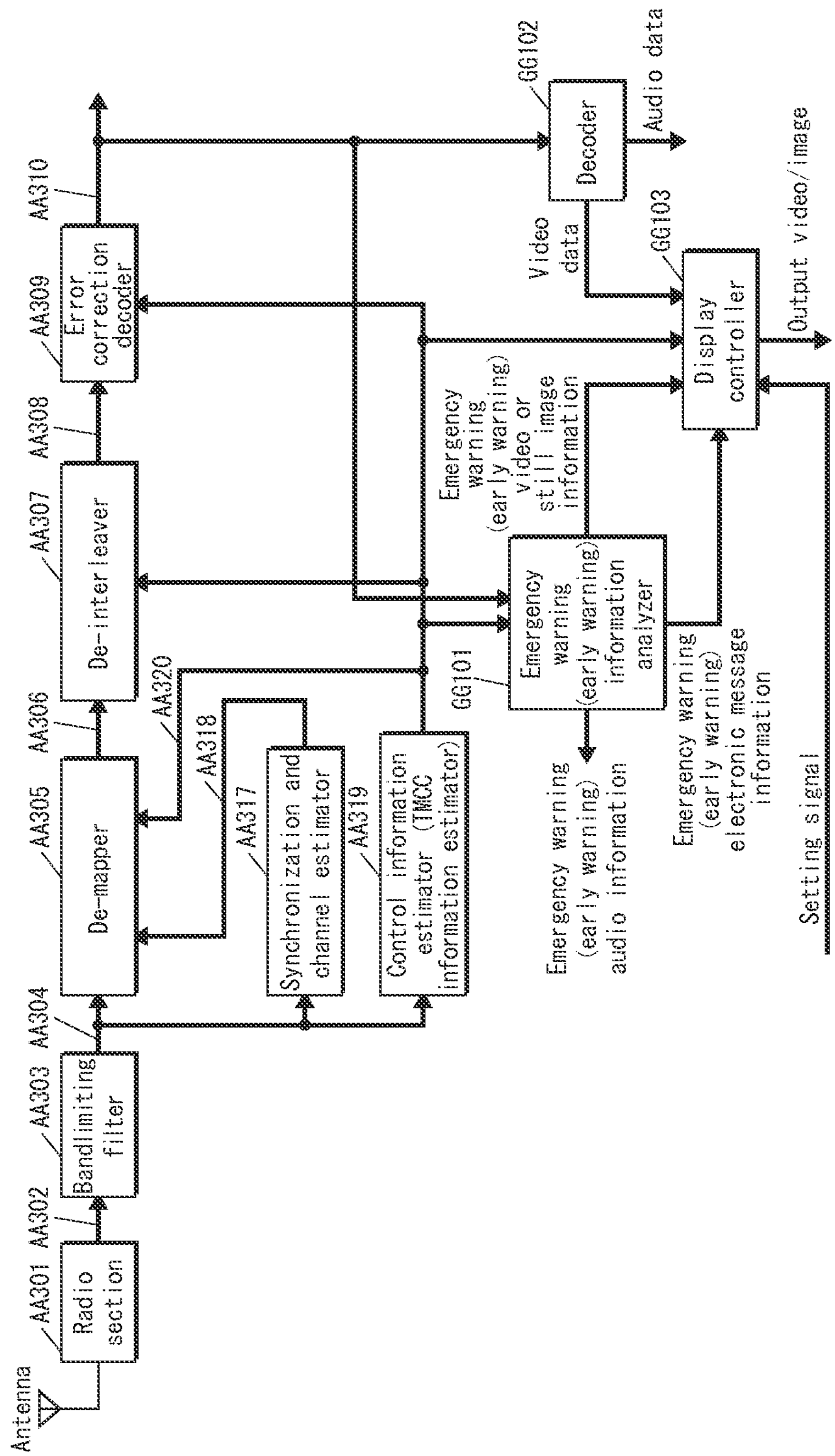
FIG. 96 illustrates an example configuration of a reception device.

FIG. 96 illustrates an example configuration of a terminal that is different to FIG. 90, and elements that operate α s in FIG. 85 have the same reference signs as in FIG. 85. FIG. 96 illustrates a terminal configuration when emergency warning (early warning) information is transmitted by a main broadcast signal (stream), as in FIG. 85. A point of difference from FIG. 85 is that the screen controller (GG103) receives a setting signal as input. This point is explained in detail below.

Being able to control a method of screen output via a setting signal that is inputted to the screen controller (GG103) of FIG. 96 is a feature, as stated above.

Figure 97:
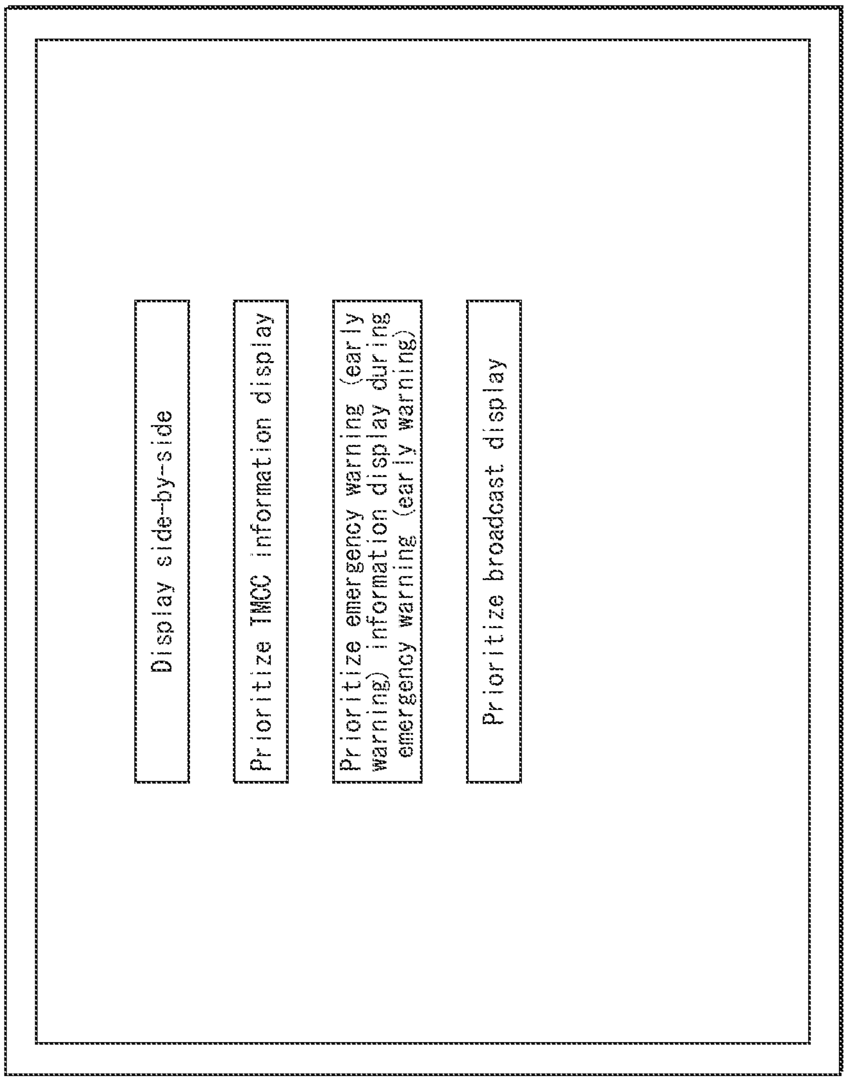
FIG. 97 illustrates a setting screen example related to audio output method.

FIG. 97 illustrates a setting screen displayed on a television or monitor for example, in connection with a method of setting screen output via a setting signal.

In FIG. 97, a "display side-by-side" mode, a "prioritize TMCC information display" mode, a "prioritize emergency warning (early warning) display during emergency warning (early warning)" mode, and a "prioritize broadcast display" mode are illustrated as examples. (However, when actually displayed on a screen, the same content may be displayed in different ways. Further, modes displayed on screen are not limited to "display side-by-side", "prioritize TMCC information display", "prioritize emergency warning (early warning) information display during emergency warning (early warning)", and "prioritize broadcast display" and other modes may be present. Further, all of the modes "display side-by-side", "prioritize TMCC information display", "prioritize emergency warning (early warning) information display during emergency warning (early warning)", and "prioritize broadcast display" need not be present. The important point is that a method of screen output can be set.) Details of each mode are described below.

Display Side-by-Side:

When this mode is selected for a terminal, and video information, still image information, or electronic message information is transmitted in TMCC, "video information, still image information, or electronic message information of TMCC" and "video information (or still image information) transmitted by a main broadcast signal (stream)" are displayed side-by-side on the monitor.

In FIG. 92, GG200 is a monitor and, for example, "video information, still image information, or electronic message information of TMCC" is displayed on screen #1 (GG201) and "video information (or still image information) transmitted by a main broadcast signal (stream)" is displayed on screen #2 (GG202) so that the monitor displays two screens side-by-side.

When "video information, still image information, or electronic message information of TMCC" is not transmitted, the monitor G200 displays "video information (or still image information) transmitted by a main broadcast signal (stream)" (screen #1 (GG201)) as illustrated in FIG. 93.

When an emergency warning (early warning) is transmitted by a main broadcast signal (stream), and an emergency warning (early warning) is transmitted instead of a program currently being viewed, the emergency warning (early warning) is displayed on screen #1 (GG201) of the monitor G200, as in FIG. 93.

Prioritize TMCC Information Display:

When this mode is selected for a terminal and video information, still image information, or electronic message information is transmitted in TMCC, "video information, still image information, or electronic message information of TMCC" is prioritized for display on the monitor.

When an emergency warning (early warning) is transmitted by a main broadcast signal (stream), and an emergency warning (early warning) is transmitted instead of a program currently being viewed, the emergency warning (early warning) is prioritized for display on the monitor.

When video information, still image information, or electronic message information is not transmitted in TMCC, "video information (or still image information) transmitted by a main broadcast signal (stream)" is displayed on the monitor.

Methods of prioritizing display are as described above.

Prioritize emergency warning (early warning) information display during emergency warning (early warning):

When this mode is selected for a terminal and emergency warning (early warning) video information, still image information, or electronic message information is transmitted in TMCC, "video information, still image information, or electronic message information of TMCC" is prioritized for display on the monitor.

When an emergency warning (early warning) is transmitted by a main broadcast signal (stream), and an emergency warning (early warning) is transmitted instead of a program currently being viewed, the emergency warning (early warning) is prioritized for display on the monitor.

When emergency warning (early warning) video information, still image information, and electronic message information are not transmitted in TMCC, "video information (or still image information) transmitted by a main broadcast signal (stream)" is prioritized and displayed on the monitor.

For example, when video information, still image information, or electronic message information other than emergency warning (early warning) information is transmitted in TMCC, "video information (or still image information) transmitted by a main broadcast signal (stream)" is prioritized, and display of the video information, still image information, or electronic message information other than emergency warning (early warning) information of TMCC is not prioritized.

When video information, still image information, or electronic message information is not transmitted in TMCC, "video information (or still image information) transmitted by a main broadcast signal (stream)" is displayed on the monitor.

Methods of prioritizing display are as described above.

Prioritize broadcast display:

When this mode is selected for a terminal, "video information (or still image information) transmitted by a main broadcast signal (stream)" is prioritized for display on the monitor.

Methods of prioritizing display are as described above.

In order to set a mode selected from among modes displayed on screen, the setting signal of FIG. 96 transmits a control signal. The screen controller GG103 of FIG. 96 sets priorities of display output according to a mode selected by a user, and displays screens according to the priorities set.

As above, display output is controlled according to a mode selected by a user, and therefore display of the mode selected by the user is appropriately visible to the user. Further, a user that prioritized "emergency warning (early warning) display" can view an emergency warning (early warning) display when appropriate, achieving an effect of ensuring safety of the user.

Next, description is provided for an example of operation when region information is included in TMCC, as described in embodiment BB and embodiment CC, with respect to the embodiment described above.

As above, referring to the embodiment described with reference to FIG. 90 and FIG. 91, details of each mode indicated in FIG. 91 are as follows.

Display Side-by-Side:

When this mode is selected for a terminal, region information included in TMCC matches a region to which the terminal belongs, and video information, still image information, or electronic message information is transmitted in TMCC, "video information, still image information, or electronic message information of TMCC" and "video information (or still image information) transmitted by a main broadcast signal (stream)" are displayed side-by-side on the monitor.

In FIG. 92, GG200 is a monitor and, for example, "video information, still image information, or electronic message information of TMCC" is displayed on screen #1 (GG201) and "video information (or still image information) transmitted by a main broadcast signal (stream)" is displayed on screen #2 (GG202) so that the monitor displays two screens side-by-side.

When region information included in TMCC does not match a region to which the terminal belongs, the monitor G200 displays "video information (or still image information) transmitted by a main broadcast signal (stream)" (screen #1 (GG201)) as illustrated in FIG. 93.

When region information is not included in TMCC, and video information, still image information, or electronic message information is transmitted in TMCC, "video information, still image information, or electronic message information of TMCC" and "video information (or still image information) transmitted by a main broadcast signal (stream)" are displayed side-by-side on the monitor.

When "video information, still image information, or electronic message information of TMCC" is not transmitted, the monitor G200 displays "video information (or still image information) transmitted by a main broadcast signal (stream)" (screen #1 (GG201)) as illustrated in FIG. 93.

Prioritize TMCC information display:

When this mode is selected for a terminal, region information included in TMCC matches a region to which the terminal belongs, and video information, still image information, or electronic message information is transmitted in TMCC, "video information, still image information, or electronic message information of TMCC" is prioritized for display on the monitor.

When region information included in TMCC does not match a region to which the terminal belongs, and video information, still image information, or electronic message information is transmitted in TMCC, "video information (or still image information) transmitted by a main broadcast signal (stream)" is displayed on the monitor.

When region information is not included in TMCC, and video information, still image information, or electronic message information is transmitted in TMCC, "video information, still image information, or electronic message information of TMCC" is prioritized for display on the monitor.

When video information, still image information, or electronic message information is not transmitted in TMCC, "video information (or still image information) transmitted by a main broadcast signal (stream)" is displayed on the monitor.

Methods of prioritizing display are as described above.

Prioritize TMCC information display during emergency warning (early warning):

When this mode is selected for a terminal, region information included in TMCC matches a region to which the terminal belongs, and emergency warning (early warning) video information, still image information, or electronic message information is transmitted in TMCC, "video information, still image information, or electronic message information of TMCC" is prioritized for display on the monitor.

When region information included in TMCC does not match a region to which the terminal belongs, and emergency warning (early warning) video information, still image information, or electronic message information is transmitted in TMCC, "video information (or still image information) transmitted in a main broadcast signal (stream)" is prioritized for display on the monitor.

When region information is not included in TMCC, and video information, still image information, or electronic message information is transmitted in TMCC, "video information, still image information, or electronic message information of TMCC" is prioritized for display on the monitor.

When emergency warning (early warning) video information, still image information, or electronic message information is not transmitted in TMCC, "video information (or still image information) transmitted by a main broadcast signal (stream)" is prioritized for display on the monitor.

For example, when video information, still image information, or electronic message information other than emergency warning (early warning) information is transmitted in TMCC, "video information (or still image information) transmitted by a main broadcast signal (stream)" is prioritized, and display of the video information, still image information, or electronic message information other than emergency warning (early warning) information of TMCC is not prioritized.

When video information, still image information, or electronic message information is not transmitted in TMCC, "video information (or still image information) transmitted by a main broadcast signal (stream)" is displayed on the monitor.

Methods of prioritizing display are as described above.

Prioritize broadcast display:

When this mode is selected for a terminal, "video information (or still image information) transmitted by a main broadcast signal (stream)" is prioritized for display on the monitor.

Methods of prioritizing display are as described above.

In order to set a mode selected from among modes displayed on screen, the setting signal of FIG. 90 transmits a control signal. The screen controller GG103 of FIG. 90 sets priorities of display output according to a mode selected by a user, and displays screens according to the priorities set.

As above, referring to the embodiment described with reference to FIG. 96 and FIG. 97, details of each mode indicated in FIG. 97 are as follows.

Display side-by-side:

When this mode is selected for a terminal, region information included in TMCC matches a region to which the terminal belongs, and video information, still image information, or electronic message information is transmitted in TMCC, "video information, still image information, or electronic message information of TMCC" and "video information (or still image information) transmitted by a main broadcast signal (stream)" are displayed side-by-side on the monitor.

In FIG. 92, GG200 is a monitor and, for example, "video information, still image information, or electronic message information of TMCC" is displayed on screen #1 (GG201) and "video information (or still image information) transmitted by a main broadcast signal (stream)" is displayed on screen #2 (GG202) so that the monitor displays two screens side-by-side.

When region information included in TMCC does not match a region to which the terminal belongs, the monitor G200 displays "video information (or still image information) transmitted by a main broadcast signal (stream)" (screen #1 (GG201)) as illustrated in FIG. 93.

When region information is not included in TMCC, and video information, still image information, or electronic message information is transmitted in TMCC, "video information, still image information, or electronic message information of TMCC" and "video information (or still image information) transmitted by a main broadcast signal (stream)" are displayed side-by-side on a monitor.

When "video information, still image information, or electronic message information of TMCC" is not transmitted, the monitor G200 displays "video information (or still image information) transmitted by a main broadcast signal (stream)" (screen #1 (GG201)) as illustrated in FIG. 93.

When an emergency warning (early warning) is transmitted by a main broadcast signal (stream), and an emergency warning (early warning) is transmitted instead of a program currently being viewed, the emergency warning (early warning) is displayed on screen #1 (GG201) of the monitor G200, as in FIG. 93.

Prioritize TMCC Information Display:

When this mode is selected for a terminal, region information included in TMCC matches a region to which the terminal belongs, and video information, still image information, or electronic message information is transmitted in TMCC, "video information, still image information, or electronic message information of TMCC" is prioritized for display on the monitor.

When region information included in TMCC does not match a region to which the terminal belongs, and video information, still image information, or electronic message information is transmitted in TMCC, "video information (or still image information) transmitted by a main broadcast signal (stream)" is displayed on the monitor.

When region information is not included in TMCC, and video information, still image information, or electronic message information is transmitted in TMCC, "video information, still image information, or electronic message information of TMCC" is prioritized for display on the monitor.

When an emergency warning (early warning) is transmitted by a main broadcast signal (stream), and an emergency warning (early warning) is transmitted instead of a program currently being viewed, the emergency warning (early warning) is prioritized for display on the monitor.

When video information, still image information, or electronic message information is not transmitted in TMCC, "video information (or still image information) transmitted by a main broadcast signal (stream)" is displayed on the monitor.

Methods of prioritizing display are as described above.

Prioritize emergency warning (early warning) during emergency warning (early warning):

When this mode is selected for a terminal, information included in TMCC matches a region to which the terminal belongs and emergency warning (early warning) video information, still image information, or electronic message information is transmitted in TMCC, "video information, still image information, or electronic message information of emergency warning (early warning) of TMCC" is prioritized for display on the monitor.

When region information included in TMCC does not match a region to which the terminal belongs, and emergency warning (early warning) video information, still image information, or electronic message information is transmitted in TMCC, "video information (or still image information) transmitted in a main broadcast signal (stream)" is prioritized for display on the monitor.

When region information is not included in TMCC, and emergency warning (early warning) video information, still image information, or electronic message information is transmitted in TMCC, "emergency warning (early warning) video information, still image information, or electronic message information of TMCC" is prioritized for display on the monitor.

When an emergency warning (early warning) is transmitted by a main broadcast signal (stream), and an emergency warning (early warning) is transmitted instead of a program currently being viewed, the emergency warning (early warning) is prioritized for display on the monitor.

When emergency warning (early warning) video information, still image information, or electronic message information is not transmitted in TMCC, "video information (or still image information) transmitted by a main broadcast signal (stream)" is prioritized for display on the monitor.

For example, when video information, still image information, or electronic message information other than emergency warning (early warning) information is transmitted in TMCC, "video information (or still image information) transmitted by a main broadcast signal (stream)" is prioritized, and display of the video information, still image information, or electronic message information other than emergency warning (early warning) information of TMCC is not prioritized.

When video information, still image information, or electronic message information is not transmitted in TMCC, "video information (or still image information) transmitted by a main broadcast signal (stream)" is displayed on the monitor.

Methods of prioritizing display are as described above.

Prioritize Broadcast Display:

When this mode is selected for a terminal, "video information (or still image information) transmitted by a main broadcast signal (stream)" is prioritized for display on the monitor.

Methods of prioritizing display are as described above.

In order to set a mode selected from among modes displayed on screen, the setting signal of FIG. 96 transmits a control signal. The screen controller GG103 of FIG. 96 sets priorities of display output according to a mode selected by a user, and displays screens according to the priorities set.

In the description above, transmission of "emergency warning (early warning) video information, still image information, or electronic message information" or "video information, still image information, or electronic message information" in TMCC is described. In particular, when "still image information" or "electronic message information" is transmitted by a transmit station, even if a terminal obtains the information, display processing, i.e., processing with respect to display time on a monitor, depends on the terminal. Because of this, a transmission system that transmits information broadly, precisely, and as equitably as possible is not achieved.

Accordingly, when "still image information or electronic message information" is transmitted in TMCC, information related to time for which a terminal displays the information on screen may be transmitted by a transmit station.

Table 28 illustrates an example of correspondence between $\Omega_0\Omega_1\Omega_2$ and display time. In Table 28, $\Omega_0\Omega_1\Omega_2$ is information related to display time and transmitted by using TMCC. (Three-bit information is illustrated here, but this is just an example and not limiting.)

When a transmit station transmits "000" as $\Omega_0\Omega_1\Omega_2$, a display time of "still image information or electronic message information" transmitted by using TMCC is interpreted by a terminal to be one minute.

Likewise:

When a transmit station transmits "001" as $\Omega_0\Omega_1\Omega_2$, a display time of "still image information or electronic message information" transmitted by using TMCC is interpreted by a terminal to be two minutes.

When a transmit station transmits "010" as $\Omega_0\Omega_1\Omega_2$, a display time of "still image information or electronic message information" transmitted by using TMCC is interpreted by a terminal to be three minutes.

When a transmit station transmits "011" as $\Omega_0\Omega_1\Omega_2$, a display time of "still image information or electronic message information" transmitted by using TMCC is interpreted by a terminal to be four minutes.

When a transmit station transmits "100" as $\Omega_0\Omega_1\Omega_2$, a display time of "still image information or electronic message information" transmitted by using TMCC is interpreted by a terminal to be five minutes.

When a transmit station transmits "101" as $\Omega_0\Omega_1\Omega_2$, a display time of "still image information or electronic message information" transmitted by using TMCC is interpreted by a terminal to be ten minutes.

When a transmit station transmits "110" as $\Omega_0\Omega_1\Omega_2$, a display time of "still image information or electronic message information" transmitted by using TMCC is interpreted by a terminal to be 30 minutes.

When a transmit station transmits "111" as $\Omega_0\Omega_1\Omega_2$, a display time of "still image information or electronic message information" transmitted by using TMCC is interpreted by a terminal to be 60 minutes.

TABLE 28

Correspondence between $\Omega_0\Omega_1\Omega_2$ and display time

| $\Omega_0\Omega_1\Omega_2$ | Display time |
|---|---|
| 000 | 1 minute |
| 001 | 2 minutes |
| 010 | 3 minutes |
| 011 | 4 minutes |
| 100 | 5 minutes |
| 101 | 10 minutes |
| 110 | 30 minutes |
| 111 | 60 minutes |

However, a terminal doesn't have to adhere to the display time obtained from $\Omega_0\Omega_1\Omega_2$. For example, when a user executes a setting to cancel display of "still image information or electronic message information" transmitted by using TMCC, display of "still image information or electronic message information" transmitted by using TMCC may be cancelled.

Further, a case may be considered in which a first "still image information or electronic message information" and $\Omega_0\Omega_1\Omega_2$ are transmitted by a transmit station, and, during display time of the first "still image information or electronic message information", a second "still image information or electronic message information" is transmitted by a transmit station. In this case, a terminal may display the second "still image information or electronic message information" upon obtaining the second "still image information or electronic message information", even during display time of the first "still image information or electronic message information".

However, in this case, a transmit station may accumulate this information during a time of the first "still image information or electronic message information" set by $\Omega_0\Omega_1\Omega_2$.

In other words, an accumulation time of "still image information or electronic message information" transmitted by using TMCC may be interpreted as being set by transmitting $\Omega_0\Omega_1\Omega_2$ as per Table 28. When an accumulation time is exceeded, the "still image information or electronic message information" transmitted by using TMCC is deleted from a terminal.

In this case, when a plurality of "still image information or electronic message information transmitted by using TMCC" is accumulated by a terminal, a "still image information or electronic message information transmitted by using TMCC" can be selected for display on a monitor by a user of the terminal.

Further, as another example, a display start flag may be transmitted in connection with "still image information or electronic message information" in TMCC. (However, a display start flag may be transmitted in a different frame to a frame transmitting "still image information or electronic message information".) A method may also be used in which, subsequently, a display end flag for ending display is transmitted by a transmit station.

In this way, by setting a display time or accumulation time of "still image information or electronic message information transmitted by using TMCC", a transmission system can be provided that broadly, precisely, and as equitably as possible transmits "still image information or electronic message information transmitted by using TMCC". In particular, because a user can view an emergency warning (early warning) screen as appropriate, a result is achieved of ensuring safety of a user who makes a selection.

In the present embodiment, an example of a system composed of a transmit station, a repeater, and a terminal is described as in embodiment B, embodiment C, embodiment D, embodiment E, embodiment F, and embodiment G, but a system composed of a transmit station and a terminal may of course be implemented similarly.

Embodiment HH

Embodiment AA, embodiment BB, embodiment CC, embodiment DD, embodiment EE, embodiment FF, and embodiment GG disclose transmitting emergency warning (early warning) information by using TMCC. In the present embodiment, a more detailed method of transmitting emergency warning (early warning) information is described.

As described in embodiment FF and embodiment GG, a transmit station is required to precisely transmit emergency warning (early warning) information to terminals. (In order to increase the probability of ensuring safety of users.) Thus, in the present embodiment, a method for precisely transmitting emergency warning (early warning) information to terminals is described.

In the present embodiment, for example, as described in embodiment FF and embodiment GG, a case is considered in which emergency warning (early warning) information that is "electronic message information", "video", "still image", "audio", etc., or information other than emergency warning (early warning) information that is "electronic message information", "video", "still image", "audio", etc., is transmitted by a transmit station by using TMCC.

In this case, it is unlikely that information that is "electronic message information", "video", "still image", "audio", etc., can be transmitted in one frame of TMCC. Accordingly, a frame count (using only a TMCC region) required to transmit information that is "electronic message information", "video", "still image", "audio", etc., may be transmitted by a transmit station to a terminal.

Figure 98:
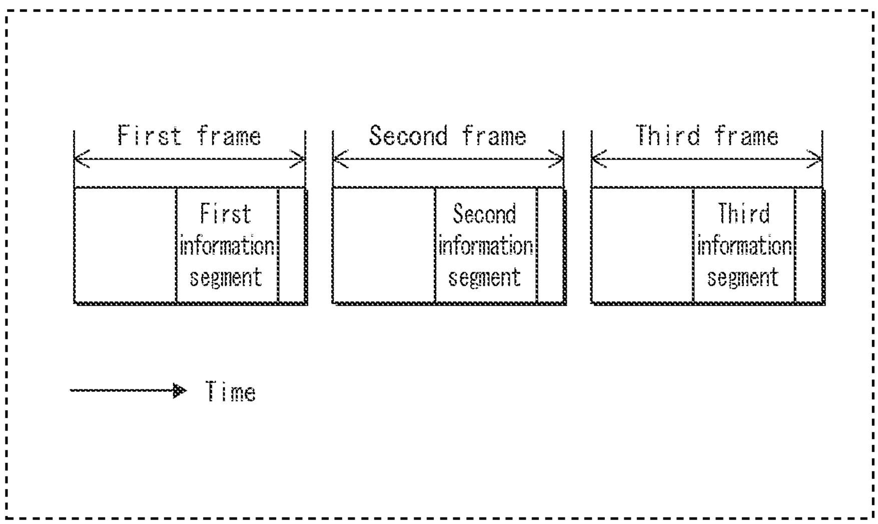
FIG. 98 illustrates an example of frame transmission state.

For example, as in FIG. 98, three frames (using only a TMCC region) are required to transmit information that is "electronic message information", "video", "still image", "audio", etc., to a terminal. In this case, the information that is "electronic message information", "video", "still image", "audio", etc., is divided into a "first information segment", a "second information segment", and a "third information segment", and the "first information segment" is transmitted in a first frame, the "second information segment" is transmitted in a second frame, and the "third information segment" is transmitted in a third frame. In FIG. 98, the horizontal axis is time.

In this case, TMCC includes information that is "electronic message information", "video", "still image", "audio", etc., and information other than the information that is "electronic message information", "video", "still image", "audio", etc. Further, because the TMCC is data after error correction coding, for example using systematic code such as low-density parity-check (LDPC) code, the TMCC includes the information and parity. Accordingly, the "first information segment" is a portion of "first TMCC", the "second information segment" is a portion of "second TMCC", and the "third information segment" is a portion of "third TMCC". Thus, the "first TMCC" is transmitted in the first frame, the "second TMCC" is transmitted in the second frame, and the "third TMCC" is transmitted in the third frame.

TABLE 29

Correspondence between $\delta_0\delta_1\delta_2$ and frame count required for transmitting information that is "electronic message information", "video", "still image", "audio", etc.

| $\delta_0\delta_1\delta_2$ | Frame count |
|---|---|
| 000 | 1 Frame |
| 001 | 2 Frames |
| 010 | 3 Frames |
| 011 | 4 Frames |
| 100 | 5 Frames |
| 101 | 6 Frames |
| 110 | 7 Frames |
| 111 | 8 Frames |

TABLE 30

Correspondence between $\varepsilon_0\varepsilon_1\varepsilon_2$ and number of frame transmitting information that is "electronic message information", "video", "still image", "audio", etc.

| $\varepsilon_0\varepsilon_1\varepsilon_2$ | Frame number |
|---|---|
| 000 | First frame |
| 001 | Second frame |
| 010 | Third frame |
| 011 | Fourth frame |
| 100 | Fifth frame |
| 101 | Sixth frame |
| 110 | Seventh frame |
| 111 | Eighth frame |

Table 29 illustrates correspondence between $\delta_0\delta_1\delta_2$ and frame count required for transmitting information that is "electronic message information", "video", "still image", "audio", etc., and Table 30 illustrates correspondence between $\varepsilon_0\varepsilon_1\varepsilon_2$ and number of frame transmitting information that is "electronic message information", "video", "still image", "audio", etc.

From Table 29, when a frame count (number of required TMCC) required to transmit information that is "electronic message information", "video", "still image", "audio", etc., is one, $\delta_0\delta_1\delta_2$="000" is set.

In the same way, when a frame count (number of required TMCC) required to transmit information that is "electronic message information", "video", "still image", "audio", etc., is two, $\delta_0\delta_1\delta_2$="001" is set.

When a frame count (number of required TMCC) required to transmit information that is "electronic message information", "video", "still image", "audio", etc., is three, $\delta_0\delta_1\delta_2$="010" is set.

When a frame count (number of required TMCC) required to transmit information that is "electronic message information", "video", "still image", "audio", etc., is four, $\delta_0\delta_1\delta_2$="011" is set.

When a frame count (number of required TMCC) required to transmit information that is "electronic message information", "video", "still image", "audio", etc., is five, $\delta_0\delta_1\delta_2$="100" is set.

When a frame count (number of required TMCC) required to transmit information that is "electronic message information", "video", "still image", "audio", etc., is six, $\delta_0\delta_1\delta_2$="101" is set.

When a frame count (number of required TMCC) required to transmit information that is "electronic message information", "video", "still image", "audio", etc., is seven, $\delta_0\delta_1\delta_2$="110" is set.

When a frame count (number of required TMCC) required to transmit information that is "electronic message information", "video", "still image", "audio", etc., is eight, $\delta_0\delta_1\delta_2$="111" is set.

Although $\delta_0\delta_1\delta_2$ is three bits in the present example, this is not a limitation and the number of bits required for notifying a terminal of a frame count (number of required TMCC) required for transmitting information that is "electronic message information", "video", "still image", "audio", etc., may be any number equal to or greater than two.

The following describes in detail the example of FIG. 98, with regard to Table 30.

TMCC information includes $\delta_0\delta_1\delta_2$ of Table 29 and $\varepsilon_0\varepsilon_1\varepsilon_2$ of Table 30. Accordingly, a transmit station transmits $\delta_0\delta_1\delta_2$ of Table 29 and $\varepsilon_0\varepsilon_1\varepsilon_2$ of Table 30 along with the information that is "electronic message information", "video", "still image", "audio", etc.

The following describes setting values of $\delta_0\delta_1\delta_2$ of Table 29 and $\varepsilon_0\varepsilon_1\varepsilon_2$ of Table 30, using FIG. 98 as an example.

In FIG. 98, information that is "electronic message information", "video", "still image", "audio", etc., is divided into a "first information segment", a "second information segment", and a "third information segment", and the "first information segment" ("first TMCC") is transmitted in a first frame, the "second information segment" ("second TMCC") is transmitted in a second frame, and the "third information segment" ("third TMCC") is transmitted in a third frame. In other words, three frames are required to transmit the information that is "electronic message information", "video", "still image", "audio", etc. Accordingly, from Table 29, $\delta_0\delta_1\delta_2$="010" is set. Thus, $\delta_0\delta_1\delta_2$="010" is transmitted in "first TMCC" transmitted in the first frame. In the same way, $\delta_0\delta_1\delta_2$="010" is transmitted in "second TMCC" transmitted in the second frame, and $\delta_0\delta_1\delta_2$="010" is transmitted in "third TMCC" transmitted in the third frame.

Table 30 illustrates correspondence between $\varepsilon_0\varepsilon_1\varepsilon_2$ and number of a frame transmitting information that is "electronic message information", "video", "still image", "audio", etc. Accordingly, the "first information segment" is transmitted in the first frame, and therefore $\varepsilon_0\varepsilon_1\varepsilon_2$="000" is set and $\varepsilon_0\varepsilon_1\varepsilon_2$="000" is transmitted in the "first TMCC".

In the same way, the "second information segment" is transmitted in the second frame, and therefore $\varepsilon_0\varepsilon_1\varepsilon_2$="001" is set and $\varepsilon_0\varepsilon_1\varepsilon_2$="001" is transmitted in the "second TMCC".

The "third information segment" is transmitted in the third frame, and therefore $\varepsilon_0\varepsilon_1\varepsilon_2$="010" is set and $\varepsilon_0\varepsilon_1\varepsilon_2$="010" is transmitted in the "third TMCC".

In other words, in the case of FIG. 98, information that is "electronic message information", "video", "still image", "audio", etc., is divided into X parts (X being an integer equal to or greater than one), and a transmit station transmits the three bits of $\varepsilon_0\varepsilon_1\varepsilon_2$ as a portion of TMCC information, $\varepsilon_0\varepsilon_1\varepsilon_2$ indicating for each frame a frame number of Table 30 as a "Y-th frame" in a frame that transmits a "Y-th information segment" (Y being an integer from 1 to Y).

(Although $\varepsilon_0\varepsilon_1\varepsilon_2$ is three bits in the present example, this is not a limitation and the number of bits required for notifying a terminal of the number of a frame transmitting information that is "electronic message information", "video", "still image", "audio", etc., may be any number equal to or greater than two.)

Thus, a terminal can be notified of a required frame count to obtain information that is "electronic message information", "video", "still image", "audio", etc., by obtaining $\delta_0\delta_1\delta_2$, and can be notified of how far frame reception is complete, within the required frame count, by obtaining $\varepsilon_0\varepsilon_1\varepsilon_2$.

The following describes an example that is different from FIG. 98.

A transmit station is required to precisely transmit emergency warning (early warning) information to terminals. When a terminal is unable to correctly obtain any one of the "first information segment", the "second information segment", and the "third information segment" transmitted as in FIG. 98, it becomes difficult to provide content of an emergency warning (early warning) to a user. Accordingly, application of a method that can allow, as much as possible, all of the information of the "first information segment", the "second information segment", and the "third information segment" to be correctly received is of importance. In particular, when emergency warning (early warning) information is a "still image", "audio", or "electronic message information", application of a method that can allow, as much as possible, all of the information of the "first information segment", the "second information segment", and the "third information segment" to be correctly received is desirable. (In the case of video, the emergency warning (early warning) may be communicated even if a portion of the video cannot be played back.)

Here, in order that a terminal be able to correctly obtain information, a method is presented by which a transmit station repeatedly transmits "emergency warning (early warning) information".

Table 31 illustrates correspondence between $\sigma_0\sigma_1$ and the number of transmissions. Note that $\sigma_0\sigma_1$ is a portion of TMCC information, and transmitted by a transmit station.

Table 31 shows the following.

When the number of transmissions is one, $\sigma_0\sigma_1$="00" is set and a transmit station transmits $\sigma_0\sigma_1$="00".

When the number of transmissions is two, $\sigma_0\sigma_1$="01" is set and a transmit station transmits $\sigma_0\sigma_1$="01".

When the number of transmissions is three, $\sigma_0\sigma_1$="10" is set and a transmit station transmits $\sigma_0\sigma_1$="10".

When the number of transmissions is four, $\sigma_0\sigma_1$="11" is set and a transmit station transmits $\sigma_0\sigma_1$="11".

Although $\sigma_0\sigma_1$ is composed of two bits, this is just an example, and the required number of bits changes along with the maximum number of transmissions a transmit station supports.

TABLE 31

Correspondence between $\sigma_0\sigma_1$ and number of transmissions

| $\sigma_0\sigma_1$ | Number of transmissions |
|---|---|
| 00 | 1 |
| 01 | 2 |
| 10 | 3 |
| 11 | 4 |

Figure 99:
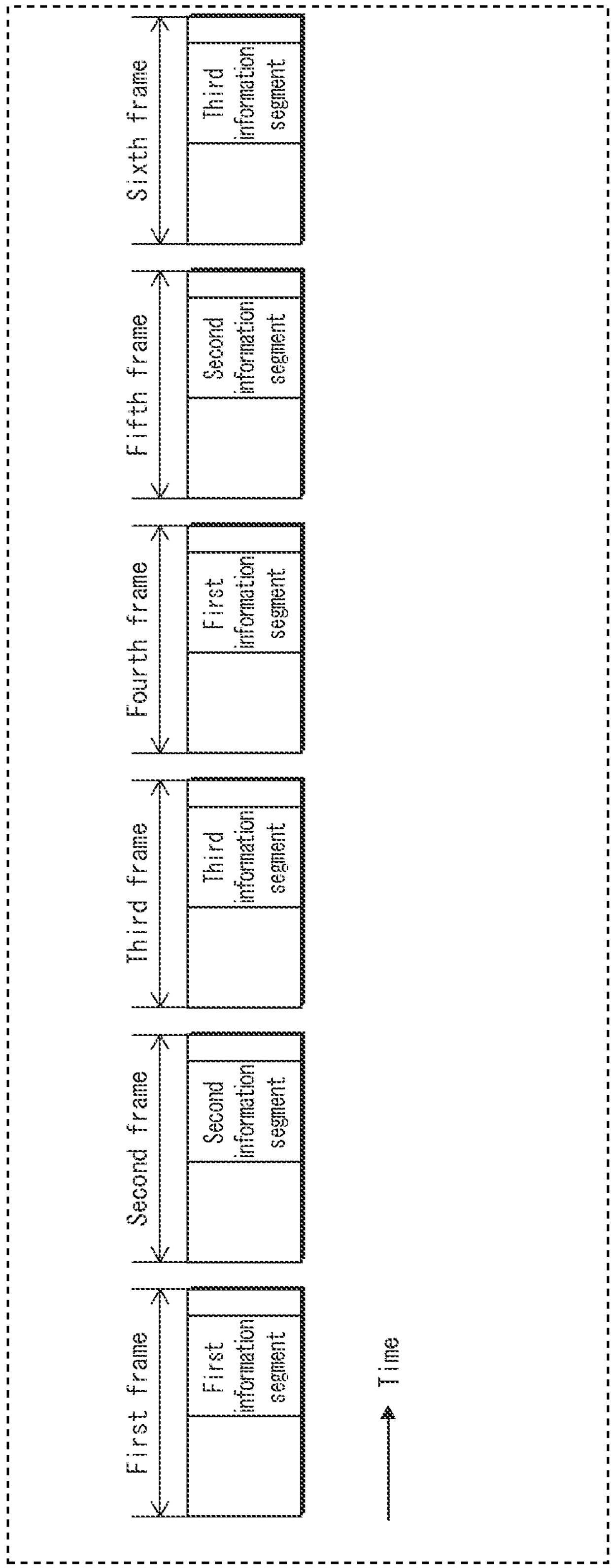
FIG. 99 illustrates an example of frame transmission state.

FIG. 99 illustrates an example of frame transmission when the number of transmissions is two. In FIG. 99, the horizontal axis is time.

As in FIG. 98, "emergency warning (early warning) video information, still image information, or electronic message information" is divided into a "first information segment", a "second information segment", and a "third information segment", and a terminal can generate the "emergency warning (early warning) video information, still image information, or electronic message information" by obtaining the "first information segment", the "second information segment", and the "third information segment".

Accordingly, assuming the "emergency warning (early warning) video information, still image information, or electronic message information" is divided into three and the number of transmissions is two, the number of frames required to transmit the "emergency warning (early warning) video information, still image information, or electronic message information" is 3×2=6. Accordingly, in FIG. 99, a transmit station transmits:

a first information segment in a first frame;

a second information segment in a second frame;

a third information segment in a third frame;

a first information segment in a fourth frame;

a second information segment in a fifth frame; and a third information segment in a sixth frame.

In this case, $\delta_0\delta_1\delta_2$, $\varepsilon_0\varepsilon_1\varepsilon_2$, and $\sigma_0\sigma_1$ are set as follows, and transmitted by a transmit station.

In the first frame, $\delta_0\delta_1\delta_2$="101", $\varepsilon_0\varepsilon_1\varepsilon_2$="000", $\sigma_0\sigma_1$="01".

In the second frame, $\delta_0\delta_1\delta_2$="101", $\varepsilon_0\varepsilon_1\varepsilon_2$="001", $\sigma_0\sigma_1$="01".

In the third frame, $\delta_0\delta_1\delta_2$="101", $\varepsilon_0\varepsilon_1\varepsilon_2$="010", $\sigma_0\sigma_1$="01".

In the fourth frame, $\delta_0\delta_1\delta_2$="101", $\varepsilon_0\varepsilon_1\varepsilon_2$="011", $\sigma_0\sigma_1$="01".

In the fifth frame, $\delta_0\delta_1\delta_2$="101", $\varepsilon_0\varepsilon_1\varepsilon_2$="100", $\sigma_0\sigma_1$="01".

In the sixth frame, $\delta_0\delta_1\delta_2$="101", $\varepsilon_0\varepsilon_1\varepsilon_2$="101", $\sigma_0\sigma_1$="01".

(This transmission method is referred to as a "first repetition method".)

Figure 100:
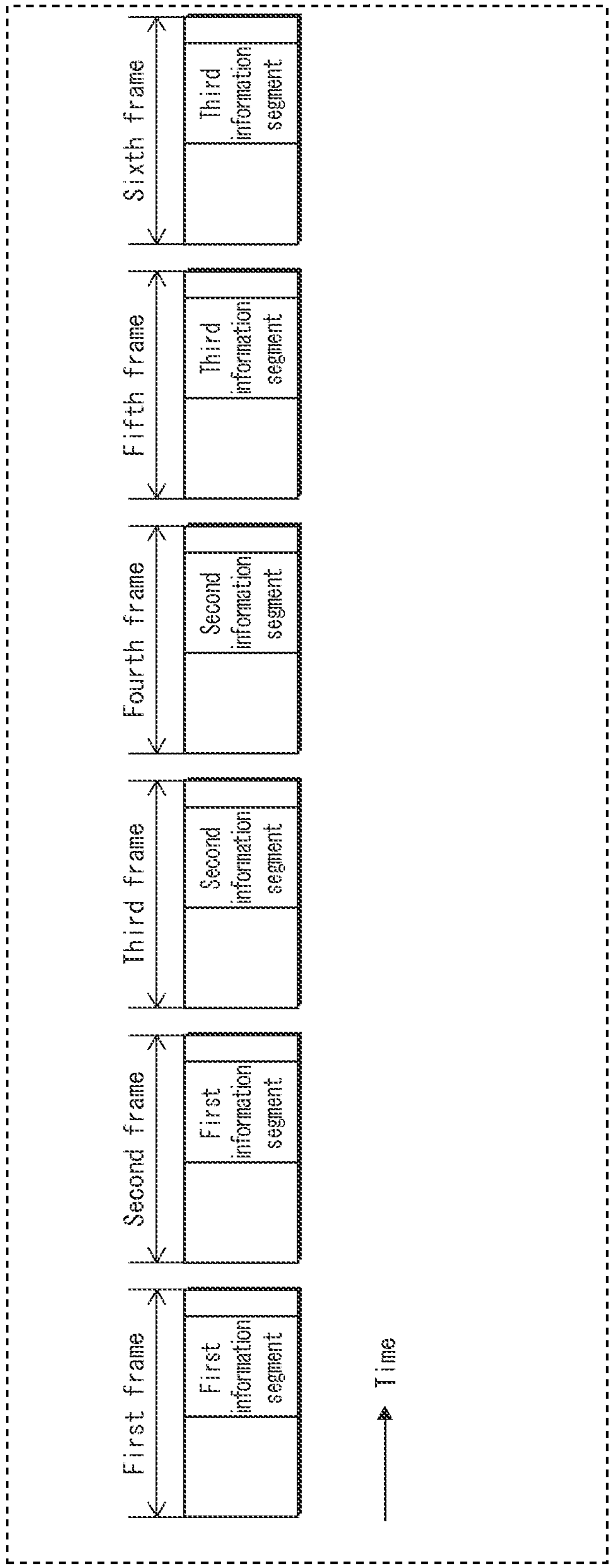
FIG. 100 illustrates an example of frame transmission state.

When the number of transmissions is two, frame transmission is not limited to the example of FIG. 99, and different transmission orders may be used. FIG. 100 illustrates such an example of frame transmission when the number of transmissions is two. In FIG. 100, the horizontal axis is time.

In FIG. 100, a transmit station transmits:

a first information segment in a first frame;

a first information segment in a second frame;

a second information segment in a third frame;

a second information segment in a fourth frame;

a third information segment in a fifth frame; and a third information segment in a sixth frame.

In this case, $\delta_0\delta_1\delta_2$, $\varepsilon_0\varepsilon_1\varepsilon_2$ and $\sigma_0\sigma_1$ are set as follows, and transmitted by a transmit station.

In the first frame, $\delta_0\delta_1\delta_2$="101", $\varepsilon_0\varepsilon_1\varepsilon_2$="000", $\sigma_0\sigma_1$="01".

In the second frame, $\delta_0\delta_1\delta_2$="101", $\varepsilon_0\varepsilon_1\varepsilon_2$="001", $\sigma_0\sigma_1$="01".

In the third frame, $\delta_0\delta_1\delta_2$="101", $\varepsilon_0\varepsilon_1\varepsilon_2$="010", $\sigma_0\sigma_1$="01".

In the fourth frame, $\delta_0\delta_1\delta_2$="101", $\varepsilon_0\varepsilon_1\varepsilon_2$="011", $\sigma_0\sigma_1$="01".

In the fifth frame, $\delta_0\delta_1\delta_2$="101", $\varepsilon_0\varepsilon_1\varepsilon_2$="100", $Q_0a_1$"01".

In the sixth frame, $\delta_0\delta_1\delta_2$="101", $\varepsilon_0\varepsilon_1\varepsilon_2$="101", $\sigma_0\sigma_1$="01".

(This transmission method is referred to as a "second repetition method".)

The "first repetition method" and the "second repetition method" are described using FIG. 99 and FIG. 100, but the order of transmission of information segments is not limited to the examples in FIG. 99 and FIG. 100. The value of $\varepsilon_0\varepsilon_1\varepsilon_2$ is also required to correspond to the order in which information segments are transmitted.

The above describes an example in which $\delta_0\delta_1\delta_2$, $\varepsilon_0\varepsilon_1\varepsilon_2$, and $\sigma_0\sigma_1$ are transmitted in TMCC. The following describes a method of transmitting $\delta'_0\delta'_1\delta'_2$ instead of $\delta_0\delta_1\delta_2$ and $\varepsilon'_0\varepsilon'_1\varepsilon'_2$ instead of $\varepsilon_0\varepsilon_1\varepsilon_2$ in TMCC.

Table 32 illustrates correspondence between $\delta'_0\delta'_1\delta'_2$ and a frame count (number of required TMCC) required to transmit information that is "electronic message information", "video", "still image", "audio", etc., without repetition. Table 33 illustrates correspondence between $\varepsilon'_0\varepsilon'_1\varepsilon'_2$ and frame number of each frame transmitted when information that is "electronic message information", "video", "still image", "audio", etc., is transmitted without repetition.

TABLE 32

Correspondence between $\delta'_0\delta'_1\delta'_2$ and a frame count (number of required TMCC) required to transmit information that is "electronic message information", "video", "still image", "audio", etc., without repetition

| $\delta'_0\delta'_1\delta'_2$ | Frame count |
|---|---|
| 000 | 1 Frame |
| 001 | 2 Frames |
| 010 | 3 Frames |
| 011 | 4 Frames |
| 100 | 5 Frames |
| 101 | 6 Frames |
| 110 | 7 Frames |
| 111 | 8 Frames |

TABLE 33

Correspondence between $\varepsilon'_0\varepsilon'_1\varepsilon'_2$ and frame number of each frame transmitted when information that is "electronic message information", "video", "still image", "audio", etc., is transmitted without repetition

| $\varepsilon'_0\varepsilon'_1\varepsilon'_2$ | Frame number |
|---|---|
| 000 | First frame |
| 001 | Second frame |
| 010 | Third frame |
| 011 | Fourth frame |
| 100 | Fifth frame |
| 101 | Sixth frame |
| 110 | Seventh frame |
| 111 | Eighth frame |

As in Table 32, when the frame count (number of required TMCC) required to transmit information that is "electronic message information", "video", "still image", "audio", etc., without repetition is one, $\delta'_0\delta'_1\delta'_2$="000" is set. Repetition may be performed, and this point is described in detail later. Setting of $\delta'_0\delta'_1\delta'_2$ when repetition is performed is also described too.

When the frame count (number of required TMCC) required to transmit information that is "electronic message information", "video", "still image", "audio", etc., without repetition is two, $\delta'_0\delta'_1\delta'_2$="001" is set.

When the frame count (number of required TMCC) required to transmit information that is "electronic message information", "video", "still image", "audio", etc., without repetition is three, $\delta'_0\delta'_1\delta'_2$="010" is set.

When the frame count (number of required TMCC) required to transmit information that is "electronic message information", "video", "still image", "audio", etc., without repetition is four, $\delta'_0\delta'_1\delta'_2$="011" is set.

When the frame count (number of required TMCC) required to transmit information that is "electronic message information", "video", "still image", "audio", etc., without repetition is five, $\delta'_0\delta'_1\delta'_2$="100" is set.

When the frame count (number of required TMCC) required to transmit information that is "electronic message information", "video", "still image", "audio", etc., without repetition is six, $\delta'_0\delta'_1\delta'_2$="101" is set.

When the frame count (number of required TMCC) required to transmit information that is "electronic message information", "video", "still image", "audio", etc., without repetition is seven, $\delta'_0\delta'_1\delta'_2$="110" is set.

When the frame count (number of required TMCC) required to transmit information that is "electronic message information", "video", "still image", "audio", etc., without repetition is eight, $\delta'_0\delta'_1\delta'_2$="111" is set.

Although $\delta'_0\delta'_1\delta'_2$ is three bits in the present example, this is not a limitation and the number of bits required for notifying a terminal of a frame count (number of required TMCC) required for transmitting information that is "electronic message information", "video", "still image", "audio", etc., when repetition is not performed may be any number equal to or greater than two.

The following describes in detail the example of FIG. 98, with regard to Table 33.

TMCC information includes $\delta'_0\delta'_1\delta'_2$ of Table 32 and $\varepsilon'_0\varepsilon'_1\varepsilon'_2$ of Table 33, and therefore a transmit station transmits $\delta'_0\delta'_1\delta'_2$ of Table 32 and $\varepsilon'_0\varepsilon'_1\varepsilon'_2$ of Table 33 along with information such as electronic message information, video, still image, audio, etc.

Next, using FIG. 98 as an example, setting values of $\delta'_0\delta'_1\delta'_2$ of Table 32 and $\varepsilon'_0\varepsilon'_1\varepsilon'_2$ of Table 33 are described.

In FIG. 98, information that is "electronic message information", "video", "still image", "audio", etc., is divided into a "first information segment", a "second information segment", and a "third information segment", and the "first information segment" ("first TMCC") is transmitted in a first frame, the "second information segment" ("second TMCC") is transmitted in a second frame, and the "third information segment" ("third TMCC") is transmitted in a third frame. In other words, three frames are required to transmit the information that is "electronic message information", "video", "still image", "audio", etc. Accordingly, from Table 32, $\delta'_0\delta'_1\delta'_2$="010" is set. Thus, $\delta'_0\delta'_1\delta'_2$="010" is transmitted in "first TMCC" transmitted in the first frame. In the same way, $\delta'_0\delta'_1\delta'_2$="010" is transmitted in "second TMCC" transmitted in the second frame, and $\delta'_0\delta'_1\delta'_2$="010" is transmitted in "third TMCC" transmitted in the third frame.

Table 33 illustrates correspondence between $\varepsilon'_0\varepsilon'_1\varepsilon'_2$ and frame number transmitted when information that is "electronic message information", "video", "still image", "audio", etc., is transmitted without repetition.

Accordingly, the "first information segment" is transmitted in the first frame, and therefore $\varepsilon'_0\varepsilon'_1\varepsilon'_2$="000" is set and $\varepsilon'_0\varepsilon'_1\varepsilon'_2$="000" is transmitted in the "first TMCC".

In the same way, the "second information segment" is transmitted in the second frame, and therefore $\varepsilon'_0\varepsilon'_1\varepsilon'_2$="001" is set and $\varepsilon'_0\varepsilon'_1\varepsilon'_2$="001" is transmitted in the "second TMCC".

The "third information segment" is transmitted in the third frame, and therefore $\varepsilon'_0\varepsilon'_1\varepsilon'_2$="010" is set and $\varepsilon'_0\varepsilon'_1\varepsilon'_2$="010" is transmitted in the "third TMCC".

In other words, in the case of FIG. 98, information that is "electronic message information", "video", "still image", "audio", etc., is divided into X parts (X being an integer equal to or greater than one), and a transmit station transmits the three bits of $\varepsilon'_0\varepsilon'_1\varepsilon'_2$ as a portion of TMCC information, $\varepsilon'_0\varepsilon'_1\varepsilon'_2$ indicating for each frame a frame number of Table 33 as a "Y-th frame" in a frame that transmits a "Y-th information segment" (Y being an integer from one to Y).

(Although $\varepsilon'_0\varepsilon'_1\varepsilon'_2$ is three bits in the present example, this is not a limitation and the number of bits required for notifying a terminal of the number of a frame transmitting information that is "electronic message information", "video", "still image", "audio", etc., may be any number equal to or greater than two.)

Thus, a terminal can be notified, when repetition is not performed, of a required frame count to obtain information that is "electronic message information", "video", "still image", "audio", etc., by obtaining $\delta'_0\delta'_1\delta'_2$, and can be notified of how far frame reception is complete, within the required frame count, by obtaining $\varepsilon'_0\varepsilon'_1\varepsilon'_2$.

The following describes an example that is different from FIG. 98.

A transmit station is required to precisely transmit emergency warning (early warning) information to terminals. When a terminal is unable to correctly obtain any one of the "first information segment", the "second information segment", and the "third information segment" transmitted as in FIG. 98, it becomes difficult to provide content of an emergency warning (early warning) to a user. Accordingly, application of a method that can allow, as much as possible, all of the information of the "first information segment", the "second information segment", and the "third information segment" to be correctly received is of importance. In particular, when emergency warning (early warning) information is a "still image", "audio", or "electronic message information", application of a method that can allow, as much as possible, all of the information of the "first information segment", the "second information segment", and the "third information segment" to be correctly received is desirable. (In the case of video, the emergency warning (early warning) may be communicated even if a portion of the video cannot be played back.)

Here, in order that a terminal be able to correctly obtain information, a transmit station repeatedly transmits "emergency warning (early warning) information".

Correspondence between $\sigma_0\sigma_1$ and number of transmissions is illustrated in Table 31, and details are provided above.

FIG. 99 illustrates an example of frame transmission when the number of transmissions is two. In FIG. 99, the horizontal axis is time.

As in FIG. 98, "emergency warning (early warning) video information, still image information, or electronic message information" is divided into a "first information segment", a "second information segment", and a "third information segment", and a terminal can generate the "emergency warning (early warning) video information, still image information, or electronic message information" by obtaining the "first information segment", the "second information segment", and the "third information segment".

Accordingly, assuming the "emergency warning (early warning) video information, still image information, or electronic message information" is divided into three and the number of transmissions is two, the number of frames required to transmit the "emergency warning (early warning) video information, still image information, or electronic message information" is 3×2=6. In FIG. 99, a transmit station transmits:

a first information segment in a first frame;

a second information segment in a second frame;

a third information segment in a third frame;

a first information segment in a fourth frame;

a second information segment in a fifth frame; and a third information segment in a sixth frame.

In this case, $\delta'_0\delta'_1\delta'_2$, $\varepsilon'_0\varepsilon'_1\varepsilon'_2$, and $\sigma_0\sigma_1$ are set as follows, and transmitted by a transmit station.

In the first frame, $\delta'_0\delta'_1\delta'_2$="010", $\varepsilon'_0\varepsilon'_1\varepsilon'_2$="000", and $\sigma_0\sigma_1$="01".

In the second frame, $\delta'_0\delta'_1\delta'_2$="010", $\varepsilon'_0\varepsilon'_1\varepsilon'_2$="001", and $\sigma_0\sigma_1$="01".

In the third frame, $\delta'_0\delta'_1\delta'_2$="010", $\varepsilon'_0\varepsilon'_1\varepsilon'_2$="010", and $\sigma_0\sigma_1$="01".

In the fourth frame, $\delta'_0\delta'_1\delta'_2$="010", $\varepsilon'_0\varepsilon'_1\varepsilon'_2$="000", and $\sigma_0\sigma_1$="01".

In the fifth frame, $\delta'_0\delta'_1\delta'_2$="010", $\varepsilon'_0\varepsilon'_1\varepsilon'_2$="001", and $\sigma_0\sigma_1$="01".

In the sixth frame, $\delta'_0\delta'_1\delta'_2$="010", $\varepsilon'_0\varepsilon'_1\varepsilon'_2$="010", and $\sigma_0\sigma_1$="01".

(This transmission method is referred to as a "third repetition method".)

In the above example of this repetition method, the number of transmissions is two, and therefore $\sigma_0\sigma_1$="01".

When the frame count (number of required TMCC) required to transmit information that is "electronic message information", "video", "still image", "audio", etc., without repetition is three, $\delta'_0\delta'_1\delta'_2$="010" is set.

When the "first information segment in the first frame" is transmitted, $\varepsilon'_0\varepsilon'_1\varepsilon'_2$="000" from Table 33, and "$\varepsilon'_0\varepsilon'_1\varepsilon'_2$="000" in the first frame" is transmitted.

When the "second information segment in the second frame" is transmitted, $\varepsilon'_0\varepsilon'_1\varepsilon'_2$="001" from Table 33, and "$\varepsilon'_0\varepsilon'_1\varepsilon'_2$="001" in the second frame" is transmitted.

When the "third information segment in the third frame" is transmitted, $\varepsilon'_0\varepsilon'_1\varepsilon'_2$="010" from Table 33, and "$\varepsilon'_0\varepsilon'_1\varepsilon'_2$="010" in the third frame" is transmitted.

When the "first information segment in the fourth frame" is transmitted, $\varepsilon'_0\varepsilon'_1\varepsilon'_2$="000" from Table 33, and "$\varepsilon'_0\varepsilon'_1\varepsilon'_2$="000" in the fourth frame" is transmitted.

When the "second information segment in the fifth frame" is transmitted, $\varepsilon'_0\varepsilon'_1\varepsilon'_2$="001" from Table 33, and "$\varepsilon'_0\varepsilon'_1\varepsilon'_2$="001" in the fifth frame" is transmitted.

When the "third information segment in the sixth frame" is transmitted, $\varepsilon'_0\varepsilon'_1\varepsilon'_2$="010" from Table 33, and "$\varepsilon'_0\varepsilon'_1\varepsilon'_2$="010" in the sixth frame" is transmitted.

In other words, in the case of FIG. 99, information that is "electronic message information", "video", "still image", "audio", etc., is divided into X parts (X being an integer equal to or greater than one), and a transmit station transmits the three bits of $\varepsilon'_0\varepsilon'_1\varepsilon'_2$ as a portion of TMCC information, $\varepsilon'_0\varepsilon'_1\varepsilon'_2$ indicating for each frame a frame number of Table 33 as a "Y-th frame" in a frame that transmits a "Y-th information segment" (Y being an integer from one to Y).

When the number of transmissions is two, frame transmission is not limited to the example of FIG. 99, and different transmission orders may be used. FIG. 100 illustrates such an example of frame transmission when the number of transmissions is two. In FIG. 100, the horizontal axis is time.

In FIG. 100, a transmit station transmits:

a first information segment in a first frame;

a first information segment in a second frame;

a second information segment in a third frame;

a second information segment in a fourth frame;

a third information segment in a fifth frame; and a third information segment in a sixth frame.

In this case, $\delta'_0\delta'_1\delta'_2$, $\varepsilon'_0\varepsilon'_1\varepsilon'_2$, and $\sigma_0\sigma_1$ are set as follows, and transmitted by a transmit station.

In the first frame, $\delta'_0\delta'_1\delta'_2$="010", $\varepsilon'_0\varepsilon'_1\varepsilon'_2$="000", and $\sigma_0\sigma_1$="01".

In the second frame, $\delta'_0\delta'_1\delta'_2$="010", $\varepsilon'_0\varepsilon'_1\varepsilon'_2$="000", and $\sigma_0\sigma_1$="01".

In the third frame, $\delta'_0\delta'_1\delta'_2$="010", $\varepsilon_0\varepsilon_1\varepsilon_2$="001", and $\sigma_0\sigma_1$="01".

In the fourth frame, $\delta'_0\delta'_1\delta'_2$="010", $\varepsilon_0\varepsilon'_1\varepsilon'_2$="001", and $\sigma_0\sigma_1$="01".

In the fifth frame, $\delta'_0\delta'_1\delta'_2$="010", $\varepsilon'_0\varepsilon'_1\varepsilon'_2$="010", and $\sigma_0\sigma_1$="01".

In the sixth frame, $\delta'_0\delta'_1\delta'_2$="010", $\varepsilon'_0\varepsilon'_1\varepsilon'_2$="010", and $\sigma_0\sigma_1$="01".

(This transmission method is referred to as a "fourth repetition method".)

In the above example of this repetition method, the number of transmissions is two, and therefore $\sigma_0\sigma_1$="01".

When the frame count (number of required TMCC) required to transmit information that is "electronic message information", "video", "still image", "audio", etc., without repetition is three, $\delta'_0\delta'_1\delta'_2$="010" is set.

When the "first information segment in the first frame" is transmitted, $\varepsilon'_0\varepsilon'_1\varepsilon'_2$="000" from Table 33, and "$\varepsilon'_0\varepsilon'_1\varepsilon'_2$="000" in the first frame" is transmitted.

When the "first information segment in the second frame" is transmitted, $\varepsilon'_0\varepsilon'_1\varepsilon'_2$="000" from Table 33, and "$\varepsilon'_0\varepsilon'_1\varepsilon'_2$="000" in the second frame" is transmitted.

When the "second information segment in the third frame" is transmitted, $\varepsilon'_0\varepsilon'_1\varepsilon'_2$="001" from Table 33, and "$\varepsilon'_0\varepsilon'_1\varepsilon'_2$="001" in the third frame" is transmitted.

When the "second information segment in the fourth frame" is transmitted, $\varepsilon'_0\varepsilon'_1\varepsilon'_2$="001" from Table 33, and "$\varepsilon'_0\varepsilon'_1\varepsilon'_2$="001" in the fourth frame" is transmitted.

When the "third information segment in the fifth frame" is transmitted, $\varepsilon'_0\varepsilon'_1\varepsilon'_2$="010" from Table 33, and "$\varepsilon'_0\varepsilon'_1\varepsilon'_2$="010" in the fifth frame" is transmitted.

When the "third information segment in the sixth frame" is transmitted, $\varepsilon'_0\varepsilon'_1\varepsilon'_2$="010" from Table 33, and "$\varepsilon'_0\varepsilon'_1\varepsilon'_2$="010" in the sixth frame" is transmitted.

In other words, in the case of FIG. 100, information that is "electronic message information", "video", "still image", "audio", etc., is divided into X parts (X being an integer equal to or greater than one), and a transmit station transmits the three bits of $\varepsilon'_0\varepsilon'_1\varepsilon'_2$ as a portion of TMCC information, $\varepsilon'_0\varepsilon'_1\varepsilon'_2$ indicating for each frame a frame number of Table 33 as a "Y-th frame" in a frame that transmits a "Y-th information segment" (Y being an integer from one to Y).

The "third repetition method" and the "fourth repetition method" are described using FIG. 99 and FIG. 100, but the order of transmission of information segments is not limited to the examples in FIG. 99 and FIG. 100. The value of $\varepsilon'_0\varepsilon'_1\varepsilon'_2$ is also required to correspond to the order in which information segments are transmitted.

Next, correspondence between information segments and other TMCC information is described in detail. In a case in which information segments are, as described above, "emergency warning (early warning) video information, still image information, or electronic message information" divided up into a "first information segment", a "second information segment", and a "third information segment", "information segment" means the "first information segment", the "second information segment", and the "third information segment". (For example, "first information segment" is an information segment.)

Figure 101:
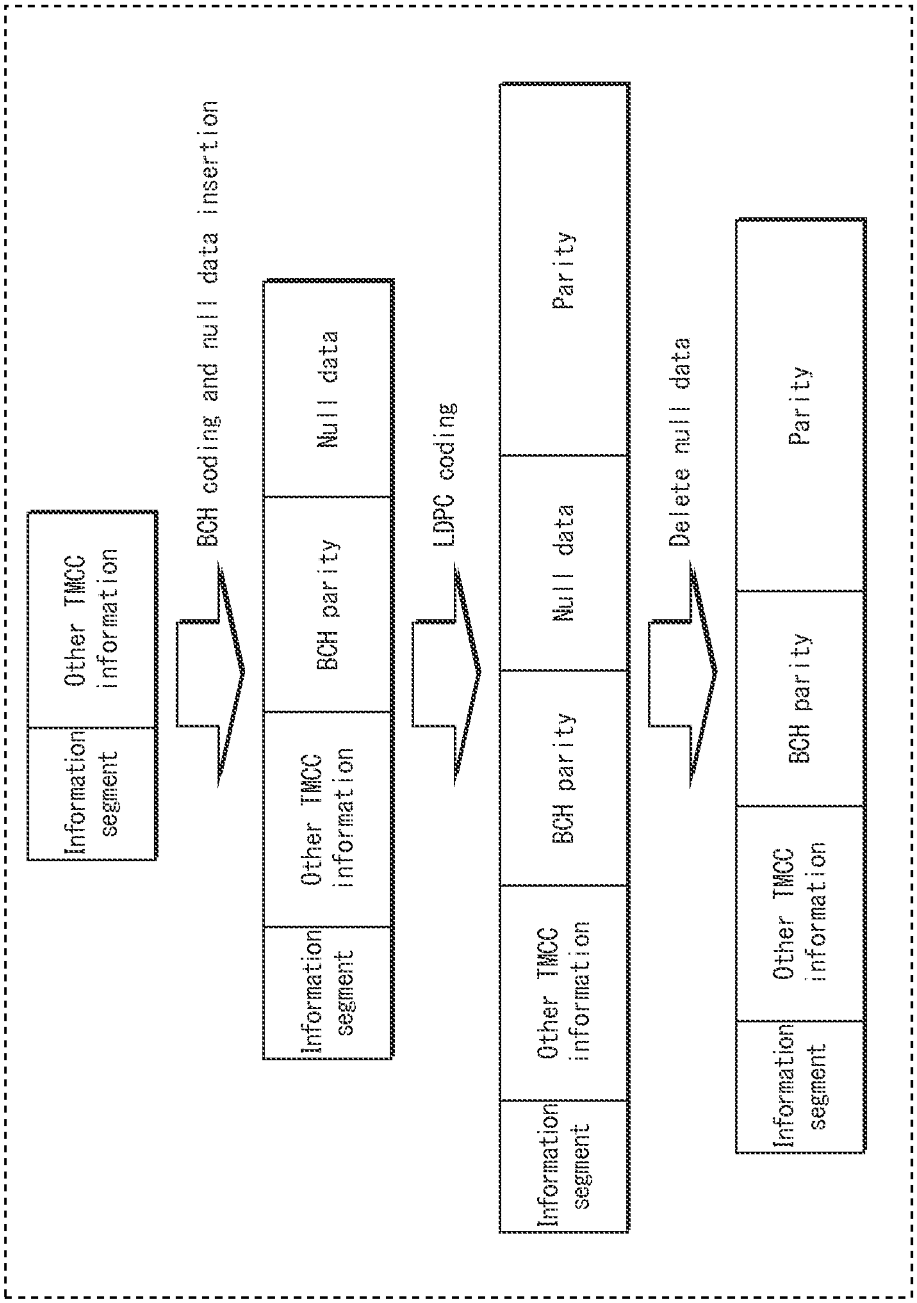
FIG. 101 illustrates an example method of TMCC generation.

FIG. 101 illustrates an example method of generating TMCC transmitted in frames.

First, TMCC information is composed of "information segment" and "other TMCC information". As stated above, information transmitted by TMCC that is not an "information segment" (for example, $\delta_0\delta_1\delta_2$ (or $\delta'_0\delta'_1\delta'_2$), $\varepsilon_0\varepsilon_1\varepsilon_2$ (or $\varepsilon'_0\varepsilon'_1\varepsilon'_2$), and $\sigma_0\sigma_1$) is included in other TMCC information.

As in FIG. 101, Bose-Chaudhuri-Hocquenghem (BCH) coding and null data insertion is performed on the "information segment" and "other TMCC information", generating information for LDPC coding composed of "information segment", "other TMCC information", "BCH parity", and "null data". Null data is, for example, data composed of a plurality of "0"s. (Null data composition is not limited to this example, and may be any data pre-defined by a transmit station and terminal.)

Thus, as in FIG. 101, LDPC coding is performed on the "information segment", "other TMCC information", "BCH parity", and "null data", generating "parity" (see FIG. 101). Accordingly, in FIG. 101, "information segment", "other TMCC information", "BCH parity", "null data", and "parity" is data after LDPC coding. (Here, LDPC code is assumed to deal with block code.)

Among "information segment", "other TMCC information", "BCH parity", "null data" and "parity", the "null data" inserted by a transmit station is already known to a terminal, and therefore the transmit station deletes the "null data" and transmits "information segment", "other TMCC information", "BCH parity", and "parity".

The following describes each element that implements FIG. 101. Configuration of a transmit terminal is as described in other embodiments, and is as described with reference to FIG. 7, FIG. 39, FIG. 41, FIG. 42, FIG. 71, etc. The following describes a configuration example of elements related to TMCC generation of FIG. 101.

Figure 102:
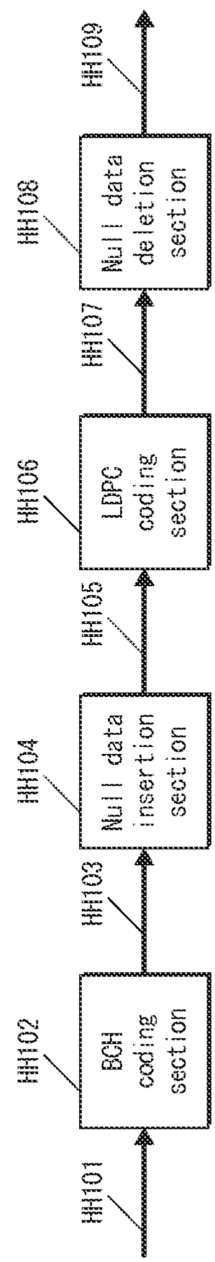
FIG. 102 illustrates an example configuration of a TMCC constructor.

In FIG. 102, a BCH coding section (HH102) receives a control signal HH101 as input, extracts TMCC information ("information segment" and "other TMCC information" in FIG. 101) included in the control signal HH101, performs BCH coding, and outputs post-BCH coding data (HH103) ("information segment", "other TMCC information", and "BCH parity" in FIG. 101).

A null data insertion section (HH104) receives the post-BCH coding data (HH103) as input, inserts null data (corresponding to the null data of FIG. 101), and outputs post-null data insertion data (HH105) ("information segment", "other TMCC information", "BCH parity", and "null data" in FIG. 101).

An LDPC coding section HH106 receives the post-null data insertion data (HH105) as input, performs LDPC code coding, and outputs post-LDPC coding data (HH107) ("information segment", "other TMCC information", "BCH parity", "null data", and "parity" in FIG. 101).

A null data deletion section HH108 receives the post-LDPC coding data (HH107) as input, deletes null data (the "null data" in FIG. 101), and outputs post-null data deletion data HH109 ("information segment", "other TMCC information", "BCH parity", and "parity" in FIG. 101). The post-null data deletion data HH109 ("information segment", "other TMCC information", "BCH parity", and "parity" in FIG. 101) is transmitted by the transmit station as TMCC.

Figure 103:
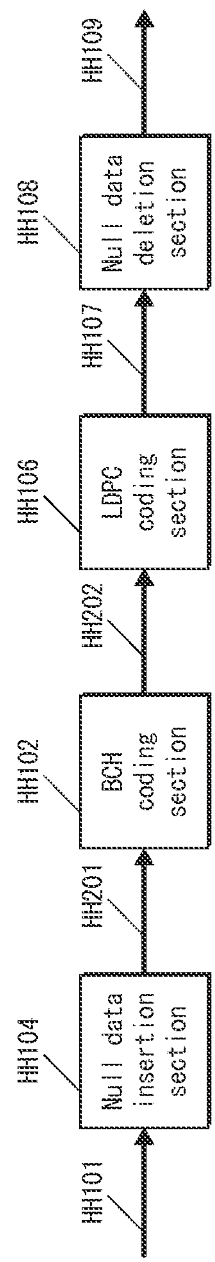
FIG. 103 illustrates an example configuration of a TMCC constructor.

Next, a configuration of elements related to TMCC generation that is different from that in FIG. 102 is illustrated in FIG. 103. A point of difference from FIG. 102 is that the order in which the BCH coding section HH102 and the null data insertion section HH104 are arranged is different in FIG. 103.

In FIG. 103, the null data insertion section HH104 receives the control signal HH101 as input, extracts the TMCC information ("information segment" and "other TMCC information" in FIG. 101) included in the control signal HH101, inserts null data (corresponding to the null data of FIG. 101), and outputs post-null data insertion data (HH201) ("information segment", "other TMCC information", and "null data").

The BCH coding section HH102 receives the post-null data insertion data (HH201) as input, performs BCH coding, and outputs post-BCH coding data (HH202) ("information segment", "other TMCC information", "BCH parity", and "null data" in FIG. 101).

The LDPC coding section HH106 receives the post-BCH coding data (HH202) as input, performs LDPC code coding, and outputs post-LDPC coding data (HH107) ("information segment", "other TMCC information", "BCH parity", "null data", and "parity" in FIG. 101).

The null data deletion section HH108 receives the post-LDPC coding data (HH107) as input, deletes null data ("null data in FIG. 101), and outputs post-null data deletion data HH109 ("information segment", "other TMCC information", "BCH parity", and "parity"). The post-null data deletion data HH109 ("information segment", "other TMCC information", "BCH parity", and "parity" in FIG. 101) is transmitted by the transmit station as TMCC.

Figure 104:
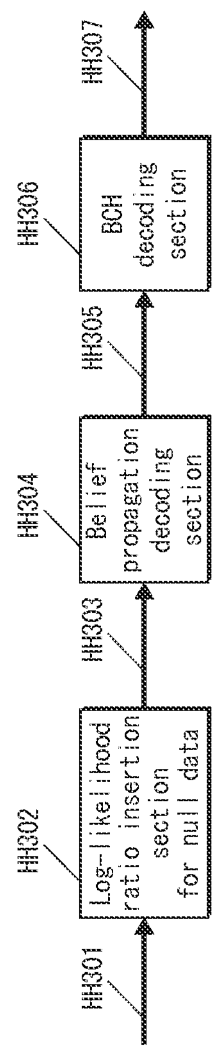
FIG. 104 illustrates an example configuration of a TMCC estimator in a reception device.

FIG. 104 illustrates an example configuration of a control information estimator (TMCC information estimator) in a reception device of a terminal described with reference to FIG. 19, FIG. 75, etc.

A log-likelihood ratio insertion section for null data HH302 receives TMCC section log-likelihood ratios (HH301) obtained by de-mapping as input, inserts TMCC section log-likelihood ratios into null data corresponding to "null data" of FIG. 101, and outputs post-log-likelihood-ratio-insertion-for-null-data log-likelihood ratios (HH303).

A belief propagation (BP) decoding section (HH304) receives the post-log-likelihood-ratio-insertion-for-null-data log-likelihood ratios (HH303) as input, performs belief propagation (BP) decoding such as sum-product decoding, shuffled BP decoding, normalized BP decoding, offset BP decoding, mini-sum decoding, layered BP decoding, etc., and outputs decoding data (HH305) ("information segment", "other TMCC information", "BCH parity", "null data", and "parity" in FIG. 101 estimated data).

The BCH decoding section (HH306) receives the decoding data HH305 as input, performs error correction of TMCC information by performing BCH decoding, and outputs TMCC information (HH307) ("information segment" and "other TMCC information" in FIG. 101 estimated data).

As above, a transmit station generates TMCC data. The following describes advantages of the "third repetition method" and the "fourth repetition method" when the "first repetition method", the "second repetition method", the "third repetition method", and the "fourth repetition method" are applied.

When the *Transmission System for Advanced Wide Band Digital Satellite Broadcasting*, ARIB Standard STD-B44, Ver. 1.0 is considered as a base standard, in embodiment AA, embodiment BB, embodiment CC, embodiment DD, embodiment EE, embodiment GG, and the present embodiment, for example, TMCC information other than TMCC extended information ("extended identifier" and "extended region") does not change rapidly. In other words, the probability of changes on a frame-by-frame basis is very small.

Accordingly, for example, when the "third repetition method" is used, in the "first frame" and "fourth frame" transmitting the "first information segment", TMCC data in the "first frame" and TMCC data in the "fourth frame" is very likely to match.

Likewise, in the "second frame" and "fifth frame" transmitting the "second information segment", TMCC data in the "second frame" and TMCC data in the "fifth frame" is very likely to match.

Likewise, in the "third frame" and "sixth frame" transmitting the "third information segment", TMCC data in the "third frame" and TMCC data in the "sixth frame" is very likely to match.

Thus, a transmit station accumulates "first frame" TMCC data, the accumulated data may be transmitted in the "fourth frame", and accordingly there is an advantage that it is possible to reduce the number of processing times associated with error correction coding.

Likewise, the transmit station may accumulate "second frame" TMCC data and transmit the accumulated data in the "fifth frame", and may accumulate "third frame" TMCC data and transmit the accumulated data in the "sixth frame".

The "fourth repetition method" also has the advantage that it is possible to reduce the number of processing times associated with error correction coding.

When considering an error in radio transmission due to a decrease in reception field strength of a terminal, the probability is high of reducing TMCC data error likelihood when using the "first repetition method" and "third repetition method".

When using either the "first repetition method" or the "third repetition method", the "first information segment" is not transmitted in adjacent frames. This is the same for the "second information segment" and the "third information segment". Accordingly, because the probability is reduced of receiving the effect of burst errors due to a decrease in reception field strength of a terminal, the probability is high of reducing TMCC data error likelihood when using the "first repetition method" and "third repetition method".

Thus, in the present embodiment, methods for precisely transmitting emergency warning (early warning) information to terminals are described. By implementing the various examples in the present embodiment, a terminal can appropriately obtain emergency warning (early warning) information, and therefore an effect can be achieved that can increase safety of users.

In the present embodiment, an example of a system composed of a transmit station, a repeater, and a terminal is described as in embodiment B, embodiment C, embodiment D, embodiment E, embodiment F, and embodiment G, but a system composed of a transmit station and a terminal may of course be implemented similarly.

Embodiment II

In all previous embodiments, examples are described of transmission of emergency warning (early warning) information, electronic message information, video information, still image information, and audio information by using TMCC.

In the present embodiment, an example is described in which a terminal that has obtained information such as emergency warning (early warning) information, electronic message information, video information, still image information, audio information, etc., then transmits the information to other devices.

In the present description, for example, each embodiment describes transmission of a control signal such as TMCC in satellite broadcasting, and a terminal, communication system, repeater system, etc., that uses this transmission. However, use of transmission of a control signal such as TMCC in satellite broadcasting is just an example, and each embodiment described in the present description may be implemented by a transmit station transmitting a control signal such as TMCC in systems such as terrestrial broadcasting, cable television, mobile broadcasting, etc. This point is also true for the present embodiment.

TMCC configuration, transmission device configuration, reception device configuration, etc., are as described in embodiment AA, and methods of transmitting emergency warning (early warning) information, electronic message information, video information, still image information, and audio information by using TMCC are as described in embodiment AA onwards, and therefore description is omitted here.

Further, in the present embodiment, as described in embodiment B, embodiment C, embodiment D, embodiment E, embodiment F, and embodiment G, a system composed of a (terrestrial) transmit station, (satellite) repeater, and terminal is described as an example.

Figure 105:
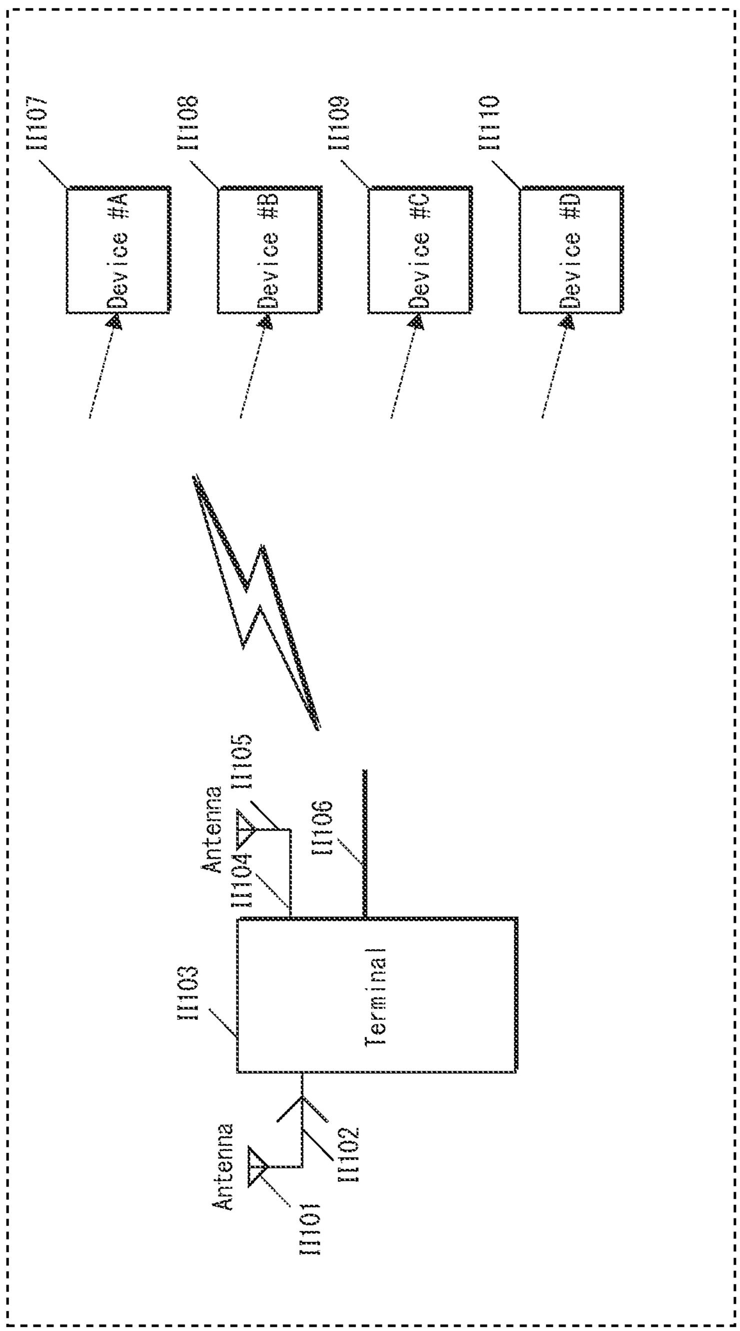
FIG. 105 is a system diagram illustrating correspondence between a reception device and other devices.

FIG. 105 illustrates correspondence between devices and a receive terminal that receives a modulated signal including control information such as TMCC that is transmitted by a transmit station.

In FIG. 105, a terminal II103 receives a modulated signal via an antenna II101, the modulated signal being transmitted by a transmit station and, for example, relayed by a repeater, and obtains a receive signal II102. Subsequently, the terminal II103 extracts control information (TMCC) included in the receive signal II102. Subsequently, as described in other embodiments, the terminal II103 is assumed to obtain emergency warning (early warning) information transmitted by using TMCC. Thus, the terminal II103 outputs a modulated signal II104 including information related to the emergency warning (early warning) from, for example, an antenna II105. As a wireless communication scheme, for example, Wi-Fi (IEEE802.11a, IEEE802.11b, IEEE802.11g, IEEE802.11n, etc.), WiGiG, Wireless HD, Bluetooth (registered trademark), Gigbee, etc., may be considered (however, wireless communication schemes are not limited to these examples). In addition, the terminal II103 outputs a signal II106 including information related to the emergency warning (early warning). The signal II106 is assumed to be a signal based on a wired communication scheme such as Ethernet (registered trademark), Universal Serial Bus (USB), power line communication (PLC), High-Definition Multimedia Interface (HDMI), etc. (however, wireless communication schemes are not limited to these examples).

A device # A (II107), a device # B (II108), a device # C (II109), and a device # D (II110) are assumed to each receive a signal transmitted by the terminal II103 based on a wireless communication scheme and/or wired communication scheme, perform detection, demodulation, error correction decoding, etc., processing, and obtain information related to the emergency warning (early warning).

Among the device # A (II107), the device # B (II108), the device # C (II109), and the device # D (II110), a device having a monitor and/or speaker may, for example, display information related to the emergency warning (early warning) on the monitor and/or output audio information related to the emergency warning (early warning) from the speaker.

Further, among the device # A (II107), the device # B (II108), the device # C (II109), and the device # D (II110), a device that may cause risk to the human body (for example, a device that could cause a fire, such as a device that deals with gas fuels, an oven, an electric stove, a gas stove, etc., or a device that may affect human life), by receiving the signal transmitted by the terminal II103 and obtaining information related to the emergency warning (early warning), performs a control that reduces the likelihood of causing risk to the human body, for example by powering off.

As above, the terminal II103 obtains emergency warning (early warning) information transmitted by a transmit station, transmits information related to the emergency warning (early warning) to other devices, and the other devices obtain this information. In this way, the other devices can implement appropriate processing, and the probability of ensuring safety of a user is increased.

The terminal II103 and the devices # A through # D in FIG. 105 may communicate directly, or the terminal II103 and the devices # A through # D may communicate via a repeater (for example, an access point (a local area network (LAN) access point) or cellular base station).

In the above description, information related to the emergency warning (early warning) is transmitted by the terminal II103 in FIG. 105. This point is described below.

The terminal II103 obtains emergency warning (early warning) information transmitted by using TMCC. Subsequently, the terminal II103, according to purpose, transmits information related to the emergency warning (early warning) to the devices # A through # D, but may generate information to transmit for each of the devices.

For example, with respect to a device provided with a monitor, the terminal II103 may generate α nd transmit information for monitor display from the emergency warning (early warning) information included in TMCC transmitted by a transmit station.

With respect to a device provided with a speaker, the terminal II103 may generate α nd transmit information for speaker output from the emergency warning (early warning) information included in TMCC transmitted by a transmit station.

With respect to performing a control to "power off" a device, etc., the terminal II103 may generate α nd transmit to the device information related to performing the control (for example, in the case of powering off, power off information) from the emergency warning (early warning) information included in TMCC transmitted by a transmit station.

In the above description, the terminal II103 temporarily stores emergency warning (early warning) information transmitted by using TMCC, and subsequently generates information to transmit to other devices from the stored information, and may transmit the information to the other devices.

Note that "the terminal II103 obtains emergency warning (early warning) information transmitted by using TMCC. Subsequently, the terminal II103, according to purpose, transmits information related to the emergency warning (early warning) to the devices # A through # D" is described above, but a control may be performed to determine whether or not the terminal II103 transmits information related to the emergency warning (early warning) according to region information as described in other embodiments.

For example, when the region information matches a region to which the terminal belongs, the terminal II103 obtains the emergency warning (early warning) information transmitted by using TMCC. Subsequently, the terminal II103, according to purpose, transmits information related to the emergency warning (early warning) to the devices # A through # D.

On the other hand, when the region information does not match a region to which the terminal belongs, the terminal II103 does not transmit information to the devices # A through # D.

Further, an example is described in which the terminal II103 generates and transmits information from "emergency warning (early warning) information" to other devices, but this is just an example. The terminal II103 may generate information for transmission to other devices based on TMCC information (information transmitted by using TMCC described in other embodiments) transmitted by a transmit station.

In the present embodiment, an example of a system composed of a transmit station, a repeater, and a terminal is described as in embodiment B, embodiment C, embodiment D, embodiment E, embodiment F, and embodiment G, but a system composed of a transmit station and a terminal may of course be implemented similarly.

Embodiment JJ

In the present embodiment, a method is provided of transmitting Uniform Resource Locator (URL) or Uniform Resource Identifier (URI) information by TMCC.

In the present description, for example, each embodiment describes transmission of a control signal such as TMCC in satellite broadcasting, and a terminal, communication system, repeater system, etc., that uses this transmission. However, use of transmission of a control signal such as TMCC in satellite broadcasting is just an example, and each embodiment described in the present description may be implemented by a transmit station transmitting a control signal such as TMCC in systems such as terrestrial broadcasting, cable television, mobile broadcasting, etc. This point is also true for the present embodiment.

TMCC configuration, transmission device configuration, reception device configuration, etc., are as described in embodiment AA, and methods of transmitting emergency warning (early warning) information, electronic message information, video information, still image information, and audio information by using TMCC are as described in embodiment AA onwards, and therefore description is omitted here.

Further, in the present embodiment, as described in embodiment B, embodiment C, embodiment D, embodiment E, embodiment F, and embodiment G, a system composed of a (terrestrial) transmit station, (satellite) repeater, and terminal is described as an example.

In embodiment EE, etc., methods are described of transmission of emergency warning (early warning) information, electronic message information, video information, still image information, and audio information by using TMCC. In embodiment EE, etc., transmission, by using TMCC, of emergency warning (early warning) information conveyed by electronic message information, video information, still image, and audio is described. However, because TMCC is essentially just a region for transmitting control information, when compared to transmission rate of transmitting data by using a main broadcast signal of a broadcast system, the transmission rate of transmitting data by using TMCC is very slow. For example, transmission of a large amount of data of emergency warning (early warning) information by using TMCC is not possible, and when considering using safety, a system structure is desired that can allow rapid acquisition of a large amount of data.

Thus, as a type of information transmitted by using TMCC, a method of TMCC transmission is provided that can select "Uniform Resource Locator (URL) or Uniform Resource Identifier (URI) information" for transmission.

As described in embodiment EE, for example, $R_2R_1R_0$ information may be transmitted as a portion of control information such as TMCC, to indicate a format of emergency warning (early warning) information. Table 34 illustrates a "correspondence between $R_2R_1R_0$ and types of emergency warning broadcast" that differs from Table 26.

TABLE 34

Correspondence between $R_2R_1R_0$ and types of emergency warning broadcast

| $R_2R_1R_0$ | Significance |
|---|---|
| 000 | Electronic message information |
| 001 | Video |
| 010 | Still image |
| 011 | Audio |
| 100 | URL or URI information |
| 101 to 111 | Reserved |

As indicated in Table 34, when $R_2R_1R_0$="000", emergency warning broadcast information is transmitted as electronic message information. When $R_2R_1R_0$="001", emergency warning broadcast information is transmitted as video; when $R_2R_1R_0$="010", emergency warning broadcast information is transmitted as still image; when $R_2R_1R_0$="011", emergency warning broadcast information is transmitted as audio; when $R_2R_1R_0$="100", URL or URI information is transmitted for the purpose of obtaining emergency warning broadcast information; and $R_2R_1R_0$="101" to "111" values are reserved.

The method of transmitting information in connection with TMCC is as described in embodiment AA, embodiment BB, embodiment CC, embodiment DD, embodiment EE, etc., and emergency warning (early warning) information, as an example, is transmitted by using "extended information" of TMCC.

Configuration of a transmit station that transmits control information such as TMCC is, for example, the configuration illustrated in FIG. 7, as described in embodiment DD. Detailed description is provided in other embodiments, and is omitted here.

Figure 106:
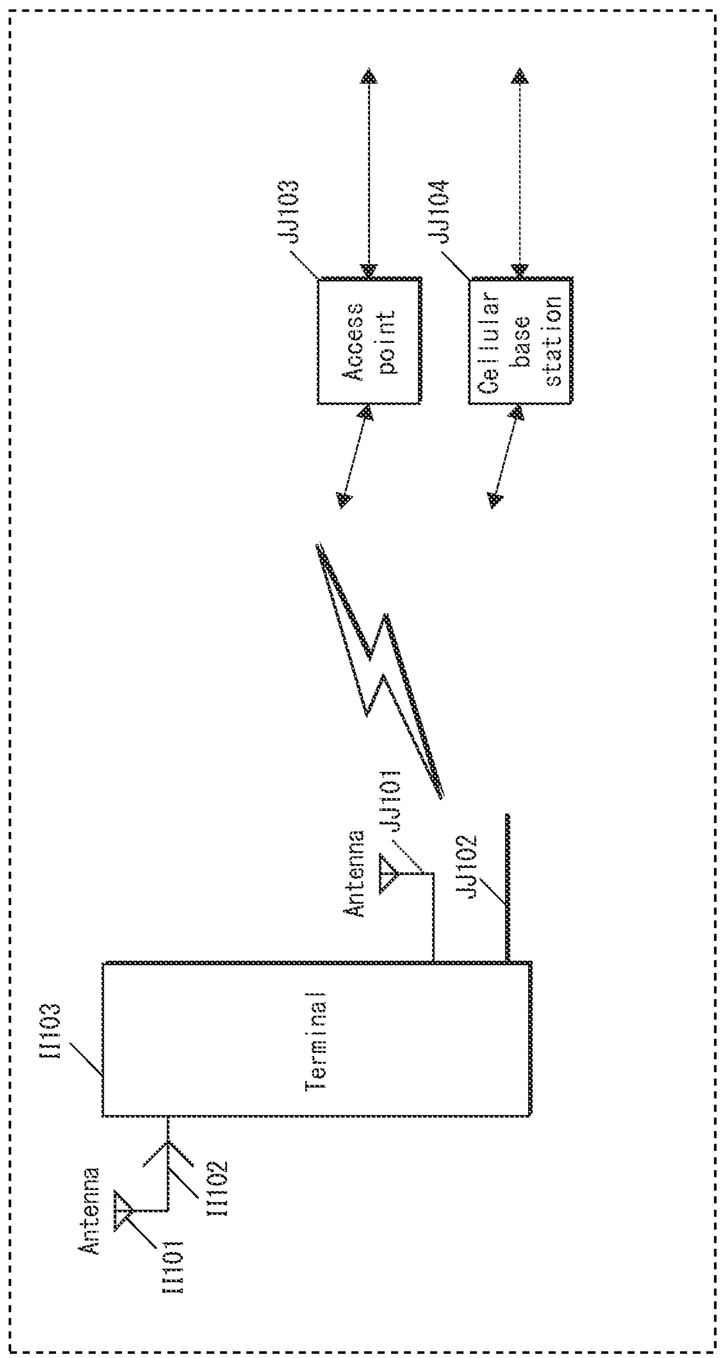
FIG. 106 illustrates an example configuration of a reception device.

FIG. 106 illustrates configuration of the terminal (II103). Elements that operate the same way as in FIG. 105 are assigned the same reference signs. The terminal II103 receives a modulated signal via the antenna II101, the modulated signal being transmitted by a transmit station and, for example, relayed by a repeater, and obtains a receive signal II102. Subsequently, the terminal II103 extracts control information (TMCC) included in the receive signal II102. Subsequently, as described in other embodiments, the terminal II103 is assumed to obtain URL or URI information for the purpose of obtaining emergency warning broadcast information, the URL or URI information being transmitted by using TMCC.

Thus, the terminal II103, for example, when an operating system (OS) is not running, initiates an OS, initiates a browser, connects, via a network, to a URL or URI transmitted by using TMCC, and obtains emergency warning (early warning) information.

An antenna JJ101 of FIG. 106 is, for example, an antenna for connection to a network via a wireless LAN (example schemes are Wi-Fi (IEEE802.11a, IEEE802.11b, IEEE802.11g, IEEE802.11n, etc.), WiGiG, WirelessHD, etc.). JJ101 is an interface connecting a network by wired means (example schemes are Ethernet (registered trademark), PLC, etc.).

The terminal II103, via the antenna JJ101 or the interface JJ101 for example, connects to a URL or URI transmitted by using TMCC, and thereby obtains emergency warning (early warning) information. At this time, the terminal II103, via an access point JJ103 or cellular base station JJ104 for example (these are only examples), connects to the URL or URI transmitted by using TMCC.

As above, the terminal links to the URL or URI of the TMCC, and thereby a large amount of data can be rapidly obtained. Further, information is obtained with immediacy, and therefore an effect is achieved of increasing the probability of ensuring safety of a user.

Figure 107:
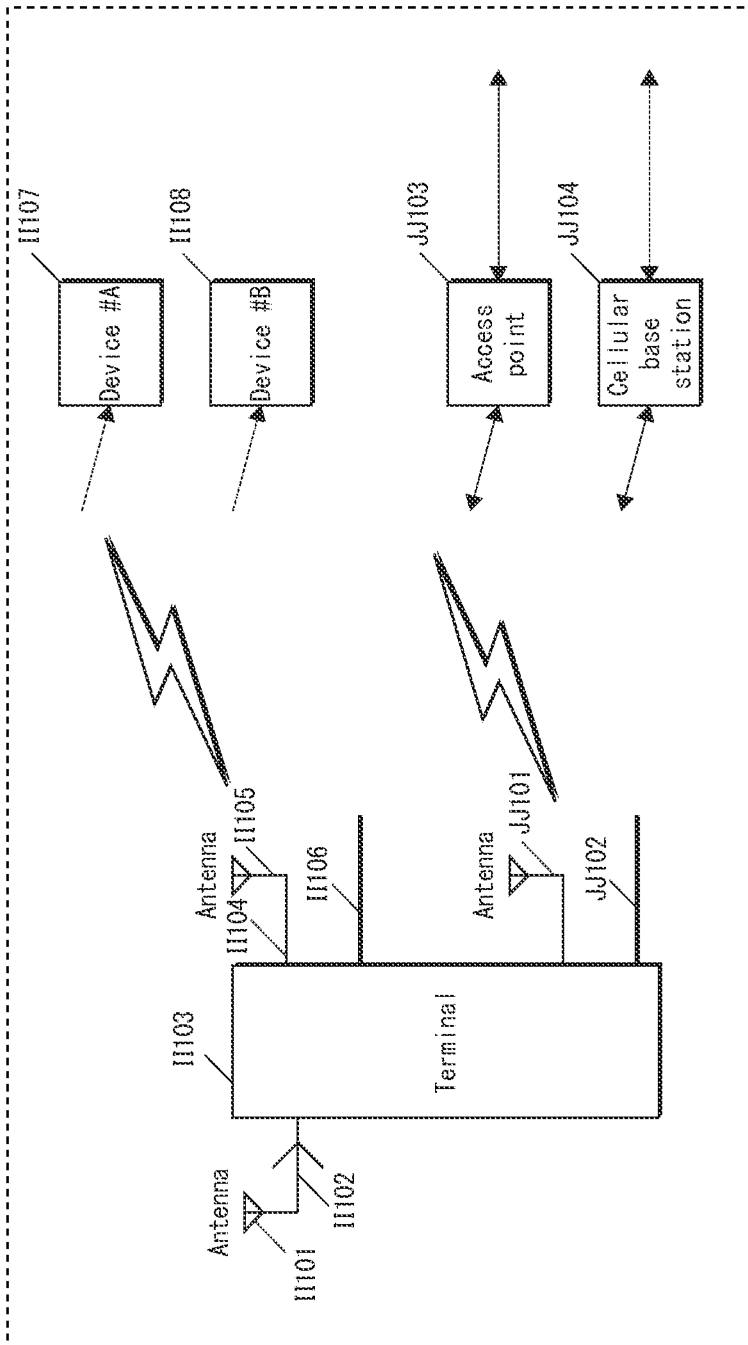
FIG. 107 is a system diagram illustrating correspondence between a reception device and other devices.

Further, the terminal may transmit the URL or URI information obtained by obtaining TMCC to other devices. FIG. 107 illustrates an example of such a system configuration. Elements in FIG. 107 that operate the same way as in FIG. 105 and FIG. 106 are assigned the same reference signs.

The terminal (II103) of FIG. 107, as in FIG. 106, obtains emergency warning (early warning) information by connecting, via a network, to a URL or URI transmitted by using TMCC. In addition, the terminal (II103), as in FIG. 105, transmits URL or URI information obtained by obtaining TMCC to, for example, the device # A (II107) and the device # B (II108) as in FIG. 107. (The terminal II103 and the devices # A and # B may communicate directly, or the terminal II103 and the devices # A and # B may communicate via a repeater (for example, an access point (a local area network (LAN) access point) or cellular base station).)

Thus, the devices # A and # B, via a network (for example, via an access point or cellular base station), access the URL or URI obtained by the terminal (II103), and, by obtaining the emergency warning (early warning) information (which has a greater data quantity than the URL or URI information), an effect is achieved of increasing the possibility of ensuring safety of a user.

Note that "the terminal II103 obtaining emergency warning (early warning) information (URL or URI information) transmitted by using TMCC and the terminal II103 transmitting this information to the devices # A and # B" is described, but a control may be performed to determine whether the terminal II103 transmits information related to the emergency warning (early warning) according to region information as described in other embodiments.

For example, when the region information matches a region to which the terminal belongs, the terminal II103 obtains the emergency warning (early warning) information (URL or URI information) transmitted by using TMCC. Subsequently, the terminal II103 transmits information related to the emergency warning (early warning) (URL or URI information) to the devices # A and # B.

On the other hand, when the region information does not match a region to which the terminal belongs, the terminal II103 does not transmit information to the devices # A and # B.

Further, as described in other embodiments, when the region information included in TMCC matches a region to which the terminal belongs, the terminal II103 may connect to the URL or URI transmitted by using TMCC.

Further, URL or URI related to emergency warning (early warning) information is described above, but this is just an example, and even when a transmit station transmits URL or URI information for information other than emergency warning (early warning) information by TMCC, the examples described above can be implemented.

In the present embodiment, an example of a system composed of a transmit station, a repeater, and a terminal is described as in embodiment B, embodiment C, embodiment D, embodiment E, embodiment F, and embodiment G, but a system composed of a transmit station and a terminal may of course be implemented similarly.

Embodiment KK

Methods of transmitting information, by using an extended region of TMCC, when radio transmission methods are changed, such as roll-off rate changes (embodiment AA, embodiment DD, etc.), changes to ring ratios when using 16APSK and 32APSK schemes (embodiment A to embodiment G, etc.), etc., are described above.

On one hand, in embodiment BB onwards, transmission of various types of information by using an extended region of TMCC is described.

Further, control information may be transmitted without using an extended region of TMCC.

However, as a simple method, a method may be considered in which transmission of "information related to changing radio transmission method" by using extended information of TMCC and transmission of "various types of information" by using extended information of TMCC are simultaneously implemented. This method has an advantage that changes in radio transmission method can be implemented in each of a plurality of frames.

However, when considering actual operation of a broadcast, a system that changes radio transmission method in each frame is not necessarily desirable. (A system that changes radio transmission method in each frame may be desirable.) Taking this into consideration, a method is described of transmission of "information related to changing radio transmission method" by using extended information of TMCC and transmission of "various types of information" by using extended information of TMCC.

In the present description, for example, each embodiment describes transmission of a control signal such as TMCC in satellite broadcasting, and a terminal, communication system, repeater system, etc., that uses this transmission. However, use of transmission of a control signal such as TMCC in satellite broadcasting is just an example, and each embodiment described in the present description may be implemented by a transmit station transmitting a control signal such as TMCC in systems such as terrestrial broadcasting, cable television, mobile broadcasting, etc. This point is also true for the present embodiment.

TMCC configuration, transmission device configuration, reception device configuration, etc., are as described in embodiment AA, and methods of transmitting emergency warning (early warning) information, electronic message information, video information, still image information, and audio information by using TMCC are as described in embodiment AA onwards, and therefore description is omitted here.

Further, in the present embodiment, as described in embodiment B, embodiment C, embodiment D, embodiment E, embodiment F, and embodiment G, a system composed of a (terrestrial) transmit station, (satellite) repeater, and terminal is described as an example.

In embodiment EE, embodiment JJ, etc., methods are described of transmission of emergency warning (early warning) information, electronic message information, video information, still image information, and audio information by using an extended region of TMCC. Further, a method is described of transmitting "Uniform Resource Locator (URL) or Uniform Resource Identifier (URI) information" by using an extended region of TMCC.

As described in embodiment EE, embodiment JJ, etc., for example, $R_2R_1R_0$ information may be transmitted as a portion of control information such as TMCC, to indicate a format of information transmitted by using an extended region of TMCC. Table 35 illustrates "correspondence between $R_2R_1R_0$ and types of emergency warning broadcast" that differs from Table 26 and Table 34.

TABLE 35

Correspondence between $R_2R_1R_0$ and types of emergency warning broadcast

| $R_2R_1R_0$ | Significance |
|---|---|
| 000 | Electronic message information |
| 001 | Video |
| 010 | Still image |
| 011 | Audio |
| 100 | URL or URI information |
| 101 | Transmission scheme parameter change |
| 110 and 111 | Reserved |

As indicated in Table 35, when $R_2R_1R_0$="000", information transmitted by using an extended region of TMCC is transmitted as electronic message information. When $R_2R_1R_0$="001", information transmitted by using an extended region of TMCC is transmitted as video; when $R_2R_1R_0$="010", information transmitted by using an extended region of TMCC is transmitted as still image; when $R_2R_1R_0$="011", information transmitted by using an extended region of TMCC is transmitted as audio; when $R_2R_1R_0$="100", URL or URI information is transmitted for the purpose of obtaining information; when $R_2R_1R_0$="101", information transmitted by using an extended region of TMCC is information related to "transmission scheme parameter change"; and $R_2R_1R_0$="110" and "111" are reserved.

Methods of transmitting information related to TMCC are as described in embodiment AA, embodiment BB, embodiment CC, embodiment DD, embodiment EE, etc., and the information is, as one example, transmitted by using "extended information" of TMCC.

Further, the "transmission scheme parameter change" in Table 35 means transmitting information by using an extended region of TMCC when a change in radio transmission method is performed, such as a change in roll-off rate (embodiment AA, embodiment DD, etc.), a change in ring ratio when using 16APSK and/or 32APSK schemes (embodiment A to embodiment G, etc.), etc.

Configuration of a transmit station that transmits control information such as TMCC is, for example, the configuration illustrated in FIG. 7, as described in embodiment DD. Detailed description is provided in other embodiments, and is omitted here.

Configuration of a reception device of a terminal is as illustrated in FIG. 75. The control information estimator (TMCC information estimator) AA319 in FIG. 75 determines information type transmitted by using an extended region of TMCC, based on Table 35.

For example, when $R_2R_1R_0$="101", a terminal determines that "information transmitted by using an extended region of TMCC is information related to 'transmission scheme parameter change'", and estimates transmission scheme parameter change content. Note that "estimating transmission scheme parameter change" is as described in other embodiments. A "transmission scheme parameter change", as described in other embodiments, may mean switching to a "*Transmission System for Digital Satellite Broadcasting*, ARIB Standard STD-B20, Ver. 3.0 or later versions of *Transmission System for Digital Satellite Broadcasting*, ARIB Standard STD-B20" transmission scheme.

As above, by using a method of transmission of "information related to changing radio transmission method" by using an extended region of TMCC, and transmission of "various types of information" by using an extended region of TMCC, transmission in parallel is not performed of "information related to changing radio transmission method" and "various types of information" by using an extended region of TMCC, and therefore there is an advantage that transmission speed of data of "various types of information" by using an extended region of TMCC can be increased.

In the present embodiment, an example of a system composed of a transmit station, a repeater, and a terminal is described as in embodiment B, embodiment C, embodiment D, embodiment E, embodiment F, and embodiment G, but a system composed of a transmit station and a terminal may of course be implemented similarly.

Embodiment LL

In the present embodiment, an example is described of a method of utilization of electronic massage information, video information, still image information, audio information, and/or URL (URI) information transmitted by using TMCC.

Figure 108:
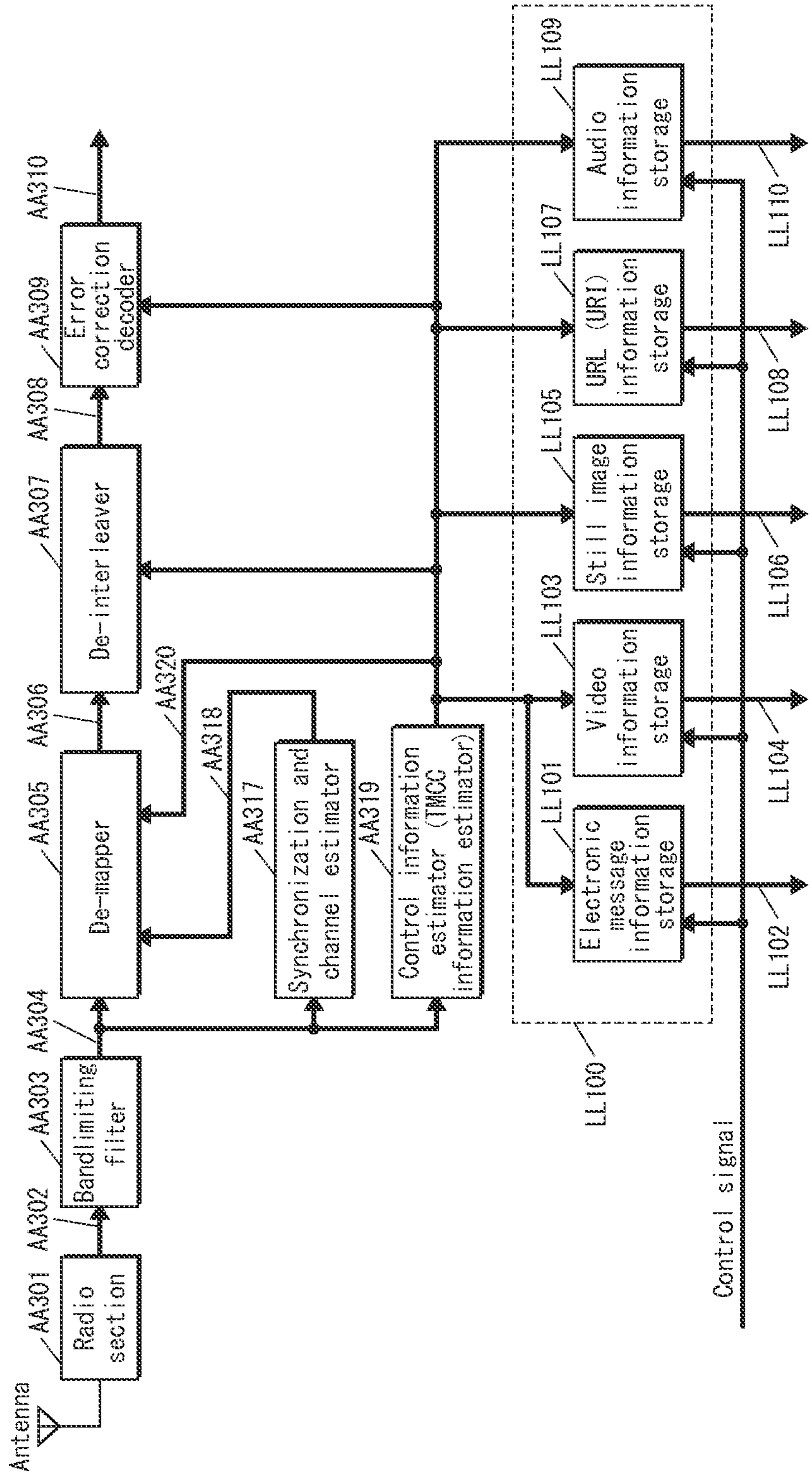
FIG. 108 illustrates an example configuration of a reception device.

FIG. 108 illustrates an example configuration of a terminal in the present embodiment. Elements that operate in the same way as in FIG. 75 are assigned the same reference signs. Such operations are described in other embodiments and description thereof is therefore omitted here.

An electronic message information storage LL101 receives control information AA320 and a control signal as input, and when electronic message information transmitted by using TMCC is in the control information AA320, the electronic message information storage LL101 stores the electronic message information. At this time, tag information indicating that the information stored is "electronic message information" is added to the information stored and stored at the same time as the information stored.

Likewise, a video information storage LL103 receives the control information AA320 and a control signal as input, and when video transmitted by using TMCC is in the control information AA320, the video information storage LL103 stores the video information. At this time, tag information indicating that the information stored is "video information" is added to the information stored and stored at the same time as the information stored.

Likewise, a still image information storage LL105 receives the control information AA320 and a control signal as input, and when still image transmitted by using TMCC is in the control information AA320, the still image information storage LL105 stores the still image information. At this time, tag information indicating that the information stored is "still image information" is added to the information stored and stored at the same time as the information stored.

A URL (URI) information storage LL107 receives the control information AA320 and a control signal as input, and when URL (URI) information transmitted by using TMCC is in the control information AA320, the URL (URI) information storage LL107 stores the URL (URI) information. At this time, tag information indicating that the information stored is "URL (URI) information" is added to the information stored and stored at the same time as the information stored.

An audio information storage LL109 receives the control information AA320 and a control signal as input, and when audio information transmitted by using TMCC is in the control information AA320, the audio information storage LL109 stores the audio information. At this time, tag information indicating that the information stored is "audio information" is added to the information stored and stored at the same time as the information stored.

As stated above, the electronic message information storage LL101, the video information storage LL103, the still image information storage LL105, the URL (URI) information storage LL107, and the audio information storage LL109 are provided, but the terminal may have a configuration in which these are integrated into a storage LL100. However, type of information transmitted by using TMCC (electronic message information, video information, still image information, URL (URI) information, or audio information) is stored along with the information itself.

The electronic message information storage LL101, when, for example, a control signal indicating "display stored electronic message information on monitor" is inputted by a user instruction, the electronic message information storage LL101 outputs (LL102) the "stored electronic message information". Further, the electronic message information storage LL101 is able to delete a portion or all of the "stored electronic message information" according to a control signal (according to a user instruction).

Likewise, the video information storage LL103, when, for example, a control signal indicating "display stored video information on monitor" is inputted by a user instruction, the video information storage LL103 outputs (LL104) the "stored video information". Further, the video information storage LL103 is able to delete a portion or all of the "stored video information" according to a control signal (according to a user instruction).

The still image information storage LL105, when, for example, a control signal indicating "display stored still image information on monitor" is inputted by a user instruction, the still image information storage LL105 outputs (LL106) the "stored still image information". Further, the still image information storage LL105 is able to delete a portion or all of the "stored still image information" according to a control signal (according to a user instruction).

The URL (URI) information storage LL107, when, for example, a control signal indicating "display stored URL (URI) information on monitor" is inputted by a user instruction, the URL (URI) information storage LL107 outputs (LL108) the "stored URL (URI) information". Further, the URL (URI) information storage LL107 is able to delete a portion or all of the "stored URL (URI) information" according to a control signal (according to a user instruction).

The audio information storage LL109 is able to delete a portion or all of "stored audio information" according to a control signal (according to a user instruction).

As above, a user can acquire and organize information when the information transmitted by using TMCC is stored, and this provides an advantage that the user can more usefully utilize helpful information.

Electronic message information stored by the electronic message information storage LL101 may be information transmitted by using TMCC, and may be information after decoding is performed for the electronic message, and the electronic message information storage LL101 may store the information in any format.

Likewise, video information stored by the video information storage LL103 may be information transmitted by using TMCC, and may be information after decoding is performed for the video, and the video information storage LL103 may store the information in any format.

Still image information stored by the still image information storage LL105 may be information transmitted by using TMCC, and may be information after decoding is performed for the still image, and the still image information storage LL105 may store the information in any format.

URL (URI) information stored by the URL (URI) information storage LL107 may be information transmitted by using TMCC, and may be information after decoding is performed for the URL (URI), and the URL (URI) information storage LL107 may store the information in any format.

Audio information stored by the audio information storage LL109 may be information transmitted by using TMCC, and may be information after decoding is performed for the audio, and the audio information storage LL109 may store the information in any format.

Further, each piece of information may have a categorizing tag added and be stored with the categorizing tag.

For example, in a case in which a first piece of information transmitted by using TMCC is financial news, when the first piece of information is stored, a financial news tag is stored with the financial news.

In a case in which a second piece of information transmitted by using TMCC is sports news, when the second piece of information is stored, a sports news tag is stored with the sports news.

For a third piece of information, a fourth piece of information, . . . categorizing tags are also stored with the information.

A terminal may organize each item based on the information of these tags, and thereby display the information on screen.

For example, when electronic message information is displayed, item categories such as "domestic news", "international news", "financial news", "sports news", "science news", etc., are provided, and for each item information belonging to the item is displayed.

In detail, the following display is performed.

"Domestic news"

{Content of first piece of information is described}

{Content of eighth piece of information is described}

"International news"

{Content of sixth piece of information is described}

{Content of seventh piece of information is described}

"Financial news"

{Content of third piece of information is described}

{Content of ninth piece of information is described}

"Sports news"

{Content of second piece of information is described}

{Content of fourth piece of information is described}

"Science news"

{Content of fifth piece of information is described}

{Content of tenth piece of information is described}

This point also applies to display of still images, display of video, and display of URLs (URIs), which may be organized and displayed per item.

Embodiment MM

A method of setting audio output is described in embodiment FF and a method of setting screen output is described in embodiment GG. In the present embodiment, as one example, a method is described of setting by using a remote control and a touch panel. A touch panel is an electronic component combining a display device such as a liquid crystal panel or organic EL panel and a position input device such as a touch pad, and is an input device for operating a device by pressing a display on screen. (A touch pad is a type of pointing device that allows operation of a mouse pointer by tracing a planar sensor with a finger.)

The method of setting audio output in embodiment FF and the method of setting screen output in embodiment GG may implement setting by using any method. For example, setting may be performed by an operation such as pressing a switch or button mounted on a terminal. Further, setting may be performed by a remote control that can control a terminal by radio transmission or infrared transmission.

In the present embodiment, a method is described of setting by using a remote control and a touch panel provided on a terminal.

For example, assuming a terminal such as a device for recording television and video, a button on a remote control associated with the terminal is pressed, resulting information is transmitted to the terminal via radio transmission or infrared transmission, and a control may be performed based on the information transmitted. When the number of buttons on the remote control is high, it is likely that a user would be confused as to which button to press, and there is a possibility that control becomes difficult.

On one hand, the terminal may have buttons mounted thereon for control of various settings, but typically the number of such buttons is low and the probability of user operation being difficult is high.

In the present embodiment, the method of setting by using a remote control and a terminal equipped with a touch panel is a method of setting that can eliminate the two technical problems described above.

Figure 109:
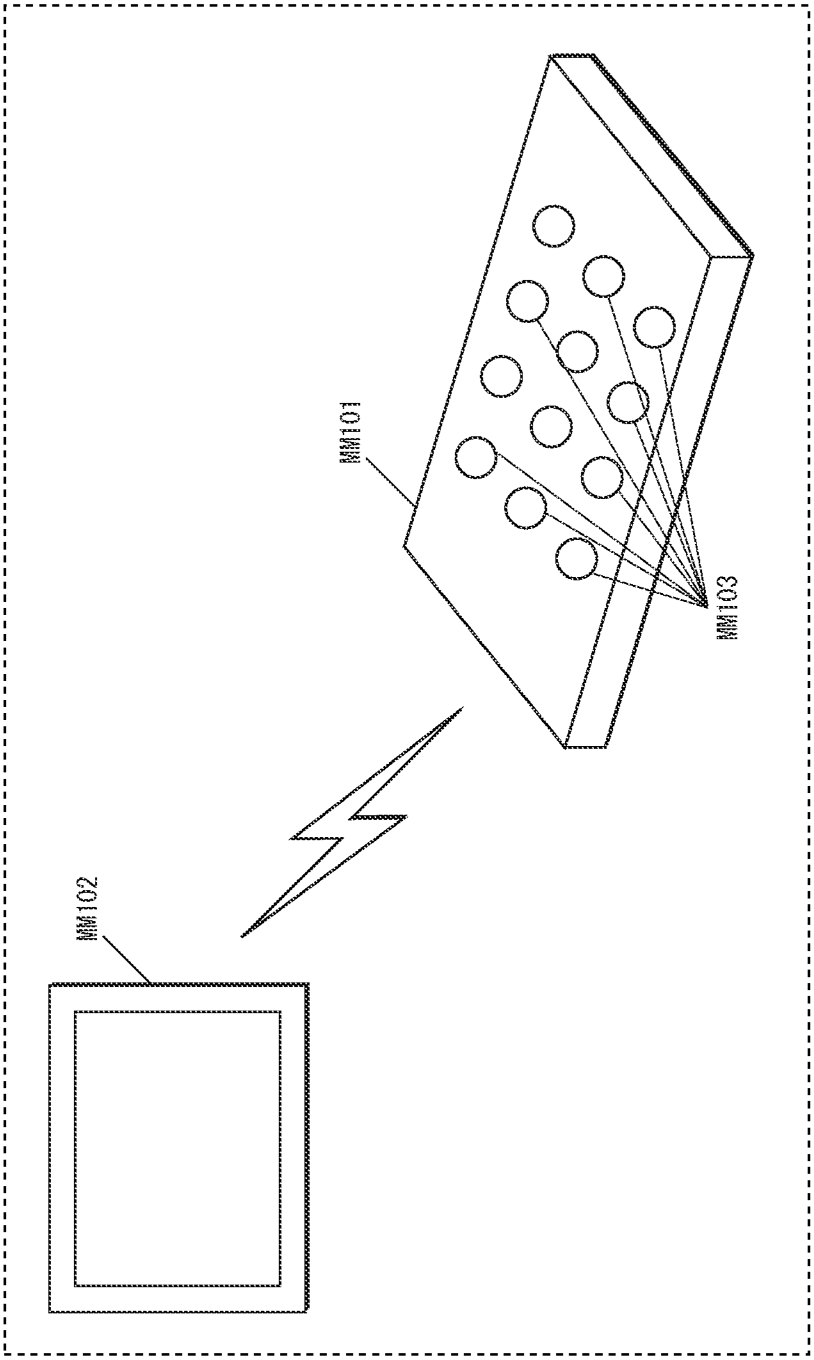
FIG. 109 illustrates correspondence between a reception device and a remote control.

FIG. 109 illustrates the terminal and remote control of the present embodiment. In FIG. 109, MM101 is a remote control and MM102 is a terminal. The remote control MM101 has buttons or a touch panel simulating buttons. Information corresponding to a button (or corresponding to a button) (MM103) pressed by a user is transmitted to the terminal MM102. When the remote control MM101 transmits information to the terminal MM102, transmission such as radio transmission or infrared transmission is used.

The terminal MM102 receives information transmitted by the remote control MM101, and thereby performs processing based on the information received. The terminal MM102 is provided with a screen (display) that displays video, electronic message information, still images, etc., and the screen (display) has touch panel functionality.

Characterizing processes of the present embodiment are described below.

<1> First, a user presses one or more buttons on the remote control MM101 and the remote control MM101 transmits information to the terminal MM102.

<2> The terminal MM102 receives the information transmitted by the remote control MM101, and, based on the information received, displays a plurality of choices (there doesn't have to be a plurality of choices) that can be selected via touch panel on the display of the terminal MM102 that is provided with touch panel functionality.

<3> The user selects a desired choice by, for example, touching (touching may be performed with a finger or other means) one of the choices on the display among the choices displayed.

Under <3>, "the user selects a desired choice by, for example, touching (touching may be performed with a finger or other means) one of the choices on the display among the choices displayed", is described, but this may be "the user selects a desired choice by, for example, touching (touching may be performed with a finger or other means) one of the choices on the display among the choices displayed, the selected choice becomes a candidate, and subsequently, for example, "OK (proceed with setting)" or "cancel (revert setting)" is displayed, and when "OK (proceed with setting)" is touched the candidate is selected, and when "cancel (revert setting)" is touched the choices are again displayed".

The above is one example, and the important point of <3> is that "the user, for example, touches (touching may be performed with a finger or other means) one of the choices on the display among the choices displayed, causing the touch panel to respond".

As a specific example, the method of audio output in embodiment FF is described.

When a user performs setting of a method of audio output, the following processing is performed.

<#1> The user presses one or more button on the remote control MM101, and the remote control MM101 transmits "setting of a method of audio output started" information to the terminal MM102.

<#2> The terminal MM102 receives the "setting of a method of audio output started" information transmitted by the remote control MM101, and, based on the information received, displays a screen as in FIG. 87 on the display of the terminal MM102 that is provided with touch panel functionality.

<#3> The user selects a desired choice by, for example, touching (touching may be performed with a finger or other means) one of the choices on the display among the choices displayed.

(Note that <#3> may be other processes as described above regarding <3>.)

As above, according to method of setting by using a remote control and a terminal equipped with a touch panel, an advantage is achieved that a button to be pressed (or touched) by a user is easily understood and various settings can be performed without confusion.

Processes <1>, <2>, and <3> may be used in setting a method of audio output as in embodiment FF and in setting a method of display output as in embodiment GG, and the processes <1>, <2>, and <3> may be applied to settings other than these examples. Further, when an application is installed on a terminal, an advantage is achieved that a button to be pressed (or touched) by a user is easily understood when advancing processing in order to set the application and run the application, by using a remote control and a touch panel the terminal is equipped with.

(Supplement)

As a matter of course, a plurality of embodiments described herein may be implemented in combination.

Herein, "∀" represents a universal quantifier and "∃" represents an existential quantifier.

Herein, in the case of a complex plane, the unit of phase of the argument, for example, is "radians".

When a complex plane is used, it can be displayed in polar form as polar coordinates of complex numbers. When points (a and b) on a complex plane are made to correspond to a complex number z=a+jb (a and b are real numbers, j is an imaginary unit), when expressing a and b as polar coordinates (r, θ), a=r×cos θ and b=r×sin θ, the following holds true:

[Math 29]

$$r=\sqrt{a^2+b^2} \quad \text{(Math 29)}$$

Here, r is the absolute value of z (r=|z|), and θ is the argument of z. Thus, z=a+jb is expressed as $r\times e^{j\theta}$.

Note that, for example, a program executing the above communication method may be stored on read only memory (ROM) and the program may be executed by a central processing unit (CPU).

Further, a program executing the above communication method may be stored on a computer-readable non-transitory storage medium, the program stored in the storage medium may be written to random access memory (RAM) of a computer, and the computer may be made to operate according to the program.

Further, each configuration such as each embodiment may be implemented typically as a large scale integration (LSI), which is an integrated circuit. This may be an individual chip, and an entire configuration or part of the configuration of an embodiment may be included in one chip. Here, "LSI" is referred to, but according to the degree of integration this may be called an integrated circuit (IC), system LSI, super LSI, or ultra LSI. Further, methods of integration are not limited to LSI, and may be implemented by a dedicated circuit or general-purpose processor. After LSI manufacture, a field programmable gate array (FPGA) or reconfigurable processor that allows reconfiguring of connections and settings of circuit cells within the LSI may be used.

Further, if integrated circuit technology to replace LSI is achieved through advancement in semiconductor technology or other derivative technology, such technology may of course be used to perform integration of function blocks. Application of biotechnology, etc., is also a possibility.

The following provides supplemental description of transmission schemes.

Figure 29:
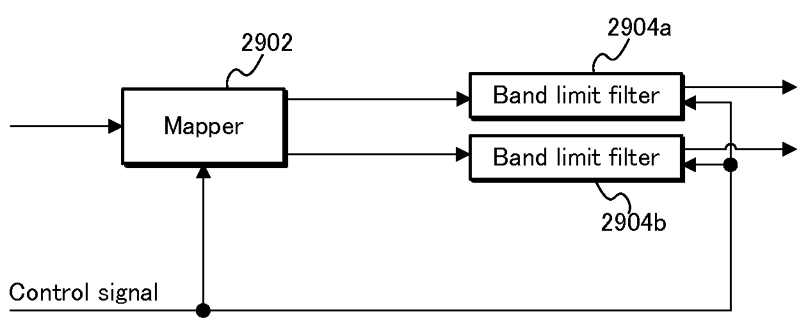
FIG. 29 is a diagram for describing a bandlimiting filter.

In the description of the present disclosure, FIG. 29 is a diagram in which a section performing mapping of, for example, the mapper 708 and the modulator 710 of FIG. 7 and a section performing bandlimiting are extracted when single carrier transmission is used as a transmission scheme.

In FIG. 29, a mapper 2902 receives a control signal and a digital signal as input, performs mapping based on information related to a modulation scheme (or transmission method) included in the control signal, and outputs an in-phase component of a post-mapping baseband signal and a quadrature component of a post-mapping baseband signal.

A bandlimiting filter 2904*a* receives the in-phase component of the post-mapping baseband signal and the control signal as input, sets a roll-off rate included in the control signal, performs bandlimiting, and outputs an in-phase component of a post-bandlimiting baseband signal.

In the same way, a bandlimiting filter 2904*b* receives the quadrature component of the post-mapping baseband signal and the control signal as input, sets a roll-off rate included in the control signal, performs bandlimiting, and outputs a quadrature component of a post-bandlimiting baseband signal.

Frequency properties of a bandlimiting filter performing bandlimiting of a carrier are as in Math (30), below.

[Math 30]

$$\begin{cases} 1 & |F| \leq F_n \times (1-\alpha) \\ \sqrt{\frac{1}{2} + \frac{1}{2}\sin\frac{\pi}{2F_n}\left[\frac{F_n - |F|}{\alpha}\right]} & F_n \times (1-\alpha) \leq |F| \leq F_n \times (1+\alpha) \\ 0 & |F| \geq F_n \times (1+\alpha) \end{cases} \quad \text{(Math 30)}$$

In the above formula, F is center frequency of a carrier, $F_n$ is a Nyquist frequency, and $\alpha$ is a roll-off rate.

Here, in a case in which it is possible that the control signal can change roll-off rate when transmitting a data symbol, ring ratio may also be changed for each modulation scheme/transmission method along with changes in roll-off rate. In this case, it is necessary to transmit information related to changes in ring ratio such as in the examples above. Thus, a reception device can demodulate and decode based on this information.

Alternatively, in a case in which it is possible that the roll-off rate can be changed when transmitting a data symbol, a transmission device transmits information related to roll-off rate changes as a control information symbol. The control information symbol may be generated by a roll-off rate of a given setting.

Embodiment B, embodiment C, embodiment D, embodiment E, embodiment F, and embodiment G describe cases in which extended information of TMCC is used to transmit $d_0$, $c_0c_1c_2c_3$, $c_4c_5c_6c_7$, $b_0b_1b_2b_3$, $x_0x_1x_2x_3x_4x_5$, $x_6x_7x_8x_9x_{10}x_{11}$, $y_0y_1y_2y_3y_4y_5$, and $y_6y_7y_8y_9y_{10}y_{11}$, but methods of transmission without using extended information of TMCC may also be considered.

In a case of transmitting without using extended information of TMCC, when two schemes exist such as "scheme A" and "scheme B", $d_0$ is transmitted as described in embodiment B, embodiment C, embodiment D, embodiment E, embodiment F, and embodiment G (but without using extended information of TMCC). On the other hand, when two schemes such as "scheme A" and "scheme B" do not exist, in other words when only one scheme exists, $d_0$ information need not be transmitted, and in such a case processing related to scheme identification as described in embodiment B, embodiment C, embodiment D, embodiment E, embodiment F, and embodiment G is unnecessary, and other processing can be implemented, in other words processing related to ring ratio changes as described in embodiment B, embodiment C, embodiment D, embodiment E, embodiment F, and embodiment G.

Further, an example of a system composed of a transmit station, a repeater, and a terminal is described in embodiment B, embodiment C, embodiment D, embodiment E, embodiment F, and embodiment G, but a system composed of a transmit station and a terminal may of course be implemented similarly. In such a case, a transmit station transmits $d_0$, $c_0c_1c_2c_3$, $c_4c_5c_6c_7$, $b_0b_1b_2b_3$, $x_0x_1x_2x_3x_4x_5$, $x_6x_7x_8x_9x_{10}x_{11}$, $y_0y_1y_2y_3y_4y_5$, and $y_6y_7y_8y_9y_{10}y_{11}$ and a terminal obtains this information, and therefore APSK ring ratio changes can be known, and detection and demodulation becomes possible.

In the present description, "audio information (audio data)" (or "audio") is referred to. The term "audio information" is considered to be interpreted to mean one of the following two cases: (However, other interpretations are possible.)

First Case:

"Audio information (audio data)" means "data of the human voice processed as a signal and digitized", "synthesized speech data", and "data other than 'data of the human voice processed as a signal and digitized' and 'synthesized speech data'".

Second Case:

"Audio information (audio data)" means "data of the sound of word(s) or sentence(s) based on a language" and "other data".

In embodiment EE, a method is described in which "emergency warning (early warning) audio information" is transmitted by a transmit station, and when a terminal obtains the "emergency warning (early warning) audio information", the terminal prioritizes audio of the "emergency warning (early warning) audio information" to output from speakers, earphones, headphones, etc. When interpreted under the above "first case", and when the "emergency warning (early warning) audio information" is "data of the human voice processed as a signal and digitized" or "synthesized speech data", the effect disclosed in embodiment EE "by prioritizing the emergency warning (early warning) audio information in the output audio, emergency warning (early warning) information can be reliably communicated to a user of a reception device (terminal), and therefore an effect is achieved of increasing the probability of ensuring safety of the user" is further increased.

When interpreted under the above "second case", and when the "emergency warning (early warning) audio information" is "data of the sound of word(s) or sentence(s) based on a language", the effect disclosed in embodiment EE "by prioritizing the emergency warning (early warning) audio information in the output audio, emergency warning (early warning) information can be reliably communicated to a user of a reception device (terminal), and therefore an effect is achieved of increasing the probability of ensuring safety of the user" is further increased.

These points are also applicable to embodiment FF in the same way.

When interpreted under the above "first case", and when the "emergency warning (early warning) audio information" is "data of the human voice processed as a signal and digitized" or "synthesized speech data", the effect disclosed in embodiment EE "by prioritizing the emergency warning (early warning) audio information in the output audio, emergency warning (early warning) information can be reliably communicated to a user of a reception device (terminal), and therefore an effect is achieved of increasing the probability of ensuring safety of the user" is further increased.

When interpreted under the above "second case", and when the "emergency warning (early warning) audio information" is "data of the sound of word(s) or sentence(s) based on a language", the effect disclosed in embodiment EE "by prioritizing the emergency warning (early warning) audio information in the output audio, emergency warning (early warning) information can be reliably communicated to a user of a reception device (terminal), and therefore an effect is achieved of increasing the probability of ensuring safety of the user" is further increased.

Further, a supplementary description is provided below of an example of a receive operation of a terminal when emergency warning (early warning) information including audio information is transmitted, as in embodiment EE and embodiment FF.

When a receiver of a terminal receives emergency warning (early warning) information including audio information, the receiver may immediately decode the audio information included in the emergency warning (early warning) information and output the audio from speakers, earphones, headphones, etc. Alternatively, upon detecting reception of emergency warning (early warning) information, the terminal may output a pre-stored warning sound (alarm), etc., from the speakers, earphones, headphones, etc., and subsequently output the audio obtained by decoding from the speakers, earphones, headphones, etc.

According to this configuration it is possible to attract the attention of a viewer/listener by outputting the warning sound (alarm) before the emergency warning (early warning) information, and therefore when compared to immediately outputting the audio of the emergency warning (early warning) information from speakers, earphones, headphones, etc., the probability of the viewer/listener missing the emergency warning (early warning) information can be decreased. Note that when the audio information itself contains a warning sound (alarm) and audio information of words or sentences of a given language, the above configuration need not be used, or the above configuration may be used to further ensure the viewer/listener listens to the audio information.

In the present description, "region information" transmitted by TMCC is described. As a method of specifying a region by "region information", a plurality of regions may simultaneously be specified, or a specific region may be individually specified. When "region information" specifies a plurality of regions, all regions (for example, "nationwide") may be specified.

In the present description, configuration of a "terminal" is described, but configuration is not limited to the terminals described in each embodiment. In particular, a terminal need not be equipped with an antenna, and in such a case the terminal is provided with an interface that inputs a signal received by antenna.

In the present description, for example, each embodiment describes transmission of a control signal such as TMCC in satellite broadcasting, and a terminal, communication system, repeater system, etc., that uses this transmission. However, use of transmission of a control signal such as TMCC in satellite broadcasting is just an example, and each embodiment described in the present description may be implemented by a transmit station transmitting a control signal such as TMCC in systems such as terrestrial broadcasting, cable television, mobile broadcasting, etc. Accordingly, as an example of a transmission scheme in wireless transmission, orthogonal frequency division multiplexing (OFDM), multiple-input multiple-output (MIMO) and multiple-input single-output (MISO) that implement signal processing such as precoding and space-time (frequency space) coding, and a spread spectrum communication scheme may be used.

A terminal described in the present description is provided with: a speaker; a liquid crystal display or organic electroluminescence (EL) display that displays video, etc.; an audio output terminal; an output terminal to output video, etc.; etc.

Setting of a method of audio output is described in embodiment FF and setting related to screen display is described in embodiment GG. A terminal itself may be provided with a controller (switch) for making (controlling) such settings, and the terminal and a remote control may be connected via infrared, wireless (for example, Wi-Fi, Bluetooth (registered trademark)), etc., and an instruction for setting of a method of audio output/setting related to screen display may be made via the remote control and the setting of a method of audio output/setting related to screen display thereby performed.

A terminal of the present description need not have a screen display or speaker. In this case, the terminal can be connected to an external display device (for example, a monitor), amplifier, and speaker.

Summary of Embodiments

A transmission method according to a first aspect is a transmission method for transmitting an emergency warning signal. The transmission method includes: generating control information, the control information including a flag indicating either presence or absence of information related to a region and, when the flag indicates presence, information related to the region; acquiring information related to emergency warning content; and generating the emergency warning signal including the control information and the information related to the emergency warning content.

According to a second aspect, in the transmission method according to first aspect, the control information is included in transmission and multiplexing configuration control (TMCC) information to be transmitted.

A transmission device according to a third aspect is a transmission device for transmitting an emergency warning signal. the transmission device includes: a control information generator that generates control information, the control information including a flag indicating either presence or absence of information related to a region and, when the flag indicates presence, information related to the region; an acquirer that acquires information related to emergency warning content; and an emergency warning signal generator that generates the emergency warning signal including the control information and the information related to the emergency warning content.

According to a fourth aspect, in the transmission device according to a third aspect, the emergency warning signal generator generates the emergency warning signal with transmission and multiplexing configuration control (TMCC) information including the control information.

A reception method according to a fifth aspect is a reception method for receiving an emergency warning signal including control information, the control information including information related to emergency warning content, a flag indicating either presence or absence of information related to a region, and, when the flag indicates presence, information related to the region. the reception method includes: detecting whether the flag indicating either presence or absence of information related to a region indicates presence or absence of information related to the region; when the flag indicates presence, determining whether or not a region receiving the emergency warning corresponds to a region indicated by the information related to the region; and when the determination is positive, decoding the information related to the emergency warning content.

According to a sixth aspect, in the reception method according to 5 sepect, the control information is included in transmission and multiplexing configuration control (TMCC) information in the emergency warning signal, and the detection is performed by extracting the control information from the TMCC information and extracting the flag from the extracted control information.

A reception device according to a seventh aspect is a reception device for receiving an emergency warning signal including control information, the control information including information related to emergency warning content, a flag indicating either presence or absence of information related to a region, and, when the flag indicates presence, information related to the region. the reception device includes: a detector that detects whether the flag either indicating presence or absence of information related to a region indicates presence or absence of information related to the region; a determiner that determines, when the flag indicates presence, whether or not a region receiving the emergency warning corresponds to a region indicated by the information related to the region; and a decoder that, when the determination is positive, decodes the information related to the emergency warning content.

According to a eighth aspect, in the reception device according to fifth aspect, the control information is included in transmission and multiplexing configuration control (TMCC) information in the emergency warning signal, and the detection is performed by extracting the control information from the TMCC information and extracting the flag from the extracted control information.

While the present disclosure described through illustration of various embodiments with reference to the drawings, it is to be understood that the present disclosure is not limited to the disclosed exemplary embodiments. Obviously, various modifications and variations will be apparent to practitioners skilled in the art within the scope of the claims, and it is to be understood that such modifications and variations are encompassed within the technical scope of the present disclosure. The components of the above-described embodiments may be combined as desired without departing from the scope of the disclosure.

In the above-described embodiments, an example in which the disclosure is implemented by using hardware discussed. However, the disclosure may be implemented by using software in cooperation with hardware.

The functional blocks utilized for describing the above-described embodiments are implemented typically by a large scale integrated circuit (LSI), which is one example of integrated circuits. These functional blocks may be individually formed into a single chip, or some or all of the functional blocks may be formed into one chip. Such an LSI may be called an IC, a system LSI, a super LSI, or an ultra LSI, depending on the integration degree.

The integration technology of the functional blocks is not restricted to an LSI technology. Instead, a dedicated circuit or a general-purpose processor may be used. For example, a field programmable gate array (FPGA) that is programmable after it is manufactured, or a reconfigurable processor that may reconfigure connections or settings of circuit cells within this processor may be used.

Further, due to the progress of semiconductor technologies or the appearance of a derivative technology, if a circuit integration technology which replaces an LSI technology is developed, the functional blocks may be integrated by utilizing such a technology. The application of a biotechnology, for example, may be one of such cases.

The transmission device pertaining to the present disclosure is applicable to communication/broadcast systems having high error correction capability error correction code, and can contribute to improvement in data reception quality when iterative detection is performed at a reception device side.

What is claimed is:

1. A transmission method, executed by a transmission device, for transmitting emergency alert information, the transmission method comprising:

generating (i) a message of an emergency alert and (ii) a Uniform Resource Locator (URL) indicating a location of a detailed content of the emergency alert;

including the message and the URL into emergency alert information; and transmitting the emergency alert information as a signaling of broadcast service toward a broadcast area, wherein the transmission method further comprises: including location information into the emergency alert information if a target area indicated by the location information is a portion of the broadcast area, and the emergency alert information does not include the location information if the target area is same as the broadcast area.

2. A processing method, executed by a reception device, for processing emergency alert information, the processing method comprising:

receiving emergency alert information as a signaling of broadcast service transmitted from a transmission device;

extracting (i) a message of an emergency alert and (ii) a Uniform Resource Locator (URL) indicating a location of a detailed content of the emergency alert from the emergency alert information;

determining whether the emergency alert information includes location information indicating a target area of the emergency alert, the target area being a portion of a broadcast area of the transmission device;

performing a first action based on the emergency alert information if the emergency alert information is determined to not include the location information;

determining whether the reception device is located in the target area if the emergency alert information is determined to include the location information; and performing a second action if the reception device is determined to be located in the target area, wherein the emergency alert information does not include the location information if the target area is same as the broadcast area.

3. A relaying method, executed by a communication device, for relaying emergency alert information, the rerouting method comprising:

receiving the emergency alert information as a signaling of broadcast service from a transmission device, the emergency alert information including (i) a message of an emergency alert and (ii) a Uniform Resource Locator (URL) indicating a location of a detailed content of the emergency alert;

generating first control information and second control information in association with the emergency alert to control a first reception device and a second reception device, respectively; and transmitting (i) the emergency alert information and the first control information to the first reception device via a local area network and (ii) the emergency alert information and the second control information to the second reception device via the local area network, the first reception device and the second reception device being configured to perform a first action and a second action different from the first action according to the first control information and the second control information, respectively, wherein the emergency alert information includes location information indicating a target area of the emergency alert if the target area is a portion of a broadcast area of the transmission device, and wherein the emergency alert information does not include the location information if the target area is same as the broadcast area.

* * * * *